US012789360B2

(12) United States Patent
Low et al.

(10) Patent No.: US 12,789,360 B2
(45) Date of Patent: Nov. 10, 2026

(54) INSPECTION ROBOT HAVING FORWARD AND REARWARD SENSOR MOUNT GROUPS AND PROCESSING AND/OR CALIBRATION VALUES

(71) Applicant: Gecko Robotics, Inc., Pittsburgh, PA (US)

(72) Inventors: Kevin Y. Low, Pittsburgh, PA (US); Edward A. Bryner, Pittsburgh, PA (US); Chase David, Montgomery, TX (US); Michael A. Binger, Pittsburgh, PA (US); Matthew St. Jean, Pittsburgh, PA (US); Ignacio J. Cordova, Pittsburgh, PA (US)

(73) Assignee: GTC Law Group PC & Affiliates, Pittsburgh, PA (US)

( * ) Notice: Subject to any disclaimer, the term of this patent is extended or adjusted under 35 U.S.C. 154(b) by 0 days.

(21) Appl. No.: 19/196,369

(22) Filed: May 1, 2025

(65) Prior Publication Data

US 2026/0061596 A1 Mar. 5, 2026

Related U.S. Application Data

(63) Continuation of application No. PCT/US2023/078409, filed on Nov. 1, 2023.

(Continued)

(51) Int. Cl.

*B25J 9/00* (2006.01)

*B25J 9/16* (2006.01)

(Continued)

(52) U.S. Cl.

CPC ........... *B25J 9/0009* (2013.01); *B25J 9/1692* (2013.01); *B25J 11/008* (2013.01); *B25J 13/08* (2013.01);

(Continued)

(58) Field of Classification Search

CPC ...... B25J 9/0009; B25J 9/1692; B25J 11/008; B25J 19/02

See application file for complete search history.

(56) References Cited

U.S. PATENT DOCUMENTS 3,028,753 A 4/1962 Joy 3,055,210 A 9/1962 Joy (Continued)

FOREIGN PATENT DOCUMENTS

CN 101368932 A 2/2009

CN 102356311 A 2/2012

(Continued)

OTHER PUBLICATIONS

European Patent Specification (Year: 2017).

(Continued)

*Primary Examiner* — Robert T Nguyen

(74) *Attorney, Agent, or Firm* — GTC Law Group PC & Affiliates

(57) ABSTRACT

A method for inspecting an inspection surface using an inspection robot includes inspecting the inspection surface with a first sled assembly, the first sled assembly including a first forward sensor mount group and a second rearward sensor mount group. The method also includes inspecting the inspection surface with a second sled assembly, the second sled assembly including a third forward sensor mount group and a fourth rearward sensor mount group, and interpreting a first calibration value for a plurality of sensors of the first forward sensor mount group and a plurality of sensors of the third forward sensor mount group. Furthermore, the method includes performing inspection operations based on the first calibration value and capturing inspection data based on the inspection operations.

10 Claims, 118 Drawing Sheets

Related U.S. Application Data

(60) Provisional application No. 63/381,851, filed on Nov. 1, 2022.

(51) Int. Cl.
*B25J 11/00* (2006.01)
*B25J 13/08* (2006.01)
*B25J 19/02* (2006.01)
*G01N 29/04* (2006.01)
*G01N 29/22* (2006.01)
*G01N 29/265* (2006.01)
*G01N 29/30* (2006.01)

(52) U.S. Cl.
CPC ............. *B25J 19/02* (2013.01); *B25J 19/027* (2013.01); *G01N 29/04* (2013.01); *G01N 29/041* (2013.01); *G01N 29/225* (2013.01); *G01N 29/265* (2013.01); *G01N 29/30* (2013.01); *G01N 2291/0289* (2013.01); *G01N 2291/105* (2013.01); *G01N 2291/106* (2013.01)

(56) References Cited

U.S. PATENT DOCUMENTS 3,279,242 A 10/1966 Megoloff
3,326,037 A 6/1967 John
3,420,097 A 1/1969 Batterman et al.
3,427,866 A 2/1969 Weighart
3,437,786 A 4/1969 Colinet et al.
3,741,003 A 6/1973 Gunkel
3,837,202 A 9/1974 Hetherington et al.
3,895,685 A 7/1975 Gillette et al.
3,952,581 A 4/1976 Gottelt
4,027,528 A 6/1977 Tyree
4,033,178 A 7/1977 Holt et al.
4,043,185 A 8/1977 Siebert
4,055,990 A 11/1977 Topping
4,304,134 A 12/1981 Rouse et al.
4,355,536 A 10/1982 Mcshane et al.
4,368,644 A 1/1983 Wentzell et al.
4,434,660 A 3/1984 Michaels et al.
4,437,332 A 3/1984 Pittaro
4,495,587 A 1/1985 Plante et al.
4,526,037 A 7/1985 Wentzell et al.
4,537,136 A 8/1985 Douglas
4,558,598 A 12/1985 Young
4,596,144 A 6/1986 Panton et al.
4,757,258 A 7/1988 Kelly, Jr. et al.
4,893,286 A 1/1990 Cobb
4,964,059 A 10/1990 Sugaya et al.
5,007,291 A 4/1991 Walters et al.
5,038,615 A 8/1991 Trulson et al.
5,062,298 A 11/1991 Falcoff et al.
5,097,710 A 3/1992 Palynchuk
5,271,274 A 12/1993 Khuri-yakub et al.
5,285,689 A 2/1994 Hapstack et al.
5,350,033 A 9/1994 Kraft
5,404,755 A 4/1995 Olson et al.
5,426,980 A 6/1995 Smith
5,429,009 A 7/1995 Wolfe et al.
5,440,929 A 8/1995 Huang et al.
5,549,004 A 8/1996 Nugent
5,559,696 A 9/1996 Borenstein
5,619,423 A 4/1997 Scrantz
5,635,644 A 6/1997 Ishikawa et al.
5,663,502 A 9/1997 Nagashima et al.
5,764,014 A 6/1998 Jakeway et al.
5,782,253 A 7/1998 Cates et al.
5,809,099 A 9/1998 Kim et al.
5,814,731 A 9/1998 Alexander et al.
5,857,534 A 1/1999 Devault et al.
5,929,338 A 7/1999 Frankel et al.
5,948,985 A 9/1999 Brautigan et al.
6,064,428 A 5/2000 Trosino et al.
6,076,407 A 6/2000 Levesque et al.
6,104,970 A 8/2000 Schmidt, Jr. et al.
6,220,099 B1 4/2001 Marti et al.
6,234,025 B1 5/2001 Gieske et al.
6,243,657 B1 6/2001 Tuck et al.
6,273,521 B1 8/2001 Halvorson et al.
6,298,727 B1 10/2001 Fleming et al.
6,317,387 B1 11/2001 D'Amaddio et al.
6,493,612 B1 12/2002 Bisset et al.
6,634,233 B2 10/2003 He
6,672,413 B2 1/2004 Moore et al.
6,748,808 B2 6/2004 Lam et al.
6,813,542 B2 11/2004 Peshkin et al.
6,883,376 B2 4/2005 He
6,904,818 B2 6/2005 Harthorn et al.
6,931,931 B2 8/2005 Graff et al.
6,981,417 B1 1/2006 Oravecz
7,082,822 B2 8/2006 Harthorn et al.
7,107,863 B2 9/2006 Harthorn et al.
7,182,025 B2 2/2007 Ghorbel et al.
7,194,908 B2 3/2007 Nenno et al.
7,210,364 B2 * 5/2007 Ghorbel .................. F16L 55/26
73/865.8
7,296,488 B2 11/2007 Hock et al.
7,337,673 B2 3/2008 Kennedy et al.
7,395,714 B2 7/2008 Georgeson et al.
7,430,913 B2 10/2008 Sarr
7,464,596 B2 12/2008 Bui et al.
7,513,161 B2 4/2009 Sato et al.
7,571,649 B2 8/2009 Young
7,617,732 B2 11/2009 Bui et al.
7,640,810 B2 1/2010 Kennedy et al.
7,681,452 B2 3/2010 Bagley et al.
7,689,003 B2 3/2010 Shannon et al.
7,743,660 B2 6/2010 Marsh et al.
7,862,512 B2 1/2011 Iikubo et al.
7,869,844 B2 1/2011 Lee et al.
8,025,551 B2 9/2011 Torres et al.
8,347,724 B2 1/2013 Brignac
8,347,746 B2 1/2013 Hafenrichter et al.
8,408,065 B2 4/2013 Nyholt et al.
8,738,226 B2 5/2014 Troy et al.
8,739,059 B2 5/2014 Rabenold et al.
8,805,579 B2 * 8/2014 Skrinde ................ B25J 11/0085
134/18
8,806,948 B2 8/2014 Kahn et al.
8,833,169 B2 9/2014 Lute, Jr. et al.
8,902,302 B2 12/2014 Garvey et al.
8,943,892 B2 * 2/2015 Garvey ................ G01N 29/043
702/56
9,010,684 B2 * 4/2015 Motzer ................ G01N 29/225
244/119
9,033,087 B2 5/2015 Lama
9,037,419 B2 5/2015 Na et al.
9,121,817 B1 9/2015 Roach et al.
9,221,506 B1 12/2015 Georgeson et al.
9,238,491 B1 1/2016 Hakes et al.
9,285,296 B2 3/2016 Georgeson et al.
9,310,482 B2 4/2016 Rosenberg et al.
9,335,305 B2 5/2016 Smith et al.
9,410,659 B2 8/2016 Troy et al.
9,463,574 B2 10/2016 Purkayastha et al.
9,470,658 B2 10/2016 Troy et al.
9,562,878 B2 2/2017 Graham et al.
9,643,313 B2 5/2017 Hafenrichter et al.
9,664,652 B2 5/2017 Fetzer et al.
9,733,219 B2 8/2017 Spencer et al.
9,746,445 B2 8/2017 Hafenrichter et al.
9,796,089 B2 10/2017 Lawrence, III et al.
9,804,132 B2 10/2017 Hoyt
9,834,323 B2 12/2017 Georgeson et al.
9,863,891 B1 1/2018 Lara Magallanes et al.
9,863,919 B2 1/2018 Carrasco Zanini et al.
9,904,614 B2 2/2018 Stevens et al.
9,950,813 B2 4/2018 Hafenrichter et al.
9,963,836 B1 5/2018 Brenner et al.
10,012,618 B2 7/2018 Carrasco Zanini et al.
10,036,680 B2 7/2018 Frueh

(56) References Cited

U.S. PATENT DOCUMENTS 10,083,166 B2 9/2018 Liu et al.
10,131,057 B2 11/2018 Patel et al.
10,209,223 B2 2/2019 Kollgaard et al.
10,234,375 B2 3/2019 Abdellatif et al.
10,253,855 B2 4/2019 Potter et al.
10,281,912 B2 5/2019 Hollister
10,315,715 B2 6/2019 Beard et al.
10,317,905 B2 6/2019 Ouellette et al.
10,343,276 B2 7/2019 Carrasco Zanini et al.
10,353,399 B2 7/2019 Ebrahimi Afrouzi
10,451,222 B2 10/2019 Carrasco Zanini et al.
10,481,608 B2 11/2019 Loosararian et al.
10,534,365 B2 1/2020 Loosararian et al.
10,545,121 B2 1/2020 Frueh et al.
10,672,046 B2 6/2020 Messinger et al.
10,689,113 B2 6/2020 Prager et al.
10,698,412 B2 6/2020 Loosararian et al.
10,739,779 B2 8/2020 Loosararian et al.
10,783,623 B2 9/2020 Morris et al.
10,795,373 B2 10/2020 Loosararian et al.
10,805,431 B2 10/2020 Ito
10,823,709 B2 11/2020 Hafenrichter et al.
10,884,423 B2 1/2021 Loosararian et al.
10,890,505 B2 1/2021 Morris et al.
10,895,878 B2 1/2021 Loosararian et al.
10,942,522 B2 3/2021 Loosararian et al.
10,969,367 B2 4/2021 Fetzer et al.
11,035,669 B2 6/2021 Patel et al.
11,035,829 B2 6/2021 Wells
11,037,320 B1 6/2021 Ebrahimi Afrouzi et al.
11,097,796 B2 8/2021 Abdellatif et al.
11,135,721 B2 10/2021 Bryner et al.
11,144,063 B2 10/2021 Loosararian et al.
11,148,292 B2 10/2021 Bryner et al.
11,157,012 B2 10/2021 Loosararian et al.
11,157,013 B2 10/2021 Loosararian et al.
11,216,006 B2 1/2022 Soh et al.
11,274,929 B1 3/2022 Afrouzi et al.
11,307,063 B2 4/2022 Low et al.
11,327,052 B2 5/2022 Gagnon et al.
11,378,553 B2 7/2022 Melandsø et al.
11,385,650 B2 7/2022 Loosararian et al.
11,399,995 B2 8/2022 Coulter et al.
11,429,109 B2 8/2022 Loosararian et al.
11,435,192 B1 9/2022 Ebrahimi Afrouzi et al.
11,468,588 B1 10/2022 Ebrahimi Afrouzi et al.
11,511,426 B2 11/2022 Bryner et al.
11,518,030 B2 12/2022 Bryner et al.
11,518,031 B2 12/2022 Bryner et al.
11,529,735 B2 12/2022 Bryner et al.
11,548,577 B2 * 1/2023 Abdellatif ............. B60B 19/006
11,549,918 B2 1/2023 Spay et al.
11,565,417 B2 1/2023 Bryner et al.
11,584,158 B2 2/2023 Abdellatif et al.
11,648,671 B2 5/2023 Bryner et al.
11,669,100 B2 6/2023 Loosararian et al.
11,673,272 B2 6/2023 Loosararian et al.
11,740,635 B2 8/2023 Loosararian et al.
11,760,127 B2 * 9/2023 Abdellatif ............. B60B 19/006
180/21
11,850,726 B2 12/2023 Bryner et al.
11,865,698 B2 1/2024 Bryner et al.
11,868,937 B1 1/2024 Culley et al.
11,872,688 B2 1/2024 Bryner et al.
11,872,707 B2 1/2024 Bryner et al.
11,892,322 B2 2/2024 Low et al.
11,904,456 B2 2/2024 Jourde et al.
11,906,470 B2 2/2024 Serrill et al.
11,926,037 B2 3/2024 Bryner et al.
11,964,382 B2 4/2024 Jourde et al.
11,969,881 B2 4/2024 Jourde et al.
11,971,389 B2 4/2024 David et al.
11,975,585 B2 5/2024 Colaw et al.
11,977,054 B2 5/2024 David et al.
11,992,935 B2 5/2024 Bryner et al.
12,007,364 B2 6/2024 David et al.
12,013,705 B2 6/2024 Loosararian et al.
12,022,617 B2 6/2024 Jourde et al.
12,038,119 B2 * 7/2024 Akin ......................... B66F 3/22
12,038,412 B2 7/2024 David et al.
12,050,202 B2 7/2024 David et al.
12,061,173 B2 8/2024 David et al.
12,061,483 B2 8/2024 Loosararian et al.
12,061,484 B2 8/2024 Loosararian et al.
12,072,319 B2 8/2024 David et al.
12,156,334 B2 11/2024 Bryner et al.
12,160,956 B2 12/2024 Jourde et al.
12,162,160 B2 12/2024 Pinero et al.
12,200,868 B2 1/2025 Jourde et al.
12,228,550 B2 2/2025 David et al.
12,313,599 B2 5/2025 David et al.
12,358,141 B2 7/2025 Loosararian et al.
12,365,199 B2 7/2025 Bryner et al.
12,366,557 B2 7/2025 David et al.
12,420,585 B2 9/2025 Bryner et al.
12,420,586 B2 9/2025 Jourde et al.
12,442,797 B2 10/2025 David et al.
12,491,732 B2 12/2025 Bryner et al.
12,510,516 B1 * 12/2025 Djavanroodi ........ G01N 29/265
12,566,158 B2 3/2026 Low et al.
12,569,979 B2 3/2026 Low et al.
12,591,239 B2 3/2026 Loosararian et al.
12,611,765 B1 * 4/2026 Boychuck .................. B25J 9/08
12,643,232 B2 6/2026 Roy et al.
2002/0104693 A1 8/2002 Moore et al.
2002/0111712 A1 8/2002 Peshkin et al.
2002/0134159 A1 9/2002 He
2002/0190682 A1 12/2002 Schempf et al.
2003/0167616 A1 9/2003 Harding et al.
2003/0172735 A1 9/2003 Lam et al.
2003/0198212 A1 10/2003 Hoctor et al.
2004/0050165 A1 3/2004 He
2004/0173116 A1 9/2004 Ghorbel et al.
2004/0177681 A1 9/2004 Harthorn et al.
2004/0207394 A1 10/2004 Harthorn et al.
2005/0056105 A1 3/2005 Delacroix et al.
2005/0150300 A1 7/2005 Nenno et al.
2005/0252296 A1 11/2005 Hock et al.
2005/0289610 A1 12/2005 Takagi et al.
2006/0055399 A1 3/2006 Georgeson et al.
2006/0243051 A1 11/2006 Bui et al.
2007/0006657 A1 1/2007 Kennedy et al.
2007/0006658 A1 1/2007 Kennedy et al.
2007/0044562 A1 3/2007 Sarr
2007/0044564 A1 3/2007 Bui et al.
2007/0055152 A1 3/2007 Ukubo et al.
2007/0144769 A1 6/2007 Salama
2007/0146480 A1 6/2007 Judge et al.
2007/0195712 A1 8/2007 Thayer et al.
2007/0217672 A1 9/2007 Shannon et al.
2007/0227250 A1 10/2007 Kennedy et al.
2008/0039974 A1 2/2008 Sandin et al.
2008/0059114 A1 3/2008 Coperet
2008/0087112 A1 4/2008 Bagley et al.
2008/0087113 A1 4/2008 Bagley et al.
2008/0118875 A1 5/2008 Kim et al.
2008/0147347 A1 6/2008 Shaw et al.
2008/0148876 A1 6/2008 Hock et al.
2008/0202245 A1 8/2008 Young
2008/0220692 A1 9/2008 Torres et al.
2008/0307886 A1 12/2008 Marsh et al.
2009/0114025 A1 5/2009 Sato et al.
2009/0287450 A1 11/2009 Dubois et al.
2009/0301203 A1 12/2009 Brussieux
2010/0036702 A1 2/2010 Sitton
2010/0060273 A1 3/2010 Couchman
2010/0212983 A1 8/2010 Lama
2010/0224001 A1 9/2010 Brignac
2011/0005846 A1 * 1/2011 Page ........................ B25J 5/005
180/68.5
2011/0030478 A1 2/2011 Park et al.
2011/0150626 A1 6/2011 Kinzie et al.
2011/0167914 A1 7/2011 Sutherland
2011/0178727 A1 7/2011 Hafenrichter et al.

(56) References Cited

U.S. PATENT DOCUMENTS

| | | | |
|---|---|---|---|
| 2012/0116583 | A1 | 5/2012 | Beard et al. |
| 2012/0215348 | A1 | 8/2012 | Skrinde |
| 2012/0218868 | A1 | 8/2012 | Kahn et al. |
| 2013/0024067 | A1 | 1/2013 | Troy et al. |
| 2013/0070068 | A1 | 3/2013 | Garvey, III et al. |
| 2013/0211766 | A1 | 8/2013 | Rosenberg et al. |
| 2013/0218490 | A1 | 8/2013 | Poirier et al. |
| 2013/0231779 | A1 | 9/2013 | Purkayastha et al. |
| 2013/0289766 | A1 | 10/2013 | Hafenrichter et al. |
| 2013/0317676 | A1 | 11/2013 | Cooper et al. |
| 2013/0340529 | A1 | 12/2013 | Lama |
| 2014/0069193 | A1 | 3/2014 | Graham et al. |
| 2014/0184786 | A1 | 7/2014 | Georgeson et al. |
| 2014/0188649 | A1 | 7/2014 | Messinger et al. |
| 2014/0278221 | A1 | 9/2014 | Troy et al. |
| 2014/0305216 | A1 | 10/2014 | Hafenrichter et al. |
| 2014/0305217 | A1 | 10/2014 | Tapia et al. |
| 2014/0350722 | A1 | 11/2014 | Skrinde |
| 2015/0046018 | A1 | 2/2015 | Hayashi et al. |
| 2015/0153312 | A1* | 6/2015 | Gonzalez ............. G01N 29/048 901/44 |
| 2015/0177194 | A1 | 6/2015 | Xu et al. |
| 2015/0226369 | A1 | 8/2015 | Troy et al. |
| 2015/0233786 | A1 | 8/2015 | Pieper et al. |
| 2015/0316195 | A1 | 11/2015 | Penza et al. |
| 2015/0329221 | A1 | 11/2015 | Georgeson et al. |
| 2016/0023696 | A1 | 1/2016 | Hakes et al. |
| 2016/0033453 | A1 | 2/2016 | Cegla et al. |
| 2016/0117059 | A1 | 4/2016 | Folken et al. |
| 2016/0121486 | A1 | 5/2016 | Lipinski et al. |
| 2016/0123933 | A1 | 5/2016 | Fetzer et al. |
| 2016/0231279 | A1 | 8/2016 | Hoyt |
| 2016/0238565 | A1 | 8/2016 | Gonzalez et al. |
| 2016/0273992 | A1 | 9/2016 | Frueh |
| 2016/0281910 | A1 | 9/2016 | Troy et al. |
| 2016/0282877 | A1 | 9/2016 | Gonzalez et al. |
| 2016/0334301 | A1 | 11/2016 | Hafenrichter et al. |
| 2016/0349213 | A1 | 12/2016 | Kollgaard et al. |
| 2016/0350671 | A1 | 12/2016 | Morris et al. |
| 2017/0007336 | A1 | 1/2017 | Tsuboi et al. |
| 2017/0021495 | A1 | 1/2017 | Davis |
| 2017/0169582 | A1 | 6/2017 | Tanaka et al. |
| 2017/0191966 | A1 | 7/2017 | Niri et al. |
| 2017/0225804 | A1 | 8/2017 | Hafenrichter et al. |
| 2017/0347624 | A1 | 12/2017 | Jorgensen et al. |
| 2018/0024561 | A1 | 1/2018 | Soh et al. |
| 2018/0029260 | A1 | 2/2018 | Shaw et al. |
| 2018/0059660 | A1 | 3/2018 | Heatzig et al. |
| 2018/0065762 | A1 | 3/2018 | Georgeson et al. |
| 2018/0073975 | A1 | 3/2018 | Abdellatif et al. |
| 2018/0080904 | A1 | 3/2018 | Al Nahwi et al. |
| 2018/0080905 | A1 | 3/2018 | Al Nahwi et al. |
| 2018/0117718 | A1 | 5/2018 | Rajagopalan et al. |
| 2018/0172121 | A1 | 6/2018 | Potter et al. |
| 2018/0232874 | A1 | 8/2018 | Østervold et al. |
| 2018/0245923 | A1 | 8/2018 | Han |
| 2018/0313715 | A1 | 11/2018 | Cichosz et al. |
| 2019/0015971 | A1 | 1/2019 | Carrasco Zanini et al. |
| 2019/0017656 | A1 | 1/2019 | Carrasco Zanini et al. |
| 2019/0022877 | A1* | 1/2019 | Akin ..................... G01M 13/00 |
| 2019/0025851 | A1 | 1/2019 | Ebrahimi Afrouzi |
| 2019/0046373 | A1 | 2/2019 | Coulter et al. |
| 2019/0086020 | A1 | 3/2019 | Wehlin et al. |
| 2019/0128850 | A1 | 5/2019 | Brignac et al. |
| 2019/0128851 | A1 | 5/2019 | Wells |
| 2019/0128856 | A1 | 5/2019 | Spay et al. |
| 2019/0134821 | A1 | 5/2019 | Patrick et al. |
| 2019/0162703 | A1 | 5/2019 | Melandsø et al. |
| 2019/0228573 | A1 | 7/2019 | Sen et al. |
| 2019/0242743 | A1 | 8/2019 | Patel et al. |
| 2019/0360976 | A1 | 11/2019 | Frueh et al. |
| 2019/0388998 | A1 | 12/2019 | Huggett et al. |
| 2020/0011840 | A1 | 1/2020 | Hafenrichter et al. |
| 2020/0045146 | A1 | 2/2020 | Ito |
| 2020/0172184 | A1 | 6/2020 | Abdellatif et al. |
| 2020/0173879 | A1 | 6/2020 | Morris et al. |
| 2020/0175667 | A1 | 6/2020 | Morris et al. |
| 2020/0262052 | A1 | 8/2020 | Bryner et al. |
| 2020/0262066 | A1 | 8/2020 | Bryner et al. |
| 2020/0264614 | A1 | 8/2020 | Bryner et al. |
| 2020/0306969 | A1 | 10/2020 | Bryner et al. |
| 2020/0393418 | A1 | 12/2020 | Fetzer et al. |
| 2021/0239815 | A1 | 8/2021 | Acosta et al. |
| 2022/0019190 | A1 | 1/2022 | Mohamed Shibly et al. |
| 2022/0169072 | A1 | 6/2022 | Abdellatif et al. |
| 2022/0214315 | A1 | 7/2022 | Serrill et al. |
| 2022/0268741 | A1* | 8/2022 | Boerner ................. G01N 29/24 |
| 2022/0282821 | A1* | 9/2022 | Tevar ..................... B25J 19/023 |
| 2022/0331945 | A1 | 10/2022 | Bryner et al. |
| 2022/0331981 | A1 | 10/2022 | Bryner et al. |
| 2022/0331983 | A1 | 10/2022 | Bryner et al. |
| 2022/0331984 | A1 | 10/2022 | Bryner et al. |
| 2022/0331985 | A1 | 10/2022 | Jourde et al. |
| 2022/0331986 | A1 | 10/2022 | Bryner et al. |
| 2022/0331987 | A1 | 10/2022 | Bryner et al. |
| 2022/0334582 | A1 | 10/2022 | Bryner et al. |
| 2022/0341884 | A1 | 10/2022 | Kobayashi et al. |
| 2022/0341891 | A1 | 10/2022 | David et al. |
| 2022/0341892 | A1 | 10/2022 | David et al. |
| 2023/0003687 | A1 | 1/2023 | Vaganay et al. |
| 2023/0087654 | A1 | 3/2023 | Bryner et al. |
| 2023/0390930 | A1 | 12/2023 | Loosararian et al. |
| 2023/0406140 | A1 | 12/2023 | Gross et al. |
| 2024/0100717 | A1 | 3/2024 | Bryner et al. |
| 2024/0198519 | A1 | 6/2024 | Roy et al. |
| 2024/0255471 | A1 | 8/2024 | David et al. |
| 2024/0269833 | A1 | 8/2024 | Van De Meer |
| 2024/0280956 | A1 | 8/2024 | Shaprio et al. |
| 2024/0345036 | A1 | 10/2024 | David et al. |
| 2024/0345580 | A1 | 10/2024 | Loosararian et al. |
| 2024/0367824 | A1* | 11/2024 | La .......................... B64U 10/16 |
| 2025/0029225 | A1 | 1/2025 | Ebata et al. |
| 2025/0033212 | A1 | 1/2025 | Pinero et al. |
| 2025/0172527 | A1 | 5/2025 | David et al. |
| 2025/0244296 | A1 | 7/2025 | Low et al. |
| 2025/0249573 | A1 | 8/2025 | Low et al. |
| 2025/0251369 | A1 | 8/2025 | Low et al. |
| 2025/0256390 | A1 | 8/2025 | Low et al. |
| 2025/0305995 | A1 | 10/2025 | David et al. |
| 2025/0314621 | A1 | 10/2025 | David et al. |
| 2025/0314624 | A1 | 10/2025 | David et al. |
| 2025/0319608 | A1 | 10/2025 | Low et al. |
| 2025/0326122 | A1 | 10/2025 | Bryner et al. |
| 2025/0389671 | A1 | 12/2025 | Padgett et al. |
| 2026/0009767 | A1 | 1/2026 | David et al. |
| 2026/0009768 | A1 | 1/2026 | David et al. |
| 2026/0009769 | A1 | 1/2026 | David et al. |
| 2026/0061638 | A1 | 3/2026 | Low et al. |
| 2026/0063593 | A1 | 3/2026 | Low et al. |
| 2026/0070223 | A1 | 3/2026 | Loosararian et al. |
| 2026/0116123 | A1 | 4/2026 | Bryner et al. |
| 2026/0138275 | A1 | 5/2026 | Padgett et al. |
| 2026/0146973 | A1 | 5/2026 | Low et al. |

FOREIGN PATENT DOCUMENTS

| | | | |
|---|---|---|---|
| CN | 107941921 | A | 4/2018 |
| CN | 112539749 | A | 3/2021 |
| CN | 112907656 | A | 6/2021 |
| CN | 112917483 | A | 6/2021 |
| CN | 115314996 | A | 11/2022 |
| CN | 117150414 | A | 12/2023 |
| DE | 10300383 | A1 | 7/2004 |
| DE | 102016117237 | A1 | 3/2018 |
| DE | 102019211479 | A1 | 2/2021 |
| EP | 1742049 | A2 | 1/2007 |
| EP | 1744157 | B1 | 9/2015 |
| IN | 202421032066 | A | 5/2024 |
| JP | 2021032881 | A | 3/2021 |
| KR | 101775114 | B1 | 8/2017 |
| KR | 20180065762 | A | 6/2018 |
| KR | 102263144 | B1 | 6/2021 |
| KR | 102263706 | B1 | 6/2021 |
| WO | 03087733 | A2 | 10/2003 |

(56) References Cited

FOREIGN PATENT DOCUMENTS

| | | | |
|---|---|---|---|
| WO | 2015059916 | A1 | 4/2015 |
| WO | 2015095908 | A2 | 7/2015 |
| WO | 2015152198 | A1 | 10/2015 |
| WO | 2016051147 | A1 | 4/2016 |
| WO | 2016089839 | A1 | 6/2016 |
| WO | 2020185719 | A2 | 9/2020 |
| WO | 2020249238 | A1 | 12/2020 |
| WO | 2022236064 | A2 | 11/2022 |
| WO | 2024073767 | A1 | 4/2024 |
| WO | 2024073771 | A2 | 4/2024 |
| WO | 2024077090 | A1 | 4/2024 |
| WO | 2024092081 | A1 | 5/2024 |
| WO | 2024097795 | A2 | 5/2024 |
| WO | 2024138219 | A3 | 7/2024 |
| WO | 2024254593 | A2 | 12/2024 |
| WO | 2024254597 | A1 | 12/2024 |
| WO | 2024259133 | A2 | 12/2024 |
| WO | 2025136451 | A1 | 6/2025 |
| WO | 2025137562 | A1 | 6/2025 |
| WO | 2025240461 | A1 | 11/2025 |
| WO | 2026006829 | A1 | 1/2026 |

OTHER PUBLICATIONS

"All Metals Fabrication", Painting Metal, Aug. 27, 2015, 7 pages.
"Coordinate Systems in Two and Three Dimensions", Oregon State University, Department of Mathematics, 2015, 3 pages.
"English translation for reference CN112539749 (Year: 2020)", 31 pages.
"English translation for reference CN115314996 (Year: 2022)", 12 pages.
"English translation for reference KR101775114 (Year: 2017)".
"Horizontal definition", Merriam-Webster Dictionary, 2014, 1 page.
"International Federation of Robotics,", World Robotics, Chapter 1 section 2, 2016, 10 pages.
"Merriam-Webster", Definition of Pivot, 2015, 5 pages.
"Reflectors, Maximum accuracy and range, Hexagon Geosystems, Leica Geosystems, https://leica-geosystems.com/products/total-stations/accessories/reflectors", available at https://web.archive.org/web/20160303225554/http://leica-geosystems.com:80/products/total-stations/accessories/reflectors, Together With Enlarged Text, Mar. 3, 2016, 4 pages.
"Reflectors, Maximum accuracy and range, Hexagon Geosystems, Leica Geosystems, https://leica-geosystems.com/products/total-stations/accessories/reflectors", available at https://web.archive.org/web/20220524042219/https://leica-geosystems.com/products/total-stations/accessories/reflectors, Together With Enlarged Text, May 24, 2022, 4 pages.
"Vertical Definition", Merriam Webster, 2014, 1 page.
"Yaskawa Motoman Robotics,", Robotics Glossary, 2019, 20 pages.
22792205.1, , "European Application Serial No. 22792205.1, Extended European Search Report mailed Feb. 6, 2025", Gecko Robotics, Inc., 10 pages.
22792521.1, , "European Application Serial No. 22792521.1, Extended European Search Report mailed Mar. 19, 2025", Gecko Robotics, Inc., 8 pages.
25151033.5, , "European Application Serial No. 25151033.5, Extended European Search Report mailed Jun. 20, 2025", Gecko Robotics, Inc., 9 pages.
AMS Controls, , "Encoder Tracking and Mounting", 2015, 18 pages.
Bell, Stephanie , "Measurement Good Practice Guide A Beginner's Guide to Uncertainty of Measurement", National Physical Laboratory, Issue 2, 2001, 41 pages.
Berendsen, A.M , "Ship Painting: Current Practice and Systems in Europe", Technology Publishing Company, Sep. 1998, 10 pages.
Borenstein, Johann et al., "Where am I? Sensors and Methods for Mobile Robot Positioning", Retrieved from the Internet :URL : http ://www-personal.umich.edu/~johannb/Papers/pos96rep.pdf, Apr. 22, 1996, pp. 1-282.
Cai, Mingxue et al., "A Novel Pipeline Inspection Robot with Two Angle-changeable Crawler Drive Modules", Proceedings of 2018 IEEE 8th Annual International Conference on CYBER Technology in Automation, Control, and Intelligent Systems, Jul. 2018, 6 pages.
Carlsten, Roy , "Understanding Corrosion and How to Protect Against It", manufacturing.net, Mar. 11, 2002, 8 pages.
Chen, et al., "Laser Micromachined Flexible Ultrasound Line Array and Subplanar Multimodal Imaging Applications", retrieved on [Oct. 16, 2024]. Retrieved from the internet <URL: https://ieeexplore.ieee.org/absbact/document/9819962 > entire document, Jul. 8, 2022,.
Connor, David et al., "Improved dead reckoning using caster wheel sensing on a differentially steered 3-wheeled autonomous vehicle", Proceedings vol. 4195, Mobile Robots XV and Telemanipulator and Telepresence Technologies VII, 2001, 13 pages.
Curran, Patrick , "Make the right choice for metal coating for the right application", Design World, Jun. 2, 2016, 18 pages.
Edlinger, Raimund et al., "MARC—Modular Autonomous Adaptable Robot Concept", 2019 IEEE International Symposium on Safety, Security, and Rescue Robotics (SSRR), IEEE, Sep. 2, 2019, pp. 1-7.
Felsch, Torsten et al., "Robotized Inspection of Vertical Structures of a Solar Power Plant Using NDT Techniques", doi:10.3390/robotics4020103, 2015, pp. 103-119.
Few, Stephen , "Practical Rules for Using Color in Charts", Perceptual Edge, Visual Business Intelligence Newsletter, Feb. 2008, 13 pages.
Fowler, Kenneth A. et al., "Theory and Application of Precious Ultrasonic Thickness Gaging", 2015, 12 pages.
General Electric, , "BWCI Automated Boiler Wall Cleaning & Inspection", inspection-robotics.com, 2016, 4 pages.
Ginzel, et al., "Acoustic Properties of the Elastomeric Materials Aqualene and ACE", The e-Journal of Nondestructive Testing—ISSN 1435-4934, Dec. 2015, 13 pages.
Gonzalez, Carlos , "What's the Difference between Pneumatic, Hydraulic, and Electrical Actuators", Machine Design, 2015, 4 pages.
Guglielmelli, E. et al., "Avoiding obstacles by using a proximity US/IR sensitive skin", IEEE, 1993, pp. 2207-2214.
Haitao, et al., "Simulation, Test and Analysis of Three-phase Short-Circuit Braking in IGCT-based MV Adjustable Speed Drive Systems", 2005 International Conference on Electrical Machines and Systems, Nanjing, China, IEEE, 2005, pp. 1437-1441.
Harrison, David M. , "Uncertainty in Physical Measurements", Module 4—Repeated Measurements, Dept. of Physics, Univ. of Toronto, 2015, 18 pages.
Hongo, Takero et al., "An Automatic Guidance System of a Self-Controlled Vehicle", In: "Autonomous Robot Vehicles", Jan. 1, 1990 (Jan. 1, 1990), Springer New York, New York, NY,, Retrieved from the Internet: URL:https://ieeexplore.ieee.org/stampPDF/getPDF.jsp?tp=&arnumber=4158818&ref=aHR0cHM6Ly9pZWVleHBsb3JlLmlIZWUub3JnL2RvY3VTZW50LzQxNTg4MTg=, Jan. 1, 1990, pp. 32-37.
Hutter, Marco et al., "Force Control for Active Chassis Balancing", IEEE/ASME Transactions on Mechatronics, vol. 22, No. 2, Apr. 2017, 10 pages.
Lebowitz, Carol A. et al., "Ultrasonic Measurement of Pipe Thickness", Review of Progress in Quantitative Nondestructive Evaluation, vol. 12, 1987, 8 pages.
Lee, Giuk et al., "Combot: Compliant Climbing Robotic Platform with Transitioning Capability and Payload Capacity", IEEE International Conference on Robotics and Automation RiverCentre, Saint Paul, Minnesota,, 2012, 6 pages.
Lins, Romulo G. et al., "Autonomous Robot System for Inspection of Defects in Civil Infrastructures", IEEE, 2016, pp. 1414-1422.
Lion Precision, , "Understanding Sensor Resolution Specifications and Performance", TechNote, LT05-0010, 2014, pp. 1-6.
Martinez, Angelo et al., "Fuzzy logic based collision avoidance for a mobile robot", IEEE, 1993, pp. 66-69.
Mims, Christopher , "America's Bridges, Factories and Highways Are in Dire Need of Repairs. Bring in the Robots.", The Wall Street Journal, available at https://www.wsj.com/tech/inspection-robots-infrastructure-ebb4172c, Aug. 2023, 5 pages.

(56) References Cited

OTHER PUBLICATIONS

Miskon, Muhammad F. et al., "Close Range Inspection Using Novelty Detection Results", Intelligent Robotic Research Center (IRRC), Monash University, Australia, ICIRA2009, LNAI 5928,, 2009, pp. 947-956.
Myers, Brad A. , "The importance of percent-done progress indicators for computer-human interfaces", Proceedings of the SIGCHI conference on Human factors in computing systems., CHI '85. ACM, New York, NY., 1985, pp. 11-17.
National Geographic, , "Encyclopedic Entry Location", 2016, 3 pages.
NDT Resource Center, , "NDT Glossary D", Webpage, 2016, 4 pages.
NDT Resource Center, , "NDT Glossary R", Webpage, 2016, 5 pages.
NDT Resource Center, , "Transducer Types", Webpage, 2005, 1 page.
Nidec, , "Flexwave Catalog", 2018, 52 pages.
Olympus, , "BondMaster Probes and Accessories Catalog", Catalog, 2008, 24 pages.
Olympus, , "Flaw Detectors Delay Line", Olympus, Flaw Detectors Delay Line, 2014, Jan. 9, 2014, 1 page.
Olympus, , "Ultrasonic Transducers Technical Notes", Notes, 2006, 11 pages.
Openstax College, , "College Physics Textbook Equity Edition", vol. 1 of 3: Chapters 1-12, Chapter 9 p. 294, 2013, 464 pages.
Papadimitriou, Vasileious et al., "An adaptable and self-calibrating service robotic nozzle-vessel welds", 2012 2nd International Conference on Applied Robotics for the Power Industry (CARPI), 2012, 6 pages.
Parallax Tutorial, , "Going the Distance—Using the Drive Distance Block Encoders and Motor Gearing", 2017, 5 pages.
PCT/US2023/075691, , "International Application Serial No. PCT/US2023/075691, International Preliminary Report on Patentability mailed Apr. 10, 2025", Gecko Robotics, Inc., 7 pages.
PCT/US2023/075722, , "International Application Serial No. PCT/US2023/075722, International Preliminary Report on Patentability mailed Apr. 10, 2025", Gecko Robotics, Inc., 23 pages.
PCT/US2023/077835, , "International Application Serial No. PCT/US2023/077835, International Preliminary Report on Patentability mailed May 8, 2025", Gecko Robotics, Inc., 17 pages.
PCT/US2023/078409, , "International Application Serial No. PCT/US2023/078409, International Preliminary Report On Patentability mailed May 15, 2025", Gecko Robotics, Inc., 13 pages.
PCT/US2024/061446, , "International Application Serial No. PCT/US2024/061446, International Search Report and Written Opinion mailed Apr. 24, 2025", Gecko Robotics, Inc., 29 pages.
PCT/US2024/061446, , "International Application Serial No. PCT/US2024/061446, Invitation to Pay Additional Fees and, Where Applicable, Protest Fee mailed Feb. 24, 2025", Gecko Robotics, Inc., 4 pages.
Reinhold, Reif , "Machine Translation DE 10300383", 2019, 4 pages.
Roudsari, , "Destructive and Robotic Assisted Non-Destructive Evaluation of Concrete Structures", <URL: https://dialog.proquest.com/professional/docview/2451414731/fulltextPDF/1909E9B91236ED61271/laccountid=139900&accountid=139900&t:ac=1909E9B91236ED61271/1&t:cp=maintain/resultcitationblocksdialog&t: zoneid=transactionalZone_72788c278028b, Dec. 31, 2020.
Sabatini, Angelo M. et al., "Correlation Techniques for Digital Time-of-Flight Measurement by Airborne Ultrasonic Rangefinders", Published in: Proceedings of IEEE/RSJ International Conference on Intelligent Robots and Systems (IROS'94), Date of Conference: Sep. 12-16, 1994,, 1994, pp. 2168-2175.
Salik, John et al., "Pipe Inspections: Robotic Laser Profiling Demystified", National Precast Concrete Association, Apr. 1, 2013, 12 pages.
Sanchez-Cuevas, Pedro J. et al., "Robotic System for Inspection by Contact of Bridge Beams Using UAVs", Sensors 2019, 19, 305, 2019, 17 pages.
Schroeder, S C. et al., "Ultrasonic Culvert Thickness Determination", US Army Armament Research Development and Engineering, Technical Report ARCCB-TR-95027, 1995, 36 pages.
Sirken, Aaron et al., "Bridge Risk Investigation Diagnostic Grouped Exploratory (BRIDGE)", IEEE/RSJ International Conference on Intelligent Robots and Systems (IROS), Sep. 24-28, 2017, Vancouver, BC, Canada (Year: 2017), 2017, 7 pages.
Smith, Oliver et al., "Machine Translation KR20140040692A", Apr. 3, 2014, 18 pages.
Stepson, W.A.V et al., "Design and Development of a Mobile Crawling Robot with Novel Halbach Array Based Magnetic Wheels", IEEE/ RSJ International Conference on Intelligent Robots and Systems (IROS), Vancouver, BC, Canada, Sep. 2017, 6 pages.
Svilainis, Linas , "Review of high resolution time of flight estimation techniques for ultrasonic signals,", Sep. 2013Conference: NDT 2013At: Telford Project: In—SMART, 2013, 13 pages.
Tufte, Edward R. , "The Visual Display of Quantitative Information", Published by Graphics Press LLC, Second edition, fifth printing, Aug. 2007, 191 pages.
Ueura, Keiji et al., "Development of the Harmonic Drive Gear for Space Applications", 1999, 6 pages.
Wisegeek, , "What is an Articulated Robot?", Webpage, 2015, 4 pages.
Xing, et al., "Design and Realization of DC Motor Speed Measurement and Control Based on an Electromagnetic Sensor", Atlantis Press, DOI10.2991/cisia-15.2015.69, 2015, 4 pages.
Yasuda, Gen'Ichi , "Behavior-based autonomous cooperative control of intelligent mobile robot systems with embedded Petri nets", IEEE, 2014, pp. 1085-1090.
Zhang, Lei et al., "Analysis of Traveling-capability and Obstacle-climbing Capability for Radially Adjustable Tracked Pipeline Robot", Proceedings of the 2016 IEEE International Conference on Robotics and Biomimetics Gingdao, China, Dec. 2016, 6 pages.
Zhang, Lei et al., "Stable Motion Analysis and Verification of a Radial Adjustable Pipeline Robot", Proceedings of the 2016 IEEE International Conference on Robotics and Biomimetics Oingdao, China, Dec. 2016, 6 pages.
Zhao, B. et al., "Estimation of ultrasound attenuation and dispersion using short time Fourier transform,", Ultrasonics 43 (2005) 375-381, 2005, pp. 375-381.
Zimmer Group, , "Die Schnittstelle—Zimmer Group", Retrieved from the Internet: URL:https://web.archive.org/web/20210623063817/https://www.zimmer-group.com/de/technologien-komponenten/robotik/match-end-of-arm-ecosystem/die-schnittstelle, Jun. 23, 2021, pp. 1-6.
Zwicker, Ekkehard et al., "A Modular Inspection Robot Platform for Power Plant Applications", IEEE, 2010 1st International Conference on Applied Robotics for the Power Industry Delta Centre-Ville Montreal, Canada, 2010, 6 pages.
"International Application Serial No. PCT/US2023/078409, International Search Report and Written Opinion mailed Mar. 28, 2024", Gecko Robotics, Inc., 17 pages.
Google Patent search Apr. 2026, 2026, 2 pages.
Gadow, Victors. , "Augmented Reality Based Maintenance Operations and Training", University of South Carolina,, Retrieved from the internet <URL: https://scholarcommons.sc.edu/cgi/viewcontent.cgi?article=9047&context=etd>, Apr. 27, 2026, 50 pages.
"International Application Serial No. PCT/US2023/085922, International Preliminary Report on Patentability mailed Jul. 3, 2025", Gecko Robotics, Inc., 20 pages.
"International Application Serial No. PCT/US2024/033260, International Preliminary Report on Patentability mailed Dec. 18, 2025", Gecko Robotics, Inc., 13 page.
"International Application Serial No. PCT/US2024/033270, International Preliminary Report on Patentability mailed Dec. 18, 2025", Gecko Robotics, Inc., 18 pages.
"International Application Serial No. PCT/US2024/033851, International Preliminary Report on Patentability mailed Dec. 26, 2025", Gecko Robotics, Inc., 15 pages.

(56) References Cited

OTHER PUBLICATIONS

"International Application Serial No. PCT/US2025/029120, Invitation to Pay Additional Fees and, Where Applicable, Protest Fee mailed Jul. 18, 2025", Gecko Robotics, Inc., 4 pages.
"International Application Serial No. PCT/US2025/029120, International Search Report and Written Opinion mailed Sep. 18, 2025", Gecko Robotics, Inc., 17 pages.
"International Application Serial No. PCT/US2025/035910, International Search Report and Written Opinion mailed Nov. 6, 2025", Gecko Robotics, Inc., 22 pages.
"International Application Serial No. PCT/US2025/035910, Invitation to Pay Additional Fees and, Where Applicable, Protest Fee mailed Sep. 10, 2025", Gecko Robotics, Inc., 3 pages.
"International Application Serial No. PCT/US2026/011884, Invitation to Pay Additional Fees and, Where Applicable, Protest Fee mailed Mar. 5, 2026", Gecko Robotics, Inc., 3 pages.
"International Application Serial No. PCT/US2026/011884, International Search Report and Written Opinion mailed May 1, 2026", Gecko Robotics, Inc., 23 pages.

* cited by examiner

INSPECTION ROBOT HAVING FORWARD AND REARWARD SENSOR MOUNT GROUPS AND PROCESSING AND/OR CALIBRATION VALUES

CROSS-REFERENCE TO RELATED APPLICATIONS

This application is a continuation of, and claims priority to, PCT Patent Application Serial No. PCT/US2023/078409, filed on Nov. 1, 2023, published on May 10, 2024, as International Publication No. WO 2024/097795, and entitled "INSPECTION ROBOT WITH PROFILE ADAPTING SLED, COUPLANT REDUCTION FILM AND TRANSDUCER POD FOR THICK ASSETS".

PCT Patent Application Serial No. PCT/US2023/078409 claims the benefit of priority to U.S. Provisional Patent Application Ser. No. 63/381,851, filed Nov. 1, 2022, and titled "INSPECTION ROBOT HAVING AN ENLARGED TRANSDUCER".

All of the foregoing listed patent documents are incorporated herein by reference in their entirety for all purposes.

BACKGROUND

The present disclosure relates to robotic inspection and treatment of industrial surfaces.

SUMMARY

Previously known inspection and treatment systems for industrial surfaces suffer from a number of drawbacks. Industrial surfaces are often required to be inspected to determine whether a pipe wall, tank surface, or other industrial surface feature has suffered from corrosion, degradation, loss of a coating, damage, wall thinning or wear, or other undesirable aspects. Industrial surfaces are often present within a hazardous location—for example in an environment with heavy operating equipment, operating at high temperatures, in a confined environment, at a high elevation, in the presence of high voltage electricity, in the presence of toxic or noxious gases, in the presence of corrosive liquids, and/or in the presence of operating equipment that is dangerous to personnel. Accordingly, presently known systems require that a system be shutdown, that a system be operated at a reduced capacity, that stringent safety procedures be followed (e.g., lockout/tagout, confined space entry procedures, harnessing, etc.), and/or that personnel are exposed to hazards even if proper procedures are followed. Additionally, the inconvenience, hazards, and/or confined spaces of personnel entry into inspection areas can result in inspections that are incomplete, of low resolution, that lack systematic coverage of the inspected area, and/or that are prone to human error and judgement in determining whether an area has been properly inspected.

Embodiments of the present disclosure provide for systems and methods of inspecting an inspecting an inspection surface with an improved inspection robot. Example embodiments include modular drive assemblies that are selectively coupled to a chassis of the inspection robot, wherein each drive assembly may have distinct wheels suited to different types of inspection surfaces. Other embodiments include payloads selectively couplable to the inspection robot chassis via universal connectors that provide for the exchange of couplant, electrical power and/or data communications. The payload may each have different sensor configurations suited for interrogating different types of inspection surfaces.

Embodiments of the present disclosure may provide for improved customer responsiveness by generating interactive inspection maps that depict past, present and/or predicted inspection data of an inspection surface. In embodiments, the inspection maps may be transmitted and displayed on user electronic devices and may provide for control of the inspection robot during an inspection run.

Embodiments of the present disclosure may provide for an inspection robot with improved environmental capabilities. For example, some embodiments have features for operating in hostile environments, e.g., high temperature environments. Such embodiments may include low operational impact capable cooling systems.

Embodiments of the present disclosure may provide for an inspection robot having an improved, e.g., reduced, footprint which may further provide for increased climbing of inclined and/or vertical inspection surfaces. The reduced footprint of certain embodiments may also provide for inspection robots having improve the horizontal range due to reduced weight.

In some aspects, the techniques described herein relate to a sled assembly for an inspection robot, the sled assembly including: a first portion having a first sensor mount, at a first horizontal position, the first sensor mount structured to accommodate a first inspection sensor and thereby interrogate an inspection surface; a second offset portion having a second sensor mount, at a second horizontal position, the second sensor mount structured to accommodate a second inspection sensor and thereby interrogate the inspection surface; and wherein the first horizontal position and the second horizontal position are horizontally displaced by a selected horizontal distance.

In some aspects, the techniques described herein relate to a sled assembly, wherein the first portion includes a first plurality of sensor mounts, the first plurality of sensor mounts including the first sensor mount, and wherein the first plurality of sensor mounts include a first horizontal distribution profile providing a horizontal displacement between adjacent ones of the first plurality of sensor mounts that is not greater than a selected inspection resolution.

In some aspects, the techniques described herein relate to a sled assembly, wherein the first horizontal distribution profile provides for equal spacing between each adjacent one of the first plurality of sensor mounts.

In some aspects, the techniques described herein relate to a sled assembly, wherein the second offset portion includes a second plurality of sensor mounts, the second plurality of sensor mounts including the second sensor mount, and wherein the second plurality of sensor mounts includes a second horizonal distribution profile providing a horizontal displacement between adjacent ones of the second plurality of sensor mounts that is not greater than the selected inspection resolution.

In some aspects, the techniques described herein relate to a sled assembly, wherein the second horizontal distribution profile provides for equal spacing between each adjacent one of the second plurality of sensor mounts.

In some aspects, the techniques described herein relate to a sled assembly, wherein the selected horizontal distance, the first horizontal distribution profile, and the second horizontal distribution profile are selected such that a distance between a last one of the first plurality of sensor mounts and a first one of the second plurality of sensor mounts is not greater than the selected inspection resolution.

In some aspects, the techniques described herein relate to a sled assembly, wherein the selected horizontal distance, the first horizontal distribution profile, and the second horizontal distribution profile are selected to provide equal spacing between each adjacent one of the first plurality of sensor mounts and each adjacent one of the second plurality of sensor mounts.

In some aspects, the techniques described herein relate to a sled assembly, wherein the horizontal distance, the first horizontal distribution profile, and the second horizontal distribution profile are further selected to provide the equal spacing between the last one of the first plurality of sensor mounts and the first one of the second plurality of sensor mounts.

In some aspects, the techniques described herein relate to a sled assembly, wherein the first portion includes: a UT sensor housing that includes the first sensor mount and includes an opening for couplant to flow through; and a film disposed over the opening and structured to regulate the flow of the couplant through the opening.

In some aspects, the techniques described herein relate to a sled assembly, wherein the first portion includes a first UT sensor housing that includes the first sensor mount, wherein the first UT sensor housing includes a delay line for the first inspection sensor coupled to the first sensor mount of between 5 mm to 50 mm inclusive.

In some aspects, the techniques described herein relate to a sled assembly, wherein the first portion includes a first UT sensor housing that includes the first sensor mount, wherein the first UT sensor housing includes a delay line for a UT sensor coupled to the first sensor mount of between 0.20" to 1.97" inclusive.

In some aspects, the techniques described herein relate to a sled assembly, wherein the delay line is about 1.25".

In some aspects, the techniques described herein relate to a sled assembly, wherein the first portion includes a first UT sensor housing that includes the first sensor mount, wherein the first UT sensor housing includes a delay line for a UT sensor coupled to the first sensor mount structured to provide for two backwall echoes from the inspection surface.

In some aspects, the techniques described herein relate to a sled assembly, further including: a third portion connecting the first portion to the second offset portion and having a shape structured to provide the selected horizontal distance.

In some aspects, the techniques described herein relate to a sled assembly, further including: a first sensor housing that includes the first sensor mount, the first sensor housing defining a first horizontal extent; a second sensor housing that includes the second sensor mount, the second sensor housing defining a second horizontal extent; and wherein the first horizontal extent and the second horizontal extent include an overlap region.

In some aspects, the techniques described herein relate to a payload for an inspection robot including: a first sled assembly including a first sensor mount group and a second sensor mount group, wherein the first sensor mount group is positioned at a first characteristic horizontal position and a first characteristic vertical position, wherein the second sensor mount group is positioned at a second characteristic horizontal position and a second characteristic vertical position; a second sled assembly including a third sensor mount group and a fourth sensor mount group, wherein the third sensor mount group is positioned at a third characteristic horizontal position and a third characteristic vertical position, wherein the fourth sensor mount group is positioned at a fourth characteristic horizontal position and a fourth characteristic vertical position; and a payload mount configured to couple the first sled assembly and the second sled assembly to the inspection robot.

In some aspects, the techniques described herein relate to a payload, wherein the first characteristic horizontal position is aligned with the fourth characteristic horizontal position.

In some aspects, the techniques described herein relate to a payload, wherein each mount of the first sensor mount group includes an ultrasonic sensor mount, and wherein each mount of the fourth sensor mount group includes a distinct sensor mount.

In some aspects, the techniques described herein relate to a payload, wherein each mount of the first sensor mount group and the fourth sensor mount group includes an ultrasonic sensor mount.

In some aspects, the techniques described herein relate to a payload, further including: a first group of ultrasonic sensors each mounted to one of the mounts of the first sensor mount group, the first group of ultrasonic sensors calibrated with a first calibration set; and a fourth group of ultrasonic sensors each mounted to one of the mounts of the fourth sensor mount group, the fourth group of ultrasonic sensors calibrated with a second calibration set.

In some aspects, the techniques described herein relate to a payload, further including: a first group of ultrasonic sensors each mounted to one of the mounts of the first sensor mount group; a fourth group of ultrasonic sensors each mounted to one of the mounts of the fourth sensor mount group.

In some aspects, the techniques described herein relate to a system, including: an inspection robot including: a payload, including: a first sled assembly including a first forward sensor mount group and a second rearward sensor mount group, wherein the first forward sensor mount group is positioned at a first characteristic horizontal position, and wherein the second rearward sensor mount group is positioned at a second characteristic horizontal position; a second sled assembly including a third forward sensor mount group and a fourth rearward sensor mount group, wherein the third forward sensor mount group is positioned at a third characteristic horizontal position, and wherein the fourth rearward sensor mount group is positioned at a fourth characteristic horizontal position; and a payload mount, wherein the first sled assembly is coupled to the payload mount at a first mounting position, and wherein the second sled assembly is coupled to the payload mount at a second mounting position, and wherein the payload mount is coupled to a body of the inspection robot.

In some aspects, the techniques described herein relate to a system, wherein the first characteristic horizontal position is aligned with the fourth characteristic horizontal position.

In some aspects, the techniques described herein relate to a system, wherein the first characteristic horizontal position and the fourth characteristic horizontal position are selected such that a last sensor mount of the first forward sensor mount group is horizontally displaced from a first sensor mount of the fourth rearward sensor mount group by not greater than a selected inspection resolution.

In some aspects, the techniques described herein relate to a system, wherein the first forward sensor mount group and the third forward sensor mount group each include mounts for a first sensor type, and wherein the second rearward sensor mount group and the fourth rearward sensor mount group each includes mounts for a second sensor type.

In some aspects, the techniques described herein relate to a system, wherein the first characteristic horizontal position is aligned with the fourth characteristic horizontal position.

In some aspects, the techniques described herein relate to a system, wherein each sensor mount of the first forward sensor mount group is aligned with a corresponding sensor mount of the fourth rearward sensor mount group.

In some aspects, the techniques described herein relate to a system, wherein the first characteristic horizontal position and the third characteristic horizontal position are selected such that a last sensor mount of the first forward sensor mount group is horizontally displaced from a first sensor mount of the third forward sensor mount group by not greater than a selected inspection resolution.

In some aspects, the techniques described herein relate to a system, further including a means for inspecting an inspection surface at a selected inspection resolution between a first sensor mount of the second rearward sensor mount group and a last sensor mount of the third forward sensor mount group, inclusive.

In some aspects, the techniques described herein relate to a system, further including a means for inspecting an inspection surface at a selected inspection resolution between a first sensor mount of the first forward sensor mount group and a last sensor mount of the third forward sensor mount group, inclusive.

In some aspects, the techniques described herein relate to a system, further including a means for inspecting an inspection surface at a selected inspection resolution between a first sensor mount of the second rearward sensor mount group and a last sensor mount of the fourth rearward sensor mount group, inclusive.

In some aspects, the techniques described herein relate to a system, further including: a controller configured to: interpret a first calibration value for a plurality of sensors of the first forward sensor mount group and a plurality of sensors of the third forward sensor mount group; perform inspection operations based on the first calibration value; and capture inspection data based on the inspection operations, wherein the plurality of sensors of the first forward sensor mount group and the plurality of sensors of the third forward sensor mount group are a same type of sensor.

In some aspects, the techniques described herein relate to a system, further including: a controller configured to: interpret a first processing value for a plurality of sensors of the first forward sensor mount group and a plurality of sensors of the third forward sensor mount group; interpret a second processing value for a plurality of sensors of the second rearward sensor mount group and a plurality of sensors of the fourth rearward sensor mount group; perform inspection operations based on the first processing value and the second processing value; and capture inspection data based on the inspection operations, wherein the plurality of sensors of the first forward sensor mount group and the plurality of sensors of the third forward sensor mount group are a same type of sensor.

In some aspects, the techniques described herein relate to a system, further including: a controller configured to: interpret a first calibration value for a plurality of sensors of the first forward sensor mount group and a plurality of sensors of the second rearward sensor mount group; perform inspection operations based on the first calibration value; and capture inspection data based on the inspection operations, wherein the plurality of sensors of the first forward sensor mount group and the plurality of sensors of the second rearward sensor mount group are a same type of sensor.

In some aspects, the techniques described herein relate to a system, further including: a controller configured to: interpret a first processing value for a plurality of sensors of the first forward sensor mount group and a plurality of sensors of the second rearward sensor mount group; perform inspection operations based on the first processing value; and capture inspection data based on the inspection operations, wherein the plurality of sensors of the first forward sensor mount group and the plurality of sensors of the second rearward sensor mount group are a same type of sensor.

In some aspects, the techniques described herein relate to a method for inspecting an inspection surface using an inspection robot, including: inspecting the inspection surface with a first sled assembly, wherein the first sled assembly includes a first forward sensor mount group and a second rearward sensor mount group, wherein the first forward sensor mount group is positioned at a first characteristic horizontal position, and wherein the second rearward sensor mount group is positioned at a second characteristic horizontal position; and inspecting the inspection surface with a second sled assembly, wherein the second sled assembly includes a third forward sensor mount group and a fourth rearward sensor mount group, wherein the third forward sensor mount group is positioned at a third characteristic horizontal position, and wherein the fourth rearward sensor mount group is positioned at a fourth characteristic horizontal position.

In some aspects, the techniques described herein relate to a method, further including: interpreting a first calibration value for a plurality of sensors of the first forward sensor mount group and a plurality of sensors of the third forward sensor mount group; performing inspection operations based on the first calibration value; and capturing inspection data based on the inspection operations, wherein the plurality of sensors of the first forward sensor mount group and the plurality of sensors of the third forward sensor mount group are a same type of sensor.

In some aspects, the techniques described herein relate to a method, further including: interpreting a first processing value for a plurality of sensors of the first forward sensor mount group and a plurality of sensors of the third forward sensor mount group; interpreting a second processing value for a plurality of sensors of the second rearward sensor mount group and a plurality of sensors of the fourth rearward sensor mount group; performing inspection operations based on the first processing value and the second processing value; and capturing inspection data based on the inspection operations, wherein the plurality of sensors of the first forward sensor mount group and the plurality of sensors of the third forward sensor mount group are a same type of sensor.

In some aspects, the techniques described herein relate to a method, further including: interpreting a first calibration value for a plurality of sensors of the first forward sensor mount group and a plurality of sensors of the second rearward sensor mount group; performing inspection operations based on the first calibration value; and capturing inspection data based on the inspection operations, wherein the plurality of sensors of the first forward sensor mount group and the plurality of sensors of the second rearward sensor mount group are a same type of sensor.

In some aspects, the techniques described herein relate to a method, further including: interpreting a first processing value for a plurality of sensors of the first forward sensor mount group and a plurality of sensors of the second rearward sensor mount group; performing inspection operations based on the first processing value; and capturing inspection data based on the inspection operations, wherein the plurality of sensors of the first forward sensor mount group and the plurality of sensors of the second rearward sensor mount group are a same type of sensor.

In some aspects, the techniques described herein relate to a method for inspecting an inspection surface using an inspection robot, including: operating a first group of ultrasonic sensors with a first calibration set; and operating a second group of ultrasonic sensors with a second calibration set, wherein the first group of ultrasonic sensors is included in a first sled assembly of a payload for the inspection robot, and the second group of ultrasonic sensors is included in a second sled assembly of the payload for the inspection robot; and wherein the first group of ultrasonic sensors is at a first characteristic vertical position on the first sled assembly, and the second group of ultrasonic sensors is at a second characteristic vertical position on the second sled assembly.

In some aspects, the techniques described herein relate to a method, wherein the first characteristic vertical position is forward of the second characteristic vertical position relative to an inspection direction of the inspection robot.

In some aspects, the techniques described herein relate to a method, wherein the first calibration set includes a same calibration as the second calibration set, and the second group of ultrasonic sensors provides inspection data that is redundant with inspection data provided by the first group of ultrasonic sensors.

In some aspects, the techniques described herein relate to a method, wherein the first calibration set is distinct from the second calibration set such that the second group of ultrasonic sensors inspects the inspection surface with a different calibration than the first group of ultrasonic sensors.

In some aspects, the techniques described herein relate to a payload for an inspection robot including: a plurality of assembly sleds each including: a first sensor structured to interrogate an inspection surface; and a second sensor structured to interrogate the inspection surface; wherein: each assembly sled of the plurality has a shape structured to offset an inspection path of the first sensor with respect to an inspection path of the second sensor along the inspection surface; and the plurality of assembly sleds are disposed in a staggered arrangement structured to offset the inspection paths of the first sensor and the second sensor of a first assembly sled, of the plurality of assembly sleds, from the inspection paths of the first sensor and the second sensor of a second assembly sled, of the plurality of assembly sleds.

In some aspects, the techniques described herein relate to a payload, wherein each assembly sled of the plurality further includes: a first portion that includes the first sensor; a second portion that includes the second sensor; and a third portion connecting the first portion to the second portion and having a shape structured to provide the offset of the inspection path of the first sensor with respect to the inspection path of the second sensor along the inspection surface.

In some aspects, the techniques described herein relate to a payload, wherein: the first portion includes a first sensor housing that includes a first plurality of sensors structured to interrogate the inspection surface, the first plurality of sensors including the first sensor, wherein the first sensor housing arranges the first plurality of sensors such that there is intra-housing spacing between scanning paths of the first plurality of sensors; and the second portion includes a second sensor housing that includes a second plurality of sensors structured to interrogate the inspection surface, the second plurality of sensors including the second sensor, wherein the second sensor housing arranges the second plurality of sensors such that there is intra-housing spacing between scanning paths of the second plurality of sensors.

In some aspects, the techniques described herein relate to a payload, wherein at least one assembly sled of the plurality includes: a sensor housing that includes the first sensor and has an opening through which couplant flows; and a film disposed over the opening so as to regulate the flow of couplant through the opening.

In some aspects, the techniques described herein relate to a payload, wherein at least one assembly sled of the plurality includes: a sensor housing that includes the first sensor, wherein the sensor housing includes a delay line for the first sensor of between 5 mm to 50 mm inclusive In some aspects, the techniques described herein relate to a payload, wherein at least one assembly sled of the plurality includes: a sensor housing that includes the first sensor, wherein the sensor housing includes a delay line for the first sensor of between 0.20" to 1.97" inclusive.

In some aspects, the techniques described herein relate to a payload, wherein the delay line is about 1.25".

In some aspects, the techniques described herein relate to a payload, wherein at least one assembly sled of the plurality includes: a sensor housing that includes the first sensor, wherein the sensor housing includes a delay line structured to provide for two backwall echoes from the inspection surface.

In some aspects, the techniques described herein relate to a payload, wherein the first sensor includes a first plurality of ultrasonic (UT) sensors, and the second sensor includes a second plurality of UT sensors.

In some aspects, the techniques described herein relate to a sled assembly for an inspection robot, the sled assembly including: an ultrasonic (UT) sensor housing having a couplant chamber with an opening structured to disperse couplant onto an inspection surface; and a film disposed over the opening and structured to regulate a flow of the couplant out of the opening.

In some aspects, the techniques described herein relate to a sled assembly, wherein the film and the UT sensor housing define at least one opening for the couplant to flow through.

In some aspects, the techniques described herein relate to a sled assembly, wherein: the UT sensor housing is structured to house a plurality of UT sensors; and the film and the UT sensor housing define a plurality of openings each corresponding to a distinct one of the plurality of UT sensors, wherein the plurality of openings are for couplant to flow through.

In some aspects, the techniques described herein relate to a sled assembly, wherein the film includes at least one of: a low density polyethylene; tin; nylon; polyester ether ketone; acrylonitrile butadiene styrene; or polyfluoroethylene.

In some aspects, the techniques described herein relate to a sled assembly, wherein the film is secured to the UT sensor housing via at least one of an adhesive or a mechanical coupling.

In some aspects, the techniques described herein relate to a sled assembly, wherein the UT sensor housing includes a plurality of channels extending from the opening to provide for couplant to flow out of the couplant chamber and around sides of the film to thereby maintain a layer of couplant between the film and the inspection surface.

In some aspects, the techniques described herein relate to a sled assembly for an inspection robot, the sled assembly including: a first portion having a first ultrasonic (UT) sensor structured to interrogate an inspection surface; and a second portion having a second UT sensor structured to interrogate the inspection surface, wherein the first portion and the second portion move independently of each other.

In some aspects, the techniques described herein relate to a sled assembly, further including: a third portion connecting the first portion to the second portion and structured such that the first portion and the second portion move independently of each other In some aspects, the techniques described herein relate to a sled assembly, wherein the third portion has a shape structured to offset an inspection path of the first UT sensor with respect to an inspection path of the second UT sensor along the inspection surface.

In some aspects, the techniques described herein relate to a sled assembly, wherein the third portion includes: a pivot point for connecting the third portion to an arm of a payload for the inspection robot, wherein the pivot point is structured to provide movement of the third portion with respect to the arm.

In some aspects, the techniques described herein relate to a sled assembly, wherein the independent movement of the first portion and the second portion includes rotating and tilting.

In some aspects, the techniques described herein relate to a sled assembly, wherein: the first portion includes: a first UT sensor housing that includes a first plurality of UT sensors structured to interrogate the inspection surface, the first plurality of UT sensors including the first UT sensor, wherein the first UT sensor housing arranges the first plurality of UT sensors such that there is intra-housing spacing between scanning paths of the first plurality of UT sensors; and the second portion includes: a second UT sensor housing that includes a second plurality of UT sensors structured to interrogate the inspection surface, the second plurality of UT sensors including the second UT sensor, wherein the second UT sensor housing arranges the second plurality of UT sensors such that there is intra-housing spacing between scanning paths of the second plurality of UT sensors.

BRIEF DESCRIPTION OF THE FIGURES

FIG. 115 is a schematic flow diagram of an example procedure to adjust inspection traversal and/or interrogation commands.

FIG. 116 is a schematic flow diagram of an example procedure to provide a marking operation.

FIG. 117 is a schematic flow diagram of an example procedure to selectively display a virtual mark.

Figure 119:
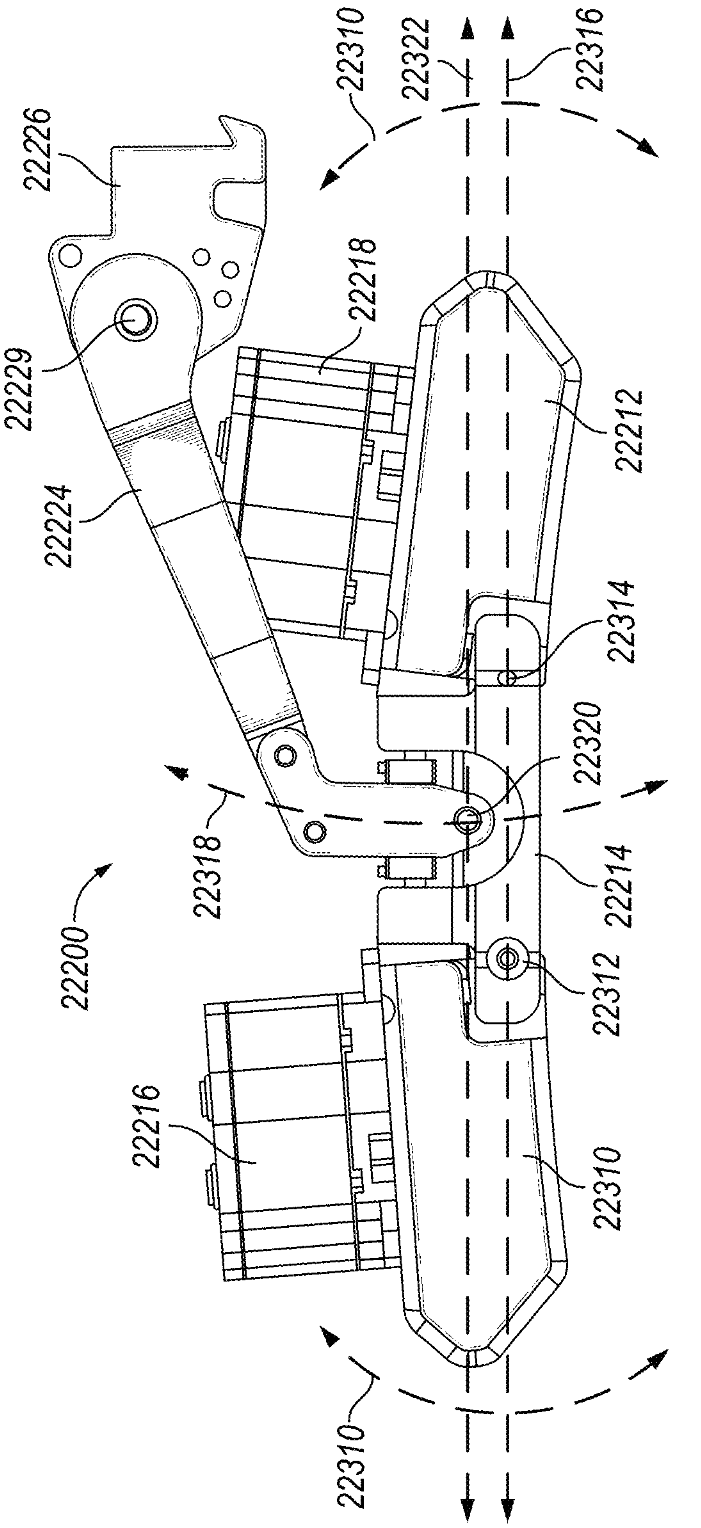
Figure 120:
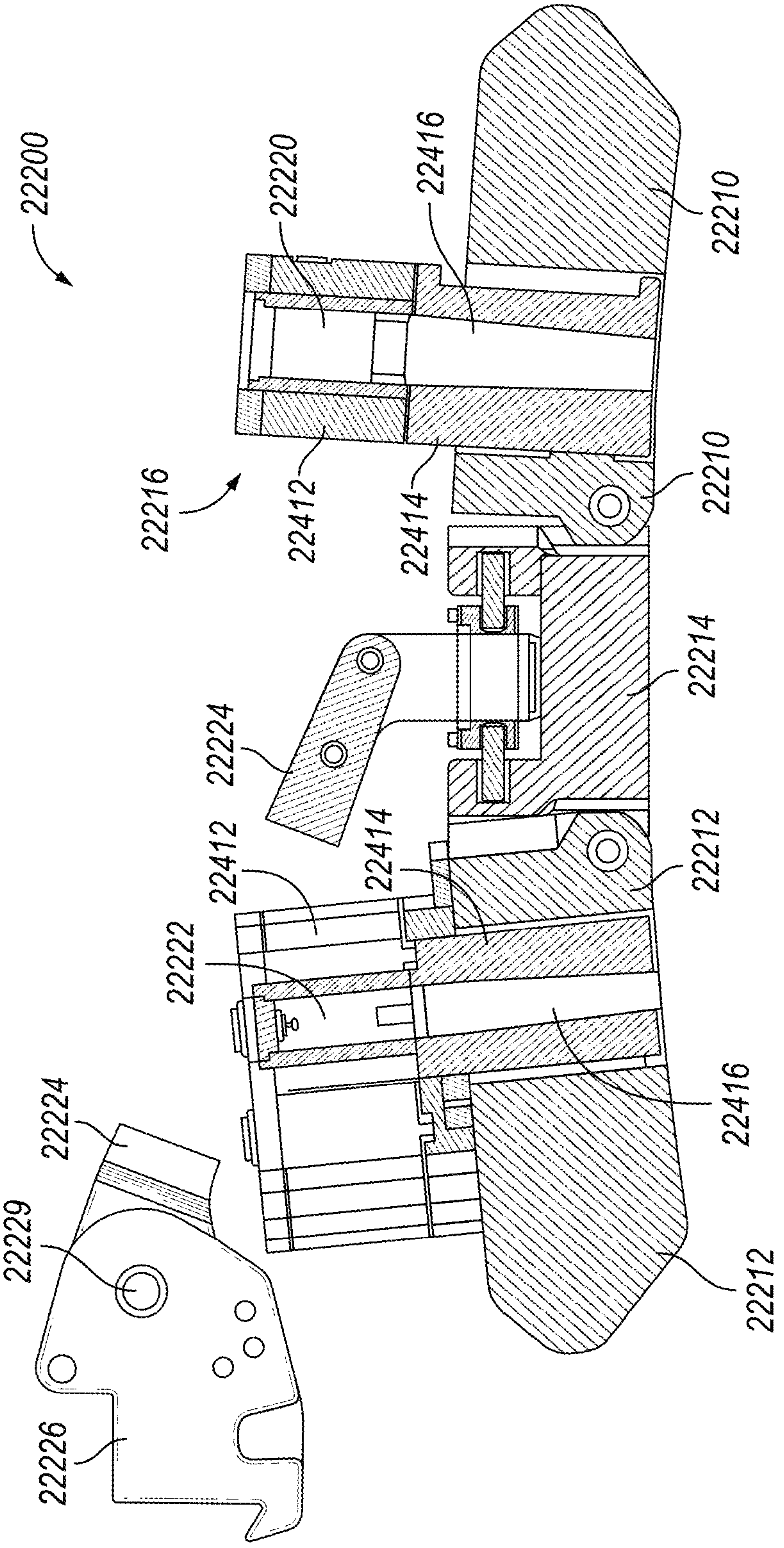
Figure 121:
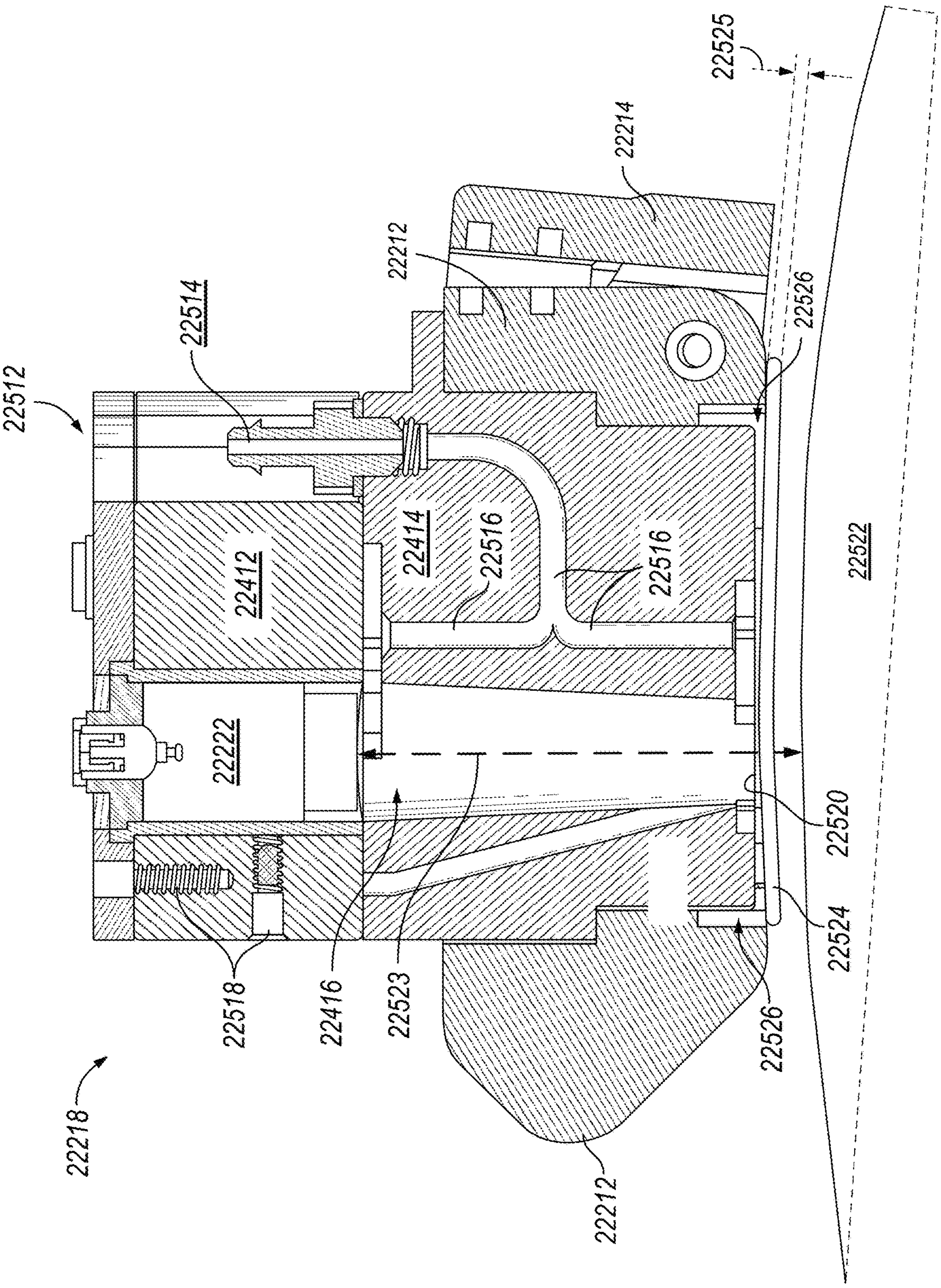
Figure 123:
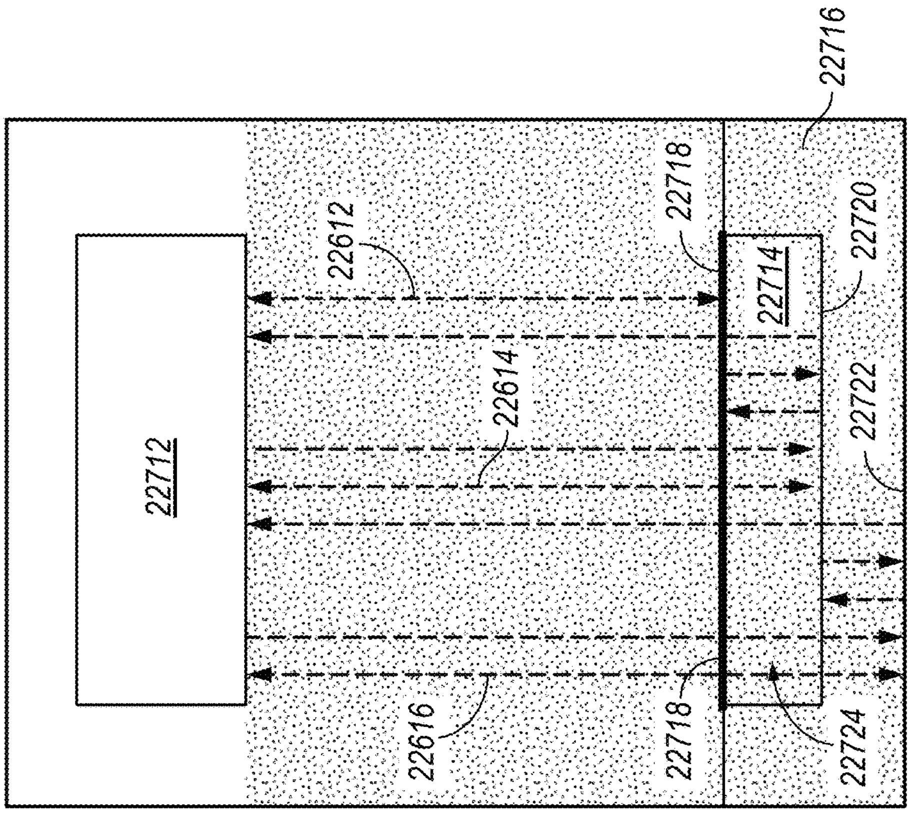
Figure 122:
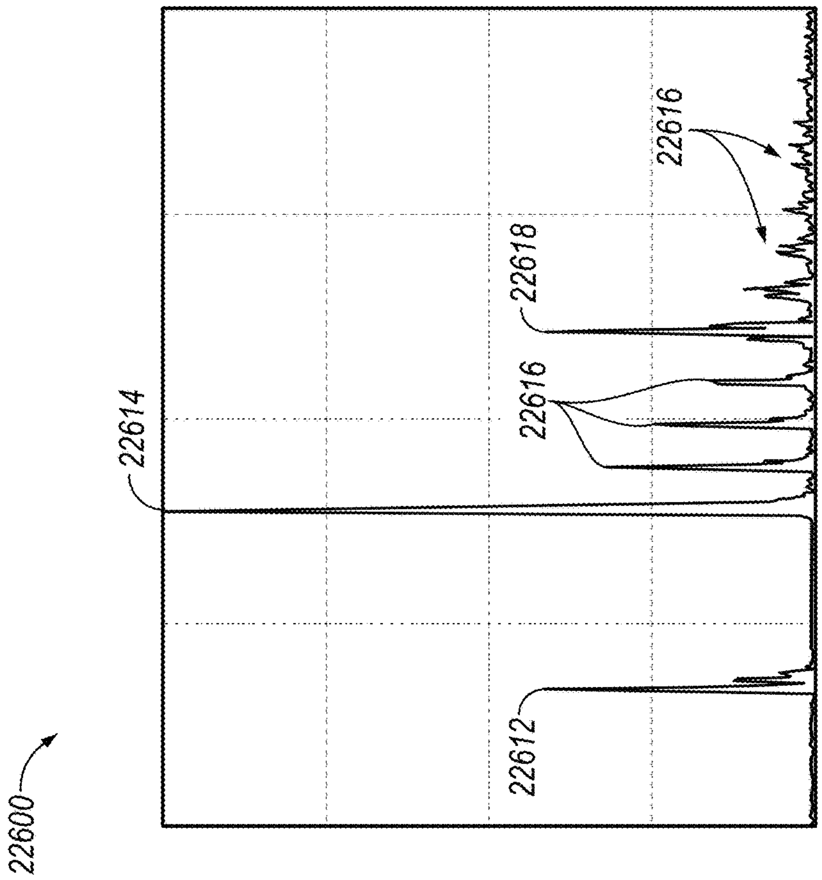
Figure 145:
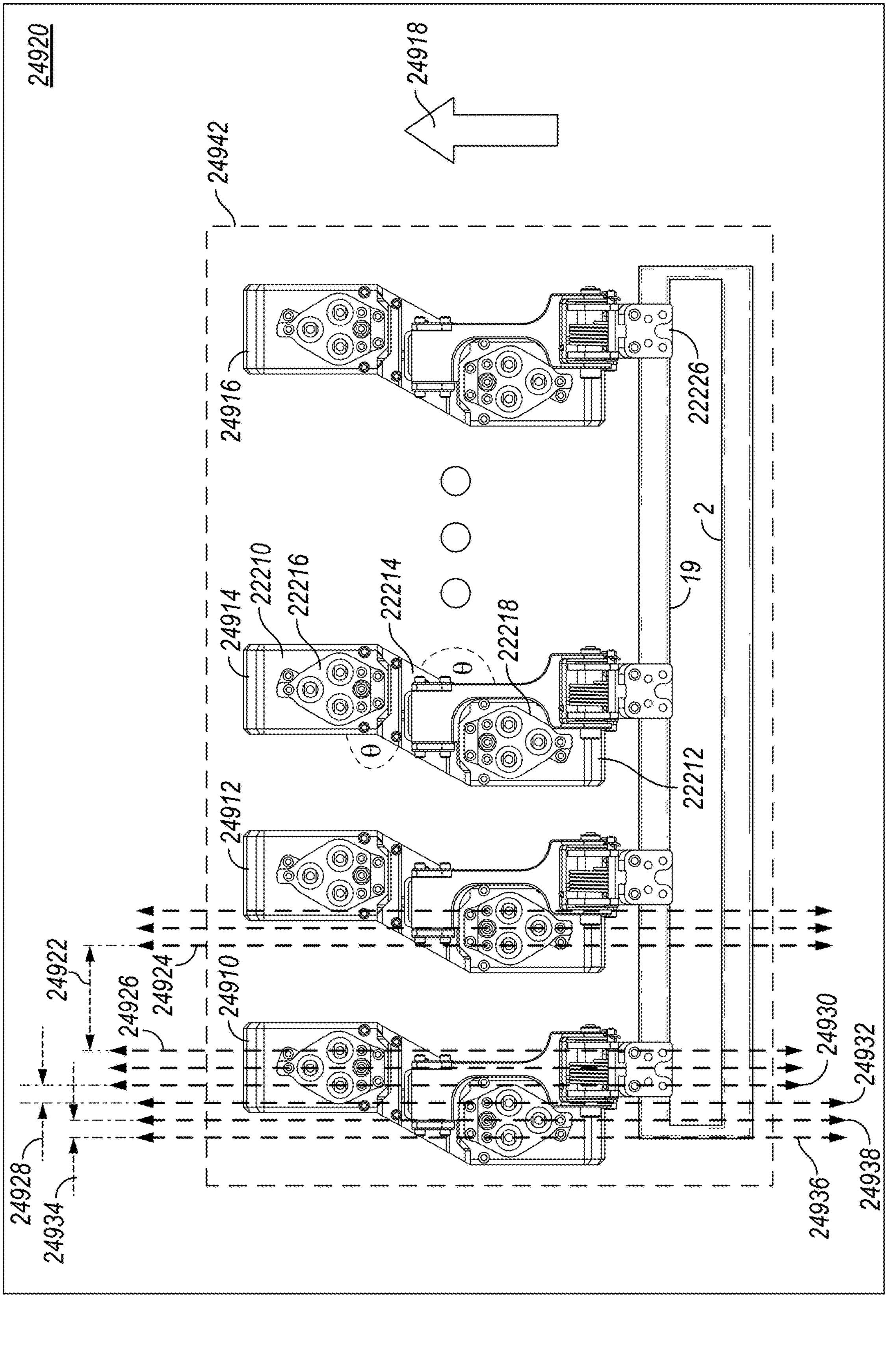

FIGS. 118A-H are schematic diagrams of a sled assembly, in accordance with embodiments of the present disclosure;

FIG. 119 is another schematic diagram of the sled assembly, in accordance with embodiments of the present disclosure;

FIG. 120 is another schematic diagram of the sled assembly, in accordance with embodiments of the present disclosure;

FIG. 121 is another schematic diagram of the sled assembly with a film, in accordance with embodiments of the present disclosure;

FIG. 122 is a chart depicting reflected sound wave peaks, in accordance with embodiments of the present disclosure;

FIG. 123 is a schematic diagram of a sensor interrogating an inspection surface through a film, in accordance with embodiments of the present disclosure;

FIGS. 124-144 are charts depicting reflected sound wave peaks, in accordance with embodiments of the present disclosure; and FIG. 145 is a schematic diagram of a payload having sled assemblies in a staggered arrangement, in accordance with embodiments of the present disclosure.

Figure 146:
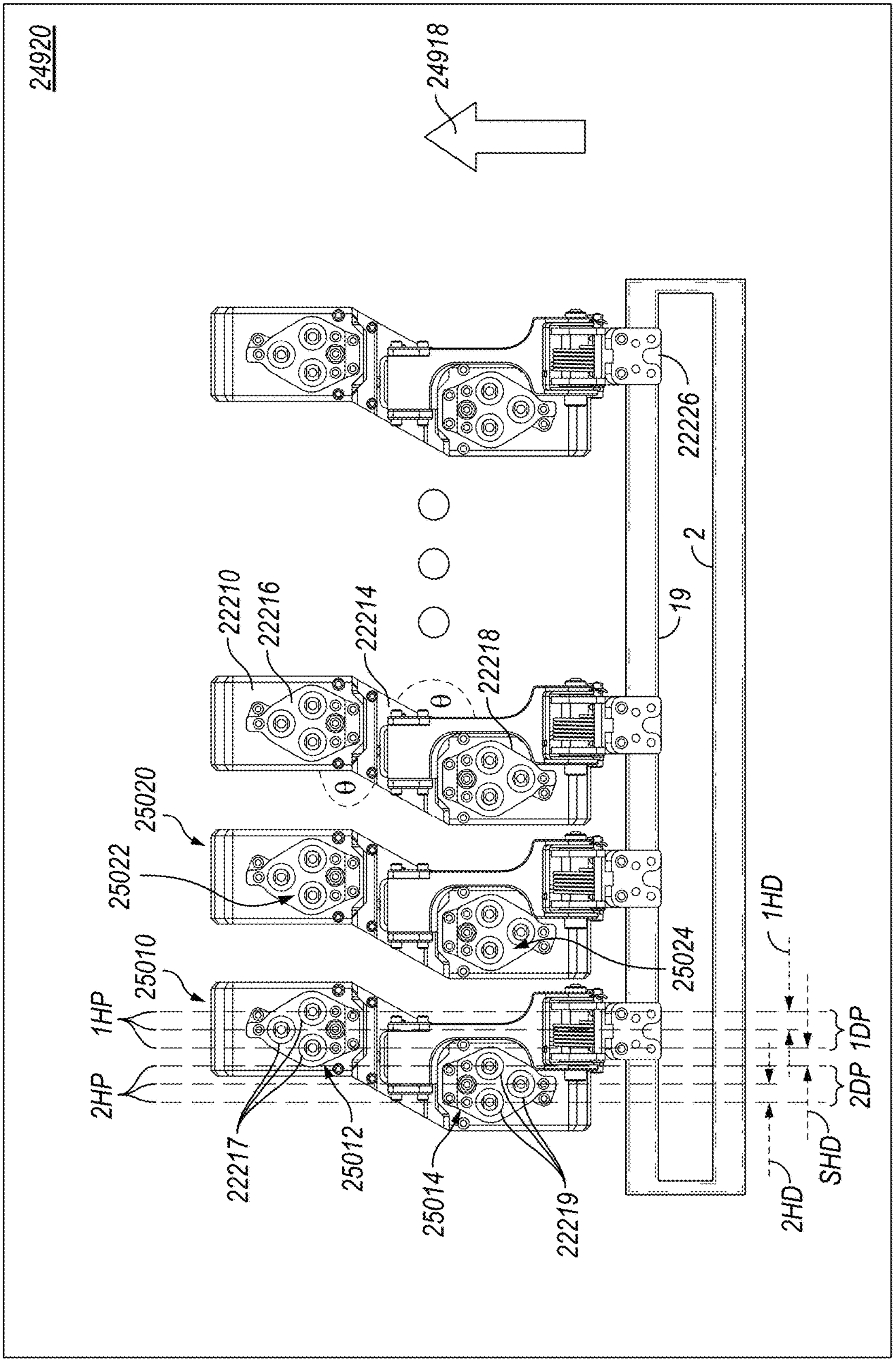

FIG. 146 is a schematic diagram of a payload having sled assemblies in a staggered arrangement, in accordance with embodiments of the present disclosure.

Figure 147:
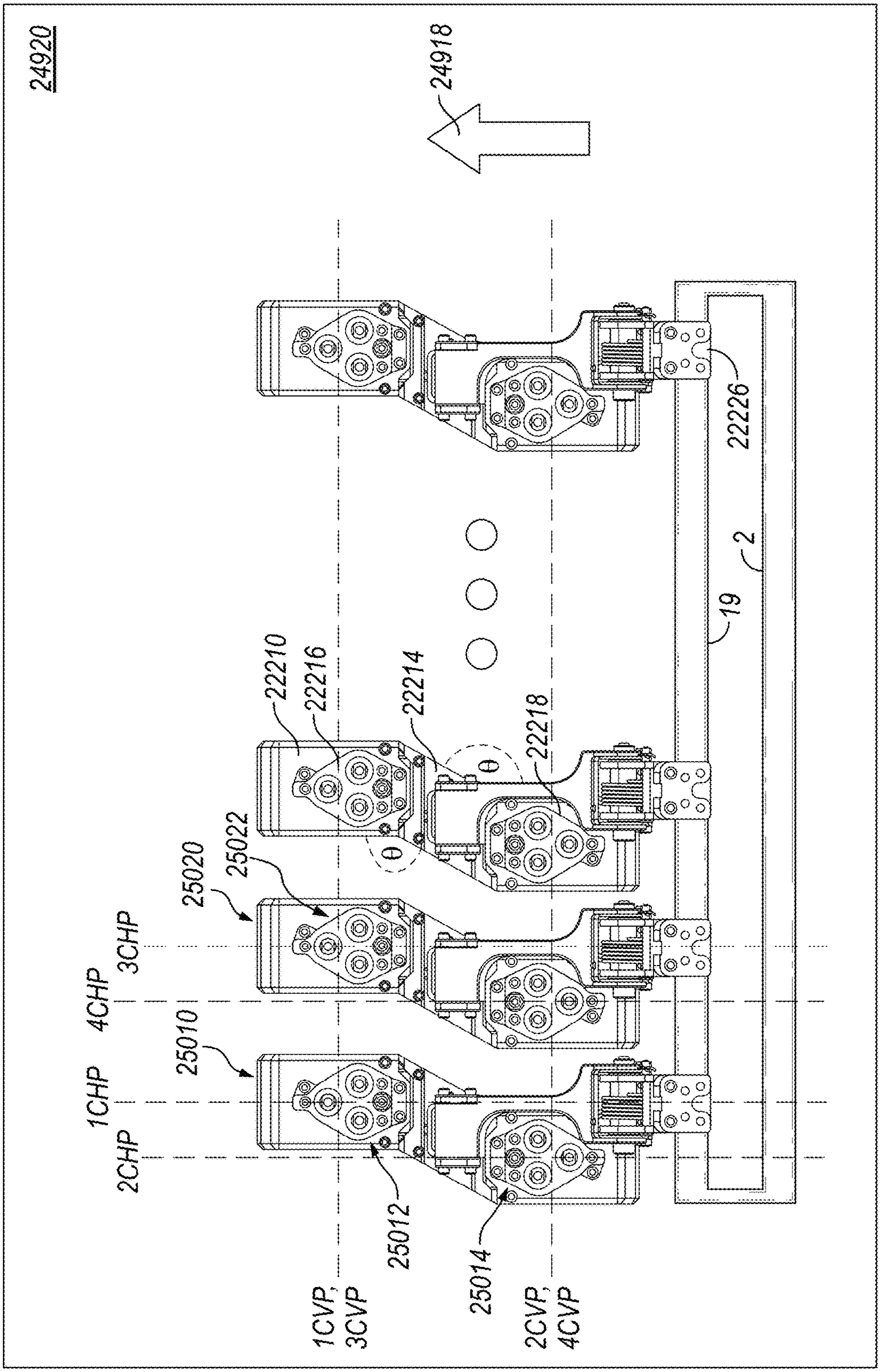

FIG. 147 is a schematic diagram of a payload having sled assemblies in a staggered arrangement, in accordance with embodiments of the present disclosure.

FIGS. 148-151 are schematic diagrams of sled assemblies in various arrangements in accordance with embodiments of the present disclosure.

Figure 152:
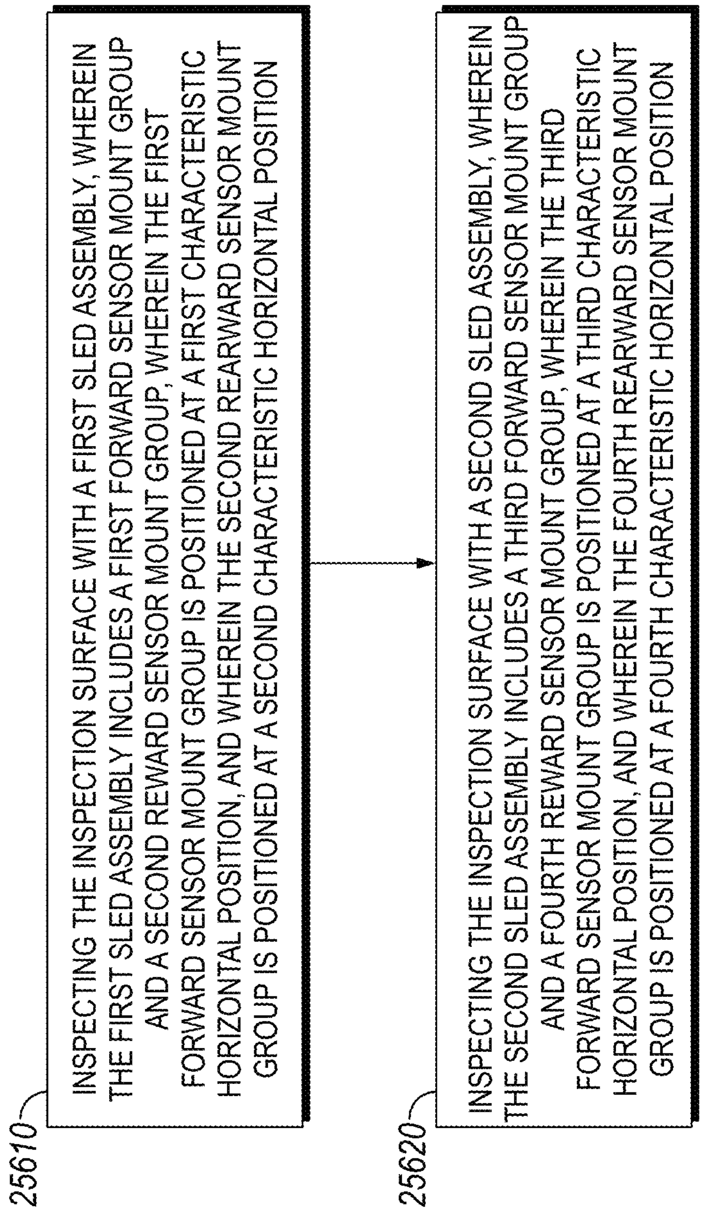

FIG. 152 is a flowchart of an example method for inspecting an inspection surface using an inspection robot in accordance with embodiments of the present disclosure.

Figure 153:
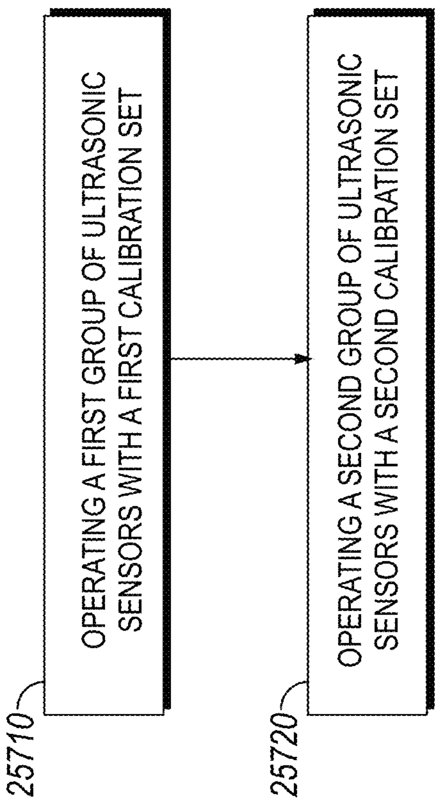

FIG. 153 is a flowchart of an example method for inspecting an inspection surface using an inspection robot in accordance with embodiments of the present disclosure.

DETAILED DESCRIPTION

The present disclosure relates to a system developed for traversing, climbing, or otherwise traveling over walls (curved or flat), or other industrial surfaces. Industrial surfaces, as described herein, include any tank, pipe, housing, or other surface utilized in an industrial environment, including at least heating and cooling pipes, conveyance pipes or conduits, and tanks, reactors, mixers, or containers. In certain embodiments, an industrial surface is ferromagnetic, for example including iron, steel, nickel, cobalt, and alloys thereof. In certain embodiments, an industrial surface is not ferromagnetic.

Certain descriptions herein include operations to inspect a surface, an inspection robot or inspection device, or other descriptions in the context of performing an inspection. Inspections, as utilized herein, should be understood broadly. Without limiting any other disclosures or embodiments herein, inspection operations herein include operating one or more sensors in relation to an inspected surface, electromagnetic radiation inspection of a surface (e.g., operating a camera) whether in the visible spectrum or otherwise (e.g., infrared, UV, X-Ray, gamma ray, etc.), high-resolution inspection of the surface itself (e.g., a laser profiler, caliper, etc.), performing a repair operation on a surface, performing a cleaning operation on a surface, and/or marking a surface for a later operation (e.g., for further inspection, for repair, and/or for later analysis). Inspection operations include operations for a payload carrying a sensor or an array of sensors (e.g. on sensor sleds) for measuring characteristics of a surface being traversed such as thickness of the surface, curvature of the surface, ultrasound (or ultra-sonic) measurements to test the integrity of the surface and/or the thickness of the material forming the surface, heat transfer, heat profile/mapping, profiles or mapping any other parameters, the presence of rust or other corrosion, surface defects or pitting, the presence of organic matter or mineral deposits on the surface, weld quality and the like. Sensors may include magnetic induction sensors, acoustic sensors, laser sensors, LIDAR, a variety of image sensors, and the like. The inspection sled may carry a sensor for measuring characteristics near the surface being traversed such as emission sensors to test for gas leaks, air quality monitoring, radioactivity, the presence of liquids, electro-magnetic interference, visual data of the surface being traversed such as uniformity, reflectance, status of coatings such as epoxy coatings, wall thickness values or patterns, wear patterns, and the like. The term inspection sled may indicate one or more tools for repairing, welding, cleaning, applying a treatment or coating the surface being treated. Treatments and coatings may include rust proofing, sealing, painting, application of a coating, and the like. Cleaning and repairing may include removing debris, sealing leaks, patching cracks, and the like. The term inspection sled, sensor sled, and sled may be used interchangeably throughout the present disclosure.

In certain embodiments, for clarity of description, a sensor is described in certain contexts throughout the present disclosure, but it is understood explicitly that one or more tools for repairing, cleaning, and/or applying a treatment or coating to the surface being treated are likewise contemplated herein wherever a sensor is referenced. In certain embodiments, where a sensor provides a detected value (e.g., inspection data or the like), a sensor rather than a tool may be contemplated, and/or a tool providing a feedback value (e.g., application pressure, application amount, nozzle open time, orientation, etc.) may be contemplated as a sensor in such contexts.

Inspections are conducted with a robotic system 100 (e.g., an inspection robot, a robotic vehicle, etc.) which may utilize sensor sleds 1 and a sled array system 2 which enables accurate, self-aligning, and self-stabilizing contact with a surface (not shown) while also overcoming physical obstacles and maneuvering at varying or constant speeds. In certain embodiments, mobile contact of the system 100 with the surface includes a magnetic wheel 3. In certain embodiments, a sled array system 2 is referenced herein as a payload 2—wherein a payload 2 is an arrangement of sleds 1 with sensor mounted thereon, and wherein, in certain embodiments, an entire payload 2 can be changed out as a unit. The utilization of payloads 2, in certain embodiments, allows for a pre-configured sensor array that provides for rapid re-configuration by swapping out the entire payload 2. In certain embodiments, sleds 1 and/or specific sensors on sleds 1, are changeable within a payload 2 to reconfigure the sensor array.

An example sensor sled 1 includes, without limitation, one or more sensors mounted thereon such that the sensor(s) is operationally couplable to an inspection surface in contact with a bottom surface of the corresponding one of the sleds. For example, the sled 1 may include a chamber or mounting structure, with a hole at the bottom of the sled 1 such that the sensor can maintain line-of-sight and/or acoustic coupling with the inspection surface. The sled 1 as described throughout the present disclosure is mounted on and/or operationally coupled to the inspection robot 100 such that the sensor maintains a specified alignment to the inspection surface 500—for example a perpendicular arrangement to the inspection surface, or any other specified angle. In certain embodiments, a sensor mounted on a sled 1 may have a line-of-sight or other detecting arrangement to the inspection surface that is not through the sled 1—for example a sensor may be mounted at a front or rear of a sled 1, mounted on top of a sled 1 (e.g., having a view of the inspection surface that is forward, behind, to a side, and/or oblique to the sled 1). It will be seen that, regardless of the sensing orientation of the sensor to the inspection surface, maintenance of the sled 1 orientation to the inspection surface will support more consistent detection of the inspection surface by the sensor, and/or sensed values (e.g., inspection data) that is more consistently comparable over the inspection surface and/or that has a meaningful position relationship compared to position information determined for the sled 1 or inspection robot 100. In certain embodiments, a sensor may be mounted on the inspection robot 100 and/or a payload 2—for example a camera mounted on the inspection robot 100.

The present disclosure allows for gathering of structural information from a physical structure. Example physical structures include industrial structures such as boilers, pipelines, tanks, ferromagnetic structures, and other structures. An example system 100 is configured for climbing the outside of tube walls.

As described in greater detail below, in certain embodiments, the disclosure provides a system that is capable of integrating input from sensors and sensing technology that may be placed on a robotic vehicle. The robotic vehicle is capable of multi-directional movement on a variety of surfaces, including flat walls, curved surfaces, ceilings, and/or floors (e.g., a tank bottom, a storage tank floor, and/or a recovery boiler floor). The ability of the robotic vehicle to operate in this way provides unique access especially to traditionally inaccessible or dangerous places, thus permitting the robotic vehicle to gather information about the structure it is climbing on.

Figure 1:
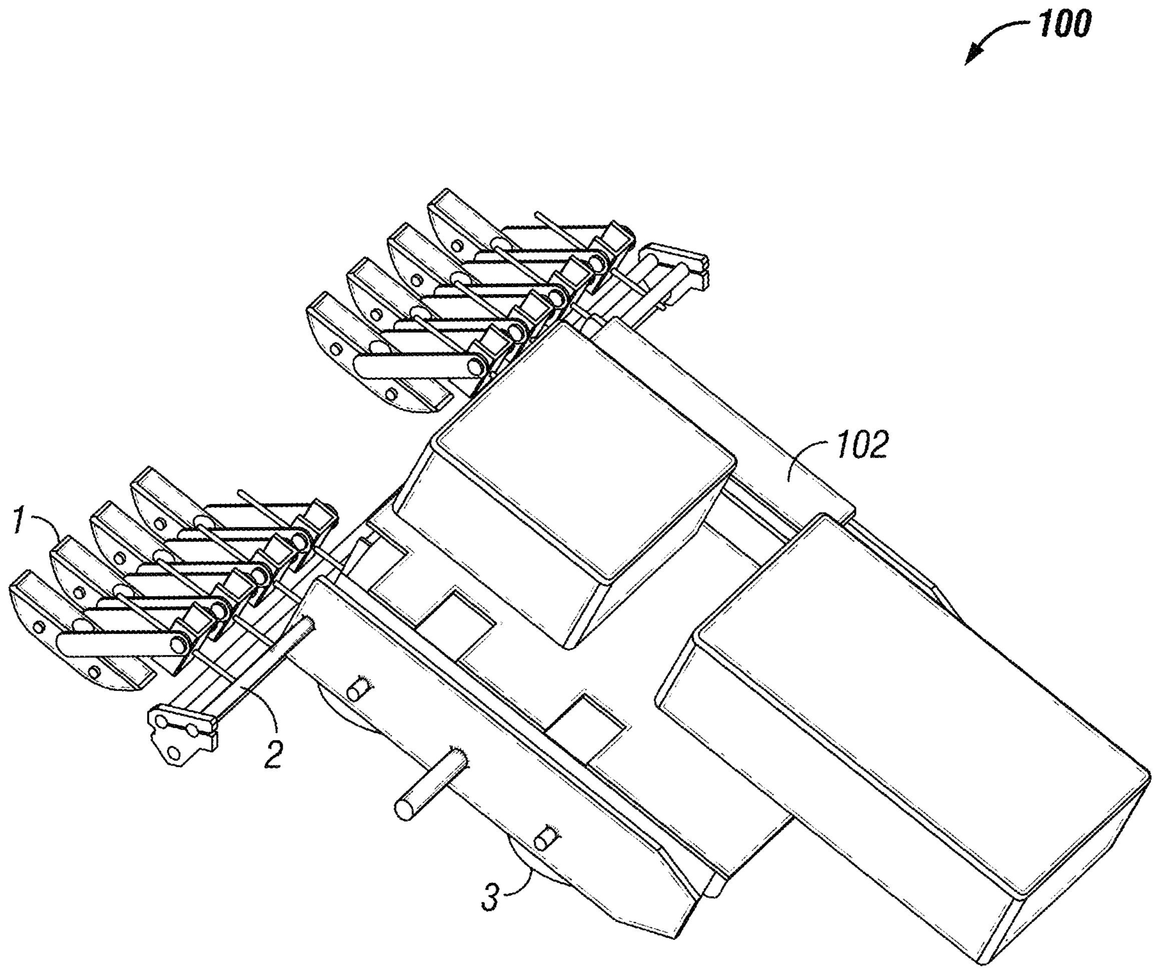
FIG. 1 is a schematic depiction of an inspection robot consistent with certain embodiments of the present disclosure.
Figure 3A:
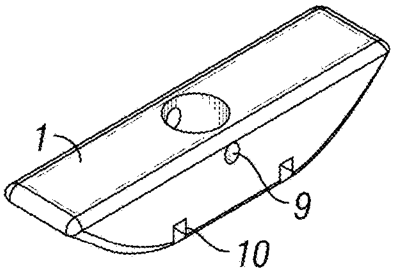
FIGS. 3A to 3C are schematic views of a sled consistent with certain embodiments of the present disclosure.
Figure 3B:
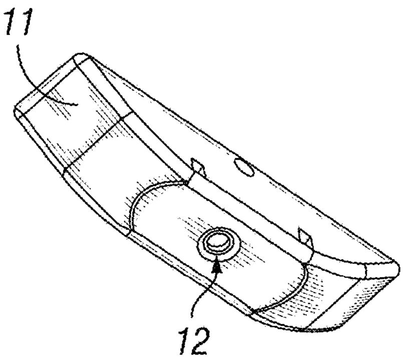

The system 100 (e.g., an inspection robot, a robotic vehicle, and/or supporting devices such as external computing devices, couplant or fluid reservoirs and delivery systems, etc.) in FIG. 1 includes the sled 1 mounted on a payload 2 to provide for an array of sensors having selectable contact (e.g., orientation, down force, sensor spacing from the surface, etc.) with an inspected surface. The payload 2 includes mounting posts mounted to a main body 102 of the system 100. The payload 2 thereby provides a convenient mounting position for a number of sleds 1, allowing for multiple sensors to be positioned for inspection in a single traverse of the inspected surface. The number and distance of the sleds 1 on the payload 2 are readily adjustable—for example by sliding the sled mounts on the payload 2 to adjust spacing. Referencing FIG. 3B, an example sled 1 has an aperture 12, for example to provide for couplant communication (e.g., an acoustically and/or optically continuous path of couplant) between the sensor mounted on the sled 1 and a surface to be inspected, to provide for line-of-sight availability between the sensor and the surface, or the like.

Figure 4:
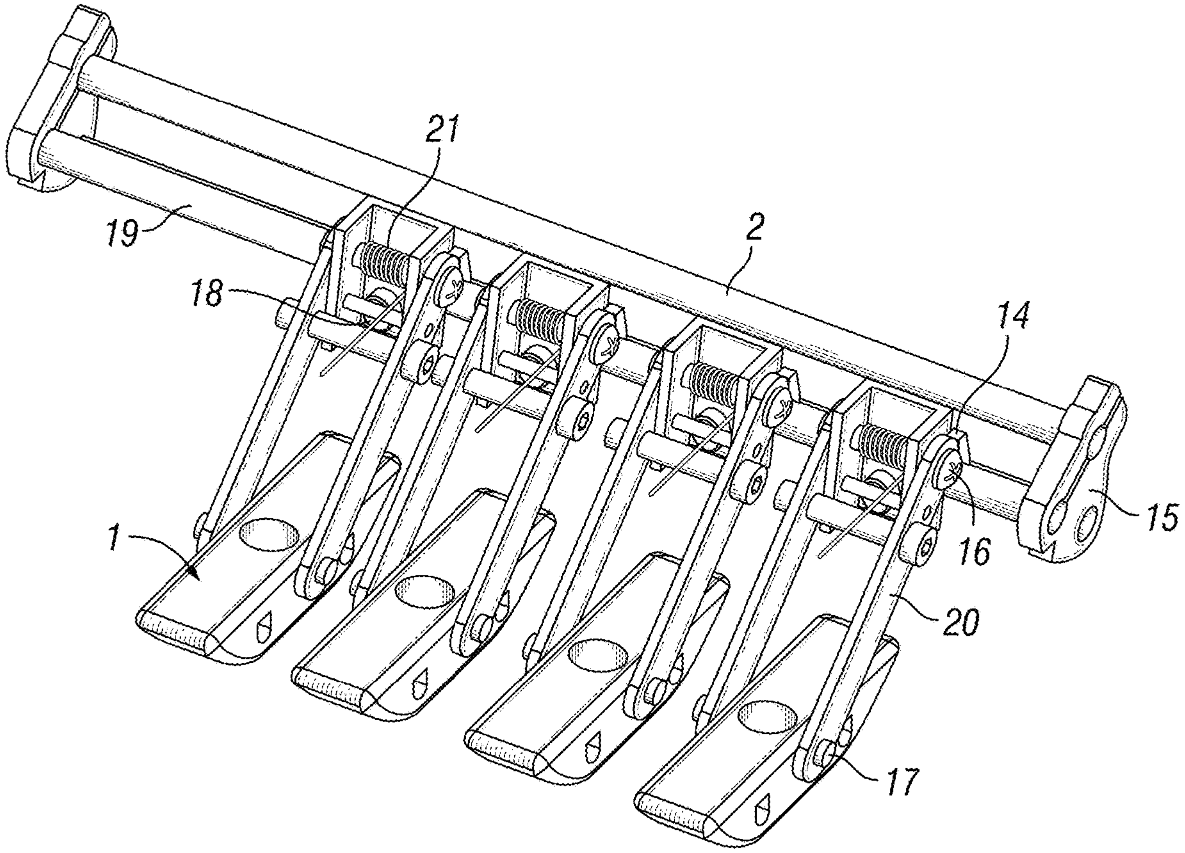
FIG. 4 is a schematic depiction of a payload consistent with certain embodiments of the present disclosure.

Referencing FIG. 4, an example system 100 includes the sled 1 held by an arm 20 that is connected to the payload 2 (e.g., a sensor array or sensor suite). An example system includes the sled 1 coupled to the arm 20 at a pivot point 17, allowing the sensor sled to rotate and/or tilt. On top of the arm 20, an example payload 2 includes a biasing member 21 (e.g., a torsion spring) with another pivot 16, which provides for a selectable down-force of the arm 20 to the surface being inspected, and for an additional degree of freedom in sled 1 movement to ensure the sled 1 orients in a desired manner to the surface. In certain embodiments, down-force provides for at least a partial seal between the sensor sled 1 and surface to reduce or control couplant loss (e.g., where couplant loss is an amount of couplant consumed that is beyond what is required for operations), control distance between the sensor and the surface, and/or to ensure orientation of the sensor relative to the surface. Additionally or alternatively, the arm 20 can lift in the presence of an obstacle, while traversing between surfaces, or the like, and return to the desired position after the maneuver is completed. In certain embodiments, an additional pivot 18 couples the arm 20 to the payload 2, allowing for an additional rolling motion. In certain embodiments, pivots 16, 17, 18 provide for three degrees of freedom on arm 20 motion, allowing the arm 20 to be responsive to almost any obstacle or surface shape for inspection operations. In certain embodiments, various features of the system 100, including one or more pivots 16, 17, 18, co-operate to provide self-alignment of the sled 1 (and thus, the sensor mounted on the sled) to the surface. In certain embodiments, the sled 1 self-aligns to a curved surface and/or to a surface having variability in the surface shape.

In certain embodiments, the system is also able to collect information at multiple locations at once. This may be accomplished through the use of a sled array system. Modular in design, the sled array system allows for mounting sensor mounts, like the sleds, in fixed positions to ensure thorough coverage over varying contours. Furthermore, the sled array system allows for adjustment in spacing between sensors, adjustments of sled angle, and traveling over obstacles. In certain embodiments, the sled array system was designed to allow for multiplicity, allowing sensors to be added to or removed from the design, including changes in the type, quantity, and/or physical sensing arrangement of sensors. The sensor sleds that may be employed within the context of the present invention may house different sensors for diverse modalities useful for inspection of a structure. These sensor sleds are able to stabilize, align, travel over obstacles, and control, reduce, or optimize couplant delivery which allows for improved sensor feedback, reduced couplant loss, reduced post-inspection clean-up, reduced down-time due to sensor re-runs or bad data, and/or faster return to service for inspected equipment.

Figure 11:
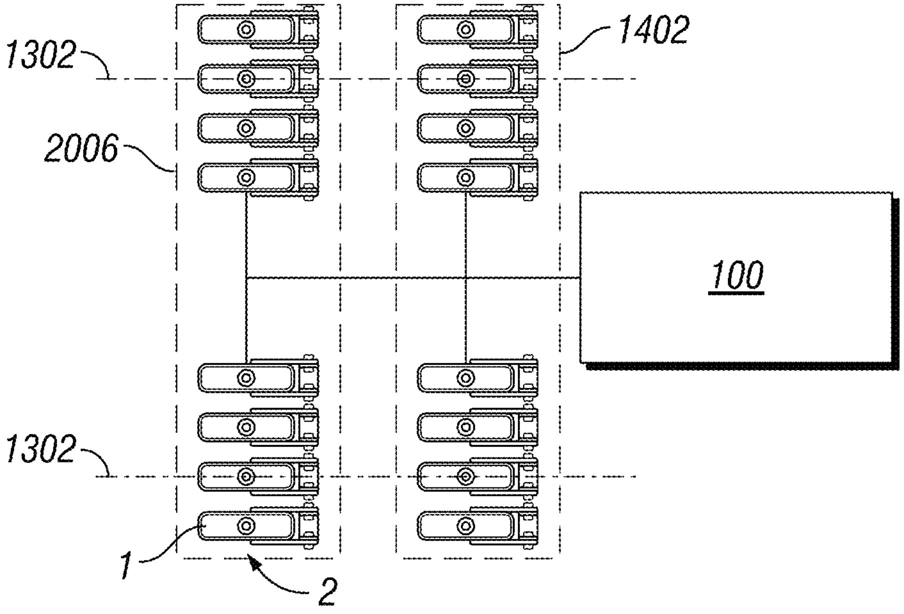
FIG. 11 is a schematic diagram of a payload arrangement.

There may be advantages to maintaining a sled with associated sensors or tools in contact and/or in a fixed orientation relative to the surface being traversed even when that surface is contoured, includes physical features, obstacles, and the like. In embodiments, there may be sled assemblies which are self-aligning to accommodate variabilities in the surface being traversed (e.g., an inspection surface) while maintaining the bottom surface of the sled (and/or a sensor or tool, e.g. where the sensor or tool protrudes through or is flush with a bottom surface of the sled) in contact with the inspection surface and the sensor or tool in a fixed orientation relative to the inspection surface. In an embodiment, as shown in FIG. 11 there may be a number of payloads 2, each payload 2 including a sled 1 positioned between a pair of sled arms 20, with each side exterior of the sled 1 attached to one end of each of the sled arms 20 at a pivot point 17 so that the sled 1 is able to rotate around an axis that would run between the pivot points 17 on each side of the sled 1. As described elsewhere herein, the payload 2 may include one or more inspection sleds 1 being pushed ahead of the payload 2, pulled behind the payload 2, or both. The other end of each sled arm 20 is attached to an inspection sled mount 14 with a pivot connection 16 which allows the sled arms to rotate around an axis running through the inspection sled mount 14 between the two pivot connections 16. Accordingly, each pair of sled arms 20 can raise or lower independently from other sled arms 20, and with the corresponding sled 1. The inspection sled mount 14 attaches to the payload 2, for example by mounting on payload shaft 19. The inspection sled mount 14 may connect to the payload shaft 19 with a pivot 18 connection which allows the sled 1 and corresponding arms 20 to rotate from side to side in an arc around a perpendicular to the payload shaft 19. Together the up and down and side to side arc, where present, allow two degrees of rotational freedom to the sled arms. Pivot 18 connection is illustrated as a gimbal mount in the example of FIG. 4, although any type of connection providing a rotational degree of freedom for movement is contemplated herein, as well as embodiments that do not include a rotational degree of freedom for movement. The gimbal mount (pivot 18) allows the sled 1 and associated arms 20 to rotate to accommodate side to side variability in the surface being traversed or obstacles on one side of the sled 1. The pivot 17 between the sled arms 20 and the sled 1 allow the sled 1 to rotate (e.g., tilt in the direction of movement of the inspection robot 100) to conform to the surface being traversed and accommodate to variations or obstacles in the surface being traversed. Pivot 17, together with the rotational freedom of the arms, provides the sled three degrees of rotational freedom relative to the inspection surface. The ability to conform to the surface being traversed facilitated the maintenance of a perpendicular interface between the sensor and the surface allowing for improved interaction between the sled 1 and the inspection surface. Improved interaction may include ensuring that the sensor is operationally couplable to the inspection surface.

Within the inspection sled mount 14 there may be a biasing member (e.g., torsion spring 21) which provides a down force to the sled 1 and corresponding arms 20. In the example, the down force is selectable by changing the torsion spring, and/or by adjusting the configuration of the torsion spring (e.g., confining or rotating the torsion spring to increase or decrease the down force). Analogous operations or structures to adjust the down force for other biasing members (e.g., a cylindrical spring, actuator for active down force control, etc.) are contemplated herein.

In certain embodiments, the inspection robot 100 includes a tether (not shown) to provide power, couplant or other fluids, and/or communication links to the robot 100. It has been demonstrated that a tether to support at least 200 vertical feet of climbing can be created, capable of couplant delivery to multiple ultra-sonic sensors, sufficient power for the robot, and sufficient communication for real-time processing at a computing device remote from the robot. Certain aspects of the disclosure herein, such as but not limited to utilizing couplant conservation features such as sled downforce configurations, the acoustic cone, and water as a couplant, support an extended length of tether. In certain embodiments, multiple ultra-sonic sensors can be provided with sufficient couplant through a ⅛" couplant delivery line, and/or through a ¼" couplant delivery line to the inspection robot 100, with ⅛" final delivery lines to individual sensors. While the inspection robot 100 is described as receiving power, couplant, and communications through a tether, any or all of these, or other aspects utilized by the inspection robot 100 (e.g., paint, marking fluid, cleaning fluid, repair solutions, etc.) may be provided through a tether or provided in situ on the inspection robot 100. For example, the inspection robot 100 may utilize batteries, a fuel cell, and/or capacitors to provide power; a couplant reservoir and/or other fluid reservoir on the robot to provide fluids utilized during inspection operations, and/or wireless communication of any type for communications, and/or store data in a memory location on the robot for utilization after an inspection operation or a portion of an inspection operation.

In certain embodiments, maintaining sleds 1 (and sensors or tools mounted thereupon) in contact and/or selectively oriented (e.g., perpendicular) to a surface being traversed provides for: reduced noise, reduced lost-data periods, fewer false positives, and/or improved quality of sensing; and/or improved efficacy of tools associated with the sled (less time to complete a repair, cleaning, or marking operation; lower utilization of associated fluids therewith; improved confidence of a successful repair, cleaning, or marking operation, etc.). In certain embodiments, maintaining sleds 1 in contacts and/or selectively oriented to the surface being traversed provides for reduced losses of couplant during inspection operations.

In certain embodiments, the combination of the pivots 16, 17, 18) and torsion spring (biasing device 21) act together to position the sled 1 perpendicular to the surface being traversed. The biasing force of the spring (biasing device 21) may act to extend the sled arms 20 downward and away from the payload shaft 19 and inspection sled mount 14, pushing the sled 1 toward the inspection surface. The torsion spring (biasing device 21) may be passive, applying a constant downward pressure, or the torsion spring (biasing device 21) or other biasing member may be active, allowing the downward pressure to be varied. In an illustrative and non-limiting example, an active torsion spring (biasing device 21) might be responsive to a command to relax the spring tension, reducing downward pressure and/or to actively pull the sled 1 up, when the sled 1 encounters an obstacle, allowing the sled 1 to more easily move over the obstacle. The active torsion spring (biasing device 21) may then be responsive to a command to restore tension, increasing downward pressure, once the obstacle is cleared to maintain the close contact between the sled 1 and the surface. The use of an active spring may enable changing the angle of a sensor or tool relative to the surface being traversed during a traverse. Design considerations with respect to the surfaces being inspected may be used to design the active control system. If the spring (biasing device 21) is designed to fail closed, the result would be similar to a passive spring and the sled 1 would be pushed toward the surface being inspected. If the spring (biasing device 21) is designed to fail open, the result would be increased obstacle clearance capabilities. In embodiments, spring (biasing device 21) may be a combination of passive and active biasing members.

The downward pressure applied by the torsion spring (biasing device 21) may be supplemented by a spring within the sled 1 further pushing a sensor or tool toward the surface. The downward pressure may be supplemented by one or more magnets in/on the sled 1 pulling the sled 1 toward the surface being traversed. The one or more magnets may be passive magnets that are constantly pulling the sled 1 toward the surface being traversed, facilitating a constant distance between the sled 1 and the surface. The one or magnets may be active magnets where the magnet field strength is controlled based on sensed orientation and/or distance of the sled 1 relative to the inspection surface. In an illustrative and non-limiting example, as the sled 1 lifts up from the surface to clear an obstacle and it starts to roll, the strength of the magnet may be increased to correct the orientation of the sled 1 and draw it back toward the surface.

The connection between each sled 1 and the sled arms 20 may constitute a simple pin or other quick release connect/disconnect attachment. The quick release connection at the pivot 17 may facilitate attaching and detaching sleds 1 enabling a user to easily change the type of inspection sled attached, swapping sensors, types of sensors, tools, and the like.

Figure 12:
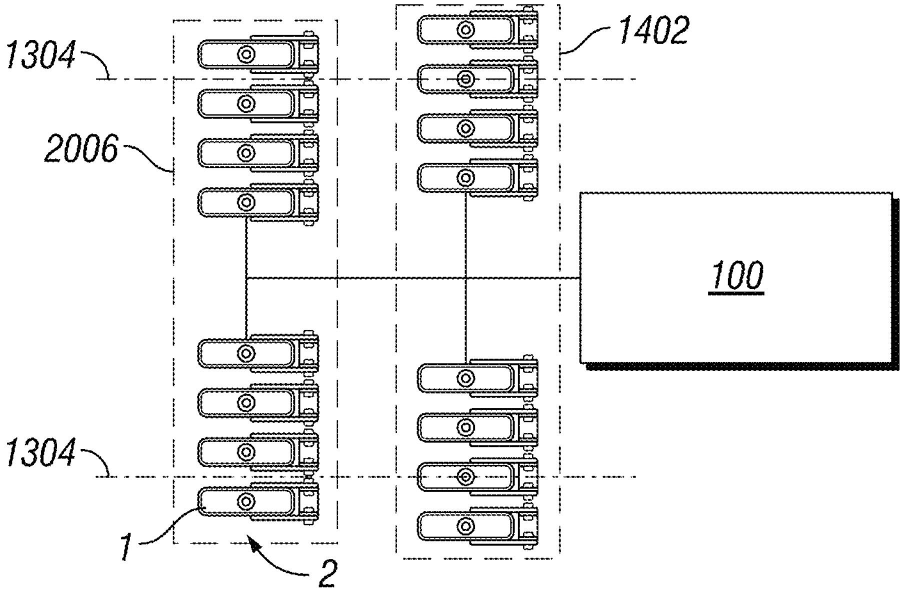
FIG. 12 is another schematic diagram of a payload arrangement.

In embodiments, as depicted in FIG. 12, there may be multiple attachment or pivot point accommodations 9 available on the sled 1 for connecting the sled arms 20. The location of the pivot point accommodations 9 on the sled 1 may be selected to accommodate conflicting goals such as sled 1 stability and clearance of surface obstacles. Positioning the pivot point accommodations 9 behind the center of sled in the longitudinal direction of travel may facilitate clearing obstacles on the surface being traversed. Positioning the pivot point accommodation 9 forward of the center may make it more difficult for the sled 1 to invert or flip to a position where it cannot return to a proper inspection operation position. It may be desirable to alter the connection location of the sled arms 20 to the pivot point accommodations 9 (thereby defining the pivot 17) depending on the direction of travel. The location of the pivot 17 on the sled 1 may be selected to accommodate conflicting goals such as sensor positioning relative to the surface and avoiding excessive wear on the bottom of the sled. In certain embodiments, where multiple pivot point accommodations 9 are available, pivot 17 selection can occur before an inspection operation, and/or be selectable during an inspection operation (e.g., arms 20 having an actuator to engage a selected one of the pivot point accommodations 9, such as extending pegs or other actuated elements, thereby selecting the pivot 17).

Figure 15:
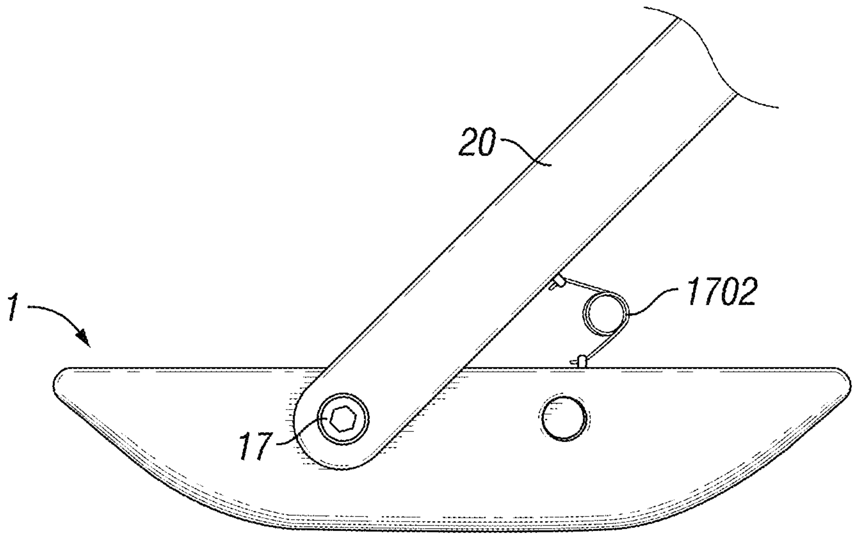
FIG. 15 is a schematic side view of a sled.

In embodiments, the degree of rotation allowed by the pivot 17 may be adjustable. This may be done using mechanical means such as a physical pin, or lock. In embodiments, as shown in FIG. 15, the connection between the sled 1 and the sled arms 20 may include a spring 1702 that biases the pivot 17 to tend to pivot in one direction or another. The spring 1702 may be passive, with the selection of the spring based on the desired strength of the bias, and the installation of the spring 1702 may be such as to preferentially push the front or the back of the sled 1 down. In embodiments, the spring 1702 may be active and the strength and preferential pivot may be varied based on direction of travel, presence of obstacles, desired pivoting responsiveness of the sled 1 to the presence of an obstacle or variation in the inspection surface, and the like. In certain embodiments, opposing springs or biasing members may be utilized to bias the sled 1 back to a selected position (e.g., neutral/flat on the surface, tilted forward, tilted rearward, etc.). Where the sled 1 is biased in a given direction (e.g., forward or rearward), the sled 1 may nevertheless operate in a neutral position during inspection operations, for example due to the down force from the arm 20 on the sled 1.

Figure 14:
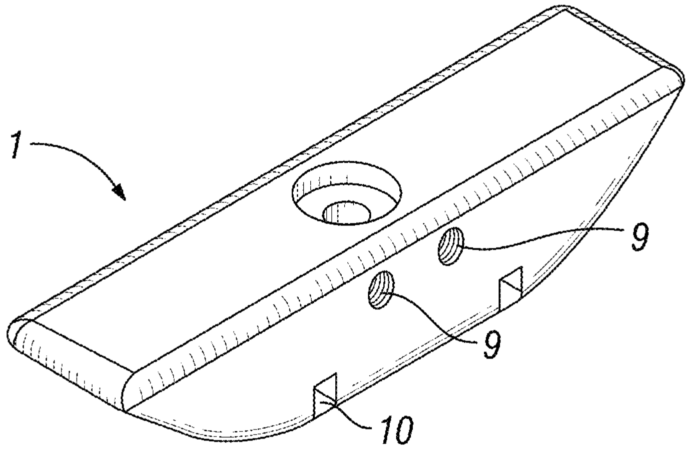
FIG. 14 is a schematic perspective view of a sled.
Figure 16:
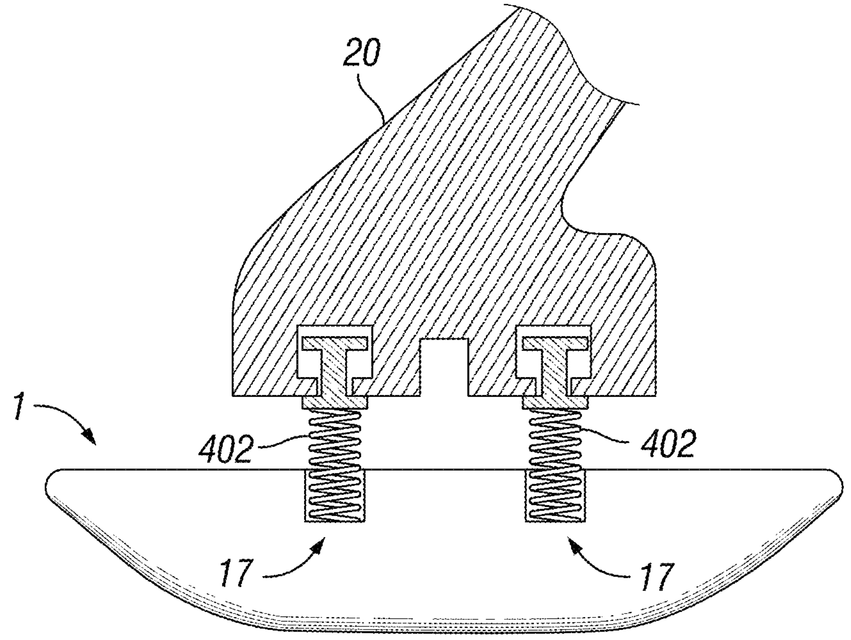
FIG. 16 is a schematic cutaway view of a sled.

An example sled 1, for example as shown in FIG. 16, includes more than one pivot 17, for example utilizing springs 402 to couple to the sled arm 20. In the example of FIG. 14, the two pivots 17 provide additional clearance for the sled 1 to clear obstacles. In certain embodiments, both springs 402 may be active, for example allowing some rotation of each pivot simultaneously, and/or a lifting of the entire sled. In certain embodiments, springs 402 may be selectively locked—for example before inspection operations and/or actively controlled during inspection operations. Additionally or alternatively, selection of pivot position, spring force and/or ease of pivoting at each pivot may be selectively controlled—for example before inspection operations and/or actively controlled during inspection operations (e.g., using a controller 802). The utilization of springs 402 is a non-limiting example of simultaneous multiple pivot points, and leaf springs, electromagnets, torsion springs, or other flexible pivot enabling structures are contemplated herein. The spring tension or pivot control may be selected based on the uniformity of the surface to be traversed. The spring tension may be varied between the front and rear pivot points depending on the direction of travel of the sled 1. In an illustrative and non-limiting example, the rear spring (relative to the direction of travel) might be locked and the front spring active when traveling forward to better enable obstacle accommodation. When direction of travel is reversed, the active and locked springs 402 may be reversed such that what was the rear spring 402 may now be active and what was the front spring 402 may now be locked, again to accommodate obstacles encountered in the new direction of travel.

Figure 17A:
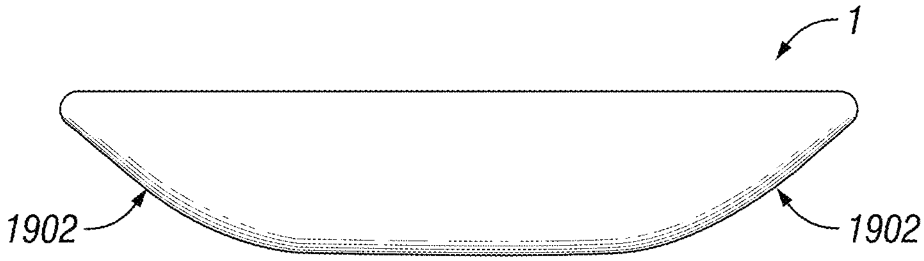
FIGS. 17A and 17B depict schematic side views of alternate embodiments of a sled.
Figure 17B:
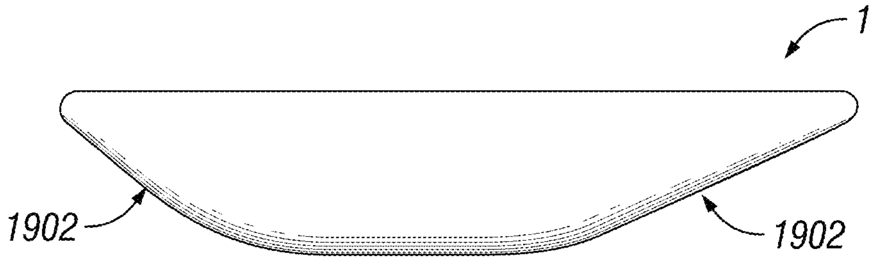

In embodiments, the bottom surface of the sled 1 may be shaped, as shown in FIGS. 17A, 17B, with one or more ramps 1902 to facilitate the sled 1 moving over obstacles encountered along the direction of travel. The shape and slope of each ramp 1902 may be designed to accommodate conflicting goals such as sled 1 stability, speed of travel, and the size of the obstacle the sled 1 is designed to accommodate. A steep ramp angle might be better for accommodating large obstacles but may be required to move more slowly to maintain stability and a good interaction with the surface. The slope of the ramp 1902 may be selected based on the surface to be traversed and expected obstacles. If the sled 1 is interacting with the surface in only one direction, the sled 1 may be designed with only one ramp 1902. If the sled 1 is interacting with the surface going in two directions, the sled 1 may be designed with two ramps 1902, e.g., a forward ramp and a rearward ramp, such that the sled 1 leads with a ramp 1902 in each direction of travel. Referencing FIG. 17B, the front and rear ramps 1902 may have different angles and/or different total height values. While the ramps 1902 depicted in FIGS. 17A and 17B are linear ramps, a ramp 1902 may have any shape, including a curved shape, a concave shape, a convex shape, and/or combinations thereof. The selection of the ramp angle, total ramp height, and bottom surface shape is readily determinable to one of skill in the art having the benefit of the disclosure herein and information ordinarily available when contemplating a system. Certain considerations for determining the ramp angle, ramp total height, and bottom surface shape include considerations of manufacturability, obstacle geometries likely to be encountered, obstacle materials likely to be encountered, materials utilized in the sled 1 and/or ramp 1902, motive power available to the inspection robot 100, the desired response to encountering obstacles of a given size and shape (e.g., whether it is acceptable to stop operations and re-configure the inspection operations for a certain obstacle, or whether maximum obstacle traversal capability is desired), and/or likely impact speed with obstacles for a sled.

Figure 18A:
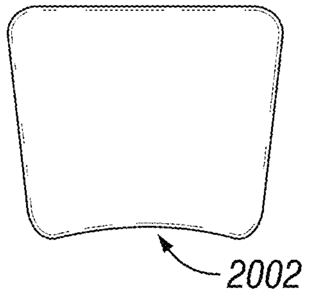
FIGS. 18A and 18B depict schematic front views of alternate embodiments of a sled.
Figure 18B:
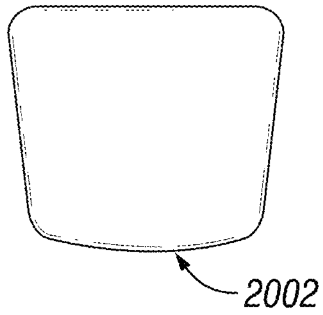

In embodiments, as shown in FIGS. 18A and 18B, the bottom surface 2002 of the sled 1 may be contoured or curved to accommodate a known texture or shape of the surface being traversed, for example such that the sled 1 will tend to remain in a desired orientation (e.g., perpendicular) with the inspection surface as the sled 1 is moved. The bottom surface 2002 of the sled 1 may be shaped to reduce rotation, horizontal translation and shifting, and/or yaw or rotation of the sled 1 from side to side as it traverses the inspection surface. Referencing FIG. 18B, the bottom surface 2002 of the sled 1 may be convex for moving along a rounded surface, on the inside of a pipe or tube, and/or along a groove in a surface. Referencing FIG. 18A, the bottom surface 2002 of the sled 1 may be concave for the exterior of a rounded surface, such as riding on an outer wall of a pipe or tube, along a rounded surface, and/or along a ridge in a surface. The radius of curvature of the bottom surface 2002 of the sled 1 may be selected to facilitate alignment given the curvature of the surface to be inspected. The bottom surface 2002 of the sled 1 may be shaped to facilitate maintaining a constant distance between sensors or tools in the sled 1 and the inspection surface being traversed. In embodiments, at least a portion the bottom of the sled 1 may be flexible such that the bottom of the sled 1 may comply to the shape of the surface being traversed. This flexibility may facilitate traversing surfaces that change curvature over the length of the surface without the adjustments to the sled 1.

For a surface having a variable curvature, a chamfer or curve on the bottom surface 2002 of a sled 1 tends to guide the sled 1 to a portion of the variable curvature matching the curvature of the bottom surface 2002. Accordingly, the curved bottom surface 2002 supports maintaining a selected orientation of the sled 1 to the inspection surface. In certain embodiments, the bottom surface 2002 of the sled 1 is not curved, and one or more pivots 16, 17, 18 combined with the down force from the arms 20 combine to support maintaining a selected orientation of the sled 1 to the inspection surface. In some embodiments, the bottom of the sled 1 may be flexible such that the curvature may adapt to the curvature of the surface being traversed.

Figure 19:
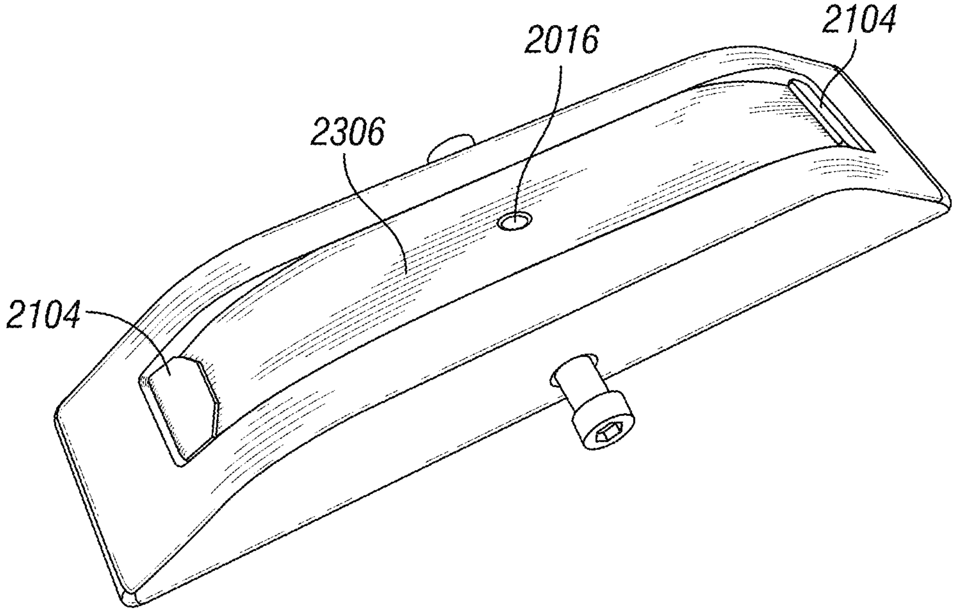
FIG. 19 is a schematic bottom view of a sled.
Figure 22:
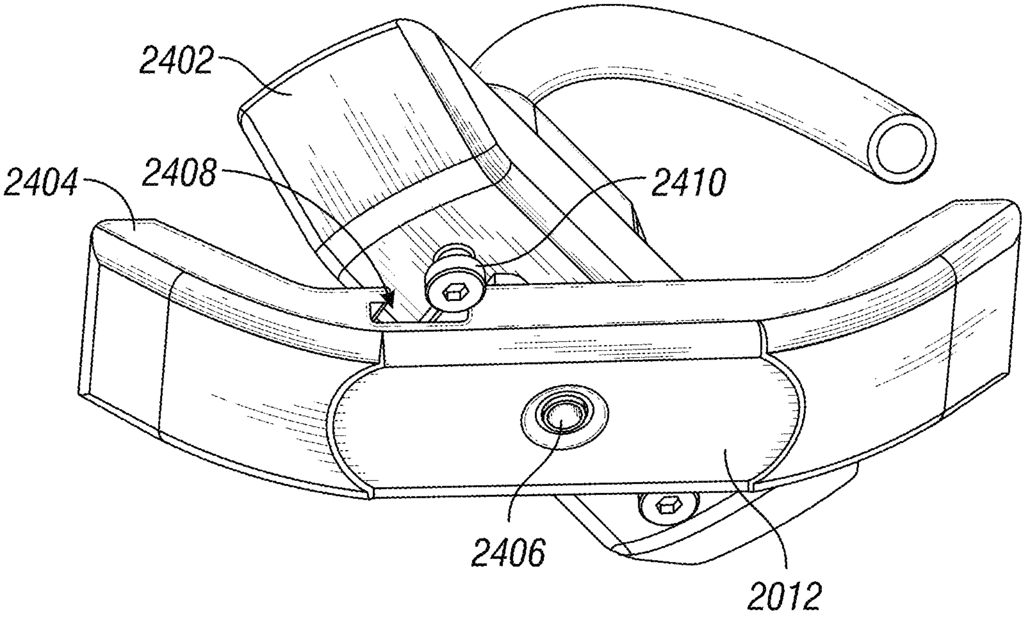
FIG. 22 is a schematic view of a sled having separable top and bottom portions.

The material on the bottom of the sled 1 may be chosen to prevent wear on the sled 1, reduce friction between the sled 1 and the surface being traversed, or a combination of both. Materials for the bottom of the sled may include materials such as plastic, metal, or a combination thereof. Materials for the bottom of the sled may include an epoxy coat, a replaceable layer of polytetrafluoroethylene (e.g., Teflon), acetyl (e.g., —Delrin® acetyl resin), ultrafine molecular weight polyethylene (PMW), and the like. In embodiments, as shown in FIGS. 22, the material on the bottom of the sled 1 may be removable layer such as a sacrificial film layer 2012 (or layer, and/or removable layer) that is applied to the bottom of the sled 1 and then lifted off and replaced at selected intervals, before each inspection operation, and/or when the sacrificial film layer 2012 or bottom of the sled begin to show signs of wear or an increase in friction. An example sled 1 includes an attachment mechanism 2104, such as a clip, to hold the sacrificial film layer 2012 in place. Referencing FIG. 19, an example sled 1 includes a recess 2306 in the bottom surface of the sled to retain the sacrificial film layer 2012 and allow the sacrificial film layer 2012 to have a selected spatial orientation between the inspection contact side (e.g., the side of the sacrificial film layer 2012 exposed to the inspection surface) with the bottom surface 2002 of the sled 1 (e.g., flush with the bottom, extending slightly past the bottom, etc.). In certain embodiments, the removable layer may include a thickness that provides a selected spatial orientation between an inspection contact side in contact with the inspection surface and the bottom surface of the sled. In certain embodiments, the sacrificial film layer 2012 includes an adhesive, for example with an adhesive backing to the layer, and/or may be applied as an adhesive (e.g., an epoxy layer or coating that is refreshed or reapplied from time to time). An example sacrificial film layer 2012 includes a hole therethrough, for example allowing for visual and/or couplant contact between a sensor 2202 attached to the sled 1 and the inspection surface. The hole may be positioned over the sensor 2202, and/or may accommodate the sensor 2202 to extend through the sacrificial film layer 2012, and/or may be aligned with a hole 2016 (e.g., FIG. 19) or aperture 12 (e.g., FIG. 3B) in the sled bottom.

Figure 20:
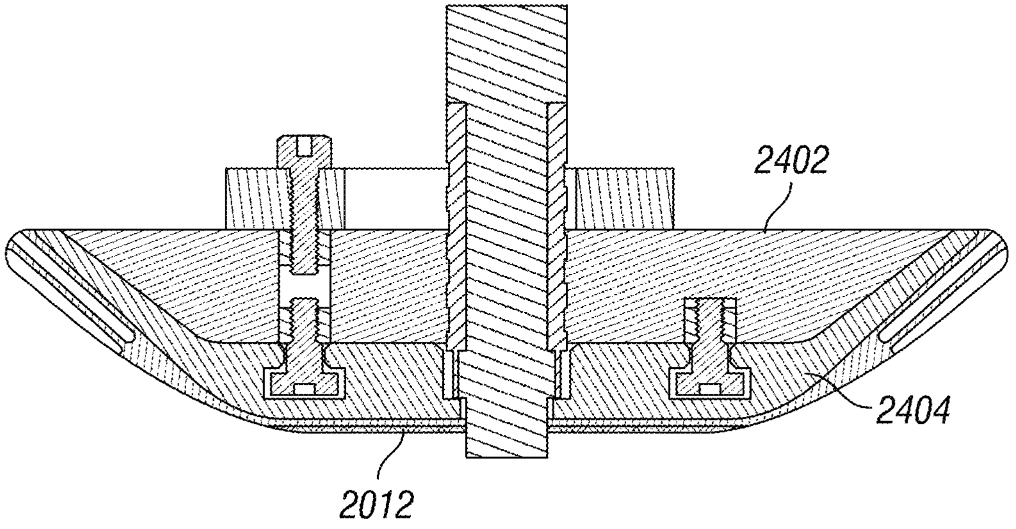
FIG. 20 is a schematic cutaway side view of a sled.
Figure 21:
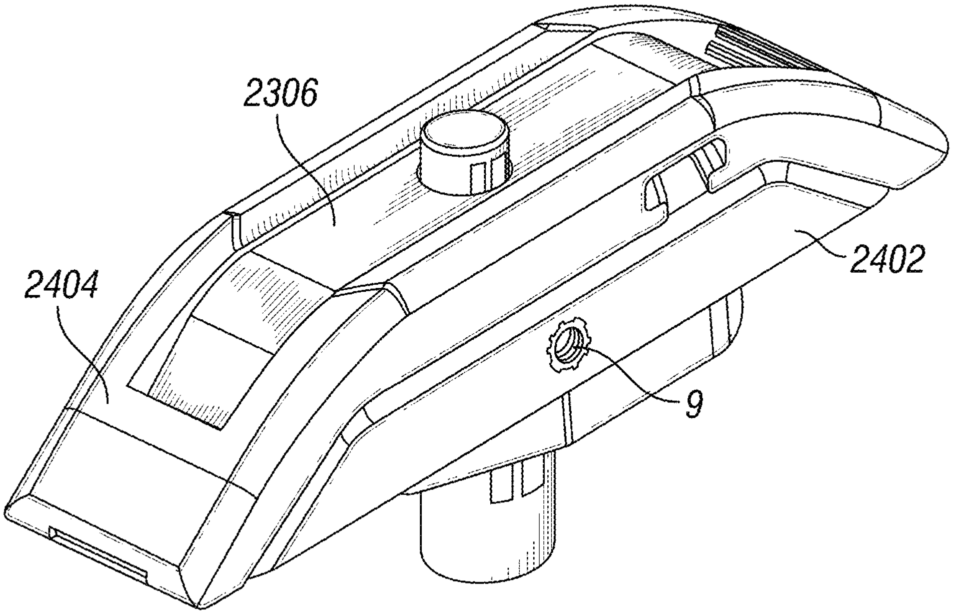
FIG. 21 is a schematic bottom view of a sled.

In embodiments, as shown in FIG. 20-22, an example sled 1 includes an upper portion 2402 and a replaceable lower portion 2404 having a bottom surface. In some embodiments, the replaceable lower portion 2404 may be designed to allow the bottom surface and shape to be changed to accommodate the specific surface to be traversed without having to disturb or change the upper portion 2402. Accordingly, where sensors or tools engage the upper portion 2402, the replaceable lower portion 2404 can be rapidly changed out to configure the sled 1 to the inspection surface, without disturbing sensor connections and/or coupling to the arms 20. The replaceable lower portion 2404 may additionally or alternatively be configured to accommodate a sacrificial film layer 2012, including potentially with a recess 2306. An example sled 1 includes a replaceable lower portion 2404 designed to be easily replaced by lining up the upper portion 2402 and the replaceable lower portion 2404 at a pivot point 2406, and then rotating the pieces to align the two portions. In certain embodiments, the sensor, installation sleeve, cone tip, or other portion protruding through aperture 12 forms the pivot point 2406. One or more slots 2408 and key 2410 interfaces or the like may hold the two portions together.

The ability to quickly swap the replaceable lower portion 2404 may facilitate changing the bottom surface of the sled 1 to improve or optimize the bottom surface of the sled 1 for the surface to be traversed. The lower portion may be selected based on bottom surface shape, ramp angle, or ramp total height value. The lower portion may be selected from a multiplicity of pre-configured replaceable lower portions in response to observed parameters of the inspection surface after arrival to an inspection site. Additionally or alternatively, the replaceable lower portion 2404 may include a simple composition, such as a wholly integrated part of a single material, and/or may be manufactured on-site (e.g., in a 3-D printing operation) such as for a replacement part and/or in response to observed parameters of the inspection surface after arrival to an inspection site. Improvement and/or optimization may include: providing a low friction material as the bottom surface to facilitate the sled 1 gliding over the surface being traversed, having a hardened bottom surface of the sled 1 if the surface to be traversed is abrasive, producing the replaceable lower portion 2404 as a wear material or low-cost replacement part, and the like. The replaceable lower portion 2404 may allow for quick replacement of the bottom surface when there is wear or damage on the bottom surface of the sled 1. Additionally or alternatively, a user may alter a shape/curvature of the bottom of the sled, a slope or length of a ramp, the number of ramps, and the like. This may allow a user to swap out the replaceable lower portion 2404 of an individual sled 1 to change a sensor to a similar sensor having a different sensitivity or range, to change the type of sensor, manipulate a distance between the sensor and the inspection surface, replace a failed sensor, and the like. This may allow a user to swap out the replaceable lower portion 2404 of an individual sled 1 depending upon the surface curvature of the inspection surface, and/or to swap out the replaceable lower portion 2404 of an individual sled 1 to change between various sensors and/or tools.

Figure 23:
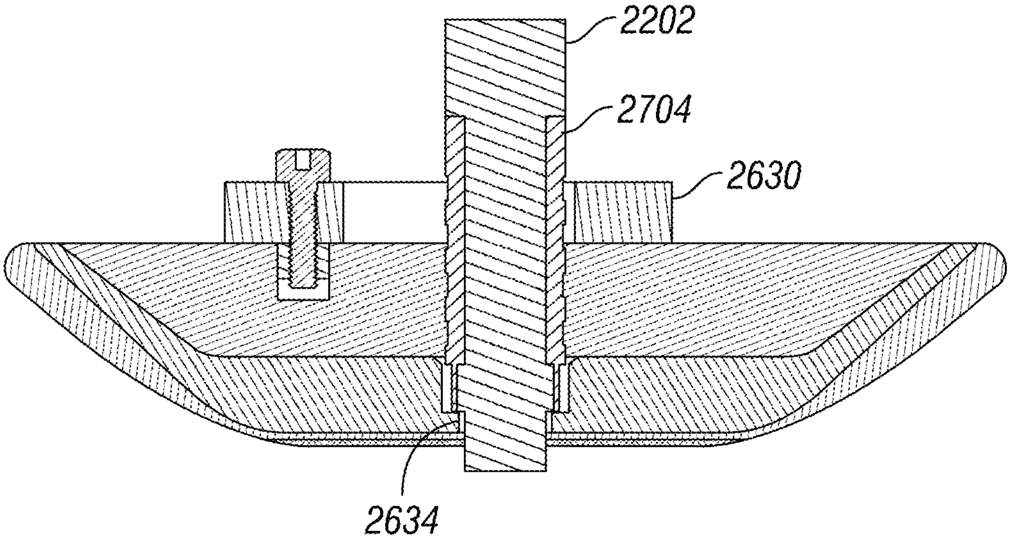
FIG. 23 is a schematic cutaway side view of a sled.
Figure 24:
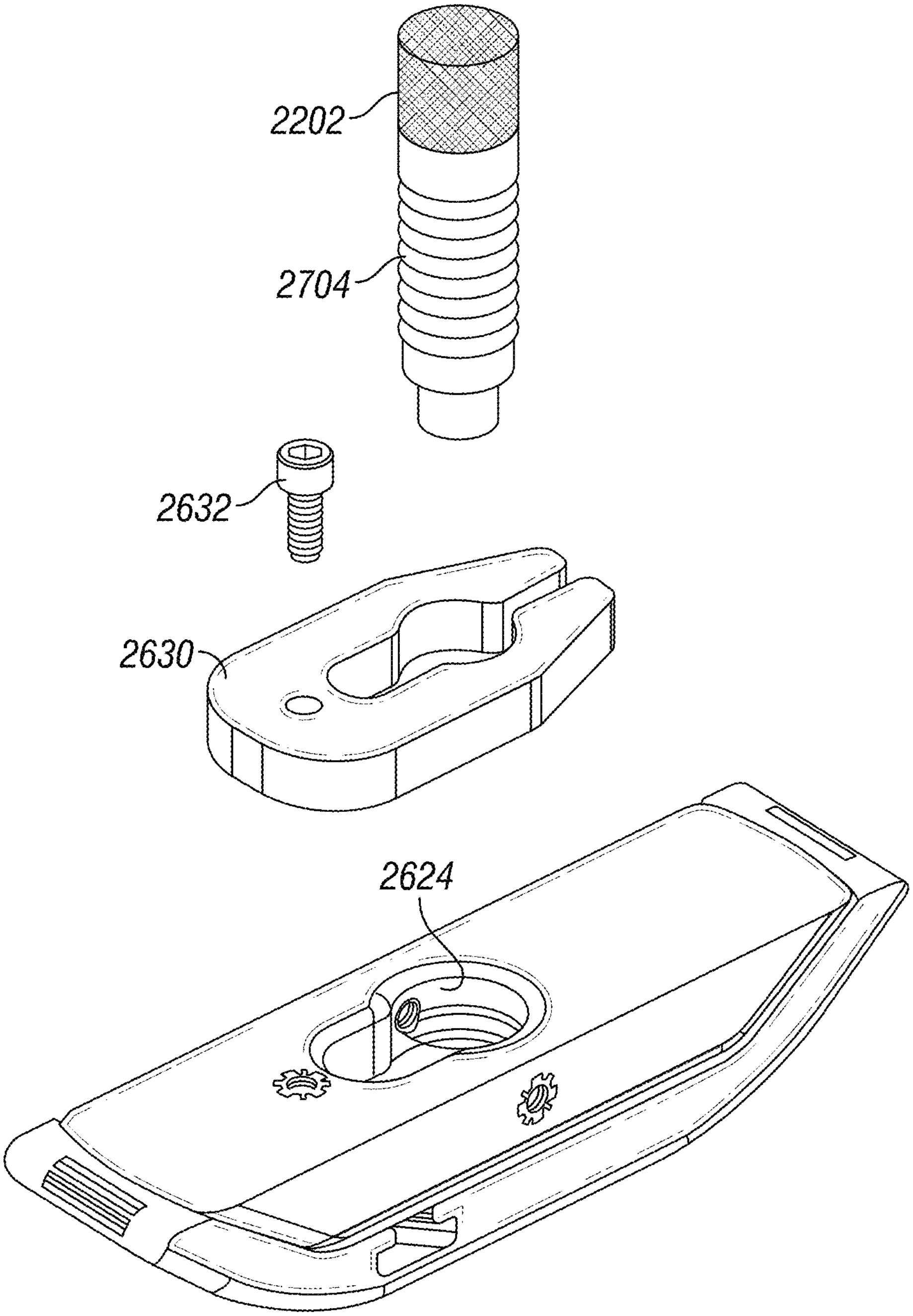
FIG. 24 is a schematic exploded view of a sled with a sensor.
Figure 25:
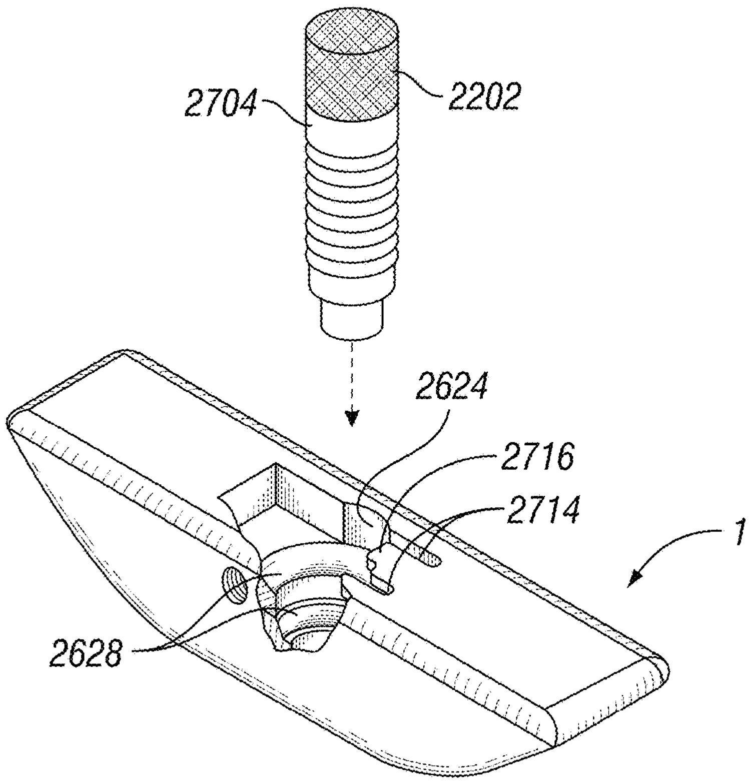
FIG. 25 is a schematic, partially exploded, partially cutaway view of a sled with a sensor.

In embodiments, as shown in FIGS. 23-25, a sled 1 may have a chamber 2624 sized to accommodate a sensor 2202, and/or into which a sensor 2202 may be inserted. The chamber 2624 may have chamfers 2628 on at least one side of the chamber to facilitate ease of insertion and proper alignment of the sensor 2202 in the chamber 2624. An example sled 1 includes a holding clamp 2630 that accommodates the sensor 2202 to pass therethrough, and is attached to the sled 1 by a mechanical device 2632 such as a screw or the like. An example sled 1 includes stops 2634 at the bottom of the chamber 2624, for example to ensure a fixed distance between the sensor 2202 and bottom surface of the sled and/or the inspection surface, and/or to ensure a specific orientation of the sensor 2202 to the bottom surface of the sled and/or the inspection surface.

Figure 27:
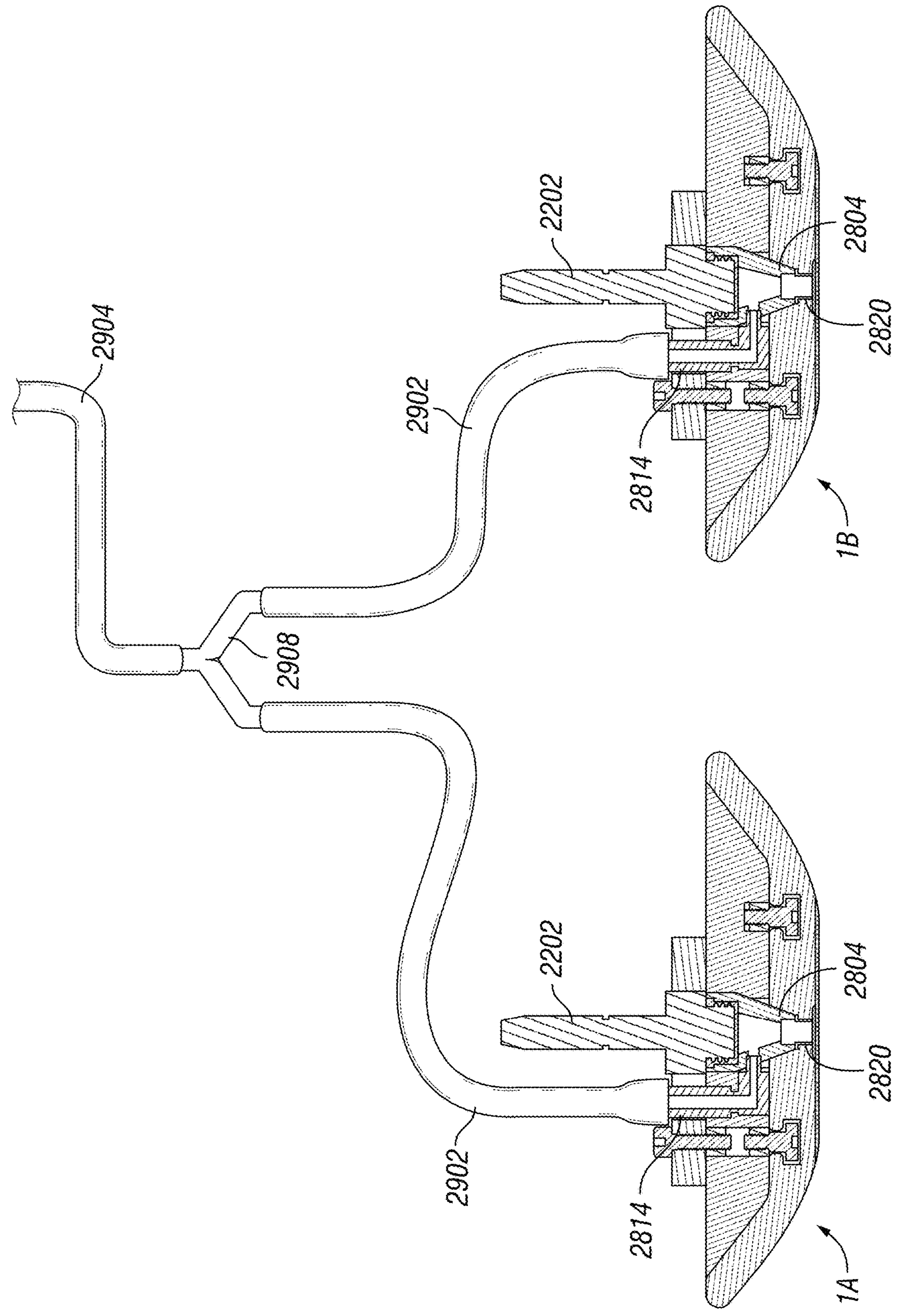
FIG. 27 is a schematic view of couplant lines to a number of sleds.

Referencing FIG. 25, an example sled 1 includes a sensor installation sleeve 2704, which may be positioned, at least partially, within the chamber. The example sensor installation sleeve 2704 may be formed from a compliant material such as neoprene, rubber, an elastomeric material, and the like, and in certain embodiments may be an insert into a chamber 2624, a wrapper material on the sensor 2202, and/or formed by the substrate of the sled 1 itself (e.g., by selecting the size and shape of the chamber 2624 and the material of the sled 1 at least in the area of the chamber 2624). An example sensor installation sleeve 2704 includes an opening 2 sized to receive a sensor 2202 and/or a tool (e.g., marking, cleaning, repair, and/or spray tool). In the example of FIG. 27, the sensor installation sleeve 2704 flexes to accommodate the sensor 2202 as the sensor 2202 is inserted. Additionally or alternatively, a sensor installation sleeve 2704 may include a material wrapping the sensor 2202 and slightly oversized for the chamber 2624, where the sleeve compresses through the hole into the chamber 2624, and expands slightly when released, thereby securing the sensor 2202 into the sled 1. In the example of FIG. 25, an installation tab 2716 is formed by relief slots 2714. The tab 2716 flexes to engage the sensor 2202, easing the change of the sensor 2202 while securing the sensor 2202 in the correct position once inserted into the sled 1.

It can be seen that a variety of sensor and tool types and sizes may be swapped in and out of a single sled 1 using the same sensor installation sleeve 2704. The opening of the chamber 2624 may include the chamfers 2628 to facilitate insertion, release, and positioning of the sensor 2202, and/or the tab 2716 to provide additional compliance to facilitate insertion, release, and positioning of the sensor 2202 and/or to accommodate varying sizes of sensors 2202. Throughout the present disclosure, a sensor 2202 includes any hardware of interest for inserting or coupling to a sled 1, including at least: a sensor, a sensor housing or engagement structure, a tool (e.g., a sprayer, marker, fluid jet, etc.), and/or a tool housing or engagement structure.

Figure 26:
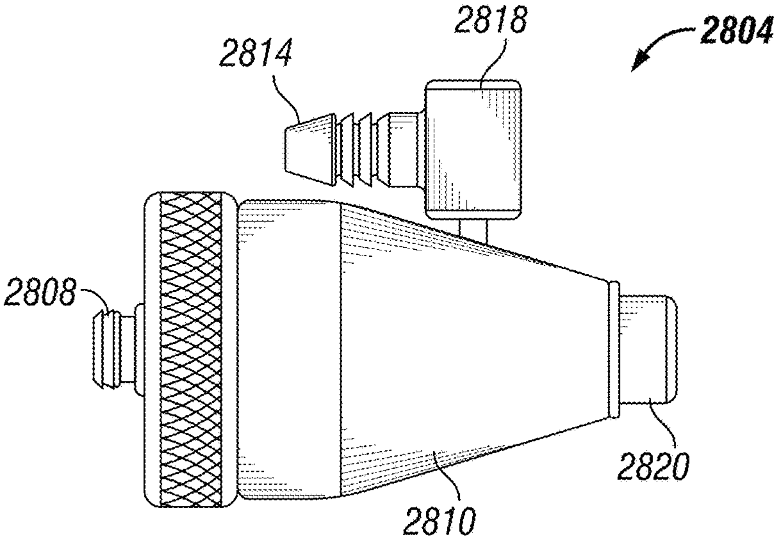
FIG. 26 is a schematic depiction of an acoustic cone.

Referencing FIG. 26, an acoustic cone 2804 is depicted. The acoustic cone 2804 includes a sensor interface 2808, for example to couple an acoustic sensor with the cone 2804. The example acoustic cone 2804 includes a couplant interface 2814, with a fluid chamber 2818 coupling the couplant interface 2814 to the cone fluid chamber 2810. In certain embodiments, the cone tip 2820 of the acoustic cone 2804 is kept in contact with the inspection surface, and/or kept at a predetermined distance from the inspection surface while the acoustic sensor is mounted at the opposite end of the acoustic cone 2804 (e.g., at sensor interface 2808). The cone tip 2820 may define a couplant exit opening between the couplant chamber and the inspection surface. The couplant exit opening may be flush with the bottom surface or extend through the bottom of the sled. Accordingly, a delay line (e.g., acoustic or vibration coupling of a fixed effective length) between the sensor and the inspection surface is kept at a predetermined distance throughout inspection operations. Additionally, the acoustic cone 2804 couples to the sled 1 in a predetermined arrangement, allowing for replacement of the sensor, and/or swapping of a sled 1 without having to recalibrate acoustic and/or ultra-sonic measurements. The volume between the sensor and the inspection surface is maintained with couplant, providing a consistent delay line between the sensor and the inspection surface. Example and non-limiting couplant fluids include alcohol, a dye penetrant, an oil-based liquid, an ultra-sonic gel, or the like. An example couplant fluid includes particle sizes not greater than 1⁄16 of an inch. In certain embodiments, the couplant is filtered before delivery to the sled 1. In certain embodiments, the couplant includes water, which is low cost, low viscosity, easy to pump and compatible with a variety of pump types, and may provide lower resistance to the movement of the inspection sled over the surface than gels. In certain embodiments, water may be an undesirable couplant, and any type of couplant fluid may be provided.

An example acoustic cone 2804 provides a number of features to prevent or remove air bubbles in the cone fluid chamber 2810. An example acoustic cone 2804 includes entry of the fluid chamber 2818 into a vertically upper portion of the cone fluid chamber 2810 (e.g., as the inspection robot 100 is positioned on the inspection surface, and/or in an intended orientation of the inspection robot 100 on the inspection surface, which may toward the front of the robot where the robot is ascending vertically), which tends to drive air bubbles out of the cone fluid chamber 2810. In certain embodiments, the utilization of the acoustic cone 2804, and the ability to minimize sensor coupling and de-coupling events (e.g., a sled can be swapped out without coupling or decoupling the sensor from the cone) contributes to a reduction in leaks and air bubble formation. In certain embodiments, a controller 802 periodically and/or in response to detection of a potential air bubble (e.g., due to an anomalous sensor reading) commands a de-bubbling operation, for example increasing a flow rate of couplant through the cone 2804. In certain embodiments, the arrangements described throughout the present disclosure provide for sufficient couplant delivery to be in the range of 0.06 to 0.08 gallons per minute using a 1⁄8" fluid delivery line to the cone 2804. In certain embodiments, nominal couplant flow and pressure is sufficient to prevent the formation of air bubbles in the acoustic cone 2804.

As shown in FIG. 27, individual tubing 2902 may be connected to each couplant interface 2814. In some embodiments, the individual tubing 2902 may be connected directly to a sled 1A, 1B rather than the individual tubing 2902, for example with sled 1A, 1B plumbing permanently coupled to the couplant interface 2814. Two or more individual tubing 2902 sections may then be joined together in a tubing junction 2908 with a single tube 2904 leaving the junction. In this way, a number of individual tubes 2902 may be reduced to a single tube 2904 that may be easily connected/disconnected from the source of the couplant. In certain embodiments, an entire payload 2 may include a single couplant interface, for example to the inspection robot 100. The inspection robot 100 may include a couplant reservoir and/or a delivery pump thereupon, and/or the inspection robot 100 may be connected to an external couplant source. In certain embodiments, an entire payload 2 can be changed out with a single couplant interface change, and without any of the cone couplant interfaces and/or sensor couplant interface being disconnected. In certain embodiments, the integration of the sensor 2202, acoustic cone 2804, and cone tip 2820 is designed to maintain a constant distance between the surface being measured and the acoustic sensor 2202. The constant distance facilitates in the interpretation of the data recorded by the acoustic sensor 2202. In certain embodiments, the distance between the surface being measured and the acoustic sensor 2202 may be described as the "delay line."

Certain embodiments include an apparatus for providing acoustic coupling between a carriage (or sled) mounted sensor and an inspection surface. Example and non-limiting structures to provide acoustic coupling between a carriage mounted sensor and an inspection surface include an acoustic (e.g., an ultra-sonic) sensor mounted on a sled 1, the sled 1 mounted on a payload 2, and the payload 2 coupled to an inspection robot. An example apparatus further includes providing the sled 1 with a number of degrees of freedom of motion, such that the sled 1 can maintain a selected orientation with the inspection surface-including a perpendicular orientation and/or a selected angle of orientation. Additionally or alternatively, the sled 1 is configured to track the surface, for example utilizing a shaped bottom of the sled 1 to match a shape of the inspection surface or a portion of the inspection surface, and/or the sled 1 having an orientation such that, when the bottom surface of the sled 1 is positioned against the inspection surface, the sensor maintains a selected angle with respect to the inspection surface.

Certain additional embodiments of an apparatus for providing acoustic coupling between a carriage mounted sensor and an inspection surface include utilization of a fixed-distance structure that ensures a consistent distance between the sensor and the inspection surface. For example, the sensor may be mounted on a cone, wherein an end of the cone touches the inspection surface and/or is maintained in a fixed position relative to the inspection surface, and the sensor mounted on the cone thereby is provided at a fixed distance from the inspection surface. In certain embodiments, the sensor may be mounted on the cone, and the cone mounted on the sled 1, such that a change-out of the sled 1 can be performed to change out the sensor, without engaging or disengaging the sensor from the cone. In certain embodiments, the cone may be configured such that couplant provided to the cone results in a filled couplant chamber between a transducer of the sensor and the inspection surface. In certain additional embodiments, a couplant entry position for the cone is provided at a vertically upper position of the cone, between the cone tip portion and the sensor mounting end, in an orientation of the inspection robot as it is positioned on the surface, such that couplant flow through the cone tends to prevent bubble formation in the acoustic path between the sensor and the inspection surface. In certain further embodiments, the couplant flow to the cone is adjustable, and is capable, for example, to be increased in response to a determination that a bubble may have formed within the cone and/or within the acoustic path between the sensor and the inspection surface. In certain embodiments, the sled 1 is capable of being lifted, for example with an actuator that lifts an arm 20, and/or that lifts a payload 2, such that a free fluid path for couplant and attendant bubbles to exit the cone and/or the acoustic path is provided. In certain embodiments, operations to eliminate bubbles in the cone and/or acoustic path are performed periodically, episodically (e.g., after a given inspection distance is completed, at the beginning of an inspection run, after an inspection robot pauses for any reason, etc.), and/or in response to an active determination that a bubble may be present in the cone and/or the acoustic path.

An example apparatus provides for low or reduced fluid loss of couplant during inspection operations. Example and non-limiting structures to provide for low or reduced fluid loss include providing for a limited flow path of couplant out of the inspection robot system—for example utilizing a cone having a smaller exit couplant cross-sectional area than a cross-sectional area of a couplant chamber within the cone. In certain embodiments, an apparatus for low or reduced fluid loss of couplant includes structures to provide for a selected down force on a sled 1 which the sensor is mounted on, on an arm 20 carrying a sled 1 which the sensor is mounted on, and/or on a payload 2 which the sled 1 is mounted on. Additionally or alternatively, an apparatus providing for low or reduced fluid loss of couplant includes a selected down force on a cone providing for couplant connectivity between the sensor and the inspection surface—for example, a leaf spring or other biasing member within the sled 1 providing for a selected down force directly to the cone. In certain embodiments, low or reduced fluid loss includes providing for an overall fluid flow of between 0.12 to 0.16 gallons per minute to the inspection robot to support at least 10 ultra-sonic sensors. In certain embodiments, low or reduced fluid loss includes providing for an overall fluid flow of less than 50 feet per minute, less than 100 feet per minute, and less than 200 feet per minute fluid velocity in a tubing line feeding couplant to the inspection robot. In certain embodiments, low or reduced fluid loss includes providing sufficient couplant through a ¼" tubing line to feed couplant to at least 6, at least 8, at least 10, at least 12, or at least 16 ultra-sonic sensors to a vertical height of at least 25 feet, at least 50 feet, at least 100 feet, at least 150 feet, or at least 200 feet. An example apparatus includes a ¼" feed line to the inspection robot and/or to the payload 2, and a ⅛" feed line to individual sleds 1 and/or sensors (or acoustic cones associated with the sensors). In certain embodiments, larger and/or smaller diameter feed and individual fluid lines are provided.

Figure 28:
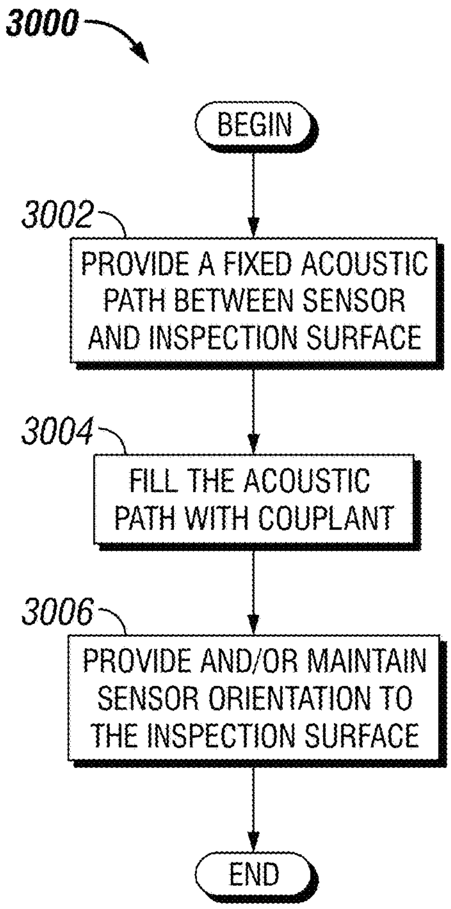
FIG. 28 is a schematic flow diagram of a procedure to provide sensors for inspection of an inspection surface.

Referencing FIG. 28, an example procedure 3000 to provide acoustic coupling between a sensor and an inspection surface is depicted schematically. The example procedure 3000 includes an operation 3002 to provide a fixed acoustic path between the sensor and the inspection surface. The example procedure 3000 further includes an operation 3004 to fill the acoustic path with a couplant. The example procedure 3000 further includes an operation 3006 to provide for a selected orientation between the sensor and the inspection surface. In certain embodiments, certain operations of the procedure 3000 are performed iteratively throughout inspection operations—for example operations 3006 may include maintaining the orientation throughout inspection operations—such as providing the sensor on a sled having a bottom surface and/or maneuverability to passively or actively self-align to the inspection surface, and/or to return to alignment after a disturbance such as traversal of an obstacle. In another example, operations 3004 include providing a couplant flow to keep the acoustic path between the sensor and the inspection surface filled with couplant, and/or adjusting the couplant flow during inspection operations. Certain operations of procedure 3000 may be performed by a controller 802 during inspection operations.

Figure 29:
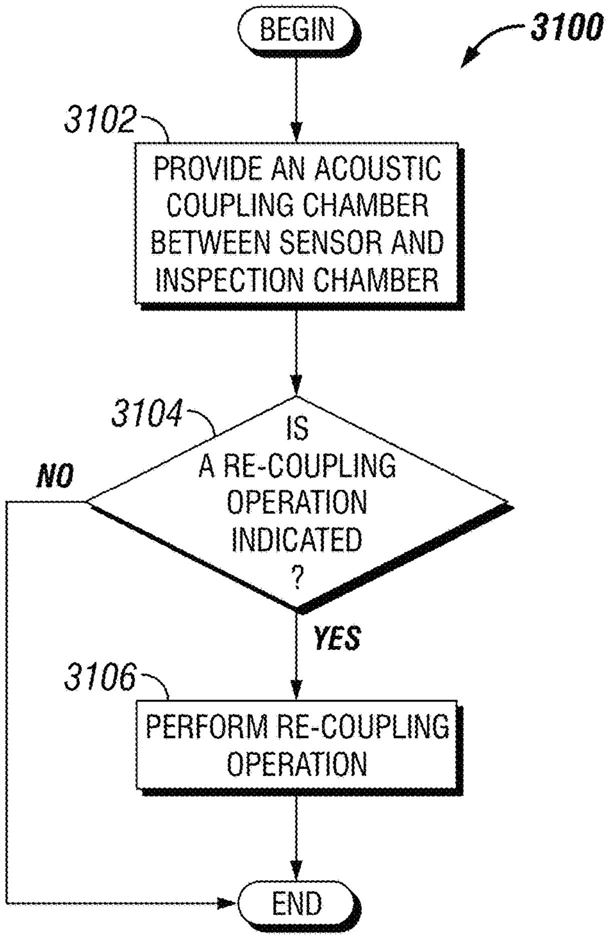
FIG. 29 is a schematic flow diagram of a procedure to re-couple a sensor to an inspection surface.

Referencing FIG. 29, an example procedure 3100 to ensure acoustic engagement between a sensor and an inspection surface is depicted schematically. The example procedure 3100 includes an operation 3102 to provide an acoustic coupling chamber between the sensor and the inspection surface. Example and non-limiting operations 3102 include providing the acoustic coupling chamber with an arrangement that tends to reduce bubble formation within the acoustic path between the sensor and the inspection surface. The example procedure 3100 further includes an operation 3104 to determine that the sensor should be re-coupled to the inspection surface. Example and non-limiting operations 3104 include determining that a time has elapsed since a last re-coupling operation, determining that an event has occurred and performing a re-coupling operation in response to the event, and/or actively determining that the acoustic path has been interrupted. Example and non-limiting events include a pausing of the inspection robot, a beginning of inspection operations and/or completion of a selected portion of inspection operations, and/or an interruption of couplant flow to the inspection robot. Example and non-limiting operation to actively determine that the acoustic path has been interrupted include an observation of a bubble (e.g., in an acoustic cone), an indication that couplant may have exited the acoustic path (e.g., the sled 1 has lifted either for an obstacle or for another operation, observation of an empty cone, etc.), and/or an indication that a sensor reading is off-nominal (e.g., signal seems to have been lost, anomalous reading has occurred, etc.). The example procedure 3100 further includes an operation 3106 to re-couple the sensor to the inspection surface. Example and non-limiting operations 3106 include resuming and/or increasing a couplant flow rate, and/or briefly raising a sled, sled arm, and/or payload from the inspection surface. The procedure 3100 and/or portions thereof may be repeated iteratively during inspection operations. Certain operations of procedure 3100 may be performed by a controller 802 during inspection operations.

Figure 30:
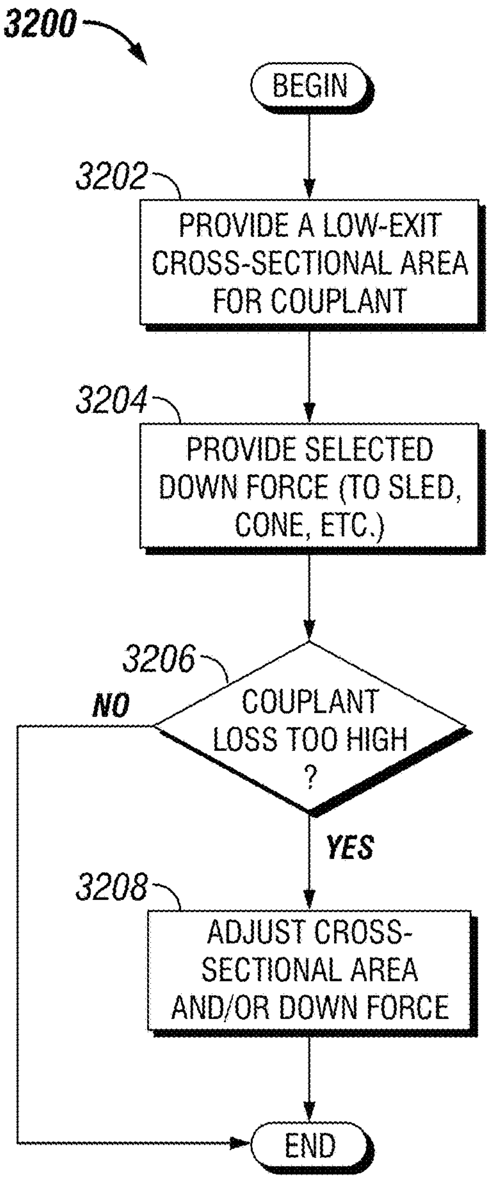
FIG. 30 is a schematic flow diagram of a procedure to provide for low couplant loss.

Referencing FIG. 30, an example procedure 3200 to provide low fluid loss (and/or fluid consumption) between an acoustic sensor and an inspection surface is depicted schematically. An example procedure 3200 includes an operation 3202 to provide for a low exit cross-sectional area for couplant from an acoustic path between the sensor and the inspection surface—including at least providing an exit from a couplant chamber formed by a cone as the exit cross-sectional area, and/or providing an exit cross-sectional area that is in a selected proximity to, and/or in contact with, the inspection surface. The example procedure 3200 further includes an operation 3204 to provide a selected down force to a sled having the sensor mounted thereon, and/or to a couplant chamber. In certain embodiments, the example procedure 3200 includes an operation 3206 to determine if fluid loss for the couplant is excessive (e.g., as measured by replacement couplant flow provided to an inspection robot, and/or by observed couplant loss), and an operation 3208 to increase a down force and/or reduce a couplant exit cross-sectional area from a couplant chamber. In certain embodiments, an inspection robot includes a configurable down force, such as: an active magnet strength control; a biasing member force adjustment (e.g., increasing confinement of a spring to increase down force); sliding of a weight in a manner to adjust down force on the sled and/or cone; combinations of these; or the like. In certain embodiments, an exit cross-sectional are for couplant is adjustable—for example, an iris actuator (not shown), gate valve, or cross-sectional area adjustment is provided. In certain embodiments, cross-sectional area is related to the offset distance of the couplant chamber exit (e.g., cone tip) from the inspection surface, whereby a reduction of the selected offset distance of the couplant chamber exit to the inspection surface reduces the effective exit flow area of the couplant chamber. Example operations to adjust the selected offset distance include lowering the couplant chamber within the sled and/or increasing a down force on the sled and/or couplant chamber. Certain operations of procedure 3200 may be performed by a controller 802 during inspection operations.

Figure 2A:
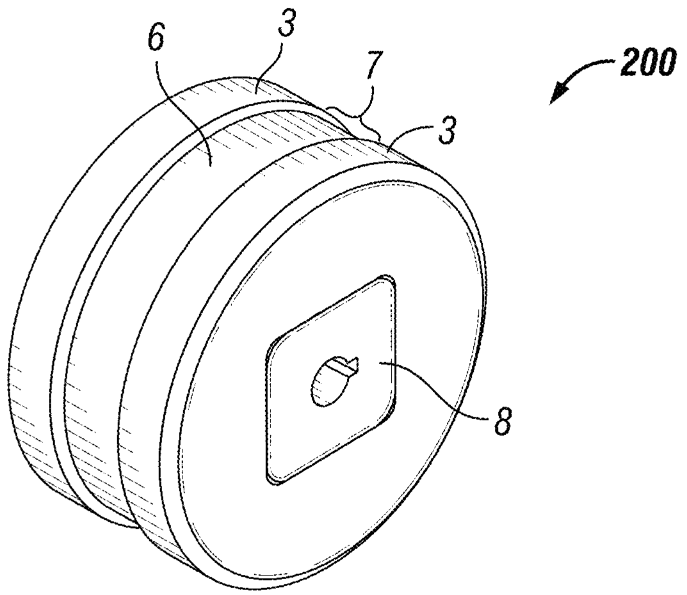
FIG. 2A is a schematic depiction of a wheel and splined hub design consistent with certain embodiments of the present disclosure.
Figure 2B:
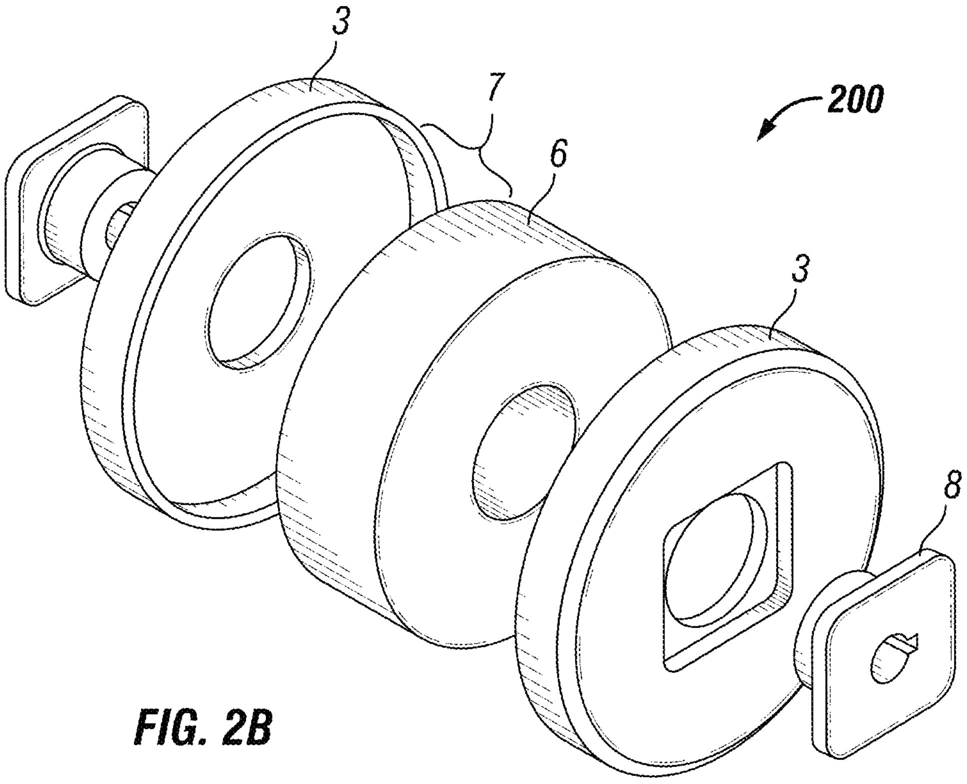
FIG. 2B is an exploded view of a wheel and splined hub design consistent with certain embodiments of the present disclosure.

Referencing FIGS. 2A and 2B, an example system includes a wheel 200 design that enables modularity, adhesion to the structure's surface, and obstacle traversing. A splined hub, wheel size, and the use of magnets allow the system to be effective on many different surfaces. In some embodiments, the wheel 200 includes a splined hub 8. The wheel 200 permits a robotic vehicle 100 to climb on walls, ceilings, and other ferromagnetic surfaces. As shown in the embodiment depicted in FIGS. 2A and 2B, this may be accomplished by embedding magnets 6 in a ferromagnetic enclosure 3 and/or an electrically conductive enclosure to protect the magnet 6, improve alignment, and allow for ease of assembly. For example, the magnet 6 may be a permanent magnet and/or a controllable electromagnet, and may further include a rare earth magnet. The ferromagnetic enclosure 3 protects the magnet 6 from directly impacting the inspected surface, reduces impacts and damage to the magnet 6, and reduces wear on the surface and the magnet 6. The ferromagnetic and/or electrical conductivity of the enclosure 3 reduces magnetic field lines in not-useful directions (e.g., into the housing 102, electrical lines or features that may be present near the inspected surface, etc.) and guides the magnetic field lines to the inspected surface. In certain embodiments, the enclosure 3 may not be ferromagnetic or conductive, and/or the enclosure 3 may be at least partially covered by a further material (e.g., molded plastic, a coating, paint, etc.), for example to protect the inspected surface from damage, to protect the enclosure 3 from wear, for aesthetic reasons, or for any other reason. In certain embodiments, the magnet 6 is not present, and the system 100 stays in contact with the surface in another manner (e.g., surface tension adhesion, gravity such as on a horizontal or slightly inclined inspection surface, movement along a track fixed to the surface, or the like). Any arrangements of an inspection surface, including vertical surfaces, overhang or upside-down surfaces, curved surfaces, and combinations of these, are contemplated herein.

Figure 3C:
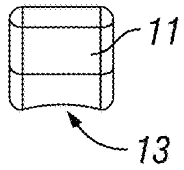

The wheel 200 includes a channel 7 formed between enclosures 3, for example at the center of the wheel 200. In certain embodiments, the channel 7 provides for self-alignment on surfaces such as tubes or pipes. In certain embodiments, the enclosures 3 include one or more chamfered edges or surfaces (e.g., the outer surface in the example of FIGS. 3B-3C), for example to improve contact with a rough or curved surface, and/or to provide for a selected surface contact area to avoid damage to the surface and/or the wheel 200. The flat face along the rim also allows for adhesion and predictable movement on flat surfaces.

The wheel 200 may be connected to the shaft using a splined hub 8. This design makes the wheel modular and also prevents it from binding due to corrosion. The splined hub 8 transfers the driving force from the shaft to the wheel. An example wheel 200 includes a magnetic aspect (e.g., magnet 6) capable to hold the robot on the wall, and accept a driving force to propel the robot, the magnet 6 positioned between conductive and/or ferromagnetic plates or enclosures, a channel 7 formed by the enclosures or plates, one or more chamfered and/or shaped edges, and/or a splined hub attachment to a shaft upon which the wheel is mounted.

The robotic vehicle may utilize a magnet-based wheel design that enables the vehicle to attach itself to and operate on ferromagnetic surfaces, including vertical and inverted surfaces (e.g., walls and ceilings). As shown in FIGS. 2A and 2B, the wheel design may comprise a cylindrical magnet 6 mounted between two wheel enclosures 3 with a splined hub 8 design for motor torque transfer, where the outer diameter of the two enclosures 3 is greater than the outer diameter of the magnet 6. Once assembled, this configuration creates a channel 7 between the two wheel enclosures 3 that prevents the magnet 6 from making physical contact with the surface as the wheel rolls on the outer diameter surface of the wheel enclosures 3. In certain embodiments, the material of the magnet 6 may include a rare earth material (e.g., neodymium, yttrium-cobalt, samarium-cobalt, etc.), which may be expensive to produce, handle, and/or may be highly subject to damage or corrosion. Additionally, any permanent magnet material may have a shorter service life if exposed to direct shocks or impacts.

The channel 7 may also be utilized to assist in guiding the robotic vehicle along a feature of an inspection surface 500, such as where the channel 7 is aligned along the top of a rounded surface (e.g., pipe, or other raised feature) that the wheel uses to guide the direction of travel. The wheel enclosures 3 may also have guiding features, such as grooves, concave or convex curvature, chamfers on the inner and/or outer edges, and the like.

One skilled in the art will appreciate that a great variety of different guiding features may be used to accommodate the different surface characteristics to which the robotic vehicle may be applied. In certain embodiments, combinations of features provide for the inspection robot 100 to traverse multiple surfaces for a single inspection operation, reducing change-time for the wheels and the like. In certain embodiments, chamfer angles, radius of curvature, vertical depth of chamfers or curves, and horizontal widths of chamfers or curves are selectable to accommodate the sizing of the objects to be traversed during inspection operations. It can be seen that the down force provided by the magnet 6 combined with the shaping of the enclosure 3 guiding features combine to provide for self-alignment of the inspection robot 100 on the surface 500, and additionally provide for protection of the magnet 6 from exposure to shock, impacts, and/or materials that may be present on the inspection surface. In certain embodiments, the magnet 6 may be shaped—for example with curvature, to better conform to the inspection surface 500 and/or prevent impact or contact of the magnet 6 with the surface.

Figure 8:
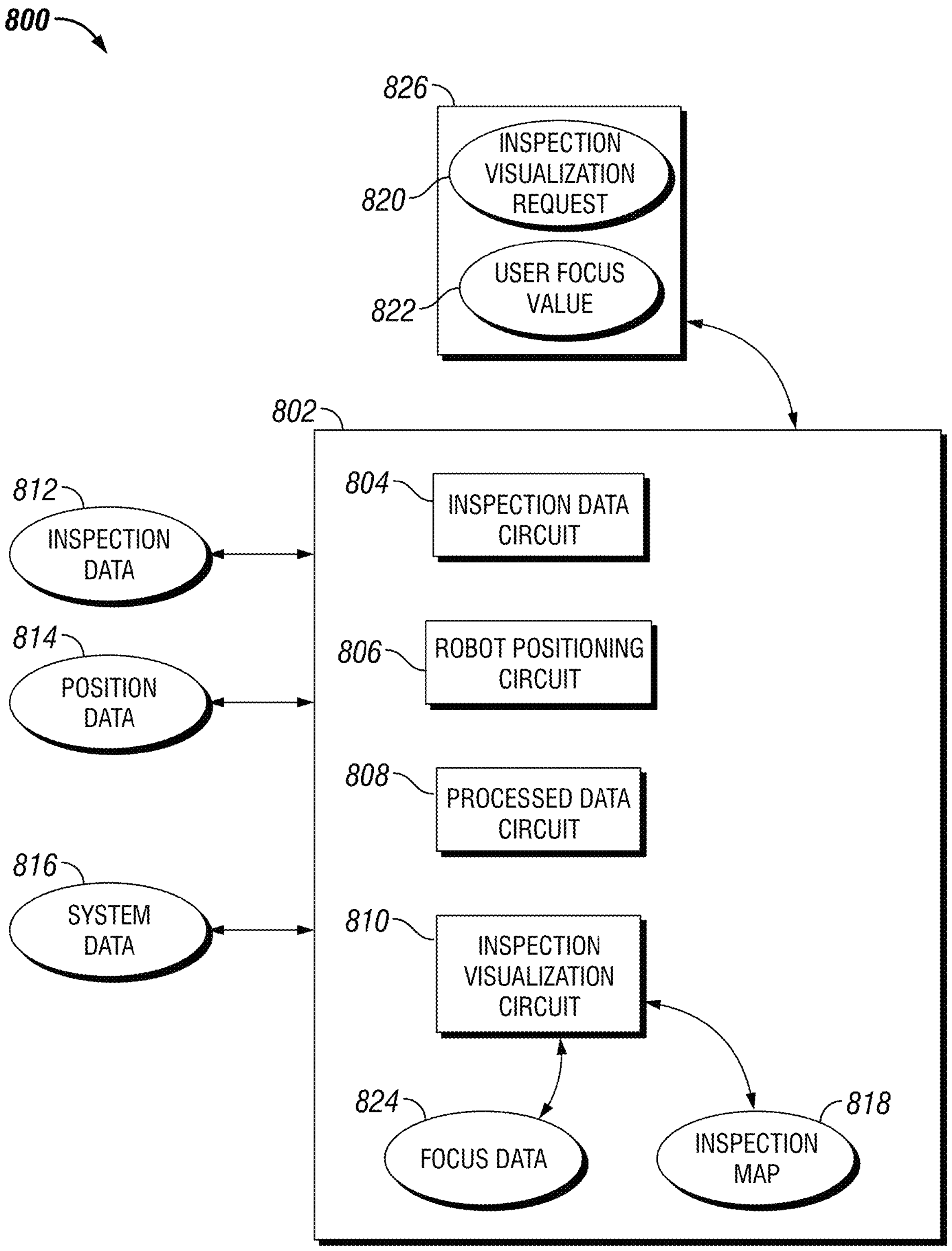
FIG. 8 is a schematic block diagram of an apparatus for providing an inspection map.

Additionally or alternatively, guiding features may be selectable for the inspection surface—for example multiple enclosures 3 (and/or multiple wheel assemblies including the magnet 6 and enclosure 3) may be present for an inspection operation, and a suitable one of the multiple enclosures 3 provided according to the curvature of surfaces present, the spacing of pipes, the presence of obstacles, or the like. In certain embodiments, an enclosure 3 may have an outer layer (e.g., a removable layer—not shown)—for example a snap on, slide over, coupled with set screws, or other coupling mechanism for the outer layer, such that just an outer portion of the enclosure is changeable to provide the guiding features. In certain embodiments, the outer layer may be a non-ferrous material (e.g., making installation and changes of the outer layer more convenient in the presence to the magnet 6, which may complicate quick changes of a fully ferromagnetic enclosure 3), such as a plastic, elastomeric material, aluminum, or the like. In certain embodiments, the outer layer may be a 3-D printable material (e.g., plastics, ceramics, or any other 3-D printable material) where the outer layer can be constructed at an inspection location after the environment of the inspection surface 500 is determined. An example includes the controller 802 (e.g., reference FIG. 8 and the related description) structured to accept inspection parameters (e.g., pipe spacing, pipe sizes, tank dimensions, etc.), and to provide a command to a 3-D printer responsive to the command to provide an outer layer configured for the inspection surface 500. In certain embodiments, the controller 802 further accepts an input for the wheel definition (e.g., where selectable wheel sizes, clearance requirements for the inspection robot 100, or other parameters not necessarily defined by the inspection surface 500), and further provides the command to the 3-D printer, to provide an outer layer configured for the inspection surface 500 and the wheel definition.

An example splined hub 8 design of the wheel assembly may enable modular re-configuration of the wheel, enabling each component to be easily switched out to accommodate different operating environments (e.g., ferromagnetic surfaces with different permeability, different physical characteristics of the surface, and the like). For instance, enclosures with different guiding features may be exchanged to accommodate different surface features, such as where one wheel configuration works well for a first surface characteristic (e.g., a wall with tightly spaced small pipes) and a second wheel configuration works well for a second surface characteristic (e.g., a wall with large pipes). The magnet 6 may also be exchanged to adjust the magnetic strength available between the wheel assembly and the surface, such as to accommodate different dimensional characteristics of the surface (e.g., features that prevent close proximity between the magnet 6 and a surface ferromagnetic material), different permeability of the surface material, and the like. Further, one or both enclosures 3 may be made of ferromagnetic material, such as to direct the flux lines of the magnet toward a surface upon which the robotic vehicle is riding, to direct the flux lines of the magnet away from other components of the robotic vehicle, and the like, enabling the modular wheel configuration to be further configurable for different ferromagnetic environments and applications.

The present disclosure provides for robotic vehicles that include a sensor sled components, permitting evaluation of particular attributes of the structure. As shown in the embodiments depicted in FIGS. 3A to 3C, the sled 1 may hold the sensor that can perform inspection of the structure. The sensor may be perpendicular to the surface being inspected and, in some embodiments, may have a set distance from the surface to protect it from being damaged. In other embodiments, the distance from the surface to the sensor may be adjusted to accommodate the technical requirements of the sensor being utilized. A couplant retaining column may be added at the sensor outlet to retain couplant depending on the type of sensor being used. In certain embodiments, an aperture 12 may be provided at a bottom of the sled 1 to allow an installed sensor to operatively communicate with an inspection surface.

The sleds of the present disclosure may slide on a flat or curved surface and may perform various types of material testing using the sensors incorporated into the sled. The bottom surface 13 of the sled may be fabricated from numerous types of materials which may be chosen by the user to fit the shape of the surface. Note that depending on the surface condition, a removeable, replaceable, and/or sacrificial layer of thin material may be positioned on the bottom surface of the sled to reduce friction, create a better seal, and protect the bottom of the sled from physical damage incurred by the surface. In certain embodiments, the sled may include ramp surfaces 11 at the front and back of the sled. The ramp and available pivot point accommodation 9 (described below—for example, an option for pivot 17) give the sled the ability to travel over obstacles. This feature allows the sled to work in industrial environments with surfaces that are not clean and smooth. In certain embodiments, one or more apertures 10 may be provided, for example to allow a sacrificial layer to be fixed to the bottom of the sled 1.

In summary, an example robotic vehicle 100 includes sensor sleds having the following properties capable of providing a number of sensors for inspecting a selected object or surface, including a soft or hard bottom surface, including a bottom surface that matches an inspection surface (e.g., shape, contact material hardness, etc.), having a curved surface and/or ramp for obstacle clearance (including a front ramp and/or a back ramp), includes a column and/or couplant insert (e.g., a cone positioned within the sled, where the sensor couples to the cone) that retains couplant, improves acoustic coupling between the sensor and the surface, and/or assists in providing a consistent distance between the surface and the sensor; a plurality of pivot points between the main body 102 and the sled 1 to provide for surface orientation, improved obstacle traversal, and the like, a sled 1 having a mounting position configured to receive multiple types of sensors, and/or magnets in the sled to provide for control of downforce and/or stabilized positioning between the sensor and the surface. In certain implementations of the present invention, it is advantageous to not only be able to adjust spacing between sensors but also to adjust their angular position relative to the surface being inspected. The present invention may achieve this goal by implementing systems having several translational and rotational degrees of freedom.

Referencing FIG. 4, an example payload 2 includes selectable spacing between sleds 1, for example to provide selectable sensor spacing. In certain embodiments, spacing between the sensors may be adjusted using a lockable translational degree of freedom such as a set screw allowing for the rapid adjustment of spacing. Additionally or alternatively, any coupling mechanism between the arm 20 and the payload 2 is contemplated herein. In certain embodiments, a worm gear or other actuator allows for the adjustment of sensor spacing by a controller and/or in real time during operations of the system 100. In certain embodiments, the payload 2 includes a payload shaft 19 whereupon sleds 1 are mounted (e.g., via the arms 20). In these embodiments, the inspection sled mounts 14 are mounted on a payload shaft 19. The example of FIG. 4 includes a shaft cap 15 providing structural support to a number of shafts of the payload 2. In the example of FIG. 4, two shafts are utilized to mount the payload 2 onto the housing 102, and one payload shaft 19 is utilized to mount the arms 20 onto the payload 2. The arrangement utilizing a payload 2 is a non-limiting example, that allows multiple sensors and sleds 1 to be configured in a particular arrangement, and rapidly changed out as a group (e.g., swapping out a first payload and set of sensors for a second payload and set of sensors, thereby changing an entire sensor arrangement in a single operation). However, in certain embodiments one or more of the payload 2, arms 20, and/or sleds 1 may be fixedly coupled to the respective mounting features, and numerous benefits of the present disclosure are nevertheless achieved in such embodiments.

During operation, an example system 100 encounters obstacles on the surface of the structure being evaluated, and the pivots 16, 17, 18 provide for movement of the arm 20 to traverse the obstacle. In certain embodiments, the system 100 is a modular design allowing various degrees of freedom of movement of sleds 1, either in real-time (e.g., during an inspection operation) and/or at configuration time (e.g., an operator or controller adjusts sensor or sled positions, down force, ramp shapes of sleds, pivot angles of pivots 16, 17, 18 in the system 100, etc.) before an inspection operation or a portion of an inspection operation, and including at least the following degrees of freedom: translation (e.g., payload 2 position relative to the housing 102); translation of the sled arm 20 relative to the payload 2, rotation of the sled arm 20, rotation of the sled arm 20 mount on the payload 2, and/or rotation of the sled 1 relative to the sled arm 20.

In certain embodiments, a system 100 allows for any one or more of the following adjustments: spacing between sensors (perpendicular to the direction of inspection motion, and/or axially along the direction of the inspection motion); adjustments of an angle of the sensor to an outer diameter of a tube or pipe; momentary or longer term displacement to traverse obstacles; provision of an arbitrary number and positioning of sensors; etc.

An example inspection robot 100 may utilize downforce capabilities for sensor sleds 1, such as to control proximity and lateral stabilization of sensors. For instance, an embedded magnet (not shown) positioned within the sled 1 may provide passive downforce that increases stabilization for sensor alignment. In another example, the embedded magnet may be an electromagnet providing active capability (e.g., responsive to commands from a controller 802—reference FIG. 8) that provide adjustable or dynamic control of the downforce provided to the sensor sled. In another example, magnetic downforce may be provided through a combination of a passive permanent magnet and an active electromagnet, providing a default minimum magnetic downforce, but with further increases available through the active electromagnet. In embodiments, the electromagnet may be controlled by a circuit where the downforce is set by the operator, controlled by an on-board processor, controlled by a remote processor (e.g., through wireless communications), and the like, where processor control may utilize sensor data measurements to determine the downforce setting. In embodiments, downforce may be provided through suction force, spring force, and the like. In certain embodiments, downforce may be provided by a biasing member, such as a torsion spring or leaf spring, with active or passive control of the downforce—for example positioning a tension or confinement of the spring to control the downforce. In certain embodiments, the magnet, biasing member, or other downforce adjusting member may adjust the downforce on the entire sled 1, on an entire payload 2, and/or just on the sensor (e.g., the sensor has some flexibility to move within the sled 1, and the downforce adjustment acts on the sensor directly).

An example system 100 includes an apparatus 800 (reference FIG. 8 and the disclosure referencing FIG. 8) for providing enhanced inspection information, including position-based information. The apparatus 800 and operations to provide the position-based information are described in the context of a particular physical arrangement of an industrial system for convenient illustration, however any physical arrangement of an industrial system is contemplated herein.

Figure 5:
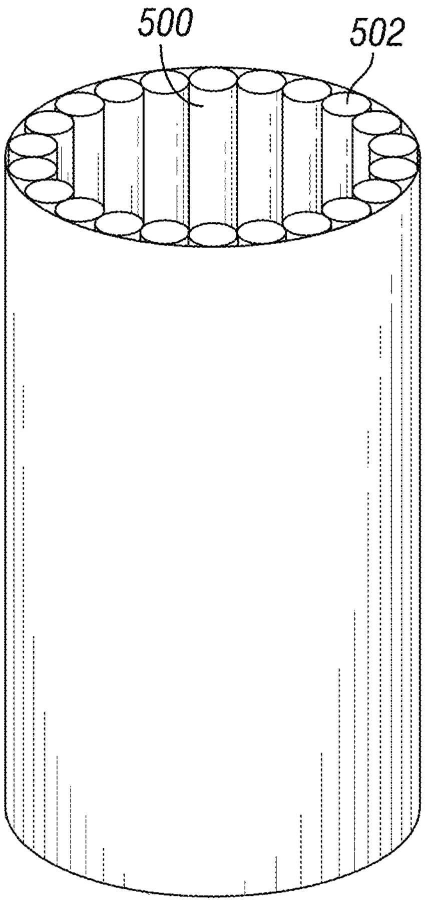
FIG. 5 is a schematic depiction of an inspection surface.

Referencing FIG. 5, an example system includes a number of pipes 502—for example vertically arranged pipes such as steam pipes in a power plant, pipes in a cooling tower, exhaust or effluent gas pipes, or the like. The pipes 502 in FIG. 5 are arranged to create a tower having a circular cross-section for ease of description. In certain embodiments, periodic inspection of the pipes is utilized to ensure that pipe degradation is within limits, to ensure proper operation of the system, to determine maintenance and repair schedules, and/or to comply with policies or regulations. In the example of FIG. 5, an inspection surface 500 includes the inner portion of the tower, whereby an inspection robot 100 traverses the pipes 502 (e.g., vertically, inspecting one or more pipes on each vertical run). An example inspection robot 100 includes configurable payloads 2, and may include ultra-sonic sensors (e.g., to determine wall thickness and/or pipe integrity), magnetic sensors (e.g., to determine the presence and/or thickness of a coating on a pipe), cameras (e.g., to provide for visual inspection, including in EM ranges outside of the visual range, temperatures, etc.), composition sensors (e.g., gas chromatography in the area near the pipe, spectral sensing to detect leaks or anomalous operation, etc.), temperature sensing, pressure sensing (ambient and/or specific pressures), vibration sensing, density sensing, etc. The type of sensing performed by the inspection robot 100 is not limiting to the present disclosure except where specific features are described in relation to specific sensing challenges and opportunities for those sensed parameters as will be understood to one of skill in the art having the benefit of the disclosures herein.

Figure 6:
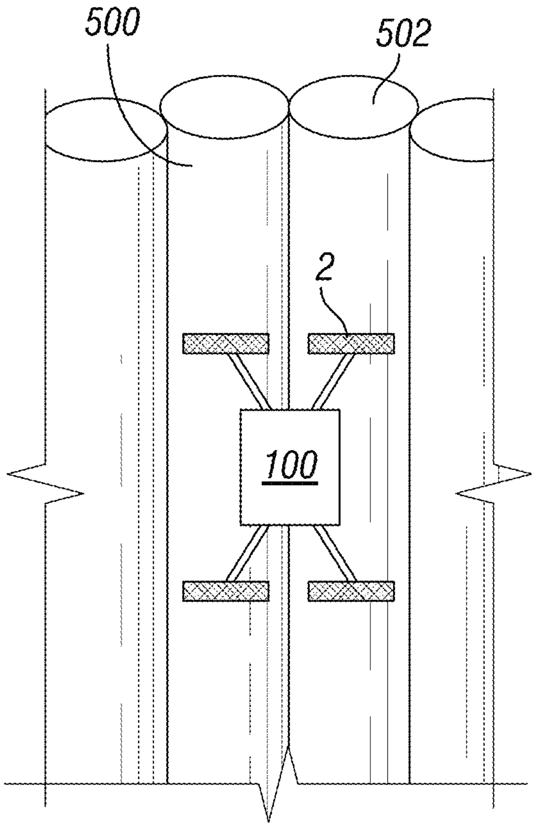
FIG. 6 is a schematic depiction of an inspection robot positioned on an inspection surface.

In certain embodiments, the inspection robot 100 has alternatively or additionally, payload(s) 2 configured to provide for marking of aspects of the inspection surface 500 (e.g., a paint sprayer, an invisible or UV ink sprayer, and/or a virtual marking device configured to mark the inspection surface 500 in a memory location of a computing device but not physically), to repair a portion of the inspection surface 500 (e.g., apply a coating, provide a welding operation, apply a temperature treatment, install a patch, etc.), and/or to provide for a cleaning operation. Referencing FIG. 6, an example inspection robot 100 is depicted in position on the inspection surface 500 at a location. In the example, the inspection robot 100 traverses vertically and is positioned between two pipes 502, with payloads 2 configured to clean, sense, treat, and/or mark two adjacent pipes 502 in a single inspection run. The inspection robot 100 in the example includes two payloads 2 at the "front" (ahead of the robot housing in the movement direction) and two payloads 2 at the "rear" (behind the robot housing in the movement direction). The inspection robot 100 may include any arrangement of payloads 2, including just one or more payloads in front or behind, just one or more payloads off to either or both sides, and combinations of these. Additionally or alternatively, the inspection robot 100 may be positioned on a single pipe, and/or may traverse between positions during an inspection operation, for example to inspect selected areas of the inspection surface 500 and/or to traverse obstacles which may be present.

In certain embodiments, a "front" payload 2 includes sensors configured to determine properties of the inspection surface, and a "rear" payload 2 includes a responsive payload, such as an enhanced sensor, a cleaning device such as a sprayer, scrubber, and/or scraper, a marking device, and/or a repair device. The front-back arrangement of payloads 2 provides for adjustments, cleaning, repair, and/or marking of the inspection surface 500 in a single run—for example where an anomaly, gouge, weld line, area for repair, previously repaired area, past inspection area, etc., is sensed by the front payload 2, the anomaly can be marked, cleaned, repaired, etc. without requiring an additional run of the inspection robot 100 or a later visit by repair personnel. In another example, a first calibration of sensors for the front payload may be determined to be incorrect (e.g., a front ultra-sonic sensor calibrated for a particular coating thickness present on the pipes 502) and a rear sensor can include an adjusted calibration to account for the detected aspect (e.g., the rear sensor calibrated for the observed thickness of the coating). In another example, certain enhanced sensing operations may be expensive, time consuming, consume more resources (e.g., a gamma ray source, an alternate coupling such as a non-water or oil-based acoustic coupler, require a high energy usage, require greater processing resources, and/or incur usage charges to an inspection client for any reason) and the inspection robot 100 can thereby only utilize the enhanced sensing operations selectively and in response to observed conditions.

Figure 7:
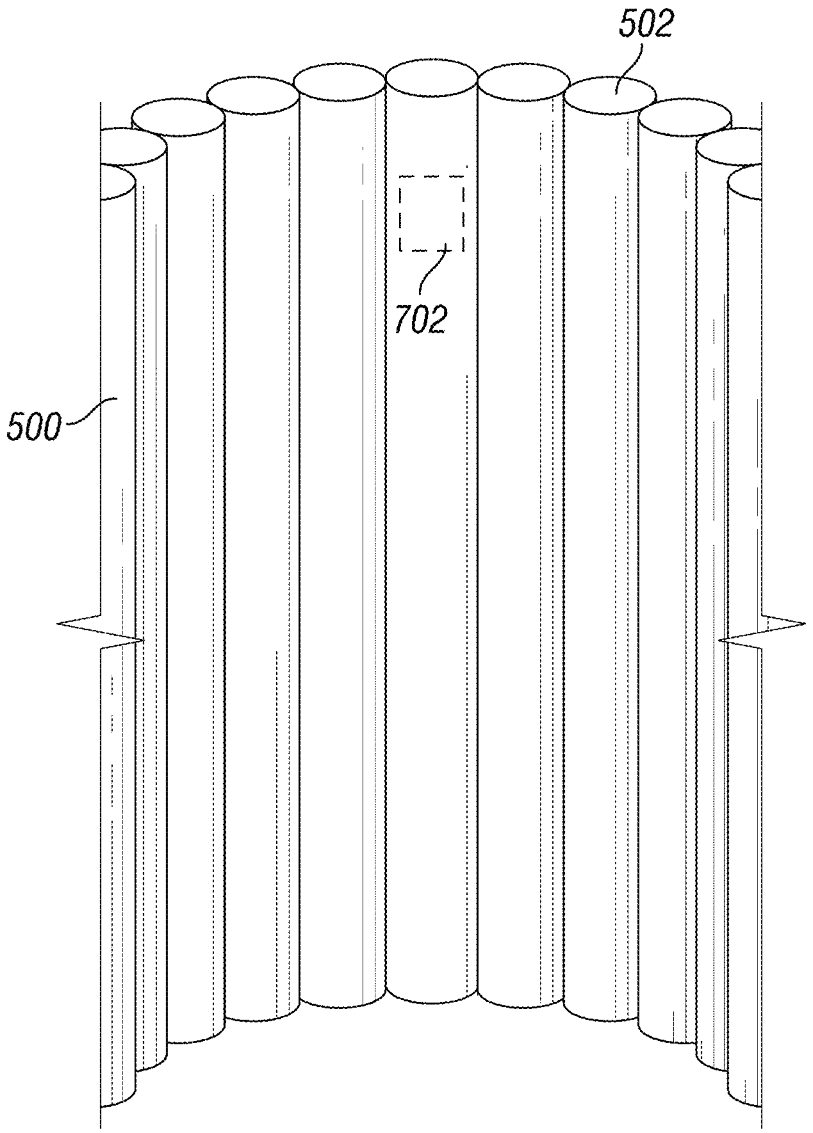
FIG. 7 is a schematic depiction of a location on an inspection surface.

Referencing FIG. 7, a location 702 on the inspection surface 500 is identified for illustration. In certain embodiments, the inspection robot 100 and/or apparatus 800 includes a controller 802 having a number of circuits structured to functionally execute operations of the controller 802. The controller 802 may be a single device (e.g., a computing device present on the robot 100, a computing device in communication with the robot 100 during operations and/or post-processing information communicated after inspection operations, etc.) and/or a combination of devices, such as a portion of the controller 802 positioned on the robot 100, a portion of the controller 802 positioned on a computing device in communication with the robot 100, a portion of the controller 802 positioned on a handheld device (not shown) of an inspection operator, and/or a portion of the controller 802 positioned on a computing device networked with one or more of the preceding devices. Additionally or alternatively, aspects of the controller 802 may be included on one or more logic circuits, embedded controllers, hardware configured to perform certain aspects of the controller 802 operations, one or more sensors, actuators, network communication infrastructure (including wired connections, wireless connections, routers, switches, hubs, transmitters, and/or receivers), and/or a tether between the robot 100 and another computing device. The described aspects of the example controller 802 are non-limiting examples, and any configuration of the robot 100 and devices in communication with the robot 100 to perform all or selected ones of operations of the controller 802 are contemplated herein as aspects of an example controller 802.

An example controller 802 includes an inspection data circuit 804 that interprets inspection data 812—for example sensed information from sensors mounted on the payload and determining aspects of the inspection surface 500, the status, deployment, and/or control of marking devices, cleaning devices, and/or repair devices, and/or post-processed information from any of these such as a wall thickness determined from ultra-sonic data, temperature information determined from imaging data, and the like. The example controller 802 further includes a robot positioning circuit 806 that interprets position data 814. An example robot positioning circuit 806 determines position data by any available method, including at least triangulating (or other positioning methods) from a number of available wireless devices (e.g., routers available in the area of the inspection surface 500, intentionally positioned transmitters/transceivers, etc.), a distance of travel measurement (e.g., a wheel rotation counter which may be mechanical, electro-magnetic, visual, etc.; a barometric pressure measurement; direct visual determinations such as radar, Lidar, or the like), a reference measurement (e.g., determined from distance to one or more reference points); a time-based measurement (e.g., based upon time and travel speed); and/or a dead reckoning measurement such as integration of detection movements. In the example of FIG. 5, a position measurement may include a height determination combined with an azimuthal angle measurement and/or a pipe number value such that the inspection surface 500 location is defined thereby. Any coordinate system and/or position description system is contemplated herein. In certain embodiments, the controller 802 includes a processed data circuit 808 that combines the inspection data 812 with the position data 814 to determine position-based inspection data. The operations of the processed data circuit 808 may be performed at any time—for example during operations of the inspection robot 100 such that inspection data 812 is stored with position data 814, during a post-processing operation which may be completed separately from the inspection robot 100, and/or which may be performed after the inspection is completed, and/or which may be commenced while the inspection is being performed. In certain embodiments, the linking of the position data 814 with the inspection data 812 may be performed if the linked position-inspection data is requested—for example upon a request by a client for an inspection map 818. In certain embodiments, portions of the inspection data 812 are linked to the position data 814 at a first time, and other portions of the inspection data 812 are linked to the position data 814 at a later time and/or in response to post-processing operations, an inspection map 818 request, or other subsequent event.

The example controller 802 further includes an inspection visualization circuit 810 that determines the inspection map 818 in response to the inspection data 812 and the position data 814, for example using post-processed information from the processed data circuit 808. In a further example, the inspection visualization circuit 810 determines the inspection map 818 in response to an inspection visualization request 820, for example from a client computing device 826. In the example, the client computing device 826 may be communicatively coupled to the controller 802 over the internet, a network, through the operations of a web application, and the like. In certain embodiments, the client computing device 826 securely logs in to control access to the inspection map 818, and the inspection visualization circuit 810 may prevent access to the inspection map 818, and/or provide only portions of the inspection map 818, depending upon the successful login from the client computing device 826, the authorizations for a given user of the client computing device 826, and the like.

In certain embodiments, the inspection visualization circuit 810 and/or inspection data circuit 804 further accesses system data 816, such as a time of the inspection, a calendar date of the inspection, the robot 100 utilized during the inspection and/or the configurations of the robot 100, a software version utilized during the inspection, calibration and/or sensor processing options selected during the inspection, and/or any other data that may be of interest in characterizing the inspection, that may be requested by a client, that may be required by a policy and/or regulation, and/or that may be utilized for improvement to subsequent inspections on the same inspection surface 500 or another inspection surface. In certain embodiments, the processed data circuit 808 combines the system data 816 with the processed data for the inspection data 812 and/or the position data 814, and/or the inspection visualization circuit incorporates the system data 816 or portions thereof into the inspection map 818. In certain embodiments, any or all aspects of the inspection data 812, position data 814, and/or system data 816 may be stored as meta-data (e.g., not typically available for display), may be accessible in response to prompts, further selections, and/or requests from the client computing device 826, and/or may be utilized in certain operations with certain identifiable aspects removed (e.g., to remove personally identifiable information or confidential aspects) such as post-processing to improve future inspection operations, reporting for marketing or other purposes, or the like.

In certain embodiments, the inspection visualization circuit 810 is further responsive to a user focus value 822 to update the inspection map 818 and/or to provide further information (e.g., focus data 824) to a user, such as a user of the client computing device 826. For example, a user focus value 822 (e.g., a user mouse position, menu selection, touch screen indication, keystroke, or other user input value indicating that a portion of the inspection map 818 has received the user focus) indicates that a location 702 of the inspection map 818 has the user focus, and the inspection visualization circuit 810 generates the focus data 824 in response to the user focus value 822, including potentially the location 702 indicated by the user focus value 822.

Figure 9:
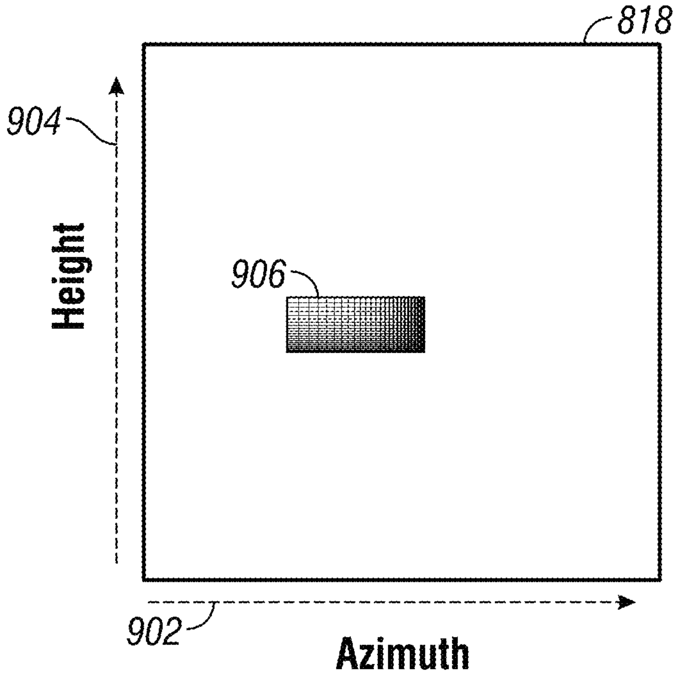
FIG. 9 depicts an illustrative inspection map.

Referencing FIG. 9, an example inspection map 818 is depicted. In the example, the inspection surface 500 may be similar to that depicted in FIG. 5—for example the interior surface of tower formed by a number of pipes to be inspected. The example inspection map 818 includes an azimuthal indication 902 and a height indication 904, with data from the inspection depicted on the inspection map 818 (e.g., shading at 906 indicating inspection data corresponding to that visual location). Example and non-limiting inspection maps 818 include numeric values depicted on the visualization, colors, shading or hatching, and/or any other visual depiction method. In certain embodiments, more than one inspection dimension may be visualized (e.g., temperatures and wall thickness), and/or the inspection dimension may be selected or changed by the user. Additionally or alternatively, physical elements such as obstacles, build up on the inspection surface, weld lines, gouges, repaired sections, photos of the location (e.g., the inspection map 818 laid out over a panoramic photograph of the inspection surface 500 with data corresponding to the physical location depicted), may be depicted with or as a part of the inspection map 818. Additionally or alternatively, visual markers may be positioned on the inspection map 818—for example, a red "X" (or any other symbol, including a color, bolded area, highlight, image data, a thumbnail, etc.) at a location of interest on the map—which marking may be physically present on the actual inspection surface 500 or only virtually depicted on the inspection map 818. It can be seen that the inspection map 818 provides for a convenient and powerful reference tool for a user to determine the results of the inspection operation and plan for future maintenance, repair, or inspections, as well as planning logistics in response to the number of aspects of the system requiring further work or analysis and the location of the aspects requiring further work or analysis. Accordingly, inspection results can be analyzed more quickly, regulatory or policy approvals and system up-time can be restored more quickly (if the system was shut-down for the inspection), configurations of an inspection robot 100 for a future inspection can be performed more quickly (e.g. preparing payload 2 configurations, obstacle management, and/or sensor selection or calibration), any of the foregoing can be performed with greater confidence that the results are reliable, and/or any combinations of the foregoing. Additionally or alternatively, less invasive operations can be performed, such as virtual marking which would not leave marks on the inspection surface 500 that might be removed (e.g., accidentally) before they are acted upon, which may remain after being acted upon, or which may create uncertainty as to when the marks were made over the course of multiple inspections and marking generations.

Figure 10:
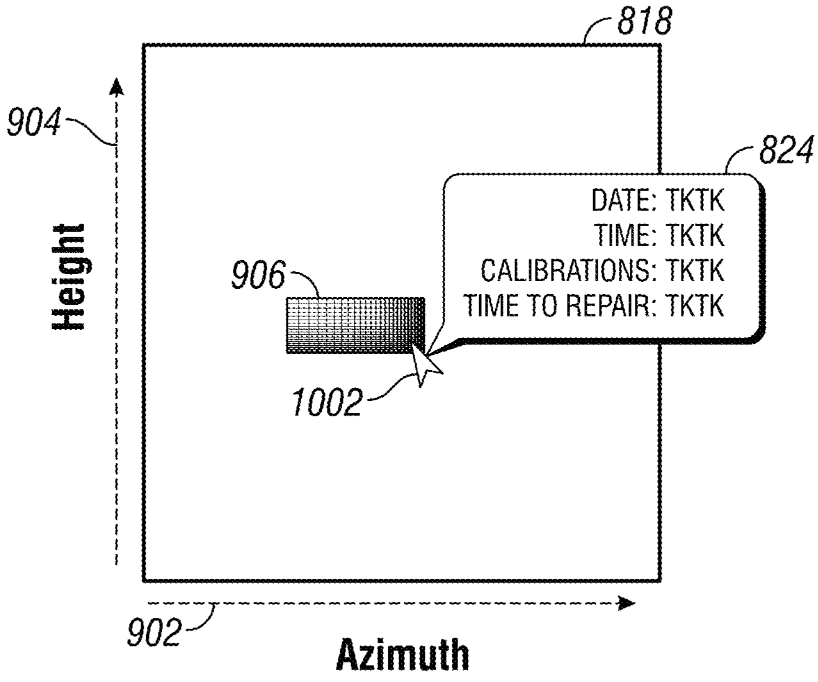
FIG. 10 depicts an illustrative inspection map and focus data.

Referencing FIG. 10, an illustrative example inspection map 818 having focus data 824 is depicted. The example inspection map 818 is responsive to a user focus value 822, such as a mouse cursor 1002 hovering over a portion of the inspection map 818. In the example, the focus data 824 comes up as a tooltip, although any depiction operations such as output to a file, populating a static window for focus data 824, or any other operations known in the art are contemplated herein. The example focus data 824 includes a date (e.g., of the inspection), a time (e.g., of the inspection), the sensor calibrations utilized for the inspection, and the time to repair (e.g., down-time that would be required, actual repair time that would be required, the estimated time until the portion of the inspection surface 500 will require a repair, or any other description of a "time to repair"). The depicted focus data 824 is a non-limiting example, and any other information of interest may be utilized as focus data 824. In certain embodiments, a user may select the information, or portions thereof, utilized on the inspection map 818—including at least the axes 902, 904 (e.g., units, type of information, relative versus absolute data, etc.) and the depicted data (e.g., units, values depicted, relative versus absolute values, thresholds or cutoffs of interest, processed values such as virtually determined parameters, and/or categorical values such as "PASSED" or "FAILED"). Additionally or alternatively, a user may select the information, or portions thereof, utilized as the focus data 824.

In certain embodiments, an inspection map 818 (or display) provides an indication of how long a section of the inspection surface 500 is expected to continue under nominal operations, how much material should be added to a section of the inspection surface 500 (e.g., a repair coating or other material), and/or the type of repair that is needed (e.g., wall thickness correction, replacement of a coating, fixing a hole, breach, rupture, etc.).

Figure 39:
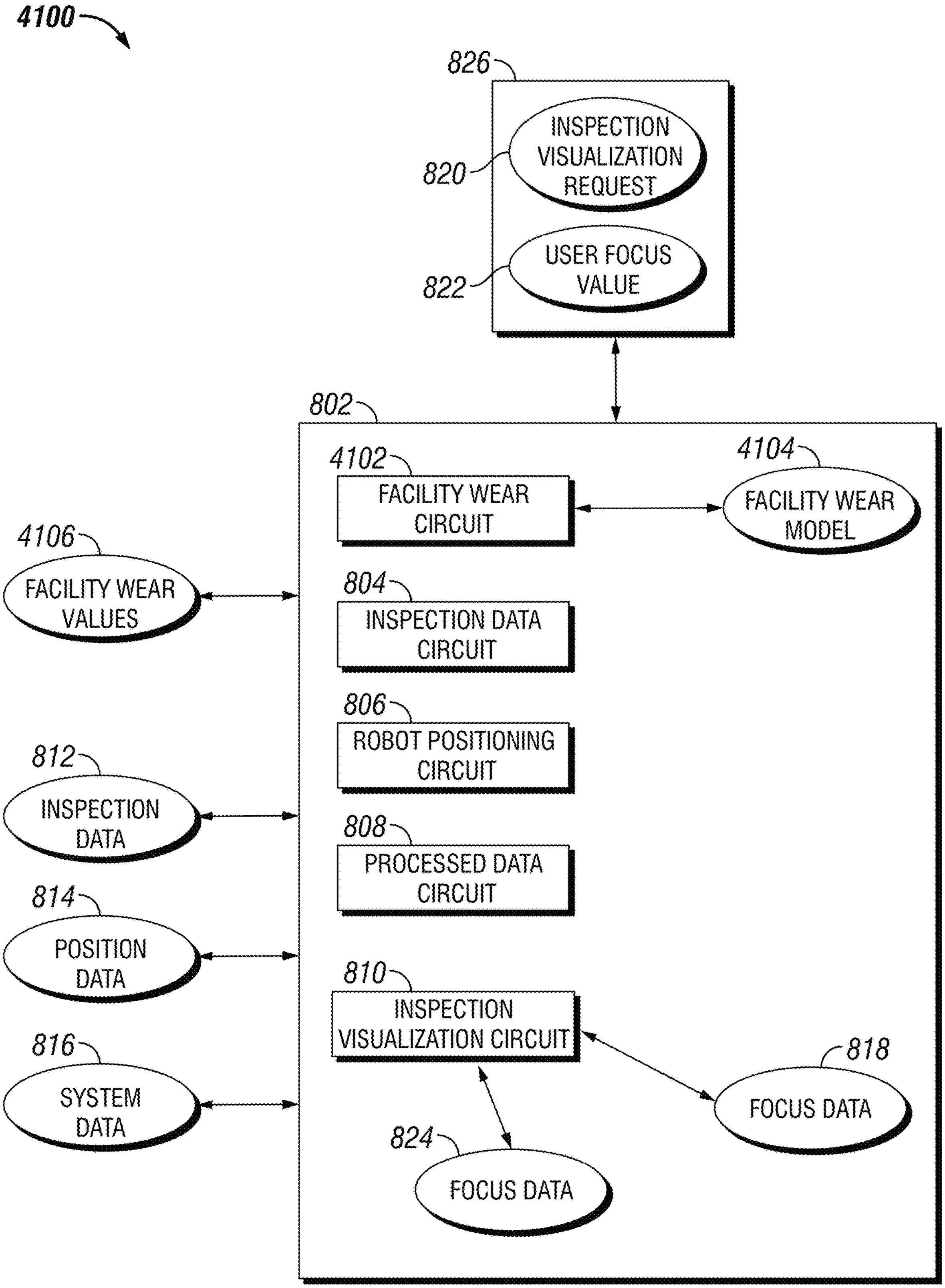
FIG. 39 is a schematic block diagram of an apparatus for providing a facility wear value.

Referencing FIG. 39, an apparatus 4100 for determining a facility wear value 4106 is depicted. The example apparatus 4100 includes a facility wear circuit 4102 that determines a facility wear model 4104 corresponding to the inspection surface 500 and/or an industrial facility, industrial system, and/or plant including the inspection surface 500. An example facility wear circuit 4102 accesses a facility wear model 4104, and utilizes the inspection data 812 to determine which portions of the inspection surface 500 will require repair, when they will require repair, what type of repair will be required, and a facility wear value 4106 including a description of how long the inspection surface 500 will last without repair, and/or with selected repairs. In certain embodiments, the facility wear model 4104 includes historical data for the particular facility, system, or plant having the inspection surface 500—for example through empirical observation of previous inspection data 812, when repairs were performed, what types of repairs were performed, and/or how long repaired sections lasted after repairs.

Additionally or alternatively, the facility wear model 4104 includes data from offset facilities, systems, or plants (e.g., a similar system that operates a similar duty cycle of relevant temperatures, materials, process flow streams, vibration environment, etc. for the inspection surface 500; and which may include inspection data, repair data, and/or operational data from the offset system), canonical data (e.g., pre-entered data based on estimates, modeling, industry standards, or other indirect sources), data from other facilities from the same data client (e.g., an operator, original equipment manufacturer, owner, etc. for the inspection surface), and/or user-entered data (e.g., from an inspection operator and/or client of the data) such as assumptions to be utilized, rates of return for financial parameters, policies or regulatory values, and/or characterizations of experience in similar systems that may be understood based on the experience of the user. Accordingly, operations of the facility wear circuit 4102 can provide an overview of repair operations recommended for the inspection surface 500, including specific time frame estimates of when such repairs will be required, as well as a number of options for repair operations and how long they will last.

In certain embodiments, the facility wear value 4106, and/or facility wear value 4106 displayed on an inspection map 818, allows for strategic planning of repair operations, and/or coordinating the life cycle of the facility including the inspection surface 500—for example performing a short-term repair at a given time, which might not be intuitively the "best" repair operation, but in view of a larger repair cycle that is upcoming for the facility. Additionally or alternatively, we facility wear value 4106 allows for a granular review of the inspection surface 500—for example to understand operational conditions that drive high wear, degradation, and/or failure conditions of aspects of the inspection surface 500. In certain embodiments, repair data and/or the facility wear value 4106 are provided in a context distinct from an inspection map 818—for example as part of an inspection report (not shown), as part of a financial output related to the system having the inspection surface (e.g., considering the costs and shutdown times implicated by repairs, and/or risks associated with foregoing a repair).

Figure 40:
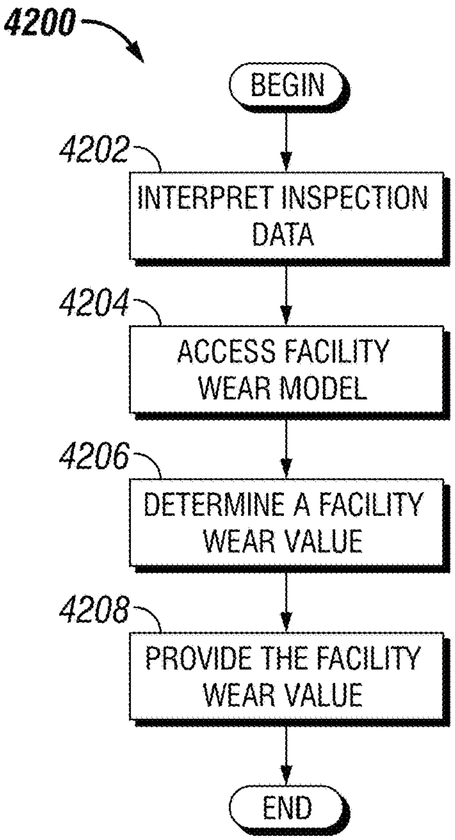
FIG. 40 is a schematic flow diagram of a procedure to provide a facility wear value.

Referencing FIG. 40, a procedure 4200 for determining a facility wear value is depicted schematically. An example procedure 4200 includes an operation 4202 to interpret inspection data for an inspection surface, and an operation 4204 to access a facility wear model. The example procedure 4200 further includes an operation 4206 to determine a facility wear value in response to the inspection data and the facility wear model. The example procedure 4200 further includes an operation 4208 to provide the facility wear value—for example as a portion of an inspection map, an inspection report, and/or a financial report for a facility having the inspection surface.

In embodiments, the robotic vehicle may incorporate a number of sensors distributed across a number of sensor sleds 1, such as with a single sensor mounted on a single sensor sled 1, a number of sensors mounted on a single sensor sled 1, a number of sensor sleds 1 arranged in a linear configuration perpendicular to the direction of motion (e.g., side-to-side across the robotic vehicle), arranged in a linear configuration along the direction of motion (e.g., multiple sensors on a sensor sled 1 or multiple sensor sleds 1 arranged to cover the same surface location one after the other as the robotic vehicle travels). Additionally or alternatively, a number of sensors may be arranged in a two-dimensional surface area, such as by providing sensor coverage in a distributed manner horizontally and/or vertically (e.g., in the direction of travel), including offset sensor positions (e.g., reference FIG. 14). In certain embodiments, the utilization of payloads 2 with sensor sleds mounted thereon enables rapid configuration of sensor placement as desired, sleds 1 on a given payload 2 can be further adjusted, and/or sensor(s) on a given sled can be changed or configured as desired.

In certain embodiments, two payloads 2 side-by-side allow for a wide horizontal coverage of sensing for a given travel of the inspection robot 100—for example as depicted in FIG. 1. In certain embodiments, a payload 2 is coupled to the inspection robot 100 with a pin or other quick-disconnect arrangement, allowing for the payload 2 to be removed, to be reconfigured separately from the inspection robot 100, and/or to be replaced with another payload 2 configured in a desired manner. The payload 2 may additionally have a couplant connection to the inspection robot 100 (e.g., reference FIG. 27—where a single couplant connection provides coupling connectivity to all sleds 1A and 1B) and/or an electrical connection to the inspection robot 100. Each sled may include a couplant connection conduit where the couplant connection conduit is coupled to a payload couplant connection at the upstream end and is coupled to the couplant entry of the cone at the downstream end. Multiple payload couplant connections on a single payload may be coupled together to form a single couplant connection between the payload and the inspection robot. The single couplant connection per payload facilitates the changing of the payload without having to connect/disconnect the couplant line connections at each sled. The couplant connection conduit between the payload couplant connection and the couplant entry of the cone facilitates connecting/disconnecting a sled from a payload without having to connect/disconnect the couplant connection conduit from the couplant entry of the cone. The couplant and/or electrical connections may include power for the sensors as required, and/or communication coupling (e.g., a datalink or network connection). Additionally or alternatively, sensors may communicate wirelessly to the inspection robot 100 or to another computing device, and/or sensors may store data in a memory associated with the sensor, sled 1, or payload 2, which may be downloaded at a later time. Any other connection type required for a payload 2, such as compressed air, paint, cleaning solutions, repair spray solutions, or the like, may similarly be coupled from the payload 2 to the inspection robot 100.

The horizontal configuration of sleds 1 (and sensors) is selectable to achieve the desired inspection coverage. For example, sleds 1 may be positioned to provide a sled running on each of a selected number of pipes of an inspection surface, positioned such that several sleds 1 combine on a single pipe of an inspection surface (e.g., providing greater radial inspection resolution for the pipe), and/or at selected horizontal distances from each other (e.g., to provide 1 inch resolution, 2 inch resolution, 3 inch resolution, etc.). In certain embodiments, the degrees of freedom of the sensor sleds 1 (e.g., from pivots 16, 17, 18) allow for distributed sleds 1 to maintain contact and orientation with complex surfaces.

In certain embodiments, sleds 1 are articulable to a desired horizontal position. For example, quick disconnects may be provided (pins, claims, set screws, etc.) that allow for the sliding of a sled 1 to any desired location on a payload 2, allowing for any desired horizontal positioning of the sleds 1 on the payload 2. Additionally or alternatively, sleds 1 may be movable horizontally during inspection operations. For example, a worm gear or other actuator may be coupled to the sled 1 and operable (e.g., by a controller 802) to position the sled 1 at a desired horizontal location. In certain embodiments, only certain ones of the sleds 1 are moveable during inspection operations—for example outer sleds 1 for maneuvering past obstacles. In certain embodiments, all of the sleds 1 are moveable during inspection operations—for example to support arbitrary inspection resolution (e.g., horizontal resolution, and/or vertical resolution), to configure the inspection trajectory of the inspection surface, or for any other reason. In certain embodiments, the payload 2 is horizontally moveable before or during inspection operations. In certain embodiments, an operator configures the payload 2 and/or sled 1 horizontal positions before inspection operations (e.g., before or between inspection runs). In certain embodiments, an operator, or a controller 802 configures the payload 2 and/or sled 1 horizontal positions during inspection operations. In certain embodiments, an operator can configure the payload 2 and/or sled 1 horizontal positions remotely, for example communicating through a tether or wirelessly to the inspection robot.

The vertical configuration of sleds 1 is selectable to achieve the desired inspection coverage (e.g., horizontal resolution, vertical resolution, and/or redundancy). For example, referencing FIG. 11, multiple payloads 2 are positioned on a front side of the inspection robot 100, with forward payloads 2006 and rear payloads 1402. In certain embodiments, a payload 2 may include a forward payload 2006 and a rear payload 1402 in a single hardware device (e.g., with a single mounting position to the inspection robot 100), and/or may be independent payloads 2 (e.g., with a bracket extending from the inspection robot 100 past the rear payload 1402 for mounting the forward payloads 2006). In the example of FIG. 11, the rear payload 1402 and forward payload 2006 include sleds 1 mounted thereupon which are in vertical alignment 1302—for example a given sled 1 of the rear payload 1402 traverses the same inspection position (or horizontal lane) of a corresponding sled 1 of the forward payload 2006. The utilization of aligned payloads 2 provides for a number of capabilities for the inspection robot 100, including at least: redundancy of sensing values (e.g., to develop higher confidence in a sensed value); the utilization of more than one sensing calibration for the sensors (e.g., a front sensor utilizes a first calibration set, and a rear sensor utilizes a second calibration set); the adjustment of sensing operations for a rear sensor relative to a forward sensor (e.g., based on the front sensed parameter, a rear sensor can operate at an adjusted range, resolution, sampling rate, or calibration); the utilization of a rear sensor in response to a front sensor detected value (e.g., a rear sensor may be a high cost sensor—either high power, high computing/processing requirements, an expensive sensor to operate, etc.) where the utilization of the rear sensor can be conserved until a front sensor indicates that a value of interest is detected; the operation of a repair, marking, cleaning, or other capability rear payload 1402 that is responsive to the detected values of the forward payload 2006; and/or for improved vertical resolution of the sensed values (e.g., if the sensor has a given resolution of detection in the vertical direction, the front and rear payloads can be operated out of phase to provide for improved vertical resolution).

In another example, referencing FIG. 12, multiple payloads 2 are positioned on the front of the inspection robot 100, with sleds 1 mounted on the forward payload 2006 and rear payload 1402 that are not aligned (e.g., lane 1304 is not shared between sleds of the forward payload 2006 and rear payload 1402). The utilization of not aligned payloads 2 allows for improved resolution in the horizontal direction for a given number of sleds 1 mounted on each payload 2. In certain embodiments, not aligned payloads may be utilized where the hardware space on a payload 2 is not sufficient to conveniently provide a sufficient number or spacing of sleds 1 to achieve the desired horizontal coverage. In certain embodiments, not aligned payloads may be utilized to limit the number of sleds 1 on a given payload 2, for example to provide for a reduced flow rate of couplant through a given payload-inspection robot connection, to provide for a reduced load on an electrical coupling (e.g., power supply and/or network communication load) between a given payload and the inspection robot. While the examples of FIGS. 11 and 12 depict aligned or not aligned sleds for convenience of illustration, a given inspection robot 100 may be configured with both aligned and not aligned sleds 1, for example to reduce mechanical loads, improve inspection robot balance, in response to inspection surface constraints, or the like.

It can be seen that sensors may be modularly configured on the robotic vehicle to collect data on specific locations across the surface of travel (e.g., on a top surface of an object, on the side of an object, between objects, and the like), repeat collection of data on the same surface location (e.g., two sensors serially collecting data from the same location, either with the same sensor type or different sensor types), provide predictive sensing from a first sensor to determine if a second sensor should take data on the same location at a second time during a single run of the robotic vehicle (e.g., an ultra-sonic sensor mounted on a leading sensor sled taking data on a location determines that a gamma-ray measurement should be taken for the same location by a sensor mounted on a trailing sensor sled configured to travel over the same location as the leading sensor), provide redundant sensor measurements from a plurality of sensors located in leading and trailing locations (e.g., located on the same or different sensor sleds to repeat sensor data collection), and the like.

In certain embodiments, the robotic vehicle includes sensor sleds with one sensor and sensor sleds with a plurality of sensors. A number of sensors arranged on a single sensor sled may be arranged with the same sensor type across the direction of robotic vehicle travel (e.g., perpendicular to the direction of travel, or "horizontal") to increase coverage of that sensor type (e.g., to cover different surfaces of an object, such as two sides of a pipe), arranged with the same sensor type along the direction of robotic vehicle travel (e.g., parallel to the direction of travel, or "vertical") to provide redundant coverage of that sensor type over the same location (e.g., to ensure data coverage, to enable statistical analysis based on multiple measurements over the same location), arranged with a different sensor type across the direction of robotic vehicle travel to capture a diversity of sensor data in side-by-side locations along the direction of robotic vehicle travel (e.g., providing both ultra-sonic and conductivity measurements at side-by-side locations), arranged with a different sensor type along the direction of robotic vehicle travel to provide predictive sensing from a leading sensor to a trailing sensor (e.g., running a trailing gamma-ray sensor measurement only if a leading ultra-sonic sensor measurement indicates the need to do so), combinations of any of these, and the like. The modularity of the robotic vehicle may permit exchanging sensor sleds with the same sensor configuration (e.g., replacement due to wear or failure), different sensor configurations (e.g., adapting the sensor arrangement for different surface applications), and the like.

Providing for multiple simultaneous sensor measurements over a surface area, whether for taking data from the same sensor type or from different sensor types, provides the ability to maximize the collection of sensor data in a single run of the robotic vehicle. If the surface over which the robotic vehicle was moving were perfectly flat, the sensor sled could cover a substantial surface with an array of sensors. However, the surface over which the robotic vehicle travels may be highly irregular, and have obstacles over which the sensor sleds must adjust, and so the preferred embodiment for the sensor sled is relatively small with a highly flexible orientation, as described herein, where a plurality of sensor sleds is arranged to cover an area along the direction of robotic vehicle travel. Sensors may be distributed amongst the sensor sleds as described for individual sensor sleds (e.g., single sensor per sensor sled, multiple sensors per sensor sled (arranged as described herein)), where total coverage is achieved through a plurality of sensor sleds mounted to the robotic vehicle. One such embodiment, as introduced herein, such as depicted in FIG. 1, comprises a plurality of sensor sleds arranged linearly across the direction of robotic vehicle travel, where the plurality of sensor sleds is capable of individually adjusting to the irregular surface as the robotic vehicle travels. Further, each sensor sled may be positioned to accommodate regular characteristics in the surface (e.g., positioning sensor sleds to ride along a selected portion of a pipe aligned along the direction of travel), to provide for multiple detections of a pipe or tube from a number of radial positions, sensor sleds may be shaped to accommodate the shape of regular characteristics in the surface (e.g., rounded surface of a pipe), and the like. In this way, the sensor sled arrangement may accommodate both the regular characteristics in the surface (e.g., a series of features along the direction of travel) and irregular characteristics along the surface (e.g., obstacles that the sensor sleds flexibly mitigate during travel along the surface).

Although FIG. 1 depicts a linear arrangement of sensor sleds with the same extension (e.g., the same connector arm length), another example arrangement may include sensor sleds with different extensions, such as where some sensor sleds are arranged to be positioned further out, mounted on longer connection arms. This arrangement may have the advantage of allowing a greater density of sensors across the configuration, such as where a more leading sensor sled could be positioned linearly along the configuration between two more trailing sensor sleds such that sensors are provided greater linear coverage than would be possible with all the sensor sleds positioned side-by-side. This configuration may also allow improved mechanical accommodation between the springs and connectors that may be associated with connections of sensor sleds to the arms and connection assembly (e.g., allowing greater individual movement of sensor sleds without the sensor sleds making physical contact with one another).

Figure 13:
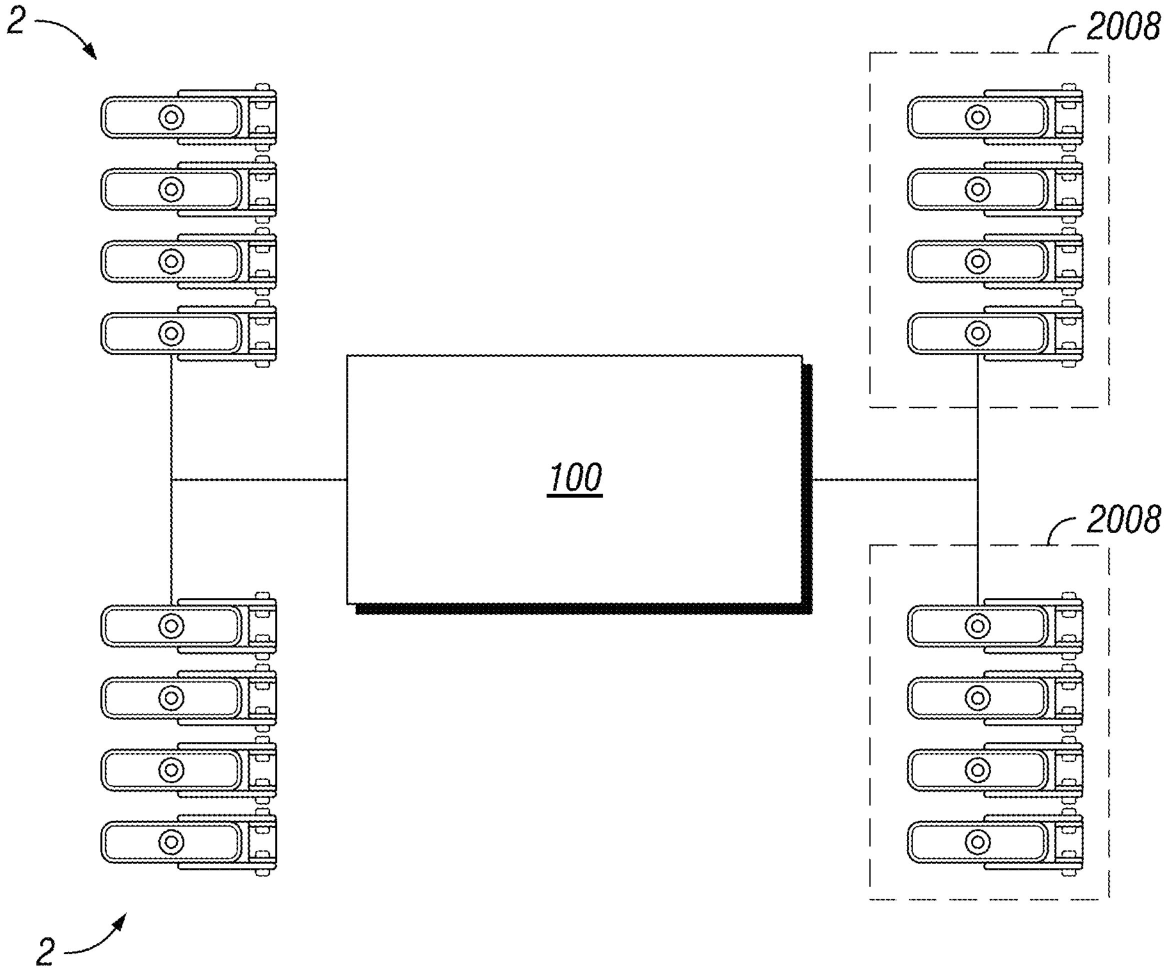
FIG. 13 is another schematic diagram of a payload arrangement.

Referring to FIG. 11, an example configuration of sensor sleds includes the forward payload 2006 ahead of the rear payload, each payload includes a sled array, such as where each utilizes a sensor sled connector assembly for mounting the payloads. Again, although FIG. 11 depicts the sensor sleds arranged on the sensor sled connector assembly with equal length arms, different length arms may be utilized to position, for instance, sensor sleds of sensor sled array of the rear payload 1402 in intermediate positions between other rear sensor sleds of rear payload 1402 and forward sensor sleds of the forward payload 2006. As was the case with the arrangement of a plurality of sensors on a single sensor sled to accommodate different coverage options (e.g., maximizing coverage, predictive capabilities, redundancy, and the like), the extended area configuration of sensors in this multiple sensor sled array arrangement allows similar functionality. For instance, a sensor sled positioned in a lateral position on the forward payload 2006 may provide redundant or predictive functionality for another sensor sled positioned in the same lateral position on the rear payload 1402. In the case of a predictive functionality, the greater travel distance afforded by the separation between a sensor sled mounted on a second sensor sled array of the forward payload 2006 and a sensor sled array of the rear payload 1402 may provide for additional processing time for determining, for instance, whether the sensor in the trailing sensor sled should be activated. For example, the leading sensor collects sensor data and sends that data to a processing function (e.g., wired communication to on-board or external processing, wireless communication to external processing), the processor takes a period of time to determine if the trailing sensor should be activated, and after the determination is made, activates the trailing sensor. The separation of the two sensors, divided by the rate of travel of the robotic vehicle, determines the time available for processing. The greater the distance, the greater the processing time allowed. Referring to FIG. 13, in another example, distance is increased further by utilizing a trailing payload 2008, thus increasing the distance and processing time further. Additionally or alternatively, the hardware arrangement of FIG. 13 may provide for more convenient integration of the trailing payload 2008 rather than having multiple payloads 1402, 2006 in front of the inspection robot 100. In certain embodiments, certain operations of a payload 2 may be easier or more desirable to perform on a trailing side of the inspection robot 100—such as spraying of painting, marking, or repair fluids, to avoid the inspection robot 100 having to be exposed to such fluids as a remaining mist, by gravity flow, and/or having to drive through the painted, cleaned, or repaired area. In certain embodiments, an inspection robot 100 may additionally or alternatively include both multiple payloads 1402, 2006 in front of the inspection robot (e.g., as depicted in FIGS. 11 and 12) and/or one or more trailing payloads (e.g., as depicted in FIG. 13).

In another example, the trailing payload 2008 (e.g. a sensor sled array) may provide a greater distance for functions that would benefit the system by being isolated from the sensors in the forward end of the robotic vehicle. For instance, the robotic vehicle may provide for a marking device (e.g., visible marker, UV marker, and the like) to mark the surface when a condition alert is detected (e.g., detecting corrosion or erosion in a pipe at a level exceeding a predefined threshold, and marking the pipe with visible paint).

Embodiments with multiple sensor sled connector assemblies provide configurations and area distribution of sensors that may enable greater flexibility in sensor data taking and processing, including alignment of same-type sensor sleds allowing for repeated measurements (e.g., the same sensor used in a leading sensor sled as in a trailing sensor sled, such as for redundancy or verification in data taking when leading and trailing sleds are co-aligned), alignment of different-type sensor sleds for multiple different sensor measurements of the same path (e.g., increase the number of sensor types taking data, have the lead sensor provide data to the processor to determine whether to activate the trailing sensor (e.g., ultra-sonic/gamma-ray, and the like)), off-set alignment of same-type sensor sleds for increased coverage when leading and trailing sleds are off-set from one another with respect to travel path, off-set alignment of different-type sensor sleds for trailing sensor sleds to measure surfaces that have not been disturbed by leading sensor sleds (e.g., when the leading sensor sled is using a couplant), and the like.

The modular design of the robotic vehicle may provide for a system flexible to different applications and surfaces (e.g., customizing the robot and modules of the robot ahead of time based on the application, and/or during an inspection operation), and to changing operational conditions (e.g., flexibility to changes in surface configurations and conditions, replacement for failures, reconfiguration based on sensed conditions), such as being able to change out sensors, sleds, assemblies of sleds, number of sled arrays, and the like.

An example inspection robot utilizes a magnet-based wheel design (e.g., reference FIGS. 2A-2B and the related description). Although the inspection robot may utilize flux directing ferromagnetic wheel components, such as ferromagnetic magnet enclosures 3 to minimize the strength of the extended magnetic field, ferromagnetic components within the inspection robot may be exposed to a magnetic field. One component that may experience negative effects from the magnetic field is the gearbox, which may be mounted proximate to the wheel assembly.

Throughout the present description, certain orientation parameters are described as "horizontal," "perpendicular," and/or "across" the direction of travel of the inspection robot, and/or described as "vertical," "parallel," and/or in line with the direction of travel of the inspection robot. It is specifically contemplated herein that the inspection robot may be travelling vertically, horizontally, at oblique angles, and/or on curves relative to a ground-based absolute coordinate system. Accordingly, except where the context otherwise requires, any reference to the direction of travel of the inspection robot is understood to include any orientation of the robot—such as an inspection robot traveling horizontally on a floor may have a "vertical" direction for purposes of understanding sled distribution that is in a "horizontal" absolute direction. Additionally, the "vertical" direction of the inspection robot may be a function of time during inspection operations and/or position on an inspection surface—for example as an inspection robot traverses over a curved surface. In certain embodiments, where gravitational considerations or other context based aspects may indicate—vertical indicates an absolute coordinate system vertical—for example in certain embodiments where couplant flow into a cone is utilized to manage bubble formation in the cone. In certain embodiments, a trajectory through the inspection surface of a given sled may be referenced as a "horizontal inspection lane"—for example, the track that the sled takes traversing through the inspection surface.

Certain embodiments include an apparatus for acoustic inspection of an inspection surface with arbitrary resolution. Arbitrary resolution, as utilized herein, includes resolution of features in geometric space with a selected resolution—for example resolution of features (e.g., cracks, wall thickness, anomalies, etc.) at a selected spacing in horizontal space (e.g., perpendicular to a travel direction of an inspection robot) and/or vertical space (e.g., in a travel direction of an inspection robot). While resolution is described in terms of the travel motion of an inspection robot, resolution may instead be considered in any coordinate system, such as cylindrical or spherical coordinates, and/or along axes unrelated to the motion of an inspection robot. It will be understood that the configurations of an inspection robot and operations described in the present disclosure can support arbitrary resolution in any coordinate system, with the inspection robot providing sufficient resolution as operated, in view of the target coordinate system. Accordingly, for example, where inspection resolution of 6-inches is desired in a target coordinate system that is diagonal to the travel direction of the inspection robot, the inspection robot and related operations described throughout the present disclosure can support whatever resolution is required (whether greater than 6-inches, less than 6-inches, or variable resolution depending upon the location over the inspection surface) to facilitate the 6-inch resolution of the target coordinate system. It can be seen that an inspection robot and/or related operations capable of achieving an arbitrary resolution in the coordinates of the movement of the inspection robot can likewise achieve arbitrary resolution in any coordinate system for the mapping of the inspection surface. For clarity of description, apparatus, and operations to support an arbitrary resolution are described in view of the coordinate system of the movement of an inspection robot.

An example apparatus to support acoustic inspection of an inspection surface includes an inspection robot having a payload and a number of sleds mounted thereon, with the sleds each having at least one acoustic sensor mounted thereon. Accordingly, the inspection robot is capable of simultaneously determining acoustic parameters at a range of positions horizontally. Sleds may be positioned horizontally at a selected spacing, including providing a number of sleds to provide sensors positioned radially around several positions on a pipe or other surface feature of the inspection surface. In certain embodiments, vertical resolution is supported according to the sampling rate of the sensors, and/or the movement speed of the inspection robot. Additionally or alternatively, the inspection robot may have vertically displaced payloads, having an additional number of sleds mounted thereon, with the sleds each having at least one acoustic sensor mounted thereon. The utilization of additional vertically displaced payloads can provide additional resolution, either in the horizontal direction (e.g., where sleds of the vertically displaced payload(s) are offset from sleds in the first payload(s)) and/or in the vertical direction (e.g., where sensors on sleds of the vertically displaced payload(s) are sampling such that sensed parameters are vertically offset from sensors on sleds of the first payload(s)). Accordingly, it can be seen that, even where physical limitations of sled spacing, numbers of sensors supported by a given payload, or other considerations limit horizontal resolution for a given payload, horizontal resolution can be enhanced through the utilization of additional vertically displaced payloads. In certain embodiments, an inspection robot can perform another inspection run over a same area of the inspection surface, for example with sleds tracking in an offset line from a first run, with positioning information to ensure that both horizontal and/or vertical sensed parameters are offset from the first run.

Accordingly, an apparatus is provided that achieves significant resolution improvements, horizontally and/or vertically, over previously known systems. Additionally or alternatively, an inspection robot performs inspection operations at distinct locations on a descent operation than on an ascent operation, providing for additional resolution improvements without increasing a number of run operations required to perform the inspection (e.g., where an inspection robot ascends an inspection surface, and descends the inspection surface as a normal part of completing the inspection run). In certain embodiments, an apparatus is configured to perform multiple run operations to achieve the selected resolution. It can be seen that the greater the number of inspection runs required to achieve a given spatial resolution, the longer the down time for the system (e.g., an industrial system) being inspected (where a shutdown of the system is required to perform the inspection), the longer the operating time and greater the cost of the inspection, and/or the greater chance that a failure occurs during the inspection. Accordingly, even where multiple inspection runs are required, a reduction in the number of the inspection runs is beneficial.

In certain embodiments, an inspection robot includes a low fluid loss couplant system, enhancing the number of sensors that are supportable in a given inspection run, thereby enhancing available sensing resolution. In certain embodiments, an inspection robot includes individual down force support for sleds and/or sensors, providing for reduced fluid loss, reduced off-nominal sensing operations, and/or increasing the available number of sensors supportable on a payload, thereby enhancing available sensing resolution. In certain embodiments, an inspection robot includes a single couplant connection for a payload, and/or a single couplant connection for the inspection robot, thereby enhancing reliability and providing for a greater number of sensors on a payload and/or on the inspection robot that are available for inspections under commercially reasonable operations (e.g., configurable for inspection operations with reasonable reliability, checking for leaks, expected to operate without problems over the course of inspection operations, and/or do not require a high level of skill or expensive test equipment to ensure proper operation). In certain embodiments, an inspection robot includes acoustic sensors coupled to acoustic cones, enhancing robust detection operations (e.g., a high percentage of valid sensing data, ease of acoustic coupling of a sensor to an inspection surface, etc.), reducing couplant fluid losses, and/or easing integration of sensors with sleds, thereby supporting an increased number of sensors per payload and/or inspection robot, and enhancing available sensing resolution. In certain embodiments, an inspection robot includes utilizing water as a couplant, thereby reducing fluid pumping losses, reducing risks due to minor leaks within a multiple plumbing line system to support multiple sensors, and/or reducing the impact (environmental, hazard, clean-up, etc.) of performing multiple inspection runs and/or performing an inspection operation with a multiplicity of acoustic sensors operating.

Figure 31:
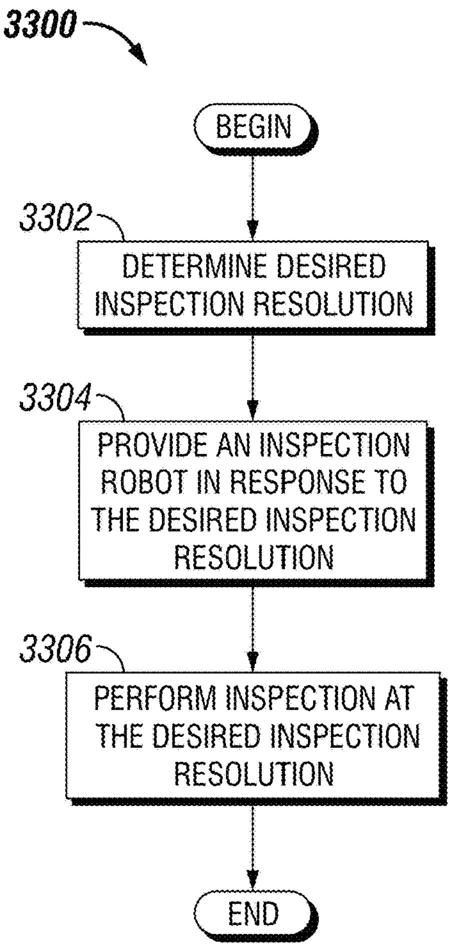
FIG. 31 is a schematic flow diagram of a procedure to perform an inspection at an arbitrary resolution.

Referencing FIG. 31, an example procedure 3300 to acoustically inspect an inspection surface with an arbitrary (or selectable) resolution is schematically depicted. The example procedure 3300 includes an operation 3302 to determine a desired resolution of inspection for the surface. The operation 3302 includes determining the desired resolution in whatever coordinate system is considered for the inspection surface, and translating the desired resolution for the coordinate system of the inspection surface to a coordinate system of an inspection robot (e.g., in terms of vertical and horizontal resolution for the inspection robot), if the coordinate system for the inspection surface is distinct from the coordinate system of the inspection robot. The example procedure 3300 further includes an operation 3304 to provide an inspection robot in response to the desired resolution of inspection, the inspection robot having at least one payload, a number of sleds mounted on the payload, and at least one acoustic sensor mounted on each sled. It will be understood that certain sleds on the payload may not have an acoustic sensor mounted thereupon, but for provision of selected acoustic inspection resolution, only the sleds having an acoustic sensor mounted thereupon are considered. In certain embodiments, operation 3304 additionally or alternatively includes one or more operations such as: providing multiple payloads; providing vertically displaced payloads; providing offset sleds on one or more vertically displaced payloads; providing payloads having a single couplant connection for the payload; providing an inspection robot having a single couplant connection for the inspection robot; providing an inspection robot utilizing water as a couplant; providing a down force to the sleds to ensure alignment and/or reduced fluid loss; providing degrees of freedom of movement to the sleds to ensure alignment and/or robust obstacle traversal; providing the sensors coupled to an acoustic cone; and/or configuring a horizontal spacing of the sleds in response to the selected resolution (e.g., spaced to support the selected resolution, spaced to support the selected resolution between an ascent and a descent, and/or spaced to support the selected resolution with a scheduled number of inspection runs).

The example procedure 3300 further includes an operation 3306 to perform an inspection operation of an inspection surface with arbitrary resolution. For example, operation 3306 includes at least: operating the number of horizontally displaced sensors to achieve the arbitrary resolution; operating vertically displaced payloads in a scheduled manner (e.g., out of phase with the first payload thereby inspecting a vertically distinct set of locations of the inspection surface); operating vertically displaced payloads to enhance horizontal inspection resolution; performing an inspection on a first horizontal track on an ascent, and a second horizontal track distinct from the first horizontal track on a descent; performing an inspection on a first vertical set of points on an ascent, and on a second vertical set of points on a descent (which may be on the same or a distinct horizontal track); and/or performing a plurality of inspection runs where the horizontal and/or vertical inspection positions of the multiple runs are distinct from the horizontal and/or vertical inspection positions of a first run. Certain operations of the example procedure 3300 may be performed by a controller 802.

While operations of procedure 3300, and an apparatus to provide for arbitrary or selected resolution inspections of a system are described in terms of acoustic sensing, it will be understood that arbitrary or selected resolution of other sensed parameters are contemplated herein. In certain embodiments, acoustic sensing provides specific challenges that are addressed by certain aspects of the present disclosure. However, sensing of any parameter, such as temperature, magnetic or electro-magnetic sensing, infra-red detection, UV detection, composition determinations, and other sensed parameters also present certain challenges addressed by certain aspects of the present disclosure. For example, the provision of multiple sensors in a single inspection run at determinable locations, the utilization of an inspection robot (e.g., instead of a person positioned in the inspection space), including an inspection robot with position sensing, and/or the reduction of sensor interfaces including electrical and communication interfaces, provides for ease of sensing for any sensed parameters at a selected resolution. In certain embodiments, a system utilizes apparatuses and operations herein to achieve arbitrary resolution for acoustic sensing. In certain embodiments, a system additionally or alternatively utilizes apparatuses and operations herein to achieve arbitrary resolution for any sensed parameter.

Figure 32:
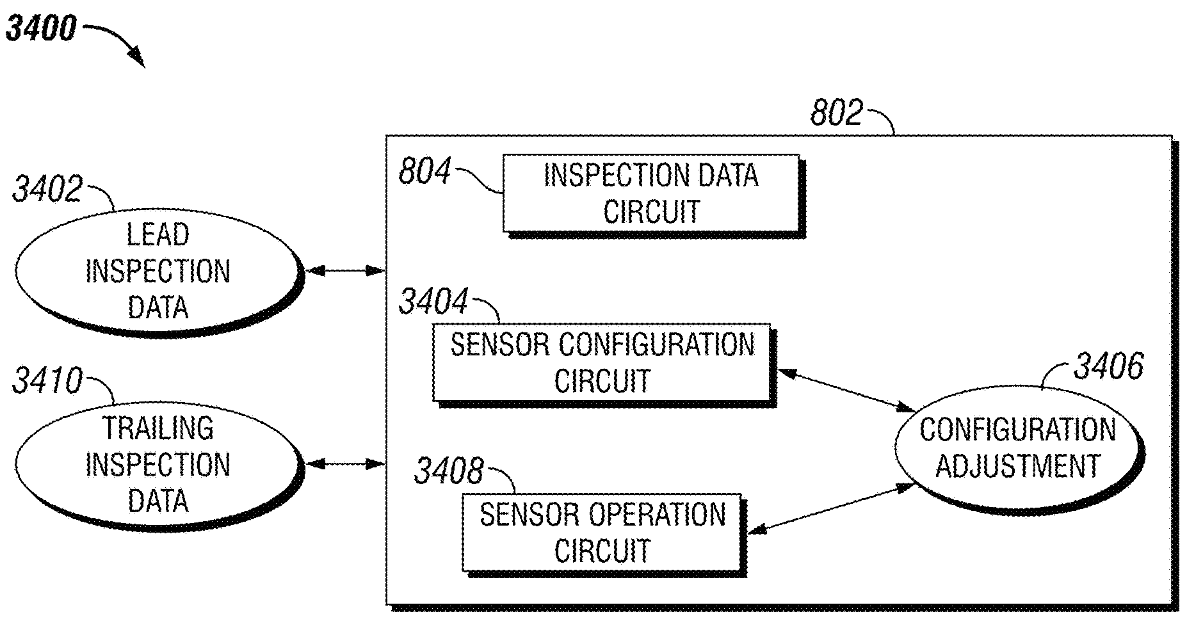
FIG. 32 is a schematic block diagram of an apparatus for adjusting a trailing sensor configuration.

Referencing FIG. 32, an example apparatus 3400 is depicted for configuring a trailing sensor inspection scheme in response to a leading sensor inspection value. The example apparatus 3400 includes a controller 802 having an inspection data circuit 804 that interprets lead inspection data 3402 from a lead sensor. Example and non-limiting lead sensors include a sensor mounted on a sled of a forward payload 2006, a sensor mounted on either a forward payload 2006 or a rear payload 1402 of an inspection robot having a trailing payload 2008, and/or a sensor operated on a first run of an inspection robot, where operations of the apparatus 3400 proceed with adjusting operations of a sensor on a subsequent run of the inspection robot (e.g., the first run is ascending, and the subsequent run is descending; the first run is descending, and the subsequent run is ascending; and/or the first run is performed at a first time, and the subsequent run is performed at a second, later, time).

The example controller 802 further includes a sensor configuration circuit 3404 structured to determine a configuration adjustment 3406 for a trailing sensor. Example and non-limiting trailing sensors include any sensor operating over the same or a substantially similar portion of the inspection surface as the lead sensor, at a later point in time. A trailing sensor may be a sensor positioned on a payload behind the payload having the lead sensor, a physically distinct sensor from the lead sensor operating over the same or a substantially similar portion of the inspection surface after the lead sensor, and/or a sensor that is physically the same sensor as the lead sensor, but reconfigured in some aspect (e.g., sampling parameters, calibrations, inspection robot rate of travel change, etc.). A portion that is substantially similar includes a sensor operating on a sled in the same horizontal track (e.g., in the direction of inspection robot movement) as the lead sensor, a sensor that is sensing a portion of the inspection sensor that is expected to determine the same parameters (e.g., wall thickness in a given area) of the inspection surface as that sensed by the lead sensor, and/or a sensor operating in a space of the inspection area where it is expected that determinations for the lead sensor would be effective in adjusting the trailing sensor. Example and non-limiting determinations for the lead sensor to be effective in adjusting the trailing sensor include pipe thickness determinations for a same pipe and/or same cooling tower, where pipe thickness expectations may affect the calibrations or other settings utilized by the lead and trailing sensors; determination of a coating thickness where the trailing sensor operates in an environment that has experienced similar conditions (e.g., temperatures, flow rates, operating times, etc.) as the conditions experienced by the environment sensed by the lead sensor; and/or any other sensed parameter affecting the calibrations or other settings utilized by the lead and trailing sensors where knowledge gained by the lead sensor could be expected to provide information utilizable for the trailing sensor.

Example and non-limiting configuration adjustments 3406 include changing of sensing parameters such as cut-off times to observe peak values for ultra-sonic processing, adjustments of rationality values for ultra-sonic processing, enabling of trailing sensors or additional trailing sensors (e.g., X-ray, gamma ray, high resolution camera operations, etc.), adjustment of a sensor sampling rate (e.g., faster or slower), adjustment of fault cut-off values (e.g., increase or decrease fault cutoff values), adjustment of any transducer configurable properties (e.g., voltage, waveform, gain, filtering operations, and/or return detection algorithm), and/or adjustment of a sensor range or resolution value (e.g., increase a range in response to a lead sensing value being saturated or near a range limit, decrease a range in response to a lead sensing value being within a specified range window, and/or increase or decrease a resolution of the trailing sensor). In certain embodiments, a configuration adjustment 3406 to adjust a sampling rate of a trailing sensor includes by changing a movement speed of an inspection robot. Example and non-limiting configuration adjustments include any parameters described in relation to FIGS. 37, 38, and 41-46 and the related descriptions. It can be seen that the knowledge gained from the lead inspection data 3402 can be utilized to adjust the trailing sensor plan which can result more reliable data (e.g., where calibration assumptions appear to be off-nominal for the real inspection surface), the saving of one or more inspection runs (e.g., reconfiguring the sensing plan in real-time to complete a successful sensing run during inspection operations), improved operations for a subsequent portion of a sensing run (e.g., a first inspection run of the inspection surface improves the remaining inspection runs, even if the vertical track of the first inspection run must be repeated), and/or efficient utilization of expensive sensing operations by utilizing such operations only when the lead inspection data 3402 indicates such operations are useful or required. The example controller 802 includes a sensor operation circuit 3408 that adjusts parameters of the trailing sensor in response to the configuration adjustment 3406, and the inspection data circuit 804 interpreting trailing inspection data 3410, wherein the trailing sensors are responsive to the adjusted parameters by the sensor operation circuit.

Figure 33:
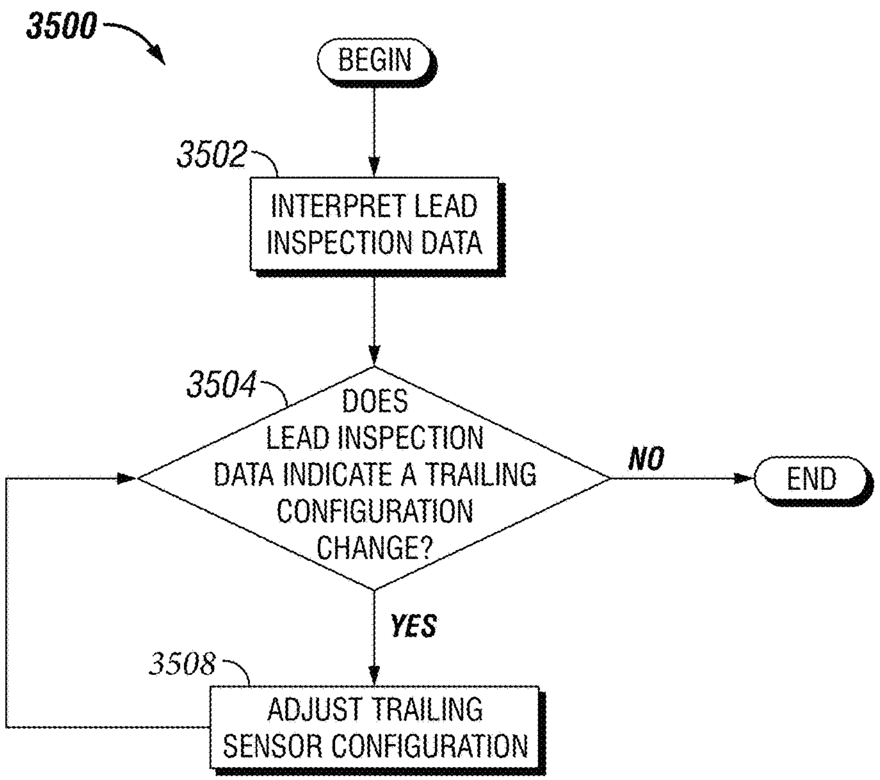
FIG. 33 is a schematic flow diagram of a procedure to adjust a trailing sensor configuration.

Referencing FIG. 33, an example procedure 3500 to configure a trailing sensor in response to a leading sensor value is depicted. The example procedure 3500 includes an operation 3502 to interpret lead inspection data provided by a leading sensor, and an operation 3504 to determine whether the lead inspection data indicates that a trailing sensor configuration should be adjusted. Where the operation 3504 determines that the trailing sensor configuration should be adjusted, the example procedure 3500 includes an operation 3508 to adjust the trailing sensor configuration in response to the lead inspection data. Example and non-limiting operations 3508 to adjust a trailing sensor configuration include changing a calibration for the sensor (e.g., an analog/digital processor configuration, cutoff time values, and/or speed-of-sound values for one or more materials), changing a range or resolution of the trailing sensor, enabling or disabling sensing operations of a trailing sensor, and/or adjusting a speed of travel of an inspection robot. In certain embodiments, operations 3508 include adjusting a horizontal position of a trailing sensor (e.g., where a horizontal position of a sled 1 on a payload 2 is actively controllable by a controller 802, and/or adjusted manually between the lead sensing operation and the trailing sensing operation).

In certain embodiments, lead inspection data 3402 includes ultra-sonic information such as processed ultra-sonic information from a sensor, and the sensor configuration circuit 3404 determines to utilize a consumable, slower, and/or more expensive sensing, repair, and/or marking operation by providing a configuration adjustment 3406 instructing a trailing sensor to operate, or to change nominal operations, in response to the lead inspection data 3402. For example, lead inspection data 3402 may indicate a thin wall, and sensor configuration circuit 3404 provides the configuration adjustment 3406 to alter a trailing operation such as additional sensing with a more capable sensor (e.g., a more expensive or capable ultra-sonic sensor, an X-ray sensor, a gamma ray sensor, or the like) and/or to operate a repair or marking tool (e.g., which may have a limited or consumable amount of coating material, marking material, or the like) at the location determined to have the thin wall. Accordingly, expense, time, and/or operational complication can be added to inspection operations in a controlled manner according to the lead inspection data 3402.

An example apparatus is disclosed to perform an inspection of an industrial surface. Many industrial surfaces are provided in hazardous locations, including without limitation where heavy or dangerous mechanical equipment operates, in the presence of high temperature environments, in the presence of vertical hazards, in the presence of corrosive chemicals, in the presence of high pressure vessels or lines, in the presence of high voltage electrical conduits, equipment connected to and/or positioned in the vicinity of an electrical power connection, in the presence of high noise, in the presence of confined spaces, and/or with any other personnel risk feature present. Accordingly, inspection operations often include a shutdown of related equipment, and/or specific procedures to mitigate fall hazards, confined space operations, lockout-tagout procedures, or the like. In certain embodiments, the utilization of an inspection robot allows for an inspection without a shutdown of the related equipment. In certain embodiments, the utilization of an inspection robot allows for a shutdown with a reduced number of related procedures that would be required if personnel were to perform the inspection. In certain embodiments, the utilization of an inspection robot provides for a partial shutdown to mitigate some factors that may affect the inspection operations and/or put the inspection robot at risk, but allows for other operations to continue. For example, it may be acceptable to position the inspection robot in the presence of high pressure or high voltage components, but operations that generate high temperatures may be shut down.

In certain embodiments, the utilization of an inspection robot provides additional capabilities for operation. For example, an inspection robot having positional sensing within an industrial environment can request shutdown of only certain aspects of the industrial system that are related to the current position of the inspection robot, allowing for partial operations as the inspection is performed. In another example, the inspection robot may have sensing capability, such as temperature sensing, where the inspection robot can opportunistically inspect aspects of the industrial system that are available for inspection, while avoiding other aspects or coming back to inspect those aspects when operational conditions allow for the inspection. Additionally, in certain embodiments, it is acceptable to risk the industrial robot (e.g., where shutting down operations exceed the cost of the loss of the industrial robot) to perform an inspection that has a likelihood of success, where such risks would not be acceptable for personnel. In certain embodiments, a partial shutdown of a system has lower cost than a full shutdown, and/or can allow the system to be kept in a condition where restart time, startup operations, etc. are at a lower cost or reduced time relative to a full shutdown. In certain embodiments, the enhanced cost, time, and risk of performing additional operations beyond mere shutdown, such as compliance with procedures that would be required if personnel were to perform the inspection, can be significant.

Figure 34:
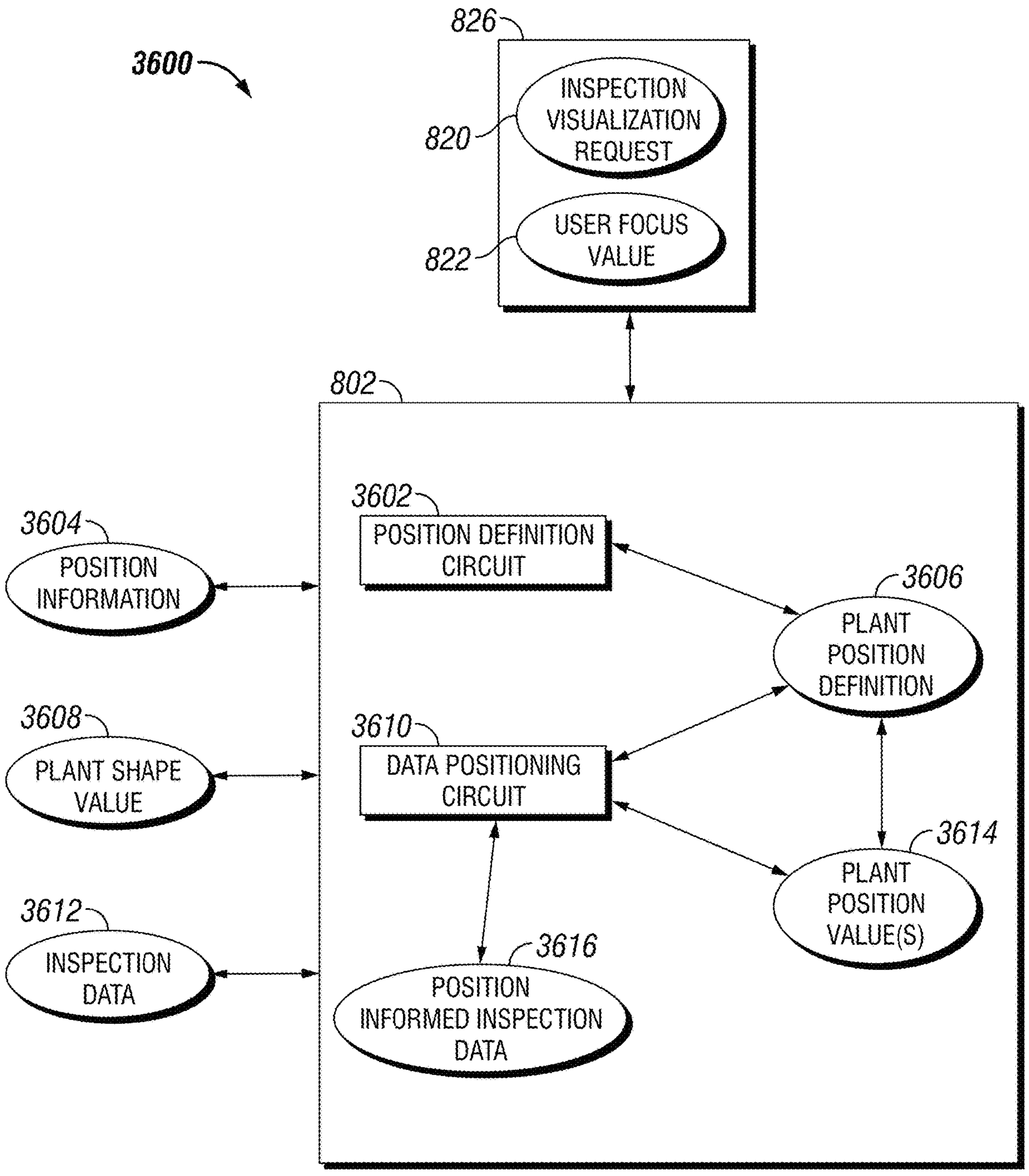
FIG. 34 is a schematic block diagram of an apparatus for providing position informed inspection data.

Referencing FIG. 34, an example apparatus 3600 to inspect a plant, industrial system, and/or inspection surface utilizing position information is depicted schematically. The example apparatus 3600 includes a position definition circuit 3602 that interprets position information 3604, and/or determines a plant position definition 3606 (e.g., a plant definition value) and an inspection robot position (e.g., as one or more plant position values 3614) in response to the position information 3604. Example and non-limiting position information 3604 includes relative and/or absolute position information—for example a distance from a reference position (e.g., a starting point, stopping point, known object in proximity to the plant, industrial system, and/or inspection surface, or the like). In certain embodiments, position information 3604 is determinable according to a global positioning service (GPS) device, ultra-wide band radio frequency (RF) signaling, LIDAR or other direct distance measurement devices (including line-of-sight and/or sonar devices), aggregating from reference points (e.g., routers, transmitters, know devices in communication with the inspection robot, or the like), utilizing known obstacles as a reference point, encoders (e.g., a wheel counter or other device), barometric sensors (e.g., altitude determination), utilization of a known sensed value correlated to position (e.g., sound volume or frequency, temperature, vibration, etc.), and/or utilizing an inertial measurement unit (e.g., measuring and/or calculating utilizing an accelerometer and/or gyroscope). In certain embodiments, values may be combined to determine the position information 3604—for example in 3-D space without further information, four distance measurements are ordinarily required to determine a specific position value. However, utilizing other information, such as a region of the inspection surface that the inspection robot is operating on (e.g., which pipe the inspection robot is climbing), an overlay of the industrial surface over the measurement space, a distance traveled from a reference point, a distance to a reference point, etc., the number of distance measurements required to determine a position value can be reduced to three, two, one, or even eliminated and still position information 3604 is determinable. In certain embodiments, the position definition circuit 3602 determines the position information 3604 completely or partially on dead reckoning (e.g., accumulating speed and direction from a known position, and/or direction combined with a distance counter), and/or corrects the position information 3604 when feedback based position data (e.g., a true detected position) is available.

Example and non-limiting plant position values 3614 include the robot position information 3604 integrated within a definition of the plant space, such as the inspection surface, a defined map of a portion of the plant or industrial system, and/or the plant position definition 3606. In certain embodiments, the plant space is predetermined, for example as a map interpreted by the controller 802 and/or pre-loaded in a data file describing the space of the plant, inspection surface, and/or a portion of the plant or industrial surface. In certain embodiments, the plant position definition 3606 is created in real-time by the position definition circuit 3602—for example by integrating the position information 3604 traversed by the inspection robot, and/or by creating a virtual space that includes the position information 3604 traversed by the inspection robot. For example, the position definition circuit 3602 may map out the position information 3604 over time, and create the plant position definition 3606 as the aggregate of the position information 3604, and/or create a virtual surface encompassing the aggregated plant position values 3614 onto the surface. In certain embodiments, the position definition circuit 3602 accepts a plant shape value 3608 as an input (e.g., a cylindrical tank being inspected by the inspection robot having known dimensions), deduces the plant shape value 3608 from the aggregated position information 3604 (e.g., selecting from one of a number of simple or available shapes that are consistent with the aggregated plant position definition 3606), and/or prompts a user (e.g., an inspection operator and/or a client for the data) to select one of a number of available shapes to determine the plant position definition 3606.

The example apparatus 3600 includes a data positioning circuit 3610 that interprets inspection data 3612 and correlates the inspection data 3612 to the position information 3604 and/or to the plant position values 3614. Example and non-limiting inspection data 3612 includes: sensed data by an inspection robot; environmental parameters such as ambient temperature, pressure, time-of-day, availability and/or strength of wireless communications, humidity, etc.; image data, sound data, and/or video data taken during inspection operations; metadata such as an inspection number, customer number, operator name, etc.; setup parameters such as the spacing and positioning of sleds, payloads, mounting configuration of sensors, and the like; calibration values for sensors and sensor processing; and/or operational parameters such as fluid flow rates, voltages, pivot positions for the payload and/or sleds, inspection robot speed values, downforce parameters, etc. In certain embodiments, the data positioning circuit 3610 determines the positional information 3604 corresponding to inspection data 3612 values, and includes the positional information 3604 as an additional parameter with the inspection data 3612 values and/or stores a correspondence table or other data structure to relate the positional information 3604 to the inspection data 3612 values. In certain embodiments, the data positioning circuit 3610 additionally or alternatively determines the plant position definition 3606, and includes a plant position value 3614 (e.g., as a position within the plant as defined by the plant position definition 3606) as an additional parameter with the inspection data 3612 values and/or stores a correspondence table or other data structure to relate the plant position values 3614 to the inspection data 3612 values. In certain embodiments, the data positioning circuit 3610 creates position informed data 3616, including one or more, or all, aspects of the inspection data 3612 correlated to the position information 3604 and/or to the plant position values 3614.

In certain embodiments, for example where dead reckoning operations are utilized to provide position information 3604 over a period of time, and then a corrected position is available through a feedback position measurement, the data positioning circuit 3610 updates the position informed inspection data 3616—for example re-scaling the data according to the estimated position for values according to the changed feedback position (e.g., where the feedback position measurement indicates the inspection robot traveled 25% further than expected by dead reckoning, position information 3604 during the dead reckoning period can be extended by 25%) and/or according to rationalization determinations or externally available data (e.g., where over 60 seconds the inspection robot traverses 16% less distance than expected, but sensor readings or other information indicate the inspection robot may have been stuck for 10 seconds, then the position information 3604 may be corrected to represent the 10-seconds of non-motion rather than a full re-scale of the position informed inspection data 3616). In certain embodiments, dead reckoning operations may be corrected based on feedback measurements as available, and/or in response to the feedback measurement indicating that the dead reckoning position information exceeds a threshold error value (e.g., 1%, 0.1%, 0.01%, etc.).

It can be seen that the operations of apparatus 3600 provide for position-based inspection information. Certain systems, apparatuses, and procedures throughout the present disclosure utilize and/or can benefit from position informed inspection data 3616, and all such embodiments are contemplated herein. Without limitation to any other disclosures herein, certain aspects of the present disclosure include: providing a visualization of inspection data 3612 in position information 3604 space and/or in plant position value 3614 space; utilizing the position informed inspection data 3616 in planning for a future inspection on the same or a similar plant, industrial system, and/or inspection surface (e.g., configuring sled number and spacing, inspection robot speed, inspection robot downforce for sleds and/or sensors, sensor calibrations, planning for traversal and/or avoidance of obstacles, etc.); providing a format for storing a virtual mark (e.g., replacing a paint or other mark with a virtual mark as a parameter in the inspection data 3612 correlated to a position); determining a change in a plant condition in response to the position informed inspection data 3616 (e.g., providing an indication that expected position information 3604 did not occur in accordance with the plant position definition 3606—for example indicating a failure, degradation, or unexpected object in a portion of the inspected plant that is not readily visible); and/or providing a health indicator of the inspection surface (e.g., depicting regions that are nominal, passed, need repair, will need repair, and/or have failed). In certain embodiments, it can be seen that constructing the position informed inspection data 3616 using position information 3604 only, including dead reckoning based position information 3604, nevertheless yields many of the benefits of providing the position informed inspection data 3616. In certain further embodiments, the position informed inspection data 3616 is additionally or alternatively constructed utilizing the plant position definition 3606, and/or the plant position values 3614.

Figure 35:
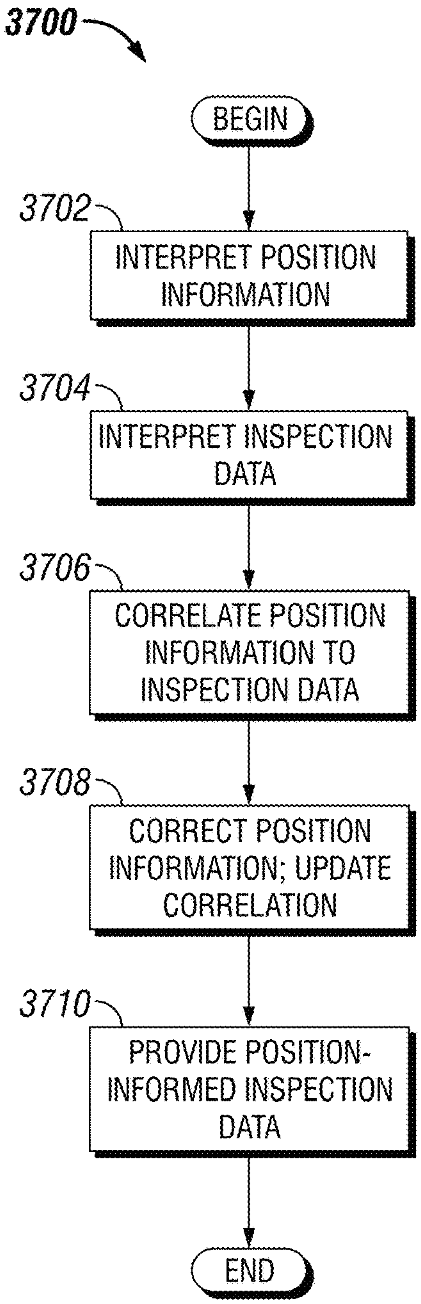
FIG. 35 is a schematic flow diagram of a procedure to provide position informed inspection data.

Referencing FIG. 35, an example procedure 3700 to inspect a plant, industrial system, and/or inspection surface utilizing position information is depicted. The example procedure 3700 includes an operation 3702 to interpret position information, an operation 3704 to interpret inspection data, and an operation 3706 correlate the inspection data to the position information. The example procedure 3700 further includes an operation 3708 to correct the position information (e.g., updating a dead reckoning-based position information), and to update the correlation of the inspection data to the position information. The example procedure further includes an operation 3710 to provide position informed inspection data in response to the correlated inspection data. In certain embodiments, operation 3706 is additionally or alternatively performed on the position informed inspection data, where the position informed inspection data is corrected, and operation 3710 includes providing the position informed inspection data. In certain embodiments, one or more operations of a procedure 3700 are performed by a controller 802.

Figure 36:
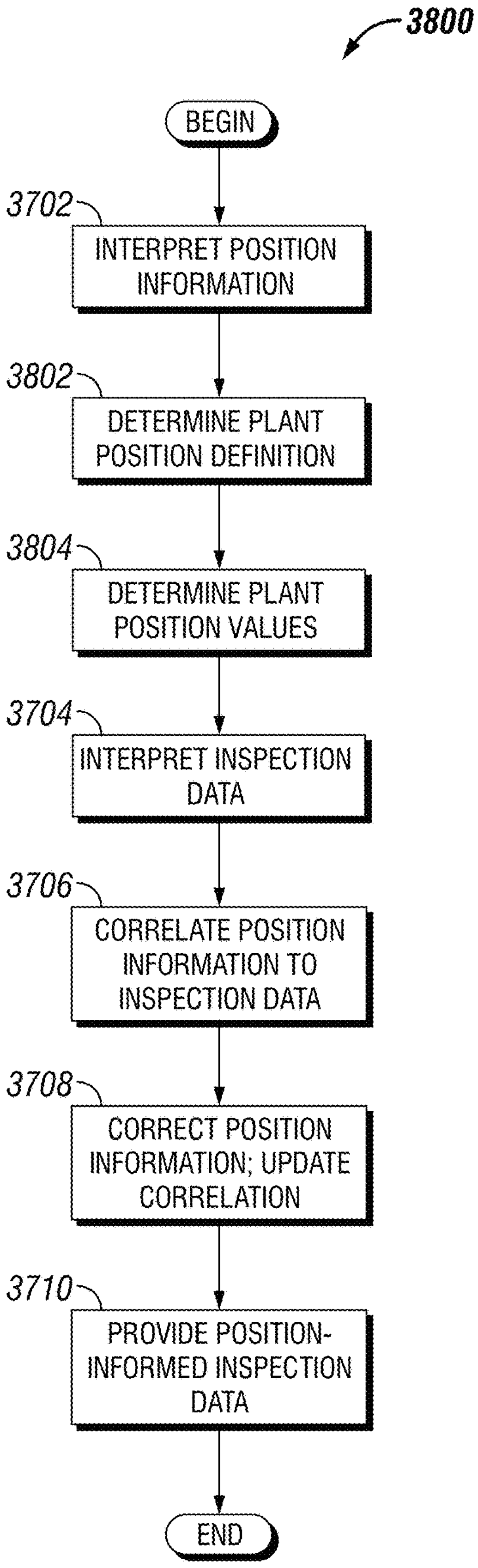
FIG. 36 is a schematic flow diagram of another procedure to provide position informed inspection data.

Referencing FIG. 36, an example procedure 3800 to inspect a plant, industrial system, and/or inspection surface utilizing position information is depicted. In addition to operations of procedure 3700, example procedure 3800 includes an operation 3802 to determine a plant definition value, and an operation 3804 to determine plant position values in response to the position information and the plant position definition. Operation 3706 further includes an operation to correlate the inspection data with the position information and/or the plant position values. In certain embodiments, one or more operations of procedure 3800 are performed by a controller 802.

Figure 37:
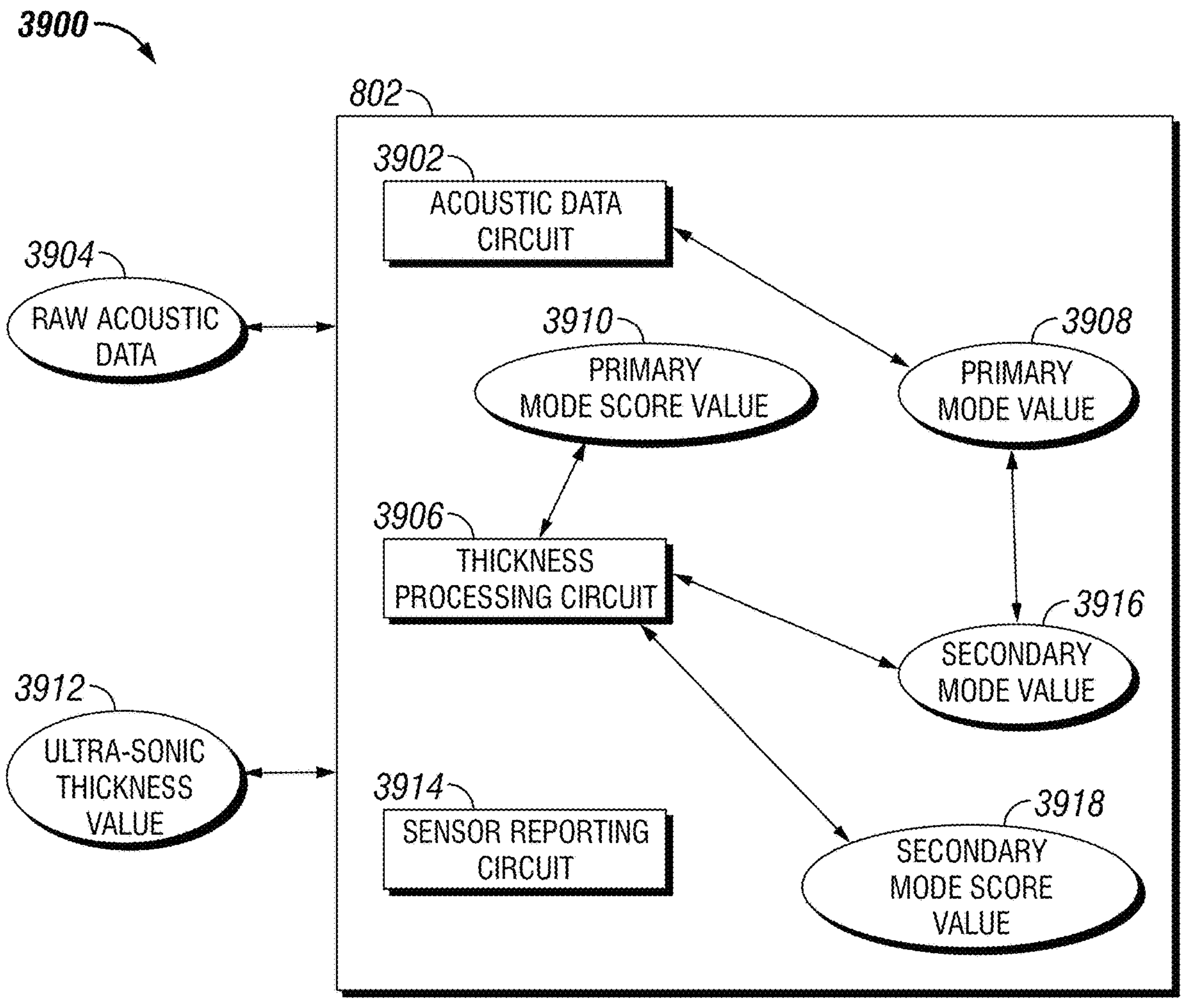
FIG. 37 is a schematic block diagram of an apparatus for providing an ultra-sonic thickness value.

Referencing FIG. 37, an example apparatus 3900 for processing ultra-sonic sensor readings is depicted schematically. The example apparatus 3900 includes a controller 802 having an acoustic data circuit 3902 that determines return signals from the tested surface—for example a transducer in the sensor 2202 sends a sound wave through the couplant chamber to the inspection surface, and the raw acoustic data 3904 includes primary (e.g., from the surface inspection surface), secondary (e.g., from a back wall, such as a pipe wall or tank wall) and/or tertiary (e.g., from imperfections, cracks, or defects within the wall) returns from the inspection surface.

In certain embodiments, the controller 802 includes a thickness processing circuit 3906 that determines a primary mode value 3908 in response to the raw acoustic data 3904. The primary mode value 3908, in certain embodiments, includes a determination based upon a first return and a second return of the raw acoustic data 3904, where a time difference between the first return and the second return indicates a thickness of the inspection surface material (e.g., a pipe). The foregoing operations of the thickness processing circuit 3906 are well known in the art, and are standard operations for ultra-sonic thickness testing. However, the environment for the inspection robot is not typical, and certain further improvements to operations are described herein. An inspection robot, in certain embodiments, performs a multiplicity of ultra-sonic thickness determinations, often with simultaneous (or nearly) operations from multiple sensors. Additionally, in certain embodiments, it is desirable that the inspection robot operate: autonomously without the benefit of an experienced operator; without high-end processing in real-time to provide substantial displays to a user to determine whether parameters are not being determined properly; and/or with limited communication resources utilized for post-processing that is fast enough that off nominal operation can be adjusted after significant post-processing.

In certain embodiments, the thickness processing circuit 3906 determines a primary mode score value 3910. In certain embodiments, the thickness processing circuit 3906 determines the primary mode score value 3910 in response to a time of arrival for the primary (e.g., inspection surface face) return from the raw acoustic data 3904. Because the delay time for the sensor is a known and controlled value (e.g., reference FIGS. 26 and 29, and the related description), the return time of the primary return is known with high confidence. Additionally or alternatively, the thickness processing circuit 3906 determines the primary mode score value 3910 in response to the character of the primary return—for example a sharp peak of a known width and/or amplitude. In certain embodiments, the primary mode score value 3910 calculation is calibrated in response to the material of the inspection surface—although known materials such as iron, various types of steel, and other surfaces can utilize nominal calibrations. In certain embodiments, the configuration adjustment 3406 based on lead inspection data 3402 is utilized to calibrate a primary mode score value 3910 calculation for a sensor providing the trailing inspection data 3410. In certain embodiments, determining that the first peak (related to the primary return) meets expected characteristics is sufficient to provide confidence to utilize the primary mode value 3908 as the ultra-sonic thickness value 3912. In certain embodiments, the ultra-sonic thickness value 3912 is the inspection data for the sensor, and/or a part of the inspection data for the sensor.

In certain embodiments, the thickness processing circuit 3906 additionally or alternatively considers the timing of arrival for a secondary return, peak arrival time, and/or peak width of the secondary return (e.g., from the back wall) in determining the primary mode score value 3910. For example, if the secondary return indicates a wall thickness that is far outside of an expected thickness value, either greater or lower, the primary mode score value 3910 may be reduced. In certain embodiments, if the secondary return has a peak characteristic that is distinct from the expected characteristic (e.g., too narrow, not sharp, etc.) then the primary mode score value 3910 may be reduced. Additionally or alternatively, feedback data regarding the sensor may be utilized to adjust the primary mode score value 3910—for example if the sensor is out of alignment with the inspection surface, the sensor (or sled) has lifted off of the inspection surface, a sled position for a sled having an acoustic sensor, and/or if a couplant anomaly is indicated (e.g., couplant flow is lost, a bubble is detected, etc.) then the primary mode score value 3910 may be reduced.

In certain embodiments, for example when the primary mode score value 3910 indicates that the primary mode value 3908 is to be trusted, the controller 802 includes a sensor reporting circuit 3914 that provides the ultra-sonic thickness value 3912 in response to the primary mode value 3908. In certain embodiments, if the primary mode score value 3910 is sufficiently high, the thickness processing circuit 3906 omits operations to determine a secondary mode value 3916. In certain embodiments, the thickness processing circuit 3906 performs operations to determine the secondary mode value 3916 in response to the primary mode score value 3910 is at an intermediate value, and/or if feedback data regarding the sensor indicates off-nominal operation, even when the primary mode score value 3910 is sufficiently high (e.g., to allow for improved post-processing of the inspection data). In certain embodiments, the thickness processing circuit 3906 determines the secondary mode value 3916 at all times, for example to allow for improved post-processing of the inspection data. In certain embodiments, the sensor reporting circuit 3914 provides processed values for the primary mode value 3908 and/or the secondary mode value 3916, and/or the primary mode scoring value 3910 and/or a secondary mode score value 3918, either as the inspection data and/or as stored data to enable post-processing and/or future calibration improvements. In certain embodiments, the sensor reporting circuit 3914 provides the raw acoustic data 3904, either as the inspection data and/or as stored data to enable post-processing and/or future calibration improvements.

The example thickness processing circuit 3906 further determines, in certain embodiments, a secondary mode value 3916. An example secondary mode value 3916 includes values determined from a number of reflected peaks—for example determining which of a number of reflected peaks are primary returns (e.g., from a face of the inspection surface) and which of a number of reflected peaks are secondary returns (e.g., from a back wall of the inspection surface). In certain embodiments, a Fast-Fourier Transform (FFT), wavelet analysis, or other frequency analysis technique is utilized by the thickness processing circuit 3906 to determine the energy and character of the number of reflected peaks. In certain embodiments, the thickness processing circuit 3906 determines a secondary mode score value 3918—for example from the character and consistency of the peaks, and determines an ultra-sonic thickness value 3912 from the peak-to-peak distance of the number of reflected peaks. The operations of the example apparatus 3900, which in certain embodiments favor utilization of the primary mode value 3908, provide for rapid and high confidence determinations of the ultra-sonic thickness value 3912 in an environment where a multiplicity of sensors are providing raw acoustic data 3904, computing resources are limited, and a large number of sensor readings are to be performed without supervision of an experienced operator.

In certain embodiments, any one or more of the ultra-sonic thickness value 3912, the primary mode value 3908, the secondary mode value 3916, the primary mode score value 3910, and/or the secondary mode score value 3918 are provided or stored as position informed inspection data 3616. The correlation of the values 3912, 3908, 3916, 3910, and/or 3918 with position data as position informed inspection data 3616 provides for rapid visualizations of the characteristics of the inspection surface, and provides for rapid convergence of calibration values for inspection operations on the inspection surface and similar surfaces. In certain embodiments, the raw acoustic data 3904 is provided or stored as position informed inspection data 3616.

Figure 38:
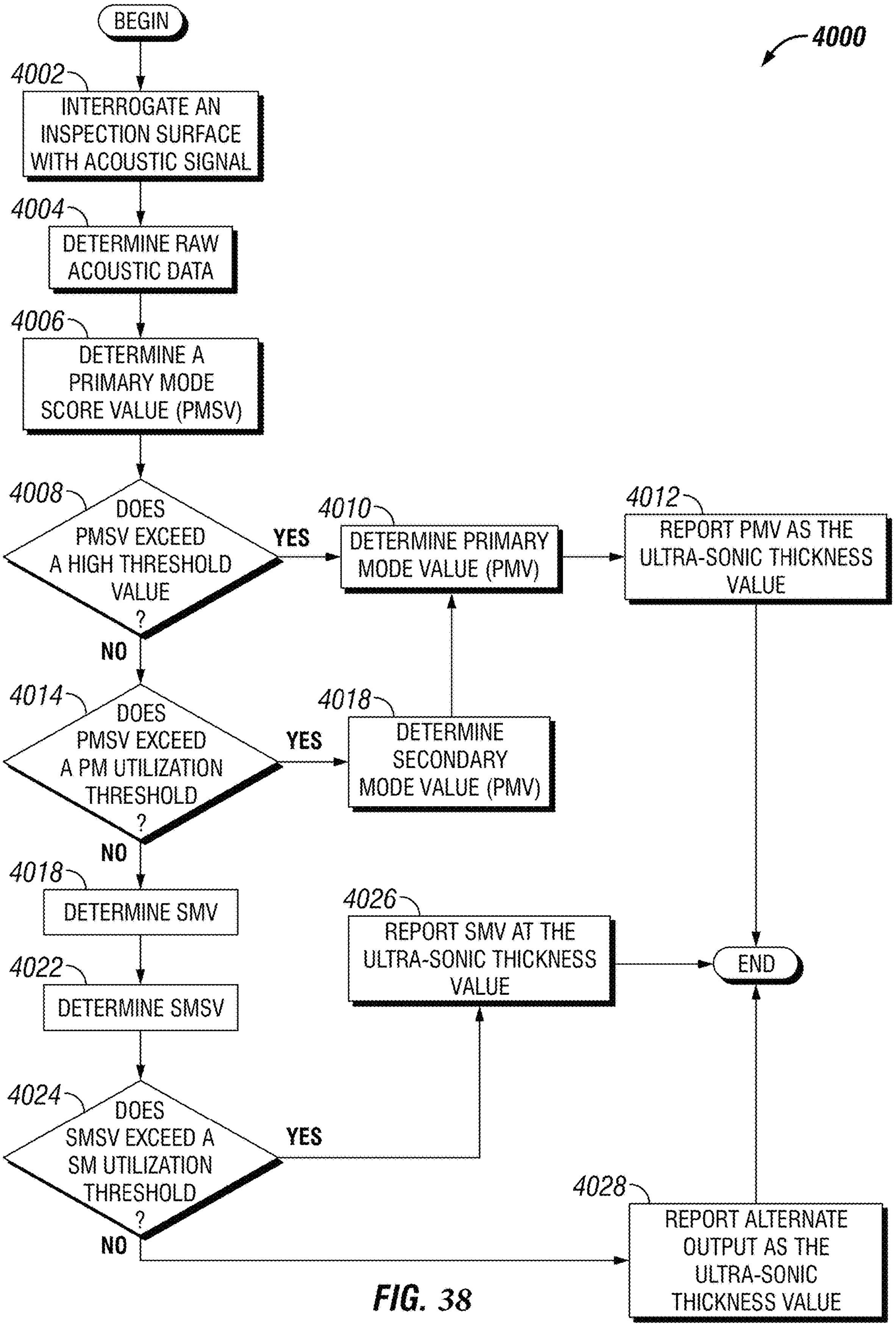
FIG. 38 is a schematic flow diagram of a procedure to provide an ultra-sonic thickness value.

Referencing FIG. 38, an example procedure 4000 to process ultra-sonic sensor readings is depicted schematically. In certain embodiments, procedure 4000 processes ultra-sonic sensor readings for an inspection robot having a number of ultra-sonic sensor mounted thereon. The example procedure 4000 includes an operation 4002 to interrogate an inspection surface with an acoustic signal (e.g., acoustic impulse from a transducer). The example procedure 4000 further includes an operation 4004 to determine raw acoustic data, such as return signals from the inspection surface. The example procedure 4000 further includes an operation 4006 to determine a primary mode score value in response to a primary peak value, and/or further in response to a secondary peak value, from the raw acoustic data. The example procedure 4000 further includes an operation 4008 to determine whether the primary mode score value exceeds a high threshold value, such as whether the primary mode value is deemed to be reliable without preserving a secondary mode value. In response to the operation 4008 determining the primary mode score value exceeds the high threshold value, the procedure 4000 further includes an operation 4010 to determine the primary mode value, and an operation 4012 to report the primary mode value as an ultra-sonic thickness value. In response to the operation 4008 determining the primary mode score value does not exceed the high threshold value, the procedure includes an operation 4014 to determine whether the primary mode score value exceeds a primary mode utilization value. In certain embodiments, in response to the operation 4014 determining the primary mode score value exceeds the primary mode utilization value, the procedure 4000 includes the operation 4010 to determine the primary mode value, an operation 4018 to determine the secondary mode value, and the operation 4012 to provide the primary mode value as the ultra-sonic thickness value. In response to the operation 4014 determining the primary mode score value does not exceed the primary mode utilization value, the procedure 4000 includes the operation 4018 to determine the secondary mode value and an operation 4022 to determine the secondary mode score value. The procedure 4000 further includes an operation 4024 to determine whether the secondary mode score value exceeds a secondary mode utilization value, and in response to operation 4024 determining the secondary mode score value exceeds the secondary mode utilization value, the procedure 4000 includes an operation 4026 to provide the secondary mode value as the ultra-sonic thickness value. In response to the operation 4024 determining the secondary mode score value does not exceed the secondary mode utilization value, the procedure 4000 includes an operation 4028 to provide an alternate output as the ultra-sonic thickness value. In certain embodiments, operation 4028 includes providing an error value (e.g., data not read), one of the primary mode value and the secondary mode value having a higher score, and/or combinations of these (e.g., providing a "best" value, along with an indication that the ultra-sonic thickness value for that reading may not be reliable).

As with all schematic flow diagrams and operational descriptions throughout the present disclosure, operations of procedure 4000 may be combined or divided, in whole or part, and/or certain operations may be omitted or added. Without limiting the present description, it is noted that operation 4022 to determine the secondary mode score value and operation 4024 to determine whether the secondary mode score value exceeds a utilization threshold may operate together such that operation 4018 to determine the secondary mode score is omitted. For example, where the secondary mode score value indicates that the secondary mode value is not sufficiently reliable to use as the ultra-sonic thickness value, in certain embodiments, processing to determine the secondary mode value are omitted. In certain embodiments, one or more of operations 4014 and/or 4008 to compare the primary mode score value to certain thresholds may additionally or alternatively include comparison of the primary mode score value to the secondary mode score value, and/or utilization of the secondary mode value instead of the primary mode value where the secondary mode score value is higher, or sufficiently higher, than the primary mode score value. In certain embodiments, both the primary mode value and the secondary mode value are determined and stored or communicated, for example to enhance future calibrations and/or processing operations, and/or to enable post-processing operations. In certain embodiments, one or more operations of procedure 4200 are performed by a controller 802.

Figure 41:
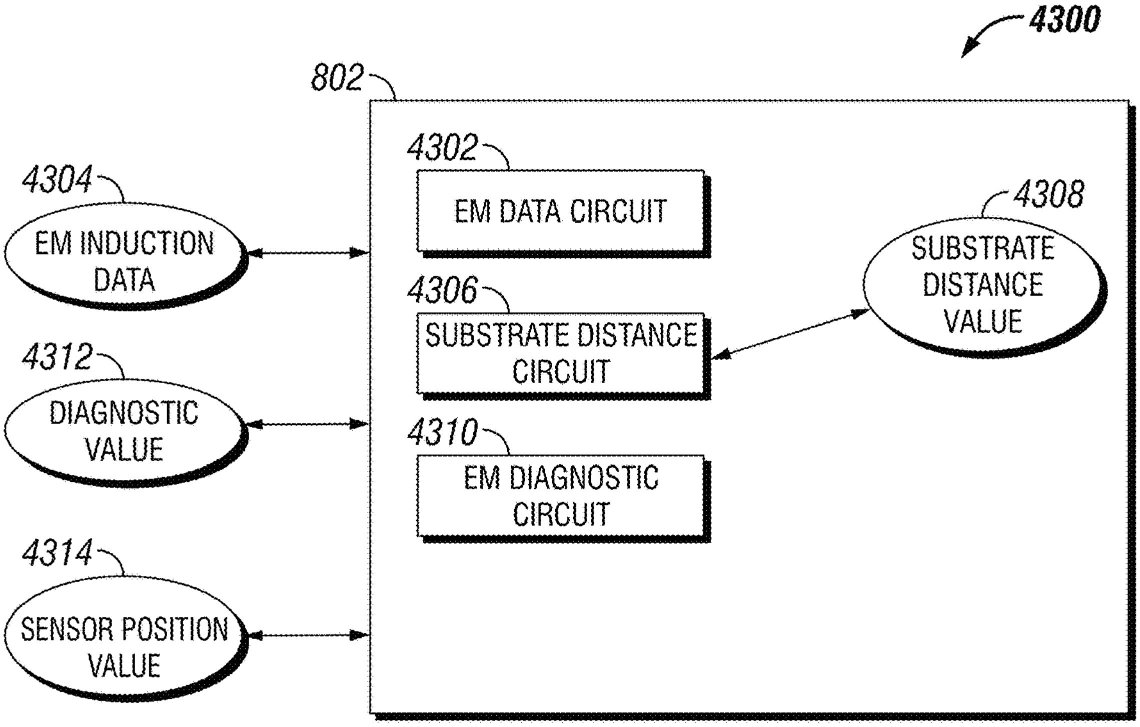
FIG. 41 is a schematic block diagram of an apparatus for utilizing EM induction data.

Referencing FIG. 41, an example apparatus 4300 for operating a magnetic induction sensor for an inspection robot is depicted. In certain embodiments, the magnetic induction sensor is mounted on a sled 1, and/or on a payload 2. In certain embodiments, the magnetic induction sensor is a lead sensor as described throughout the present disclosure, although operations of the apparatus 4300 for operating the magnetic induction sensor for the inspection robot include the magnetic induction sensor positioned on any payload and/or any logistical inspection operation runs. In certain embodiments, the magnetic induction sensor is a lead sensor and positioned on a same sled as an ultra-sonic or other sensor. In certain embodiments, the magnetic induction sensor is included on a payload 2 with other sensors, potentially including an ultra-sonic sensor, and may be on a same sled 1 or an offset sled (e.g., one or more magnetic sensors on certain sleds 1 of a payload 2, and ultra-sonic or other sensors on other sleds 1 of the payload 2).

An example apparatus 4300 includes an EM data circuit 4302 structured to interpret EM induction data 4304 provided by a magnetic induction sensor. The EM induction data 4304 provides an indication of the thickness of material, including coatings, debris, non-ferrous metal spray material (e.g., repair material), and/or damage, between the sensor and a substrate ferrous material, such as a pipe, tube, wall, tank wall, or other material provided as a substrate for an inspection surface. The foregoing operations of the EM data circuit 4302 and magnetic induction sensor are well known in the art, and are standard operations for determining automotive paint thickness or other applications. However, the environment for the inspection robot is not typical, and certain further improvements to operations are described herein.

In certain embodiments, an inspection robot includes sled configurations, including any configurations described throughout the present disclosure, to ensure expected contact, including proximity and/or orientation, between the inspection surface and the magnetic induction sensor. Accordingly, a magnetic induction sensor included on a sled 1 of the inspection robot in accordance with the present disclosure provides a reliable reading of distance to the substrate ferrous material. In certain embodiments, the apparatus 4300 includes a substrate distance circuit 4306 that determines a substrate distance value 4308 between the magnetic induction sensor and a ferrous substrate of the inspection surface. Additionally or alternatively, the substrate distance value 4308 may be a coating thickness, a delay line correction factor (e.g., utilized by a thickness processing circuit 3906), a total debris-coating distance, or other value determined in response to the substrate distance value 4308.

In certain embodiments, the controller 802 further includes an EM diagnostic circuit 4310 that supports one or more diagnostics in response to the substrate distance value 4308. An example diagnostic includes a diagnostic value 4312 (e.g., a rationality diagnostic value, or another value used for a diagnostic check), wherein the EM diagnostic circuit 4310 provides information utilized by the thickness processing circuit 3906, for example to a thickness processing circuit 3906. For example, the layer of coating, debris, or other material between the substrate of the inspection surface and an ultra-sonic sensor can affect the peak arrival times. In a further example, the layer of coating, debris, or other material between the substrate of the inspection surface and an ultra-sonic sensor can act to increase the effective delay line between the transducer of the ultra-sonic sensor and the inspection surface. In certain embodiments, the thickness processing circuit 3906 utilizes the rationality diagnostic value 4312 to adjust expected arrival times for the primary return and/or secondary return values, and/or to adjust a primary mode scoring value and/or a secondary mode score value.

In certain embodiments, the EM diagnostic circuit 4310 operates to determine a sensor position value 4314. In certain embodiments, the sensor position value 4314 provides a determination of the sensor distance to the substrate. In certain embodiments, the sensor position value 4314 provides a rationality check whether the sensor is positioned in proximity to the inspection surface. For example, an excursion of the EM induction data 4304 and/or substrate distance value 4308 may be understood to be a loss of contact of the sensor with the inspection surface, and/or may form a part of a determination, combined with other information such as an arm 20, sled 1, or payload 2 position value, a value of any of the pivots 16, 17, 18, and/or information from a camera or other visual indicator, to determine that a sled 1 including the magnetic induction sensor, and/or the magnetic induction sensor, is not properly positioned with regard to the inspection surface. Additionally or alternatively, a thickness processing circuit 3906 may utilize the sensor position value 4314 to adjust the primary mode scoring value and/or the secondary mode score value—for example to exclude or label data that is potentially invalid. In certain embodiments, the sensor position value 4314 is utilized on a payload 2 having both an ultra-sonic sensor and a magnetic induction sensor, and/or on a sled 1 having both an ultra-sonic sensor and a magnetic induction sensor (e.g., where the sensor position value 4314 is likely to provide direct information about the ultra-sonic sensor value). In certain embodiments, the sensor position value 4314 is utilized when the magnetic induction sensor is not on a same payload 2 or sled 1 with an ultra-sonic sensor—for example by correlating with position data to identify a potential obstacle or other feature on the inspection surface that may move the sled 1 out of a desired alignment with the inspection surface. In certain embodiments, the sensor position value 4314 is utilized when the magnetic induction sensor is not on a same payload 2 or sled 1 with an ultra-sonic sensor, and is combined with other data in a heuristic check to determine if the ultra-sonic sensor (and/or related sled or payload) experiences the same disturbance at the same location that the magnetic induction sensor (and/or related sled or payload) experienced.

In certain embodiments, the substrate distance value 4308 is provided to a thickness processing circuit 3906, which utilizes the substrate distance value 4308 to differentiate between a utilization of the primary mode value 3908 and/or the secondary mode value 3916. For example, the thickness of a coating on the inspection surface can affect return times and expected peak times. Additionally or alternatively, where the speed of sound through the coating is known or estimated, the peak analysis of the primary mode value 3908 and/or the secondary mode value 3916 can be adjusted accordingly. For example, the secondary mode value 3916 will demonstrate additional peaks, which can be resolved with a knowledge of the coating thickness and material, and/or the speed of sound of the coating material can be resolved through deconvolution and frequency analysis of the returning peaks if the thickness of the coating is known. In another example, the primary mode value 3908 can be adjusted to determine a true substrate first peak response (which will, in certain embodiments, occur after a return from the coating surface), which can be resolved with a knowledge of the coating thickness and/or the speed of sound of the coating material. In certain embodiments, a likely composition of the coating material is known—for example based upon prior repair operations performed on the inspection surface. In certain embodiments, as described, sound characteristics of the coating material, and/or effective sound characteristics of a pseudo-material (e.g., a mix of more than one material modeled as an aggregated pseudo-material) acting as the aggregate of the coating, debris, or other matter on the substrate of the inspection surface, can be determined through an analysis of the ultra-sonic data and/or coupled with knowledge of the thickness of the matter on the substrate of the inspection surface.

Figure 42:
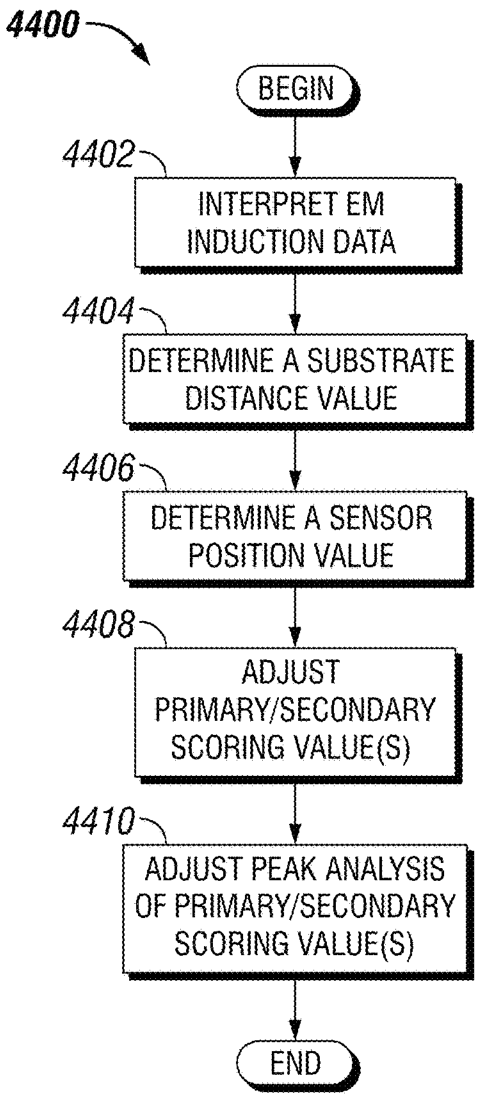
FIG. 42 is a schematic flow diagram of a procedure to utilize EM induction data.

Referencing FIG. 42, an example procedure 4400 for operating and analyzing a magnetic induction sensor on an inspection robot is schematically depicted. The example procedure 4400 includes an operation 4402 to interpret EM induction data provided by a magnetic induction sensor, and an operation 4404 to determine a substrate distance value between the magnetic induction sensor and a ferrous substrate of the inspection surface. The example procedure 4400 further includes an operation 4406 to determine a sensor position value, such as: a sensor distance from a substrate of the inspection surface; and/or a sensor pass/fail orientation, alignment or position check. In certain embodiments, the example procedure 4400 further includes an operation 4408 to adjust a primary mode scoring value and/or a secondary mode score value in response to the substrate distance value and/or the sensor position value. In certain embodiments, operation 4408 includes an operation to set the primary mode scoring value and/or secondary mode score value to a value that excludes the primary mode value and/or the secondary mode value from being used, and/or labels the primary mode value and/or the secondary mode value as potentially erroneous. In certain embodiments, an operation includes determining a reliability of the primary mode value and/or the secondary mode value—for example where sonic properties of the matter between the ultra-sonic sensor and the inspection surface substrate are determined with a high degree of reliability—and the reliability determined for the primary mode value and/or the secondary mode value is utilized to adjust the primary mode scoring value and/or the secondary mode score value. An example procedure 4400 further includes an operation 4410 to adjust a peak analysis of a primary mode value and/or a secondary mode value in response to the substrate distance value and/or the sensor position value. In certain embodiments, one or more operations of procedure 4400 are performed by a controller 802.

Figure 43:
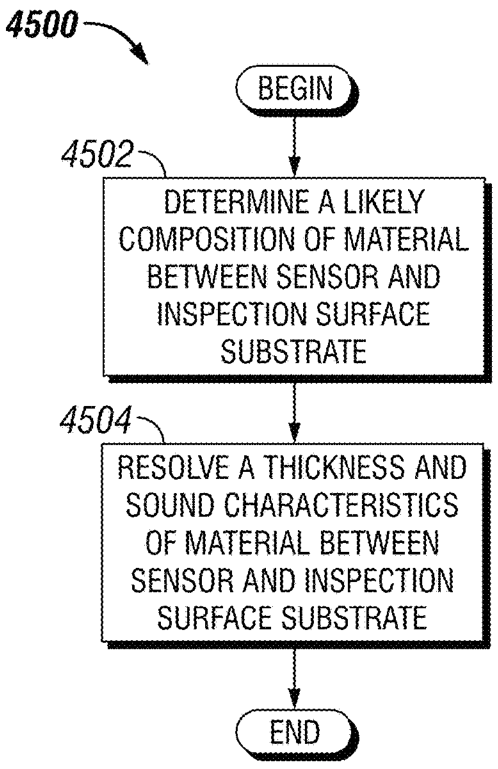
FIG. 43 is a schematic flow diagram of a procedure to determine a coating thickness and composition.

Referencing FIG. 43, an example procedure 4500 to adjust a peak analysis of a primary mode value and/or a secondary mode value is schematically depicted. The example procedure 4500 includes an operation 4504 to resolve a thickness and a sound characteristic of material positioned between a substrate of an inspection surface and an ultra-sonic sensor. In certain embodiments, operation 4504 includes a deconvolution of peak values including a frequency analysis of peaks observed in view of the substrate distance value and/or the sensor position value. In certain embodiments, the example procedure 4500 further includes an operation 4502 to determine a likely composition of the coating material—for example in response to a defined parameter by an inspection operator, and/or a previously executed repair operation on the inspection surface. In certain embodiments, operations of any of procedure 4400 and/or procedure 4500 are performed in view of position information of the magnetic induction sensor, and/or correlating position information of the ultra-sonic sensor. In certain embodiments, one or more operations of procedure 4500 are performed by a controller 802.

Figure 44:
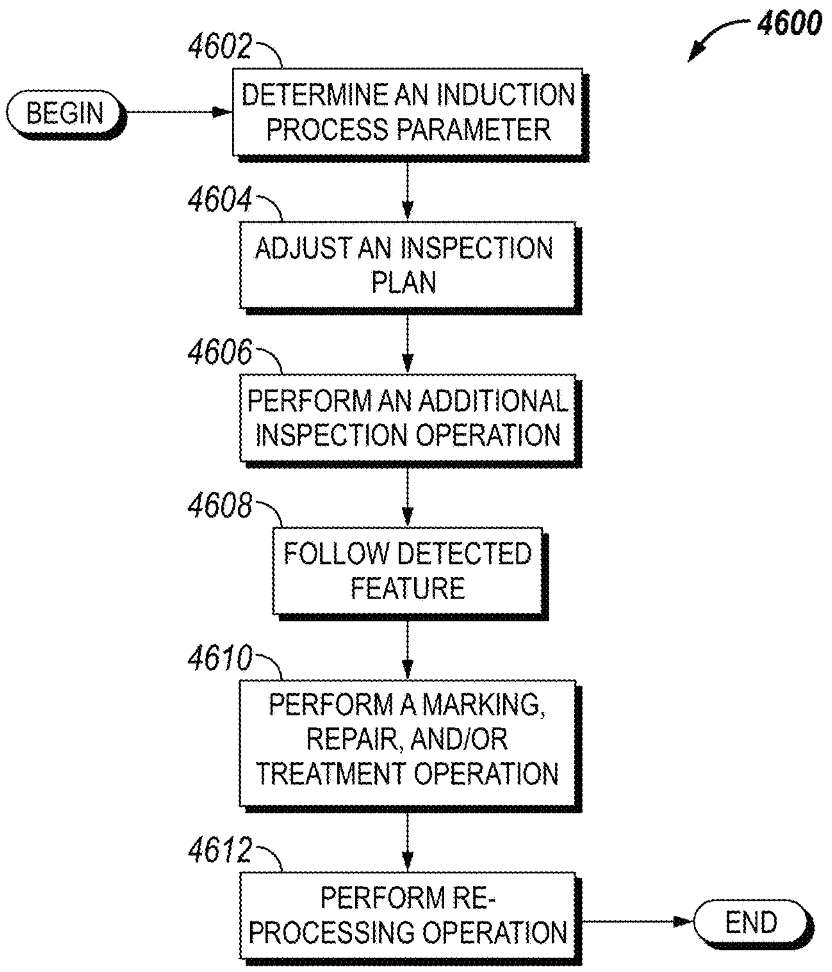
FIG. 44 is a schematic flow diagram of a procedure to re-process sensor data based on an induction process parameter.

Referencing FIG. 44, an example procedure 4600 to adjust an inspection operation in real-time in response to a magnetic induction sensor is schematically depicted. In certain embodiments, example procedure 4600 includes an operation 4602 to determine an induction processing parameter, such as a substrate distance value, a sensor position value, and/or a rationality diagnostic value. In certain embodiments, the example procedure 4600 includes an operation 4604 to adjust an inspection plan in response to the induction processing parameter. Example and non-limiting operations 4604 to an inspection plan include: adjusting a sensor calibration value (e.g., for an ultra-sonic sensor, a temperature sensor, etc.) for a sensor that may be affected by the coating, debris, or other matter between the magnetic induction sensor and a substrate of the inspection surface; adjusting an inspection resolution for one or more sensors for a planned inspection operation; adjusting a planned inspection map display for an inspection operation, and/or including adjusting sensors, sled positions, and/or an inspection robot trajectory to support the planned inspection map display; adjusting an inspection robot trajectory (e.g., locations, paths, number of runs, and/or movement speed on the inspection surface); adjusting a number, type, and/or positioning (e.g., sled numbers, placement, and/or payload positions) for sensors for an inspection operation; adjusting a wheel magnet strength and/or wheel configuration of an inspection robot in response to the induction processing parameter (e.g., adjusting for an expected distance to a ferrous material, configuring the wheels to manage debris, etc.); adjusting a sled ramp configuration (e.g., sled ramp leading and/or following slope, shape, and/or depth); and/or adjusting a down force for a sled and/or sensor. Operations 4604 may be performed in real-time, such as a change of an inspection plan during inspection operations, and/or at design or set-up time, such as a change of a configuration for the inspection robot or any other aspects described herein before an inspection run, between inspection runs, or the like.

In certain embodiments, the example procedure 4600 includes an operation 4606 to perform an additional inspection operation in response to the induction processing parameter. For example, operation 4606 may include operations such as: inspecting additional portions of the inspection surface and/or increasing the size of the inspection surface (e.g., to inspect other portions of an industrial system, facility, and/or inspection area encompassing the inspection surface); to activate trailing payloads and/or a rear payload to perform the additional inspection operation; re-running an inspection operation over an inspection area that at least partially overlaps a previously inspected area; and/or performing a virtual additional inspection operation—for example re-processing one or more aspects of inspection data in view of the induction processing parameter.

In certain embodiments, the example procedure 4600 includes an operation 4608 to follow a detected feature, for example activating a sensor configured to detect the feature as the inspection robot traverses the inspection surface, and/or configuring the inspection robot to adjust a trajectory to follow the feature (e.g., by changing the robot trajectory in real-time, and/or performing additional inspection operations to cover the area of the feature). Example and non-limiting features include welds, grooves, cracks, coating difference areas (e.g., thicker coating, thinner coating, and/or a presence or lack of a coating). In certain embodiments, the example procedure 4600 includes an operation 4610 to perform at least one of a marking, repair, and/or treatment operation, for example marking features (e.g., welds, grooves, cracks, and/or coating difference areas), and/or performing a repair and/or treatment operation (e.g., welding, applying an epoxy, applying a cleaning operation, and/or applying a coating) appropriate for a feature. In certain embodiments, operation 4610 to perform a marking operation includes marking the inspection surface in virtual space—for example as a parameter visible on an inspection map but not physically applied to the inspection surface.

In certain embodiments, the example procedure 4600 includes an operation 4612 to perform a re-processing operation in response to the induction processing parameter. For example, and without limitation, acoustic raw data, primary mode values and/or primary mode score values, and/or secondary mode values and/or secondary mode score values may be recalculated over at least a portion of an inspection area in response to the induction processing parameter. In certain embodiments, ultra-sonic sensor calibrations may be adjusted in a post-processing operation to evaluate, for example, wall thickness and/or imperfections (e.g., cracks, deformations, grooves, etc.) utilizing the induction processing parameter(s).

Operations for procedure 4600 are described in view of an induction processing parameter for clarity of description. It is understood that a plurality of induction processing parameters, including multiple parameter types (e.g., coating presence and/or coating thickness) as well as a multiplicity of parameter determinations (e.g., position based induction processed values across at least a portion of the inspection surface) are likewise contemplated herein. In certain embodiments, one or more operations of procedure 4600 are performed by a controller 802.

Figure 45:
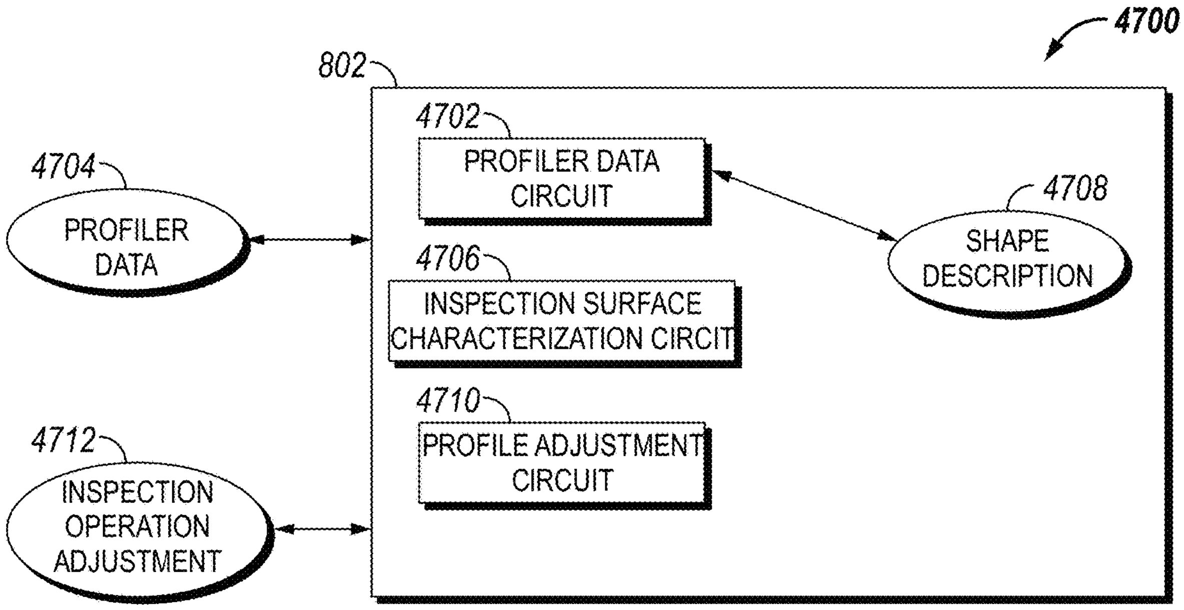
FIG. 45 is a schematic block diagram of a procedure to utilize a shape description.

Referencing FIG. 45, an example apparatus 4700 for utilizing a profiling sensor on an inspection robot is schematically depicted. Example and non-limiting profiling sensors include a laser profiler (e.g., a high spatial resolution laser beam profiler) and/or a high resolution caliper log. A profiling sensor provides for a spatial description of the inspection surface—for example variations in a pipe 502 or other surface can be detected, and/or a high resolution contour of at least a portion of the inspection surface can be determined. In certain embodiments, a controller 802 includes a profiler data circuit 4702 that interprets profiler data 4704 provided by the profiling sensor. The example controller 802 further includes an inspection surface characterization circuit 4706 that provides a characterization of the shape of the inspection surface in response to the profiler data—for example as a shape description 4708 of the inspection surface, including anomalies, variations in the inspection surface geometry, and/or angles of the inspection surface (e.g., to determine a perpendicular angle to the inspection surface). The example controller 802 further includes a profile adjustment circuit 4710 that provides an inspection operation adjustment 4712 in response to the shape description 4708. Example and non-limiting inspection operation adjustments 4712 include: providing an adjustment to a sled, payload, and/or sensor orientation within a sled (e.g., to provide for a more true orientation due to a surface anomaly, including at least changing a number and configuration of sleds on a payload, configuring a payload to avoid an obstacle, adjusting a down force of a sled, arm, sensor, and/or payload, and/or adjusting a shape of a sled bottom surface); a change to a sensor resolution value (e.g., to gather additional data in the vicinity of an anomaly or shape difference of the inspection surface); a post-processing operation (e.g., re-calculating ultra-sonic and/or magnetic induction data—for example in response to a shape of the inspection surface, and/or in response to a real orientation of a sensor to the inspection surface—such as correcting for oblique angles and subsequent sonic and/or magnetic effects); a marking operation (e.g., marking an anomaly, shape difference, and/or detected obstacle in real space—such as on the inspection surface—and/or in virtual space such as on an inspection map); and/or providing the inspection operation adjustment 4712 as an instruction to a camera to capture an image of an anomaly and/or a shape difference.

Figure 46:
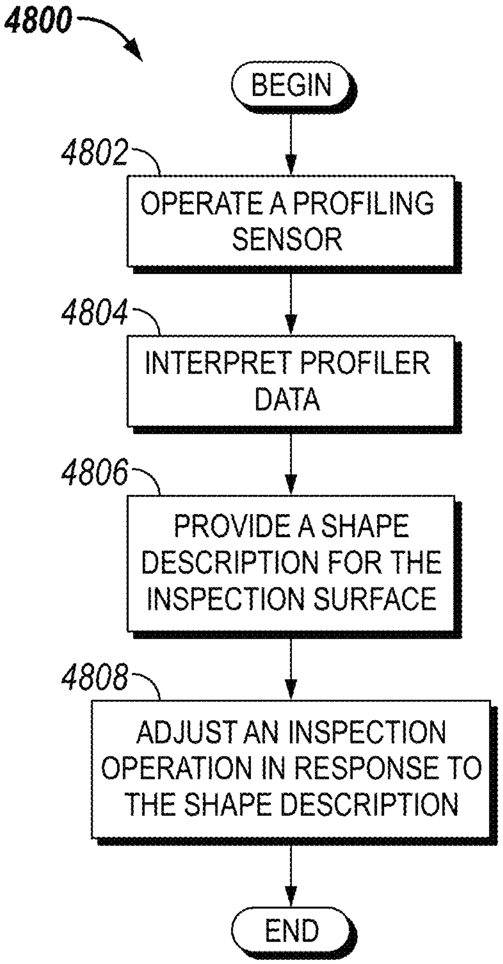
FIG. 46 is a schematic flow diagram of a procedure to adjust an inspection operation in response to profiler data.

Referencing FIG. 46, an example procedure 4800 for utilizing a profiling sensor on an inspection robot is schematically depicted. The example procedure 4800 includes an operation 4802 to operate a profiling sensor on at least a portion of an inspection surface, and an operation 4804 to interpret profiler data in response to the operation 4802. The example procedure 4800 further includes an operation 4806 to characterize a shape of the inspection surface, and/or thereby provide a shape description for the inspection surface, and an operation 4808 to adjust an inspection operation in response to the shape of the inspection surface.

Figure 47:
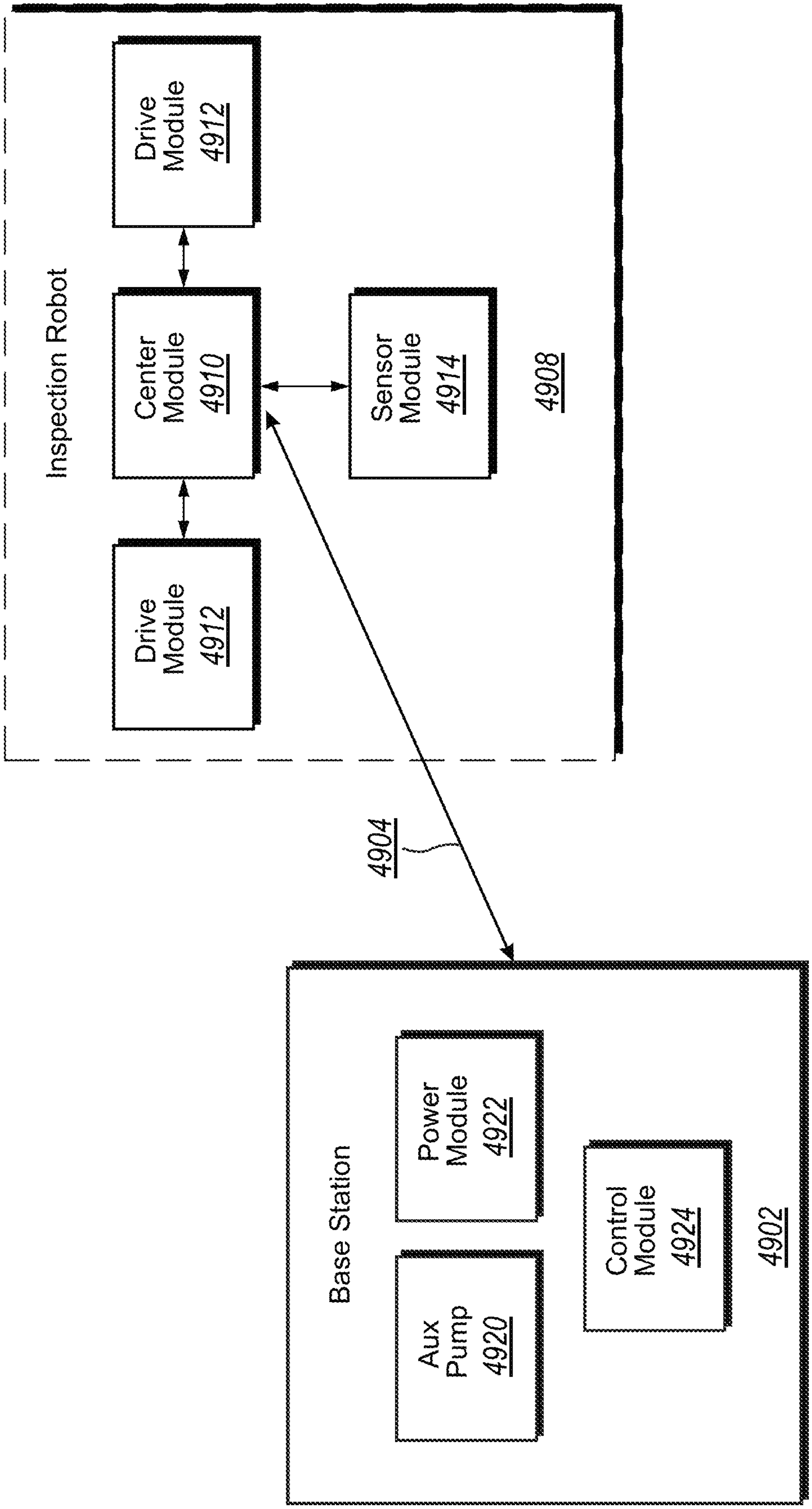
FIG. 47 depicts a schematic of an example system including a base station and an inspection robot.

As shown in FIG. 47, a system may comprise a base station 4902 connected by a tether 4904 to a center module 4910 of a robot 4908 used to traverse an industrial surface. The tether 4904 may be a conduit for power, fluids, control, and data communications between the base station 4902 and the robot 4908. The robot 4908 may include a center module 4910 connected to one or more drive modules 4912 which enable the robot 4908 to move along an industrial surface. The center module 4910 may be coupled to one or more sensor modules 4914 for measuring an industrial surface—for example the sensor modules 4914 may be positioned on a drive module 4912, on the payload, in the center body housing, and/or aspects of a sensor module 4914 may be distributed among these. An example embodiment includes the sensor modules 4914 each positioned on an associated drive module 4912, and electrically coupled to the center module 4910 for power, communications, and/or control. The base station 4902 may include an auxiliary pump 4920, a control module 4924 and a power module 4922. The example robot 4908 may be an inspection robot, which may include any one or more of the following features: inspection sensors, cleaning tools, and/or repair tools. In certain embodiments, it will be understood that an inspection robot 4908 is configured to perform only cleaning and/or repair operations, and/or may be configured for sensing, inspection, cleaning, and/or repair operations at different operating times (e.g., performing one type of operation at a first operating time, and performing another type of operation at a second operating time), and/or may be configured to perform more than one of these operations in a single run or traversal of an industrial surface (e.g., the "inspection surface"). The modules 4910, 4912, 4914, 4920, 4922, 4924 are configured to functionally execute operations described throughout the present disclosure, and may include any one or more hardware aspects as described herein, such as sensors, actuators, circuits, drive wheels, motors, housings, payload configurations, and the like.

Figure 48:
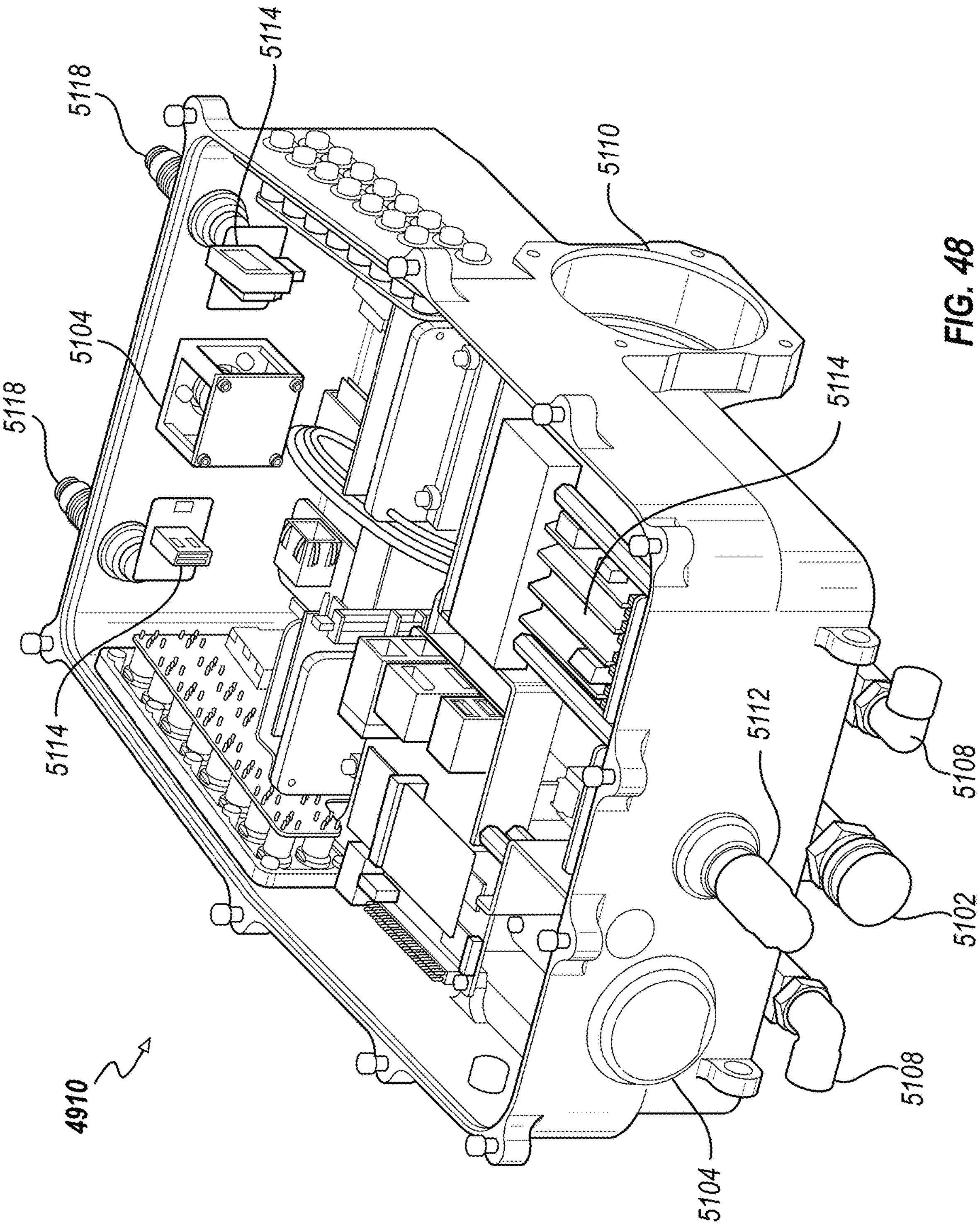
FIG. 48 depicts an internal view of certain components of the center module.

As shown in FIG. 48, the center module 4910 (or center body or chasis) of the robot may include a couplant interface 5102, a data communications/power/control tether input 5112, forward facing and reverse facing navigation cameras 5104, multiple sensor connectors 5118, couplant outlets 5108 (e.g., to each payload), and one or more drive module connections 5110 (e.g., one on each side). An example center module 4910 includes a distributed controller design, with low-level and hardware control decision making pushed down to various low level control modules (e.g., 5114, and/or further control modules on the drive modules as described throughout the present disclosure). The utilization of a distributed controller design, for example as depicted schematically in FIG. 85, facilitates rapid design, rapid upgrades to components, and compatibility with a range of components and associated control modules 5114. For example, the distributed controller design allows the high level controller (e.g., the brain/gateway) to provide communications in a standardized high-level format (e.g., requesting movement rates, sensed parameter values, powering of components, etc.) without utilizing the hardware specific low-level controls and interfaces for each component, allowing independent development of hardware components and associated controls. The use of the low-level control modules may improve development time and enable the base level control module to be component neutral and send commands, leaving the specific implementation up to the low-level control module 5114 associated with a specific camera, sensor, sensor module, actuator, drive module, and the like. The distributed controller design may extend to distributing the local control to the drive module(s) and sensor module(s) as well.

Figure 49:
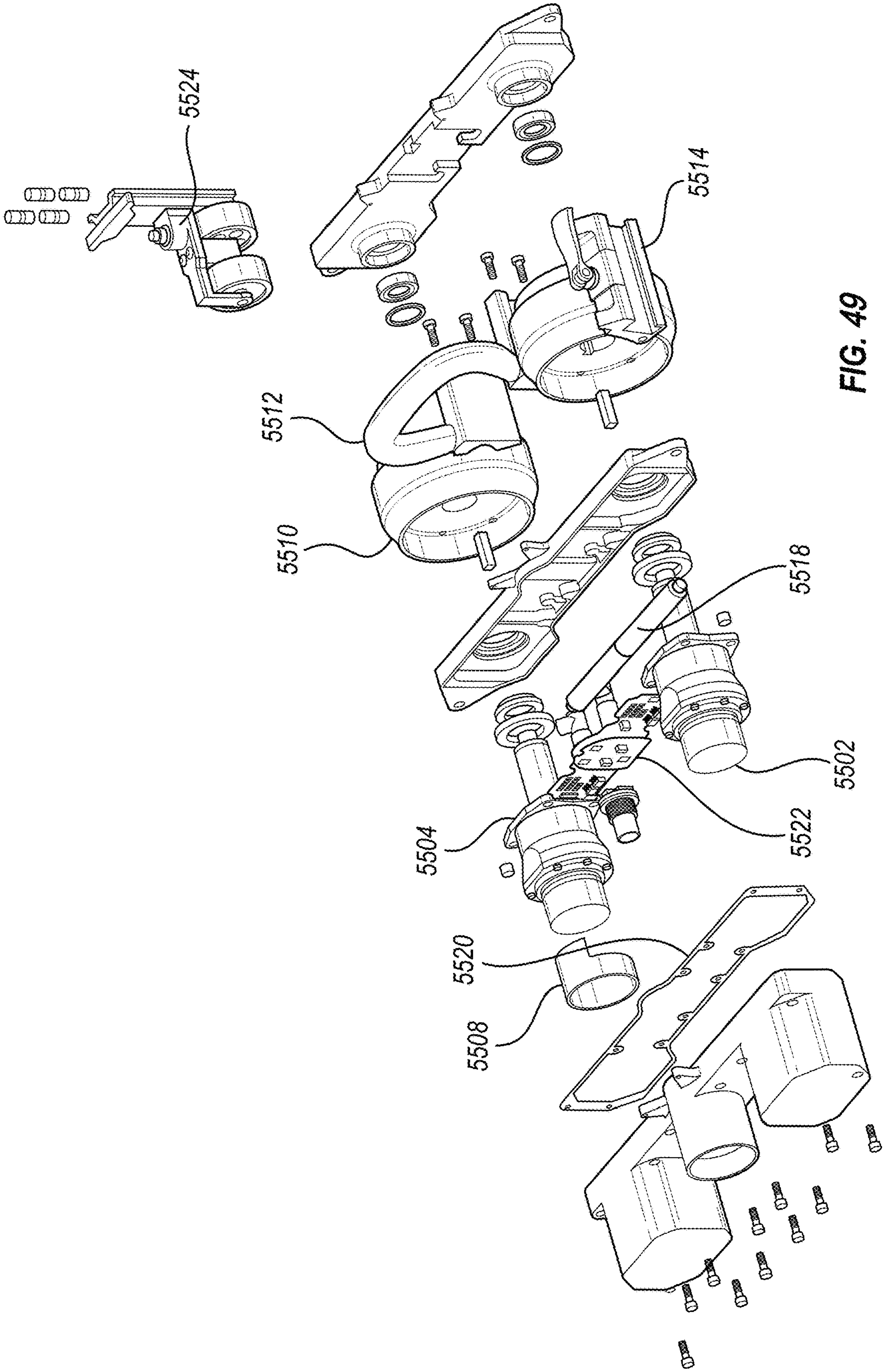
FIG. 49 depicts an exploded view of a drive module.

FIG. 49 shows an exterior and exploded view of a drive module 4912. A drive module 4912 may include motors 5502 and motor shielding 5508, a wheel actuator assembly 5504 housing the motor, and wheel assemblies 5510 including, for example, a magnetic wheel according to any magnetic wheel described throughout the present disclosure. An example drive module 4912 includes a handle 5512 to enable an operator to transport the robot 4908 and position the robot 4908 on an industrial surface. The motor shielding 5508 may be made of an electrically conductive material, and provide protection for the motors 5502 and associated motor position and/or speed sensors (e.g., a hall effect sensor) from electro-magnetic interference (EMI) generated by the wheel assembly 5510. The drive module 4912 provides a mounting rail 5514 for a payload and/or sensor module 4914, which may cooperate with a mounting rail on the center body to support the payload. An example drive module 4912 includes one or more payload actuators 5518 (e.g., the payload gas spring) for engaging and disengaging the payload or sensor module 4914 from an inspection surface (or industrial surface), and/or for adjusting a down force of the payload (and thereby a downforce for specific sensor carriages and/or sleds) relative to the inspection surface. The drive module 4912 may include a connecter 5522 that provides an interface with the center module for power and communications and a cover 5520 for the motors.

A drive module (FIG. 49) may include a hall effect sensor in each of the motors 5502 as part of non-contact encoder for measuring the rotation of each motor as it drives the associated wheel assembly 5510. There may be shielding 5508 (e.g., a conductive material such as steel) to prevent unintended EMI noise from a magnet in the wheel inducing false readings in the hall effect sensor.

Data from the encoder assembly encoder and the driven wheel encoder 5524 (e.g., the motion and/or position sensor associated with the drive motor for the magnetic wheels) provide an example basis for deriving additional information, such as whether a wheel is slipping by comparing the encoder assembly readings (which should reliably show movement only when actual movement is occurring) to those of the driven wheel encoders on the same drive module. If the encoder assembly shows limited or no motion while the driven wheel encoder(s) show motion, drive wheels slipping may be indicated. Data from the encoder assembly and the driven wheel encoders may provide a basis for deriving additional information such as whether the robot is travelling in a straight line, as indicated by similar encoder values between corresponding encoders in each of the two drive modules on either side of the robot. If the encoders on one of the drive modules indicate little or no motion while the encoders of the other drive module show motion, a turning of the inspection robot toward the side with limited movement may be indicated.

The base station may include a GPS module or other facility for recognizing the position of the base station in a plant. The encoders on the drive module provide both absolute (relative to the robot) and relative information regarding movement of the robot over time. The combination of data regarding an absolute position of the base station and the relative movement of the robot may be used to ensure complete plant inspection and the ability to correlate location with inspection map.

The central module (FIG. 48) may have a camera 5104 that may be used for navigation and obstacle detection, and/or may include both a front and rear camera 5104 (e.g., as shown in FIG. 48). A video feed from a forward facing camera (relative to the direction of travel) may be communicated to the base station to assist an operator in obstacle identification, navigation, and the like. The video feed may switch between cameras with a change in direction, and/or an operator may be able to selectively switch between the two camera feeds. Additionally or alternatively, both cameras may be utilized at the same time (e.g., provided to separate screens, and/or saved for later retrieval). The video and the sensor readings may be synchronized such that, for example: an operator (or display utility) reviewing the data would be able to have (or provide) a coordinated visual of the inspection surface in addition to the sensor measurements to assist in evaluating the data; to provide repairs, mark repair locations, and/or confirm repairs; and/or to provide cleaning operations and/or confirm cleaning operations. The video camera feeds may also be used for obstacle detection and path planning, and/or coordinated with the encoder data, other position data, and/or motor torque data for obstacle detection, path planning, and/or obstacle clearance operations.

Figure 50:
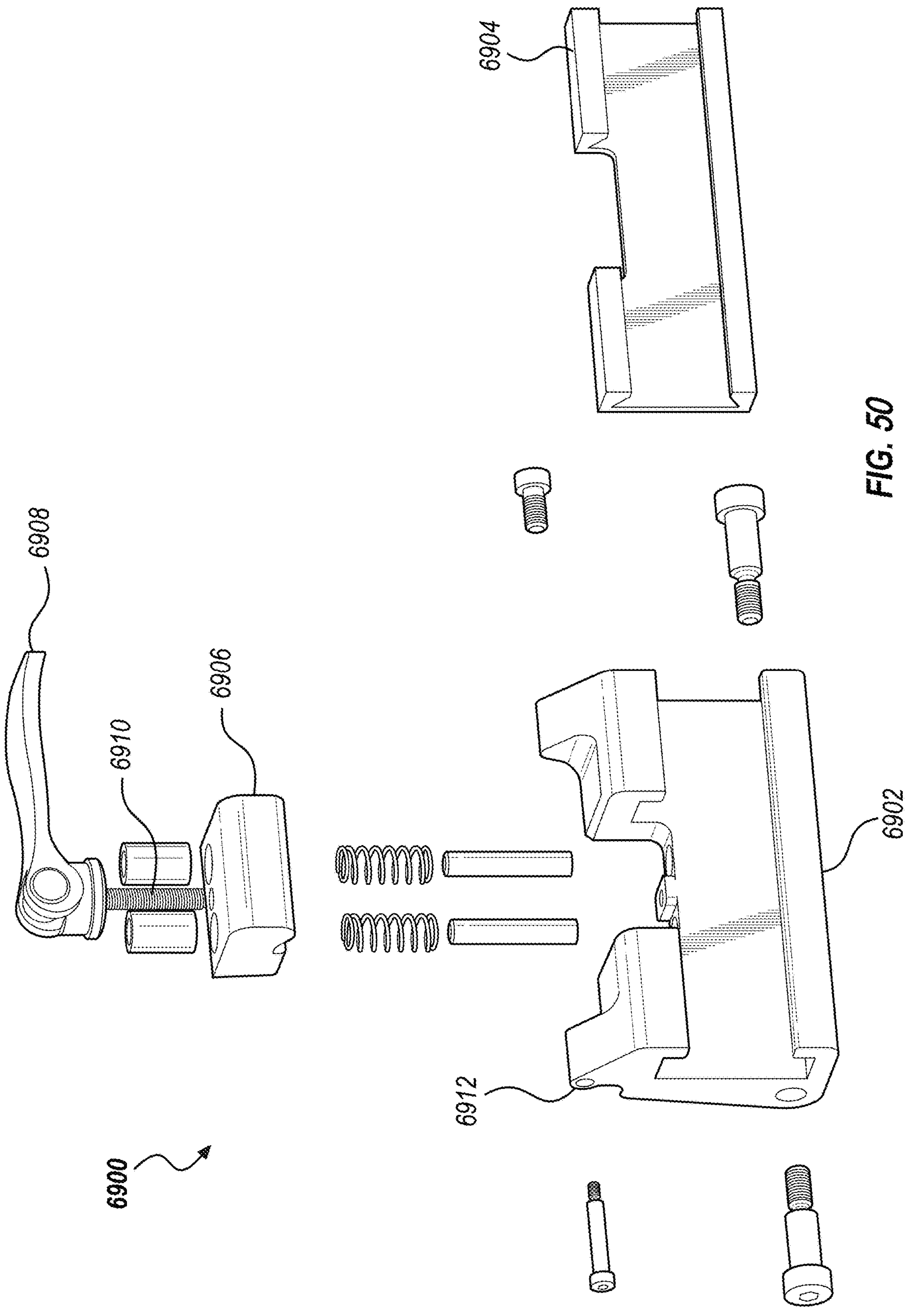
FIG. 50 depicts an exploded view of a dovetail payload rail mount assembly.
Figure 51:
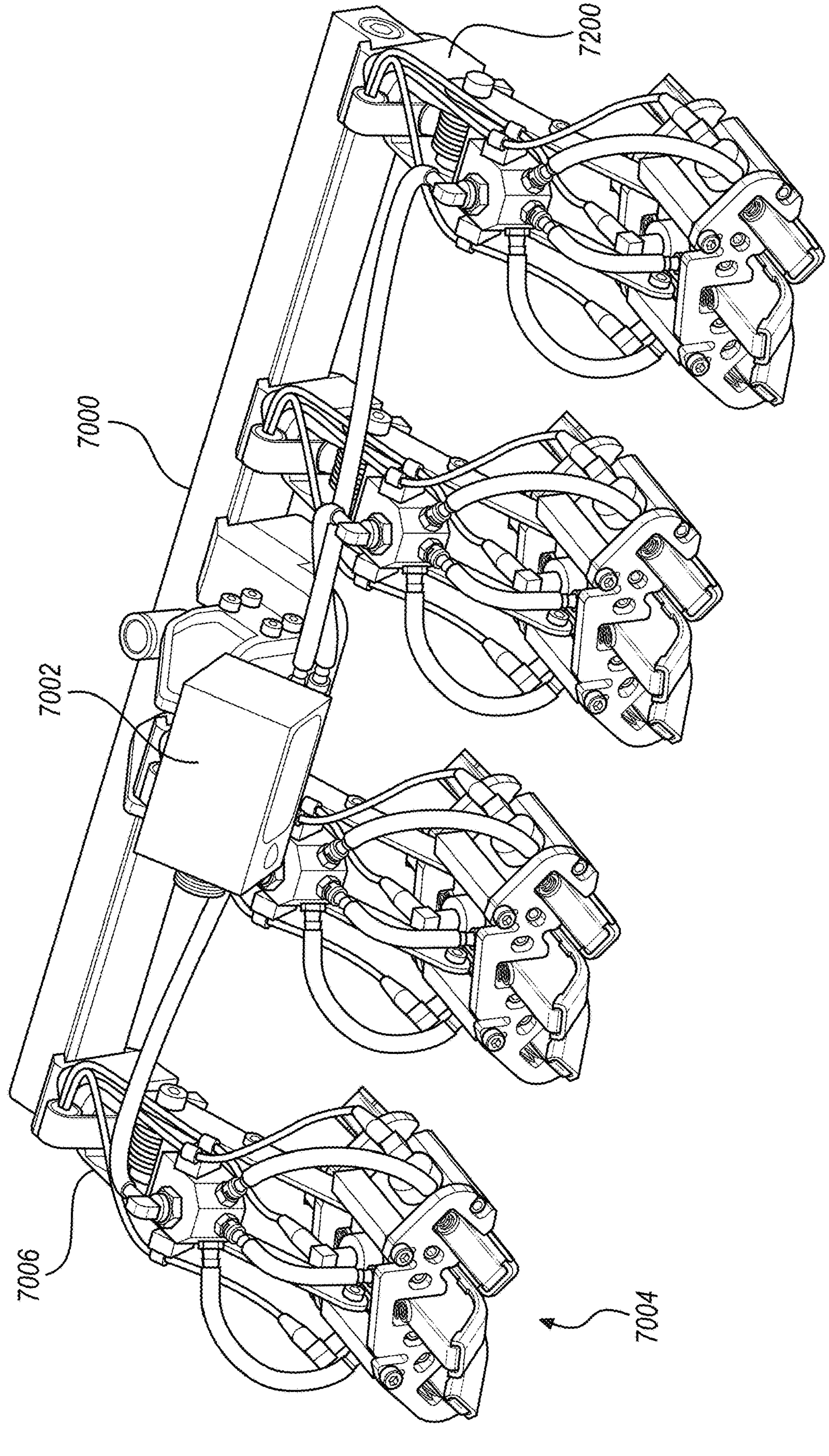
FIG. 51 depicts a payload with sensor carriages and an inspection camera.

Referring to FIG. 50, a drive module (and/or the center body) may include one or more payload mount assemblies 6900. The payload mount assembly 6900 may include a rail mounting block 6902 with a wear resistant sleeve 6904 and a rail actuator connector 6912. Once a rail of the payload is slid into position, a dovetail clamping block 6906 may be screwed down with a thumbscrew 6910 to hold the rail in place with a cam-lock clamping handle 6908. The wear resistant sleeve 6904 may be made of Polyoxymethylene (POM), a low friction, strong, high stiffness material such as Delrin, Celecon, Ramtal, Duracon, and the like. The wear resistant sleeve 6904 allows the sensor to easily slide laterally within the rail mounting block 6902. The geometry of the dovetail clamping block 6906 limits lateral movement of the rail once it is clamped in place. However, when unclamped, it is easy to slide the rail off to change the rail. In another embodiment, the rail mounting block may allow for open jawed, full rail coupling allowing the rail to be rapidly attached and detached without the need for sliding into position.

Figure 52A:
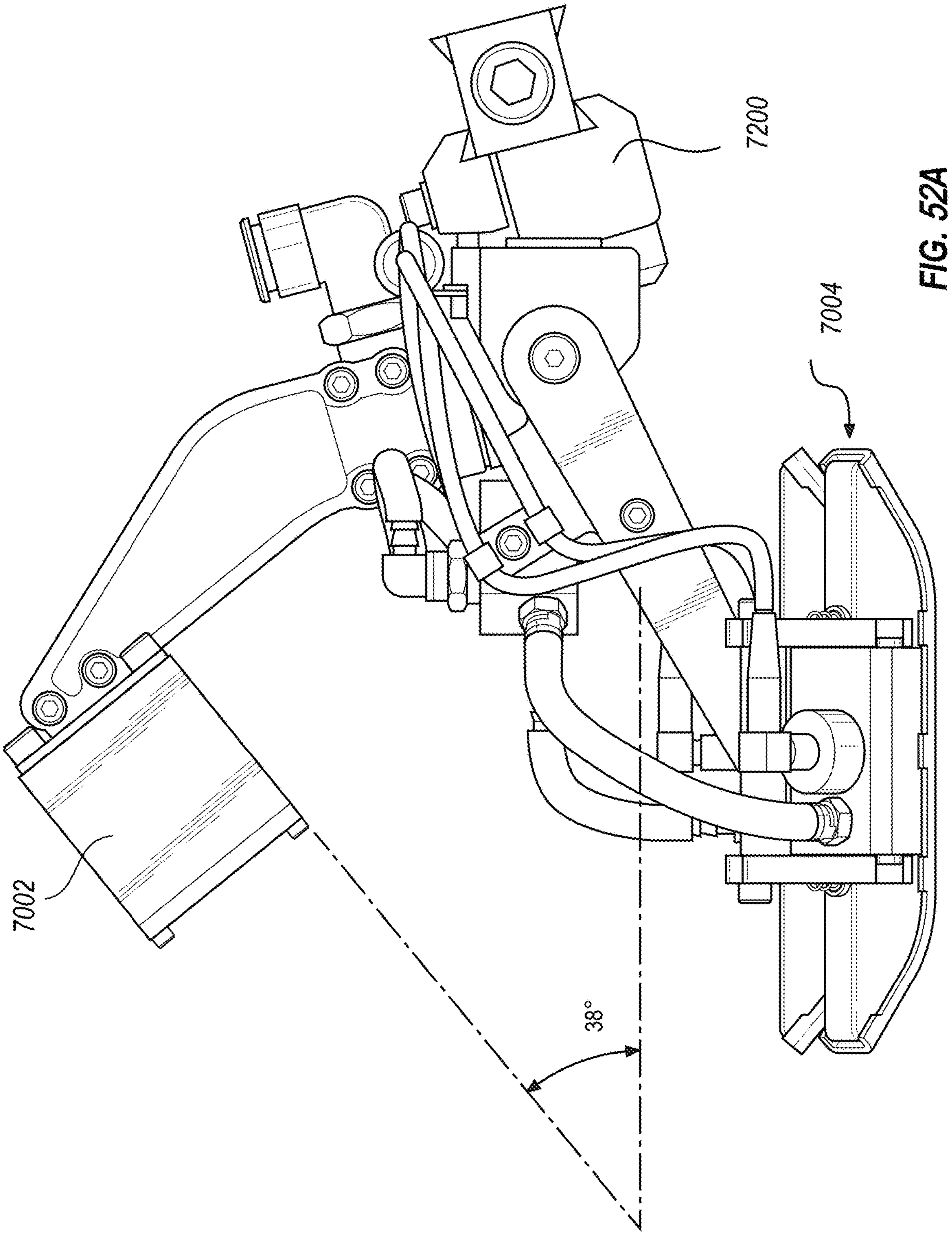
FIG. 52A depicts an example side view of a payload and inspection camera.
Figure 52B:
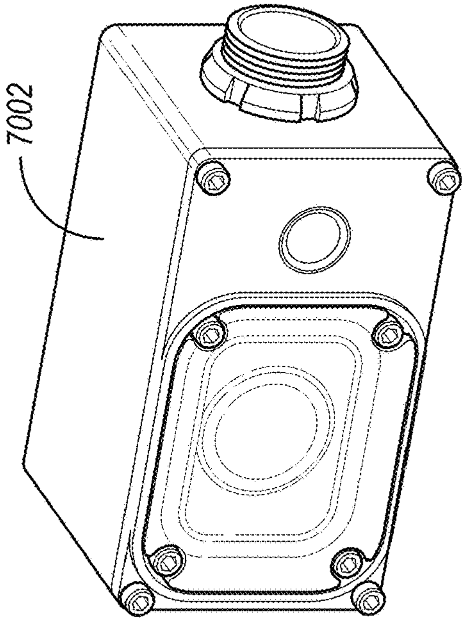
FIGS. 52B-52C depict details of an example inspection camera.
Figure 52C:
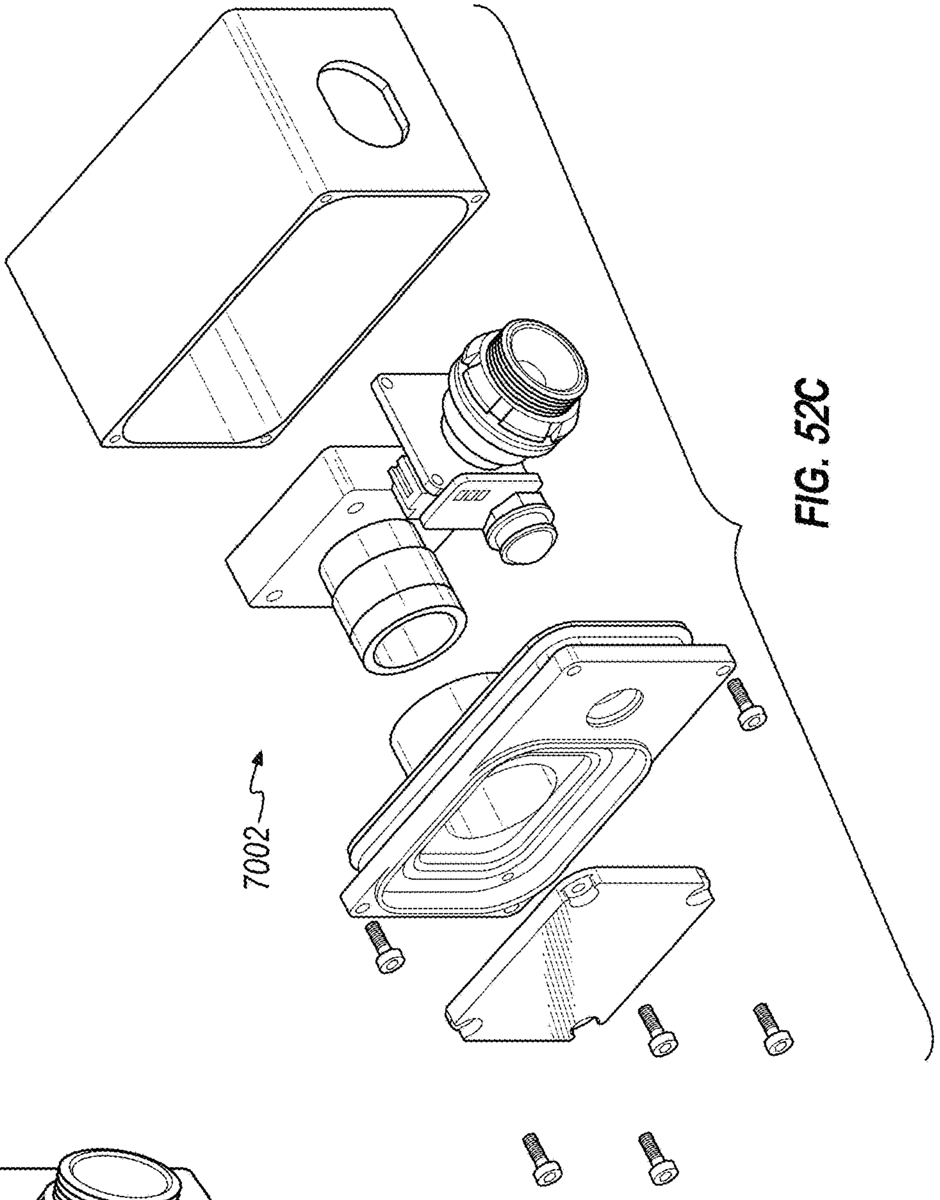

Referring to FIGS. 51 and 52A-C, an example of a rail 7000 is seen with a plurality of sensor carriages 7004 attached and an inspection camera 7002 attached. As shown in FIG. 52A, the inspection camera 7002 may be aimed downward (e.g., at 38 degrees) such that it captures an image of the inspection surface that can be coordinated with sensor measurements. The inspection video captured may be synchronized with the sensor data and/or with the video captured by the navigation cameras on the center module. The inspection camera 7002 may have a wide field of view such that the image captured spans the width of the payload and the surface measured by all of the sensor carriages 7004 on the rail 7000.

The length of the rail may be designed to according to the width of sensor coverage to be provided in a single pass of the inspection robot, the size and number of sensor carriages, the total weight limit of the inspection robot, the communication capability of the inspection robot with the base station (or other communicated device), the deliverability of couplant to the inspection robot, the physical constraints (weight, deflection, etc.) of the rail and/or the clamping block, and/or any other relevant criteria. A rail may include one or more sensor carriage clamps 7006, 7200 having joints with several degrees of freedom for movement to allow the robot to continue even if one or more sensor carriages encounter unsurmountable obstacles (e.g., the entire payload can be raised, the sensor carriage can articulate vertically and raise over the obstacle, and/or the sensor carriage can rotate and traverse around the obstacle).

The rail actuator connector 6912 may be connected to a payload actuator 5518 (FIG. 49) which is able to provide a configurable down-force on the rail 7000 and the attached sensor carriages 7004 to assure contact and/or desired engagement angle with the inspection surface. The payload actuator 5518 may facilitate engaging and disengaging the rail 7000 (and associated sensor carriages 7004) from the inspection surface to facilitate obstacle avoidance, angle transitions, engagement angle, and the like. Payload actuators 5518 may operate independently of one another. Thus, rail engagement angle may vary between drive modules on either side of the center module, between front and back rails on the same drive module, and the like.

Figure 53B:
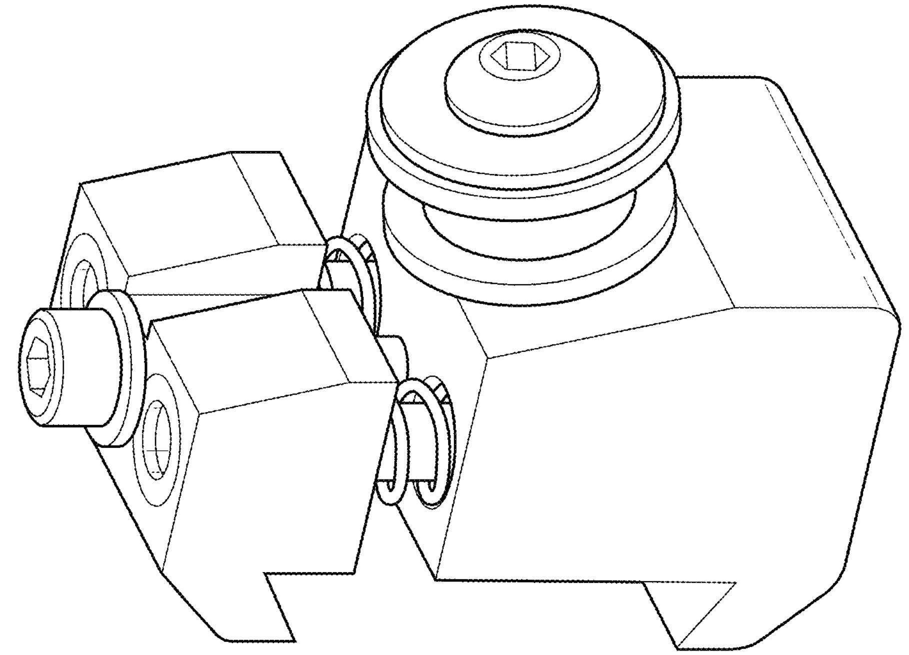
FIGS. 53A-53B depict clamped and un-clamped views of a sensor clamp.
Figure 53A:
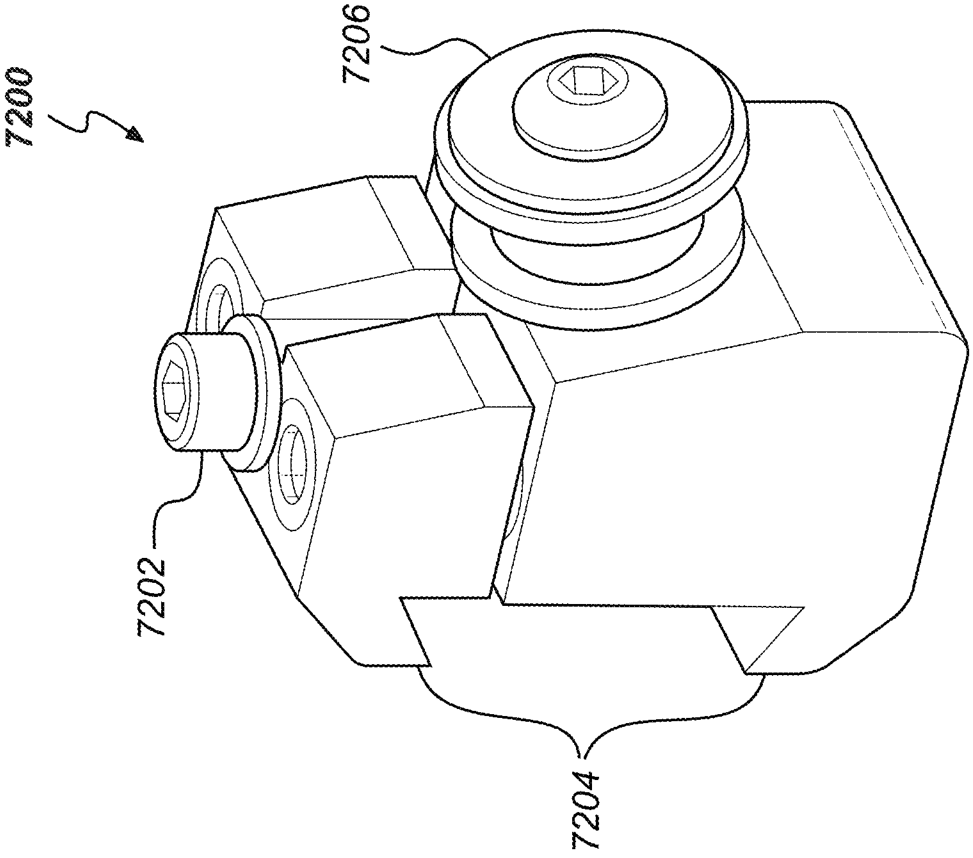
Figure 53C:
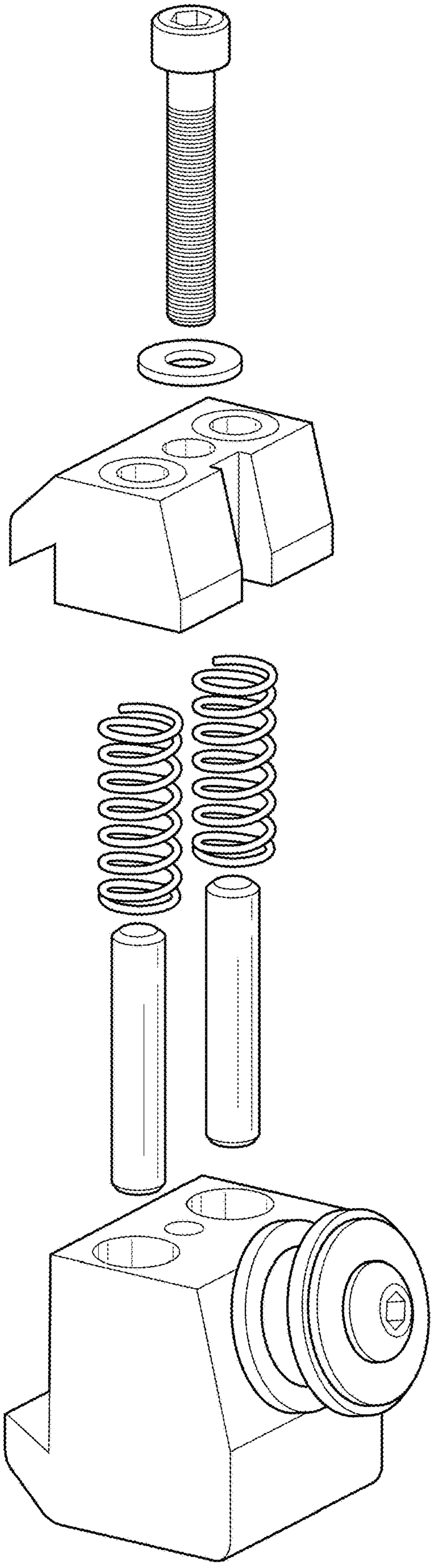
FIG. 53C depicts an exploded view of a sensor carriage clamp.
Figure 54A:
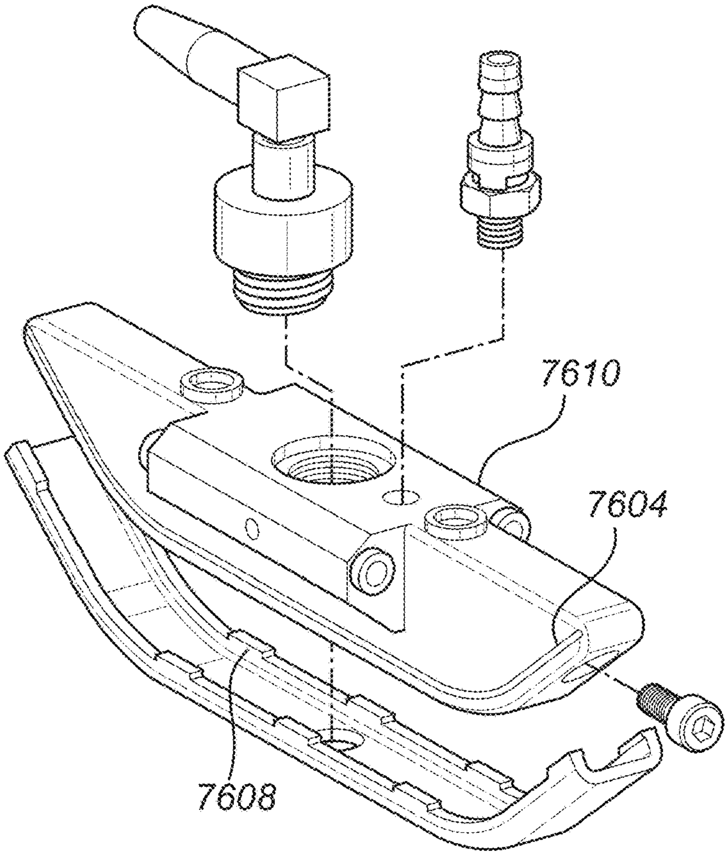
FIG. 54A depicts a perspective view looking down on an exploded view of a sensor housing.
Figure 54B:
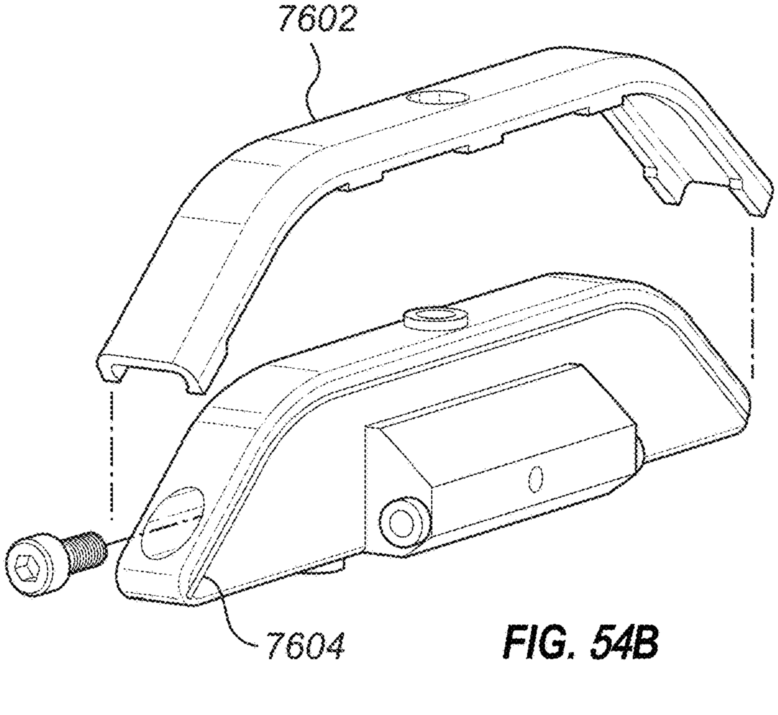
FIG. 54B depicts a perspective view looking up on an exploded view of the bottom of a sensor housing.
Figure 54C:
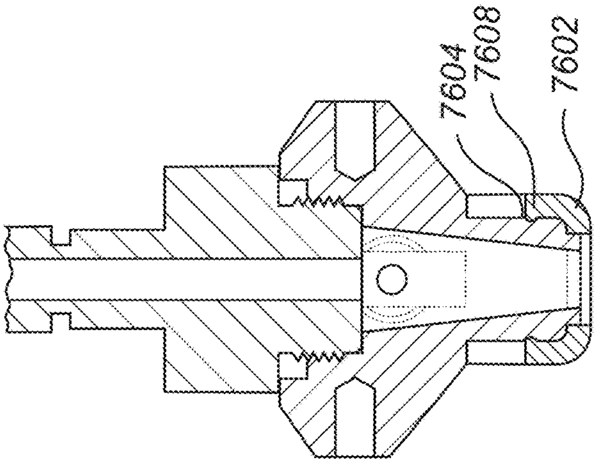
FIG. 54C depicts a front view cross-section of a sensor housing and surface contact relative to an inspection surface.
Figure 54D:
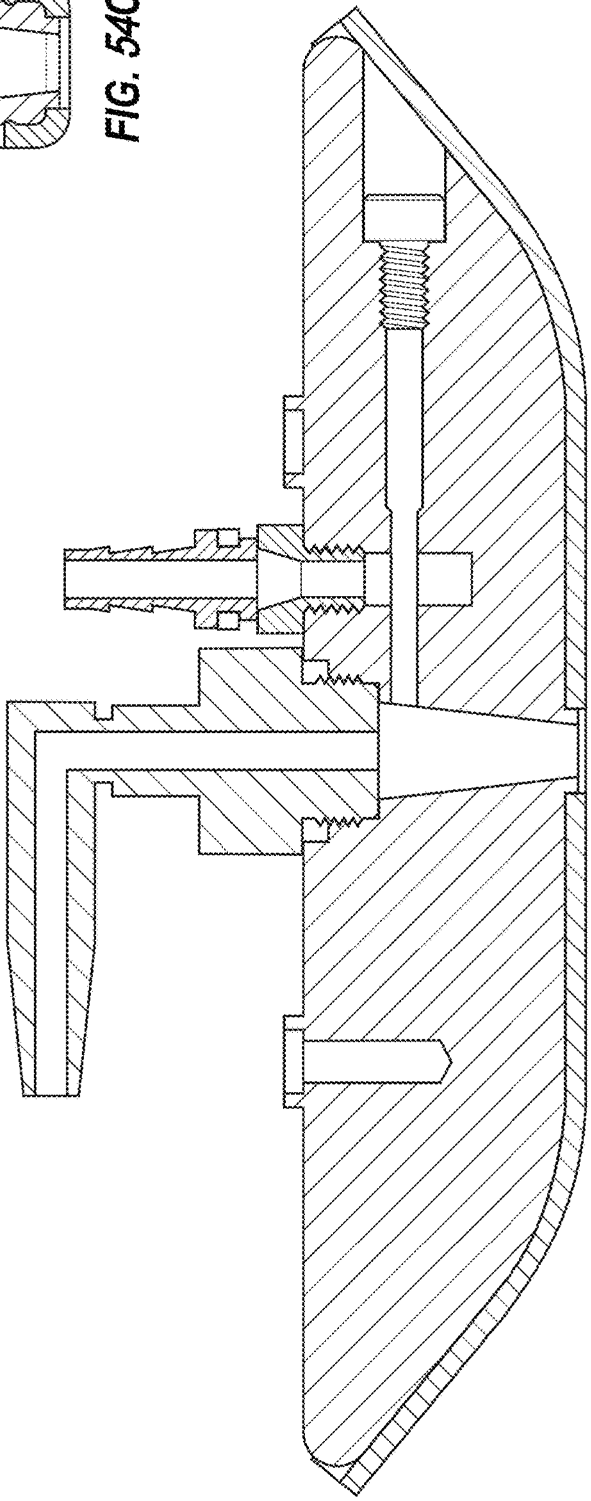
FIG. 54D depicts a side view cross-section of a sensor housing.

Referring to FIGS. 53A-53C, a sensor clamp 7200 may allow sensor carriages 7004 to be easily added individually to the rail (payload) 7000 without disturbing other sensor carriages 7004. A simple sensor set screw 7202 tightens the sensor clamp edges 7204 of the sensor clamp 7200 over the rail. In the example of FIGS. 53A-53C, a sled carriage mount 7206 provides a rotational degree of freedom for movement.

Figure 55:
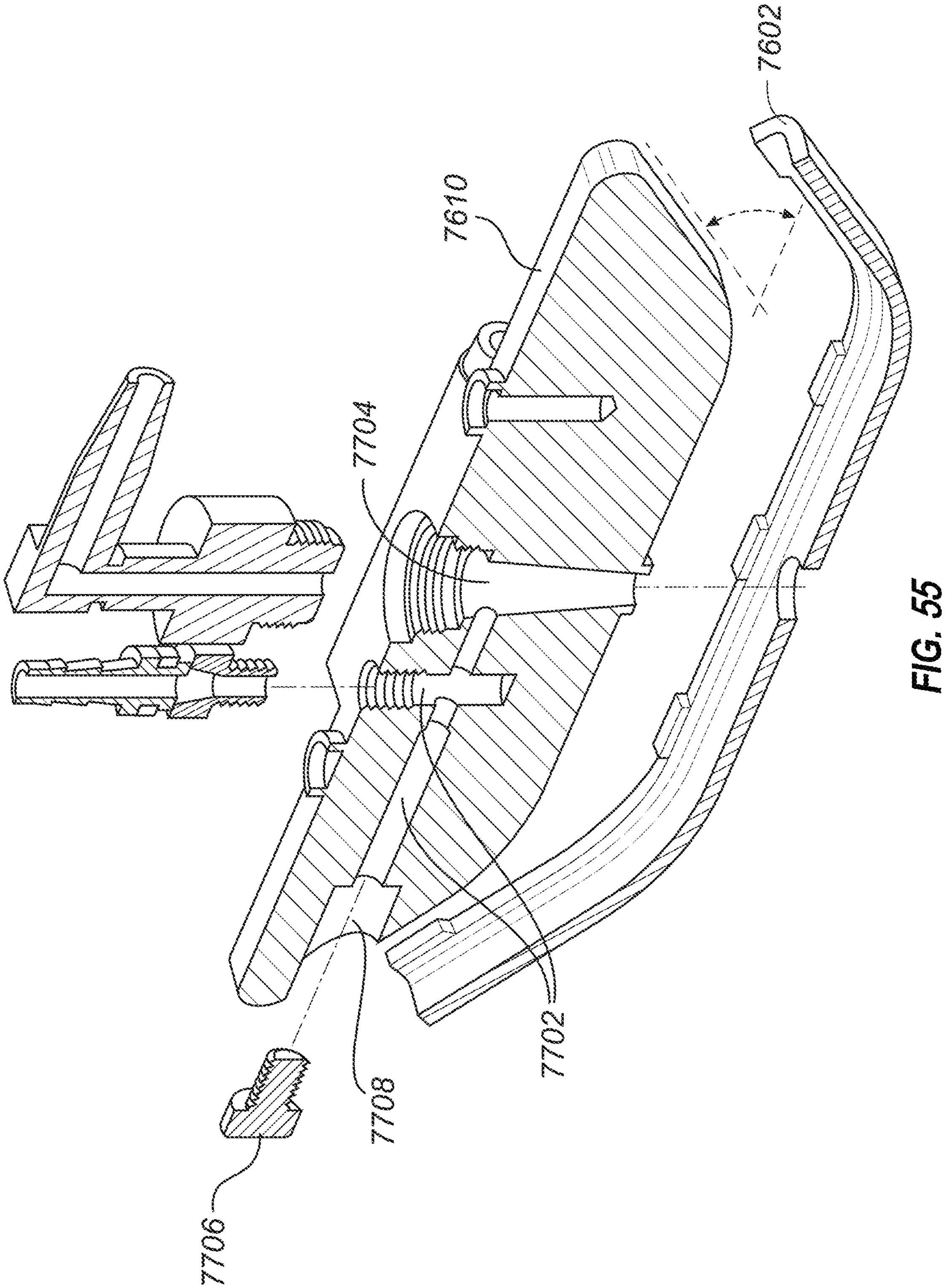
FIG. 55 depicts an exploded view of a cross-section of a sensor housing.

Referring to FIGS. 54A-54D, a sled may include a sensor housing 7610 having a groove 7604. A replaceable engagement surface 7602 may include one or more hooks 7608 which interact with the groove 7604 to snap the replaceable engagement surface 7602 to the sensor housing 7610. The sensor housing 7610, a cross section of which is shown in FIG. 55, may be a single machined part which may include an integral couplant channel 7702, in some embodiments this is a water line, and an integrated cone assembly 7704 to allow couplant to flow from a couplant connector down to the inspection surface. There may be a couplant plug 7706 to prevent the couplant from flowing out of a machining hole 7708 rather than down through the integrated cone assembly 7704 to the inspection surface. The front and back surface of the sled may be angled at approximately 40° to provide the ability of the sled to surmount obstacles on the navigation surface. If the angle is too shallow, the size of obstacle the sled is able to surmount is small. If the angle is too steep, the sled may be more prone to jamming into obstacles rather than surmounting the obstacles. The angle may be selected according to the size and type of obstacles that will be encountered, the available contingencies for obstacle traversal (degrees of freedom and amount of motion available, actuators available, alternate routes available, etc.), and/or the desired inspection coverage and availability to avoid obstacles.

In addition to structural integrity and machinability, the material used for the sensor housing 7610 may be selected based on acoustical characteristics (such as absorbing rather than scattering acoustic signals, harmonics, and the like), hydrophobic properties (waterproof), and the ability to act as an electrical insulator to eliminate a connection between the sensor housing and the chassis ground, and the like such that the sensor housing may be suitable for a variety of sensors including EMI sensors. A PEI plastic such as ULTEM® 1000 (unreinforced amorphous thermoplastic polyetherimide) may be used for the sensor housing 7610.

In embodiments, identification of a sensor and its location on a rail and relative to the center module may be made in real-time during a pre-processing/calibration process immediately prior to an inspection run, and/or during an inspection run (e.g., by stopping the inspection robot and performing a calibration). Identification may be based on a sensor ID provided by an individual sensor, visual inspection by the operator or by image processing of video feeds from navigation and inspection cameras, and user input include including specifying the location on the robot and where it is plugged in. In certain embodiments, identification may be automated, for example by powering each sensor separately and determining which sensor is providing a signal.

Figure 56A:
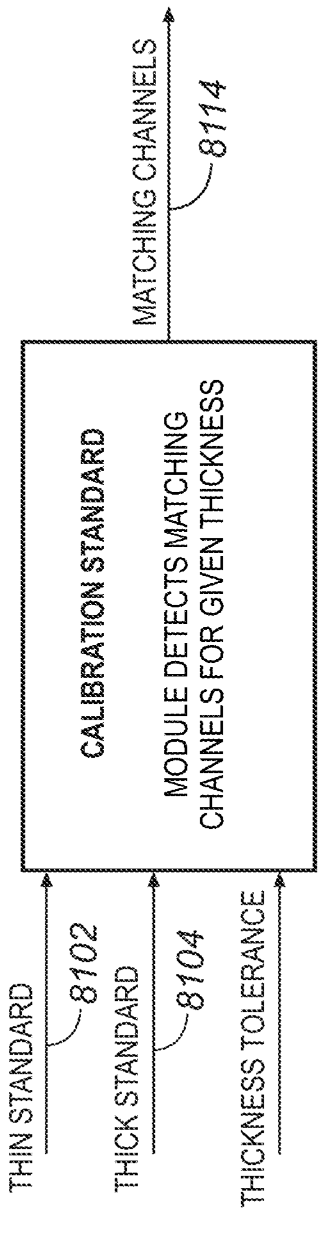
FIG. 56A depicts a calibration data flow for an ultra-sonic inspection robot.

In other embodiments, as shown in FIG. 56A, a sensor may be initially calibrated by measuring a thin standard 8102 and a thick standard 8104 (e.g., a thick and thin standard for the type of surface, pipe, etc. being measured), and matching the sensor being calibrated with the matching thick and thin channel measurements resulting in matching channel data 8114 having thick and thin channels that map to a specific sensor or sensor type. In certain embodiments, sensor measurements (e.g., return times, as described elsewhere in the present disclosure) may be matched by interpolation between the thin standard 8102 and the thick standard 8104. In certain embodiments, depending upon the material response and the desired measurement accuracy, measurements may be extrapolated outside of the thin standard 8102 and the thick standard 8104. Additionally or alternatively, a single standard may be utilized in certain embodiments, with measurement comparisons to the standard to provide the measured thickness value of the inspection surface.

Figure 56B:
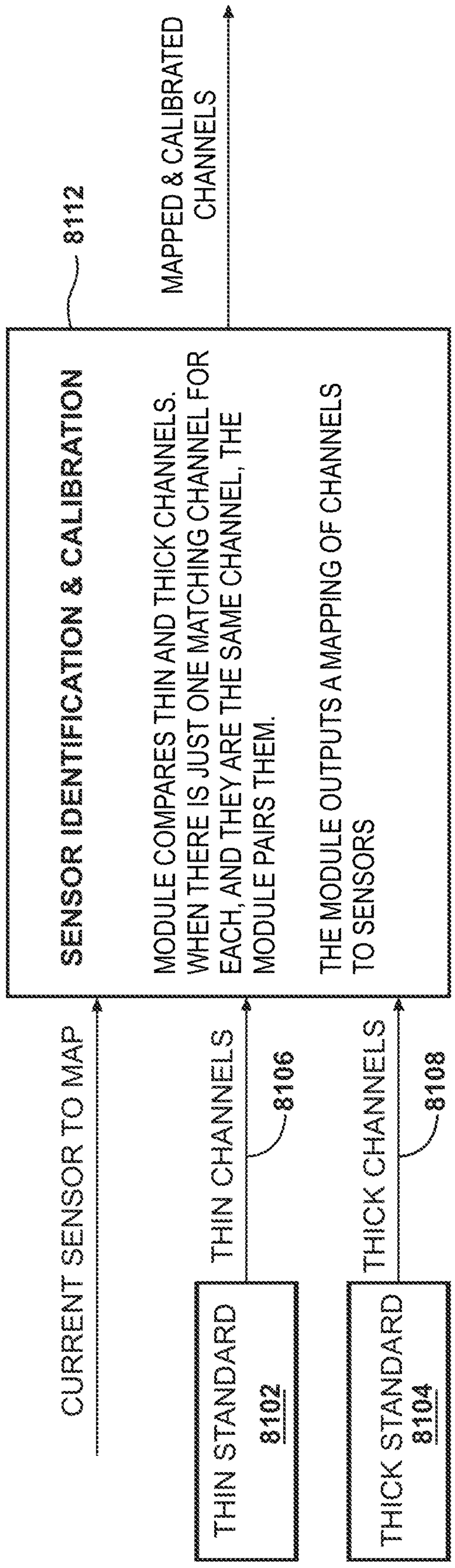
FIG. 56B depicts the flow of data for sensor identification and calibration.

As shown in FIG. 56B, a calibration block may include both a thick standard 8104 and a thin standard 8102, each standard 8102, 8104 having precisely known thicknesses. Measurements may be made of each standard 8102, 8104, resulting in thin channels of data 8106 and thick channels of data 8108. The sensor identification and calibration module 8112 compares the incoming thin and thick channels of data 8106, 8108 with a plurality of matching channel data 8114 and, once matches for both the thin channel of data 8106 and the thick channel of data 8108 are found in a single matching channel, the sensor identification and calibration module 8112 pairs the sensor definition with the data coming in from that sensor. The thin and thick channel data may be compared with data expected from standards of the specified thickness and an offset calibration map may be developed that may be applied to data obtained by the given sensor during an inspection run post calibration. There may be different calibration blocks based on different inspection surface characteristics such as outer diameter of pipes to be inspected, material making up inspection surface (different materials having different acoustic properties), type of inspection surface (e.g., pipes, tank, nominal thicknesses of the target surface), and the like. Having offsets for different thickness may enable the system to interpolate a needed offset for intervening thickness values, and may improve the accuracy of the measurements. This resulting in mapping received data channels to sensors as well as calibration maps for mapping correcting offsets in the data received from the mapped sensor. Sensors may be identified according to the response of the sensor, where the match is determined from the sensor return for the known thickness value for a particular channel, then the sensor can be identified for that data channel.

Figure 57:
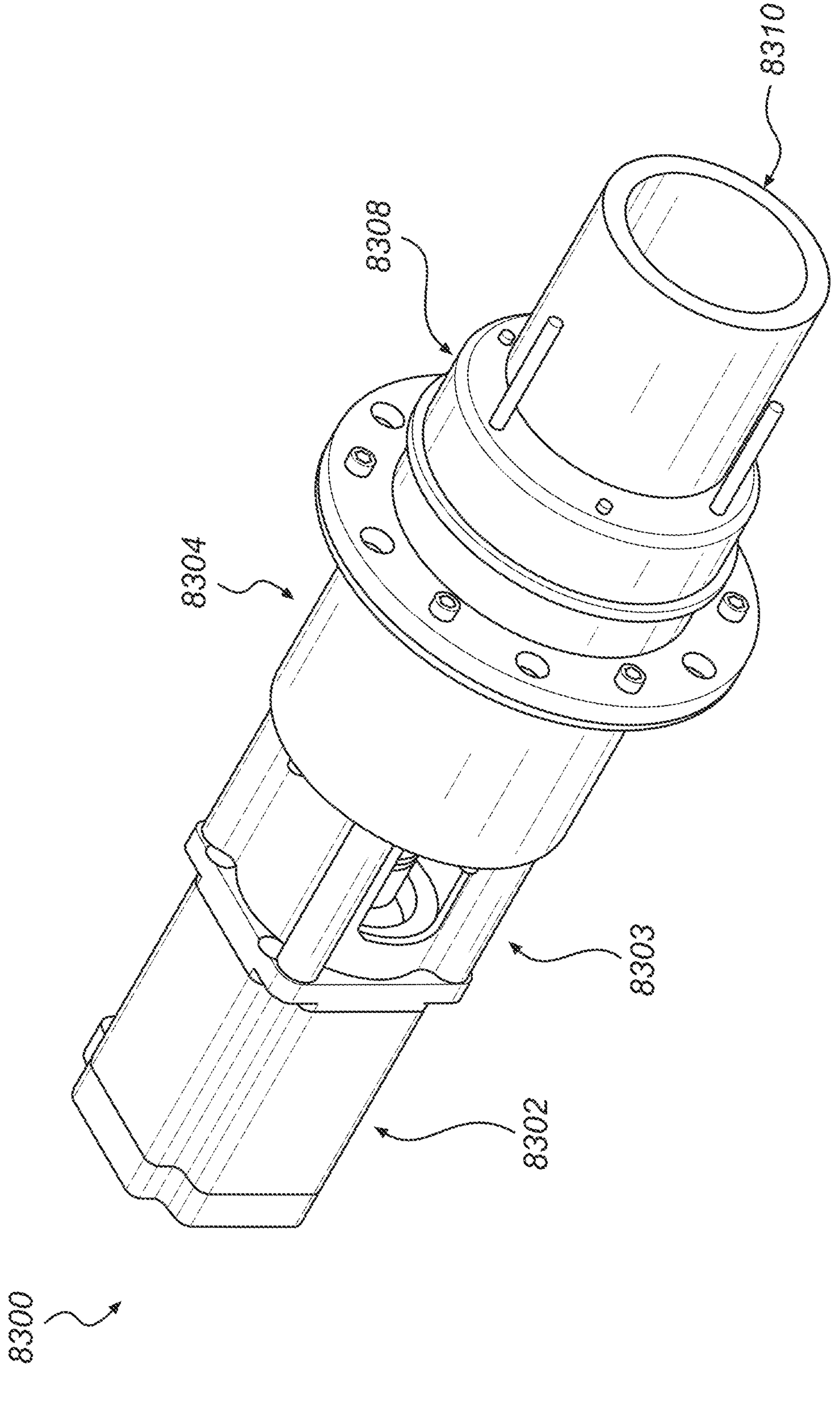
FIG. 57 depicts a wheel assembly machine.

In order to safely manufacture the wheels using a high strength magnet, a wheel assembly machine ("WAM") may be used to assemble the wheel while providing increased safety for a worker assembling the wheel. FIG. 57 depicts a wheel assembly machine 8300. The wheel assembly machine 8300 may include a motor 8302, a shaft coupler 8303, a drum assembly 8304, a fixture assembly 8308, and an alignment shaft 8310. The fixture assembly 8308 may include an actuated flange with pins, a limit switch and a ball screw and nut. The motor 8302 may allow the pins to be raised and lowered, moving the magnet toward or away from the wheel plate, and further avoiding a pinch hazard between the magnet and the wheel plate.

An example procedure for detecting and/or traversing obstacles is described following. An example procedure includes evaluating at least one of: a wheel slippage determination value, a motor torque value, and a visual inspection value (e.g., through the camera, by an operator or controller detecting an obstacle directly and/or verifying motion). The example procedure further includes determining that an obstacle is present in response to the determinations. In certain embodiments, one or more determinations are utilized to determine that an obstacle may be present (e.g., a rapid and/or low-cost determination, such as the wheel slippage determination value and/or the motor torque value), and another determination is utilized to confirm the obstacle is present and/or to confirm the location of the obstacle (e.g., the visual inspection value and/or the wheel slippage determination value, which may be utilized to identify the specific obstacle and/or confirm which side of the inspection robot has the obstacle). In certain embodiments, one or more obstacle avoidance maneuvers may be performed, which may be scheduled in an order of cost, risk, and/or likelihood of success, including such operations as: raising the payload, facilitating a movement of the sensor carriage around the obstacle, reducing and/or manipulating a down force of the payload and/or of a sensor carriage, moving the inspection robot around and/or to avoid the obstacle, and/or changing the inspection run trajectory of the inspection robot.

Figure 58:
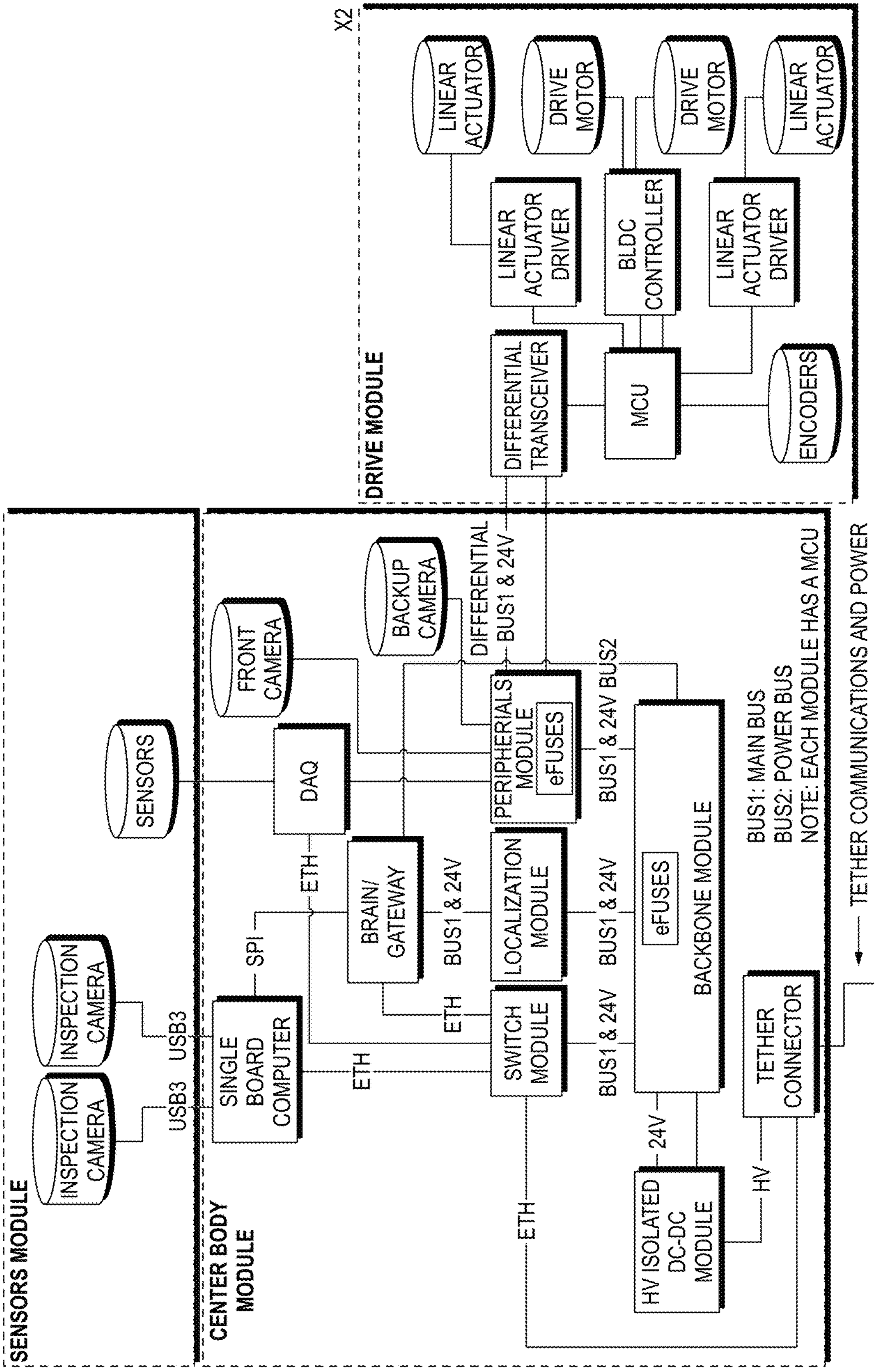
FIG. 58 depicts a schematic block diagram of a control scheme for an inspection robot.

FIG. 58 depicts a schematic block diagram of a control scheme for an inspection robot. The example control scheme includes distributed control, with a high level controller (e.g., the brain/gateway, and/or with distributed elements in the base station) providing standardized commands and communications to highly capable low-level controllers that provide hardware specific responses. Various communication and/or power paths are depicted between controllers in the example of FIG. 58, although specific communication protocols, electrical power characteristics, and the like are non-limiting examples for clarity of the present description. In the example of FIG. 58, two separate drive modules may be present in certain embodiments, each having an interface to the center body. In the example of FIG. 58, the sensor module includes the inspection cameras and sensor communications, and may be on the payload and/or associated with the payload (e.g., on the center body side and in communication with sensors of the payload).

Figure 59:
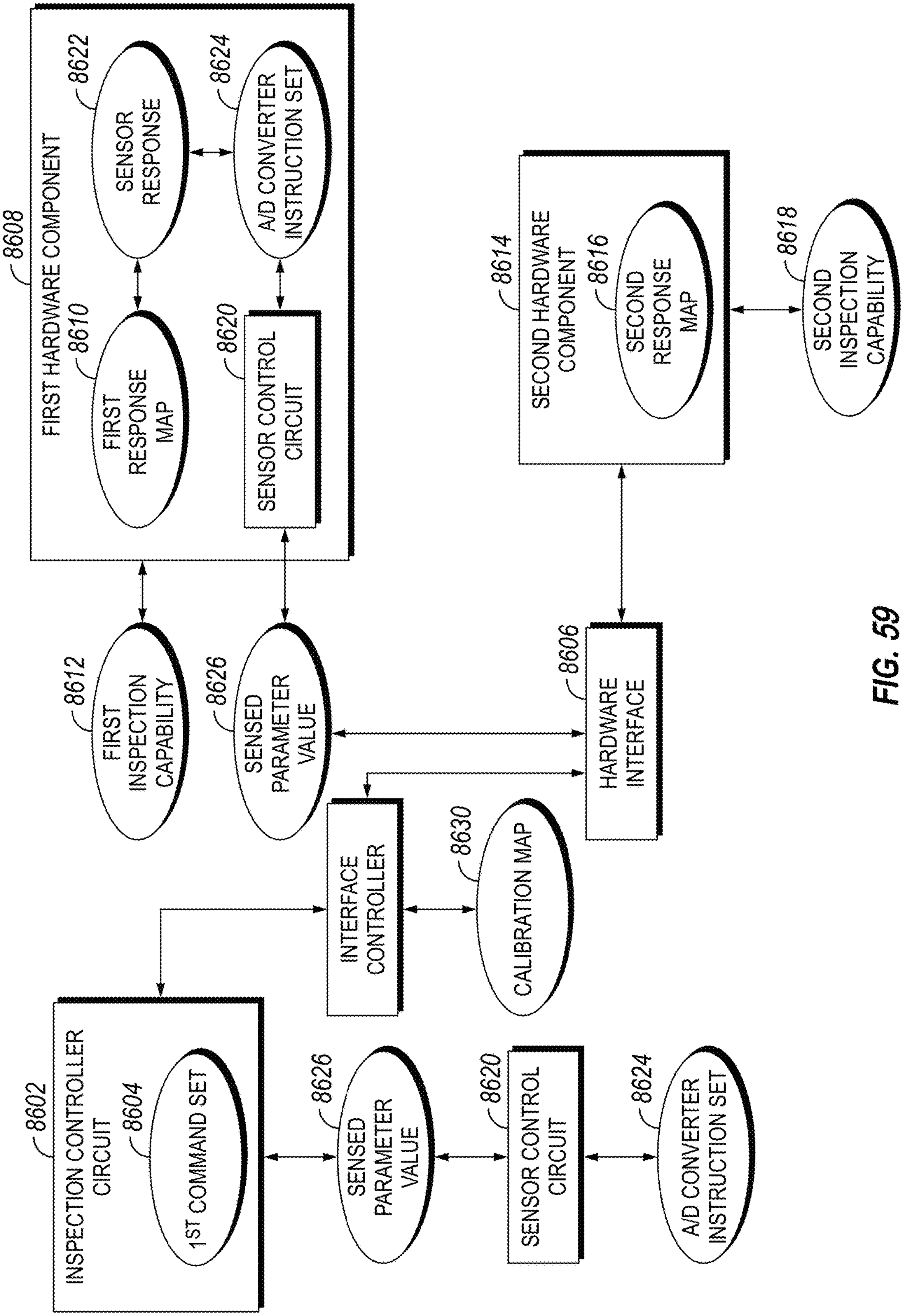
FIG. 59 is a schematic diagram of a system for distributed control of an inspection robot.

Referencing FIG. 59, an example system for operating an inspection robot having a distributed microcontroller assembly is depicted, the distributed microcontroller assembly supporting modular control operations, and allowing for rapid prototyping, testing, reconfiguration of the inspection robot, and swapping of hardware components without requiring changes to the primary inspection control functions of the inspection robot.

The example system includes an inspection controller circuit 8602 that operates an inspection robot using a first command set 8604. In certain embodiments, the first command set 8604 includes high-level inspection control commands, such as robot positioning and/or movement instructions, instructions to perform sensing operations and/or actuator operations, and may further include instructions using standardized parameters, state values, and the like that are separated from low-level instructions that might be configured for the specific characteristics of hardware components of the inspection robot. For example, an actuator may be responsive to specific voltage values, position instructions, or the like, where the example first command set includes instructions such as whether the actuator should be activated, a down force to be applied by the actuator, a position target value of an actuated component such as a payload or stability assist device, and/or a state value such as "inspecting", "stability assist stored", "stability assist deployed", "payload raised", etc.

The example system includes a hardware interface 8606 in communication with the inspection coordination controller 8704 (which may be a circuit), where the hardware interface utilizes the first command set 8604. The example system further includes a first hardware component 8608 that is operatively couplable to the hardware interface 8606, and a second hardware component 8614 that is couplable to the hardware interface 8606. The hardware components 8608, 8614 may include sensors, actuators, payloads, and/or any other device that, when coupled to the inspection robot, communicates and/or is controlled by the inspection robot during inspection operations. In certain embodiments, one or more of the hardware components 8608, 8614 includes a painting device, an actuator, a camera, a welding device, a marking device, and/or a cleaning device. The example first hardware component 8608 includes a first response map 8610, which may include a description of sensor response values (e.g., voltages, frequency values, current values, or the like) provided by the hardware component 8608 and corresponding values used by the inspection robot, such as the represented sensed values (e.g., temperature, UT return time, wall thickness indicated, etc.). Another example first response map 8610 may include a description of actuation command values provided by the inspection robot corresponding to actuator responses for the values. For example, actuation command values may be an actuator position value, where the actuator responses may be voltage values, current values, or the like provided to the actuator. The example second hardware component 8614 including a second response map 8616. In certain embodiments, the first response map 8610 is distinct from the second response map 8616.

In certain embodiments, the actuation command values and/or the represented sensed values are more specific to the hardware component than parameters utilized in the first command set 8604. In certain embodiments, as described following, an interface controller 8628 and/or a low level hardware control circuit (e.g., sensor control circuit 8620) may be present and interposed between the hardware component and the inspection controller circuit 8602. Intermediate controllers or control circuits may be positioned on either side of the hardware interface 8606, and may further be positioned on the respective hardware controller.

The system includes the inspection controller circuit 8602 controlling the first hardware component 8608 or the second hardware component 8614 utilizing the first command set 8604. The system having the first hardware component 8608 coupled to the hardware interface 8606 has a first inspection capability 8612, and the system having the second hardware component 8614 coupled to the hardware interface 8606 has a second inspection capability 8618. In certain embodiments, the first inspection capability 8612 is distinct from the second inspection capability 8618, such as distinct inspection and/or sensing capabilities, and/or distinct actuation capabilities. The first hardware component 8608 and/or the second hardware component 8614 may include more than one sensor (e.g., a group of sensors having a single interface to the hardware interface 8606), more than one actuator (e.g., a drive module having a drive actuator and a payload actuator), or combinations of these (e.g., a drive module or payload having at least one sensor and at least one actuator).

An example system includes at least one of the hardware components 8608, 8614 including a sensor (depicted as the first hardware component 8608 in the example of FIG. 59), and a sensor control circuit 8620 that converts a sensor response 8622 to a sensed parameter value 8626. The example sensor control circuit 8620 is depicted as positioned on the hardware component, and as interposed between the hardware interface 8606 and the inspection controller circuit 8602, although the sensor control circuit 8620 may be positioned in only one of these locations for a given embodiment. The example sensor control circuit 8620 utilizes an A/D converter instruction set 8624 to convert the sensor response 8622. In certain embodiments, the sensor control circuit 8620 performs one or more operations such as debouncing, noise removal, filtering, saturation management, slew rate management, hysteresis operations, and/or diagnostic processing on the sensor response 8622 to determine the sensed parameter value 8626. In certain embodiments, the sensor control circuit 8620 additionally or alternatively interprets the sensor response 8622 by converting the sensor response 8622 from sensor provided units (e.g., voltage, bits, frequency values, etc.) to the sensed parameter value 8626. In certain embodiments, for example where the sensor is a smart sensor or a high capability sensor, the sensor may be configured to provide the sensed parameter value 8626 directly, and/or the sensor control circuit 8620 may be positioned on the sensor to provide the sensed parameter value 8626.

In certain embodiments, the inspection controller circuit 8602 utilizes the sensed parameter value 8626. The sensed parameter value 8626 may be communicated to the inspection controller circuit 8602 from the sensor control circuit 8620, for example where the interface controller 8628 receives the sensor response 8622, and the sensor control circuit 8620 is interposed between the hardware interface 8606 and the inspection controller circuit 8602. In certain embodiments, the sensed parameter value 8626 may be communicated to the inspection controller circuit 8602 from the interface controller 8628, for example where the interface controller 8628 receives the sensed parameter value 8626 from the sensor control circuit 8620 interposed between the hardware interface 8606 and the sensor.

An example interface controller 8628 interprets the sensor response 8622 utilizing a calibration map 8630. For example, the calibration map 8630 may include interface information between the first command set 8604 and responses and/or commands from/to the respective hardware component 8608, 8614. In certain embodiments, when a hardware component coupled to the hardware interface 8606 is changed, the interface controller updates the calibration map 8630, for example selecting an applicable calibration map 8630 from a number of available calibration maps 8630, and/or receiving an update (e.g., a new calibration, and/or updated firmware for the interface controller 8628) to provide the updated calibration map 8630. In certain embodiments, the hardware component provides an identifier, such as part number, build number, component type information, or the like, and the interface controller 8628 selects a calibration map 8630 in response to the identifier of the hardware component.

Figure 60:
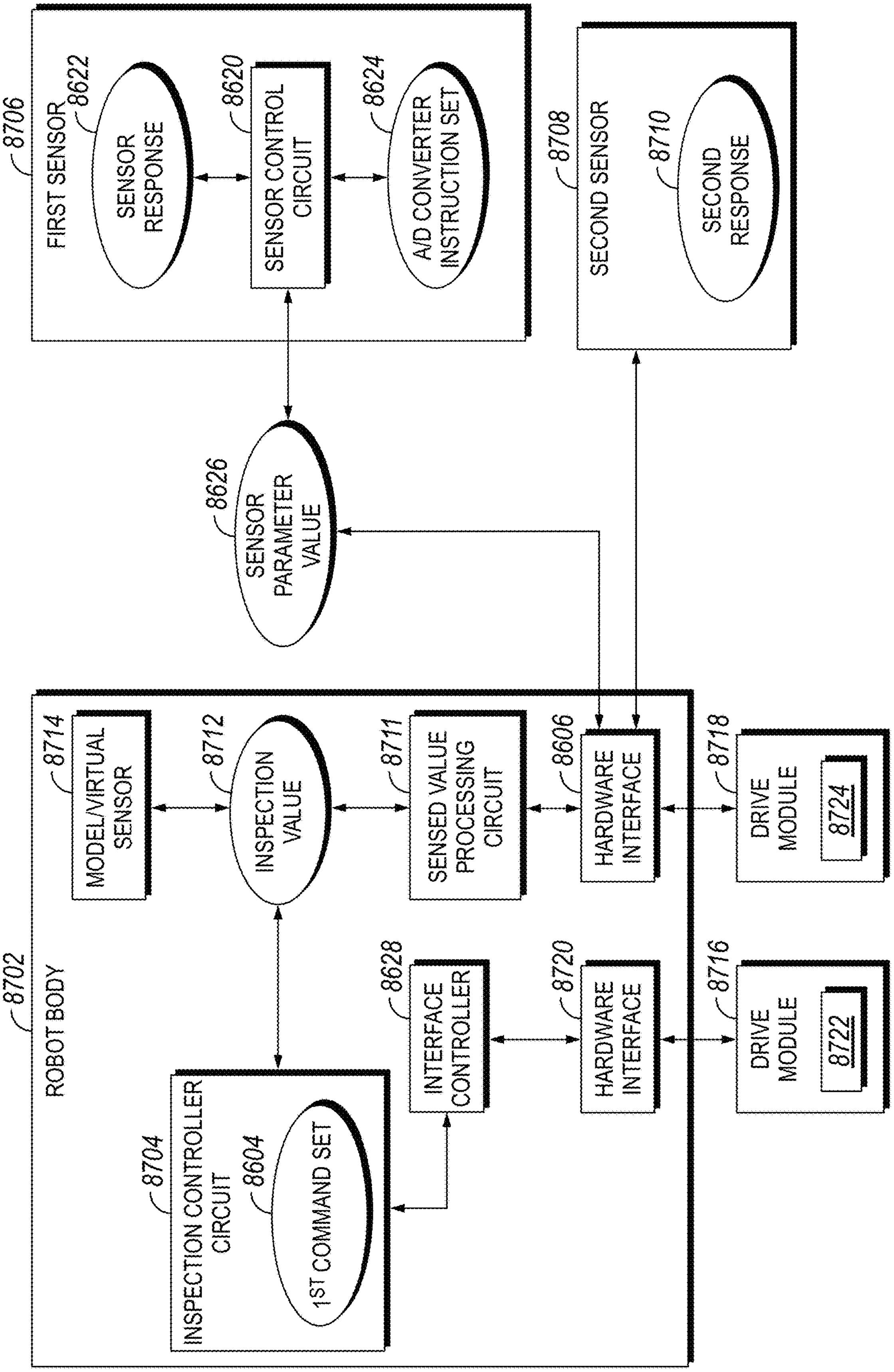
FIG. 60 is a schematic diagram of an inspection robot supporting modular component operations.

Referencing FIG. 60, an example inspection robot for performing inspection operations having a distributed microcontroller assembly is depicted, the distributed microcontroller assembly supporting modular control operations, and allowing for rapid prototyping, testing, reconfiguration of the inspection robot, and swapping of hardware components without requiring changes to the primary inspection control functions of the inspection robot. The inspection robot includes a robot body 8702 including an inspection coordination controller 8704 that controls a first inspection utilizing a first command set 8604. The inspection robot includes a hardware interface 8606 in communication with the inspection coordination controller 8704, a first sensor 8706 operatively couplable to the hardware interface 8606, where the first sensor has a first response map 8610, and a second sensor 8708 operatively couplable to the hardware interface 8606, where the second sensor 8708 has a second response map 8616. In certain embodiments, the second response map 8616 is distinct from the first response map 8610. The inspection coordination controller 8704 further controls, using the first command set 8604, the first sensor 8706 or the second sensor 8708.

In certain embodiments, the first sensor 8706 and second sensor 8708 are swappable, such as where either the first sensor 8706 or the second sensor 8708 can be coupled to the hardware interface 8606, and the inspection coordination controller 8704 can continue to control inspection operations without a change to the first command set 8604. In certain embodiments, the swappable first sensor 8706 or the second sensor 8708 indicates that a same functionality of the inspection robot is available, even where the sensor responses 8622, 8710 are distinct (e.g., the sensors have a same type, can fulfill a same function, and/or they can be utilized with other components of the inspection robot to provide a same function).

An example inspection robot includes a sensor control circuit 8620 included on the first sensor 8706 and/or the second sensor 8708 (the first sensor 8706 in the example of FIG. 60) that converts the sensor response 8622 to a sensed parameter value 8626. In certain embodiments, the sensor control circuit 8620 provides the sensed parameter value 8626 to the hardware interface 8606. In certain embodiments, the sensor control circuit 8620 converts the sensor response 8622 by performing one or more of debouncing, noise removal, filtering, saturation management, slew rate management, hysteresis operations, and/or diagnostic processing on the sensor response 8622 provided by the sensor. In certain embodiments, the sensor control circuit 8620 performs an A/D conversion on the sensor response 8622 provided by the sensor.

An example inspection robot includes an interface controller 8628 in communication with the hardware interface 8606, where the interface controller 8628 further receives one of the sensed parameter value 8626 or the sensor response 8622, 8710. In certain embodiments, the inspection robot further includes a sensed value processing circuit 8711 that converts the sensed parameter value 8626 to an inspection value 8712 (e.g., converting a sensed value to a secondary value such as a wall thickness, coating thickness, etc.). An example sensed value processing circuit 8711 provides the inspection value 8712 to the inspection coordination controller 8704, and/or to a model or virtual sensor 8714. In certain embodiments, the model or virtual sensor 8714 utilizes the inspection value 8712 to determine other values in the system.

An example inspection robot includes two drive modules 8716, 8718, each operatively coupled to a respective hardware interface 8606, 8720. The example system includes the interface controller 8628 interposed between the inspection coordination controller 8704 and each of the hardware interfaces 8606, 8720. The example inspection robot further includes each drive module 8716, 8718 having a respective drive controller 8722, 8724, where each drive controller 8722, 8724 is in communication with the respective hardware interface 8606, 8720. The example including the drive modules 8716, 8718 and the interface controller 8628 provides for separation between the first command set 8604 and the specific communication protocols, command values, and the like for the drive modules 8716, 8718. In certain embodiments, the example including the drive modules 8716, 8718 and the interface controller 8628 provides for swapability and/or reversibility of the drive modules 8716, 8718 between the hardware interfaces 8606, 8720.

Figure 61:
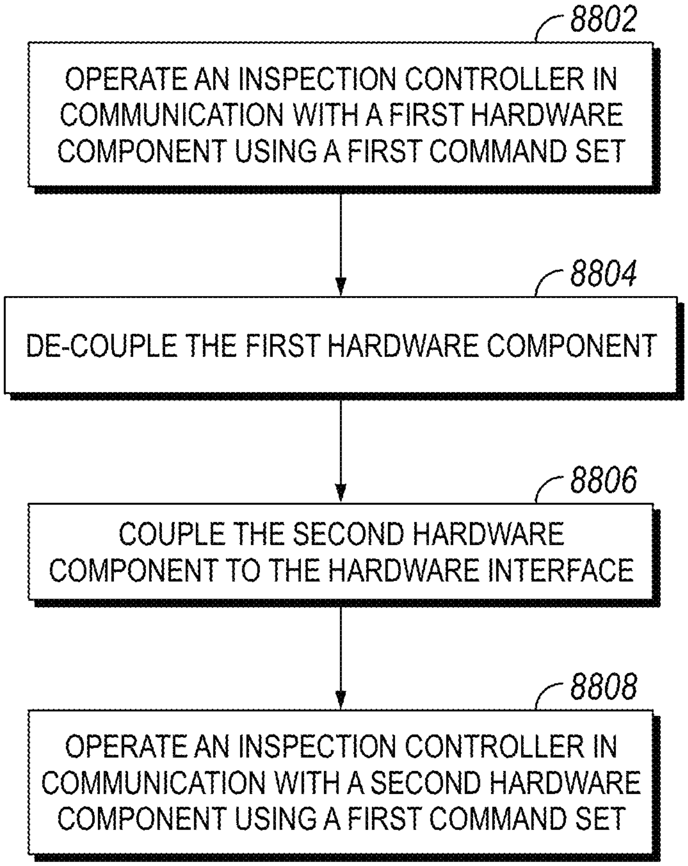
FIG. 61 is a schematic flow diagram of a procedure for operating an inspection robot.

Referencing FIG. 61, an example procedure for operating an inspection robot having a distributed microcontroller assembly is depicted. The example procedure includes an operation 8802 to operate an inspection controller in communication with a first hardware component coupled to a hardware interface utilizing a first command set, where the first hardware component includes a first response map, an operation 8804 to de-couple the first hardware component from the hardware interface, an operation 8806 to couple a second hardware component to the hardware interface, where the second hardware component includes a second response map, and an operation 8808 to operate the inspection controller in communication with the second hardware component utilizing the first command set.

An example procedure includes one of the response maps including an A/D converter instruction set, and/or where the first response map is distinct from the second response map. An example procedure includes an operation (not shown) to operate an interface controller communicatively coupled to the hardware interface, where the operating of the interface controller includes interpreting data from the first hardware component utilizing the first response map, interpreting data from the second hardware component utilizing the second response map, and communicating with the inspection controller in response to the first command set. In certain embodiments, interpreting data from the first hardware component is performed in a first hardware configuration (e.g., with the first hardware component coupled to the hardware interface), and interpreting data from the second hardware component is performed in a second hardware configuration (e.g., with the second hardware component coupled to the hardware interface).

An example procedure includes one of the response maps including an A/D converter instruction set, and/or where the first response map is distinct from the second response map. An example procedure includes an operation (not shown) to operate an interface controller communicatively coupled to the hardware interface, where the operating of the interface controller includes providing actuator command values to the first hardware component utilizing the first response map, providing actuator command values to the second hardware component utilizing the second response map, and communicating with the inspection controller in response to the first command set. In certain embodiments, providing actuator command values to the first hardware component is performed in a first hardware configuration (e.g., with the first hardware component coupled to the hardware interface), and providing actuator command values to the second hardware component is performed in a second hardware configuration (e.g., with the second hardware component coupled to the hardware interface). In certain embodiments, the procedure includes an operation to update computer readable instructions accessible to the interface controller before operating the inspection controller in communication with one of the hardware components, for example after a swap from the first hardware component to the second hardware component.

Figure 62:
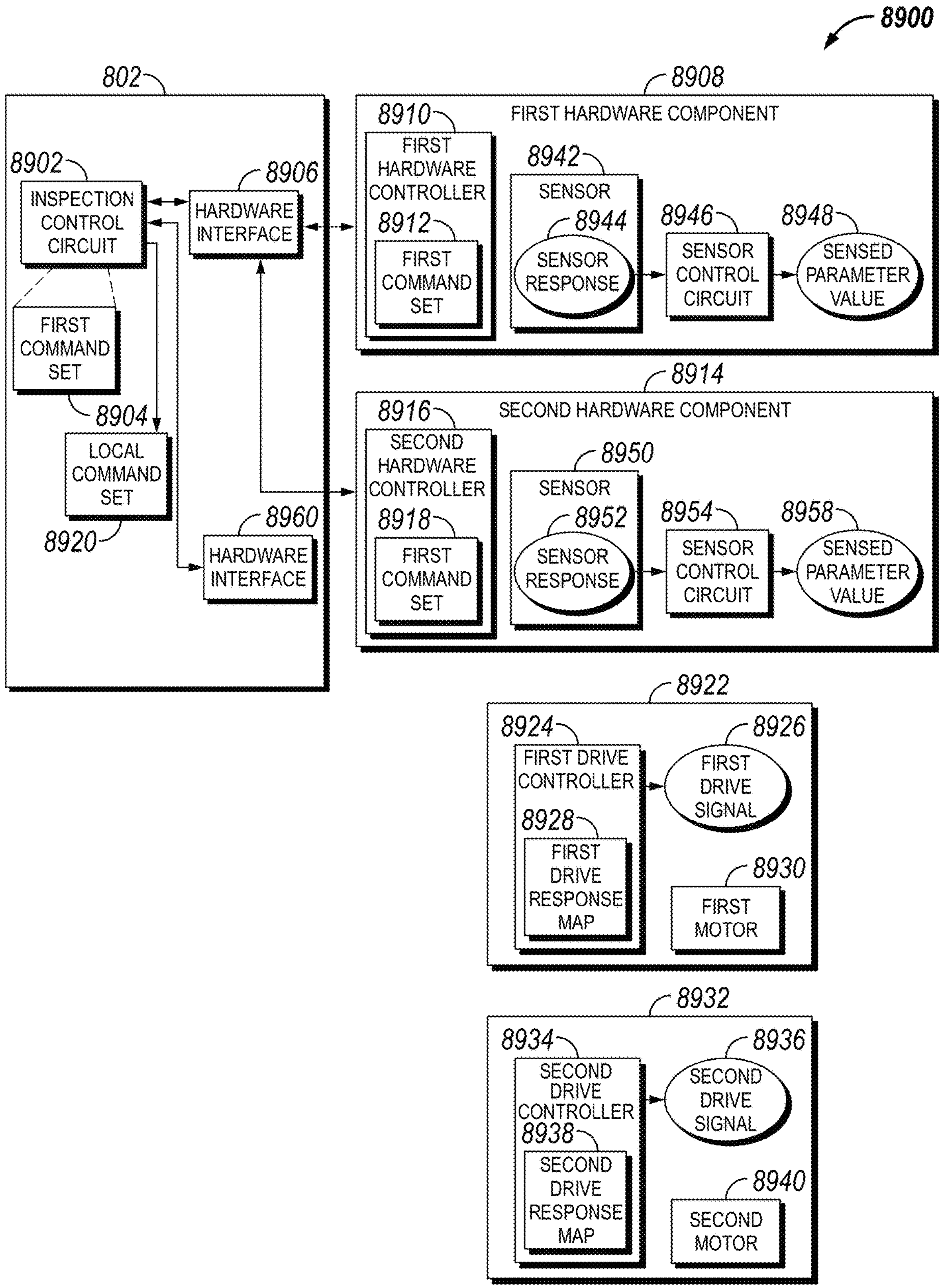
FIG. 62 is a schematic diagram of a system for distributed control of an inspection robot.

Referencing FIG. 62, an example system 8900 for distributed control of an inspection robot is depicted. The inspection robot may include any embodiment of an inspection robot as set forth throughout the present disclosure. The example system includes an inspection control circuit 8902 structured to operate the inspection robot utilizing a first command set, such as high level operation descriptions including movement commands, sensor commands (e.g., sensor on/off times, sampling rates, etc.), actuator commands (e.g., actuator activation or deactivation, actuator positions, and/or result commands such as applying a selected downforce, position for a payload, position for a sled, etc.). The example system includes a hardware interface 8906 in communication with the inspection control circuit 8902, where the hardware interface utilizes the first command set.

The example system includes a first hardware component 8908 operatively couplable to the hardware interface 8906, where the first hardware component includes and/or is in communication with a first hardware controller 8910. The first hardware controller 8910 includes a first response map 8912, for example including interface descriptions, A/D mapping, hardware responses to commands, and the like, where the first hardware controller 8910 commands the first hardware component 8908 in response to the first response map 8912 and the first command set 8904.

The example system includes a second hardware component 8914 operatively couplable to the hardware interface 8906, where the second hardware component includes and/or is in communication with a second hardware controller 8916. The second hardware controller 8916 includes a second response map 8918, and commands the second hardware component 8914 in response to the second response map 8918 and the first command set 8904.

It can be seen that the system of FIG. 62 provides for an inspection robot controller 802 operable to command inspection operations of the inspection robot, with either the first hardware component 8908 or the second hardware component 8914 coupled to the hardware interface 8906, without a change in the coupled hardware component requiring a change in the inspection robot controller 802 or the first command set 8904.

The example system 8900 further includes the first hardware controller 8910 utilizing a local command set 8920 to command the first hardware component 8908. For example, the inspection robot controller 802 may store a number of command sets thereon, wherein the first hardware controller 8910 selects one of the number of command sets as the local command set 8920 based on the type of hardware component being controlled, a function of the hardware component (e.g., sensing, a type of sensor, actuating a payload, actuating a sensor position, actuating a down force value, actuating a drive wheel, etc.) and/or the type of command present in the first command set 8904. The utilization of a local command set 8920 allows for the implementation of different hardware component types, while allowing the high level first command set 8904 to operate utilizing functional commands disassociated with the specific hardware components implementing the commands. In certain embodiments, a system 8900 may be changed to be compatible with additional hardware component types, actuator positions (e.g., a payload actuator coupled to a drive module or to a center chassis), by adding to available command sets available as local command sets 8920 without changing the inspection control circuit 8902 or the first command set 8904.

An example system 8900 includes the first response map 8912 being distinct from the second response map 8918, for example where the first hardware component 8908 is a different type of component than the second hardware component 8914, and/or has different interaction values such as response curves relative to electrical control values.

An example system 8900 includes a first drive module 8922 (which may be the first hardware component 8908, although they are depicted separately in the example of FIG. 62) having a first drive controller 8924 that determines a first drive signal 8926 in response to the first command set 8904 and a first drive module response map 8928. The first drive module 8922 may include a first motor 8930 (e.g., coupled to a drive wheel of the first drive module 8922) that is responsive to the first drive signal 8926.

An example system 8900 includes a second drive module 8932 (which may be the second hardware component 8914) having a second drive controller 8934 that determines a second drive signal 8936 in response to the first command set 8904 and a second drive module response map 8938. The second drive module 8932 may include a second motor 8940 that is responsive to the second drive signal 8936.

In certain embodiments, one of the first drive module 8922 or the second drive module 8932 may be coupled to the hardware interface 8906. Additionally or alternatively, one or both of the drive modules may be coupled to one or more additional hardware interfaces 8960, for example with a first drive module 8922 coupled to a center chassis on a first side, and a second drive module 8932 coupled to the center chassis on a second side. In certain embodiments, the drive controllers 8924, 8934 are configured to provide appropriate drive signals 8926, 8936 to the drive modules 8922, 8932 responsive to the first command set 8904, based on the response maps 8928, 8938 and/or which hardware interface 8960 the drive modules 8922, 8932 are coupled to. In certain embodiments, the first command set 8904 may include a command to move the inspection robot in a desired direction and speed, and the operation of the drive controllers 8924, 8934 allow for proper movement (direction and speed) regardless of which side the drive modules are coupled to. Accordingly, in certain embodiments, the drive modules 8922, 8932 are swappable, and/or reversible, without changes to the inspection control circuit 8902 or the first command set 8904. In certain embodiments, the first drive module response map 8928 is distinct from the second drive module response map 8938, for example where the motors are distinct, where the drive modules 8922, 8932 include different actuators (e.g., a payload actuator on one, and a stability support device actuator on the other), and/or where the drive modules 8922, 8932 are positioned on opposing sides of the center chassis (e.g., where reversibility management is performed response map 8928, 8938 rather than through a hardware interface 8960 detection). In certain embodiments, the first drive signal 8926 is distinct from the second drive signal 8936, even where an identical drive response is desired from the first drive module 8922 and the second drive module 8932. In certain embodiments, the drive signals 8926, 8936 may be a commanded parameter to the motor (e.g., 50% torque), and/or the drive signals 8926, 8936 may be a voltage value or a current value provided to the respective drive motor 8930, 8940.

An example hardware component 8908, 8914 includes a sensor 8942, 8950, where the hardware component 8908, 8914 further includes a sensor control circuit 8946, 8954 that converts a sensor response of the sensor (e.g., depicted as 8944, 8952) to a sensed parameter value 8948, 8958. In certain embodiments, the inspection control circuit 8902 utilizes the sensed parameter value 8948, 8958, for example as a representation of a parameter sensed by the respective sensor, as a base sensor value, and/or as a minimally processed sensor value.

In certain embodiments, the sensor control circuits 8946, 8954 converts the sensor response 8944, 8952 by performing one or more of debouncing, noise removal, filtering, saturation management, slew rate management (e.g., allowable sensor response change per unit time, sampling value, and/or execution cycle), hysteresis operations (e.g., filtering, limiting, and/or ignoring sensor response sign changes and/or increase/decrease changes to smooth the sensed parameter value 8948, 8958 and/or avoid cycling), and/or diagnostic processing (e.g., converting known sensor response 8944, 8952 values that may be indicating a fault, electrical failure, and/or diagnostic condition instead of a sensed value—for example utilizing reserved bits of the sensor response map) on the sensor response 8944 value.

In certain embodiments, one or more hardware controllers 8910, 8946, 8916, 8954, 8924, 8934 and/or response maps 8912, 8918, 8928, 8938 may be positioned on the inspection robot controller 802, positioned on another controller in communication with the inspection robot controller 802, and/or positioned on the respective hardware component (e.g., as a smart component, and/or as a closely coupled component controller). In certain embodiments, one or more hardware controllers 8910, 8946, 8916, 8954, 8924, 8934 are interposed between the inspection control circuit 8902 and the respective hardware component.

Figure 63:
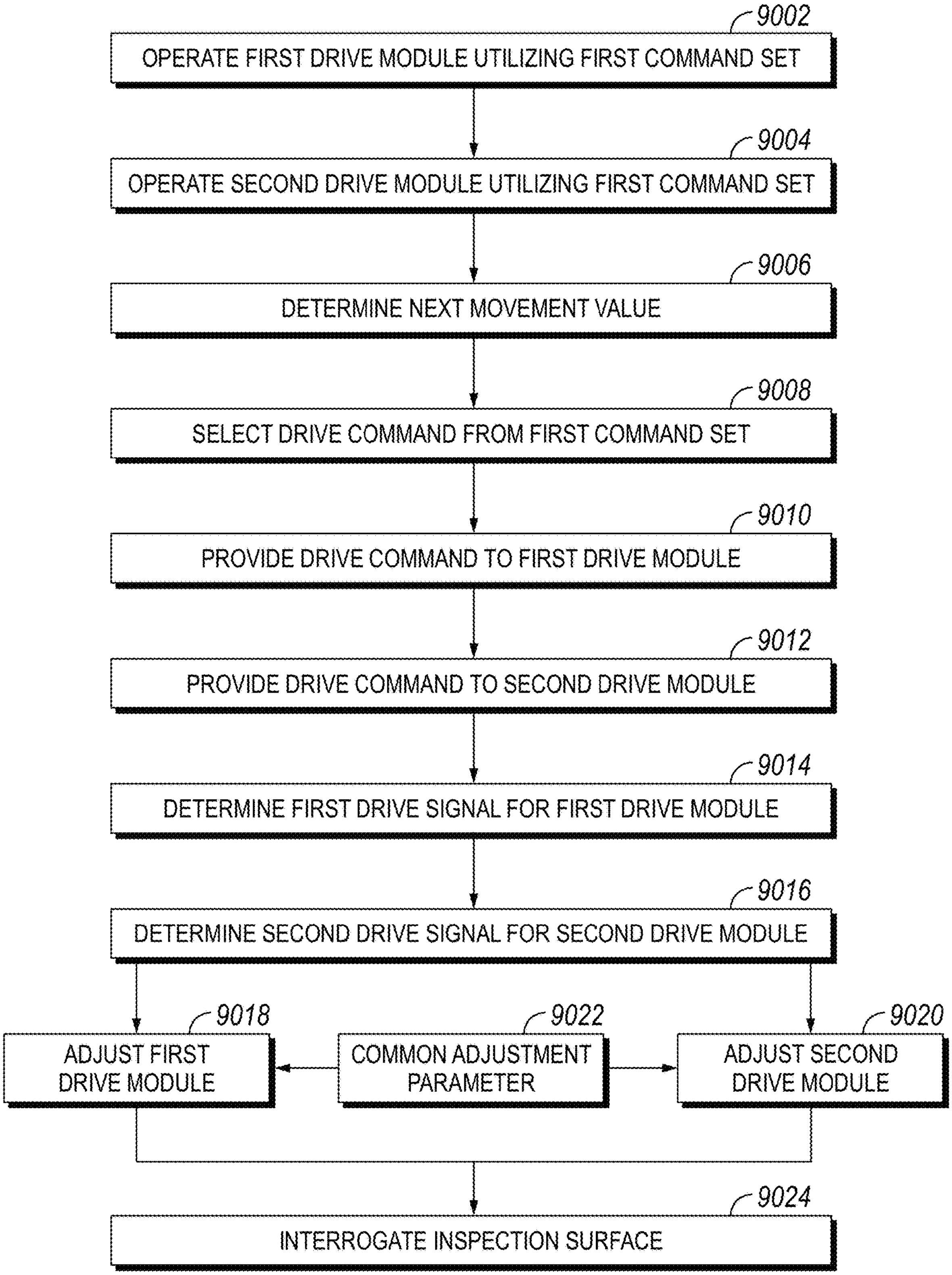
FIG. 63 is a schematic flow diagram of a procedure for operating an inspection robot having distributed control.

Referencing FIG. 63, an example procedure to operate distinct hardware devices, such as drive modules, utilizing a same first command set, and/or utilizing a swappable hardware interface, is depicted. The example procedure includes an operation 9002 to operate a first drive module with the first command set, and an operation 9004 to operate a second drive module with the first command set. The example procedure further includes an operation 9006 to determine a next movement value in response to the first command set, an operation 9008 to select a drive command from the first command set (e.g., where the first command set includes a number of additional commands in addition to drive commands), and an operations 9010, 9012 to provide drive command to each of the first drive module and the second drive module.

In certain embodiments, the example procedure further includes an operation 9014 to determine a first drive signal for the first drive module in response to a first response map for the first drive module, and an operation 9016 to determine a second drive signal for the second drive module in response to a second response map for the second drive module. The example procedure includes operations, to adjust the first drive module 9018 and the second drive module 9020 (and/or the first drive signal or the second drive signal), respectively, by an adjustment amount having a common adjustment parameter. In certain embodiments, the procedure includes an operation to determine the common adjustment parameter 9022 as one of a speed parameter, a distance parameter, and/or a direction parameter. For example, the determined common adjustment parameter 9022 may be utilized to adjust the first drive module 9018 in a first direction and to adjust the second drive module 9020 in an opposite direction to account for the positions of the reversible drive modules with respect to a center chassis of the inspection robot. In another example, the determined common adjustment parameter 9022 may be utilized to prevent wheel slipping, for example where the inspection robot is turning on a surface, by commanding an inner one of the drive modules to turn slightly slower and/or traverse a smaller distance, and commanding an outer one of the drive modules to turn slightly faster or traverse a larger distance.

In certain embodiments, operations to adjust the drive modules 9018, 9020 (and/or drive module signals) are performed to achieve a target provided by the first command set, where the adjustments do not have a common adjustment parameter, and/or where the adjustments are not adjusted by a same or similar amount (e.g., where a wheel of one of the drive modules is determined to be slipping). The procedure further includes an operation 9024 to interrogate the inspection surface (e.g., perform sensing operations) in response to the first command set.

Figure 64:
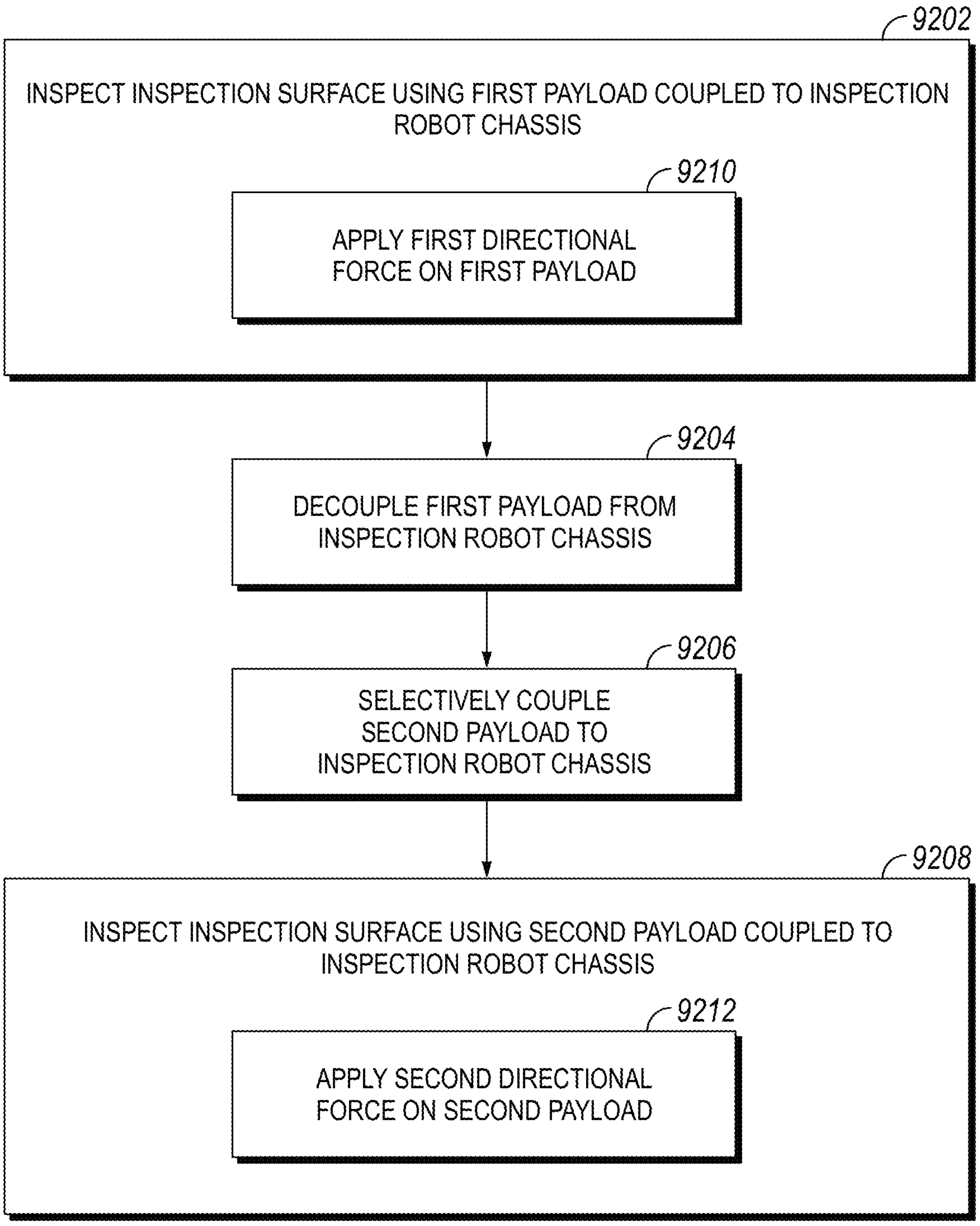
FIG. 64 is a flow chart depicting a method of inspecting an inspection surface with an inspection robot.
Figure 65:
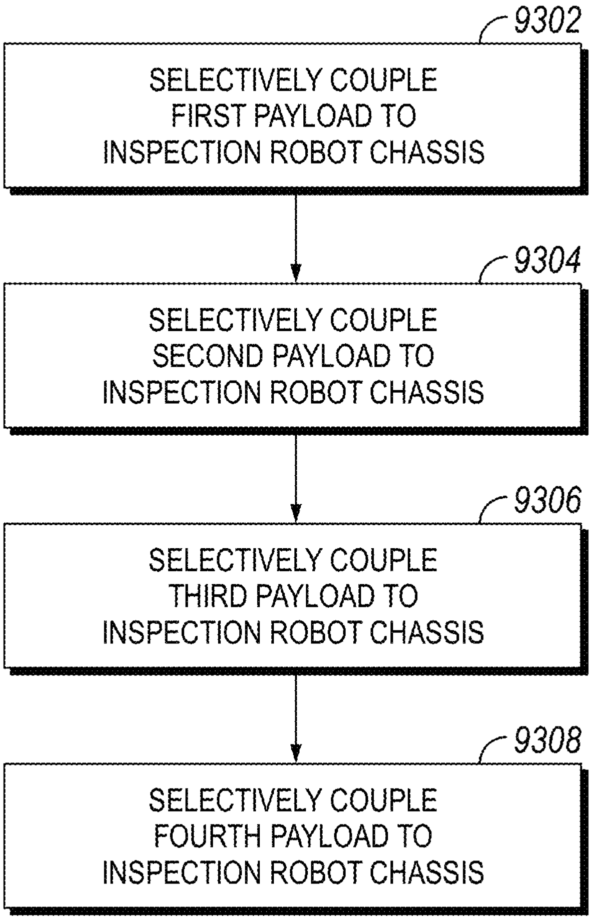
FIG. 65 is a flow chart depicting another method of inspecting an inspection surface with an inspection robot.
Figure 66:
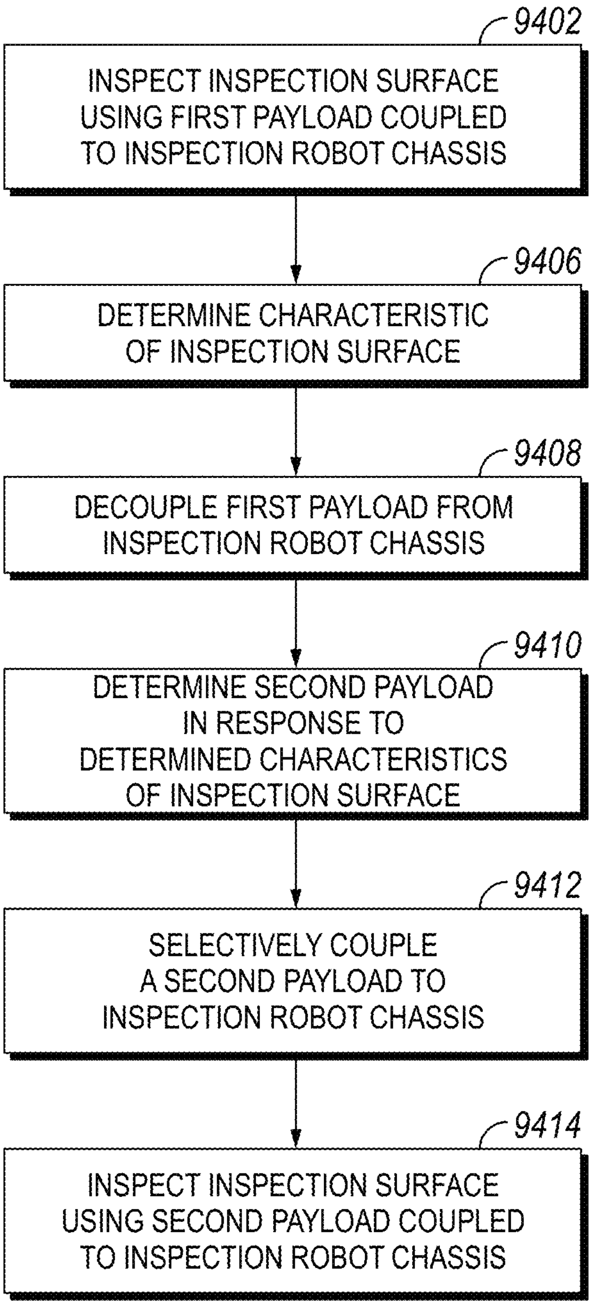
FIG. 66 is a flow chart depicting another method of inspecting an inspection surface with an inspection robot.

Referring to FIGS. 64-66, example methods for inspecting an inspection surface with an inspection robot using configurable payloads are depicted. The inspection robot includes any inspection robot having a number of sensors associated therewith and configured to inspect a selected area. Without limitation to any other aspect of the present disclosure, an inspection robot as set forth throughout the present disclosure, including any features or characteristics thereof, is contemplated for the example methods depicted in FIGS. 64-66. In certain embodiments, the inspection robot 100 (FIG. 1) may have one or more payloads 2 (FIG. 1) and may include one or more sensors 2202 (FIG. 27) on each payload 2.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

As illustrated in FIG. 64, a first method includes a first inspection pass 9022 inspecting an inspection surface using a first payload coupled to a chassis of the inspection robot, decoupling 9204 the first payload from the inspection robot, and selectively coupling 9206 a second payload to the chassis of the inspection robot. As will be explained in greater detail below, the first payload has a first inspection characteristic and the second payload has a second inspection characteristic that is distinct from the first inspection characteristic. In embodiments, the method further includes a second inspection pass 9208 inspecting the inspection surface using the second payload.

In embodiments, the inspection characteristic distinction may be a difference between a configuration of the one or more inspection sensors of the first payload and a configuration of the one or more inspection sensors of the second payload. The configuration difference may be a difference in a type of inspection sensor between the first and second payloads. In such embodiments, the sensors may be ultrasonic sensors, electromagnetic induction (EMI) sensors, photonic sensors, infrared sensors, ultraviolet sensors, electromagnetic radiation sensors, camera sensors, and/or optical sensors. For example, a first portion of an inspection run may use a first payload having ultrasonic sensors for a first inspection pass 9202 of the inspection surface. In the event an abnormality is found, the first payload may be swapped out for a second payload having optical sensors for use in a second inspection pass 9208 over the inspection surface to acquire images of the abnormality. As will be understood, various other combinations of sensors between the first and second payloads may be used.

In embodiments, both the first payload and the second payload may each comprise two or more inspection sensors, and the difference in the configuration of the first payload and the second payload may be a difference in spacing between the inspection sensors on the first payload and the inspection sensors on the second payload. For example, a first inspection pass 9202 over the inspection surface may use a payload with a wide spacing between inspection sensors in order to save on the amount of data and/or time needed to capture the status of the inspection surface. In the event that an abnormality is found during the first pass, a second payload, having a smaller spacing between the sensors than the first payload, may be swapped in place of the first payload for a second inspection pass 9208 in order to obtain higher quality data of the abnormality, but while taking a longer period of time to cover the same amount of area on the inspection surface as the first payload. As another example, the first inspection pass 9202 may cover a first portion of the inspection surface that may require a lower level of resolution, where the first payload has a wider spacing between sensors than the second payload which is used to cover a second portion of the inspection surface that requires higher resolution. In embodiments, the difference of spacing may be defined at least in part on a difference in a spacing of at least two sleds of the first payload and a spacing of at least two sleds of the second payload.

In embodiments, the difference in the configuration between the first and second payloads may be a difference between a first directional force applied 9210 on the first payload, e.g., a downward force applied by a first biasing member of the first payload to at least one inspection sensor of the first payload, and a second directional force applied 9212 on the second payload, e.g., a downward force, distinct from the first downward force, applied by a second biasing member of the second payload to at least one inspection sensor of the second payload. In embodiments, the distinction between the first and the second directional forces may be one of a magnitude, angle, and/or direction. The angle may be relative to the inspection surface. For example, in embodiments, the second payload may have a stronger downward biasing force than the first payload. In such embodiments, an operator of the inspection robot may attempt to use the first payload to inspect 9202 the inspection surface only to discover that the sensors of the first payload are having difficulty coupling to the inspection surface. The operator may then recall the inspection robot and swap out the first payload for the second payload to employ the stronger downward biasing force to couple the sensors of the second payload to the inspection surface.

In embodiments, the difference in the configuration between the first and second payloads may be a difference in a first spacing between at least two arms of the first payload and a spacing between at least two arms of the second payload.

In embodiments, the difference in the configuration between the first and second payloads may be a difference in spacing defined at least in part on a difference in a first number of inspection sensors on a sled of the first payload and a second number of inspection sensors on a sled of the second payload.

In embodiments, the distinction between the first inspection characteristic and the second inspection characteristic include at least one of a sensor interface, a sled ramp slope, a sled ramp height, a sled pivot location, an arm pivot location, a sled pivot range of motion, an arm pivot range of motion, a sled pivot orientation, an arm pivot orientation, a sled width, a sled bottom surface configuration, a couplant chamber configuration, a couplant chamber side, a couplant chamber routing, or a couplant chamber orientation.

In embodiments, the distinction between the first inspection characteristic and the second inspection characteristic is of biasing member type. For example, the first payload may have an active biasing member and the second payload may have a passive biasing member or vice versa. In such embodiments, the active biasing member may be motively coupled to an actuator, wherein a motive force of the actuator includes an electromagnetic force, a pneumatic force, or a hydraulic force. In embodiments, the passive biasing member may include a spring or a permanent magnet.

In embodiments, the distinction between the first inspection characteristic and the second inspection characteristic may be a side of the inspection robot chassis which the first payload is operative to be disposed and a side of the inspection robot chassis which the second payload is operative to be disposed. For example, the chassis may have a first payload interface on a first side and a second payload interface on a second side opposite the first side, wherein first payload may be operative to mount/couple to the first payload interface and lead the chassis and the second payload may be operative to mount/couple to the second payload interface and trail the chassis or vice versa.

Turning to FIG. 65, in embodiments, a second method includes selectively coupling 9302 a first payload to the inspection robot chassis, and selectively coupling 9304 a second payload distinct from the first payload to the inspection robot chassis. The method may further include selectively coupling 9306 a third payload distinct from the first and second payload to the inspection robot chassis. The method may further include selectively coupling 9308 a fourth payload distinct from the first, second and third payloads to the inspection robot chassis. The method may further include coupling yet additional payloads to the inspection robot chassis distinct from the first, second, third and fourth payloads.

Moving to FIG. 66, a third method includes inspecting 9402 the inspection surface using a first payload coupled to the inspection robot chassis, determining 9406 a characteristic of the inspection surface, decoupling 9408 the first payload from the inspection robot chassis, determining 9410 a second payload in response to the determined characteristic of the inspection surface, selectively coupling 9412 the second payload to the inspection surface, and inspecting 9414 the inspection surface using the second payload coupled to the inspection robot chassis.

Figure 88:
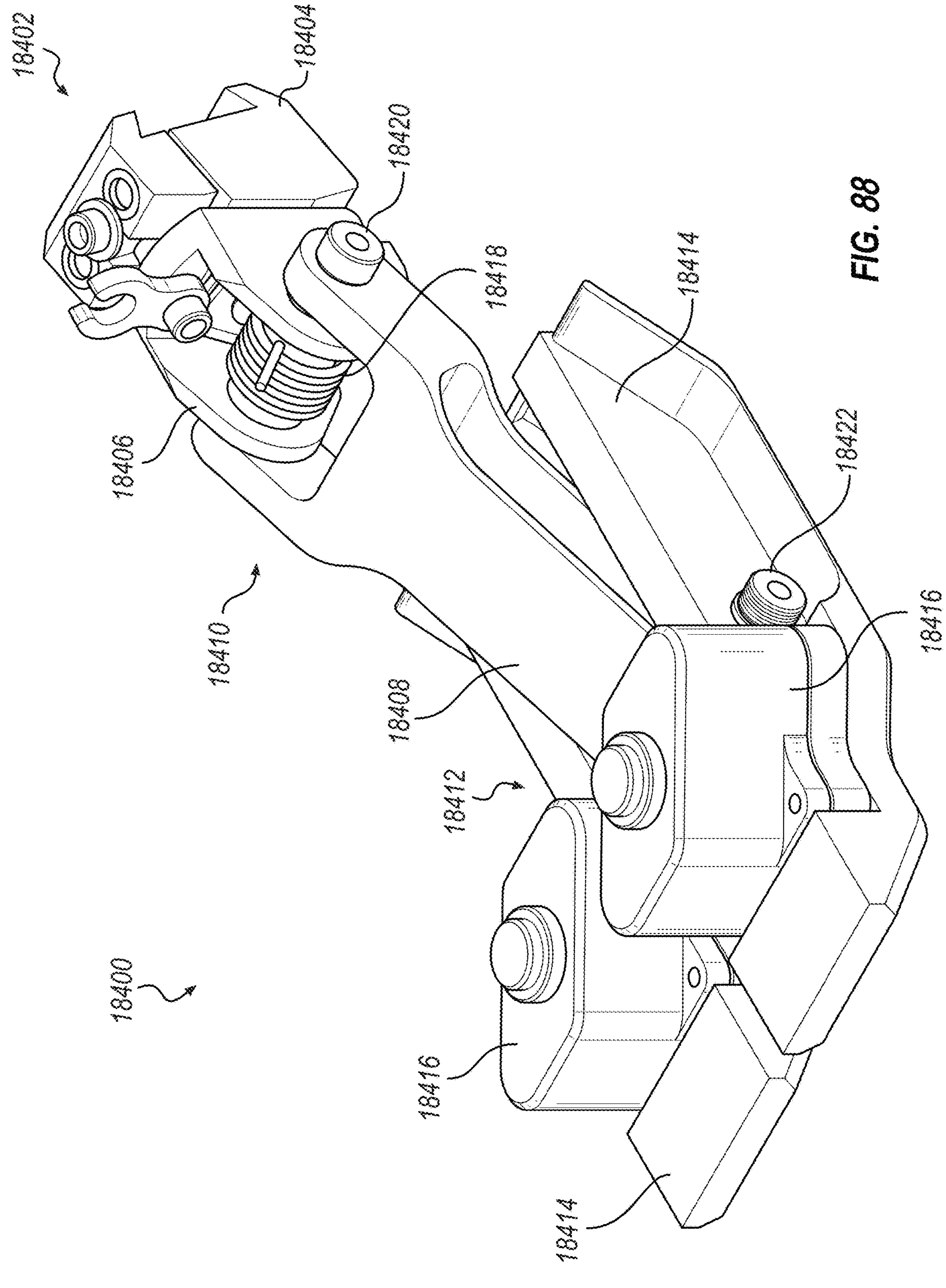
FIG. 88 depicts a payload for an inspection robot.

In an embodiment, and referring to FIG. 88, a payload 18400 for an inspection robot for inspecting an inspection surface may include a payload coupler 18402 having a first portion 18404 and a second portion 18406, the first portion 18404 selectively couplable to a chassis of the inspection robot; an arm 18408 having a first end 18410 and a second end 18412, the first end 18410 coupled to the second portion 18406 of the payload coupler 18402; one or more sleds 18414 mounted to the second end 18412 of the arm 18408; and at least two inspection sensors 18416, wherein each of the at least two inspection sensors 18416 are mounted to a corresponding sled 18414 of the one or more sleds, and operationally couplable to the inspection surface; wherein the second portion 18406 of the payload coupler 18402 may be moveable in relation to the first portion 18404.

The term selectively couplable (and similar terms) as utilized herein should be understood broadly. Without limitation to any other aspect or description of the present disclosure, selectively couplable describes a selected association between objects. For example, an interface of object 1 may be so configured as to couple with an interface of object 2 but not with the interface of other objects. An example of selective coupling includes a power cord designed to couple to certain models of a particular brand of computer, while not being able to couple with other models of the same brand of computer. In certain embodiments, selectively couplable includes coupling under selected circumstances and/or operating conditions, and/or includes de-coupling under selected circumstances and/or operating conditions.

In an embodiment, the second portion 18406 of the payload coupler 18402 may be rotatable with respect to the first portion 18404. In an embodiment, the first end of the arm 18408 may be moveable in relation to the second portion 18406 of the payload coupler 18402. In an embodiment, the first end 18410 of the arm 18408 may rotate in relation to the second portion 18406 of the payload coupler 18402. In an embodiment, the first portion of the payload coupler is rotatable with respect to a first axis, and wherein the first end of the arm is rotatable in a second axis distinct from the first axis.

In an embodiment, the one or more sleds 18414 may be rotatable in relation to the second end 18412 of the arm 18408. The payload may further include at least two sleds 18414, and wherein the at least two sleds 18414 may be rotatable as a group in relation to the second end 18412 of the arm 18408—for example, by a pivot coupling 18422 to the arm 18408. The payload may further include a downward biasing force device 18418 structured to selectively apply a downward force to the at least two inspection sensors 18416 with respect to the inspection surface. In embodiments, the weight position of the device 18418 may be set at design time or run time. In some embodiments, weight positions may only include a first position or a second position, or positions in between (a few, a lot, or continuous). In embodiments, the downward biasing force device 18418 may be disposed on the second portion 18406 of the payload coupler 18402 along an axis running through 18420. The downward biasing force device 18418 may be one or more of a weight, a spring, an electromagnet, a permanent magnet, or an actuator. The downward biasing force device 18418 may include a weight moveable between a first position applying a first downward force and a second position applying a second downward force. The downward biasing force device 18418 may include a spring, and a biasing force adjustor moveable between a first position applying a first downward force and a second position applying a second downward force. In embodiments, the force of the device 18418 may be set at design time or run time. In embodiments, the force of the device 18418 may be available only at a first position/second position, or positions in between (a few, a lot, or continuous). For example, setting the force may involve compressing a spring or increasing a tension, such as in a relevant direction based on spring type. In another example, setting the force may involve changing out a spring to one having different properties, such as at design time. In embodiments, the spring may include at least one of a torsion spring, a tension spring, a compression spring, or a disc spring. The payload 18400 may further include an inspection sensor position actuator, e.g., 6072, structured to adjust a position of the at least two inspection sensors 18416 with respect to the inspection surface. The payload may further include at least two sensors 18416, wherein the payload coupler 18402 may be moveable with respect to the chassis of the inspection robot and the inspection sensor position actuator may be coupled to the chassis, wherein the inspection sensor position actuator in a first position moves the payload coupler 18402 to a corresponding first coupler position, thereby moving the at least two sensors 18416 to a corresponding first sensor position, and wherein the inspection sensor position actuator in a second position moves the payload coupler 18402 to a corresponding second coupler position, thereby moving the at least two sensors 18416 to a corresponding second sensor position. In some embodiments, the inspection sensor position actuator may be coupled to a drive module. In some embodiments, a payload position may include a down force selection (e.g., actuator moves to touch sensors down, further movement may be applying force and may not correspond to fully matching geometric movement of the payload coupler). In embodiments, the inspection sensor position actuator may be structured to rotate the payload coupler 18402 between the first coupler position and the second coupler position. The actuator may be structured to horizontally translate the payload coupler 18402 between the first coupler position and the second coupler position. The payload may further include a couplant conduit 18506 structured to fluidly communicate couplant between a chassis couplant interface 5102 (FIG. 51) and a payload couplant interface, e.g., interface 18502, and wherein each of the at least two inspection sensors 18416 may be fluidly coupled to the payload couplant interface. In an embodiment, the couplant conduit 18506 may be from the chassis to the payload such that a single payload connection supplies all related sensors.

The term fluidly communicate (and similar terms) as utilized herein should be understood broadly. Without limitation to any other aspect or description of the present disclosure, fluid communication describes a movement of a fluid, a gas, or a liquid, between two points. In some examples, the movement of the fluid between the two points can be one of multiple ways the two points are connected, or may be the only way they are connected. For example, a device may supply air bubbles into a liquid in one instance, and in another instance the device may also supply electricity from a battery via the same device to electrochemically activate the liquid.

Figure 89:
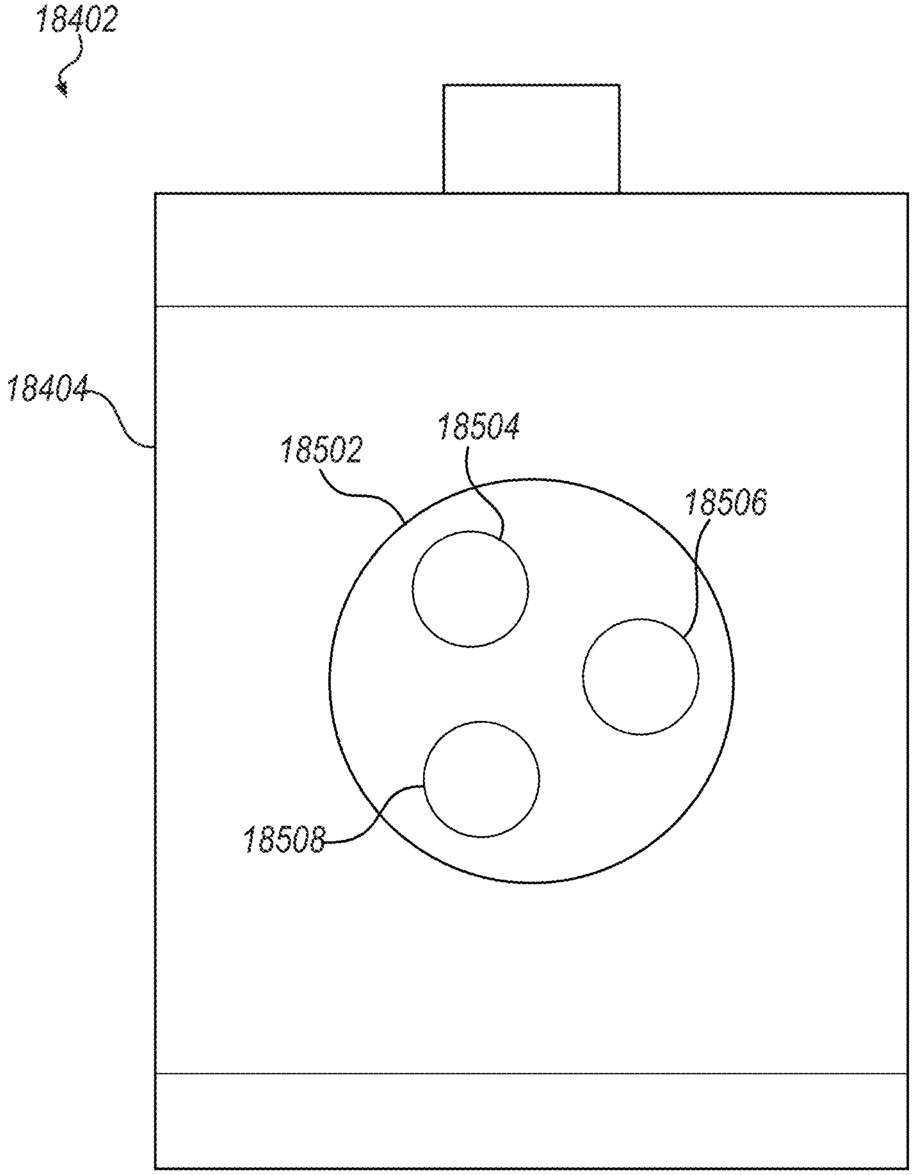
FIG. 89 depicts a payload coupler for a payload of an inspection robot for inspecting an inspection surface.

The payload may further include at least two sensor couplant channels, each of the at least two sensor couplant channels, e.g., 18608, fluidly coupled to the payload couplant interface at a first end, and fluidly coupled to a couplant chamber, e.g., 2810 (FIG. 26), for a corresponding one of the at least two inspection sensors 18416 at a second end. In an embodiment, the arm 18408 defines at least a portion of each of the at least two sensor couplant channels 18608, that is, the at least two sensor couplant channels share some of their length in the arm portion before branching out. The payload 18400 may further include a communication conduit 18504 structured to provide electrical communication between a data communications/power/control tether input 5112 (FIG. 48) and a payload control interface e.g., interface 18502, and wherein each of the at least two inspection sensors 18416 may be communicatively coupled to the payload control interface 18502. The communication conduit 18504 may include at least two sensor control channels, e.g., 18608, each of the at least two sensor control channels 18608 communicatively coupled to the payload control interface at a first end, and communicatively coupled to a corresponding one of the at least two inspection sensors 18416 at a second end. The arm 18408 may define at least a portion of each of the at least two sensor control channels. Referring to FIG. 89, the payload 18400 may further include a universal conduit 18502 structured to provide fluid communication of couplant between a chassis couplant interface 5102 and a couplant chamber 2810 (FIG. 26) corresponding to each of the at least two inspection sensors 18416; electrical communication between a, a data communications/power/control tether input 5112 and each of the at least two inspection sensors 18416; and electrical power between multiple sensor connectors 5118 (FIG. 48), and each of the at least two inspection sensors 18416.

The term universal conduit (and similar terms) as utilized herein should be understood broadly. Without limitation to any other aspect or description of the present disclosure, a universal conduit describes a conduit capable of providing multiple other conduits or connectors, such as fluid, electricity, communications, or the like. In certain embodiments, a universal conduit includes a conduit at least capable to provide an electrical connection and a fluid connection. In certain embodiments, a universal conduit includes a conduit at least capable to provide an electrical connection and a communication connection.

Figure 90:
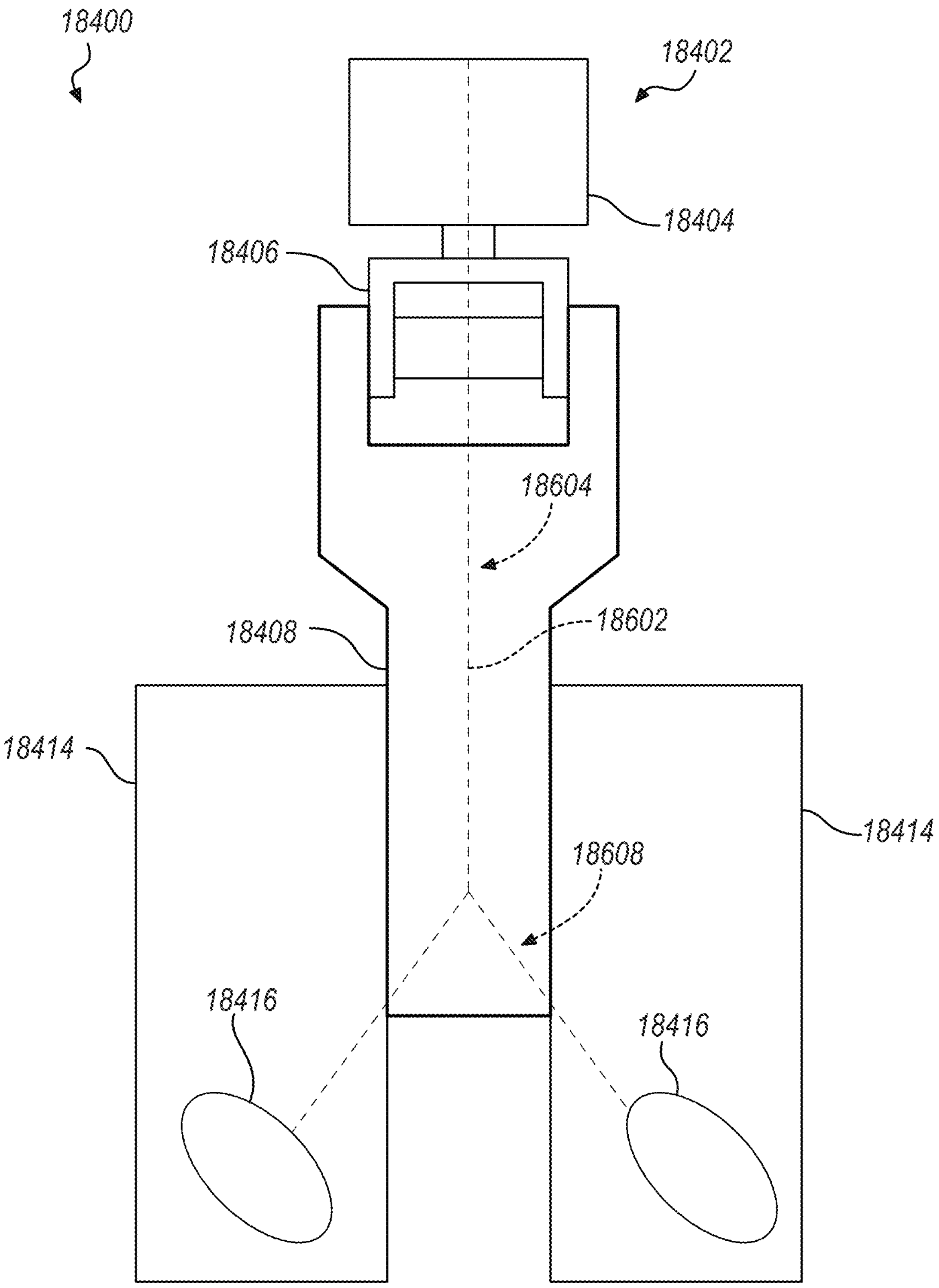
FIG. 90 depicts a payload for an inspection robot.

In an embodiment, and referring to FIG. 89 and FIG. 90, the universal conduit 18502 may include a single channel portion 18604 defining a single channel extending between the chassis and the payload coupler 18402; and a multi-channel portion 18608 defining a plurality of channels extending between the payload coupler 18402 and each of the one or more sleds 18414. In embodiments, there may be more than one single channel to support a number of payloads, or more than one chassis interface. In embodiments, the arm 18408 may define at least a portion of the multi-channel portion 18608 of the universal conduit 18602. The first portion 18404 of the payload coupler 18402 may include a universal connection port 18502 that may include a mechanical payload connector structured to mechanically couple with a mechanical connection interface of the chassis 102 (FIG. 1) of the inspection robot 100; and at least one connector selected from the connectors consisting of a payload couplant connector 18506 structured to fluidly communicate with a couplant interface 5102 of the chassis 102 of the inspection robot 100; a payload communication connector 18504 structured to electrically communicate with an electrical communication interface of the data communications/control tether input 5112 of the chassis 102 of the inspection robot 100; and an electrical power connector 18508 structured to electrically communicate with an electrical power interface of the data communications/control tether input 5112 of the chassis 102 of the inspection robot 100.

The term mechanically couple (and similar terms) as utilized herein should be understood broadly. Without limitation to any other aspect or description of the present disclosure, mechanically coupling describes connecting objects using a mechanical interface, such as joints, fasteners, snap fit joints, hook and loop, zipper, screw, rivet, or the like.

In an embodiment, and referring to FIG. 89, a payload coupler 18402 for a payload of an inspection robot for inspecting an inspection surface may include a first portion 18404 selectively couplable to a chassis of the inspection robot; a second portion 18406 couplable to an arm 18408 of the payload 18400; and a universal connection port 18502 disposed on the first portion 18404 and comprising: a mechanical payload connector structured to mechanically couple with a mechanical connection interface of the chassis of the inspection robot. The universal connection port may further include a payload couplant connector 18506 structured to fluidly communicate with a couplant interface 5102 of the chassis 102 of the inspection robot 100. The universal connection port 18502 may further include a payload communication connector 18504 structured to electrically communicate with an electrical communication interface of the data communications/control tether input 5112 of the chassis 102 of the inspection robot 100. The universal connection port 18502 may further include an electrical power connector 18508 structured to electrically communicate with an electrical power interface of the data communications/control tether input 5112 of the chassis 102 of the inspection robot 100. In certain embodiments, the payload coupler includes a single fluid connection port for a payload, and a separate single electrical connection port. In the example, the single fluid connection port provides for couplant or other working fluid provision to all sensors or devices on the payload, and the single electrical connection port provides for all electrical power and communication connections for all sensors or devices on the payload.

Figure 91:
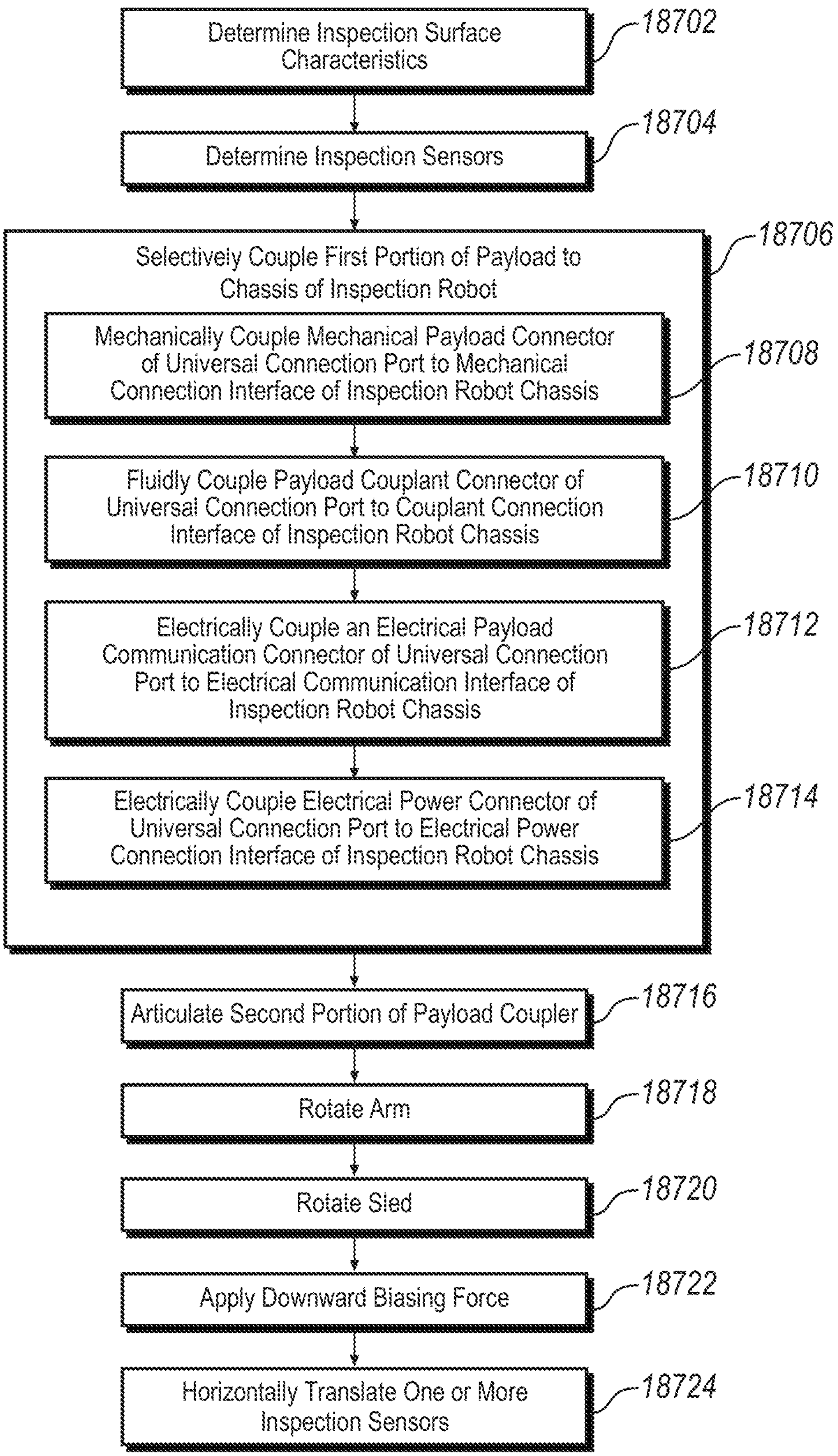
FIG. 91 depicts a method of inspecting an inspection surface with an inspection robot.

In an embodiment, and referring to FIG. 91, a method of inspecting an inspection surface with an inspection robot may include determining one or more surface characteristics of the inspection surface 18702; determining at least two inspection sensors 18704 for inspecting the inspection surface in response to the determined surface characteristics, the at least two inspection sensors each mounted to a corresponding sled, the corresponding sleds coupled to an arm, the arm coupled to a second portion of a payload coupler; selectively coupling a first portion of the payload coupler to a chassis of the inspection robot 18706; and articulating the first portion of the payload coupler 18716 causing relative movement between the first portion of the payload coupler and the second portion of the payload coupler. In an embodiment, selectively coupling the first portion of the payload coupler to a chassis of the inspection robot includes mechanically coupling a mechanical payload connector of a universal connection port, disposed on the first portion, to a mechanical connection interface of the chassis of the inspection robot 18708; and fluidly coupling a payload couplant connector of the universal connection port to a couplant interface of the chassis 18710. In an embodiment, selectively coupling a second portion of the payload coupler to a chassis of the inspection robot includes mechanically coupling a mechanical payload connector of a universal connection port, disposed on the second portion, to a mechanical connection interface of the chassis of the inspection robot 18708; and electrically coupling a payload communication connector of the universal connection port to an electrical communication interface of the chassis 18712. In an embodiment, selectively coupling the first portion of the payload coupler to a chassis of the inspection robot may include mechanically coupling a mechanical payload connector of a universal connection port, disposed on the first portion, to a mechanical connection interface of the chassis of the inspection robot 18708; and electrically coupling an electrical power connector of the universal connection port to an electrical power interface of the chassis 18714.

In an embodiment, selectively coupling the first portion of the payload coupler to a chassis of the inspection robot may include mechanically coupling a mechanical payload connector of a universal connection port, disposed on the first portion, to a mechanical connection interface of the chassis of the inspection robot 18708; fluidly coupling a payload couplant connector of the universal connection port to a couplant interface of the chassis 18710; electrically coupling an payload communication connector of the universal connection port to an electrical communication interface of the chassis 18712; and electrically coupling an electrical power connector of the universal connection port to an electrical power interface of the chassis 18714. The method may further include rotating the second portion of the payload coupler in relation to the first portion. The method may further include rotating the arm in relation to the payload coupler 18718. The method may further include rotating at least one of the corresponding sleds in relation to the arm 18720. The method may further include applying a downward biasing force to the at least two inspection sensors with respect to the inspection surface via a downward biasing force device 18722. The downward biasing force device may be disposed on the chassis of the inspection robot and may apply a rotational force to the payload coupler. The method may further include horizontally translating the at least two inspection sensors with respect to the chassis of the inspection robot 18724.

Figure 67:
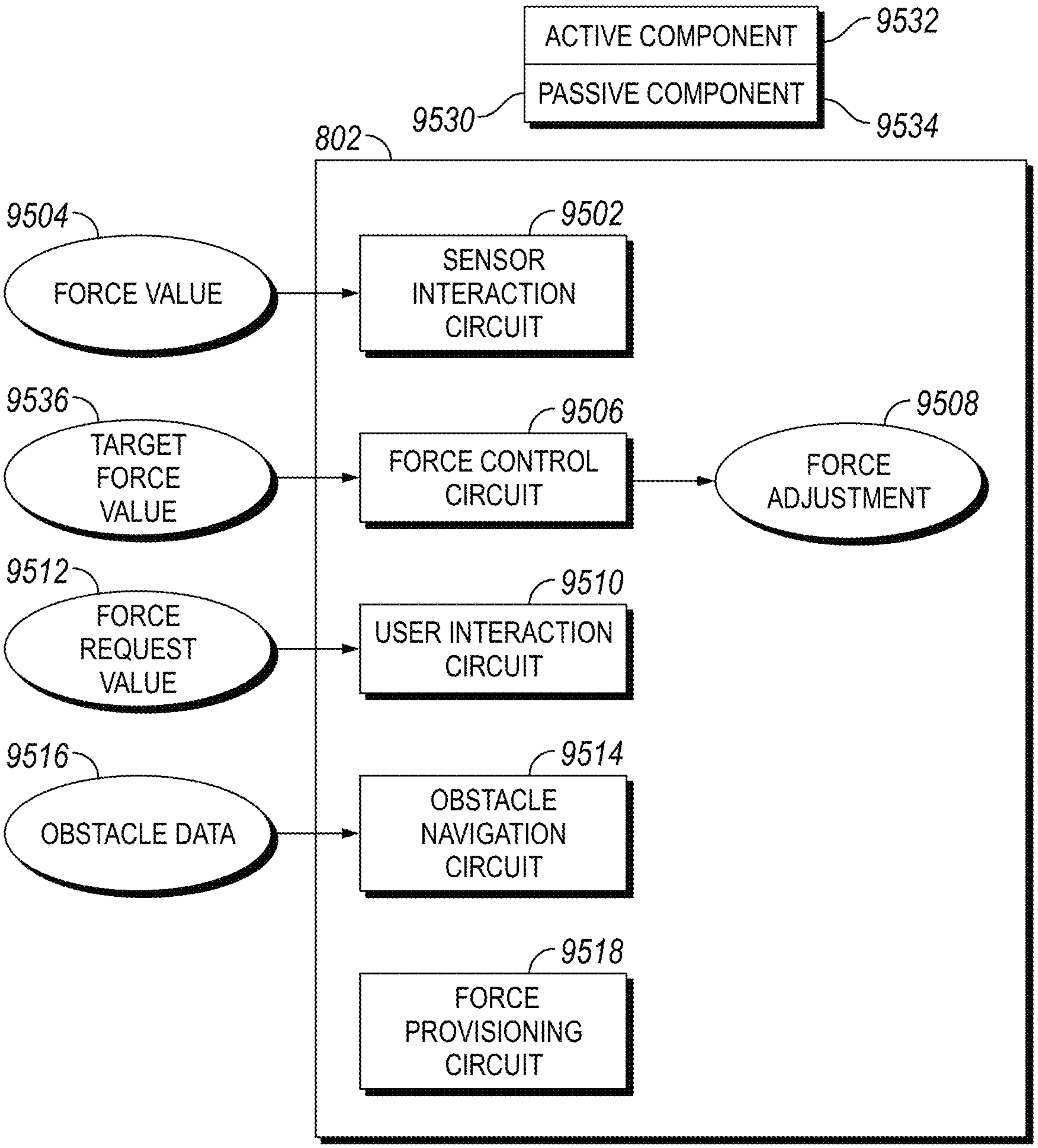
FIG. 67 depicts a controller for an inspection robot.

Turning now to FIG. 67, an example system and/or apparatus for providing dynamic adjustment of a biasing force for an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 67. In certain embodiments, the inspection robot 100 may have one or more payloads 2 (FIG. 1) and may include one or more sensors 2202 (FIG. 27) on each payload 2.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system further includes a biasing device/member 9530 that applies a downward force on at least one sled 1 (FIG. 1) of a payload 2 in a direction towards the inspection surface 500. The biasing device 9530 may be disposed on the inspection robot 100 and have a passive component 9534 and an active component 9532. The passive component 9534 may include a biasing member 21 such as a spring (FIG. 4), a permanent magnet, weight and/or other device that provides a relatively consistent force. The active component 9532 may include an electromagnet, a suction device, a sliding weight, an adjustable spring (e.g., coupled to an actuator that selectively increases compression, tension, or torsion of the spring), and/or other devices that provide for an adjustable/controllable force. The passive 9534 and/or active 9532 components may be mounted to a payload 2, sensors 2202 or other portions of the inspection robot 100 where the components 9532 and 9534 can provide a downward force on the sensors 2202 towards the inspection surface 500. For example, in embodiments, the passive component 9534 may be a permanent magnet that provides a constant baseline amount of force directing the sensors 2202 towards the inspection surface 500 with the active component 9532 being an electromagnet that provides an adjustable amount of force directing the sensors 2202 towards the inspection surface 500 that supplements the force provided by the passive component.

The example system further includes a controller 802 having a number of circuits configured to functionally perform operations of the controller 802. The example system includes the controller 802 having a sensor interaction circuit 9502, a force control circuit 9506 and a force provisioning circuit 9518. In embodiments, the controller 802 may further include a user interaction circuit 9510 and/or an obstacle navigation circuit 9514. The example controller 802 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 802 are set forth, without limitation, in the portion of the disclosure referencing FIGS. 67-69.

The example controller 802 is depicted schematically as a single device for clarity of description, but the controller 802 may be a single device, a distributed device, and/or may include portions at least partially positioned with other devices in the system (e.g., on the inspection robot 100). In certain embodiments, the controller 802 may be at least partially positioned on a computing device associated with an operator of the inspection (not shown), such as a local computer at a facility including the inspection surface 500, a laptop, and/or a mobile device. In certain embodiments, the controller 802 may alternatively or additionally be at least partially positioned on a computing device that is remote to the inspection operations, such as on a web-based computing device, a cloud computing device, a communicatively coupled device, or the like.

Figure 68:
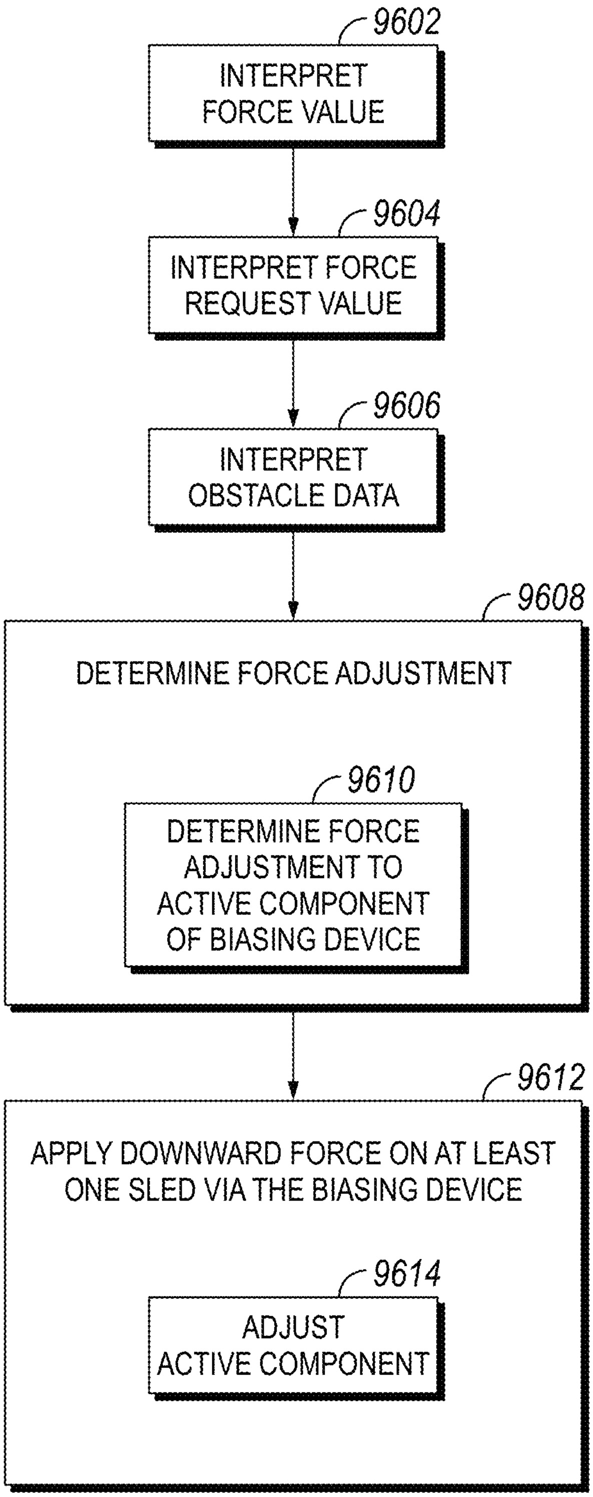
FIG. 68 depicts a method for dynamic adjustment of a biasing force for an inspection robot.

Accordingly, as illustrated in FIGS. 67 and 68, the sensor interaction circuit 9502 interprets 9602 a force value 9504 representing an amount of the downward force applied by the biasing device 9530 on a sled 1 in a direction towards the inspection surface 500. The force control circuit 9506 determines 9608 a force adjustment value 9508 in response to the force value 9504 and a target force value 9536. The force provisioning circuit 9518 provides the force adjustment value 9508 to the active component 9532, which is responsive to the force adjustment value 9508. In other words, the active component 9532 is adjusted 9614 based at least in part on the determined force adjustment value 9508. In embodiments, determining 9608 the force adjustment value 9508 may include determining 9610 the force adjustment value 9508 to the active component 9532. The biasing device 9530 may then apply 9612 the downward force to the sled 1 and/or sensors 2202, which, as discussed above, may be performed by adjusting 9614 the active component 9532.

For example, in embodiments, the passive component 9534 may be configured to provide the target force value 9536 to the sled 1 and/or sensors 2202, wherein the target force value 9536 may correspond to an ideal/optimal amount of force for keeping the sensors 2202 coupled to the inspection surface 500 as the sled 1 bounces, jostles and/or otherwise moves in relation to the inspection surface 500 during an inspection run. It will also be understood that the passive component 9534 and the active component 9532 may be configured to collectively provide the target force value 9536.

Accordingly, in embodiments, the force control circuit 9506 may determine 9608 the force adjustment value 9508 so that the magnitude of the downward force applied by the biasing device 9530 is increased or decreased as conditions encountered by the inspection robot 100 while traversing the inspection surface 500 make it more or less likely that the sensors 2202 will be jostled, bounced, and/or otherwise moved away from an ideal position with respect to the inspection surface 500. In other words, as conditions become more difficult or easy for the sensors 2202 to remain coupled to the inspection surface 500, the target force value 9536 may increase or decrease and the controller 802 may increase or decrease the amount of downward force applied by the active component 9532 in an effort to make the amount of downward force applied by the biasing device 9530, i.e., the sum of the passive 9534 and active 9532 components, to be equal, or nearly equal, to the target force value 9536. In such embodiments, the force adjustment value 9508 may be determined 9608 in response to determining that a coupling quality value is below a coupling quality threshold. As will be appreciated, dynamic adjustment of the amount of downward force provided by the biasing device 9530 improves the overall likelihood that the sensors 2202 will remain coupled to the inspection surface 500 during an inspection run.

Figure 69:
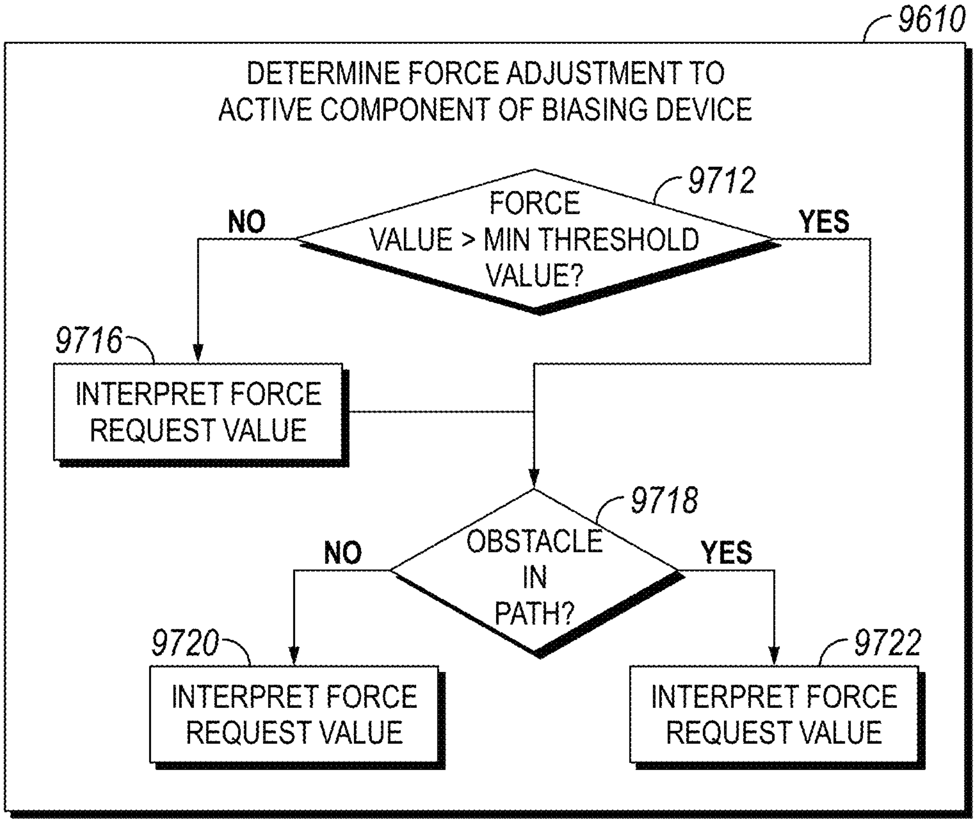
FIG. 69 a method to determine a force adjustment to a biasing force of an inspection robot.

As shown in FIGS. 68 and 69, in embodiments, the obstacle navigation circuit 9514 may interpret 9606 obstacle data 9516 from one or more obstacle sensor, which may be mounted on the inspection robot 100 or located off the inspection robot 100. Such obstacle data 9516 may include the location and/or type of structures on the surface, cracks in the surface, gaps in the inspection surface 500 and/or any other type of information (as described herein) relating to an obstacle which may need to be traversed by the inspection robot 100. In such embodiments, the force control circuit 9506 may update the force adjustment value 9508 when the obstacle navigation circuit 9514 determines 9718 from the obstacle data 9516 that an obstacle is in the path of the inspection robot 100 along the inspection surface 500 and/or when the obstacle data 9516 indicates the obstacle is no longer in the path of the inspection robot 100. For example, where the obstacle data 9516 indicates that an obstacle, e.g., a pipe head, is in the path of the inspection robot 100, the force control circuit 9506 may determine the force adjustment value 9508 to be negative to reduce 9722 the amount of force applied by the biasing device 9530 so that the sensors 2202 and/or sled 1 can more easily move over and/or away from the obstacle. As will be appreciated, in some embodiments, the direction of the fore supplied by the active component 9532 may be reversed to as to lift the sensors 2202 and/or sled 1 away from the inspection surface 500. Upon determining 9718 that the obstacle has been cleared, the force adjustment value 9508 may be made positive to increase 9720 the amount of force applied by the biasing device 9530 to improve sensor 2202 coupling with the inspection surface 500.

As further shown in FIGS. 68 and 69, in embodiments, the force control circuit 9506 may determine 9608 the force adjustment value 9508 such that the amount of the downward force applied by the biasing device 9530 is above a minimum threshold value 9712. For example, in embodiments, the minimum threshold value 9712 may correspond to an amount of force for keeping the sensors 2202 and/or sled 1 from decoupling from the inspection surface 500, e.g., when the inspection surface 500 is inclined and/or vertical with respect to the Earth's gravitational field. For example, in situations where the inspection robot 100 is inspecting a vertical metal wall, the control circuit may first attempt to traverse an obstacle by reducing an amount of force applied by an electromagnet of the active component 9532 with the minimum threshold value 9712 serving as a safety feature to prevent undesirable departure of the sensors 2202, sleds 1 and/or inspection robot (as a whole) from the inspection surface 500. When the force value 9504 is below the minimum threshold value 9712, or when a determined force adjustment value 9508 would result in the force value 9504 dropping below the minimum threshold value 9712, the force control circuit 9506 may increase 9716 the amount of downward force supplied by the biasing device 9530 by increasing the amount of the force supplied by the active component 9532.

As yet further shown in FIG. 68, in embodiments, the user interaction circuit 9510 interprets 9604 a force request value 9512. The force adjustment value 9508 may be based, at least in part, on the force request value 9512. For example, the inspection robot 100 may encounter an obstacle and send a notification to an operator. Upon receiving the notification, the operator may determine that the obstacle may be best traversed by decreasing the amount of downward force applied by the biasing device 9530. The operator may then send a force request value 9512 to the controller 802 that calls for decreasing the downward force applied by the biasing device 9530, with the force control circuit 9506 adjusting 9614 the active component 9532 in kind. The operator may also determine that an obstacle is best traversed by increasing the amount of downward biasing force and send a force request value 9512 to the controller 802 calling for an increase in the downward biasing force applied by the biasing device 9530. For example, an operator may detect that the inspection robot 100 has encountered a portion of the inspection surface 500 that is bumpier than expected such that the sensors 2202 are uncoupling, or are about to uncouple, from the surface 500. Accordingly, the operator may increase the amount of biasing force provided by the active component 9532. As another example, the operator may detect that the inspection robot 100 needs to cross a gap and/or small step in the surface 500. In such cases, the operator may decrease the amount of biasing force applied by the active component 9532 to facilitate and easier crossing.

In embodiments, the minimum threshold value 9712 may be based, at least in part, on the force request value 9512. For example, an operator may detect that the inspection surface 500 is steeper and/or bumpier than originally expected and send a force request value 9512 to the controller 802 that sets and/or increases the minimum threshold value 9712 to reduce the risk of the sensors 2202, sled 1 and/or inspection robot 100 (as a whole) from undesirably departing the inspection surface 500.

In embodiments, the force adjustment value 9508 may be determined 9608 further in response to determining that an excess fluid loss value exceeds a threshold value. For example, the controller 802 and/or operator may detect that couplant is being lost at a rate faster than desired and, in turn, increase the amount of the downward force applied by the active component 9532 to reduce couplant loss by decreasing the space between the sensors 2202 and the inspection surface 500.

In embodiments, the active component 9532 may be adjusted to compensate for a temperature of the active component 9532, passive component 9534, inspection surface 500 and/or ambient environment. For example, in embodiments where the passive component 9534 is a permanent magnet, the amount of force supplied by the permanent magnet may decrease due to a hot inspection surface and/or hot environmental temperatures. The decrease in the force supplied by the passive component 9534 may be compensated for by increasing the amount of force supplied by the active component 9532. Further, as temperatures changes may affect the efficiency of an electromagnet, in embodiments, the amount of the force called for by the controller 802 of the active component 9532 may need to change as the electromagnet increases and decreases in temperature in order to provide for a consistent amount of force.

Figure 70:
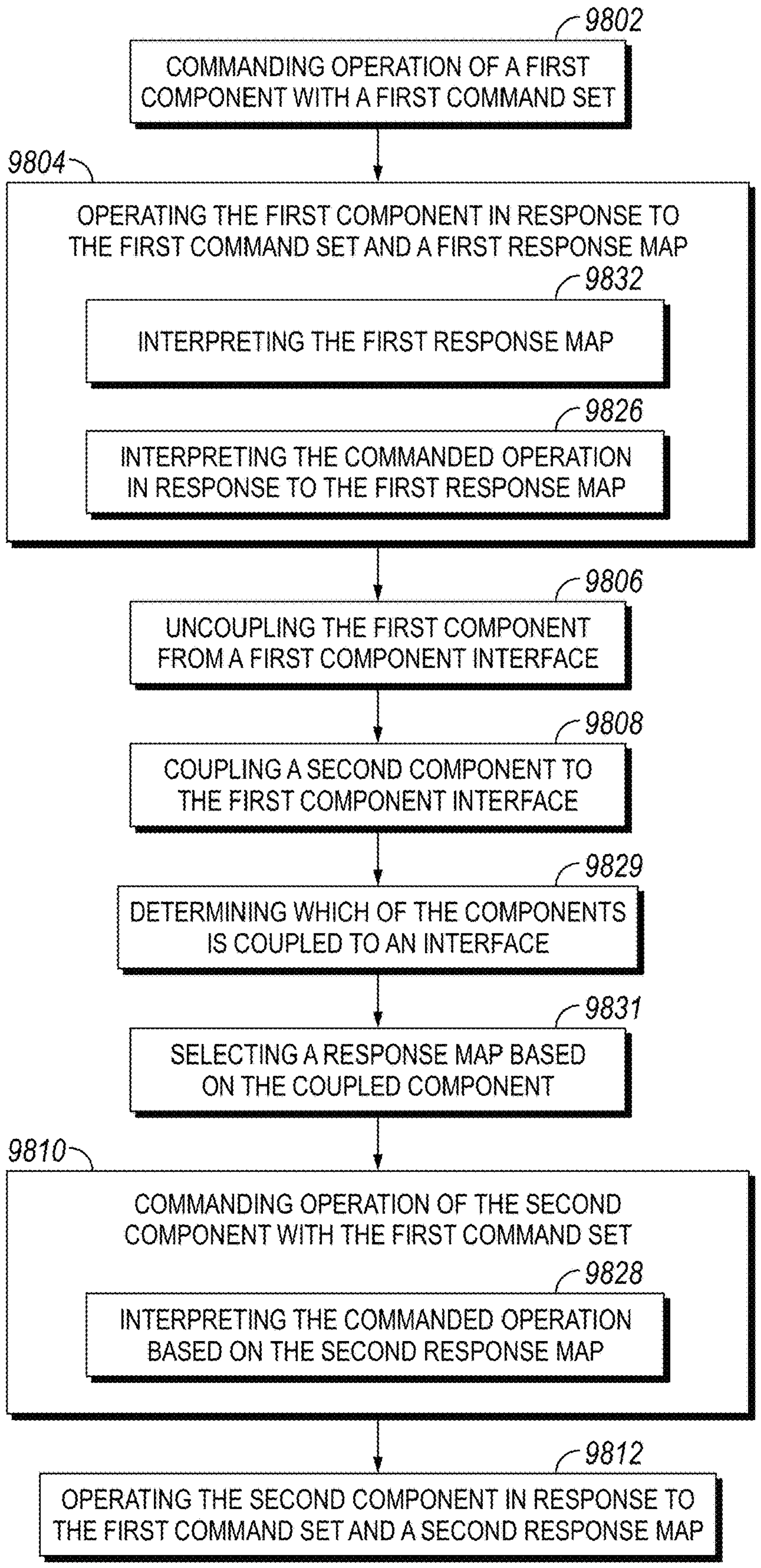
FIGS. 70-72 depict a method of operating an inspection robot.
Figure 71:
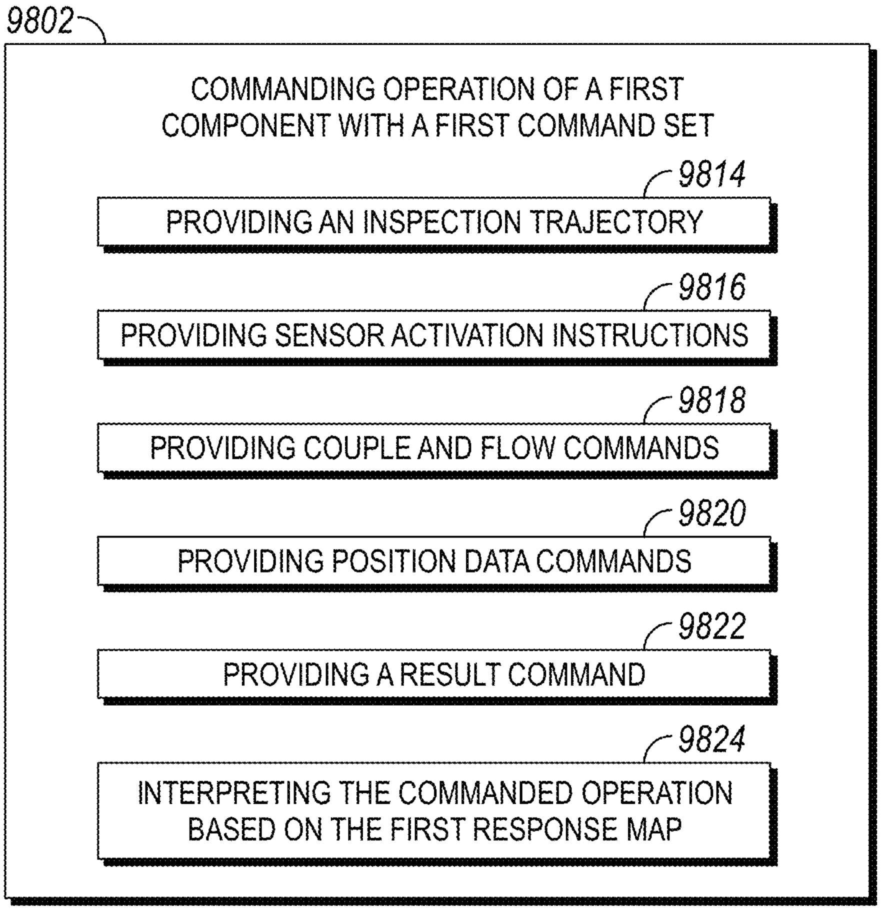
Figure 72:
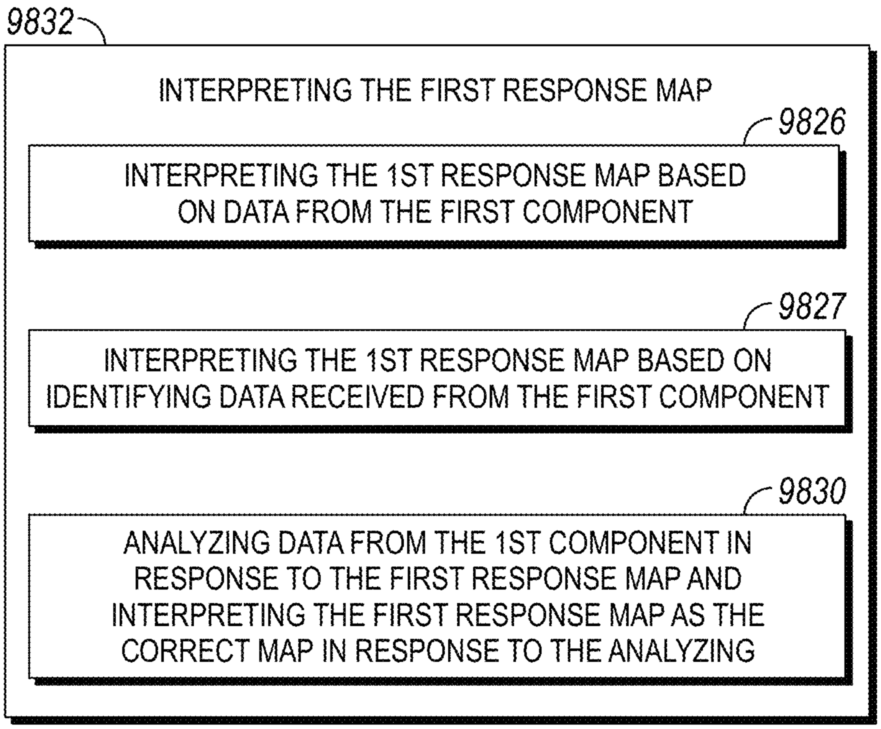

Referring to FIGS. 70-72, a method of operating an inspection robot is depicted. The method may include commanding operation of a first component of an inspection robot with a first command set (step 9802) and operating the first component in response to the first command set and a first response map (step 9804). The first component may be uncoupled from a first component interface of the inspection robot (step 9806) and a second component of the inspection robot coupled to the first component interface (9808). The method may further include commanding operation of a second component with the first command set (step 9810) and operating the second component in response to the first command set and a second response map (step 9812). Operating the first component may include interpreting the commanded operation in response to the first response map (step 9824) and operating the second component may include interpreting the commanded operation in response to the second response map (step 9828). The first response map and the second response map may be the same or distinct. In embodiments the method may further include determining which of the first component of the second component is coupled to the first component interface (step 9829) and selecting one of the first response map or the second response map based on the coupled component (step 9831). While examples of a first component with a first response map and a second component with a second response map are described, it should be understood that there may be a plurality of components, each having a component response map.

In embodiments, the first component may include a first sensor carriage with at least two sensors coupled to the first sensor carriage. The second component may include a second sensor carriage, the second carriage also having at least two sensors coupled to the second sensor carriage. The inspection configuration of the different sensor carriages may be the same or distinct from one another. In embodiments, the first component may include a first inspection payload and the second component may include a second inspection payload. The payloads may be distinct in terms of types and configurations of payloads.

As depicted in FIG. 71, commanding operation of the first component (step 9802) may include: providing an inspection trajectory for the inspection robot (step 9814), providing sensor activation instructions for a plurality of sensors corresponding to a first component (step 9816), providing couplant flow commands for the first component (step 9818), providing position data commands corresponding to inspection data from the first component (step 9820), or providing a result command for the first component (step 9822). Further, interpreting the first response map may include interpreting (step 9824) the first response map based on data received from the first component, interpreting the first response map based on identifying data received from the first component, analyzing data from the first component in response to at least the first response map and interpreting the first response map as the correct map in response to the analyzing, and the like.

As depicted in FIG. 72, operating the first component (step 9804) may include interpreting the first response map (step 9832). Interpreting the first response map may include: interpreting the first response map based on data received from the first component (step 9826); interpreting the first response map based on identifying data received from the first component (step 9827); analyzing data from the first component in response to at least the first response map and interpreting the first response map as the correct map in response to the analyzing (step 9830); and the like. Similarly, operating the second component (or other components) may include interpreting the component response map. Interpreting the component response map may include: interpreting the component response map based on data received from the component interpreting the component response map based on identifying data received from the component; analyzing data from the component in response to at least the component response map and interpreting the component response map as the correct map in response to the analyzing; and the like. While an example of commanding operation of a first component with a first command set and interpreting the first response map has been provided, it is understood that the example is not limited to the first component but rather map be understood to apply to a plurality of different components.

Figure 73:
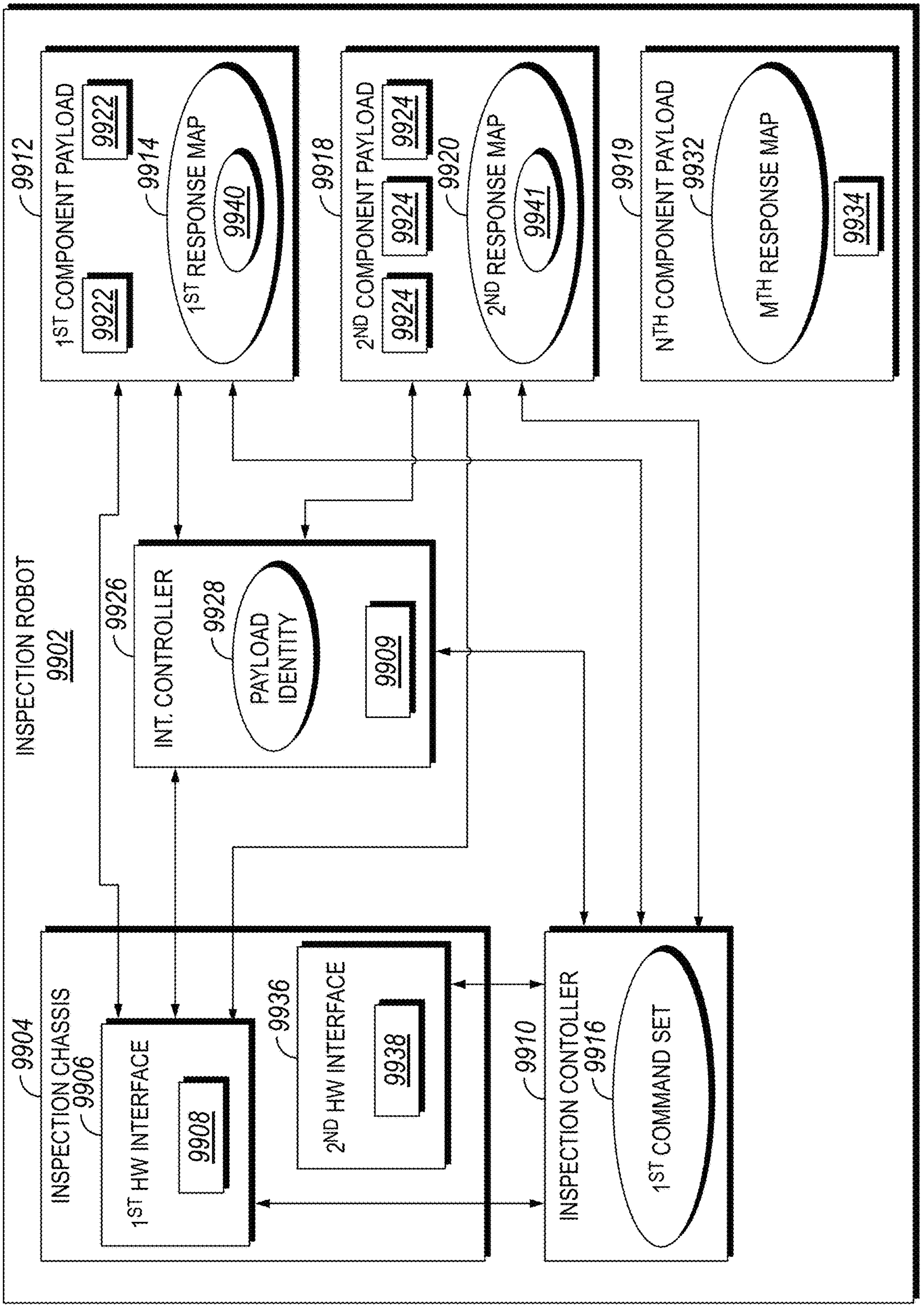
FIG. 73 depicts an inspection robot.

Referring to FIG. 73, an inspection robot 9902 is depicted. The inspection robot 9902 may include an inspection chassis 9904 having a first hardware interface 9906 with a first quick release connection 9908 and a second hardware interface 9936 with a second quick release connection 9938. The example inspection robot 9902 includes an inspection controller 9910 communicatively coupled to the first hardware interface 9906, and structured to control a payload component 9922, 9924 using a first command set 9916. The example inspection robot 9902 includes a first component payload 9912 operably couplable to the first hardware interface 9906, and having a first payload component 9922 with a first response map 9914, where the first payload component 9922 interacts with the inspection controller 9910 using the first command set 9916. The example inspection robot 9902 further includes a second component payload 9918 that includes a second payload component 9924 having a second response map 9920 and structured to interact with the inspection controller 9910 using the first command set 9916.

In certain further embodiments, the first payload component 9922 includes at least two sensors, and/or the second payload component 9924 includes at least two sensors. In certain further embodiments, the first response map 9914 is distinct from the second response map 9920. In certain embodiments, the first payload component 9922 includes a different number of sensors relative to the second payload component 9924. In certain embodiments, the first hardware interface 9906 includes a couplant connection.

Example and non-limiting first command set parameters include one or more of: an inspection trajectory for the inspection robot, sensor activation instructions for the inspection robot, couplant flow commands for the inspection robot, position data commands corresponding to inspection data from the first component or the second component for the inspection robot, a result command for the inspection robot, and/or an inspection result command for the inspection robot.

An example inspection robot 9902 includes an intermediary controller 9926 structured to determine whether the first component payload 9912 or the second component payload 9918 is coupled to the first hardware interface 9906, and to select an appropriate one of the first response map 9914 or the second response map 9920 based on the coupled component payload. An example inspection robot 9902 further includes the intermediary controller 9926 further determining whether the first component payload 9912 or the second component payload 9918 is coupled to the first hardware interface 9906 by performing an operation such as: interrogating a coupled payload for identifying information (e.g., payload identity 9928), analyzing data received from a coupled payload with the first response map 9914 and the second response map 9920 (e.g., determining which response map provides for sensible and/or expected information based on communicated data from the respective component, and/or determining which response map results in an actuator providing the expected response), using the analyzing data received from a coupled payload and determining the coupled payload in response to the analyzing (e.g., determining the type of data, the sampling rate, the range, etc., to determine which component is coupled).

An example intermediary controller 9926 interprets a corresponding response map 9914, 9920 from the coupled payload, and adjusts communications of the first command set 9916 in response to the corresponding response map 9914, 9920 to determine an adjusted command set 9909, and commands operations of the coupled payload in response to the adjusted first command set. An example intermediary controller 9926 interprets identifying information 9940, 9941 from the coupled component to determine which component is coupled to the first hardware interface 9906. An example intermediary controller 9926 interprets inspection data from the coupled payload in response to the corresponding response map.

An example inspection robot 9902 includes the inspection chassis 9904 having a second hardware interface 9936 including a second quick release connection 9938, wherein the first component payload 9912 and the second component payload 9918 are operably couplable to the second hardware interface 9936. In certain embodiments, the first component payload 9912 and the second component payload 9918 are swappable between the first hardware interface 9906 and the second hardware interface 9936. In certain embodiments, the inspection robot 9902 includes an additional number of payloads 9919, each having a corresponding response map 9932 (and/or a controller 9934), where the inspection robot 9902 is configured to interact with coupled members of the number of component payloads using the first command set 9916. In certain embodiments, the interaction controller 9926 interacts with the inspection controller 9910 and the coupled component payloads 9912, 9918, determining response maps and/or adjusting the first command set 9916, thereby isolating operations, command values, and/or parameter values of the inspection controller 9910 from the coupled component payload 9918, and allowing for utilization of each hardware interface 9906, 9936 for any one or more of, and/or for selected subsets of, the number of component payloads 9912, 9918.

Example and non-limiting component payloads include one or more components such as: a sensor, an actuator, a welder, a visible marking device, a coating device, and a cleaning tool. An example embodiment includes the first payload component 9922 comprises a first drive module, wherein the second payload component 9918 comprises a second drive module, where the first hardware interface 9906 comprises a first connection port on a first chassis side of the inspection robot, and wherein the second hardware interface 9936 comprises a second connection port on a second chassis side of the inspection robot.

Example and non-limiting response maps for components include one or more component descriptions such as: a raw sensor data to processed value calibration, an actuator command description, a sensor output value, an analog-to-digital description corresponding to the component, diagnostic data corresponding to the associated component, and/or fault code data corresponding to the associated component.

Figure 74:
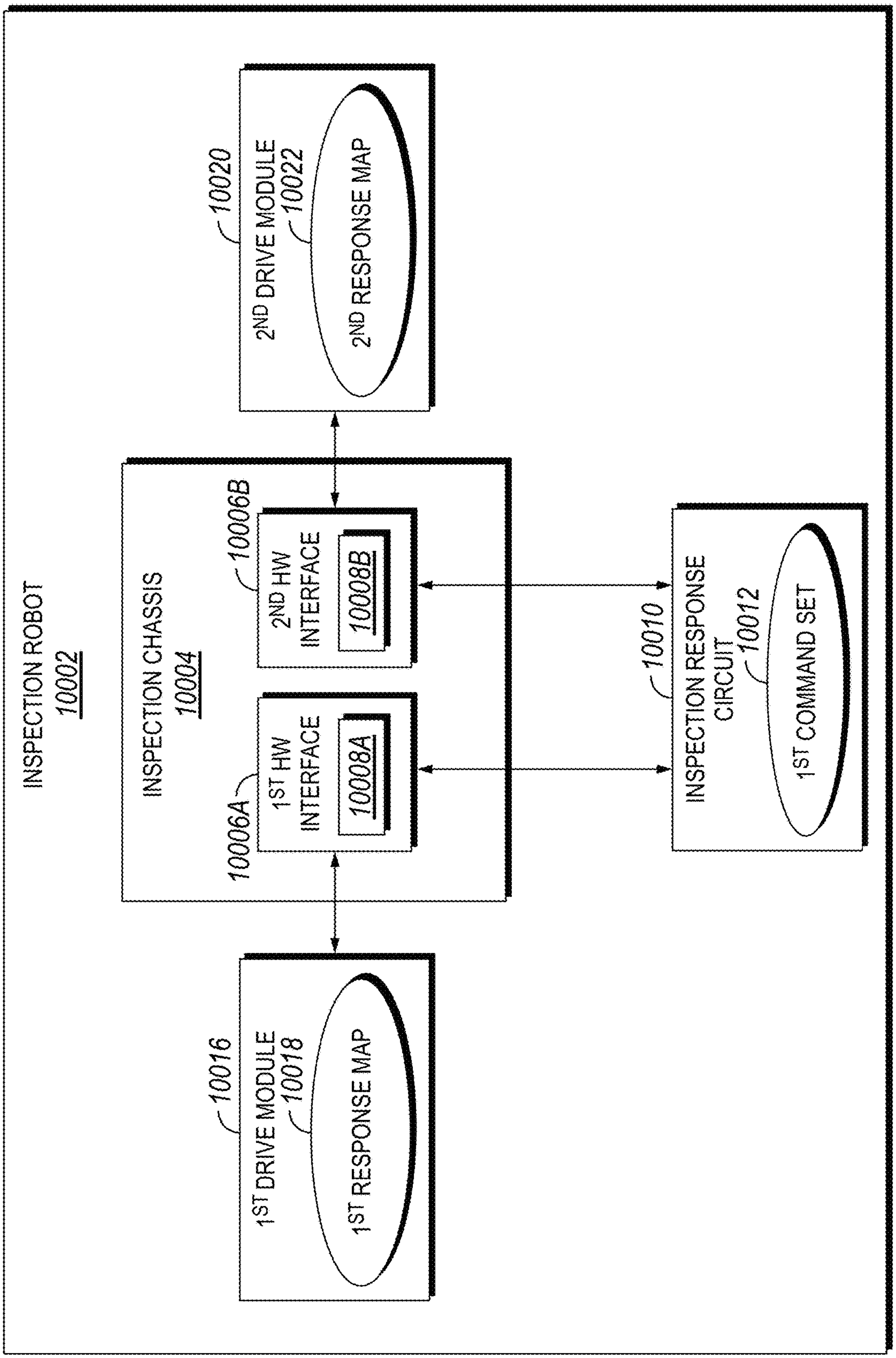
FIG. 74 depicts an inspection robot.

Referencing FIG. 74, an example inspection robot 10002 having swappable and reversible drive modules 10016, 10020 is depicted. The example inspection robot 10002 includes an inspection chassis 10004 having a first hardware interface 10006A and a second hardware interface 10006B, which may include a connecting port on the chassis housing, and/or a drive suspension couplable to a drive module and having rotation allowance/limiting features, translation allowance/limiting features, electrical connections, mechanical connections, and/or communication connections for the drive modules 10016, 10020. The example inspection robot 10002 includes an inspection response circuit 10010, depicted apart from the inspection chassis 10004 but optionally positioned in whole or part on the inspection chassis, and depicted on the inspection robot 10002 but optionally positioned in whole or part away from the inspection chassis. The example inspection response circuit 10010 receives inspection response values (e.g., determined responses for reconfiguration, adjusting an inspection operation, and/or a user request value to adjust operations), and provides a first command set 10012 in response to the adjustments. In certain embodiments, the hardware interfaces 10006A, 10006B include intermediate drive controllers 10008A, 10008B configured to provide commands responsive to the first command set 10012, and further in response to a first response map 10018 and the second response map 10022. In certain embodiments, the example of FIG. 74 allows for the drive modules 10016, 10020 to be coupled to either hardware interface and perform inspection operations and/or adjustments.

Figure 75:
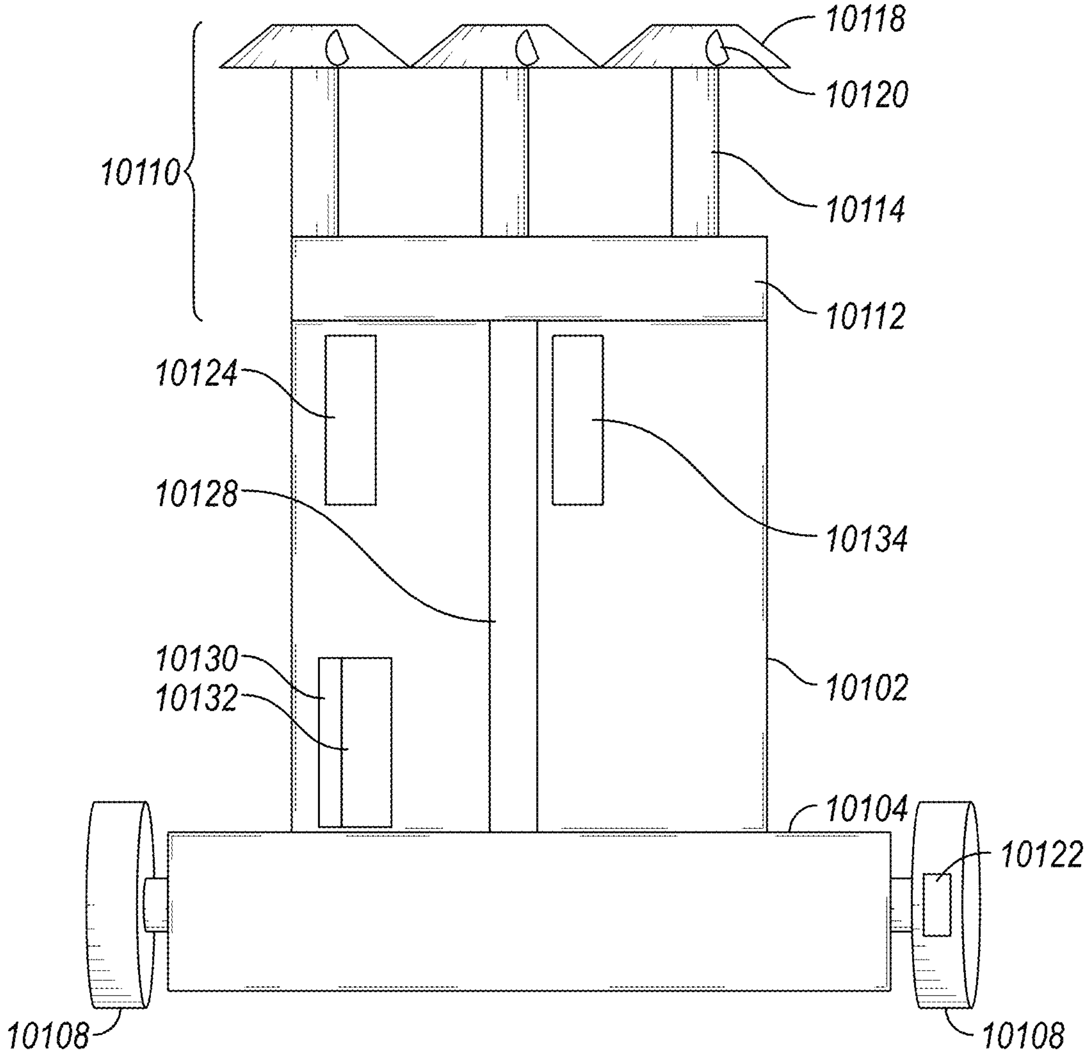
FIG. 75 is a schematic depicting an inspection robot having one or more features for operating in a hazardous environment.

Turning now to FIG. 75, an example system and/or apparatus for operating an inspection robot in a hazardous environment is depicted. The example inspection robot includes any inspection robot having a number of sensors associated therewith and configured to inspect a selected area. Without limitation to any other aspect of the present disclosure, an inspection robot as set forth throughout the present disclosure, including any features or characteristics thereof, is contemplated for the example system depicted in FIG. 75. In certain embodiments, the inspection robot may include a chassis 10102 to which one or more payloads 10110 are mounted. The payloads 10110 may have a body 10112 to which one or more arms 10114 are mounted. One or more sleds 10118, having one or more inspection sensors 10120, may be mounted to the arms 10114. One or more drive modules 10104, having one or more wheel assemblies 10108, may be mounted to the chassis 10102.

Operations of the inspection robot provide the sensors 10120 in proximity to selected locations of the inspection surface 500 (FIG. 5) and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 10120 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

In embodiments, the one or more wheel assemblies 10108 may have a heat resistant magnet 10122 and/or heat resistant magnetic arrangement. The heat resistant magnet 10122 may have a working temperature rating of at least 250° F. In embodiments, the heat resistant magnet 10122 may have a working temperature rating of at least 80° C. In embodiments, the heat resistant magnet 10122 may have a working temperature rating of at least 150° C. In embodiments, the heat resistant magnet 10122 may include a rare earth metal, e.g., neodymium, samarium, and compounds thereof, e.g., NdFeB and SmCo. Materials capable of generating a BHmax greater than forty (40) with a working temperature rating of at least 250° F. may also be included in the magnet. An example heat resistant magnetic arrangement includes a selected spacing of the magnetic hub from the inspection surface (e.g., utilizing the enclosures and/or a cover for the wheel), reducing conduction to the magnetic hub (e.g., a coating for the enclosures and/or the magnetic hub, and/or a wheel cover having a selected low conductivity material), and/or reducing radiative heating to the magnetic hub (e.g., adjusting an absorption coefficient for the hub with polishing and/or a coating, covering a line of sight between the magnetic hub and the inspection surface with a wheel cover, and/or reducing an exposed surface area of the magnetic hub with an enclosure arrangement, wheel cover, and/or coating).

As further shown in FIG. 75, in embodiments, the inspection robot may further include a cooling plate 10124 thermally coupled to an electrical component 10134 which may be disposed on the chassis 10102 and/or other portions of the inspection robot, e.g., the payloads 10110 and/or drive modules 10104. The cooling plate 10124 may be designed to transfer heat away from the electrical component 10134 and radiate it into the surrounding environment. In embodiments, the cooling plate 10124 may be disposed on a side of the chassis 10102 facing the inspection surface 500 during an inspection run. In embodiments, the cooling plate 10124 may be on a side of the chassis 10102 facing away from the inspection surface 500 during an inspection run. In embodiments, the cooling plate 10124 may be thermally coupled to a couplant manifold (e.g., a manifold within the inspection robot body to distribute couplant) to transfer heat from the electrical component 10134 and radiate it into the couplant in the manifold. In embodiments, the cooling plate 10124 may be thermally coupled to the couplant manifold to transfer heat from the couplant in the manifold and radiate it into the ambient environment.

In embodiments, the inspection robot may include a conduit 10128 that provides coolant to the electrical component 10134, wherein heat is transferred 10218 from the electrical component to the coolant. In embodiments, the coolant may be the couplant. In embodiments, the coolant may be distinct from the couplant. In embodiments, the coolant may be water, alcohol, glycol, and combinations thereof. In embodiments where the coolant is the couplant, the conduit 10128 may be fluidly connected to the couplant manifold. In embodiments, wherein the coolant is the couplant, the conduit 10128 may provide 10220 the couplant to the sleds 10118 to promote acoustic coupling of at least a portion of the sensors to the inspection surface. In embodiments, a flow rate of the coolant may be adjusted 10224 in response to a heat transfer requirement of the electrical component 10134. For example, if the electrical component 10134 is increasing in temperature, the flow rate of the coolant may be increased to so that more coolant passes through the conduit 10128 thereby increasing the transfer rate of heat from the electrical component 10134 to the coolant. Conversely, if the electrical component 10134 is not at risk from malfunctioning due to excessive heat, the flow rate of the coolant may be reduced to conserve the coolant and/or energy in transporting the coolant to the inspection robot.

Figure 77:
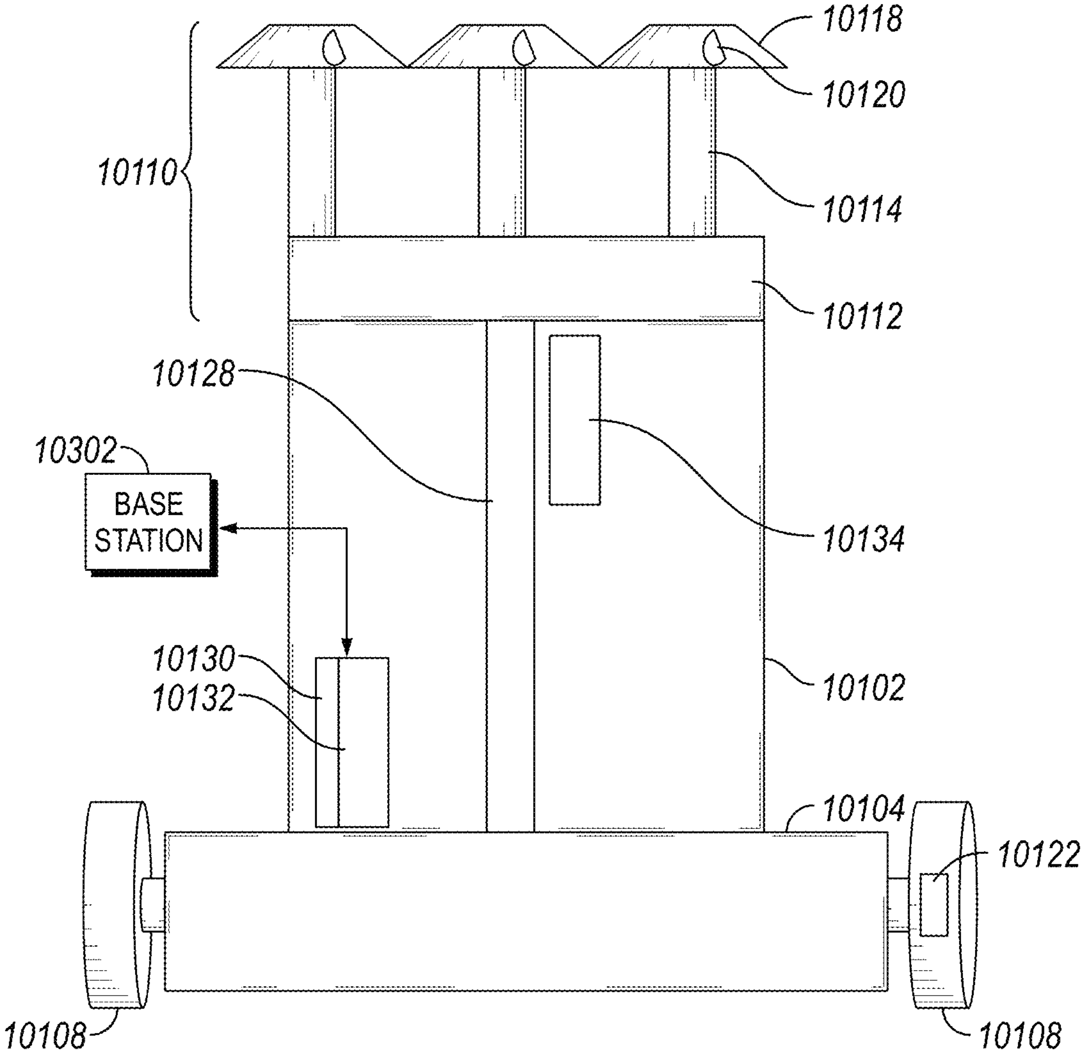
FIG. 77 is another schematic depicting an inspection robot having one or more features for operating in a hazardous environment.

In embodiments, the conduit 10128 may be fluidly connected to a tether 10130 that provides the coolant and/or other services 10228, e.g., electrical power, data communications, provision and/or recycling of coolant and/or couplant. In such embodiments, the tether 10130 may be connected to a coolant source, e.g., base station 10302 (FIG. 77), that supplies the coolant and, optionally, cools the coolant. In some embodiments, the coolant may be cycled/recycled 10222 between the inspection robot and a coolant source, e.g., the base station 10302, via the tether 10130. As will be appreciated, recycling coolant and/or couplant may reduce the costs of operating the inspection robot. In embodiments, the tether 10130 may have a heat resistant jacketing 10132, e.g., silicone rubber and/or other heat resistant materials.

In embodiments, the sleds 10118 may include polyetherimide (PEI). In such embodiments, the sleds 10118 may be additively manufactured. As will be appreciated, polyetherimide provides for the sleds 10118 to be exposed to surface temperatures of at least 250° F. without structural failures.

Figure 76:
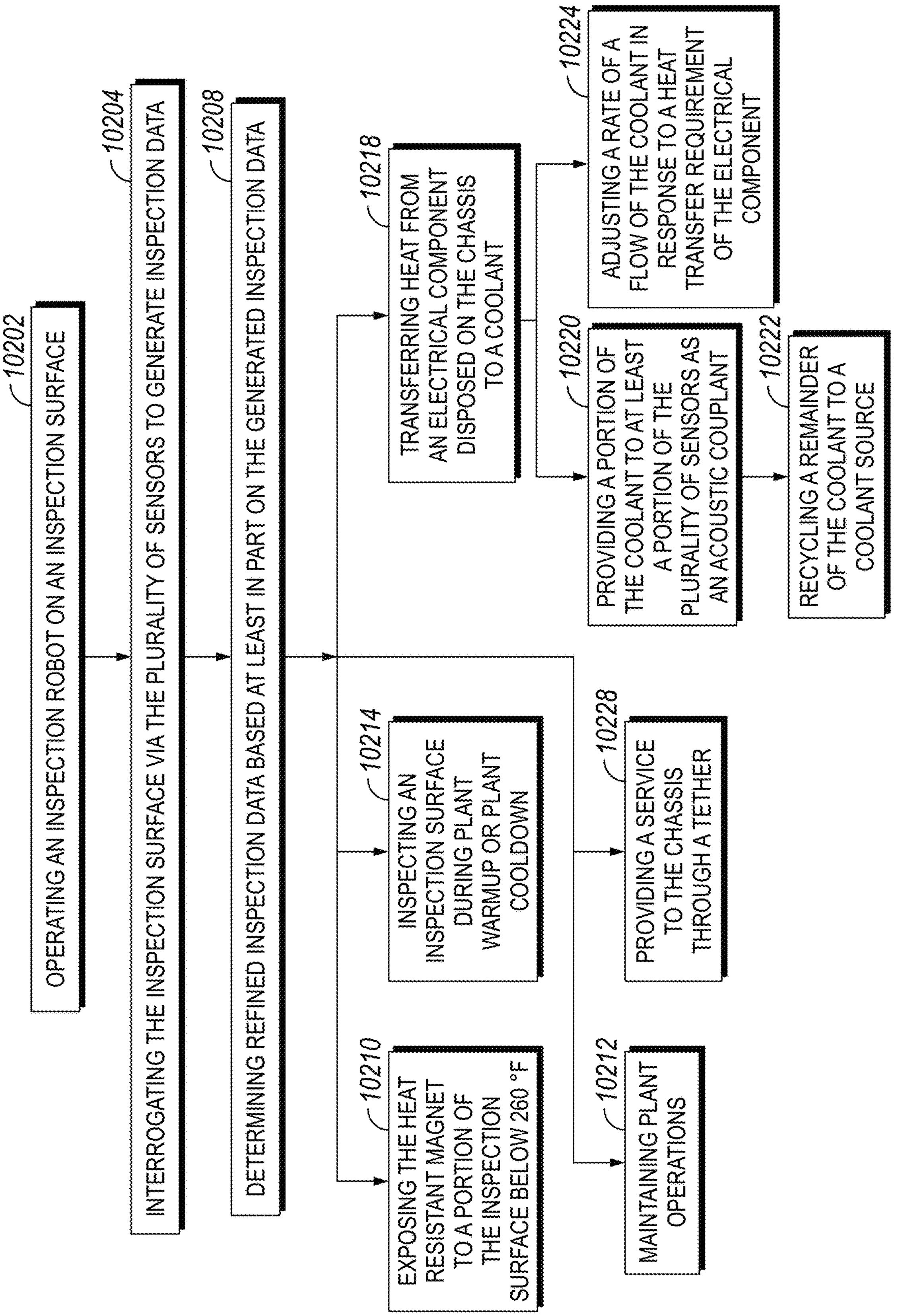
FIG. 76 depicts a method for operating an inspection robot in a hazardous environment.

Accordingly, in operation, (as shown in FIG. 76), an inspection robot having one or more of the hazardous environment features disclosed herein may be operated 10202 on the inspection surface 500 so as to interrogate 10204 the inspection surface with the sensors 10120 to generate inspection data. Refined data may be determined 10208 based at least in part on the generated inspection data. The inspection surface 500, or its environment, may expose 10210, the heat resistant magnet 10122 to temperatures below 260° F. As will be appreciated, the ability of an inspection robot, in accordance with the embodiments disclosed herein, to operate in such temperatures may provide for a plant, e.g., a power plant, corresponding to the inspection surface to maintain operations 10212 during an inspection run by the inspection robot. In embodiments, the inspection run may be performed during a warmup and/or cooldown period 10214 of the plant. By providing for the ability to perform an inspection run without disrupting a plant's operations, some embodiments of the inspection robot may improve the plant overall efficiency by reducing and/or eliminating down downtime of the plant traditionally associated with performing inspections on the inspection surface.

In embodiments, a drive motor (e.g., reference FIG. 81) in a drive module 4912 (FIG. 47) of the inspection robot 100 may include a power rating that exceeds a combined gravitational force on the inspection robot and the tether. In other words, the drive motors of some embodiments require enough electrical power to transport the weight of the inspection robot 100, the tether and the couplant flowing in the robot 100 and tether, up a vertical face of an inspection surface 500. In embodiments, the inspection surface 500 may have at least one portion with vertical extent greater than or equal to 6 feet, 12 feet, 20 feet, 34 feet, 50 feet, 100 feet, and/or 200 feet.

Figure 78:
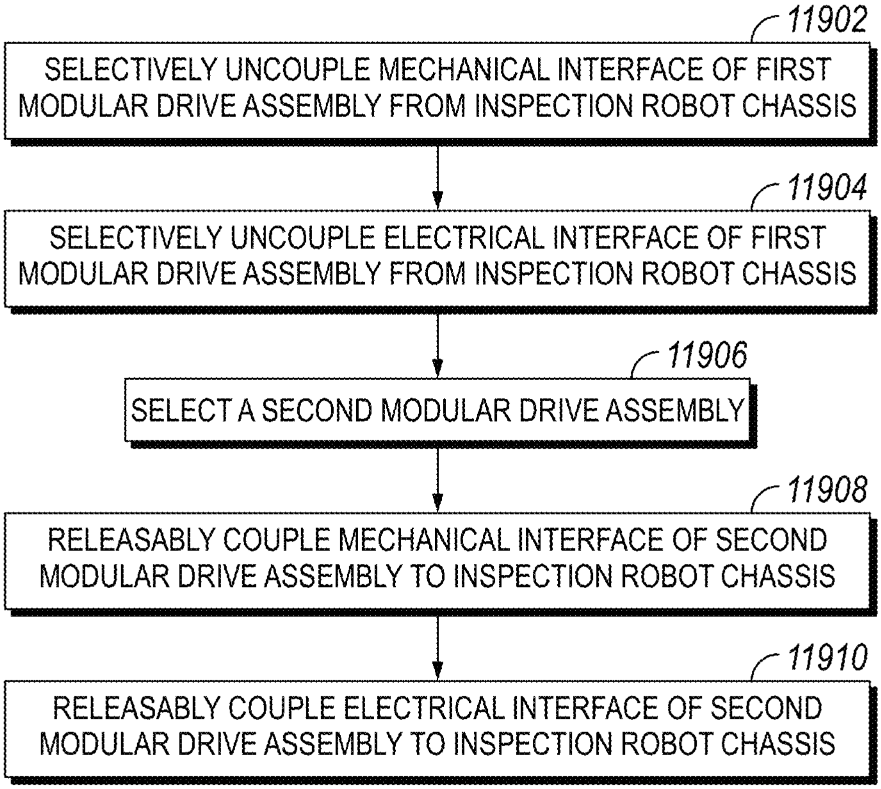
FIG. 78 depicts a method for coupling drive assemblies to an inspection robot.

Turning now to FIG. 78, a method for coupling drive assemblies to an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example methods depicted in FIGS. 78-80. In certain embodiments, the inspection robot 100 may have one or more payloads 2 (FIG. 1) and may include one or more sensors 2202 (FIG. 5) on each payload. In embodiments, the inspection robot 100 may have one or more modular drive assemblies 4918.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

Figure 79:
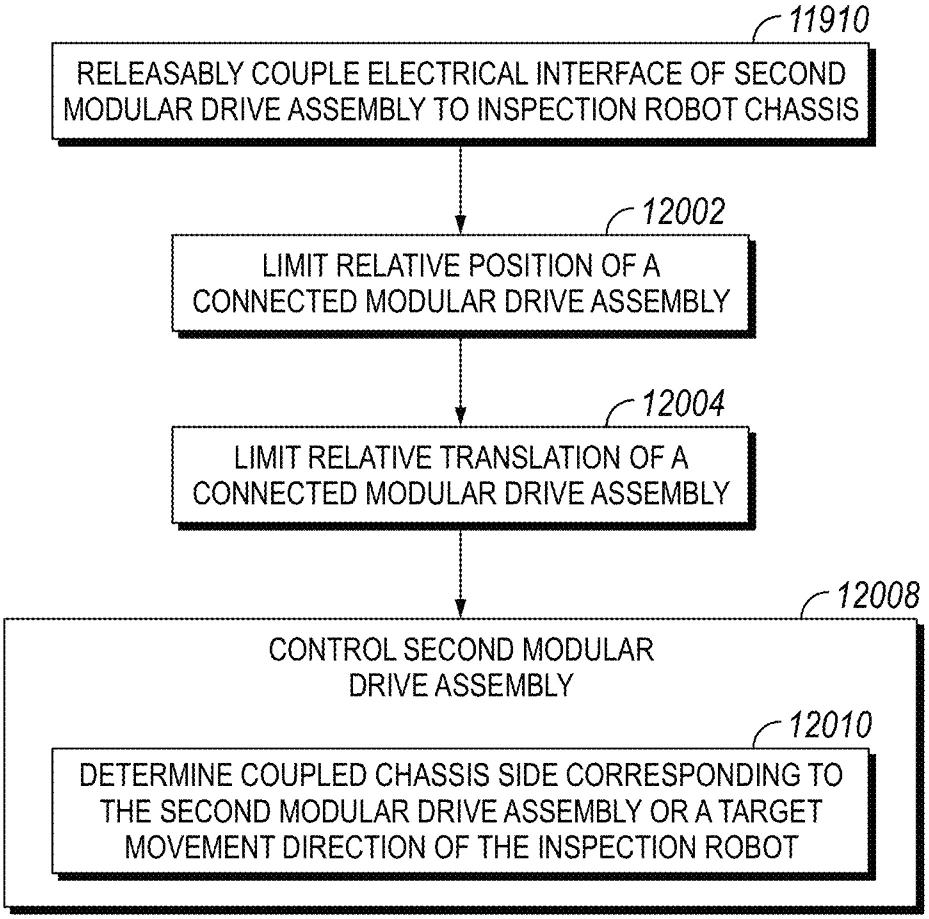
FIG. 79 depicts a method for coupling drive assemblies to an inspection robot.

As shown in FIGS. 78 and 79, a first method may include selectively uncoupling a first mechanical interface 11902 and a first electrical interface 11904 of a first connector of a first modular drive assembly from a drive module interface of a chassis of the inspection robot 100. The method may further include selecting 11906 a second modular drive assembly having a second connector. In embodiments, the method may further include releasably coupling a second mechanical interface 11908 and a second electrical interface 11910 of the second connector to the drive module interface of the chassis of the inspection robot. The first and the second electrical interfaces may include electrical power and control connections for the respective modular drive assembly, and the first and second mechanical interfaces may mechanically couple the respective modular drive assembly. In embodiments, the first and the second modular drive assemblies each have at least two wheels positioned to be in contact with the inspection surface when the inspection robot is positioned on the inspection surface. In embodiments, at least one wheel of the second modular drive assembly has a different wheel configuration than at least one corresponding wheel of the first modular drive assembly. In embodiments, the first mechanical interface may include a first rotation limiter, and/or wherein the second mechanical interface includes a second rotation limiter. In such embodiments, the method may further includes limiting 12002 a relative rotation/position of a connected modular drive assembly in response to the respective coupled rotation limiter.

In embodiments, the first mechanical interface includes a first translation limiter, such as a piston stop, wherein the second mechanical interface includes a second translation limiter, e.g., a piston stop. In such embodiments, the method may further include limiting 12004 a relative translation of a connected modular drive assembly in response to the respective coupled translation limiter. In certain embodiments, only one, or neither, of the drive modules is coupled to the chassis with the ability to translate and/or rotate relative to the chassis.

In embodiments, the method my further include selectively controlling 12008 the second modular drive assembly in one of a first direction or a second direction. In embodiments, selectively controlling 12008 may include determining 12010 one of a coupled chassis side corresponding to the second modular drive assembly or a target movement direction of the inspection robot.

Figure 80:
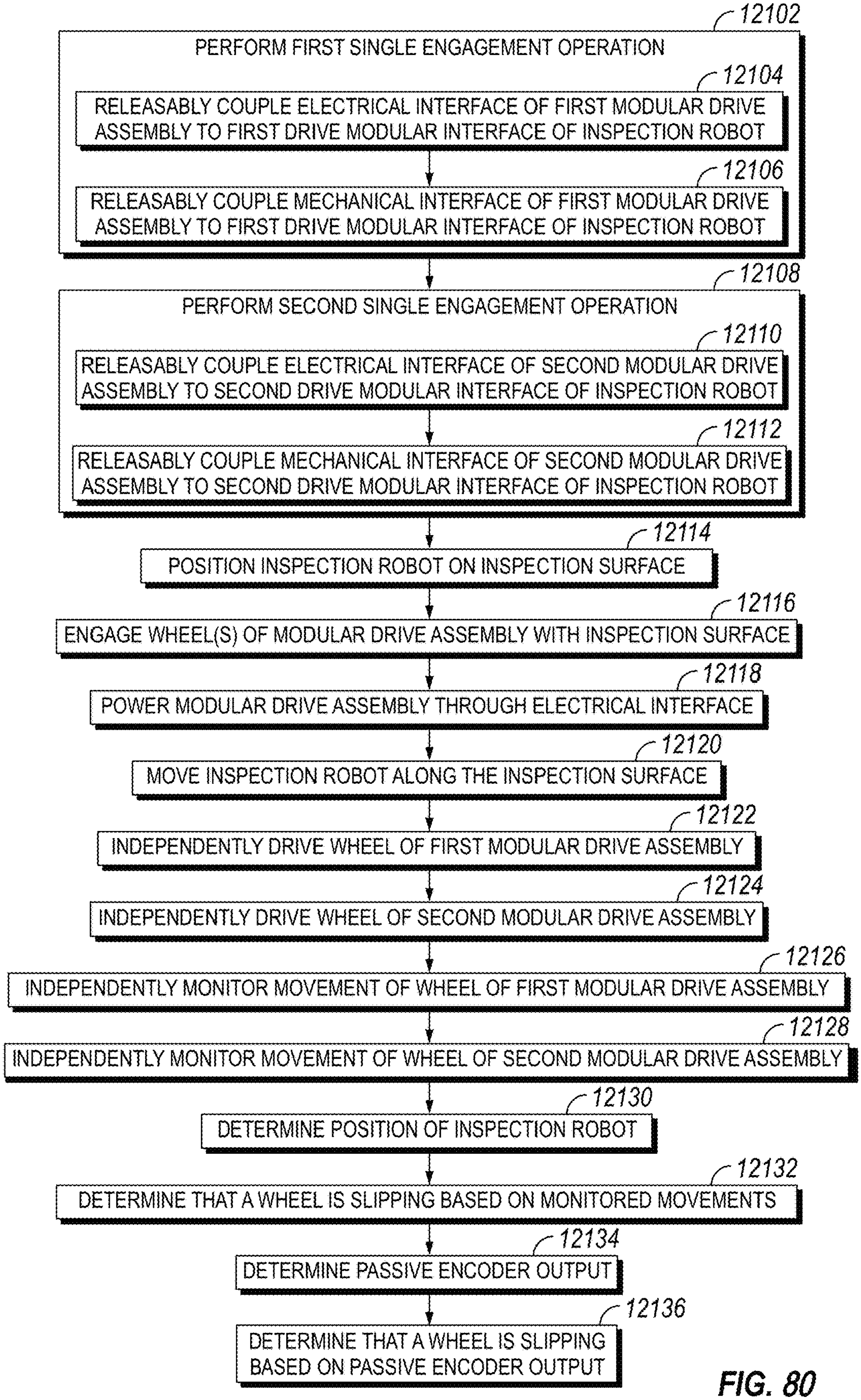
FIG. 80 depicts a method of releasably coupling an electrical interface and a mechanical interface of a modular drive assembly.

Turning to FIG. 80, another method includes releasably coupling 12102 an electrical interface and a mechanical interface of a modular drive assembly to a drive module interface of the inspection robot; positioning 12114 the inspection robot on the inspection surface, thereby engaging 12116 at least one wheel of the modular drive assembly with the inspection surface; and powering 12118 the modular drive assembly through the electrical interface, thereby controllably moving the inspection robot along the inspection surface. In embodiments, releasably coupling 12102 the electrical interface 12104 and the mechanical interface 12106 may include performing a single engagement operation. In embodiments, the method may further include limiting a relative rotation between the modular drive assembly and a chassis of the inspection robot through the mechanical interface. In embodiments, the method may further include limiting a translation movement between the modular drive assembly and a chassis of the inspection robot through the mechanical interface. In embodiment, the method may further include releasably coupling 12108 an electrical interface 12110 and a mechanical interface 12112 of a second modular drive assembly to a second drive module interface of the inspection robot. In such embodiments, the drive module interface may be positioned on a first side of a chassis of the inspection robot, and the second drive module interface may be positioned on a second side of the chassis of the inspection robot. In embodiments, controllably moving 12120 the inspection robot on the inspection surface may include independently driving 12122, 12124 the at least one wheel of the modular drive assembly and at least one wheel of the second modular drive assembly. In embodiments, the method may further include independently monitoring 12126 movement of the at least one wheel of the modular drive assembly and the at least one wheel of the second modular drive assembly. In embodiments, the method may further include determining 12130 a position of the inspection robot based at least in part on the monitored movements of the one or more wheels. In embodiments, the method may further include determining 12132 that at least one of the at least one wheel of the modular drive assembly and/or the at least one wheel of the second modular drive assembly is slipping with respect to the inspection surface based at least in part on the monitored movement of the one or more wheels. In embodiments, the method may further include determining 12126 a passive encoder output from a passive encoder associated with one of the modular drive assembly or the second modular drive assembly. In such embodiments, determining 12132 that at least one of the at least one wheel of the modular drive assembly or the at least one wheel of the second modular drive assembly is slipping with respect to the inspection surface may be based at least in part on the passive encoder output (e.g., operation 12136).

As will be appreciated, embodiments of the modular drive assemblies disclosed herein may provide for the ability to quickly swap out wheel configurations for the inspection robot. For example, a first modular drive assembly having wheels with a first shape corresponding to a first portion of an inspection surface (or the surface as a whole) may be switched out with another modular drive assembly having wheels with a shape corresponding to a second portion of the inspection surface (or a second inspection surface). For example, a first modular drive assembly may be used to inspect a first pipe having a first curvature and a second modular drive assembly may be used to inspect a second pipe having a second curvature.

Figure 81:
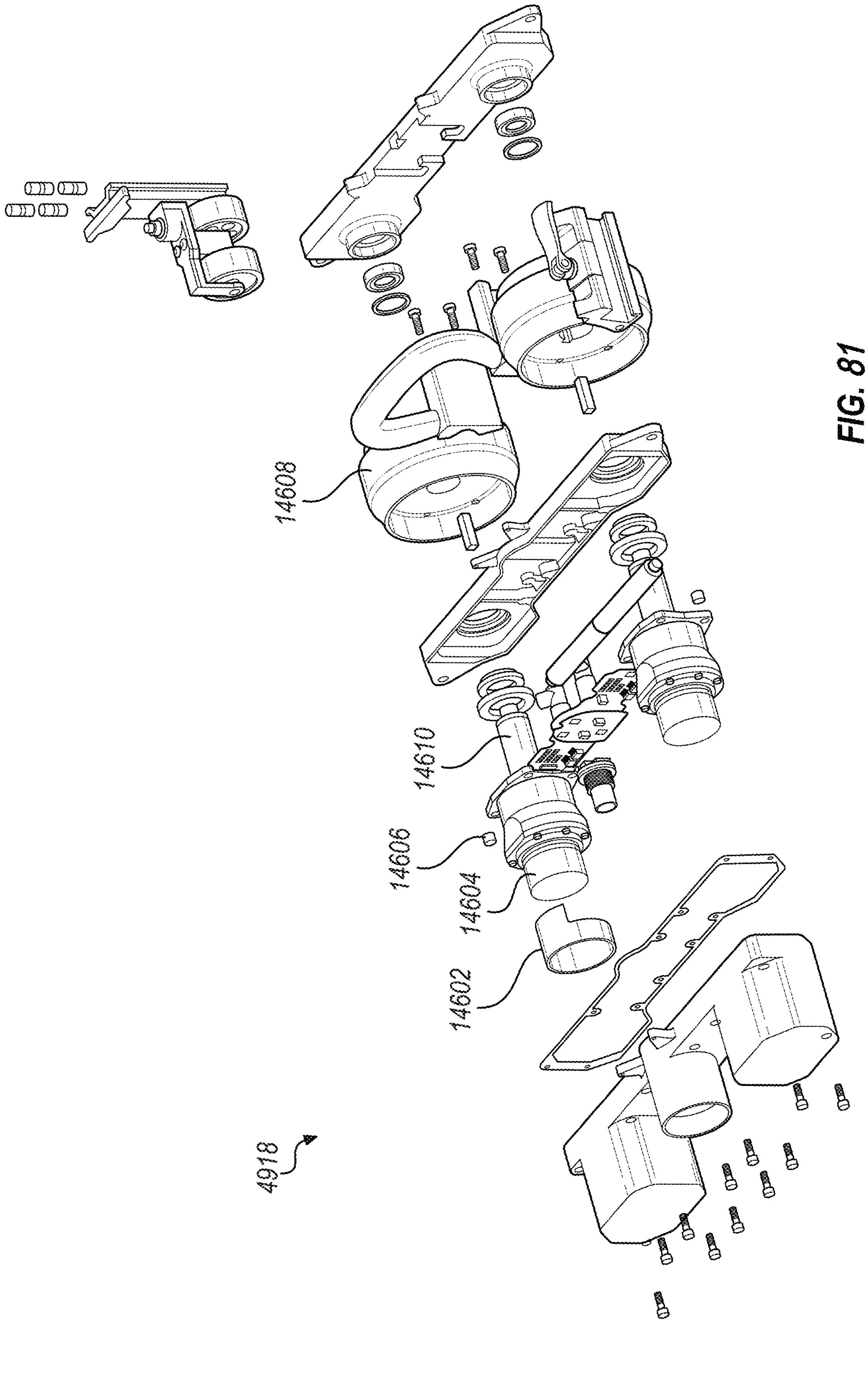
FIG. 81 is a schematic diagram depicting an exploded view of a modular drive module for an inspection robot.

Turning now to FIG. 81, an example modular drive assembly 4918 for an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example modular drive assembly 4918 depicted in FIG. 81. In certain embodiments, the inspection robot 100 may have one or more payloads 2 (FIG. 1) and may include one or more sensors 2202 (FIG. 27) on each payload.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

As shown in FIG. 81, the modular drive assembly 4918 may include a motor 14604 coupled to a magnetic wheel assembly 14608. In embodiments, the modular drive assembly 4918 may be mounted to the chassis 102 (FIG. 1) of the inspection robot 100. In embodiments, the magnetic wheel assembly 14608 and/or motor 14604 may be directly mounted to the chassis. One or more electromagnetic sensors 14606 may be coupled to the motor 14604. The modular drive assembly 4918 may further include a magnetic shielding assembly 14602 structured to shield the motor 14604 from electromagnetic interference generated by the magnetic wheel assembly 14608.

The motor 14604 may be an electromagnetic based motor, e.g., DC and/or AC, and coupled to the magnetic wheel assembly 14608 via a drive shaft 14610. The motor 14604 may be substantially cylindrical in shape and have one or more coil windings and/or permanent magnets that cause a rotor of the motor to rotate when in the presence of an electromagnetic filed generated by passing an electrical current through the motor. While the embodiment of the modular drive assembly 4918 shown in FIG. 151 the motor 14604 disposed between the magnetic wheel assembly 14608 and the chassis 102 of the inspection robot 100, it will be understood that embodiments may have the motor 14604 disposed such that the magnetic wheel assembly 14608 is disposed between the chassis 102 and the motor 14604.

The magnetic wheel assembly 14608 may include one or more magnets operative to couple the inspection robot 100 to an inspection surface 500. Without limitation to any other aspect of the present disclosure, a magnetic wheel assembly 14608 as set forth throughout the present disclosure, including any features or characteristics thereof, is contemplated for the example modular drive assembly 4918 depicted in FIG. 81. As will be appreciated, the magnets within the magnetic wheel assembly 14608 generate a magnetic field having field lines that may penetrate the motor 14604.

The electromagnetic sensors 14606 may be operative to measure one or more characteristics of the motor, e.g., rotations per minute (RPMs) and/or other properties via interfacing with electromagnetic radiation, e.g., magnetic field lines, of the electromagnetic motor. For example, in embodiments, the electromagnetic sensors 14606 may be hall effect sensors. In embodiments, the electromagnetic sensors 14606 may be disposed next and/or near the motor 14604. In embodiments wherein the electromagnetic sensors 14606 are hall effect sensors, the plane of the conductive plane of the sensor may be oriented such that the magnetic field lines of the motor 14604 pass through the plane at right (90°) or nearly right angles.

The magnetic shielding assembly 14602 may be disposed such that it intercepts some or all of the magnetic field lines of the magnetic wheel assembly 14608 before those field lines penetrate the electromagnetic sensor 14606 and/or the motor 14604, while also allowing magnetic field lines from the motor 14604 to penetrate the electromagnetic sensor 14606.

Figure 106:
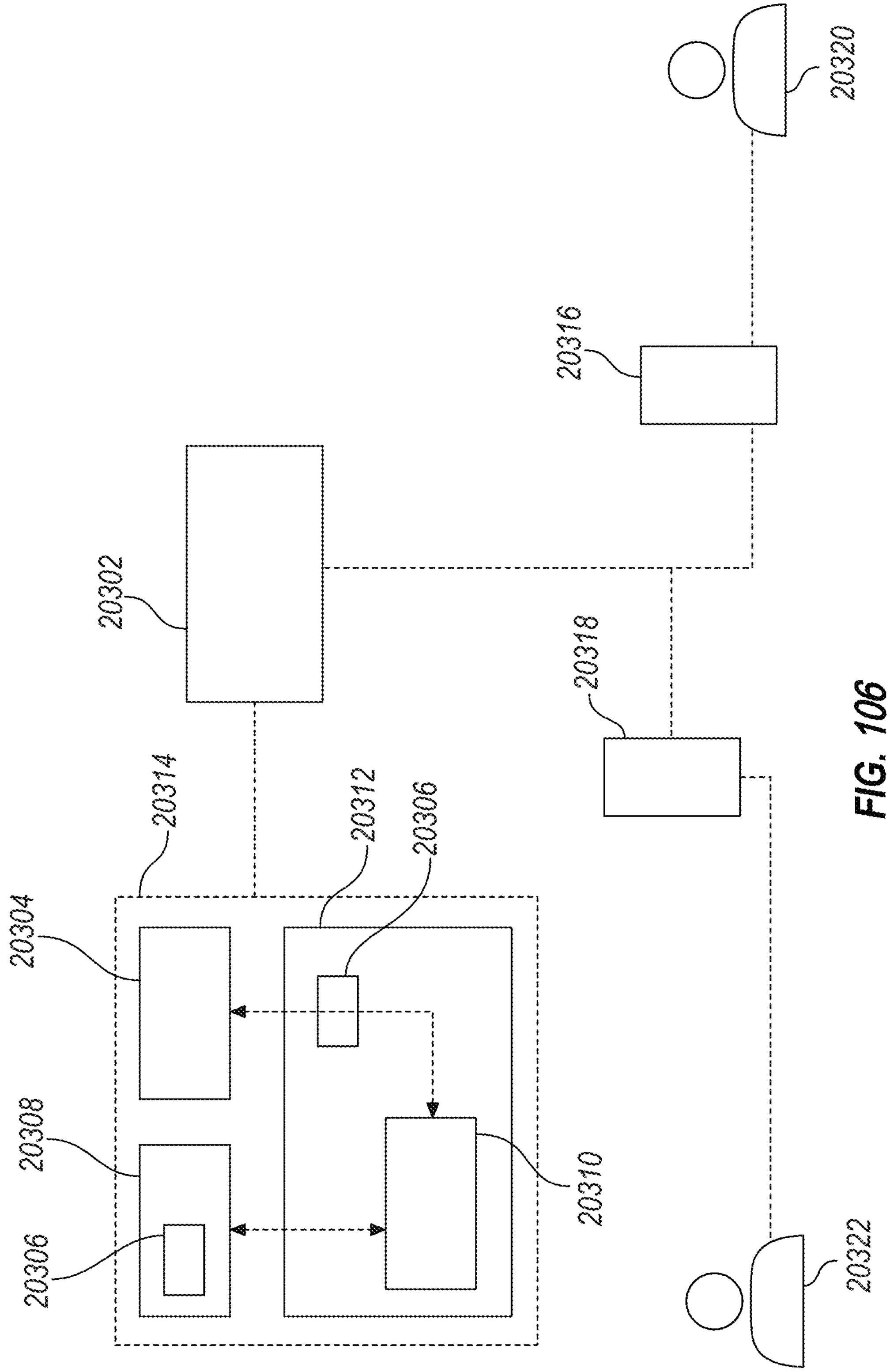
FIG. 106 depicts a system capable to perform rapid configuration of an inspection robot.

Referencing FIG. 106, an example system is depicted, capable to perform rapid configuration of an inspection robot in response to planned inspection operations and/or an inspection request from a consumer of the inspection data and/or processed values and/or visualizations determined from the inspection data.

The example system includes an inspection robot 20314. The inspection robot 20314 includes any inspection robot configured according to any embodiment set forth throughout the present disclosure, including for example, an inspection robot configured to interrogate an inspection surface using a number of input sensors. In certain embodiments, the sensors may be coupled to the inspection robot center chasis 20312 (and/or center chassis, chassis housing, or similar components of the inspection robot) using one or more payloads. Each payload may additionally include components such as arms (e.g., to fix horizontal positions of a sensor or group of sensors relative to the payload, to allow for freedom of movement pivotally, rotationally, or the like). Each arm, where present, or the payload directly, may be coupled to a sled housing one or more of the input sensors. The inspection robot 20314 may further include a tether providing for freedom of movement along an inspection surface, while having supplied power, couplant, communications, or other aspects as described herein. The inspection robot 20314 and/or components thereof may include features to allow for quick changes to sleds or sled portions (e.g., a bottom contact surface), to arms of a payload, and/or for entire payload changes (e.g., from first payload having a first sensor group to a second payload having a second sensor group, between payloads having pre-configured and distinct sensor arrangements or horizontal spacing, between payloads having pre-configured arrangements for different types or characteristics of an inspection surface, etc.). The inspection robot may include features allowing for rapid changing of payloads, for example having a single interface for communications and/or couplant compatible with multiple payloads, removable and/or switchable drive modules allowing for rapid changing of wheel configurations, encoder configurations, motor power capabilities, stabilizing device changes, and/or actuator changes (e.g., for an actuator coupled to a payload to provide for raising/lowering operations of the payload, selectable down force applied to the payload, etc.). The inspection robot may further include a distribution of controllers and/or control modules within the inspection robot body, on drive modules, and/or associated with sensors, such that hardware changes can be implemented without changes required for a high level inspection controller. The inspection robot may further include distribution of sensor processing or post-processing, for example between the inspection controller or another controller positioned on the inspection robot, a base station computing device, an operator computing device, and/or a non-local computing device (e.g., on a cloud server, a networked computing device, a base facility computing device where the base facility is associated with an operator for the inspection robot), or the like. Any one or more of the described features for the inspection robot 20314, without limitation to any other aspect of the present disclosure, may be present and/or may be available for a particular inspection robot 20314. It can be seen that the embodiments of the present disclosure provide for multiple options to configure an inspection robot 20314 for the specific considerations of a particular inspection surface and/or inspection operation of an inspection surface. The embodiments set forth in FIGS. 106-109 and 110-111, and other embodiments set forth in the present disclosure, provide for rapid configuration of the inspection robot, and further provide for, in certain embodiments, responsiveness to inspection requirements and/or inspection requests, improved assurance that a configuration will be capable to perform a successful inspection operation including capability to retrieve the selected data and to successfully traverse the inspection surface.

The example inspection robot 20314 includes one or more hardware components 20304, 20308, which may be sensors and/or actuators of any type as set forth throughout the present disclosure. The hardware components 20304, 20308 are depicted schematically as coupled to the center chassis 20312 of the inspection robot 20314, and may further be mounted on, or form part of a sled, arm, payload, drive module, or any other aspect as set forth herein. The example inspection robot 20314 includes hardware controller 20306, with one example hardware controller positioned on an associated component, and another example hardware controller separated from the inspection controller 20310, and interfacing with the hardware component and the inspection controller.

The example of FIG. 106 further includes a robot configuration controller 20302. In the example, the robot configuration controller 20302 is communicatively coupled to the inspection robot 20314, a user interface 20316, and/or an operator interface 20318. The example robot configuration controller 20302 is depicted separately for clarity of the present description, but may be included, in whole or part, on other components of the system, such as the operator interface 20318 (and/or an operator associated computing device) and/or on the inspection robot 20314. Communicative coupling between the robot configuration controller 20302 and other components of the system may include a web based coupling, an internet based coupling, a LAN or WAN based coupling, a mobile device coupling, or the like. In certain embodiments, one or more aspects of the robot configuration controller 20302 are implemented as a web portal, a web page, an application and/or an application with an API, a mobile application, a proprietary or dedicated application, and/or combinations of these.

In the example of FIG. 106, a user 20320 is depicted interacting with the user interface 20316. The user interface 20316 may provide display outputs to the user 20320, such as inspection data, visualizations of inspection data, refined inspection data, or the like. The user interface 20316 may communicate user inputs to the robot configuration controller 20302 or other devices in the system. User inputs may be provided as interactions with an application, touch screen inputs, mouse inputs, voice command inputs, keyboard inputs, or the like. The user interface 20316 is depicted as a single device, but multiple user interfaces 20316 may be present, including multiple user interfaces 20316 for a single user (e.g., multiple physical devices such as a laptop, smart phone, desktop, terminal, etc.) and/or multiple back end interfaces accessible to the user (e.g., a web portal, web page, mobile application, etc.). In certain embodiments, a given user interface 20316 may be accessible to more than one user 20320.

In the example of FIG. 106, an operator 20322 is depicted interacting with the operator interface 20318 and/or the inspection robot 20314. As with the user 20320 and the user interface 20316, more than one operator 20322 and operator interface 20318 may be present, and further may be present in a many-to-many relationship. As utilized herein, and without limitation to any other aspect of the present disclosure, the operator 20322 participates in or interacts with inspection operations of the inspection robot 20314, and/or accesses the inspection robot 20314 to perform certain configuration operations, such as adding, removing, or switching hardware components, hardware controllers, or the like.

An example system includes an inspection robot 20314 having an inspection controller 20310 that operates the inspection robot utilizing a first command set. The operations utilizing the first command set may include high level operations, such as commanding sensors to interrogate the inspection surface, commanding the inspection robot 20314 to traverse the surface (e.g., position progressions or routing, movement speed, sensor sampling rates and/or inspection resolution/spacing on the inspection surface, etc.), and/or determining inspection state conditions such as beginning, ending, sensing, etc.

The example system further includes a hardware component 20304, 20308 operatively couplable to the inspection controller 20310, and a hardware controller 20306 that interfaces with the inspection controller 20310 in response to the first command set, and commands the hardware component 20304, 20308 in response to the first command set. For example, the inspection controller 20310 may provide a command such as a parameter instructing a drive actuator to move, instructing a sensor to begin sensing operations, or the like, and the hardware controller 20306 determines specific commands for the hardware component 20304, 20308 to perform operations consistent with the command from the inspection controller 20310. In another example, the inspection controller 20310 may request a data parameter (e.g., a wall thickness of the inspection surface), and the hardware controller interprets the hardware component 20304, 20308 sensed values that are responsive to the requested data parameter. In certain embodiments, the hardware controller 20306 utilizes a response map for the hardware component 20304, 20308 to control the component and/or understand data from the component, which may include A/D conversions, electrical signal ranges and/or reserved values, calibration data for sensors (e.g., return time assumptions, delay line data, electrical value to sensed value conversions, electrical value to actuator response conversions, etc.). It can be seen that the example arrangement utilizing the inspection controller 20310 and the hardware controller 20306 relieves the inspection controller 20310 from relying upon low-level hardware interaction data, and allows for a change of a hardware component 20304, 20308, even at a given interface to the inspection controller 20310 (e.g., connected to a connector pin, coupled to a payload, coupled to an arm, coupled to a sled, coupled to a power supply, and/or coupled to a fluid line), without requiring a change in the inspection controller 20310. Accordingly, a designer, configuration operator, and/or inspection operator, considering operations performed by the inspection controller 20310 and/or providing algorithms to the inspection controller 20310 can implement and/or update those operations or algorithms without having to consider the specific hardware components 20304, 20308 that will be present on a particular embodiment of the system. Embodiments described herein provide for rapid development of operational capabilities, upgrades, bug fixing, component changes or upgrades, rapid prototyping, and the like by separating control functions.

The example system includes a robot configuration controller 20302 that determines an inspection description value, determines an inspection robot configuration description in response to the inspection description value, and provides at least a portion of the inspection robot configuration description to a configuration interface (not shown) of the inspection robot 20314, to the operator interface 20318, or both, and may provide a first portion (or all) of the inspection robot configuration description to the configuration interface, and a second portion (or all) of the inspection robot configuration description to the operator interface 20318. In certain embodiments, the first portion and the second portion may include some overlap, and/or the superset of the first portion and second portion may not include all aspects of the inspection robot configuration description. In certain embodiments, the second portion may include the entire inspection robot configuration description and/or a summary of portions of the inspection robot configuration description—for example to allow the operator (and/or one or more of a number of operators) to save the configuration description (e.g., to be communicated with inspection data, and/or saved with the inspection data), and/or for verification (e.g., allowing an operator to determine that a configuration of the inspection robot is properly made, even for one or more aspects that are not implemented by the verifying operator). Further details of operations of the robot configuration controller 20302 that may be present in certain embodiments are set forth in the disclosure referencing FIG. 107.

In certain embodiments, the hardware controller 20306 determines a response map for the hardware component 20304, 20308 in response to the provided portion of the inspection robot configuration description.

In certain embodiments, the robot configuration controller 20302 interprets a user inspection request value, for example from the user interface 20316, and determines the inspection description value in response to the user inspection request value. For example, one or more users 20320 may provide inspection request values, such as an inspection type value (e.g., type of data to be taken, result types to be detected such as wall thickness, coating conformity, damage types, etc.), an inspection resolution value (e.g., a distance between inspection positions on the inspection surface, a position map for inspection positions, a largest un-inspected distance allowable, etc.), an inspected condition value (e.g., pass/fail criteria, categories of information to be labeled for the inspection surface, etc.), an inspection ancillary capability value (e.g., capability to repair, mark, and/or clean the surface, capability to provide a couplant flow rate, capability to manage a given temperature, capability to perform operations given a power source description, etc.), an inspection constraint value (e.g., a maximum time for the inspection, a defined time range for the inspection, a distance between an available base station location and the inspection surface, a couplant source amount or delivery rate constraint, etc.), an inspection sensor distribution description (e.g., a horizontal distance between sensors, a maximum horizontal extent corresponding to the inspection surface, etc.), an ancillary component description (e.g., a component that should be made available on the inspection robot, a description of a supporting component such as a power connector type, a couplant connector type, a facility network description, etc.), an inspection surface vertical extent description (e.g., a height of one or more portions of the inspection surface), a couplant management component description (e.g., a composition, temperature, pressure, etc. of a couplant supply to be utilized by the inspection robot during inspection operations), and/or a base station capability description (e.g., a size and/or position available for a base station, coupling parameters for a power source and/or couplant source, relationship between a base station position and power source and/or couplant source positions, network type and/or availability, etc.).

Figure 107:
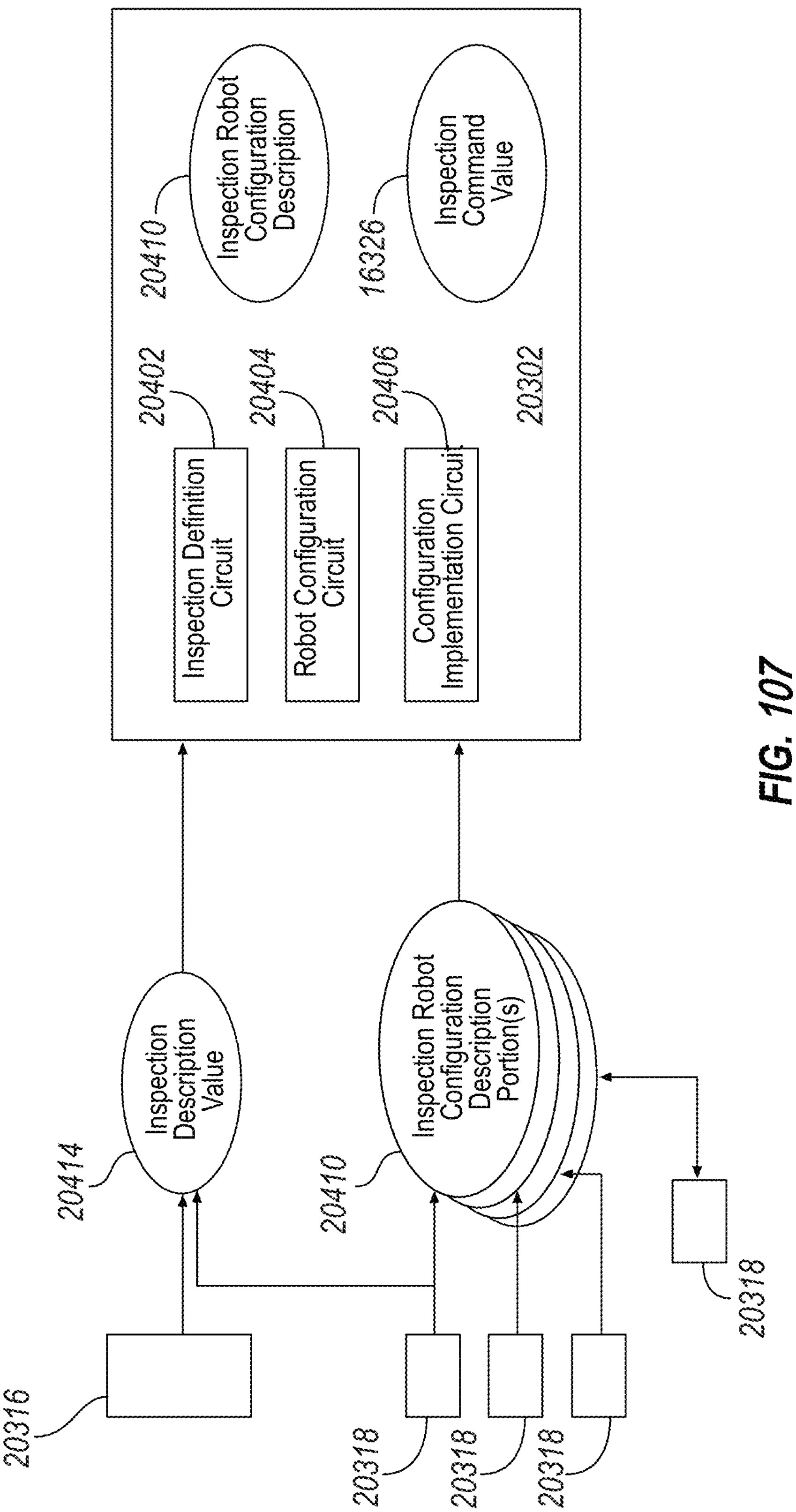
FIG. 107 depicts an example robot configuration controller having a number of circuits.

Referencing FIG. 107, an example robot configuration controller 20302 is depicted having a number of circuits configured to functionally execute one or more operations of the robot configuration controller 20302. The example robot configuration controller 20302 includes an inspection definition circuit 20402 that interprets an inspection description value 20414, for example from a user interaction request value provided through the user interface 20316. In certain embodiments, the inspection description value 20414 may further be provided, in whole or part, through an operator interface 20318. The example robot configuration controller 20302 further includes a robot configuration circuit 20404 that determines an inspection robot configuration description 20410 in response to the inspection description value 20414. An example inspection robot configuration description 20410 may include one or more of: a sensor type description, sensor horizontal position description, a payload configuration description, an arm configuration description, a sled configuration description, nominal inspection surface values (e.g., an expected wall thickness, coating thickness, obstacle positions, etc.), constraints for the inspection robot (e.g., weight, width, and/or height), actuator types for the inspection robot, vertical distance capability for the inspection robot, etc. The example robot configuration controller 20302 further includes a configuration implementation circuit 20406 that provides at least a portion of the inspection robot configuration description 20410 to a configuration interface of the inspection robot 20314 and/or to one or more operator interfaces 20318. In certain embodiments, the configuration implementation circuit 20406 provides relevant portions of the inspection robot configuration description 20410 to the inspection robot 20314 that can be configured by the inspection robot independently of an operator (e.g., to set enable/disable values for sensors, actuators, and/or available features of the inspection robot), and/or portions of the inspection robot configuration description 20410 to otherwise be available to the inspection robot (e.g., to provide verification via an operator interface positioned on the robot such as a display, to utilize in marking data values for later processing of the inspection data, and/or utilizable by the inspection controller such as to ensure that an inspection operation appears to be consistent with a plan, and/or to determine whether off-nominal or unexpected conditions are present). In certain embodiments, the configuration implementation circuit 20406 provides relevant portions of the inspection robot configuration description 20410 to the one or more operator interfaces 20318 that are planned to be implemented and/or verified by the associated operator with each respective operator interface, that may be utilized by the operator during the inspection operations, and/or that may be entered by the operator into a base station, into an inspection report, or the like.

Example and non-limiting user inspection request values include an inspection type value, an inspection resolution value, an inspected condition value, and/or an inspection constraint value. Example and non-limiting inspection robot configuration description(s) 20410 include one or more of an inspection sensor type description (e.g., sensed values; sensor capabilities such as range, sensing resolution, sampling rates, accuracy values, precision values, temperature compatibility, etc.; and/or a sensor model number, part number, or other identifying description), an inspection sensor number description (e.g., a total number of sensors, a number of sensors per payload, a number of sensors per arm, a number of sensors per sled, etc.), an inspection sensor distribution description (e.g., horizontal distribution; vertical distribution; spacing variations; and/or combinations of these with sensor type, such as a differential lead/trailing sensor type or capability), an ancillary component description (e.g., a repair component, marking component, and/or cleaning component, including capabilities and/or constraints applicable for the ancillary component), a couplant management component description (e.g., pressure and/or pressure rise capability, reservoir capability, composition compatibility, heat rejection capability, etc.), and/or a base station capability description (e.g., computing power capability, power conversion capability, power storage and/or provision capability, network or other communication capability, etc.).

Figure 108:
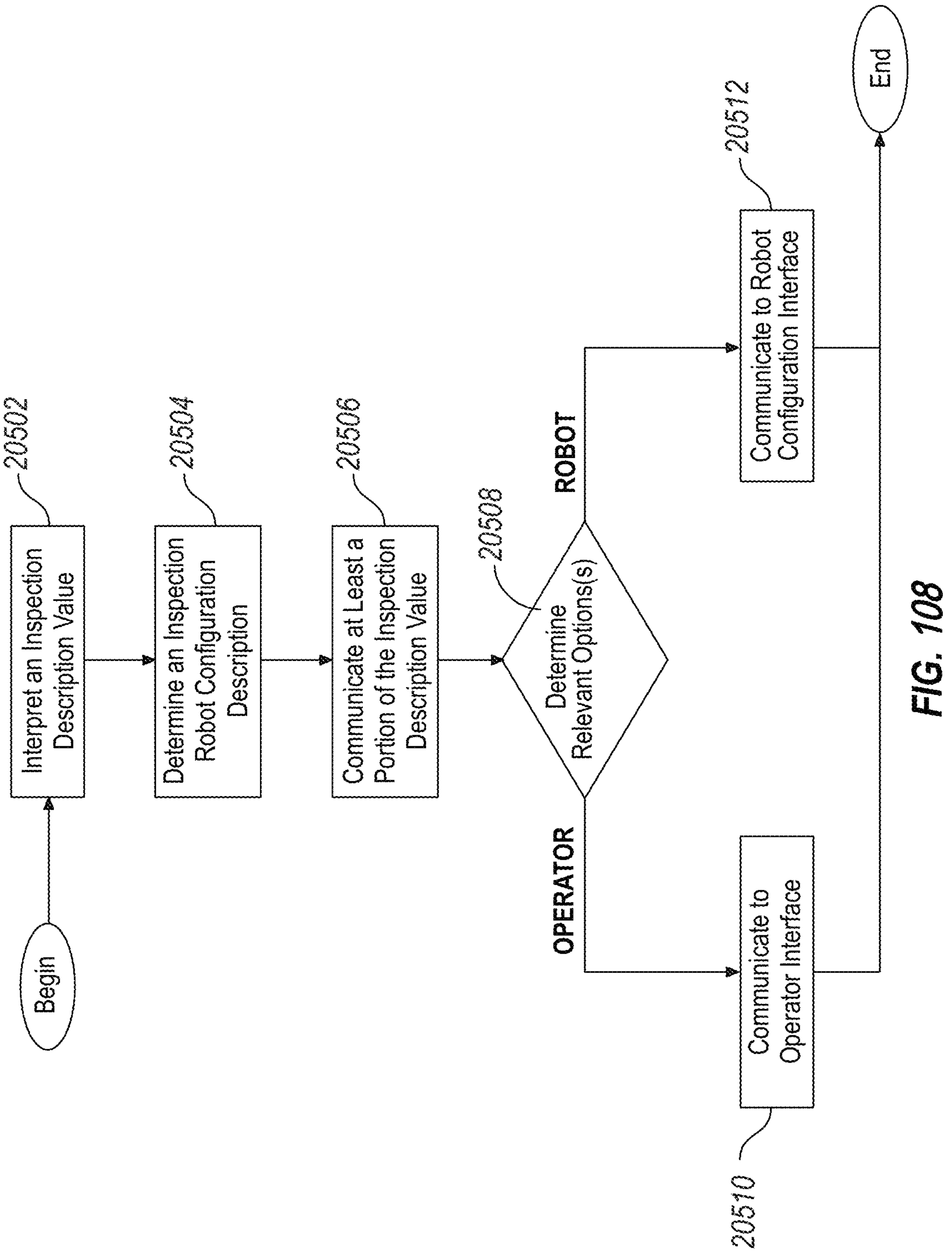
FIG. 108 is a schematic diagram of an example system for rapid development of an inspection scheme for an inspection robot.

Referencing FIG. 108, an example procedure to provide for rapid configuration of an inspection robot is depicted. The example procedure includes an operation 20502 to interpret an inspection description value, an operation 20504 to determine an inspection robot configuration description in response to the inspection description value, and an operation 20506 to communicate at least a portion of the inspection description value. The example procedure includes an operation 20508 to determine whether an inspection description value portion is to be communicated to a ROBOT, and/or to an OPERATOR. Where a portion is to be communicated to an inspection robot (operation 20508, ROBOT), the procedure includes an operation 20512 to communicate the portion to a robot configuration interface, such as to a hardware controller, inspection controller, and/or a configuration management controller of the inspection robot. Where a portion is to be communicated to an operator (operation 20508, OPERATOR), the procedure includes an operation 20510 to communicate the portion to an operator interface. The example procedure may include repeating operations 20506, 20508, and/or 20510, 20512 until the determined portions have been communicated to all of the planned inspection robots and/or operators.

Figure 109:
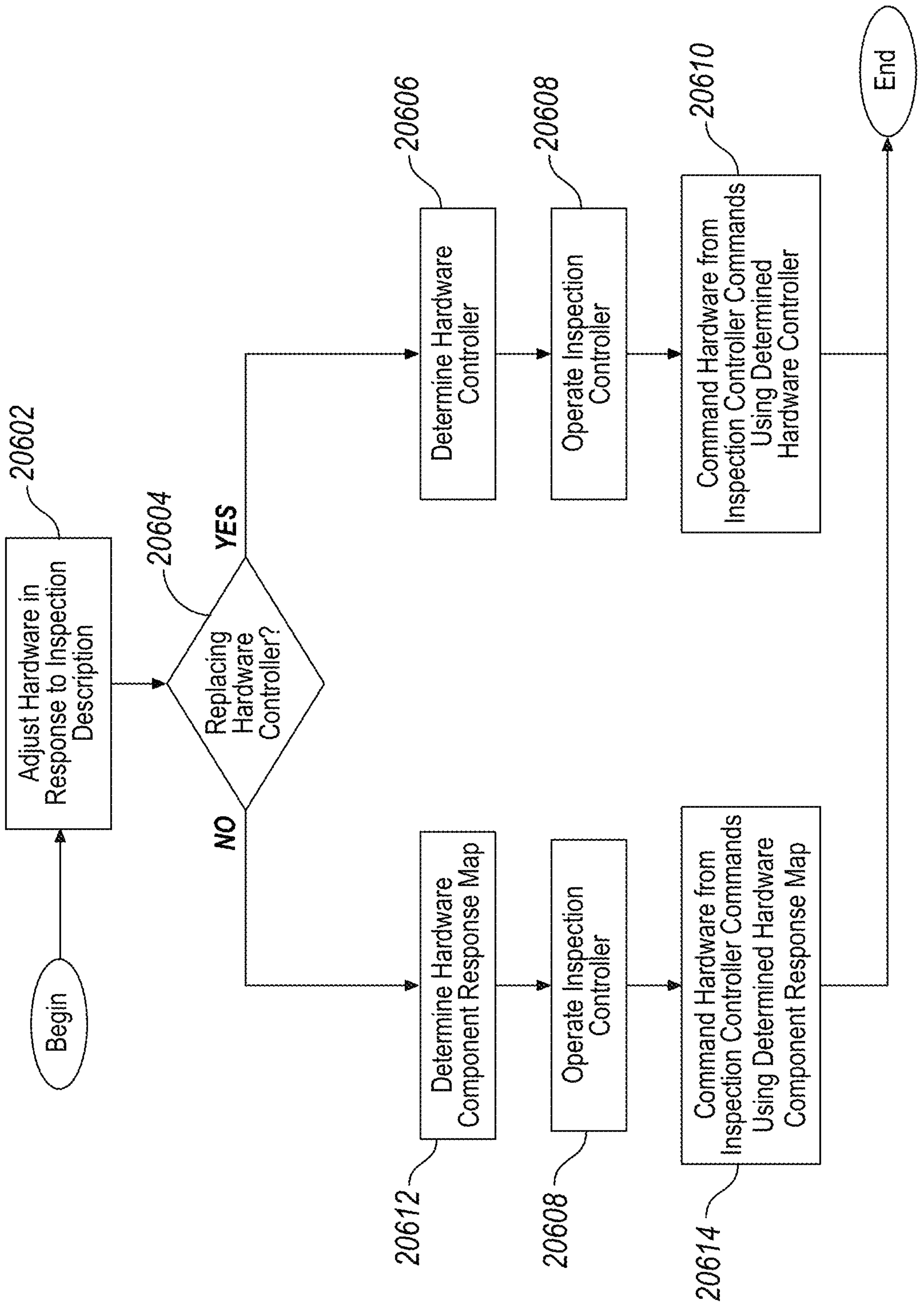
FIG. 109 is a schematic diagram of an example controller for providing rapid configuration of an inspection robot.
Figure 110:
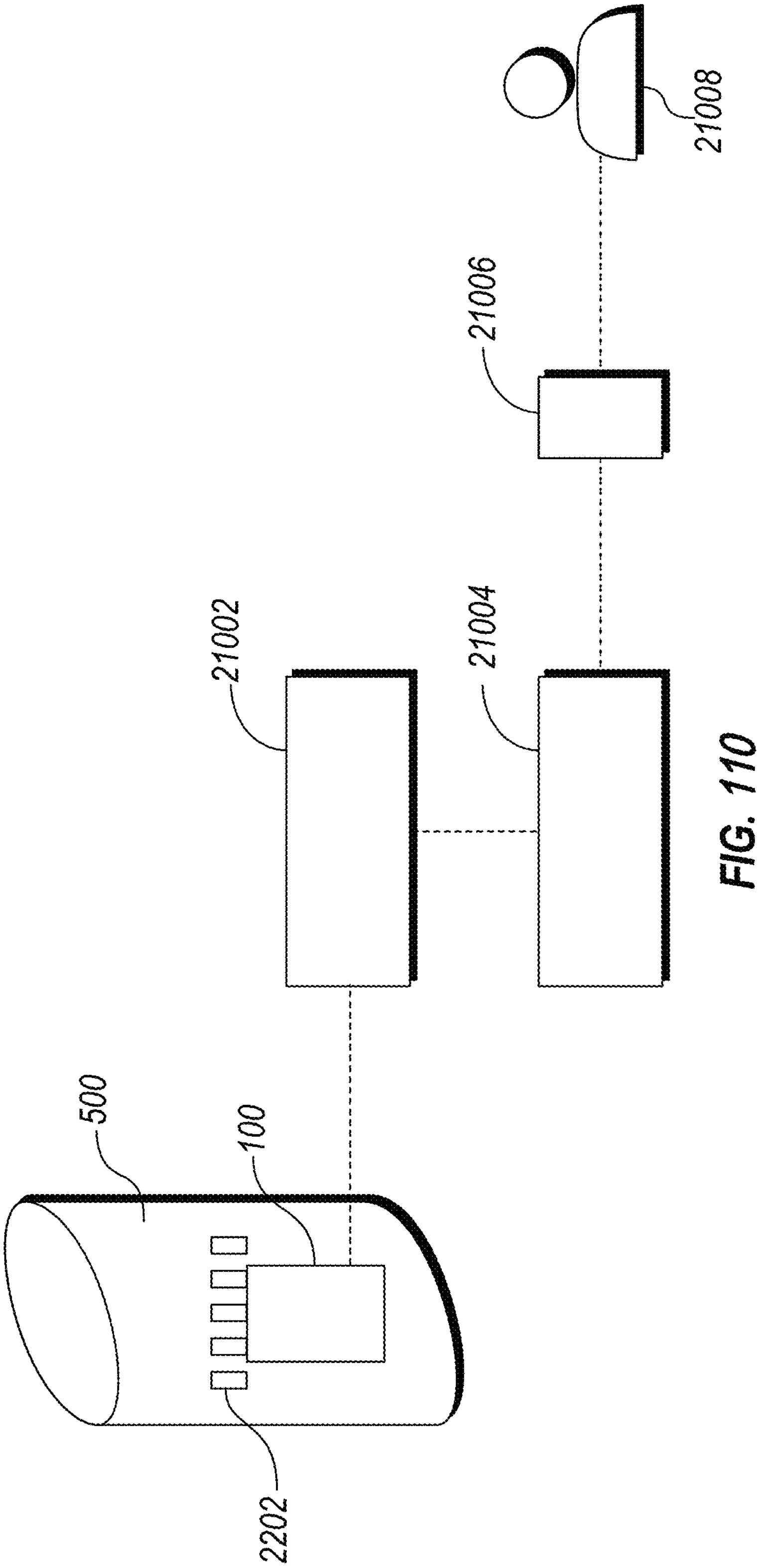
FIG. 110 is a schematic flow diagram of an example procedure to adjust a hardware component independently of an inspection controller for an inspection robot.
Figure 111:
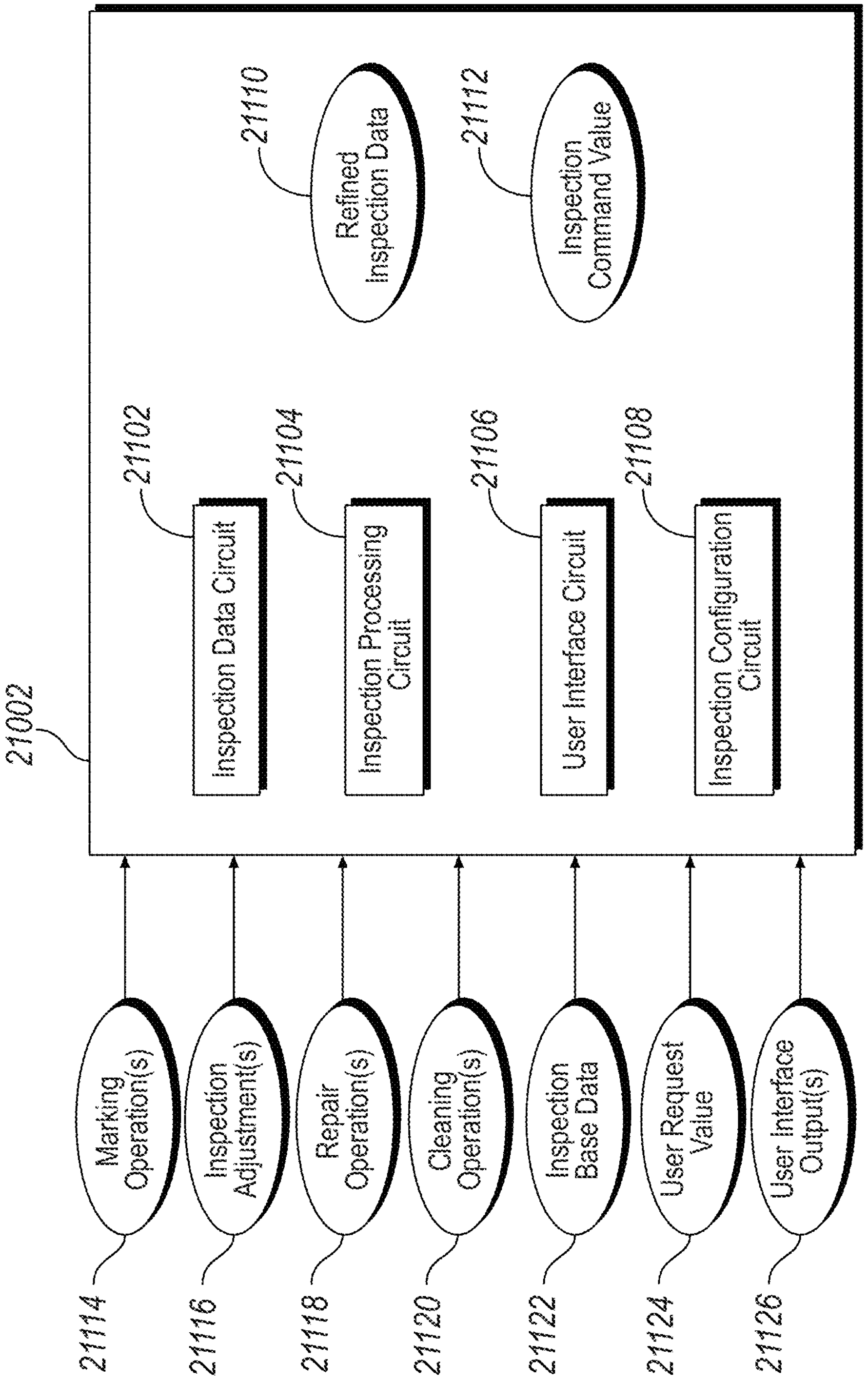
FIG. 111 is a schematic flow diagram of an example procedure to provide for configuration of an inspection scheme responsive to a user request.

Referencing FIG. 109, an example procedure is provided to configure an inspection robot by adjusting a hardware component (e.g., a sensor and/or an actuator) of the inspection robot. The example procedure includes an operation 20602 wherein a configuration adjustment includes adjusting a sensor and/or an actuator in response to the inspection description value. Example adjustments include changing one hardware component for another hardware component, changing a response of the sensor or actuator (e.g., changing a sensed value to electrical signal mapping, and/or an electrical signal to actuator response mapping). The example procedure includes an operation 20604 to determine whether a hardware controller should be replaced with the hardware component adjustment. For example, where a hardware controller utilizes a selected response map from a number of available response maps based on the hardware adjustment, and/or downloads or otherwise accesses an alternate response map based on the hardware adjustment, operation 20604 may be determined as NO, where the previous hardware controller is capable to manage the configuration adjustment. In another example, where the hardware controller is coupled with the sensor or actuator, and/or where the hardware controller does not have an available response map for the adjusted sensor or actuator, operation 20604 may be determined as YES, where the previous hardware controller will be changed with the hardware component. The procedure further includes an operation 20612 (from 20604 determining NO) to determine a hardware component response map (e.g., selecting a map based on an identified hardware component), an operation 20608 to operate an inspection controller to perform an inspection operation with the inspection robot, and an operation 20614 to command the hardware component (e.g., interpret sensor data, instruct sensor on/off operations, and/or command actuator operations) using the determined hardware component response map to implement commands from the inspection controller. The example procedure further includes an operation 20606 (from 20604 determining YES) to determine a hardware controller (e.g., a hardware controller compatible with, and/or configured for, the adjusted hardware component) and install the determined hardware controller as a part of the configuration adjustment for the inspection robot, the operation 20608 to operate the inspection controller to perform the inspection operation with the inspection robot, and an operation 20610 to command the hardware component using the determined hardware controller to implement commands from the inspection controller.

Figure 82:
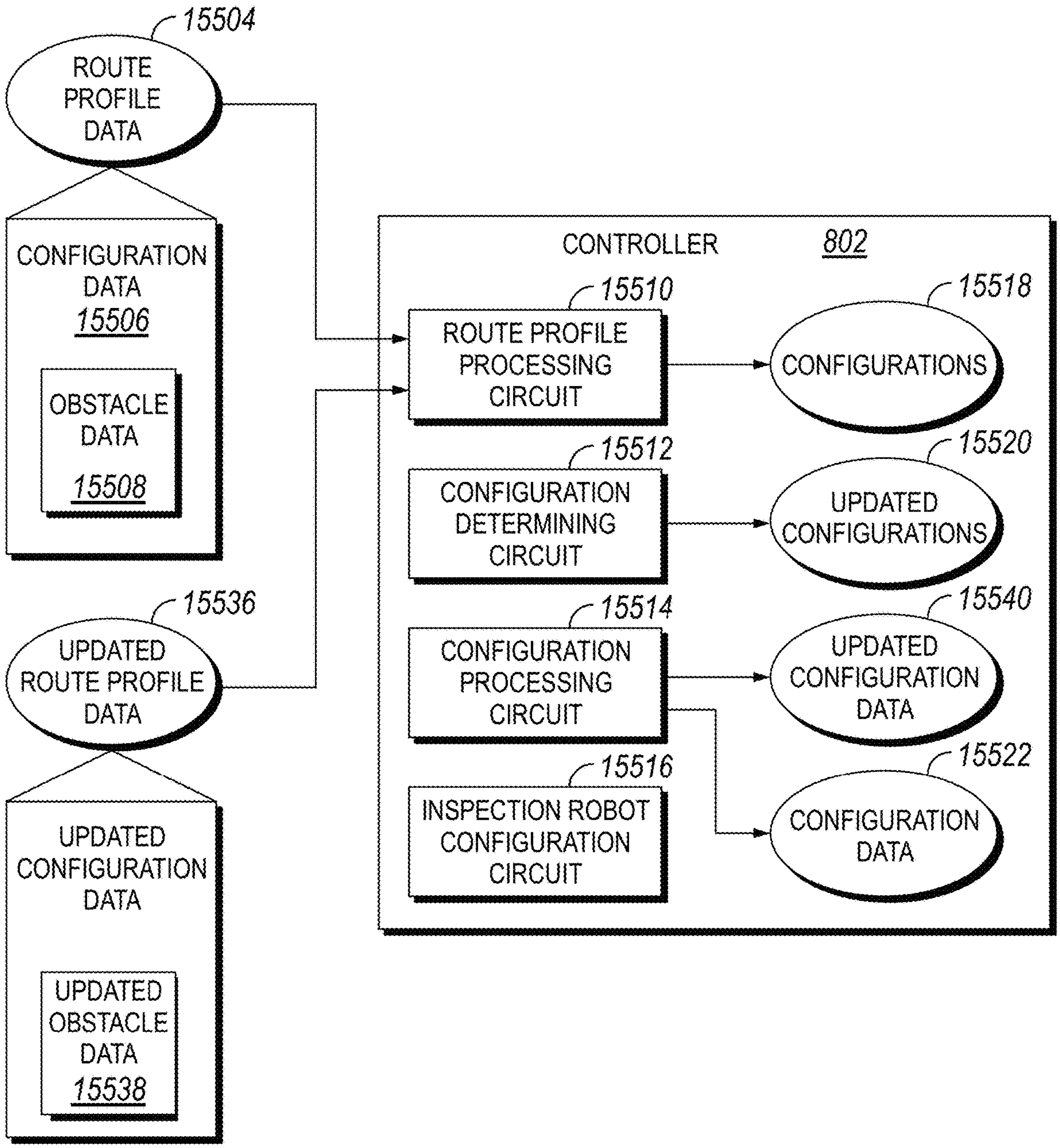
FIG. 82 depicts a controller.

Referring now to FIG. 82, an apparatus for configuring an inspection robot for inspecting an inspection surface may include a route profile processing circuit 15510 structured to interpret route profile data 15504 for the inspection robot relative to the inspection surface. The planned route implies the way the inspection robot will traverse the surface, and is configurable. The route profile data 15504 may include the planned route, or may simply define the area to be inspected. The apparatus may also include a configuration determining circuit 15512 structured to determine one or more configurations 15518 for the inspection robot in response to the route profile data 15504. The apparatus may further include a configuration processing circuit 15514 structured to provide configuration data 15522 in response to the determined one or more configurations 15518, the configuration data 15522 defining, in part, one or more inspection characteristics for the inspection robot. For example, the configuration data 15522 may be provided to an inspection robot configuration circuit 15516. In another example, the configuration data 15522 may be provided to an operator, such as an operator on a site to help the operator ensure the right parts and capabilities are provided that satisfy the requirements and are responsive to the inspection surface. In yet another example, the configuration data 15522 may be provided to an operator that is remotely positioned, which may allow the operator to configure the robot before leaving for a site, where superior installation/adjustment infrastructure may be available. In embodiments, the apparatus may configure the inspection robot automatically without operator configuration. For example, the apparatus may automatically configure various features of the inspection robot, including one or more of sensor spacing, downforce, sensors activated, routing of robot, sensor sampling rates and/or sensor data resolution, on-surface inspected resolution as a function of surface position, or the like.

Figure 83:
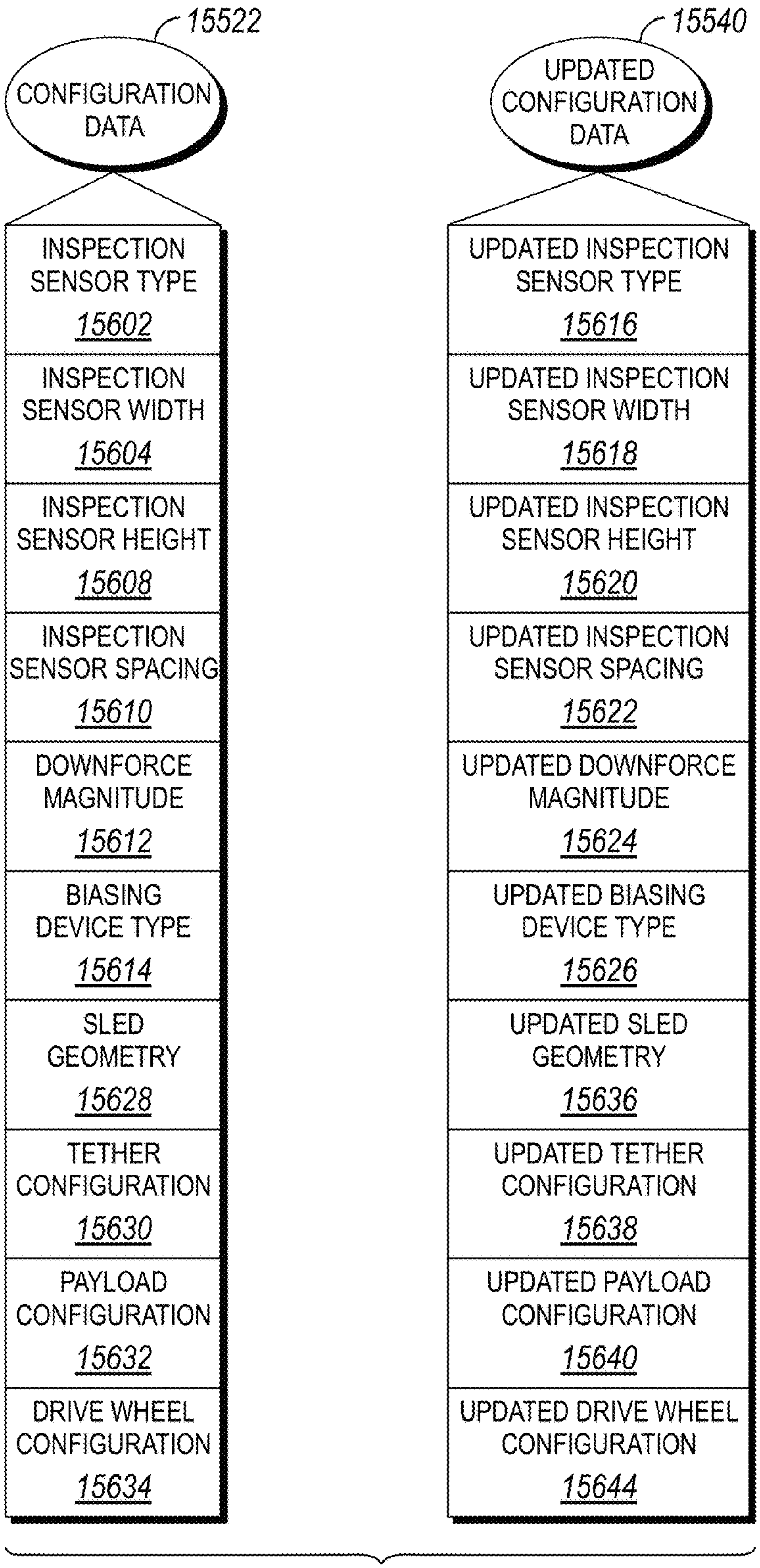
FIG. 83 depicts data.

In embodiments, and referring to FIG. 83, the one or more inspection characteristics may include at least one inspection characteristic selected from the inspection characteristics consisting of: a type of inspection sensor 15602 for the inspection robot; a horizontal spacing 15610 between adjacent inspection sensors for the inspection robot; a horizontal spacing between inspection lanes for an inspection operation of the inspection robot; any spacing enforcement such as covering the lanes in separate inspection runs, front/back sensors, non-adjacent sensors, etc.; a magnitude of a downward force 15612 applied to a sled housing an inspection sensor of the inspection robot; a sled geometry 15628 for a sled housing an inspection sensor of the inspection robot; a tether configuration 15630 description for the inspection robot; a payload configuration 15632 for a payload of the inspection robot; a drive wheel configuration 15634 for the inspection robot; a type of a downward force biasing device 15614 for the inspection robot structured to apply a downward force on an inspection sensor of the inspection robot, an inspection sensor width 15604, an inspection sensor height 15608, or the like. The one or more inspection characteristics may include trajectories of any inspection characteristic. For example, the inspection characteristic may be adjustments made during an inspection run, such as Downforce A for portion A of the inspection route, Downforce B for portion B of the inspection route, etc. The tether configuration 15630 description may include conduits applicable (e.g., which ones to be included such as power, couplant, paint, cleaning solution, communication), sizing for conduits (couplant rate, power rating, length), selected outer surface (abrasion resistant, temperature rating), or the like. The payload configuration 15632 may be a sled/arm spacing, a sled configuration type (e.g., individual sled, sled triplets, new sled types), an arm configuration (articulations available, a couplant support/connection types, sensor interfaces), or the like. A drive wheel configuration 15634 may be a wheel contact shape (convex, concave, mixed); a surface material (coating, covering, material of enclosure for hub); a magnet strength and/or temperature rating, or the like.

The apparatus may further include a robot configuring circuit 15516 structured to configure the inspection robot in response to the provided configuration data 15506, wherein the robot configuring circuit 15516 is further structured to configure the inspection robot by performing at least one operation selected from the operations consisting of: configuring a horizontal spacing between inspection lanes for an inspection operation of the inspection robot; configuring at least one of an inspection route and a horizontal spacing between adjacent inspection sensors, thereby performing an inspection operation compliant with an on-surface inspected resolution target; or configuring a downward force biasing device to apply a selected down force to a sled housing an inspection sensor of the inspection robot. The on-surface inspected resolution target may include a positional map of the surface with inspected positions, and/or regions having defined inspection resolution targets. The positional map may be overlaid with inspection operations to be performed, sensor sampling rates, and/or sensor data resolutions. The configuration determining circuit 15512 may be further structured to determine a first configuration 15710 of the one or more configurations for a first portion of the inspection surface; and determine a second configuration 15712 of the one or more configurations distinct for a second portion of the inspection surface, wherein the second configuration is distinct from the first configuration. The route profile processing circuit 15510 may be further structured to interpret updated route profile data 15536, such as updated obstacle data 15538, during an inspection operation of the inspection surface by the inspection robot, the configuration determining circuit 15512 may be further structured to determine one or more updated configurations 15520 of the inspection robot in response to the updated route profile data 15536; and the configuration processing circuit 15514 may be further structured to provide updated configuration data 15540 in response to the determined updated one or more configurations 15520. The updated configuration data may include updated inspection sensor type 15616, updated inspection sensor width 15618, an updated inspection sensor height 15620, updated inspection sensor spacing 15622, updated downforce magnitude 15624, updated biasing device type 15626, updated sled geometry 15636, updated tether configuration 15638, updated payload configuration 15640, updated drive wheel configuration 15644, or the like.

The apparatus may further include a robot configuring circuit 15516 structured to re-configure the inspection robot in response to the updated one or more configurations 15520. The route profile data 15504 may include obstacle data 15508.

Figure 84:
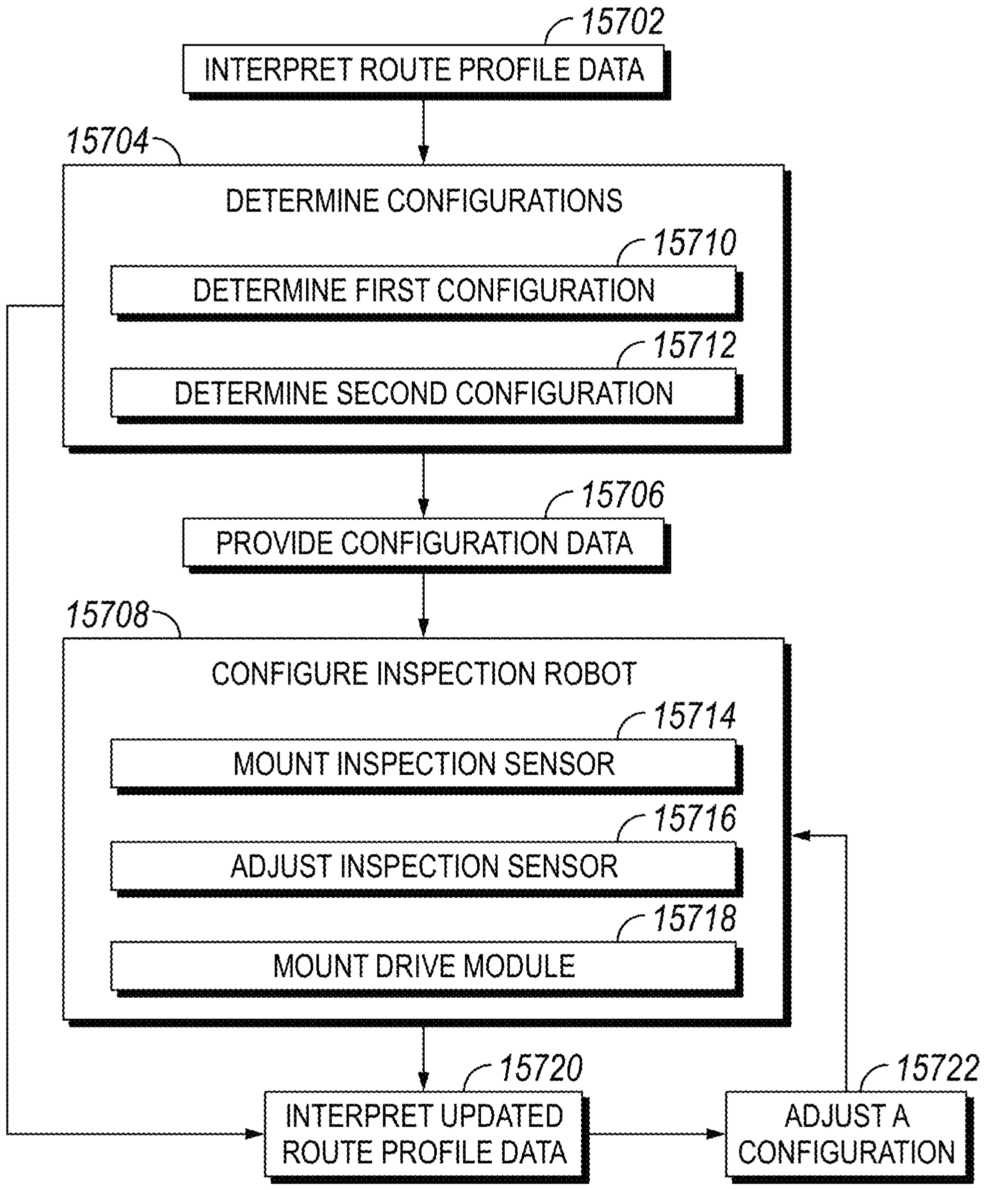
FIG. 84 depicts a method.

Referring to FIG. 84, a method for configuring an inspection robot 15708 for inspecting an inspection surface may include interpreting route profile data 15702 for the inspection robot relative to the inspection surface; determining one or more configurations 15704 for the inspection robot in response to the route profile data; and providing configuration data 15706 in response to the determined one or more configurations, the configuration data defining, at least in part, one or more inspection characteristics for the inspection robot. The one or more inspection characteristics include at least one inspection characteristic selected from the inspection characteristics consisting of a type of inspection sensor for the inspection robot; a horizontal spacing between adjacent inspection sensors for the inspection robot; a horizontal spacing between inspection lanes for an inspection operation of the inspection robot; a magnitude of a downward force applied to a sled housing an inspection sensor of the inspection robot; a sled geometry for a sled housing an inspection sensor of the inspection robot; a tether configuration description for the inspection robot; a payload configuration for a payload of the inspection robot; a drive wheel configuration for the inspection robot; and a type of a downward force biasing device for the inspection robot structured to apply a downward force to a sled housing an inspection sensor of the inspection robot. Providing the configuration data 15706 may include communicating the configuration data to a user device, wherein the user device is positioned at a distinct location from a location of the inspection surface. Communicating the configuration data to the user device may be performed before transporting the inspection robot to a location of the inspection surface. Determining one or more configurations for the inspection robot may be performed during an inspection operation of the inspection robot of the inspection surface. Determining one or more configurations may further include adjusting a configuration 15722 of the inspection robot in response to the determined one or more configurations for the inspection robot during the inspection operation of the inspection robot.

Adjusting the configuration 15722 of the inspection robot may include at least one operation selected from the operations consisting of: configuring a horizontal spacing between inspection lanes for an inspection operation of the inspection robot; configuring at least one of an inspection route and a horizontal spacing between adjacent inspection sensors, thereby performing an inspection operation compliant with an on-surface inspected resolution target; or configuring a downward force biasing device to apply a selected down force to a sled housing an inspection sensor of the inspection robot. The method may further include mounting an inspection sensor 15714 to the inspection robot in response to the provided configuration data. The method may further include mounting a drive module 15718 to the inspection robot in response to the provided configuration data. The method may further include adjusting an inspection sensor 15716 disposed on the inspection robot in response to the provided configuration data. Determining one or more configurations 15704 for the inspection robot in response to the route profile data comprises: determining a first configuration 15710 of the one or more configurations for a first portion of the inspection surface; and determining a second configuration 15712 of the one or more configurations for a second portion of the inspection surface, wherein the second configuration is distinct from the first configuration.

In an embodiment, a system may include an inspection robot comprising a payload comprising at least two inspection sensors coupled thereto; and a controller 802 comprising a route profile processing circuit 15510 structured to interpret route profile data 15504 for the inspection robot relative to an inspection surface; a configuration determining circuit 15512 structured to determine one or more configurations 15518 for the inspection robot in response to the route profile data 15504; and a configuration processing circuit 15514 structured to provide configuration data 15522 in response to the determined one or more configurations 15518, the configuration data defining, at least in part, one or more inspection characteristics for the inspection robot. The one or more inspection characteristics may include a type of inspection sensor for the inspection robot. The one or more inspection characteristics may include a horizontal spacing between adjacent inspection sensors for the inspection robot. The payload may include an adjustable sled coupling position for at least two sleds, each of the at least two sleds housing at least one of the at least two inspection sensors. The payload may include an adjustable arm coupling position for at least two arms, each of the at least two arms associated with at least one of the at least two inspection sensors. Each of the at least two arms further comprises at least one sled coupled thereto, each of the at least one sled housing at least one of the at least two inspection sensors.

The one or more inspection characteristics may include a horizontal spacing between inspection lanes for an inspection operation of the inspection robot, or any spacing enforcement, such as covering the lanes in separate inspection runs, front/back sensors, non-adjacent sensors, etc. The one or more inspection characteristics may include a magnitude of a downward force 15612 applied to a sled housing at least one of the at least two inspection sensors. The one or more inspection characteristics include a sled geometry 15628 for a sled housing at least one of the at least two inspection sensors. The one or more inspection characteristics include a tether configuration 15630 description for the inspection robot (e.g. conduits applicable (e.g., which ones to be included such as power, couplant, paint, cleaning solution, communication), sizing for conduits (couplant rate, power rating, length), selected outer surface (abrasion resistant, temperature rating), etc.), the system further including a tether structured to couple a power source and a couplant source to the inspection robot. The one or more inspection characteristics may include a payload configuration 15632 for the payload of the inspection robot. The payload configuration 15632 may include sled/arm spacing, sled configuration type (e.g., individual sled, sled triplets, new sled types), arm configuration (articulations available, couplant support/connection types, sensor interfaces), or the like. The one or more inspection characteristics may include a drive wheel configuration 15634 for the inspection robot (e.g. wheel contact shape (convex, concave, mixed); surface material (coating, covering, material of enclosure for hub); magnet strength and/or temperature rating). The one or more inspection characteristics may include a type of a downward force biasing device 15614 for the inspection robot structured to apply a downward force to a sled housing at least one of the at least two inspection sensors of the inspection robot. The system may further include a robot configuring circuit 15516 structured to configure the inspection robot in response to the provided configuration data. The robot configuring circuit 15516 may be further structured to configure the inspection robot by performing at least one operation selected from the operations consisting of: configuring a horizontal spacing between inspection lanes for an inspection operation of the inspection robot; configuring at least one of an inspection route and a horizontal spacing between adjacent inspection sensors, thereby performing an inspection operation compliant with an on-surface inspected resolution target; or configuring a downward force biasing device to apply a selected down force to a sled housing at least one of the at least two inspection sensors of the inspection robot. The on-surface inspected resolution target may include a positional map of the surface with inspected positions, and/or regions having defined inspection resolution targets which can be overlaid with inspection operations to be performed, sensor sampling rates, and/or sensor data resolutions. The configuration determining circuit 15512 may be further structured to determine a first configuration 15710 of the one or more configurations for a first portion of the inspection surface; and determine a second configuration 15712 of the one or more configurations distinct for a second portion of the inspection surface, wherein the second configuration is distinct from the first configuration. In embodiments, the route profile processing circuit 15510 may be further structured to interpret 15720 updated route profile data 15504 during an inspection operation of the inspection surface by the inspection robot; the configuration determining circuit 15512 may be further structured to determine one or more updated configurations 15520 of the inspection robot in response to the updated route profile data 15536;

and the configuration processing circuit 15514 may be further structured to provide updated configuration data 15540 in response to the determined updated one or more configurations. The system may further include a robot configuring circuit 15516 structured to re-configure the inspection robot in response to the updated one or more configurations. In embodiments, the route profile data may include obstacle data 15508.

Figure 116:
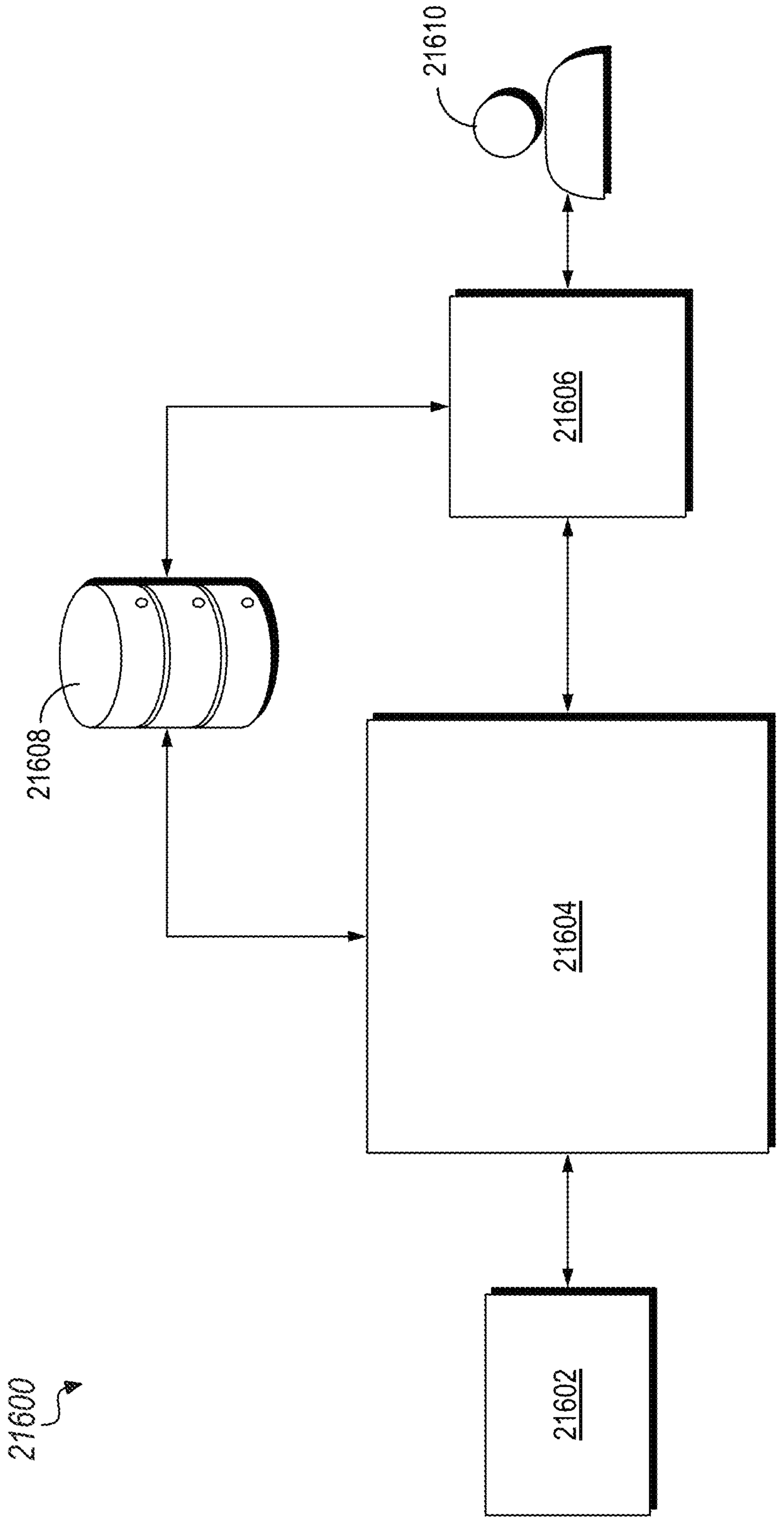

Referencing FIG. 116, an example system 21600 for rapid validation of inspection data provided by an inspection robot is depicted. A system having the capability to perform rapid validation of inspection data provides numerous benefits over previously known systems, for example providing for earlier communication of inspection data to customers of the data, such as an owner or operator of a facility having an inspection surface. Sharing of inspection data with the consumer of the data requires that the data be validated, to manage risk, liability, and to ensure that the inspection data can be utilized for the intended purpose, which may include providing the data to regulatory agencies, for maintenance records, to fulfill contractual obligations, and/or to preserve inspection information that may be later accessed for legal, regulatory, or other critical purposes. Additionally, providing access to the inspection data may be later understood for certain purposes to put the customer on notice of the results indicated by the inspection data. Accordingly, before inspection information is shared to a customer of the data, including before information is made available for access to a customer of the data, validation of the data, for example to ensure that the inspection data collected accurately represents the condition of the inspection surface. Additionally, the availability of rapid validation of inspection data has a number of additional benefits in view of the embodiments of inspection robots and related systems, procedures, and the like, of the present disclosure. For example, rapid validation of inspection data allows for reconfiguration of the inspection robot, allowing for a corrective action to be taken during the inspection operations and achieve a successful inspection operation. The availability of highly configurable inspection robot embodiments further allows for configuring an inspection robot to address issues of the inspection operation that lead to invalid data collection.

A data validation that is rapid, as used herein, and without limitation to any other aspect of the present disclosure, includes a validation capable of being performed in a time relevant to the considered downstream utilization of the validated data. For example, a validation that can be performed during the inspection operation, and/or before the completion of the inspection operation, may be considered a rapid validation of inspection data in certain embodiments, allowing for the completion of the inspection operation configured to address issues of the inspection operation that lead invalid data collection. Certain further example rapid validation times include: a validation that can be performed before the operator leaves the location of the inspection surface (e.g., without requiring the inspection robot be returned to a service or dispatching facility for reconfiguration); a validation that can be performed during a period of time before a downstream customer (e.g., an owner or operator of a facility including the inspection surface; an operator of the inspection robot performing the inspection operations; and/or a user related to the operator of the inspection robot, such as a supporting operator, supervisor, data verifier, etc.) has a requirement to utilize the inspection data; and/or a validation that can be performed within a specified period of time (e.g., before a second inspection operation of a second inspection surface at a same facility including both the inspection surface and the second inspection surface; within a specified calendar period such as a day, three days, a week, etc.), for example to ensure that a subsequent inspection operation can be performed with a configuration responsive to issues that lead to the invalid data collection. An example rapid validation operation includes a validation that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine validation operations and validation time periods that are rapid validations for the purposes of the particular system.

With reference to FIG. 116, an example system 21600 includes an inspection robot 21602 that interprets inspection base data including data provided by an inspection robot interrogating an inspection surface with a plurality of inspection sensors. The inspection robot 21602 may include an inspection robot configured according to any of the embodiments or aspects as set forth in the present disclosure.

The example system 21600 includes a controller 21604 configured to perform rapid inspection data validation operations. The controller 21604 includes a number of circuits configured to functionally execute operations of the controller 21604. An example controller 21604 includes an inspection data circuit that interprets inspection base data comprising data provided by the inspection robot interrogating the inspection surface with a number of inspection sensors, an inspection processing circuit that determines refined inspection data in response to the inspection base data, an inspection data validation circuit that determines an inspection data validity value in response to the refined inspection data, and a user communication circuit that provides a data validity description to a user device in response to the inspection data validity value. Further details of an example controller 21604 are provided in the portion referencing FIG. 117. The example system 21600 further includes a user device 21606 that is communicatively coupled to the controller 21604. The user device 21606 is configured to provide a user interface for interacting operations of the controller 21604 with the user 21610, including providing information, alerts, and/or notifications to the user 21610, receiving user requests or inputs and communicating those to the controller 21604, and accessing a data store 21608, for example to provide access to data for the user 21610.

Figure 117:
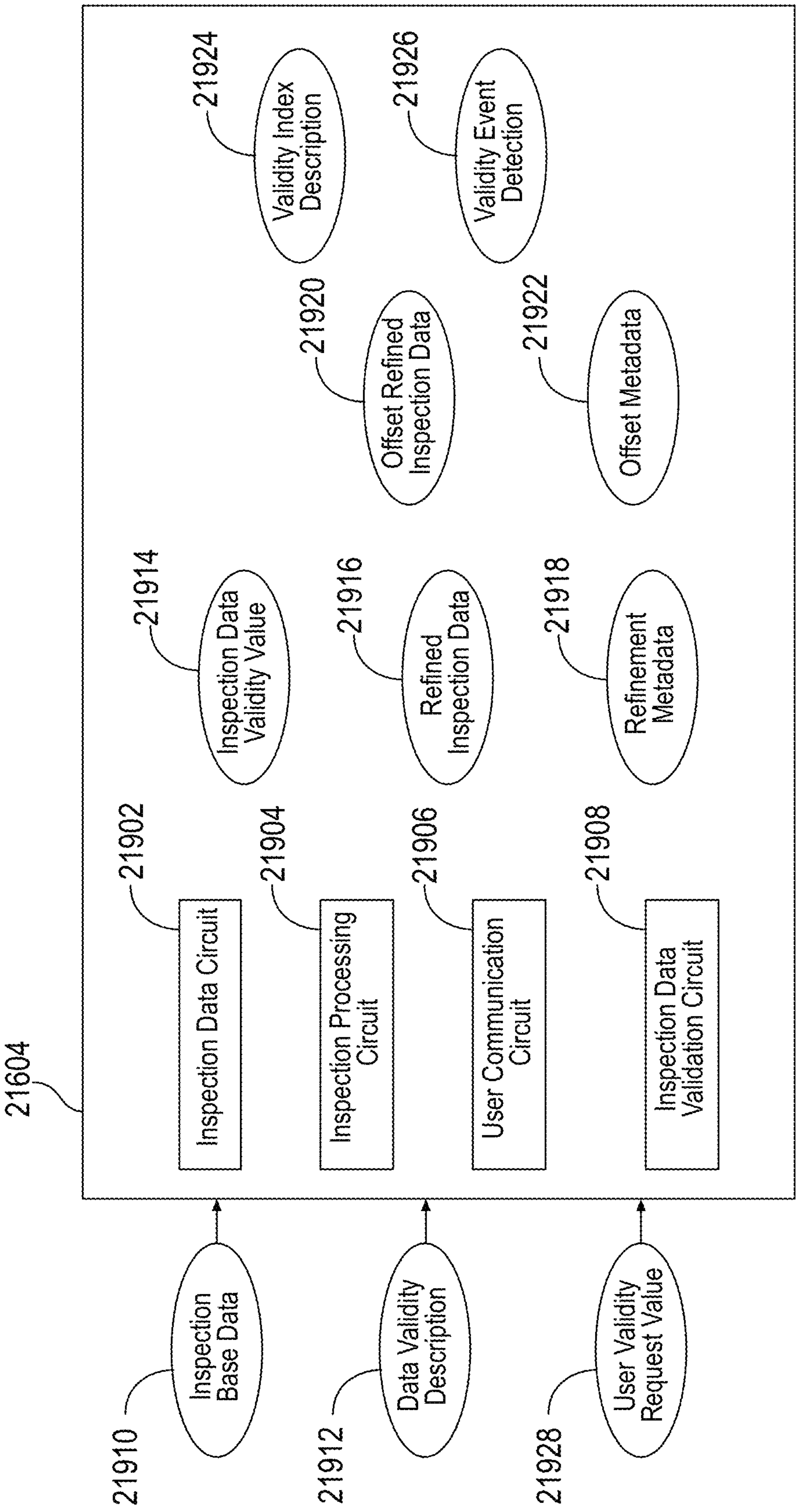

Referencing FIG. 117, an example controller 21604 for performing operations to rapidly validate inspection data is depicted. The example controller 21604 is compatible for use in a system 21600 such as the system of FIG. 116. The example controller 21604 includes an inspection data circuit 21902 that interprets inspection base data 21910 including data provided by an inspection robot interrogating an inspection surface with a number of inspection sensors. The example controller 21604 further includes an inspection processing circuit 21904 that determines refined inspection data 21916 in response to the inspection base data 21910. The refined inspection data 21916 includes processed data from the inspection base data 21910, such as refined UT sensor data to determine wall thickness values, coating values, or the like, EM sensor data (e.g., induction data, conductive material proximity data, or the like), and/or combined sensor data utilized in models, virtual sensors, or other post-processed values from the inspection base data 21910. The example controller 21604 includes an inspection data validation circuit 21908 that determines an inspection data validity value 21914 that provides a data validity description 21912 in response to the refined inspection data 21916. Without limitation to any other aspect of the present disclosure, the inspection data validation circuit 21908 determines the inspection data validity value 21914 in response to determining a consistency of the inspection base data 21910 (e.g., comparing a rate of change of the data versus time, sampling values, and/or position on the inspection surface), compared to expected values and/or rationalized values, and/or relative to detected conditions (e.g., a lifted payload and/or sensor, a fault condition of a component of the inspection robot, the presence of an obstacle, etc.) to determine the inspection data validity value 21914.

The example controller 21604 further includes a user communication circuit 21906 that provides a data validity description 21912 to a user device in response to the inspection data validity value 21914. In certain embodiments, the data validity description 21912 includes an indication that inspection data values are validated, potentially not valid, likely to be invalid, and/or confirmed to be invalid. In certain embodiments, the data validity description 21912 is provided as a layer, dimension, and/or data value overlaid onto a depiction of the inspection surface. In certain embodiments, the user associated with the user device is an operator, a user related to the operator of the inspection robot, such as a supporting operator, supervisor, data verifier, etc., and/or a downstream customer of the inspection data. In certain embodiments, information provided with the inspection data validity value 21914, and/or the data and/or format of the inspection data validity value 21914, is configured according to the user. For example, where the user is a downstream customer of the inspection data, the inspection data validity value 21914 may be limited to a general description of the inspection operation, such as to avoid communicating potentially invalid inspection data to the downstream customer. In another example, such as for a user associated with an operator of the inspection information that may be verifying the inspection operation and/or inspection data, the inspection data validity value 21914 may include and/or be provided with additional data, such as parameter utilized to determine that the inspection data validity value 21914 may be low, fault code status of the inspection robot, indicators of the inspection robot condition (e.g., actuator positions, inspection sensors active, power levels, couplant flow rates, etc.).

In certain embodiments, the controller 21604 includes the user communication circuit 21906 further providing the inspection data validity value 21914 as a notification or an alert, for example in response to determining the inspection data validity value 21914 is not a confirmed valid value. In certain embodiments, the notification and/or alert is provided to the user device, which may be one of several user devices, such as a computing device, a mobile device, a laptop, a desktop, or the like. In certain embodiments, the user communication circuit 21906 provides the notification or alert to the user device by sending a text message, e-mail, message for an application, publishing the notice to a web portal, web pages, monitoring application, or the like, where the communication is accessible to the user device.

An example user communication circuit 21906 provides at least a portion of the refined inspection data 21916 to the user device in response to determining the inspection data validity value 21914 is not a confirmed valid value. For example, the user communication circuit 21906 may provide the refined inspection data 21916 that is associated with the potential invalidation determination, representative data values from the refined inspection data 21916 that is associated with the potential invalidation determination, and/or data preceding the refined inspection data 21916 that is associated with the potential invalidation determination. In certain embodiments, the parameters of the refined inspection data 21916 that are provided with the data validity description 21912 are configured at least partially in response to a user validity request value 21928.

An example user communication circuit 21906 further provides refinement metadata 21918 corresponding to the portion of the refined inspection data 21916 provided with the data validity description 21912. Example and non-limiting refinement metadata 21918 values include one or more of: sensor calibration values corresponding to the number of inspection sensors (e.g., calibration settings for the sensors, values used to calculate wall thickness, delay line values, etc.), a fault description for the inspection robot (e.g., faults active, faults in processing such as faults about to be set, faults recently cleared, etc.), a coupling description for the number of inspection sensors (e.g., direct or indirect indicators whether sensor coupling to the inspection surface is successful, such as actuator positions, down force descriptions, couplant pressure parameters, sled positions, etc.), a re-coupling operation record for the number of inspection sensors (e.g., re-coupling operations performed over time and/or inspection surface position preceding and/or during the potentially invalid data, for example allowing for determination of an indication of a coupling problem, statistical analysis of re-coupling events, or the like), a scoring value record for the at least a portion of the refined inspection data (e.g., determinations of refined inspection data determined from a primary mode scoring value relative to a secondary mode scoring value, progression of scores over time and/or related to inspection surface position, scores utilized for data collection, ratios of primary mode to secondary mode scores utilized for data collection, etc.), and/or operational data for the inspection robot (e.g., to allow for determination of anomalies in operational data, to confirm that operations are nominal, track trends, or the like).

An example user communication circuit 21906 provides offset refined inspection data 21920 to the user device in response to determining the inspection data validity value 21914 is not a confirmed valid value. For example, the offset refined inspection data 21920 may include data preceding the refined inspection data 21916 associated with the potentially invalid data, related data such as data taken in a similar position (e.g., a similar vertical position, dating having similar scoring or other operational parameters to the potentially invalid data, or the like). In certain embodiments, the user communication circuit 21906 further provides offset metadata 21922 corresponding to the offset refined inspection data 21920.

An example inspection data validation circuit 21908 further determines the inspection data validity value 21914 as a categorical description of the inspection data validity status, such as: a confirmed valid value, a suspect valid value, a suspect invalid value, and/or a confirmed invalid value. In certain embodiments, the categorical description may be determined according to the determinations made in response to the information utilized to determine the inspection data validity value 21914 and the confidence in that information. In certain embodiments, where the refined inspection data 21916 has indicators that the data may be invalid (e.g., a fault code, coupling information, etc.) but the data appears to be valid (e.g., consistent with adjacent data, within expected ranges, etc.), the data may be determined as a suspect valid value. In certain embodiments, wherein the refined inspection data 21916 has stronger indicator that the data may be invalid, and/or the data is marginally valid, the data may be determined as a suspect invalid value. In certain embodiments, where a determinative indicator is present that the data is not valid (e.g., a sensor has failed, a position of the sled/sensor is inconsistent with valid data, etc.) and/or indicators that the data is very likely to be invalid, the data may be determined to be confirmed invalid.

In certain embodiments, the inspection data validation circuit 21908 determines the inspection data validity value 21914 in response to a validity index description 21924, and comparing the validity index description 21924 to a number of validity threshold values (e.g., values determined to relate to validity descriptions, such as valid, invalid, and/or suspected versions of these). In certain embodiments, the validity index description 21924 may be determined by scoring a number of contributing factors to the invalidity determination, and combining the contributing factors into an index for relative comparison of invalidity determinations. An example inspection data validation circuit 21908 further determines the inspection data validity value 21914 in response to a validity event detection 21926. In certain embodiments, certain events provide a strong indication that related data is invalid, and/or provide a determinative indication that related data is invalid. For example, certain fault codes and/or failed components of the inspection robot may indicate that related data may be invalid and/or is more likely to be invalid. In certain embodiments, certain indicators such as a raised payload, a deactivated sensor, or the like, may provide a determinative indication that related data is invalid.

In certain embodiments, the user communication circuit 21906 further provides the inspection data validity value 21914 as one of a notification or an alert in response to determining the inspection data validity value is not a confirmed valid value. In certain further embodiments, the user communication circuit 21906 further configures a content of the one of the notification or the alert in response to a value of the inspection data validity value 21914, for example providing a more intrusive alert or notification in response to an inspection data validity value 21914 indicating a higher likelihood of invalid data, and/or based on the criticality of the potentially invalid data.

An example user communication circuit 21906 further interprets a user validity request value 21928 and provides one or more of a portion of the refined inspection data 21916 to the user device in response to the user validity request value 21928, a portion of the refined inspection data 21916 to the user device in response to the user validity request value 21928, offset refined inspection data 21920, and/or offset metadata 21922 corresponding to the offset refined inspection data 21920 in response to the user validity request value 21928.

Figure 85:
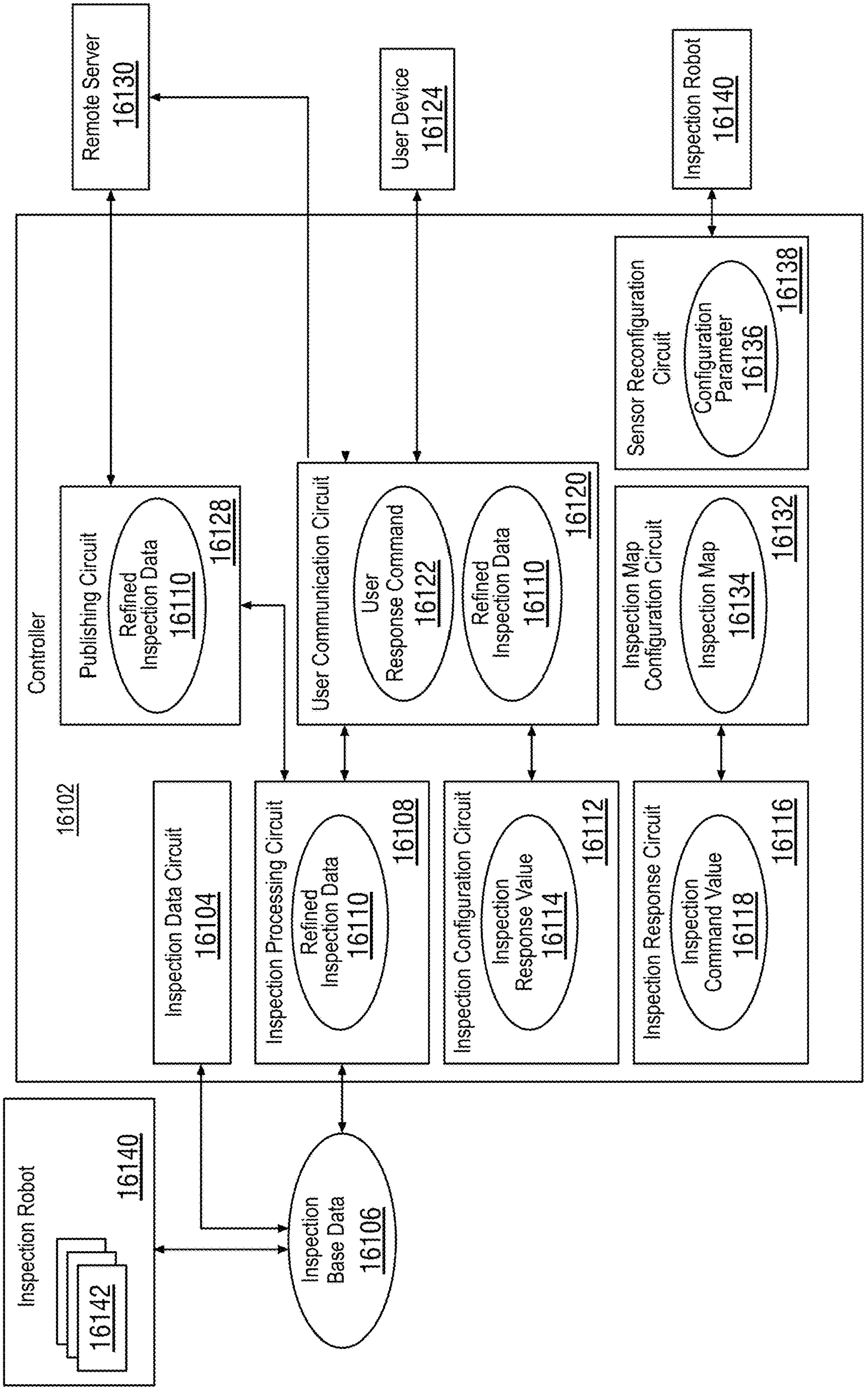
FIG. 85 depicts an example controller configured to perform operations for rapid response to inspection data.

Referencing FIG. 85, an example controller 16102 is depicted, where the controller 16102 is configured to perform operations for rapid response to inspection data, for example inspection data collected by an inspection robot performing an inspection operation on an inspection surface. The example controller 16102 includes a number of circuits configured to functionally execute certain operations of the controller 16102. The example controller 16102 depicts an example logical arrangement of circuits for clarity of the description, but circuits may be distributed, in whole or part, among a number of controllers, including an inspection robot controller, a base station controller, an operator computing device, a user device, a server and/or cloud computing device, and/or as an application provided at least in part on any one or more of the foregoing. In certain embodiments, the controller 16102 and/or portions of the controller 16102 are utilizable to perform certain operations associated with embodiments presented throughout the present disclosure.

A response, as used herein, and without limitation to any other aspect of the present disclosure, includes an adjustment to at least one of: an inspection configuration for the inspection robot while on the surface (e.g., a change to sensor operations; couplant operations; robot traversal commands and/or pathing; payload configurations; and/or down force configuration for a payload, sled, sensor, etc.); a change to display operations of the inspection data; a change to inspection data processing operations, including determining raw sensor data, minimal processing operations, and/or processed data values (e.g., wall thickness, coating thickness, categorical descriptions, etc.); an inspection configuration for the inspection robot performed with the inspection robot removed from the inspection surface (e.g., changed wheel configurations, changed drive module configurations; adjusted and/or swapped payloads; changes to sensor configurations (e.g., switching out sensors and/or sensor positions); changes to hardware controllers (e.g., switching a hardware controller, changing firmware and/or calibrations for a hardware controller, etc.); and/or changing a tether coupled to the inspection robot. The described responses are non-limiting examples, and any other adjustments, changes, updates, or responses set forth throughout the present disclosure are contemplated herein for potential rapid response operations. Certain responses are described as performed while the inspection robot is on the inspection surface and other responses are described as performed with the inspection robot removed from the inspection surface, although any given response may be performed in the other condition, and the availability of a given response as on-surface or off-surface may further depend upon the features and configuration of a particular inspection robot, as set forth in the multiple embodiments described throughout the present disclosure. Additionally or alternatively, certain responses may be available only during certain operating conditions while the inspection robot is on the inspection surface, for example when the inspection robot is in a location physically accessible to an operator, and/or when the inspection robot can pause physical movement and/or inspection operations such as data collection. One of skill in the art, having the benefit of the present disclosure and information ordinarily available when contemplating a particular system and/or inspection robot, can readily determine response operations available for the particular system and/or inspection robot.

A response that is rapid, as used herein, and without limitation to any other aspect of the present disclosure, includes a response capable of being performed in a time relevant to the considered downstream utilization of the response. For example, a response that can be performed during the inspection operation, and/or before the completion of the inspection operation, may be considered a rapid response in certain embodiments, allowing for the completion of the inspection operation utilizing the benefit of the rapid response. Certain further example rapid response times include: a response that can be performed at the location of the inspection surface (e.g., without requiring the inspection robot be returned to a service or dispatching facility for reconfiguration); a response that can be performed during a period of time wherein a downstream customer (e.g., an owner or operator of a facility including the inspection surface; an operator of the inspection robot performing the inspection operations; and/or a user related to the operator of the inspection robot, such as a supporting operator, supervisor, data verifier, etc.) of the inspection data is reviewing the inspection data and/or a visualization corresponding to the inspection data; and/or a response that can be performed within a specified period of time (e.g., before a second inspection operation of a second inspection surface at a same facility including both the inspection surface and the second inspection surface; within a specified calendar period such as a day, three days, a week, etc.). An example rapid response includes a response that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine response operations and response time periods that are rapid responses for the purposes of the particular system.

Certain considerations for determining whether a response is a rapid response include, without limitation, one or more of:

- the purpose of the inspection operation, how the downstream customer will utilize the inspection data from the inspection operation, and/or time periods related to the utilization of the inspection data;
- entity interaction information such as time periods wherein inspection data can be updated, corrected, improved, and/or enhanced and still meet contractual obligations, customer expectations, and/or industry standard obligations related to the inspection data;
- source information related to the response, such as whether the response addresses an additional request for the inspection operation after the initial inspection operation was performed, whether the response addresses initial requirements for the inspection operation that were available before the inspection operation was commenced, whether the response addresses unexpected aspects of the inspection surface and/or facility that were found during the inspection operations, whether the response addresses an issue that is attributable to the downstream customer and/or facility owner or operator, such as:
  - inspection surface has a different configuration than was indicated at the time the inspection operation was requested;
  - the facility owner or operator has provided inspection conditions that are different than planned conditions, such as couplant availability, couplant composition, couplant temperature, distance from an available base station location to the inspection surface, coating composition or thickness related to the inspection surface, vertical extent of the inspection surface, geometry of the inspection surface such as pipe diameters and/or tank geometry, availability of network infrastructure at the facility, availability of position determination support infrastructure at the facility, operating conditions of the inspection surface (e.g., temperature, obstacles, etc.);
  - additional inspected conditions are requested than were indicated at the time of the inspection operation was requested; and/or
  - additional inspection robot capabilities such as marking, repair, and/or cleaning are requested than were indicated at the time the inspection operation was requested.

The example controller 16102 includes an inspection data circuit 16104 that interprets inspection base data 16106 (e.g., raw sensor data and/or minimally processed data inspection sensors) provided by an inspection robot 16140 interrogating an inspection surface with a number of inspection sensors 16142. The example controller 16102 further includes an inspection processing circuit 16108 that determines refined inspection data 16110 (e.g., processed inspection data, determined state values and/or categories related to the inspection surface from the inspection data, data values configured for depiction or display on a user device, and/or any other refined inspection data according to the present disclosure) in response to the inspection base data 16106, and an inspection configuration circuit 16112 that determines an inspection response value 16114 in response to the refined inspection data 16110. The example controller 16102 includes an inspection response circuit 16116 that provides an inspection command value 16118 in response to the inspection response value 16114.

Example and non-limiting inspection command values 16118 include one or more commands configured for communication to the inspection robot 16140, such that the inspection robot 16140 can change a configuration aspect (e.g., a sensor setting and/or enable value; an actuator setting or position; an inspection plan such as inspection route and/or inspection operations to be performed for selected regions of the inspection surface) in response to the inspection command value 16118. Additionally or alternatively, inspection command values 16118 may be proved to any other aspect of a system including the controller 16102, including without limitation command values to adjust inspection data displays, inspection data processing operations, inspection robot configurations communicated to an operator (and/or operator device) for adjustment of the inspection robot configuration at the location of the inspection surface, and/or inspection robot configurations communicated to a user (and/or user device) related to the operator of the inspection robot, such as a supporting operator, supervisor, data verifier of the inspection data.

In certain embodiments, the inspection configuration circuit 16112 provides the inspection command values 16118 during the interrogating of the inspection surface by the inspection robot 16140, for example to provide for configuration updates during the inspection operation. Additionally or alternatively, the inspection configuration circuit 16112 provides the inspection command values 16118 to provide for a rapid response configuration of the inspection robot, to provide for configuration updates within a time period that would be considered a rapid response for a system including the controller 16102.

In certain embodiments, the controller 16102 includes a user communication circuit 16120 that provides the refined inspection data 16110 to a user device 16124, and receives a user response command 16122, where the inspection configuration circuit 16112 further determines the inspection response value 16114 in response to the user response command 16122. For example, the user device 16124 may be a device accessible to a user such as a downstream customer of the inspection data, allowing for the user to make additional inspection requests, to change conditions that are determined from the inspection data, or the like, during the inspection operations and/or within a time period consistent with a rapid response time period. In another example, the user device 16124 may be a device accessible to a user related to the operator of the inspection robot, such as a supporting operator, supervisor, data verifier of the inspection data.

In a further example, the user observes the refined inspection data 16110, such as in a display or visualization of the inspection data, and provides the user response command 16122 in response to the refined inspection data 16110, for example requesting that additional data or data types be collected, requesting that additional conditions (e.g., anomalies, damage, condition and/or thickness of a coating, higher resolution determinations—either spatial resolution such as closer or more sparse data collection positions, or sensed data resolution such as higher or lower precision sensing values, etc.) be inspected, extending the inspection surface region to be inspected, and/or omitting inspection of regions of the inspection surface that were originally planned for inspection. In certain embodiments, the user response command 16122 allows the user to change inspection operations in response to the results of the inspection operations, for example where the inspection surface is found to be in a better or worse condition than expected, where an unexpected condition or data value is detected during the inspection, and/or where external considerations to the inspection occur (e.g., more or less time are available for the inspection, a system failure occurs related to the facility or an offset facility, or the like) and the user wants to make a change to the inspection operations in response to the external condition. In certain embodiments, the user response command 16122 allows for the user to change inspection operations in response to suspected invalid data (e.g., updating sensor calibrations, performing coupling operations to ensure acoustic coupling between a sensor and the inspection surface, and/or repeating inspection operations to ensure that the inspection data is repeatable for a region of the inspection surface), in response to a condition of the inspection surface such as an assumed value (e.g., wall thickness, coating thickness and/or composition, and/or presence of debris) that may affect processing the refined inspection data 16110, allowing for corrections or updates to sensor settings, couplant flow rates, down force provisions, speed of the inspection robot, distribution of sensors, etc. responsive to the difference in the assumed value and the inspection determined condition of the inspection surface.

An example controller 16102 further includes a publishing circuit 16128 that provides the refined inspection data 16110 to a remove server 16130, which may be a computing device communicatively coupled to the controller 16102 and one or more user devices 16124, for example to operate a web portal, web page, mobile application, proprietary application, database, API related to the refined inspection data 16110, and/or that operates as a data store for inspection base data 16106 and/or refined inspection data 16110. In the example, the user communication circuit 16120 receives the user response command 16122, and the inspection configuration circuit 16112 determines the inspection response value 16114 in response to the user response command 16122.

An example controller 16102 includes an inspection map configuration circuit that updates an inspection map 16134 in response to the inspection command value 16118. An example inspection map 16134 includes one or more of: planned inspection region(s) of the inspection surface; inspection operations to be performed for each of one or more regions of the inspection surface; and/or configurations of the inspection robot (e.g., down force, payload configurations, sensor distributions, sensor types to be utilized, and/or sled configurations such as ramp heights, slope, and/or pivot arrangements) for each of one or more regions of the inspection surface. An example controller 16102 further includes a sensor reconfiguration circuit 16138 that provides a configuration parameter 16136 to the inspection robot 16140 in response to a reconfiguration command (e.g., sensor configuration parameters responsive to the inspection map and/or updates to the inspection map). In certain embodiments, an update to the inspection map 16134 includes the reconfiguration command, and/or includes an update to a travel path of the inspection robot 16140. An example reconfiguration command includes a change to at attribute such as a sensor spacing (e.g., horizontal and/or vertical), a couplant flow (e.g., a rate of flow and/or a change to a couplant flow re-coupling operation timing, triggering conditions, and/or flow rate), and/or a force on an inspection sensor (e.g., an active or passive down force, and/or a change in operations of a biasing member and/or an actuator of a payload, arm, and/or sled associated with the inspection sensor). An example update to the travel path of the inspection robot 16140 includes an update to re-traverse a portion of the inspection surface. An example update to the travel path of the inspection robot 16140 includes an update to an x-y coverage resolution of the inspection robot 16140 (e.g., a macro resolution, such as a distance between inspected regions of a payload, a distance between horizontal inspection lanes; and/or a micro-resolution such as a distance between adjacent sensors of a payload and/or of the inspection robot).

The example utilizes x-y coverage resolution to illustrate the inspection surface as a two-dimensional surface having a generally horizontal (or perpendicular to the travel direction of the inspection robot) and vertical (or parallel to the travel direction of the inspection robot) component of the two-dimensional surface. However, it is understood that the inspection surface may have a three-dimensional component, such as a region within a tank having a surface curvature with three dimensions, a region having a number of pipes or other features with a depth dimension, or the like. In certain embodiments, the x-y coverage resolution describes the surface of the inspection surface as traversed by the inspection robot, which may be two dimensional, conceptually two dimensional with aspects have a three dimensional component, and/or three dimensional. The description of horizontal and vertical as related to the direction of travel is a non-limiting example, and the inspection surface may have a first conceptualization of the surface (e.g., x-y in a direction unrelated to the traversal direction of the inspection robot), where the inspection robot traverses the inspection surface in a second conceptualization of the surface (e.g., x-y axes oriented in a different manner than the x-y directions of the first conceptualization), where the operations of the inspection robot 16140 such as movement paths and/or sensor inspection locations performed in the second conceptualization are transformed and tracked in the first conceptualization (e.g., by the inspection map configuration circuit 16132, a controller on the inspection robot, a controller on a base station, etc.) to ensure that the desired inspection coverage from the view of the first conceptualization are achieved. Accordingly, the user response command 16122 and communications to the user device 16124 can be operated in the first conceptualization or the second conceptualization according to the preferences of the user, an administrator for the system, the operator, or the like.

While the first conceptualization and the second conceptualization are described in relation to a two-dimensional description of the inspection surface for clarity of the present description, either or both of the first conceptualization and the second conceptualization may include three-dimensional components and/or may be three-dimensional descriptions of the inspection surface. In certain embodiments, the first conceptualization and the second conceptualization may be the same and/or overlay each other (e.g., where the traversal axes of the robot define the view of the inspection surface, and/or where the axes of the inspection surface view and the traversal axes of the robot coincide).

While the first conceptualization and the second conceptualization are described in terms of the inspection robot traversal and the user device 16124 interface, additional or alternative conceptualizations are possible, such as in terms of an operator view of the inspection surface, other users of the inspection surface, and/or analysis of the inspection surface (e.g., where aligning one axis with a true vertical of the inspection surface, aligning an axis with a temperature gradient of the inspection surface, or other arrangement may provide a desirable feature for the conceptualization for some purpose of the particular system).

In certain embodiments, the user may provide a desired conceptualization (e.g., orientation of x-y axes, etc.) as a user response command 16122, and/or as any other user interaction as set forth throughout the present disclosure, allowing for the user to interface with depictions of the inspection surface in any desired manner. It can be seen that the utilization of one or more conceptualizations of the inspection surface provide for simplification of certain operations of aspects of systems, procedures, and/or controllers throughout the present disclosure (e.g., user interfaces, operator interfaces, inspection robot movement controls, etc.). It can be seen that the utilization of one or more conceptualizations of the inspection surface allow for combined conceptualizations that have distinct dimensionality, such as two-dimensional for a first conceptualization (e.g., traversal commands and/or sensor distributions for an inspection robot operating on a curved surface such as a tank interior, where the curved surface includes a related three-dimensional conceptualization; and/or where a first conceptualization eliminates the need for a dimension, such as by aligning an axis perpendicular to a cylindrical inspection surface), and a either three-dimensional or a non-simple transformation to a different two-dimensional for a second conceptualization (e.g., a conceptualization having an off-perpendicular axis for a cylindrical inspection surface, where a progression of that axis along the inspection surface would be helical, leading to either a three dimensional conceptualization, or a complex transformed two dimensional conceptualization).

Figure 86:
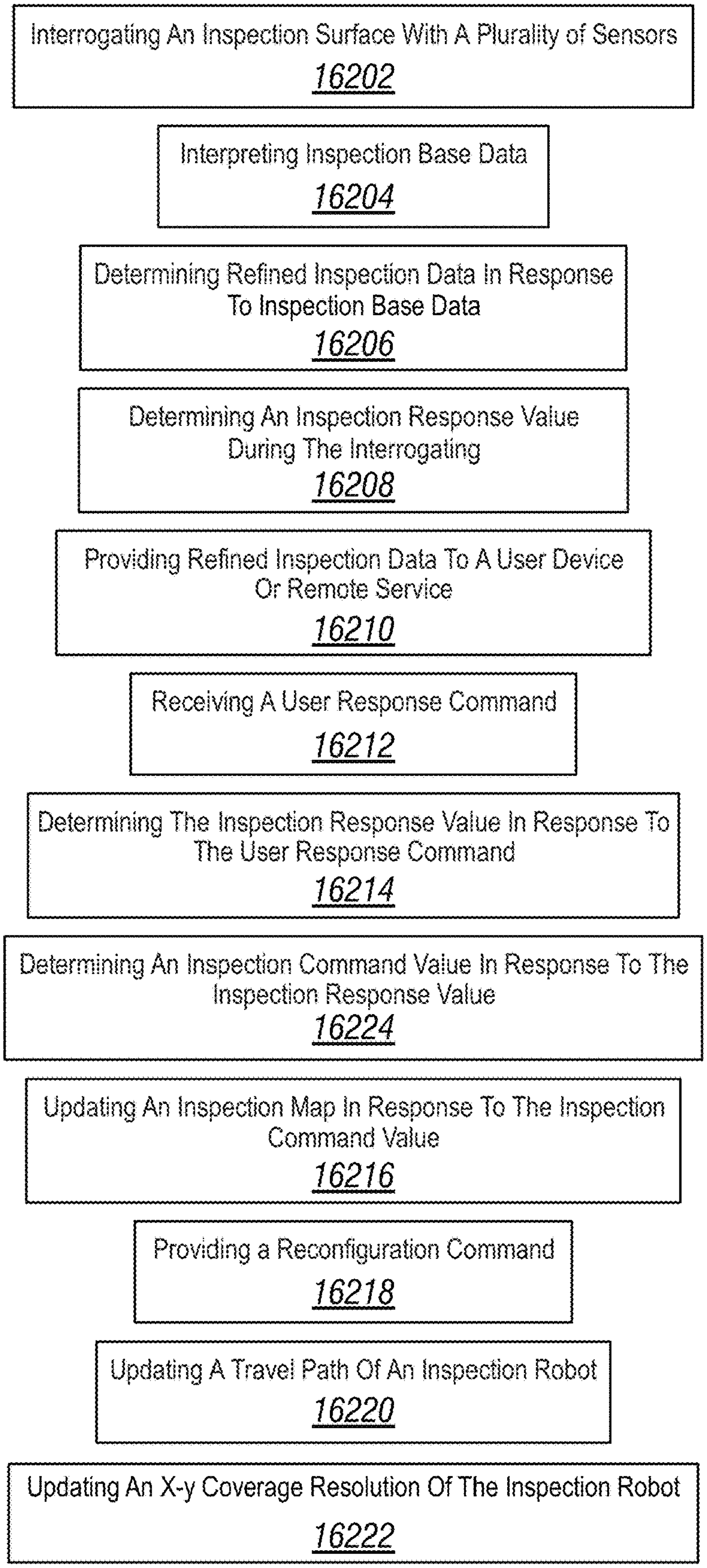
FIG. 86 is a schematic diagram of an example system for rapid response to inspection data.

Referencing FIG. 86, an example procedure for rapid reconfiguration of an inspection robot is depicted. The example procedure includes an operation 16202 to interrogate an inspection surface with a number of sensors, an operation 16204 to interpret inspection base data from the sensors, and an operation 16206 to determine refined inspection data in response to the inspection base data. The example procedure further includes an operation 16208 to determine an inspection response value during the interrogating. The example operation 16208 may additionally or alternatively determine the response value during a period of time that corresponds to a rapid response time. The example procedure further includes an operation 16224 to determine an inspection command value in response to the inspection response value.

The example procedure may further include an operation 16210 to provide the refined inspection data to a user device, remove server or service, and/or to an operator device, an operation 16212 to receive a user response command from the user device, remove server or service, and/or the operator device, and an operation 16214 to determine the inspection response value further in response to the user response command.

The example procedure may further include an operation 16216 to update an inspection map in response to the inspection command value. The example procedure may further include an operation 16218 to provide a reconfiguration command, and/or an operation 16220 to update a travel path of the inspection robot, in response to the inspection command value. The example procedure may further include an operation 16222 to update an x-y coverage resolution of the inspection robot in response to the inspection command value. In certain embodiments, the operation 16220 includes providing an updated inspection map for operation 16216, and/or providing an updated travel path for operation 16220. In certain embodiments, operation 16220 includes an operation to update coverage resolution of the inspection robot in response to the inspection command value, where the updated coverage resolution corresponds to a selected conceptualization of the inspection surface.

Figure 87:
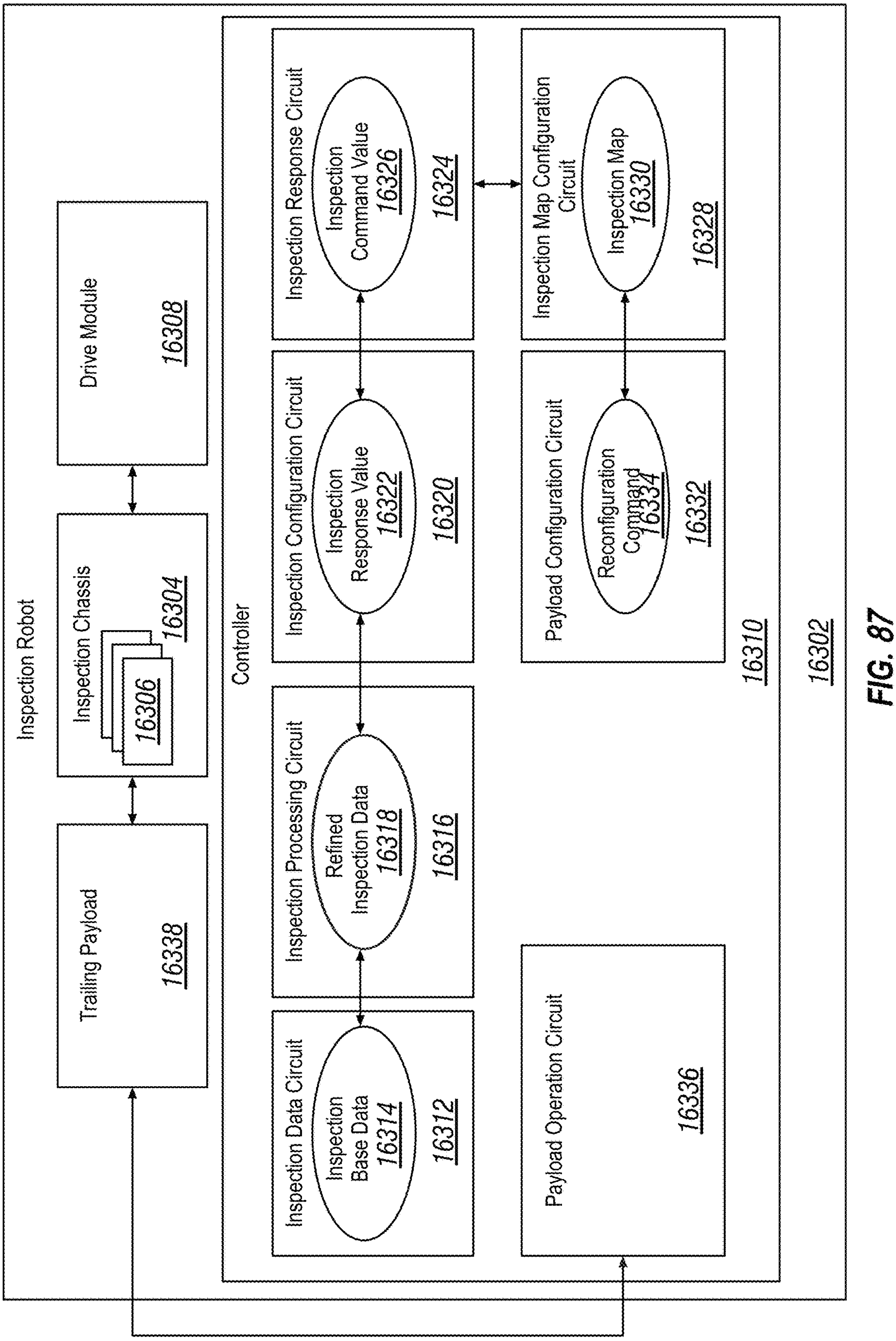
FIG. 87 is a schematic flow diagram of a procedure for rapid response to inspection data.

Referencing FIG. 87, an example inspection robot 16302 is depicted, with the inspection robot 16302 operable to perform rapid response configuration and/or reconfiguration for inspection operations of an inspection surface. In certain embodiments, the example inspection robot 16302 is compatible to interact with a controller is configured to perform operations for rapid response to inspection data (e.g., reference FIG. 85 and the related description), and/or may include portions or all of such a controller. Rapid response configuration and/or reconfiguration inspection operations include, without limitation, configuration and/or reconfiguration operations performed during an inspection operation, and/or performed during a period of time that corresponds to a rapid response time. An example inspection robot 16302 may additionally or alternatively include any components, features, and/or aspects of embodiments for an inspection robot as set forth throughout the present disclosure.

The example inspection robot 16302 includes an inspection chassis 16304 having a number of inspection sensors 16306 configured to interrogate an inspection surface. In certain embodiments, the inspection chassis 16304 corresponds to an inspection robot body, a center chassis, a robot chassis, and/or other similar terminology as utilized throughout the present disclosure. In certain embodiments, the inspection chassis 16304 further includes a payload, for example a payload coupled to the inspection robot body, and having at least some of the inspection sensors 16306 coupled thereto. Any example payloads and/or inspection sensors and coupling arrangements set forth throughout the present disclosure are contemplated herein.

The example inspection robot 16302 further includes a drive module 16308 coupled to the inspection chassis 16304, for example a drive module 16308 including one or more wheels, and power, mechanical, and/or communication interfaces to the inspection chassis 16304. The example drive module 16308 is structured to drive the inspection robot over the inspection surface, for example by powering at least one wheel of the drive module 16308, thereby propelling the inspection robot 16302 relative to the inspection surface.

The example inspection robot 16302 includes a controller 16310 having a number of circuits configured to functionally execute operations of the controller 16310. The arrangement depicted in FIG. 87 is a non-limiting example for clarity of description, and the arrangement of the controller 16310 and/or circuits thereof may vary, for example with the controller 16310 and/or portions thereof positioned on the inspection chassis 16304 and/or other components of the inspection robot 16302, and/or portions of the controller 16310 positioned on a base station, operator computing device, user computing device, remote server, and/or other locations within a system including the inspection robot 16302. The example controller 16310 includes an inspection data circuit 16312 that interprets inspection base data 16314 including data provided by the inspection sensors 16306, and an inspection processing circuit 16316 that determines refined inspection data 16318 in response to the inspection base data 16314. The example controller 16310 includes an inspection configuration circuit 16320 that determines an inspection response value 16322 in response to the refined inspection data, and an inspection response circuit 16324 that provides an inspection command value 16326 in response to the inspection response value 16322. In certain embodiments, the inspection response circuit 16324 provides the inspection command value 16326 during the inspection operations of the inspection robot 16302, and/or during a period of time that corresponds to a rapid response time. In certain embodiments, the inspection response value 16322 and/or the inspection command value 16326 may be determined in whole or part on a controller (e.g., controller 16102, reference FIG. 85) and received by the inspection configuration circuit 16320 and/or inspection response circuit 16324 for utilization by the controller 16310 to perform configuration and/or reconfiguration operations. In certain embodiments, the inspection configuration circuit 16320 and/or inspection response circuit 16324 determine relevant portions of the received inspection response value 16322 and/or the inspection command value 16326 for operations of the inspection robot 16302, and provide the relevant portions of inspection response value 16322 and/or the inspection command value 16326 as response and/or command instructions for the inspection robot 16302 and/or relevant components of the inspection robot 16302.

The example controller 16310 includes an inspection map configuration circuit 16328 that updates an inspection map 16330 in response to the inspection command value 16326. An example controller 16310 further includes a payload configuration circuit 16332 that provides a reconfiguration command 16334 in response to the inspection command value 16326. In certain embodiments, the payload configuration circuit may additionally or alternatively be referenced as a payload reconfiguration circuit and/or a sensor reconfiguration circuit, as operations of the payload configuration circuit 16332 may adjust, readjust, and/or reconfigure the payload and/or inspection sensors coupled to the payload. Example and non-limiting reconfiguration commands 16334 include a sensor spacing (e.g., horizontal and/or vertical sensor spacing), a couplant flow (e.g., flow rate and/or flow response characteristics such as re-coupling flow responses), a change in an inspection sensor (e.g., activating or deactivating a sensor, data collection from the sensor, and/or determination of inspection base data and/or refined data from the sensor; a change in a scale, sensed resolution, and/or calibrations for a sensor; and/or a change in a sampling rate of the sensor), and/or a force on an inspection sensor (e.g., an active or passive down force, and/or a change in operations of a biasing member and/or an actuator of a payload, arm, and/or sled associated with the inspection sensor). An example inspection robot 16302 is structured to re-traverse a portion of the inspection surface, and/or update an x-y coverage of the inspection operation, for example in response to an update of the inspection map 16330.

An example inspection robot 16302 includes a trailing payload 16338 structured to perform an operation on the inspection surface, such as altering the inspection surface, in response to the inspection command value 16326. The trailing payload 16338 may be coupled to a rear portion of the inspection chassis 16304. An example inspection robot 16302 includes a payload operation circuit 16336 that selectively operates the trailing payload 16338 in response to the inspection command value 16326, wherein the inspection command value 16326 includes a command for an operation such as a repair of the inspection surface, painting the inspection surface, welding the inspection surface, and/or applying a visible mark to the inspection surface. An example inspection command value 16326 may additionally or alternatively include a command for an operation such as a cleaning operation for the inspection surface, application of a coating and/or material addition to the inspection surface, and/or applying a selectively visible mark to the inspection surface. An example inspection robot 16302 is further configure to send an alarm and/or a notification to a user device in response to the inspection response value 16322, for example to notify the user and/or an operator that an off-nominal condition has been detected, that a configuration change to the inspection robot 16302 has been performed, and/or that a configuration change is unavailable and/or unsuccessful in whole or part. In certain embodiments, an alert and/or a notification to the user may be performed via a communication to an external controller (e.g., controller 16102 in FIG. 85), and/or the alert and/or notification may be provided by any applicable circuit of the controller 16310.

Figure 112:
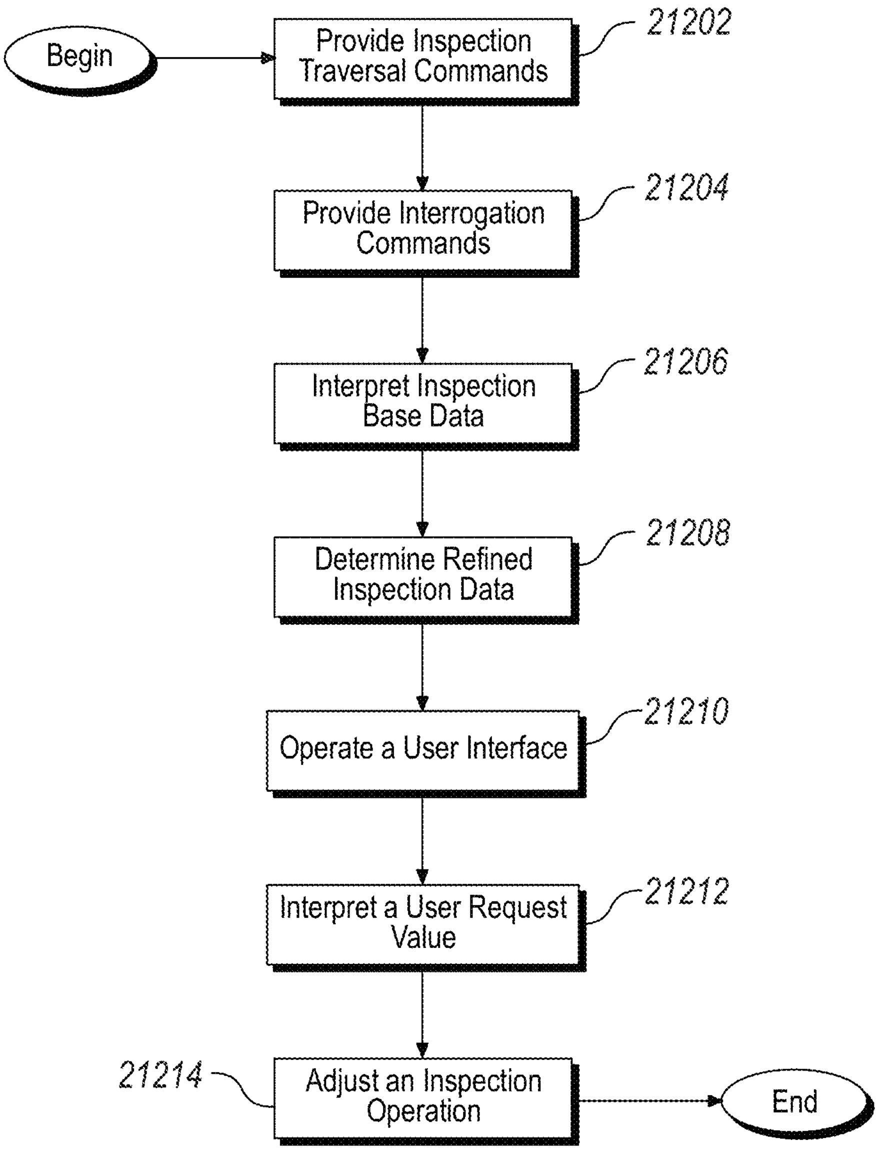
FIG. 112 is a schematic diagram of an example system for providing real-time processed inspection data to a user.

Referencing FIG. 112, an example system for providing real-time processed inspection data to a user is depicted. The example system includes an inspection robot 100 positioned on an inspection surface 500. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 112. In certain embodiments, the inspection robot 100 may have one or more payloads, and may include one or more sensors on each payload.

The example inspection robot 100 includes a number of sensors 2202, where the operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system further includes a controller 21002 having a number of circuits configured to functionally perform operations of the controller 21002. The example system includes the controller 21002 having an inspection data circuit that interprets inspection base data from the sensors 2202, an inspection processing circuit that determines refined inspection data in response to the inspection base data, and a user interface circuit that provides the refined inspection data to a user interface device 21006. The user interface circuit further communicates with the user interface device 21006, for example to interpret a user request value such as a request to change a display value, to change inspection parameters, and/or to perform marking, cleaning, and/or repair operations related to the inspection surface 500. The example controller 21002 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 21002 are set forth, without limitation, in the portion of the disclosure referencing FIG. 113.

The example controller 21002 is depicted schematically as a single device for clarity of description, but the controller 21002 may be a single device, a distributed device, and/or may include portions at least partially positioned with other devices in the system (e.g., on the inspection robot 100, or the user interface device 21006). In certain embodiments, the controller 21002 may be at least partially positioned on a computing device associated with an operator of the inspection (not shown), such as a local computer at a facility including the inspection surface 500, a laptop, and/or a mobile device. In certain embodiments, the controller 21002 may alternatively or additionally be at least partially positioned on a computing device that is remote to the inspection operations, such as on a web-based computing device, a cloud computing device, a communicatively coupled device, or the like.

In certain embodiments, the controller 21002 communicates to the user interface device 21006 using an intermediate structure 21004, such as a web portal, mobile application service, network connection, or the like. In certain embodiments, the intermediate structure 21004 may be varied by the controller 21002 and/or a user 21008, for example allowing the user 21008 to connect to the controller 21002 using a web portal at one time, and a mobile application at a different time. The controller 21002 may include operations such as performing an authentication operation, a login operation, or other confirmation that a user 21008 is authorized to interact with the controller 21002. In certain embodiments, the interactions of the user 21008 may be limited according to permissions related to the user 21008, the user interface device 21006, and/or any other considerations (e.g., a location of the user, an operating stage of an inspection, a limitation imposed by an operator of the inspection, etc.). In certain embodiments, and/or during certain operating conditions, the controller 21002 communicates directly with the user interface device 21006, and/or the user 21008 may interface directly with a computing device having at least a portion of the controller 21002 positioned thereon.

The example system further includes the inspection data circuit responsive to the user request value to adjust the interpreted inspection base data and/or the interrogation of the inspection surface. For example, and without limitation, the user request value may provide for a change to an inspection resolution (e.g., a horizontal distance between sensors 2202, a vertical distance at which sensor sampling is performed, selected positions of the inspection surface 500 to be interrogated, etc.), a change to sensor values (e.g., sensor resolution such as dedicated bits for digitization; sensor scaling; sensor communicated data parameters; sensor minimum or maximum values, etc.), a change to the planned location trajectory of the inspection robot (e.g., scheduling additional inspection passes, changing inspected areas, canceling planned inspection portions, adding inspection portions, etc.), and/or a change in sensor types (e.g., adding, removing, or replacing utilized sensors). In certain embodiments, the inspection data circuit responds to the user request value by performing an inspection operation that conforms with the user request value, by adjusting inspection operations to incrementally change the inspection scheme to be closer to the user request value (e.g., where the user request value cannot be met, where other constraints prevent the user request value from being met, and/or where permissions of the user 21008 allow only partial performance of the user request value). In certain embodiments, a difference between the user request value and the adjusted interpreted inspection base data and/or interrogation scheme may be determined, and/or may be communicated to the user, an operator, an administrator, another entity, and/or recorded in association with the data (e.g., as a data field, metadata, label for the data, etc.).

In certain embodiments, the inspection processing circuit is responsive to the user request value to adjust the determination of the refined inspection data. In certain embodiments, certain sensed values utilize a significant amount of post-processing to determine a data value. For example, a UT sensor may output a number of return times, which may be filtered, compared to thresholds, subjected to frequency analysis, or the like. In certain embodiments, the inspection base data includes information provided by the sensor 2202, and/or information provided by the inspection robot 100 (e.g., using processing capability on the inspection robot 100, hardware filters that act on the sensor 2202 raw data, de-bounced data, etc.). The inspection base data may be raw data—for example, the actual response provided by the sensor such as an electronic value (e.g., a voltage, frequency, or current output), but the inspection base data may also be processed data (e.g., return times, temperature, pressure, etc.). As utilized herein, the refined inspection data is data that is subjected to further processing, generally to yield data that provides a result value of interest (e.g., a thickness, or a state value such as "conforming" or "failed") or that provides a utilizable input for another model or virtual sensor (e.g., a corrected temperature, corrected flow rate, etc.). Accordingly, the inspection base data includes information from the sensor, and/or processed information from the sensor, while the refined inspection data includes information from the inspection base data that has been subjected to further processing. In certain embodiments, the computing time and/or memory required to determine the refined inspection data can be very significant. In certain embodiments, determination of the refined inspection data can be improved with the availability of significant additional data, such as data from offset and/or related inspections performed in similar systems, calibration options for sensors, and/or correction options for sensors (e.g., based on ambient conditions; available power for the sensor; materials of the inspection surface, coatings, or the like; etc.). Accordingly, in previously known systems, the availability of refined inspection data was dependent upon the meeting of the inspection base data with significant computing resources (including processing, memory, and access to databases), introducing significant delays (e.g., downloading data from the inspection robot 100 after an inspection is completed) and/or costs (e.g., highly capable computing devices on the inspection robot 100 and/or carried by an inspection operator) before the refined inspection data is available for analysis. Further, previously known systems do not allow for the utilization of refined inspection data during inspection operations (e.g., making an adjustment before the inspection operation is complete) and/or utilization by a customer of the data (e.g., a user 21008) that may have a better understanding of the commercial considerations of the inspection output than an inspection operator.

Figure 113:
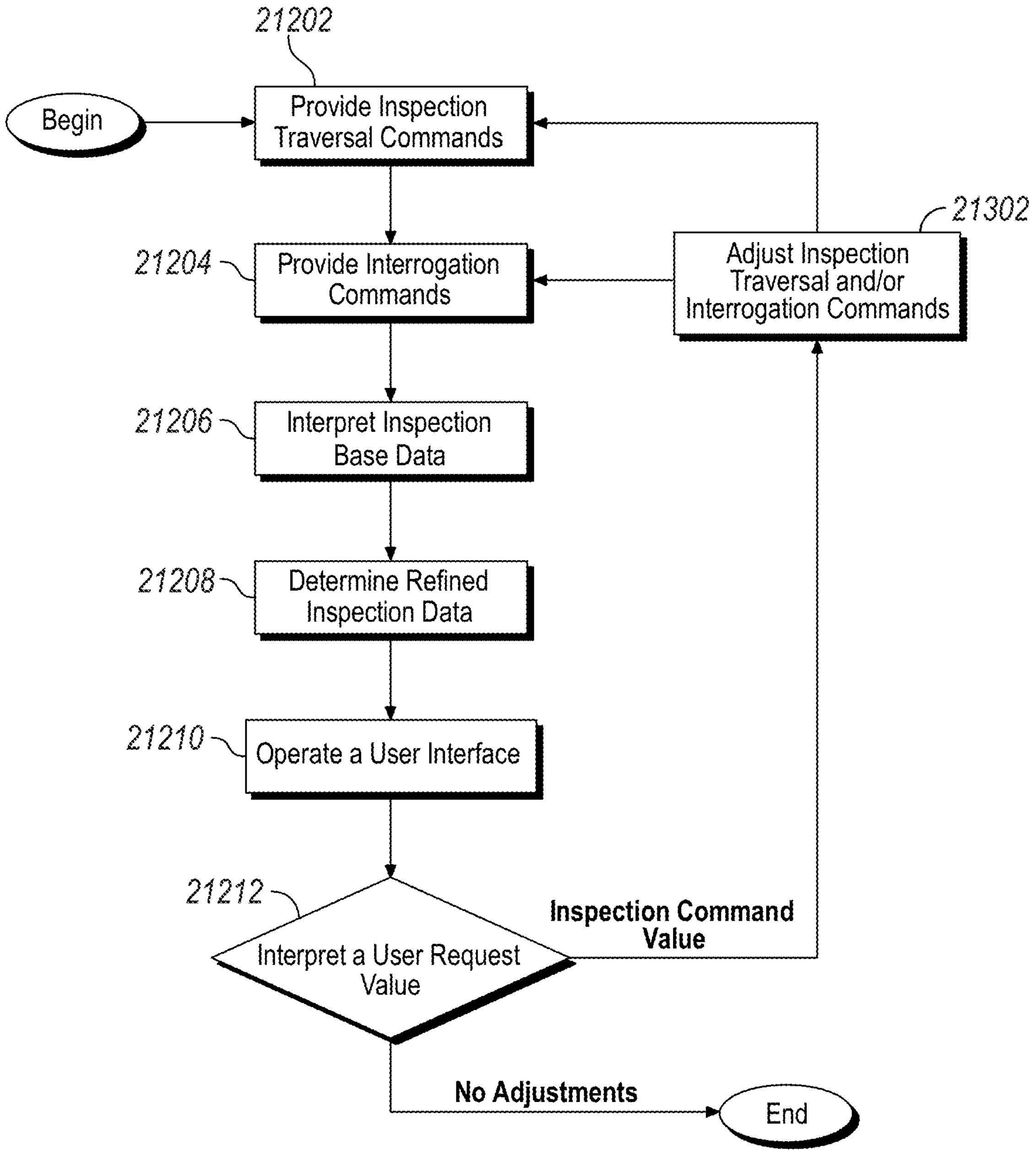
FIG. 113 is a schematic diagram of an example controller for providing real-time processed inspection data to a user.

Referencing FIG. 113, an example controller 21002 is depicted. The example controller 21002 is consistent with a controller usable in a system, for example the system depicted in FIG. 112, although the controller 21002 and/or aspects thereof may be usable in any system and/or with any embodiments set forth in the present disclosure.

The example controller 21002 includes an inspection data circuit 21102. The example inspection data circuit 21102 interprets inspection base data 21122, including data provided by an inspection robot 100 interrogating an inspection surface 500 with a number of inspection sensors 2202. The example controller 21002 further includes an inspection processing circuit 21104 that determines refined inspection data 21110 in response to the inspection base data 21122.

The example controller further includes a user interface circuit 21106 the provides the refined inspection data 21110 to a user interface device (e.g., as a user interface output 21126). In certain embodiments, the refined inspection data 21110 includes and/or is utilized to generate depictions of inspection results, including with quantified and/or qualitative values of the inspection results, such as wall thicknesses, coating thicknesses, compliant or non-compliant areas, service life descriptions (e.g., time remaining until service is required, service cost or amortization values, etc.), and/or any other values of interest determinable from the refined inspection data 21110. In certain embodiments, the refined inspection data 21110 may additionally or alternatively include data quality descriptions, such as confidence values, missing data descriptions, and/or sensing or data processing quality descriptions. In certain embodiments, the user interface circuit 21106 may be configured to adjust the displayed data, the display type, and/or provide a selection interface allowing a user to choose from among available data displays. The example user interface circuit 21106 further interprets a user request value 21124, and determines an inspection command value 21112 in response to the user request value 21124. In certain embodiments, the controller 21002 may be configured to utilize the user request value 21124 directly, where the user interface circuit 21106 accordingly passes the user request value 21124 to other aspects of the controller 21002 as the inspection command value 21112. In certain embodiments, the user interface circuit 21106 determines which aspects of the controller 21002 will be responsive to the user request value 21124, and determines one or more inspection command values 21112 to pass to the respective aspects of the controller 21002 to be responsive to the user request value 21124. For example, a user request value 21124 to inspect certain areas of the inspection surface 500, to change a planned position trajectory of the inspection robot 100, or the like, may be passed as inspection adjustments 21116 by an inspection configuration circuit 21108 to make appropriate adjustments to the inspection operations of the inspection robot 100 (e.g., utilizing command to the inspection robot 100, to an operator of the inspection robot 100, changing a planned path data structure, or the like). The example controller 21002 further includes the inspection configuration circuit 21108 that provides the inspection command value(s) 21112 to the inspection robot 100 (and/or to other aspects of the system) during the interrogating of the inspection surface 500 (e.g., while the inspection is occurring, and/or before the inspection is considered to be complete).

An example embodiment includes the inspection command value 21112 including a command to adjust in inspection operation (e.g., inspection adjustment 21116) of the inspection robot 100. Example and non-limiting inspection adjustments 21116 include adjusting an inspection location trajectory of the inspection robot (e.g., the region of the inspection surface to be inspected, the inspection pathing on the inspection surface, and/or the spatial order of inspection of the inspection surface), adjusting a calibration value of one of the inspection sensors (e.g., A/D conversion values, UT calibrations and/or assumptions utilized to process signals, and/or other parameters utilized to operate sensors, interpret data, and/or post-process data from sensors), and/or a command to enable at least one additional inspection sensor (e.g., activating an additional sensor, receiving data provided by the sensor, and/or storing data provided by the sensor). In certain embodiments, the at least one additional inspection sensor is a sensor having a different type of sensing relative to a previously operating sensor, and/or a sensor having a different capability and/or different position on the inspection robot (e.g., positioned on a different payload, different sled, and/or at a different position on a sled). An example inspection adjustment 21116 command includes a command to enable at least one additional inspection operation, where the inspection processing circuit 21104 determines the refined inspection data 21110 in response to the at least one additional inspection operation. Example and non-limiting additional inspection operations include re-inspecting at least portion of the inspection surface, performing an inspection with a sensor having distinct capabilities, sensing type, and/or calibrations relative to a previously operating sensor, inspecting additional regions of the inspection surface beyond an initially planned region, changing an inspection resolution (e.g., a spacing between sensed locations), changing a traversal speed of the inspection robot during inspection operations, or the like.

An example inspection command value 21112 includes a command to perform a repair operation 21118 of the inspection surface, such as a welding operation, applying a coating, a painting operation, a cleaning operation 21120, and/or applying an additive operation (e.g., adding substrate material, a coating material, a marking material, and/or a paint) to at least a portion of the inspection surface. An example inspection command value 21112 includes an operation to perform a marking operation 21114 on the inspection surface. Example and non-limiting marking operations include applying a visible mark, applying a selectively visible mark (e.g., a material visible under certain conditions such as in the presence of a UV light), and/or an operation to apply a virtual mark to at least a portion of the inspection surface. In certain embodiments, the marking operation 21114 additionally includes performing operations such as cleaning, repairing, and/or collecting additional data in relation to the portion of the inspection surface to be marked. In certain embodiments, a marking operation includes mitigation operations (e.g., to extend a service time, allow a facility to continue operations, and/or provide time to allow for additional inspections or subsequent service or repair to be performed), inspection operations (e.g., gathering more detailed information, confirming information, imaging information, etc. related to the marked region), and/or cleaning operations (e.g., to ensure that data collection is reliable, to ensure that a mark adheres and/or can be seen, and/or to enhance related imaging information) for the marked region of the inspection surface and/or adjacent regions.

An example inspection command value 21112 includes a command to capture a visual representation of at least a portion of the inspection surface, such as an image, a series of images, and/or video images, of the area to be marked, adjacent areas, and/or perspective views (e.g., to provide context, allow for easier location of the marked area, etc.) of related to the region of the inspection surface to be marked.

An example inspection command value 21112 includes a display threshold adjustment value, such as a threshold utilized to label, categorize, colorize, or otherwise depict aspects of the inspection data on a visual representation of at least a portion of the inspection surface. In certain embodiments, the display threshold adjustment value may be determined in response to the inspection data (e.g., to show anomalous regions based on the inspection data values, based on averages, quartiles, or other statistical determinations, etc.), in response to user request values 21124 received from a user interface provided to a user device, and/or in response to operator commands (e.g., from an operator interacting with a base station, local computing device, mobile computing device, dedicated device communicatively coupled to the inspection robot, etc.).

In certain embodiments, a user device and/or user interface device includes a computing device communicative coupled to the controller 21002. Communicative coupling may be provided through a local area network (e.g., a facility network where the facility includes the inspection surface), a wide area network, the internet, a web application, a mobile application, and/or combinations of these. Example and non-limiting user interface devices include a laptop, a desktop, or a mobile computing device such as a smart phone or tablet. In certain embodiments, the user interface device is positioned at a separate physical location from the inspection surface (e.g., at another location in a facility including the inspection surface, and/or away from the facility).

In certain embodiments, the inspection command value 21112 includes a display threshold adjustment value, where the inspection processing circuit 21104 updates the refined inspection data 21110 in response to the display threshold adjustment value (e.g., changing a sensor, sensor parameter, inspection path, etc. to provide data sufficient to support the display threshold adjustment value; adjusting post-processing of inspection data in response to the display threshold adjustment value, such as determining anomalous data, enhancing or adjusting a resolution of the refined data, and/or providing additional related data to data corresponding to the display threshold being adjusted).

In certain embodiments, the inspection based data includes raw sensor data, and/or minimally processed data. In certain embodiments, the inspection based data includes ultra-sonic (UT) sensor data, which may additionally or alternatively include sensor calibrations such as settings and assumptions utilized to determine a processed parameter (e.g., a wall thickness of the inspection surface, a presence of a crack or anomaly, and/or a thickness of a coating and/or debris). The sensor calibrations and/or other descriptive data (e.g., time stamps, location data, facility data, etc.) may be stored as metadata with the raw sensor data, and/or related to the raw sensor data such that a device accessing the raw sensor data can additionally request or retrieve the metadata. The present description references UT sensor data and related data, but sensor calibrations, related data, and/or metadata may be stored in relation to any type of raw sensor data and/or minimally processed data.

Figure 114:
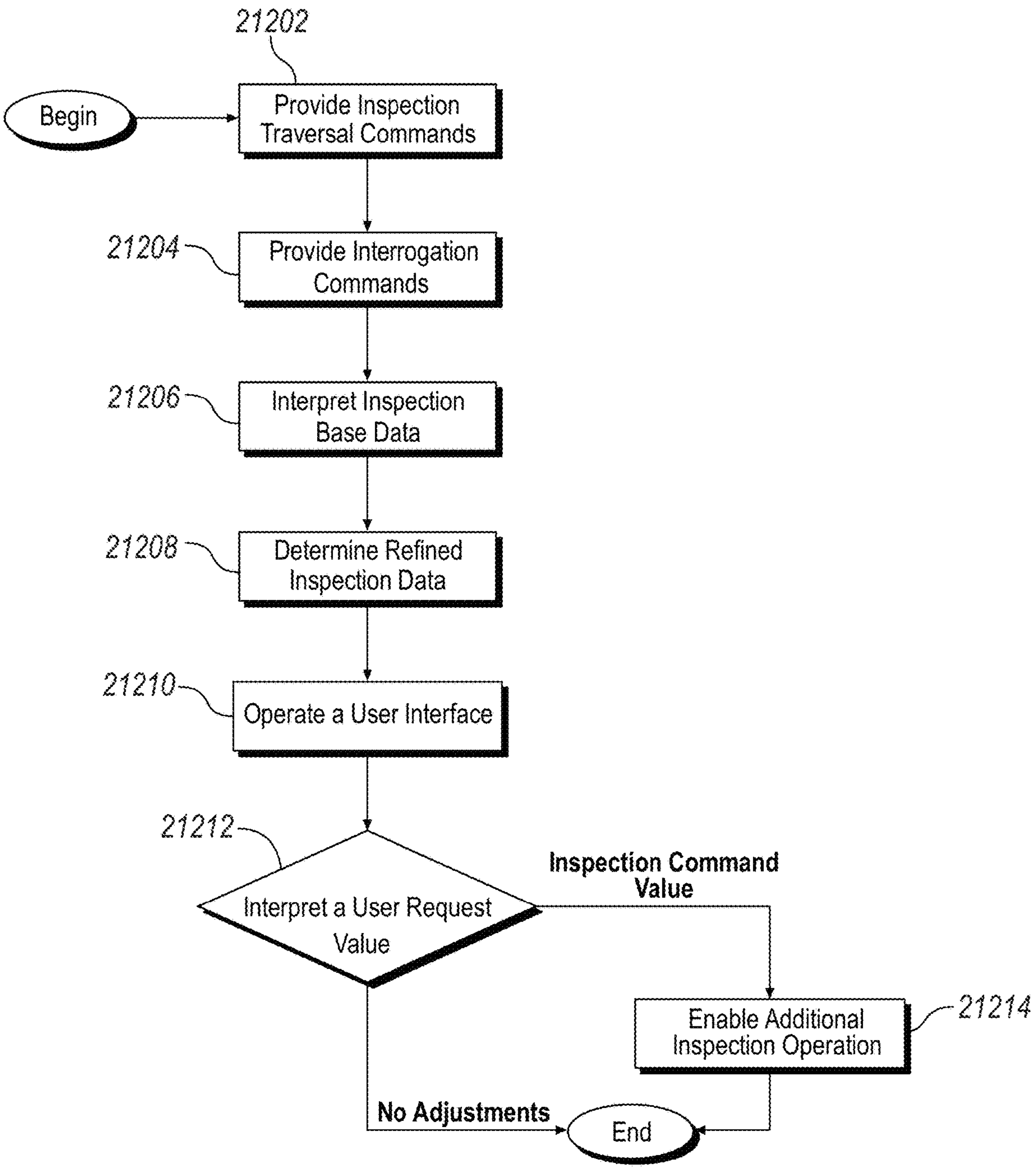
FIG. 114 is a schematic flow diagram of an example procedure to adjust inspection operations.
Figure 115:
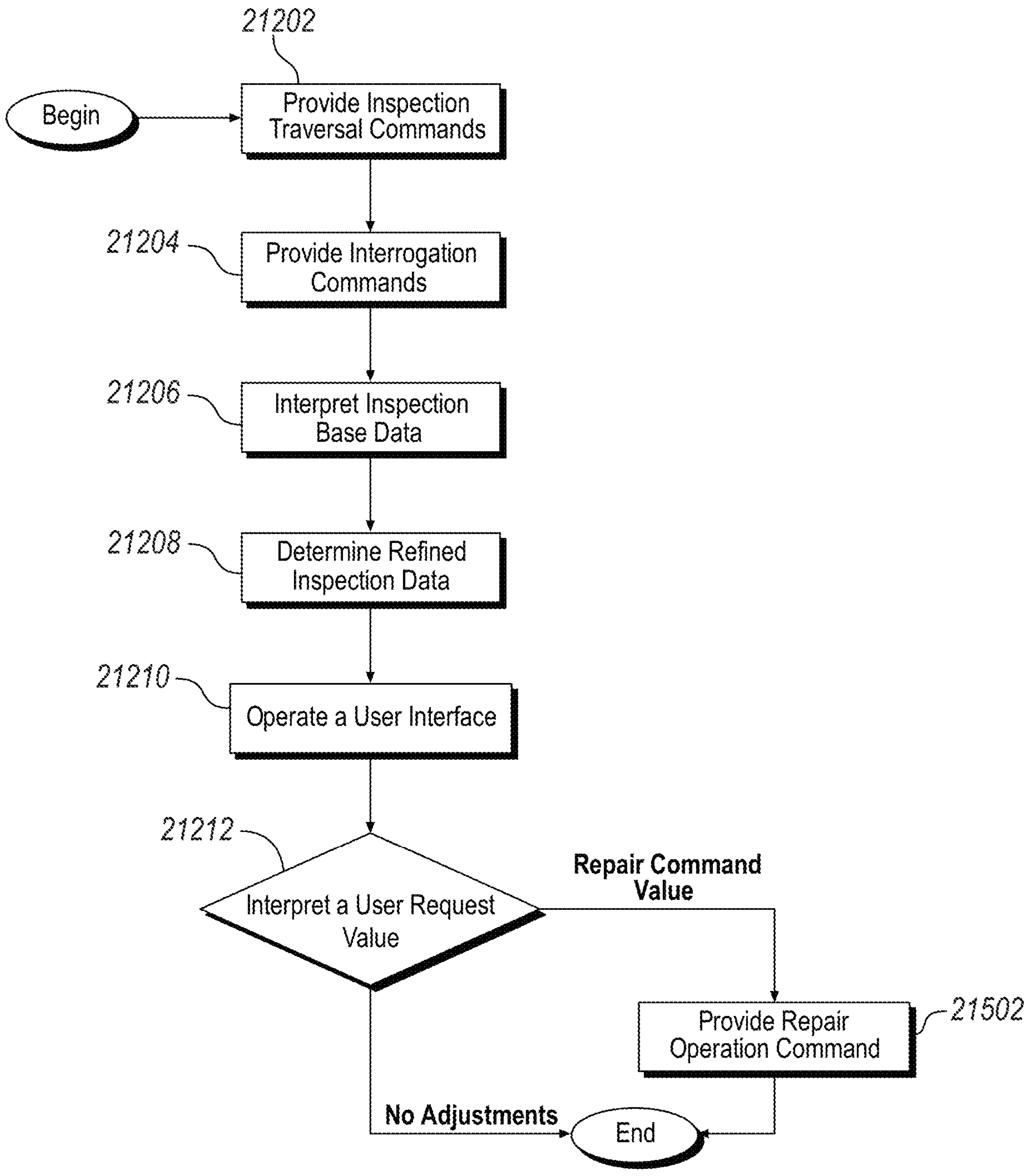

Referencing FIGS. 114-115, an example procedure for adjusting an inspection operation in response to a user request value is depicted. The example procedure includes an operation 21202 to provide inspection traversal commands (e.g., a description of regions of an inspection surface to be inspected, a pathing description for an inspection robot, etc.), an operation 21204 to provide interrogation commands to a number of inspection sensors of the inspection robot, an operation 21206 to interpret inspection base data from the inspection sensors (e.g., raw sensor data, minimally processed sensor data, and/or sensor calibration or other metadata), an 21208 to determine refined inspection data in response to the inspection base data, an operation 21210 to operate a user interface accessible to a user interface device, and to provide the refined inspection data to the user interface. For example, the refined inspection data may include processed data values (e.g., thickness values, wear values, temperatures, coating indications, service life and/or service date values, etc.), which may be presented as tables, graphs, visual depictions of the inspection surface, or the like. In certain embodiments, refined inspection data may include raw sensor data and/or minimally processed sensor data, and/or may further include associated calibrations or other metadata, for example to allow the user to evaluate the processing and determine whether sensor data processing parameters should be updated or adjusted, perform sensitivity analysis with respect to processing calibrations and/or assumptions, etc. In certain embodiments, operation 21210 to operate the user interface includes operating a web portal, web site, mobile application, proprietary application, and/or a database accessible with an application programming interface (API), and interacting with a user device through any of the foregoing.

The example procedure further includes an operation to interpret a user request value 21212, for example a request to adjust a display (e.g., displayed data, thresholds, virtual marks, displayed region of the inspection surface, etc.) presented on the user interface, a request to adjust any aspect of the inspection operation (e.g., sensors utilized and/or calibrations for the sensors; sensor positions on one or more payloads; sampling rates; robot traversal trajectory including locations to be inspected, traversal speed, areas to be re-inspected, imaged, and/or inspected with an additional inspection operations; authorizations for additional time, cost, utilization of certain operations such as welding, repair, or utilization of certain materials; adjusting downforce parameters for the inspection robot; adjusting thresholds for any operations described throughout the present disclosure, such as thresholds to enable additional or alternative inspection operations or sensors, thresholds to display information on an inspection display, thresholds to perform operations such as repair, marking, and/or cleaning and an operation, and/or thresholds to respond to off-nominal conditions such as couplant loss events, obstacle detection events, sensor evaluation, processing, or scoring values such as primary mode scores and/or secondary mode scores). The example procedure includes an operation 21214 to adjust the inspection operation in response to the user request value. One or more of any adjustments to the inspection robot and/or inspection operations as set forth throughout the present disclosure may be implemented for operation 21214.

An example procedure includes adjusting the inspection operation by adjusting the inspection operation to achieve the implied conditions from the user request value, but adjusting the inspection operation may additionally or alternatively include one or more of: adjusting the inspection operation to comply with a portion of the user request value; considering the user request value adjustments (e.g., as part of a prioritization of one or more additional requests), where the user request value adjustments may not be implemented, implemented only in part, or implemented in whole; storing a description of adjustments of the inspection operation for implementation at a later time (e.g., later in the present inspection operation, and/or in a subsequent inspection operation); implementing one or more adjustments for which a user providing the user request value has authorization, and/or not implementing one or more adjustments for which the user providing the user request value does not have authorization; and/or preserving a capability to implement one or more adjustments for which the user providing the user request value does not have authorization and/or pending an authorization of the user (e.g., performing additional inspection operations to take additional data responsive to the user request value, but preventing access of the user to the additional data until the user is authorized to access the data, and/or until user authorization for the additional data is confirmed). In certain embodiments, the operation 21214 further includes providing an alert and/or notification to the user, user device, and/or user interface in response to a partial implementation and/or non-implementation of the adjustments. The alert and/or notification may include an indication that the adjustments were not performed, a description of which aspects of the adjustments were not performed, and indication of why no adjustments or incomplete adjustments were performed (e.g., indicating a higher priority request, system capability that is lacking, that the user requires authorization, etc.). In certain embodiments, the operation 21214 includes providing an alert and/or notification to an administrator, supervisor, super-user, and/or operator of the inspection robot, indicating that a user request value was received, and/or indicating whether the user request value was addressed in full or part. In certain embodiments, the operation 21214 further includes providing an authorization request to an administrator, supervisor, super-user, and/or operator of the inspection robot for the user in response to the user request value. The described example operations are non-limiting, and set forth to provide illustrations of certain capabilities of embodiments herein.

An example user request value includes an inspection command value, where the operation 21302 includes adjusting inspection traversal commands and/or the interrogation commands in response to the inspection command value. An example operation 21214 includes adjusting inspection traversal commands to adjust an inspection location trajectory (e.g., position trajectory) of the inspection robot, adjusting the interrogation command to adjust calibration value(s) for one or more inspection sensors, and/or adjusting the interrogation commands to enable one or more additional sensors. An example operation 21214 includes enabling at least one additional inspection operation in response to a user request value (e.g., as a repair command value), for example by providing a repair operation command. In certain embodiments, the repair command provides a welding operation command, a coating application command, a painting operation command, a cleaning operation command, and/or an additive operation command.

An example user request value includes a marking command value, and operation 21502 includes providing a marking operation command. In certain embodiments, the marking operation command includes a visible marking command, a selectively visible marking command, and/or a virtual marking command. In certain embodiments, operation 21210 to operate the user interface, and/or operation 21214 to adjust an inspection operation, include selectively providing a virtual mark to the user interface (e.g., showing virtual marks in a display layer of the user interface, showing virtual marks upon request by the user, showing virtual marks according to a mark type requested by the user, showing virtual marks in response to an authorization of the user, etc.).

An example user request value includes a visual capture command value, where operation 21214 includes providing a visual capture operation command in response to the visual capture command value (e.g., where a camera, optical sensor, or other device of the inspection robot is responsive to the visual capture operation command to capture associated visual data from the inspection surface).

Referring now to FIGS. 118A-G, an example embodiment of a sensor sled assembly 22200 includes a first portion 22210, a second portion 22212, and a third portion 22214. Some or all of the features of the sensor sled assembly 22200 as described with reference to this and other embodiments throughout the description may be the same as or otherwise combined with each other. The sensor sled assembly 22200 is depicted and described as having three portions for clarity of the description to highlight aspects of certain embodiments, but the number of portions may vary across embodiments, and/or embodiments may include a sensor sled assembly 22200 without portions or segments. Example embodiments may include one or more depicted portions being integrated, and/or logical or physical divisions of the sensor sled assembly 22200 within depicted portions. For example, embodiments of the sensor sled assembly 22200 may include a single portion, two portions, three portions (as shown in FIGS. 118A-G) or more than three portions. The first portion 22210 and/or the second portion 22212 may each include one or more sensor housings 22216, 22218 that each include one or more sensors 22220 and 22222. Non-limiting examples of the sensors 22220 and 22222 include transducers of the types disclosed herein. In embodiments, the third portion 22214 may be connected/coupled to an arm 22224 which may be connected/coupled to a sled mount 22226 of an inspection robot 100 (FIG. 1), as disclosed herein. The example embodiments of FIGS. 118A-145 are depicted including UT sensors, and provide examples for high density inspection operations, but may additionally or alternatively include additional or distinct sensor types, including EM sensors, profiling sensors, and/or any other sensor type as set forth herein. Embodiments herein to provide high density inspection operations allow for various enhancements to inspection operations, for example high speed inspections (e.g., high density of sensors providing significant surface inspection coverage in a single pass over the inspection surface), additional inspection capability (e.g., inspection operations with multiple closely positioned sensors, allowing for diversity of sensor types, diversity of sensing operations or calibrations among the sensors, etc.), and/or redundancy of inspection operations (e.g., allowing for error correction, confirmation, and/or providing backup inspection operations in a single pass, which may be useful, for example: where proper calibration settings and/or sensor configurations are uncertain; where access to the inspection surface is difficult and/or otherwise high cost; and/or where the inspection conditions elevate the risk for individual sensor failures during inspection operations).

Embodiments of the sensor sled assembly 22200 may provide for one or more degrees of freedom for motion of the assembly, for sleds, for sled mounts, and/or for sled portions. Motion degrees of freedom allow for improved inspection operations, for example limiting damage to the sensor sled assembly, allowing for traversal of a range of obstacles on the inspection surface, allowing for recovery and/or continuation of inspection operations without requiring downtime (e.g., removal of an inspection robot from the inspection surface to reset the configuration), and/or improving inspection through improved compliance of proper positioning for sensors to the inspection surface, and/or more rapid recovery of positioning in response to a disturbance such as traversal of an obstacle. For example, as shown in FIG. 118B, a first degree of freedom 22228 may be about pivot joint 22229 and provide for the entire sled assembly 22200 to move in the directions indicated by the double arrowed lines with respect to the sled mount 22226. In embodiments, the range of motion of the first degree of freedom 22228 may be about 5 to 60 degrees above and up to about thirty degrees below an axis 22230 that runs through the pivot joint 22229 and the length of the arm 22224 when the sled assembly 22200 is resting on a level surface. The range of motion of the first degree of freedom 22228 depends upon the purpose for allowing movement, the utilization, availability, and characteristics of a biasing force (e.g., using a biasing spring) to bias the arm 22224 during operations, or the like. One of skill in the art, having the benefit of the disclosures herein, can readily configure a range of motion for the first degree of freedom 22228 for a given system. Certain considerations for determining the degree of freedom 22228 (range of motion) to be provided include, without limitation: the shape of the inspection surface; the purpose for the range of motion 22228 (e.g., to support inspection operations, to support assembly and/or configuration of the inspection robot, to provide a configuration of the sensor sled assembly 22200 during storage or transit, etc.); the expected size and/or configuration of disturbances (e.g., obstacles on the inspection surface, surface anomalies such as burrs, welds, damage, etc.); aspects of the hardware utilized to implement the range of motion (e.g., passive motion such as allowing the arm 22224 to passively raise for obstacles, and return with a biasing spring, versus active motion such as an actuator capable to selectively raise or lower the arm 22224); and/or other limits in the system, such as stability limits (e.g., due to weight shifting of inspection robot on the inspection surface as the arm 22224 moves), height limits (e.g., total height limit of the inspection robot, for example due to aspects of the inspected region), etc. In embodiments, one or more hard points, e.g., screws, actuator limiters, stop pegs, etc., may be used to control the range of the degree of freedom 22228 above and/or below the axis 22230.

Figure 118A:
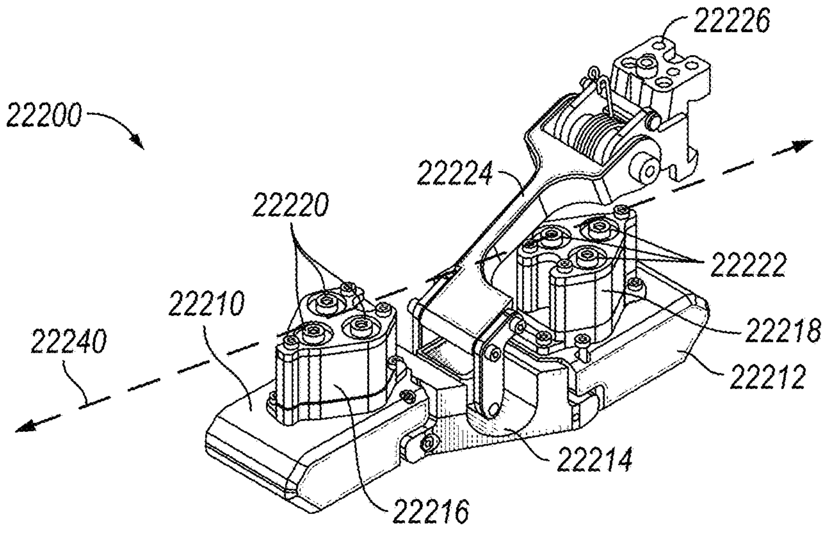
Figure 118B:
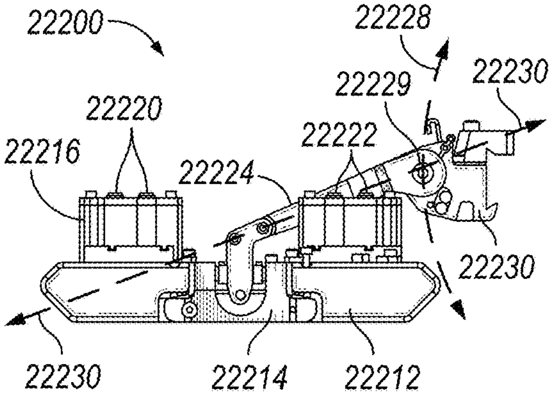
Figure 118C:
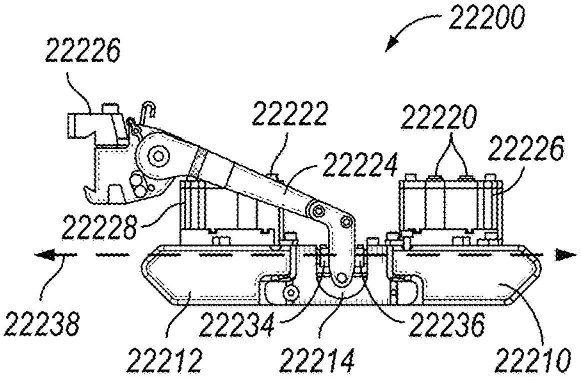
Figure 118D:
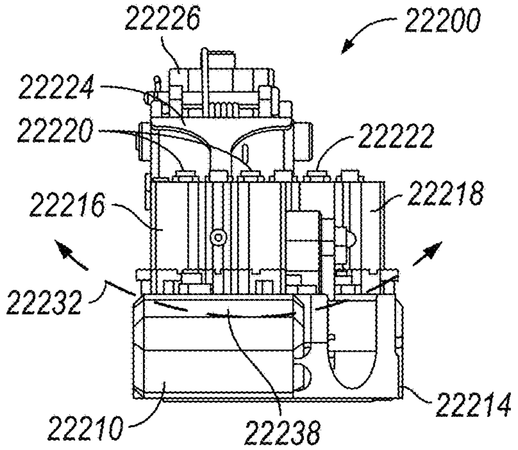
Figure 118E:
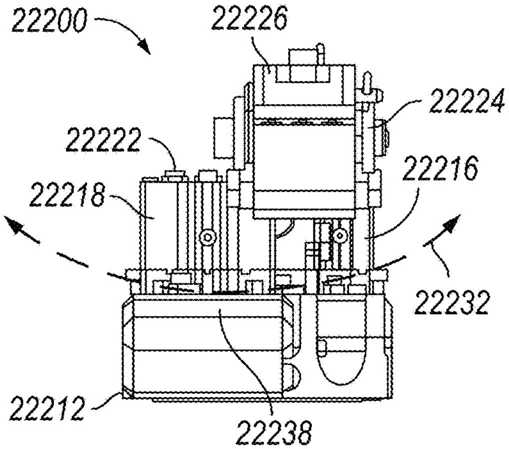

As shown in FIGS. 118C, 118D, and 118E, a second degree of freedom 22232 may be about rotational joints 22234 and 22236 such that the first portion 22210 rotates about joint 22236 and the second portion 22212 rotates about joint 22234 in the directions indicated by double arrowed line (second degree of freedom 22232). In embodiments, the first portion 22210 and the second portion 22212 may rotate, respectively about joints 22236 and 22234, synchronously, e.g., together, or asynchronously, e.g., independent of each other. In embodiments, the range of motion of the second degree of freedom 22232 may be up to about 15 degrees clockwise and about 15 degrees counter-clockwise respect to an axis 22238 that runs through the joints 22234 and 22236, as measured from the position shown in FIGS. 118C-E. In embodiments, one or more hard points, e.g., screws, may be used to control the range of the second degree of freedom 22232. The limits of the second degree of freedom 22232 may be configured to accommodate obstacles, and/or may be selected in view of the range of motion 22228 selected in the first degree of freedom (e.g., allowing small obstacles to be accommodated with the second degree of freedom 22232, with larger obstacles accommodated with the first degree of freedom). In certain embodiments, even a very limited second degree of freedom 22232, for example an available rotation of +/−1 degree of freedom, is still useful to improve inspection operations, traverse obstacles, and/or provide for rapid return to inspection orientation during and after traversal of an obstacle. An obstacle or disturbance, as utilized herein, is described as such for clarity of the description. An obstacle may be an off-nominal condition, for example, due to surface damage, improper configuration, debris, or the like, and/or a nominal condition, for example, a seam, weld, bolt, change in curvature of the inspection surface, and/or change from a first inspection surface to a second inspection surface (e.g., a transition from a first sidewall to a second sidewall, a transition from a first pipe to a second pipe, etc.). Accordingly, an obstacle or disturbance, for the purpose of traversal of the inspection robot and/or sensor sled assembly 22200, may be a properly designed aspect of the inspection surface, and/or an aspect of the inspection surface that is present due to damage, wear, corrosion, deposited material, installation of nearby equipment that impinges on the inspection region, or any other aspect that is not a designed aspect of the inspection surface.

FIG. 119 depicts a third degree of freedom 22310 about pivot points 22312 and 22314 (e.g., joints) such that the first portion 22210 and the second portion 22212 respectively pivot about points 22312 and 22314 in the direction indicated by the double arrowed lines (third degree of freedom 22310) with respect to the third portion 22214. In embodiments, the first portion 22210 and the second portion 22212 may pivot about points 22312 and 22314 synchronously, e.g., tighter, or asynchronously, e.g., independent of each other. In embodiments, the range of motion of the third degree of freedom 22310 may be about ten degrees above and about ten degrees below a longitudinal axis 22316 of the third portion 22214. In embodiments, one or more hard points, e.g., screws, may be used to control the range of the third degree of freedom 22310 above and/or below the axis 22316. The utilization of a third degree of freedom 22310 allows for independent traversal of obstacles for each sled portion, for example keeping a sensor on a first sled portion in an inspection orientation while a sensor on the other sled portion traverses the obstacle, allows for a more rapid return of a sensor to an inspection orientation after traversal, or the like. The ranges described for each degree of freedom (e.g., first, second, third, fourth, etc.) are non-limiting examples, and the ranges may be more limited, or allowed to exceed, the example ranges described herein.

In embodiments, the first 22210 and/or the second 22212 portions may be biased towards a particular position via the pivot points 22312 and 22314. In embodiments, biasing of the first portion 22210 and/or second potion 22212 about points 22312 and 22314 may be achieved via biasing mechanisms such as springs, pneumatics, electromagnetics, and the like. Biasing of the first portion 22210 and/or the second portion 22212 about points 22312 and 22314 may provide for improved stability of the sled assemblies and/or the inspection robot 100, as compared to certain embodiments that do not provide such biasing. For example, the size of the housings and/or weight of the sensors may shift the center of gravity (CoG), as compared to embodiments having smaller housings and/or sensors, such that the sled assembly 22200 may be prone to tipping, and the biasing of the first portion 22210 and/or the second portion 22212 about points 22312 and 22314 may mitigate the instability generated by the shifted CoG. Embodiments herein provide for sensor sled assemblies 22200 having a high sensor density, and/or high capability sensors (e.g., which may include a large sensor, for example, to accommodate a high energy transducer), where improved stability has even greater value than in previously known systems. In embodiments, the first portion 22210 and the second portion 22212 may be biased about points 22312 and 22314 concavely with respect to an inspection surface. In other embodiments, the first portion 22210 and the second portion 22212 may be biased about points 22312 and 22314 convexly with respect to an inspection surface. In embodiments, the first portion 22210 may be biased about point 22312 concavely and the second portion 22212 may be biased about point 22314 convexly with respect to the inspection surface or vice-versa. In embodiments, the biasing of the first portion 22210 and/or the second portion 22212 about points 22312 and 22314 may be activated/in effect while the inspection robot 100 is powered up and/or during an inspection run.

A fourth degree of freedom 22318 may be provided for the third portion 22214 about pivot point 22320 such that the first portion 22210, second portion 22212, and third portion 22214 pivot about point 22320 with respect to the arm 22224. In embodiments, the range of motion of the fourth degree of freedom 22318 may be about thirty degrees above and about thirty degrees below an axis 22322 that runs through the pivot point 22320 and is parallel to the longitudinal axis 22316 when the sled assembly 22200 is on a level surface. In embodiments, one or more hard points, e.g., screws, may be used to control the range of the fourth degree of freedom 22318 above and/or below the axis 22322.

As will be appreciated, the degrees of freedom of the sled assembly 22200, as disclosed herein, may provide for improved coupling of the sensors along curved and/or varying inspection surfaces, transitions between inspection surfaces, e.g., the interior and/or exterior of pipes, channels, ships, etc. Additionally or alternatively, the degrees of freedom of the sled assembly 22200 may improve traversal of the inspection robot and/or sled assembly 22200 during non-inspection operations, for example during traversal on a surface to an inspection location, traversal after inspection operations are complete, etc. Additionally or alternatively, the degrees of freedom of the sled assembly 22200 may improve traversal of the inspection robot and/or sled assembly 22200 in any direction, for example whether the inspection robot is going forward, reverse, turning, moving laterally, etc.

FIG. 120 is a cutaway view of the sled assembly 22200 along axis 22240 (shown in FIG. 118A). The one or more housings 22216, 22218 may have an upper housing portion 22412 and a lower housing portion 22414. The upper housing portion 22412 may house the sensors 22220 and 22222. The lower housing portion 22414 may include a couplant chamber 22416. While FIG. 120 depicts the sensors 22220, 22222 in the upper housing portion 22412 and the couplant chamber 22416 in the lower portion 22414, in embodiments, the sensor 22220, 22222 may extend into the lower housing portion 22414 and/or the couplant chamber 22416 may extend into the upper housing portion 22412. In embodiments, the lower housing portion 22414 may be formed of one or more modules. In such embodiments, the one or more modules may be adjustable, e.g., switchable, so as to vary one or more properties, e.g., the delay line, surface curvature, couplant flow configuration, surface contact material, etc., of the lower housing portion 22414.

FIG. 121 is a zoomed in view of the second portion 22212 with lower housing portion 22218. In embodiments, the upper housing portion 22412 may include a couplant port 22512. A connection point 22514 may be disposed within the port 22512 such that a couplant conduit, e.g., a hose, may be inserted into the port 22512 and coupled to the connection point 22514 so that couplant may flow from the hose and into the couplant chamber via one or more channels 22516 disposed in the lower housing portion 22414. In embodiments, one or more fasteners, e.g., screws 22518 may be used to secure the sensor 22222 in the upper housing portion 22412. The couplant chamber 22416 may have an opening 22520 which facilitates the flow of couplant to an inspection surface 22522. The couplant chamber 22416 may have a delay line 22523 of between about 5 mm to about 50 mm, without limitation, to accommodate the sensor 22222 which may be structured to inspect surfaces having varying materials, thickness, and/or for inspection of various aspects (e.g., damage, physical geometry, corrosion, cracks, etc.). In embodiments, the delay line 22523 may be about 1.25". Embodiments of the lower housing portion 22218 may include backing to accommodate the sensor 22222. In embodiments, the delay line 22523 may be structured to provide for two (2) backwall echoes and/or to provide for sufficient time to focus the sensor 22222 with respect to the inspection surface 22522. In embodiments, the sensor 22222 and delay line 22523 may be configured to inspect a steel inspection surface having a thickness of about 0.5" to about 2". In embodiments, the sensor 22222 and delay line 22523 may be configured to inspect a 26" carbon steel inspection surface. In embodiments, the delay line 22523 may be structured to provide for two (2) backwall echoes on a 2" thick steel inspection surface.

Embodiments of the present disclosure may also provide for a film 22524 to be disposed across the opening 22520. The film 22524 may be configured to provide for selected surface friction, to provide a sacrificial wear surface, to conform to minor surface anomalies and maintain acoustic coupling, to limit couplant loss, or the like. Non-limiting examples of materials that may be used for the film 22524 include: LDPE (low density polyethylene), UHMW (ultra high molecular weight polyethylene or other plastics), Aqualene™, Tin, Nylon, PEEK (polyether ether ketone), ABS (acrylonitrile butadiene styrene), PTFE (polyfluoroethylene, e.g., Teflon®), an elastomeric material, and/or any combination thereof. In embodiments, the lower housing portion 22414 may be positioned within the first 22210 and/or second 22212 portion such that a space 22526 is formed between the lower housing portion 22414 and an exterior surface of the first 22210 and/or second 22212 portion with respect to the inspection surface 22522. For example, as shown in FIG. 121, the lower housing portion 22414 may be recessed in the second portion 22212 to form space 22526, wherein the film 22524 may be secured to the second portion 22212, e.g., via adhesives and/or mechanical coupling (e.g., a clip). In embodiments, the film 22524 may be selectively removable and/or selectively attachable, e.g., use and/or configuration of the film 22524 may be selectable at an operator's discretion. In embodiments where the film 22524 is removed and/or otherwise absent, the space 22526 may be filled via couplant during operations.

Figure 118F:
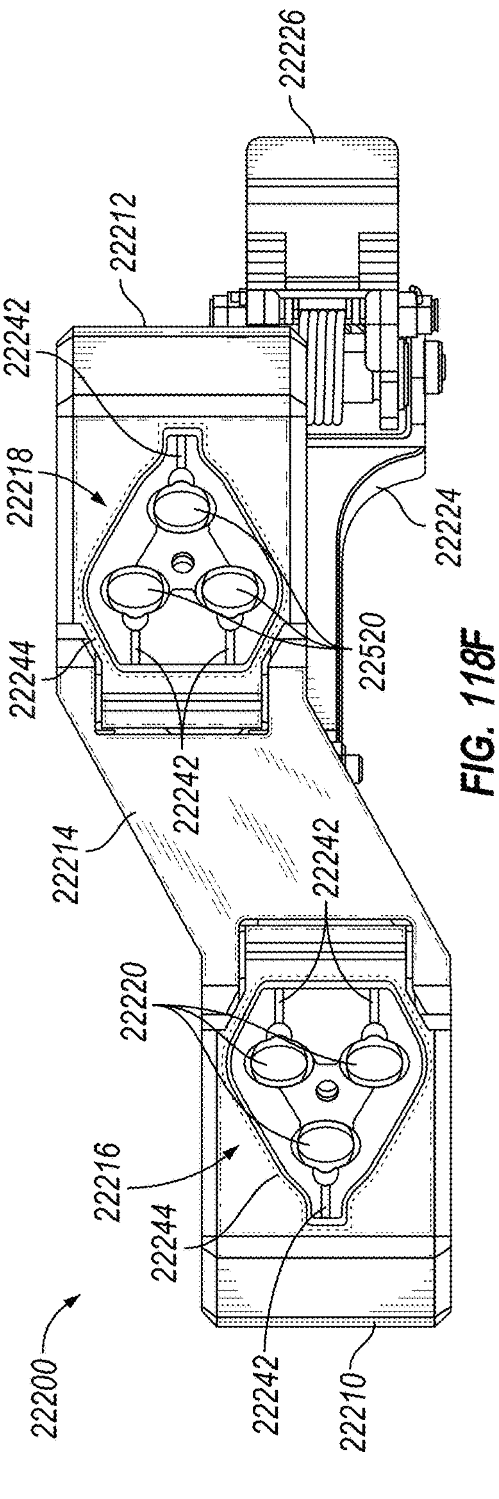

Referring briefly to FIG. 118F, the lower housing portions 22414 of the first 22210 and second 22212 portions are shown without a film 22524 (FIG. 121). As can be seen in FIG. 118F, in embodiments, the lower housing portion 22414 may have channels 22242 extending from the openings 22520 to provide for couplant to flow out of the couplant chamber 22416 (FIG. 120) when the film 22524 is in place. In embodiments, the couplant may flow around the sides of the film so as to keep a micro-layer of fluid between the film 22524 (FIG. 121) and the inspection surface 22522 (FIG. 121) (e.g., to lubricate and/or support acoustic coupling). In embodiments, the film 22524 may be secured to the first 22210 and/or the second 22212 portions along a perimeter of the lower housing portion 22414 as represented by the dashed lines 22244. As further shown in FIG. 118F, embodiments of the opening 22520 may be circular in shape which, in turn, may reduce the amount of couplant required for an inspection run by about 40%. In embodiments, the channels 22242 may have a circular shape which, in turn, may reduce the amount of couplant required for an inspection run by about 40%.

As further shown in FIG. 121, in embodiments, the film 22524 assists in regulating and/or restricting (e.g., impede, slow), the flow of couplant out of the chamber 22416 to reduce the amount of couplant used during an inspection run as compared to equivalent embodiments of the sled assembly 22200 that do not include the film 22524. For example, the film 22524 may smooth out and/or buffer the effect of inconsistencies in the inspection surface 22522, e.g., the film 22524 may act as a sort of shock absorber for the water column along the delay line 22523 so as to mitigate the effect of noise on the sensor 22222 due to the inconsistencies. Embodiments of the film 22524 may assist in regulating and/or restrict the flow of the couplant due to the increased couplant column corresponding to the size of the delay line 22523. Reducing the amount of couplant may improve the overall efficiency of the inspection robot 100 and make the robot 100 particularly suitable for inspecting surfaces in environments where couplant is not abundant and/or is expensive. A non-limiting use case includes using water as a couplant to inspect a surface of an oil refinery located in an arid location. Another non-limiting use case includes using deionized water, which can be expensive to produce and/or transport to an inspection location, as a couplant. Embodiments of the film 22524 may also conform to the shape of the inspection surface and/or otherwise mitigate the effects of surface inconsistencies of the inspection surface on the sensors during an inspection run. For example, conformance of the film 22524 may provide for improved coupling of the sensor 22222 to the inspection surface 22522.

As will be understood, in certain embodiments, the film 22524 may be structured to: have acoustic properties, e.g., density and/or speed of sound, similar to the couplant intended for use in an inspection (to mitigate the effect of sound transmission/reflections from the sensor 22222); sufficient durability for us to conduct one or more inspections; and/or have acceptable sound loss due to attenuation. Shown in FIGS. 122 and 123 is a chart 22600 (FIG. 122) depicting reflected sound wave peaks 22612, 22614, 22616, and 22618 received by an example sensor 22712 (FIG. 123) (representative of the sensors 22220 and 22222 (FIG. 118A) inspecting a channel 22714 of a surface 22716, wherein the channel 22714 is covered by a film 22718. The dashed lines in FIG. 123 represent paths traveled by sound (transmitted and received by the sensor 22712) corresponding to the reflected sound wave peaks 22612, 22614, 22616, and 22618 and have been labeled as such. Accordingly, peak 22612 corresponds to sound (from the sensor 22712) reflected from the film 22718, where the higher the amplitude of the peak the more the sound is reflected by the film 22718, e.g., the smaller this peak, the more easily the sound waves pass through it and the less the negative impact the film 22718 has on the sensitivity and/or resolution of the sensor 22712. As such, embodiments of the film 22718 may seek to reduce peak 22612. Peak 22614 corresponds to sound reflected by the leading wall 22720 of the channel 22714, where the higher the amplitude of this peak the more the sound reached the surface 22716. As such, embodiments of the film 22718 may seek to optimize peak 22614. Peaks 22616 correspond to sound reflected by the backwall 22722 of the surface 22716. As such, embodiments of the film 22718 may seek to optimize peaks 22616. Peak 22618, which may partially intersect with peaks 22616, corresponds to sound reflected by the couplant in the space 22724 between the leading wall 22720 and the film 22718.

As stated herein, embodiments of the present disclosure may structure the film 22718 to minimize peak 22612 to make filtering of the peak 22612 less impactful on the peaks of interest, e.g., 22614, 22616, and/or 22618. Non-limiting examples of filters suitable for filtering out peak 22612 include notch filters, location-based filters, gate-based filters, and the like. Embodiments of the present disclosure may also structure the film 22718 so that peak 22612 aligns with peak 22614.

Figure 124:
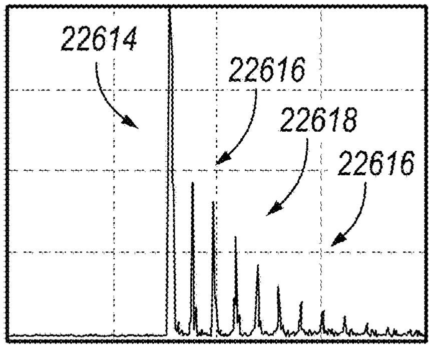
Figure 125:
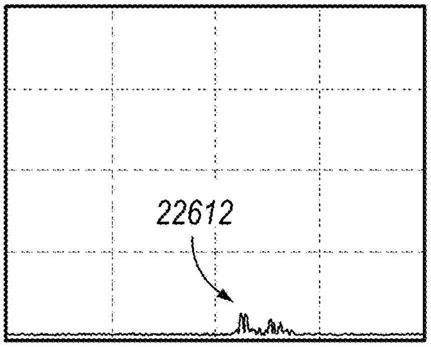
Figure 126:
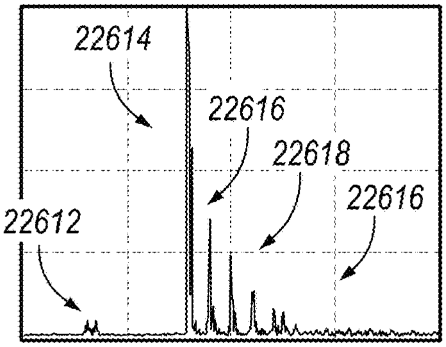
Figure 127:
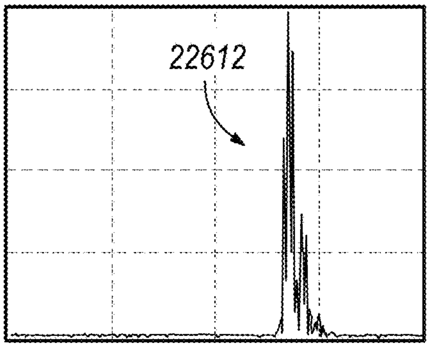
Figure 128:
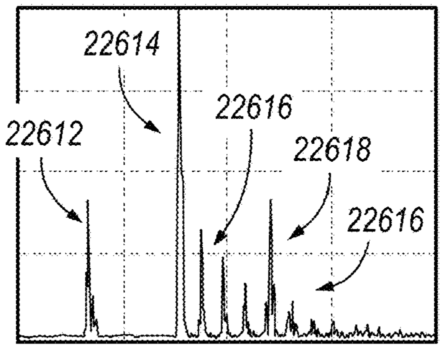
Figure 129:
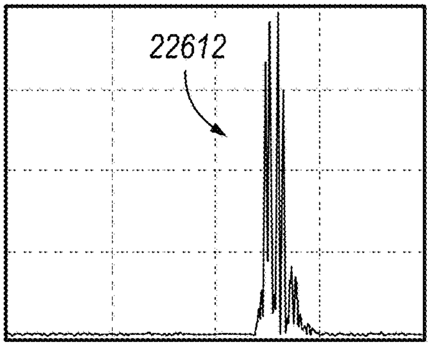
Figure 130:
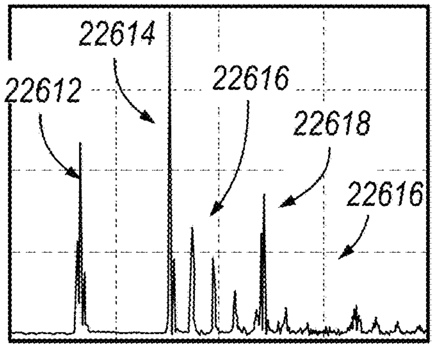
Figure 131:
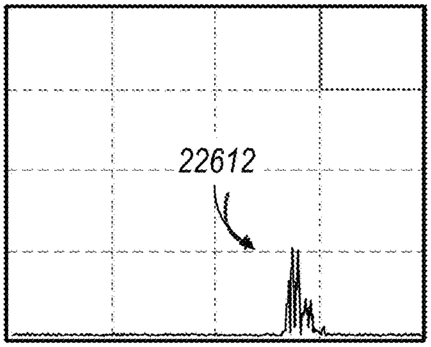
Figure 132:
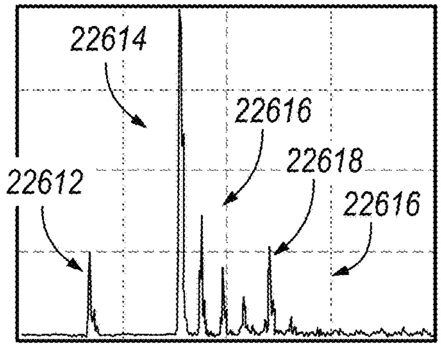
Figure 133:
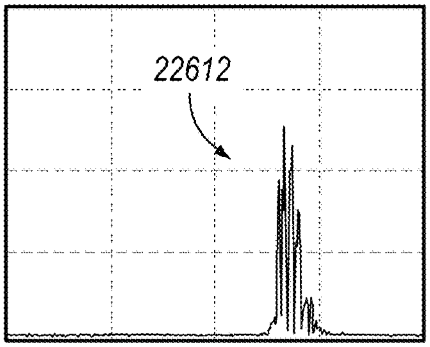
Figure 134:
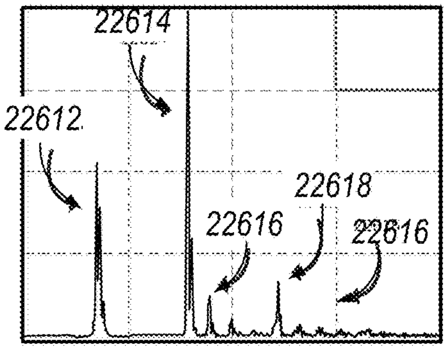
Figure 135:
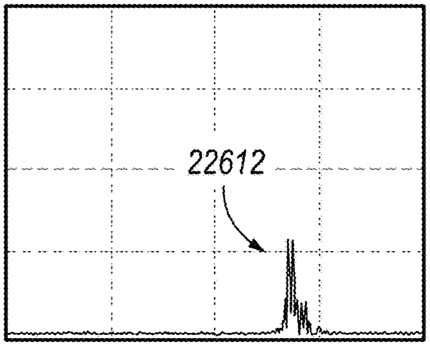
Figure 136:
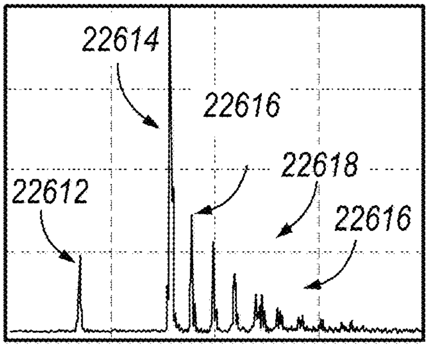
Figure 137:
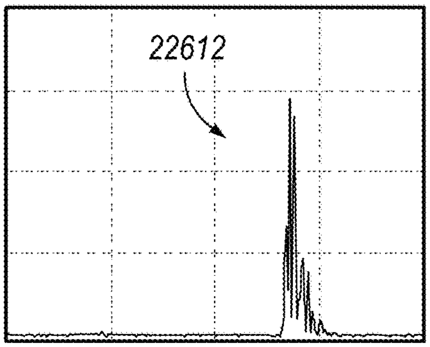
Figure 138:
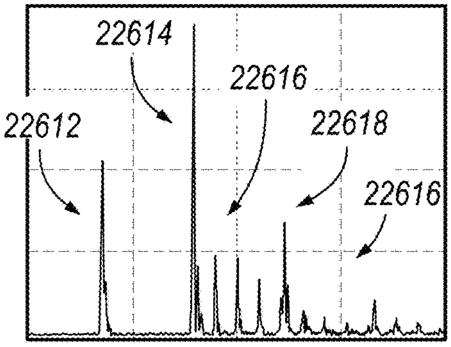
Figure 139:
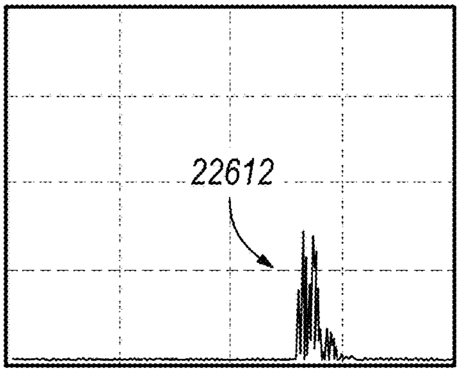
Figure 140:
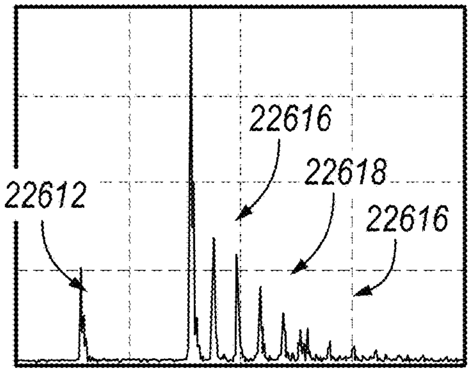
Figure 141:
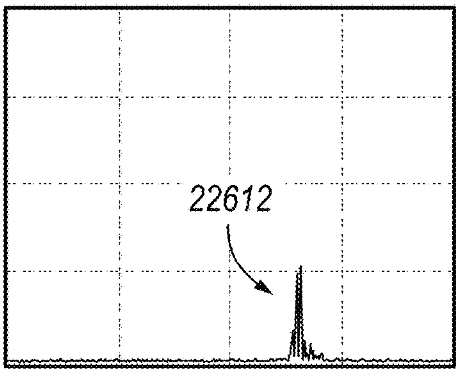
Figure 142:
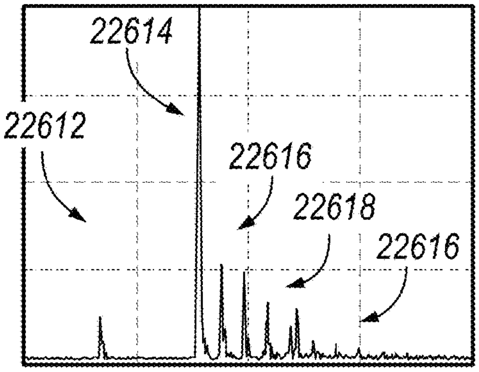
Figure 143:
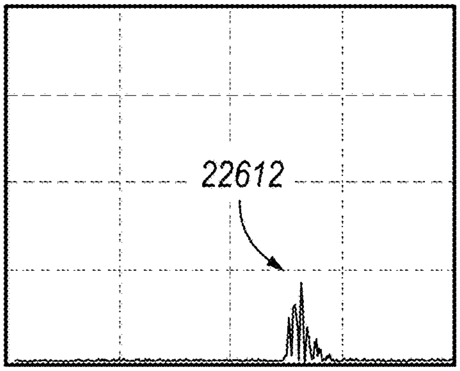
Figure 144:
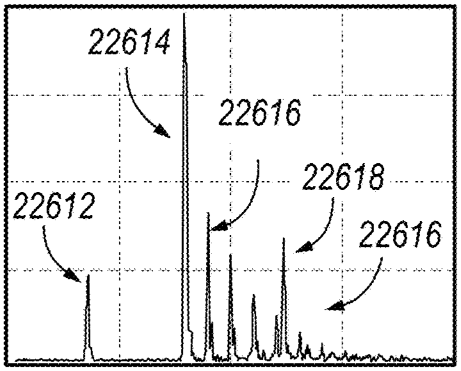

FIG. 124 is a chart depicting sound waves transmitted and received by the sensor 22712 reflected from the surface 22716 in the absence of the film 22718. FIG. 125 depicts peak 22612 isolated from the full scan results shown in FIG. 126 where the film 22718 is 0.020" of Aqualene™ FIG. 127 depicts peak 22612 isolated from the full scan results shown in FIG. 128 where the film 22718 is 0.020" of PEEK. FIG. 129 depicts peak 22612 isolated from the full scan results shown in FIG. 130 where the film 22718 is 0.010" of PEEK. FIG. 131 depicts peak 22612 isolated from the full scan results shown in FIG. 132 where the film 22718 is 0.005" of UHMW. FIG. 133 depicts peak 22612 isolated from the full scan results shown in FIG. 134 where the film 22718 is 0.005" of PTFE. FIG. 135 depicts peak 22612 isolated from the full scan results shown in FIG. 136 where the film 22718 is 0.0025" of tin. FIG. 137 depicts peak 22612 isolated from the full scan results shown in FIG. 138 where the film 22718 is 0.004" of tin. FIG. 139 depicts peak 22612 isolated from the full scan results shown in FIG. 140 where the film 22718 is 0.002" of Nylon. FIG. 141 depicts peak 22612 isolated from the full scan results shown in FIG. 142 where the film 22718 is 0.003" of ABS. FIG. 143 depicts peak 22612 isolated from the full scan results shown in FIG. 144 where the film 22718 is 0.004" of LDPE. Tables 1, 2, and 3 below respectively provide a summary, detailed results, and conclusions of the performance of the various films (and lack of film) depicted in FIGS. 124-144.

TABLE 1

(Summary of Films)

| Film Material | Film Peak 22612 Height | Backwall Peak 22616 Height |
|---|---|---|
| No Film | N/A | 47% |
| 0.004" LDPE | 25% | 42% |
| 0.005" UHMW | 26% | 38% |
| 0.020" Aqualene ™ | 6% | 37.5% |
| 0.0025" Tin | 25% | 36% |
| 0.002" Nylon | 22% | 36% |
| 0.010" PEEK | 60% | 35% |
| 0.002" PEEK | 41% | 33% |
| 0.003" ABS | 12.5% | 31% |
| 0.004" Tin | 54% | 25% |
| 0.005" PTFE | 54% | 12.5% |

TABLE 2

(Detailed Results)

| Material | Film Thickness | Acoustic Impedance @5 Mhz (MPa * s/m) | Acoustic Attenuation @5 MHz (dB/m) |
|---|---|---|---|
| Water | N/A | 1.48 | |
| Aqualene ™ | 0.020" | 1.49 | 264-483 |
| PEEK | 0.002" | 3.24 | 456.8 |
| UHMW | 0.010" | 2.33 | 800.0 |
| PTFE | 0.005" | 3.08 | 390.0 |
| Tin | 0.0025" | 1.9 | |
| Tin | 0.004" | 1.9 | |
| Nylon Clear | 0.002 | 2.9 | 290.0 |
| ABS Clear | 0.003 | 3.26 | 640.0 |
| LDPE Clear | 0.004 | 1.79 | 240.0 |

TABLE 3

(Conclusions)

| Film Material | Film Peak Height | Backwall Peak Height | Acoustic Impedance @5 Mhz (MPa * s/m) |
|---|---|---|---|
| No Film | N/A | 47% | |
| 0.004" LDPE | 25% | 42% | 1.79 |
| 0.005" UHMW | 26% | 38% | 2.33 |
| 0.020" Aqualene ™ | 6% | 37.5% | 1.49 |
| 0.0025" Tin | 25% | 36% | 2.36 |
| 0.002" Nylon | 22% | 36% | 2.9 |
| 0.010" PEEK | 60% | 35% | 3.24 |
| 0.002" PEEK | 41% | 33% | 3.24 |
| 0.003" ABS | 12.5% | 31% | 3.26 |
| 0.004" Tin | 54% | 25% | 2.36 |
| 0.005" PTFE | 54% | 12.5% | 3.08 |

As gathered from the data, impedance may have a strong effect on the amount of sound that reaches a target inspection surface and is received by a sensor, which manifest in the data in Table 1 as the films with the higher backwall peaks 22616 also generally have acoustic impedances closes to that of the couplant, e.g., water. Thus, embodiments of the film 22718 may be formed of material(s) and thicknesses 22525 that exhibit an acoustic impedance that is the same and/or substantially close to that of the couplant, e.g., water. Attenuation may have a negligible effect on the backwall peaks 22616 when compared to the results shown in table 1, which may be due to the thickness of the films 22718 listed in table 1 since attenuation often causes sound power loss that is directly proportional to the thickness of the material the sound is traveling though. Accordingly, 0.005" PTFE and 0.004" SN may, for certain scenarios, make for non-ideal films; while 0.004" LDPE, 0.005" UHMW, and 0.020" Aqualene™ may, for certain scenarios, make for ideal films.

Embodiments of the sled assembly 22200 (FIGS. 118A-118H) may be configured for use without a film 22524 such that the sensor 22222 may be used as a contact probe.

FIG. 145 illustrates an embodiment of a payload 2 where two or more sled assemblies 24910, 24912, 24914, and 24916 (of the embodiment depicted in FIG. 118A) are disposed on the payload 2 so as to provide a staggered sensor arrangement. As will be understood, the ellipse shown between sled assemblies 24914 and 24916 represents that additional sled assemblies 22200 may be included on the payload 2. As shown in FIG. 145, the third portions 22214 of the two or more sled assemblies 24910, 24912, 24914, and 24916 may have a shape that provides for the sensors 22220 in the housings 22216 of the first portions 22210 to be offset from the sensors 22222 in the housings 22218 of the second portions 22212 with respect to an inspection direction (indicated by arrow 24918) along an inspection surface 24920. The offset, in turn, generates inter-sled 24922 spacing between the scanning paths 24924 and 24926 of the sensors 22220 and 22222 of adjacent sled assemblies 24910 and 24912. Scanning paths may also be referred to herein as inspection paths. The offset may also provide for intra-sled spacing 24928 between the scanning paths 24930 and 24932 of sensors 22220 in the housing 22216 in the first portion 22210 and the sensors 22222 in the housing 22218 of the second portion 22218. Further, the sensors, e.g., 22220, in a housing, e.g., 22216, may be arranged so as to provide intra-housing spacing 24934 between the scanning paths 24932, 24936, and 24938 of sensors within the same housing, e.g., 22216 and 22218. In embodiments, the third portions 22214 may have an angled shape with an offset angle θ selected to provide an inter-sled spacing 24922 and intra-sled spacing 24928 to provide selected inspection lanes for each sensor, for each sled, and/or for the inspection assembly as a whole. In certain embodiments, spacing of sensors between sleds (inter-sled spacing) may be configured to match the spacing of sensors within sleds (intra-sled spacing), for example to provide a same resolution of sensing across the entire assembly. In certain embodiments, inter-sled spacing may vary from intra-sled spacing, where inspection resolution across the inspection assembly is nevertheless acceptable. In certain embodiments, intra-sled sensor spacing may be varied, where inspection resolution across the inspection assembly is nevertheless acceptable. In certain embodiments, variation of spacing in some regions of the inspection resolution across the inspection assembly may be desirable (e.g., near a seam, weld, or other region of interest for example a region where damage or wear is expected and/or more important to detect, and higher inspection resolution may be desirable) Offsetting the scanning paths via a staggered arrangement, as disclosed herein, reduces and/or mitigates interference between sensors which may be caused by soundwaves emitted by a leading sensor (with respect to the inspection direction indicated by arrow 24918) being received by a trailing sensor (with respect to the inspection direction 24918). As will be appreciated, embodiments of the current disclosure that provide for staggered sensor spacing, as disclosed herein, may provide for improved sensor density within an active scanning zone (represented by dashed line 24942) as compared to other non-staggered sensor arrangements. While the embodiments of the sled assemblies 24910, 24912, 24914, and 24916 are depicted herein with angled shapes, it is to be understood that embodiments of the sled assemblies may use other shapes, e.g., curved, to achieve the desired offset. In embodiments, the spacing between sensors, e.g., 22220 and/or 22222 may be about 0.3".

Further, while FIG. 145 depicts substantially uniform spacing between each sled assembly 24910, 24912, 24914, and 24916, it is to be understood that the spacing between one or more of the sled assemblies 24910, 24912, 24914, and 24916 may be substantially non-uniform. In embodiments, the sled assemblies 24910, 24912, 24914, and 24916 may form one or more groups where the spacing between the sled assemblies in a group is closer than the spacing between groups. In embodiments, the groups may be spaced uniformly from each other. In embodiments, the groups of sled assemblies may be uniformly spaced from each other while the sled assemblies within a group may be spaced non-uniformly. In embodiments, the groups of sled assemblies may be spaced non-uniformly from each other while the sled assemblies within a group may be spaced uniformly from each other.

Embodiments of the current disclosure may provide for multi-depth scanning of an inspection surface by varying the type of sensors within a sled assembly and/or across sled assemblies. For example, a first sled assembly 24910 could have housings and sensors optimized for a first depth of an inspection surface and a second sled assembly 24912 could have housings and sensors optimized to inspect a second depth of the inspection surface. In embodiments, the housing 22216 in the first portion 22210 of a sled assembly 24910 could have sensors 22220 optimized to inspect a first depth and the housing 22218 of the second portion 22212 of the sled assembly 24910 could have sensors 22222 optimized to inspect a second depth of the inspection surface. In embodiments, a single housing may contain two or more sensors each optimized to inspect a different depth of an inspection surface. In embodiments, an inspection run by the robot 100 may be paused and/or broken up into different portions so that sled assemblies with different sensors optimized for different depths may be swapped out prior to completing the inspection run.

Referring again to FIGS. 118A-G, an example embodiment of a sled assembly 22200 for an inspection robot may include a first portion 22210 and a second offset portion 22212. In an example, the sled assembly 22200 may be referred to as a sensor sled assembly. The sled assembly 22200 may be for an inspection robot 100 or other inspection robot such as described herein. For example, with reference to FIG. 145, the sled assembly 22200 may couple to a sled mount 22226 of an inspection robot 100 and may be a part of or separate from a payload 2, as described herein.

The first portion 22210 of the sensor sled assembly 22200 may include one or more first sensor mounts 22217 (see FIGS. 118G and 146) at one or more first horizontal positions 1HP (e.g., as measured at their center points). The one or more first sensor mounts 22217 may be structured to respectively accommodate one or more first inspection sensors 22220 to interrogate an inspection surface. In some embodiments, the one or more first sensor mounts 22217 may be included in a first sensor housing 22216. For example, the one or more first sensor mounts 22217 may include one or more openings in the first sensor housing 22216 structured to (e.g., sized to) accommodate the one or more first inspection sensors 22220.

The sensor sled assembly 22200 may include a second offset portion 22212, which may be offset from the first portion and referred to herein as a second offset portion 22212, and which may have one or more second sensor mounts 22219 at one or more second horizontal positions 2HP (e.g., also as measured at their center points). The one or more second sensor mounts 22219 may be structured to respectively accommodate one or more second inspection sensors 22222 to interrogate the inspection surface. The one or more first horizontal positions 1HP and the one or more second horizonal positions 2HP may be horizontally displaced from each other (e.g., relative to their centers) by a selected horizontal distance SHD. In some examples, the selected horizontal distance SHD may be attributed to a physical footprint of the sensor sled assemblies, an offset angle or other structural feature of a third portion as discussed herein, location of the sensor housings, and/or location of the sensor mounts, as described herein.

In some embodiments, the first portion 22210 may include one first sensor mount 22217. In some embodiments, the first portion 22210 may include a plurality of first sensor mounts 22217 (which may also be referred to as a first plurality of sensor mounts 22217), and the plurality of first sensor mounts 22217 may include a first horizontal distribution profile 1DP providing a horizontal displacement 1HD between adjacent ones of the plurality of first sensor mounts 22217 (e.g., a pitch between sensor mounts 22217, such as measured at a center of each sensor mount 22217) that is not greater than a selected inspection resolution. The first horizontal distribution profile 1DP may provide for equal spacing between each adjacent one of the first plurality of sensor mounts 22217. For example, the horizontal displacement 1HD between each adjacent one of the plurality of first sensor mounts 22217 may be equal.

In some embodiments, the second offset portion 22212 may include one second sensor mount 22219. In some embodiments, the second offset portion 22212 may include a plurality of second sensor mounts 22219 (which may also be referred to as a second plurality of sensor mounts 22219), and the plurality of second sensor mounts 22219 may include a second horizontal distribution profile 2DP that may provide a horizontal displacement 2HD between adjacent ones of the plurality of second sensor mounts 22219 that is not greater than the selected inspection resolution. The second horizontal distribution profile 2DP may provide for equal spacing between each adjacent one of the second plurality of sensor mounts. For example, the horizontal displacement 2HD between each adjacent one of the plurality of second sensor mounts 22219 may be equal.

In some embodiments, the first sensor mounts 22217 may be structured such that first sensors 22220 may be secured in the first sensor mounts 22217 by one or more fasteners, e.g., screws 22518 in the upper housing portion 22412 of the sensor housing, and the second sensor mounts 22219 may be structured such that second sensors 22222 may be secured in the second sensor mounts 22219 by one or more fasteners, e.g., screws 22518 in the upper housing portion 22412 of the senor housing, as described herein.

In some embodiments, the selected horizontal distance SHD, the first horizontal distribution profile 1DP, and the second horizontal distribution profile 2DP may be selected such that a distance between a last one of the first plurality of sensor mounts 22217 and a first one of the second plurality of sensor mounts 22219 is not greater than the selected inspection resolution.

In some embodiments, the selected horizontal distance SHD, the first horizontal distribution profile 1DP, and the second horizontal distribution profile 2DP may be selected to provide equal spacing between each adjacent one of the first plurality of sensor mounts 22217 and each adjacent one of the second plurality of sensor mounts 22219. Furthermore, the horizontal distance SHD, the first horizontal distribution profile 1DP, and the second horizontal distribution profile 2DP may be selected to provide the same equal spacing between the last one of the first plurality of sensor mounts 22217 and the first one of the second plurality of sensor mounts 22219. Thus, the sled assembly may provide a consistent inspection resolution as it inspects the inspection surface.

In some embodiments, the first portion 22210 of sled assembly 22200 may include a UT sensor housing that includes the one or more first sensor mounts 22217 and comprises an opening 22520 (see FIG. 121) for couplant to flow through. For example, the first sensor housing 22216 may be or include the UT sensor housing. Furthermore, the first portion 22210 may include a film 22524 disposed over the opening 22520 and structured to regulate the flow of the couplant through the opening 22520.

In some embodiments, the film 22524 may be structured to regulate the flow of the couplant through the opening 22520 such that a flow rate of the couplant through the opening 22520 is lower than if the film 22524 were not present (e.g., if the opening 22520 were wholly unobstructed). In an example, the film 22524 may provide a flow rate that is equivalent to a flow rate when at or more than 90% of the opening 22520 flow area is blocked. As another example, the film 22524 may provide a flow rate that is equivalent to a flow rate when at or more than 99% of the opening 22520 flow area is blocked. As another example, the film 22524 may provide a flow rate that is sufficient to keep a delay line 22523 full within a pumping limit of a supply pump, accounting for a pressure head on the inspection surface and back pressure on the pump. In addition to providing fluid loss control, the film 22524 may help keep the delay line 22523 full and manage velocity profiles as well as the formation of bubbles. The selection of the film thickness, fluid loss configuration, and consequent flow rate to support these may be based on one or more considerations such as wear factors according to the film material type, expected surface conditions (e.g., roughness, hardness, uniformity, etc.), UT signal quality, reduction in flow rate desired (e.g., down force on sled/payload, sealing, presence and size of fluid loss paths to the surface), and the desired or acceptable replacement frequency for sled contact surfaces. In certain embodiments, the delay line is approximately sealed, with flow rate being controlled to maintain a desired head pressure.

In some embodiments, the first portion 22210 may include a first UT sensor housing that includes the one or more first sensor mounts 22217, where the first UT sensor housing may include a delay line 22523 for the one or more first inspection sensors coupled to the one or more first sensor mounts. In an example, the delay line 22523 may be between 5 mm to 50 mm inclusive. In an example, the delay line 22523 may be about 31.75 mm—for example, 31.75 mm+/−5%.

In some embodiments, the first portion 22210 may include a first UT sensor housing that includes the one or more first sensor mounts 22217, where the first UT sensor housing may include a delay line 22523 for a UT sensor coupled to one of the one or more first sensor mounts 22217. In an example, the delay line 22523 may be between 0.20" to 1.97" inclusive. In some embodiments, the delay line 22523 may be about 1.25"—for example, 1.25"+/−5%.

In some embodiments, the first UT sensor housing may include a delay line 22523 for a UT sensor coupled to one of the one or more first sensor mounts 22217 to provide for two backwall echoes from the inspection surface. For example, the delay line 22523 may be sufficient to support the two backwall echoes, as may be exercised by a controller described herein.

With reference to FIGS. 118A-121 and 145-146, in some embodiments, the sled assembly 22200 may include a third portion 22214 connecting the first portion 22210 to the second portion 22212. The third portion 22214 may have a shape structured to provide the selected horizontal distance SHD. For example, the third portion 22214 may include a shape with an offset angle θ (see FIG. 146) that is diagonal to a direction of inspection such that the first portion 22210 is offset (e.g., horizontally) from the second portion 22212 by the selected horizontal distance SHD, and thus, the first sensor group 25012 may be offset from the second sensor group 25014 by the selected horizontal distance SHD. In an example, this offset may be determined based on the offset angle θ and/or a physical footprint of the sled assembly 22200.

Figure 118G:
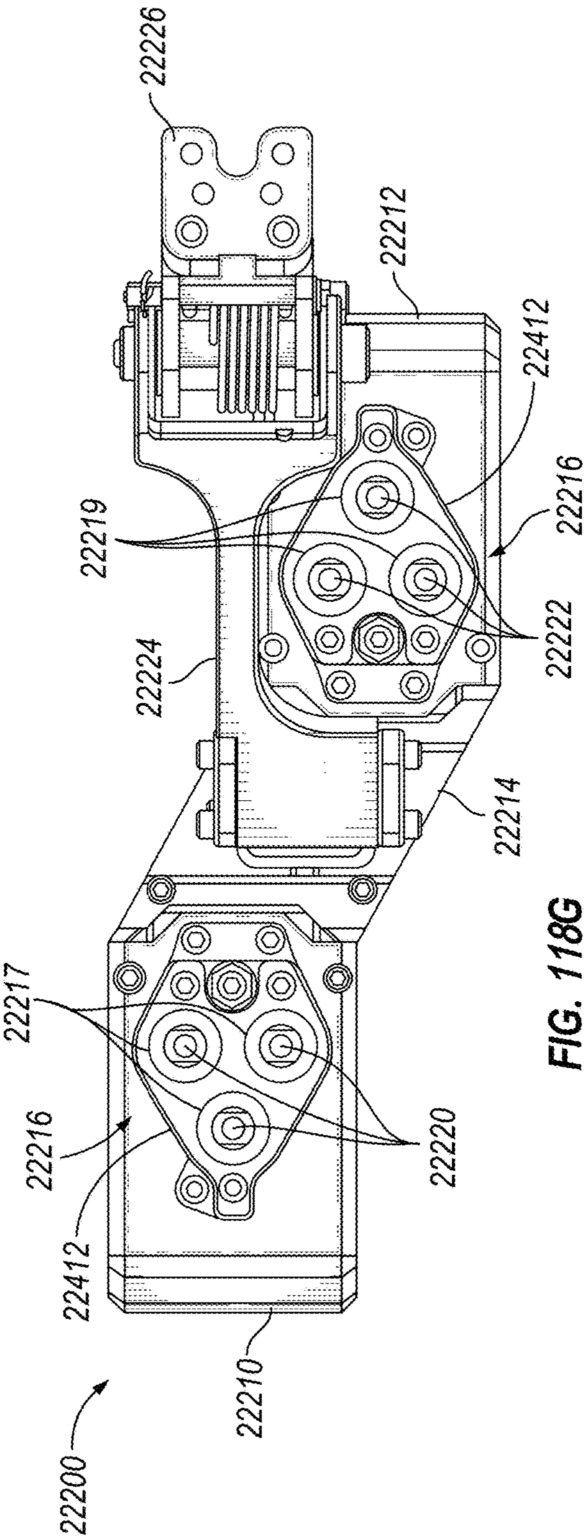
Figure 118H:
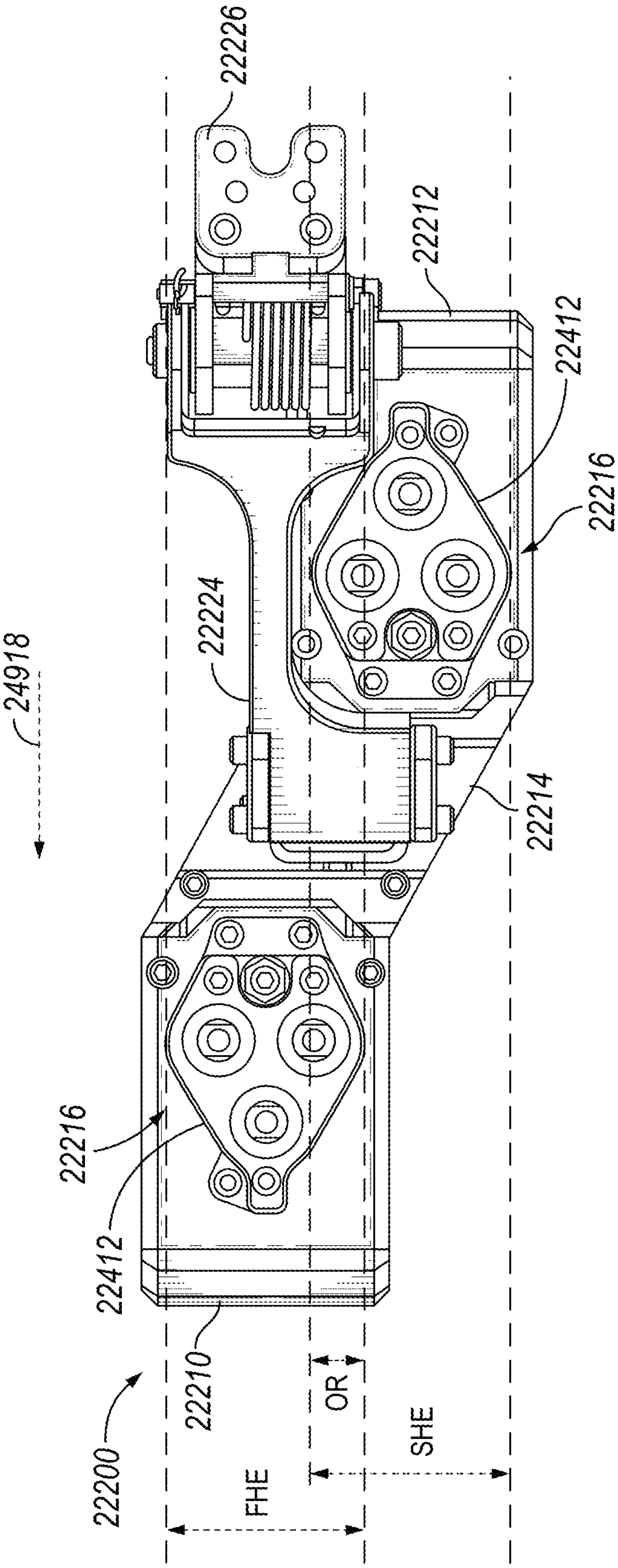

The sled assembly 22200 may include a first sensor housing 22216 that may include a first sensor mount 22217 and a second sensor housing 22218 that may include a second sensor mount 22219. With reference to FIG. 118H, the first sensor housing 22216 may define a first horizontal extent FHE, and the second sensor housing 22218 may define a second horizontal extent SHE. For example, the first horizontal extent FHE may be defined by a horizontal width (e.g., a maximum horizontal width) of the first sensor housing 22216, and the second horizontal extend SHE may be defined by a horizontal width (e.g., a maximum horizontal width) of the second sensor housing 22218. The first horizonal extent FHE and the second horizontal extent SHE may include an overlap region OR.

Referring to FIGS. 118A-H and FIG. 146, a payload 2 for an inspection robot according to an example embodiment may include a first sled assembly 25010 including a first sensor mount group 25012 and a second sensor mount group 25014, and a second sled assembly 25020 including a third sensor mount group 25022 and a fourth sensor mount group 25024. The first sensor mount group 25012 and third sensor mount group 25022 (which may be termed “forward” sensor mount groups) may be forward of the second sensor mount group 25014 and the fourth sensor mount group 25024

(which may be termed "rearward" sensor mount groups). Each of the first sled assembly 25010 and the second sled assembly 25020 may be a sled assembly 22200 as described herein. The first sled assembly 25010 may include a third portion 22214 having a shape or other structural feature structured to provide an offset of an inspection path of the first sensor mount group 25012 with respect to an inspection path of the second sensor mount group 25014, and the second sled assembly 25020 may include a portion having a shape or other structural feature structured to provide an offset of an inspection path of the third sensor mount group 25022 with respect to an inspection path of the fourth sensor mount group 25024.

The first sensor mount group 25012 and the second sensor mount group 25014 of the first sled assembly 25010 may respectively include at least two sensor mounts 22217 and 22219, and the third sensor mount group and the fourth sensor mount group of the second sled assembly 25020 may respectively include at least two sensor mounts 22217 and 22219. While the example embodiment is described with reference to first and second sled assemblies 25010 and 25020, embodiments are not limited to two sled assemblies, and may include any number of sled assemblies 22200 with features corresponding to the features of the described sled assemblies 25010 and 25020.

With reference to FIG. 147, the first sensor mount group 25012 may be positioned at a first characteristic horizontal position 1CHP and a first characteristic vertical position 1CVP, and the second sensor mount group 25014 may be positioned at a second characteristic horizontal position 2CHP and a second characteristic vertical position 2CVP. Likewise, the third sensor mount group 25022 may be positioned at a third characteristic horizontal position 3CHP and a third characteristic vertical position 3CVP, and the fourth sensor mount group 25024 may be positioned at a fourth characteristic horizontal position 4CHP and a fourth characteristic horizontal position 4CVP.

The first, second, third, and fourth characteristic vertical and horizontal positions of the first, second, third, and fourth sensor mount groups 25012, 25014, 25022, 25024 may each be based on a characteristic that may be consistent between some or all of the sensor mount groups—for example, a center of mass (e.g. geometric center or "mean" position) of the sensor mounts in each sensor mount group, a most forward of the sensor mounts in each sensor mount group, a most rearward of the sensor mounts in each sensor mount group, a median position of the sensor mounts in each sensor mount group, etc. For example, as described herein, the size of the housings and/or weight of the sensors may shift the center of gravity as compared to embodiments having smaller housings and/or sensors, such that the sled assembly 22200 may be prone to tipping, and the biasing of the first 22210 and/or the second 22212 portions about a center of mass may mitigate the instability.

In an example where the characteristic is based on a most forward (e.g., vertically forward) sensor and/or sensor mount for each of the sensor mount groups, all or some of the first, second, third, and fourth sensor mount groups 25012, 25014, 25022, 25024 may be positioned based on the respective most forward positions of their sensors and/or sensor mounts. For example, the characteristic vertical and horizontal positions of each sensor mount group may be based on a position of each sensor mount group's most forward sensor. Thus, when the characteristic vertical positions of the first and third sensor mount groups are aligned, and the characteristic vertical positions of the second and fourth sensor mount groups are aligned, the starting location of inspection data obtained from the inspection surface may be aligned between the first and third sensor mount groups, and between the second and fourth sensor mount groups, and a controller as described herein may use that knowledge as well as knowledge of the spacings between the sensors to appropriately correlate the inspection data received from each sensor mount group.

In another example, the characteristic vertical and horizontal positions of each sensor mount group may be based on a center of mass (e.g., geometric) of the sensors and/or sensor mounts for each of the sensor mount groups. Thus, for example, regardless of whether the sensor mount groups include different sensors with different sizes (for example, UT sensors for the first and third sensor mount groups 25012 and 25022, and EMI sensors for the second and fourth sensor mount groups 25014, 25024), a center of mass of each of the sensor mount groups may be selected to mitigate instability of the sled assemblies. For example, the first and third characteristic vertical positions may be aligned such that the center of mass of the first and third sensor mount groups 25012, 25022 vertically coincide, and the second and fourth characteristic vertical positions may be aligned such that the center of mass of the second and fourth sensor mount groups 25014, 25024 vertically coincide. Similarly, the first and third characteristic horizontal positions may be consistent between sled assemblies (e.g., including the first and third sensor mount groups 25012, 25022) such that the center of mass of the forward sensor mount groups (e.g., including 25012 and 25022) may be at consistently placed locations in the horizontal direction, and the second and fourth characteristic horizontal positions may be aligned such that the center of mass of the rearward sensor mount groups (e.g., the second and fourth sensor mount groups 25014, 25024) may be at consistently placed locations in the horizonal direction. Thus, instability of the sled assemblies as well as the payload may be mitigated.

In some embodiments, like as described above, the first characteristic vertical position 1CVP of the first sensor mount group 25012 and the third characteristic vertical position 3CVP of the third sensor mount group 25022 may be the same. Likewise, the second characteristic vertical position 2CVP of the second sensor mount group 25014 and the fourth characteristic vertical position 4CVP of the fourth sensor mount group 25024 may be the same.

In an example where the characteristic includes a same mean position (e.g., a same geometric center of mass) of the sensor mount groups (e.g., of the sensors and/or sensor mounts of each of the sensor mount groups), all or some of the first, second, third, and fourth sensor mount groups 25012, 25014, 25022, 25024 may be aligned with each other based on the respective mean positions of their sensors and/or sensor mounts. For example, as illustrated in FIG. 147, the first characteristic vertical position 1CVP and first characteristic horizontal position 1CHP may correspond respectively to a vertical position and a horizontal position of the mean position for the first sensor mount group 25012, the second characteristic vertical position 2CVP and second characteristic horizontal position 2CHP may correspond respectively to a vertical position and a horizontal position of the mean position for the second sensor mount group 25014, the third characteristic vertical position 3CVP and third characteristic horizontal position 3CHP may correspond respectively to a vertical position and a horizontal position of the mean position for the third sensor mount group 25022, and the fourth characteristic vertical position 4CVP and fourth characteristic horizontal position 4CHP may correspond respectively to a vertical position and a horizontal position of the mean position for the fourth sensor mount group 25024.

Example embodiments may be described with reference to sled assemblies 25010 and 25020 and first through fourth sensor mount groups thereto for convenience of description, but embodiments are not limited thereto and may include any number of sled assemblies (subject to constraints of the system). In example embodiments with more than two sled assemblies, all or some of the sled assemblies may be positioned at respective characteristic horizontal positions and respective characteristic vertical positions based on a characteristic that may be consistent between all or some of the sensor mount groups, as described herein.

In an example embodiment where the sensor mount groups have distinct shapes (e.g., shapes of the sensors and/or sensor mounts) and/or numbers of mounts, the characteristic used for each might vary, but may still be determinative for the characteristic vertical and horizontal positions. For example, in an embodiment where the first sensor mount group 25012 and third sensor mount group 25022 include UT sensors, and the second sensor mount group 25014 and fourth sensor mount group 25024 include sensors that are distinct from UT sensors, the sensor mount groups may nevertheless have horizontal and vertical characteristic positions that are based on a characteristic such as, for example, a most forward or most reward sensor/sensor mount of each sensor mount group or a mean position of the sensors/sensor mounts of each sensor mount group.

Figure 148:
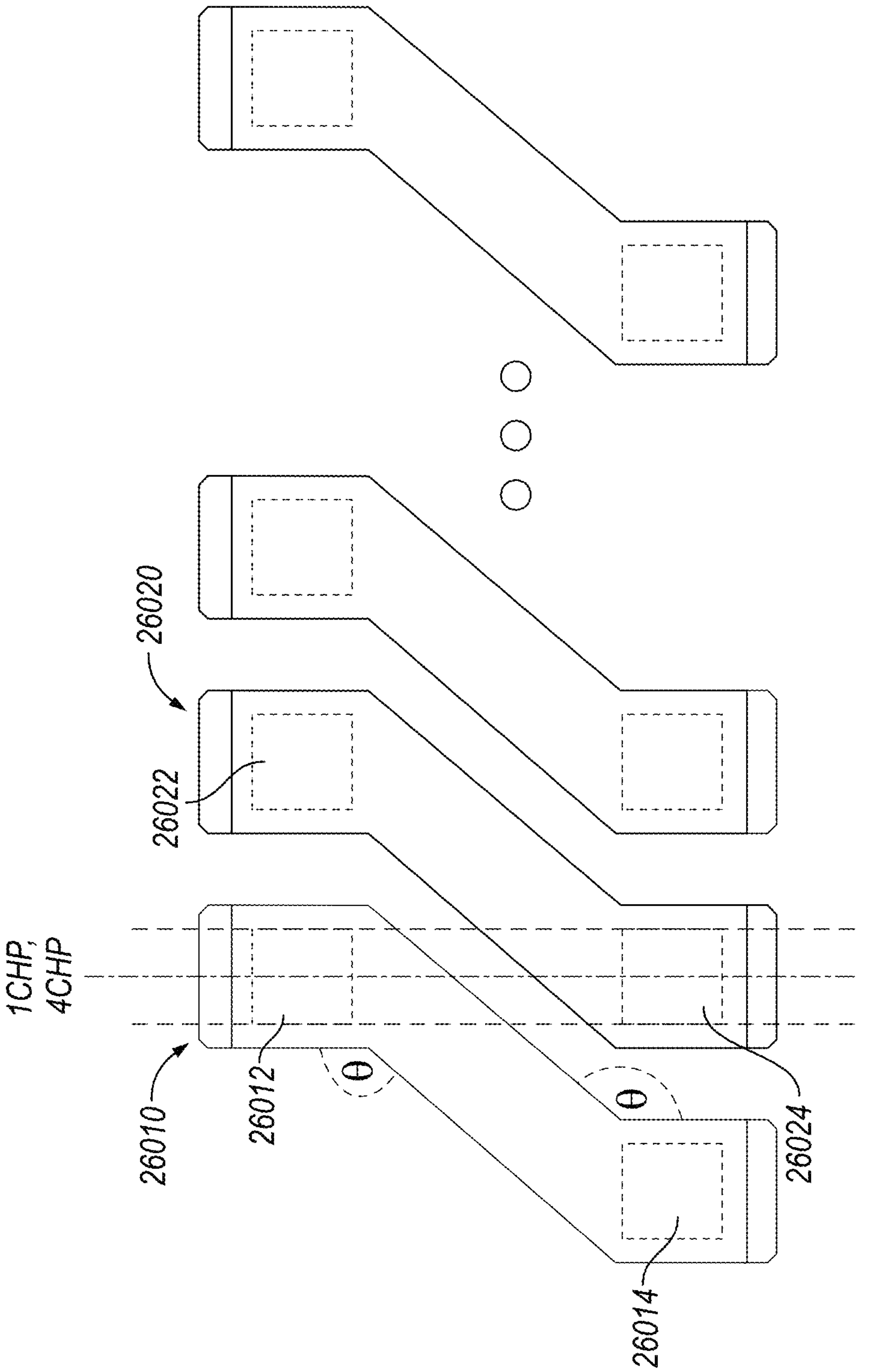

Referring to FIG. 148, in some embodiments, the first characteristic horizontal position 1CHP may be aligned with the fourth characteristic horizonal position 4CHP. Thus, the first sensor mount group 26012 and the fourth sensor mount group 26024 may inspect a same horizontal inspection lane (e.g., a same horizontal extent) as the inspection robot traverses the inspection surface.

Figure 149:
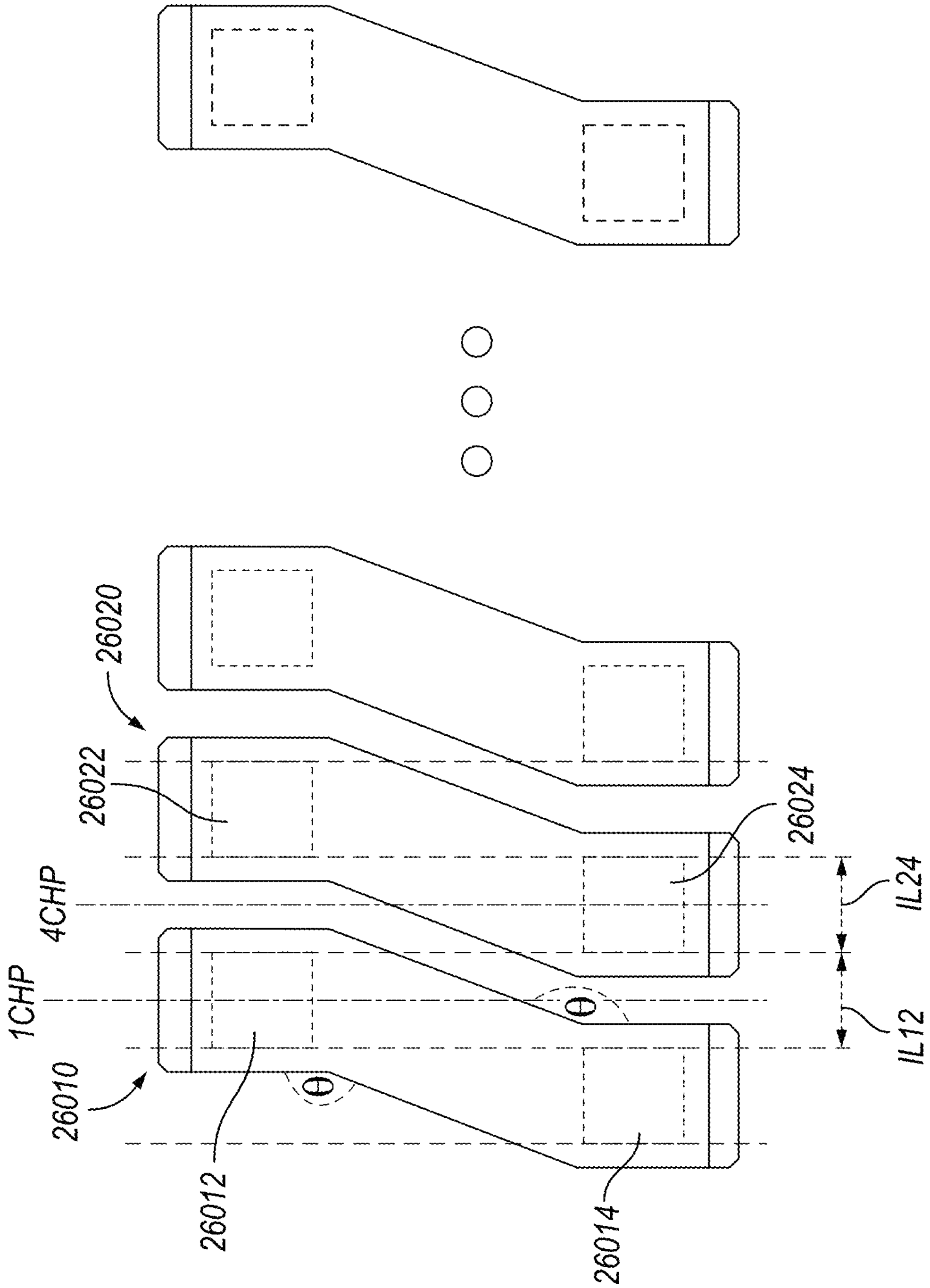

Referring to FIG. 149, in some embodiments, the first characteristic horizontal position 1CHP may not be aligned with the fourth characteristic horizontal position 4CHP. For example, the forward sensor mount group 26012 (e.g., the sensors of the first sensor mount group 26012) may inspect a different lane of the inspection surface than the rearward sensor mount group 26024 of an adjacent sled assembly 26020 (e.g., sensors of the fourth sensor mount group 26024). FIG. 149 illustrates first sensor mount group 26012 inspecting an inspection lane IL12, and fourth sensor mount group 26024 inspecting an inspection lane IL24. The inspection lanes may be inspected by the sensors of the respective sensor mount groups according to the horizontal distribution profiles of the respective sensor mount groups as described herein. In some embodiments, such as illustrated in FIG. 146, the inspection lanes of adjacent sled assemblies (e.g., an inspection lane of sensor mount group 25012 and an inspection lane of the fourth sensor mount group 25024) may be spaced apart from each other, or, as illustrated by example in FIG. 149, they (e.g., their horizontal extents) may be immediately adjacent and contiguous to each other so as to keep a consistent horizontal inspection resolution (intra-sled and inter-sled) across some or all of the sled assemblies of the payload. As discussed elsewhere herein, the extent of an inter-sled spacing—which may correspond to the spacing between inspection lanes (if any) of adjacent sled assemblies—may depend on a desired inspection resolution of the inspection surface, and may be determined by the spacing of the sled assemblies on the payload, an offset angle θ, other structural features of the first, second, or third portions, and/or other factors. For example, for some inspections and to save on cost and/or time, it may be acceptable to have data gaps in the horizontal inspection data corresponding to the spacing apart of sensors relative to other sled assemblies and within the same sled assembly.

In example embodiments such as those described with reference to FIGS. 148 and 149, one or more sensors of the first sensor mount group 26012 may be a distinct type of sensor from one or more sensors of the fourth sensor mount group 26024, such sensor types as may be described herein.

Thus, with example reference to FIG. 148, where the first characteristic horizontal position 1CHP may be aligned with the fourth characteristic horizontal position 4CHP, while the first sensor mount group 26012 and the fourth sensor mount group 26024 may inspect a same horizontal inspection lane, they may do so using different sensors and gather different data thereto. Likewise, consistent with the first and second sled assemblies and first through fourth sensor mount groups described herein, which be exemplary for a payload with more than two sled assemblies, the forward sensor mount groups of other sled assemblies may inspect a same horizontal inspection lane as rearward sensor mount groups of sled assemblies adjacent to those other sled assemblies. In some embodiments, including those where a forward sensor mount group inspects a same horizontal inspection lane as a rearward sensor mount group of an adjacent sled assembly, each mount of the forward (e.g., first) sensor mount group may include an ultrasonic sensor mount, and each mount of the rearward (e.g., fourth) sensor mount group in an adjacent sled assembly may include a distinct sensor mount—for example, any sensor mount other than an ultrasonic sensor mount, such as an EMI sensor mount, in order to obtain different inspection data from that of the first sensor mount group (and in some examples, in response to the inspection data obtained from the first sensor mount group).

However, in some embodiments, each mount of the first sensor mount group may include an ultrasonic sensor mount, and each mount of the fourth sensor mount group may include an ultrasonic sensor mount. A first group of ultrasonic sensors may each be mounted to one of the mounts of the first sensor mount group, and the first group of ultrasonic sensors may be calibrated (e.g., by a controller) with a first calibration set. A fourth group of ultrasonic sensors may each be mounted to one of the mounts of the fourth sensor mount group, and the fourth group of ultrasonic sensors calibrated with a second calibration set.

In some embodiments, a first group of ultrasonic sensors may each be mounted to one of the mounts of the first sensor mount group, and a fourth group of ultrasonic sensors may each be mounted to one of the mounts of the fourth sensor mount group. As discussed above, the first sensor mount group may be aligned with the fourth sensor mount group. For example, it may be desirable to follow an ultrasonic inspection of the inspection surface by the first group of ultrasonic sensors with an ultrasonic inspection of the inspection surface by the fourth group of ultrasonic sensors, such as when the first group of ultrasonic sensors are calibrated with a first calibration set that is different from a second calibration set used to calibrate the fourth group of ultrasonic sensors, when the first group of ultrasonic sensors inspects a different depth/delay line than the fourth group of ultrasonic sensors, when the ultrasonic data from the first group of ultrasonic sensors is processed differently than the ultrasonic data from the fourth group of ultrasonic sensors, or for redundancy in the inspection—e.g., when the inspection surface is challenging, increasing the risk of a failure of any type, and/or shutting down the equipment at the site of inspection is expensive, justifying the cost of redundancy to ensure a successful completion of the inspection.

In some embodiments, a first group of ultrasonic sensors may each be mounted to one of the mounts of the first sensor mount group, and a fourth group of ultrasonic sensors may each be mounted to one of the mounts of the fourth sensor mount group.

FIG. 152 is a flowchart of an example method for inspecting an inspection surface using an inspection robot. For example, with reference to step 25610, the method may include inspecting the inspection surface with a first sled assembly. The first sled assembly may include a first forward sensor mount group and a second rearward sensor mount group, the first forward sensor mount group may be positioned at a first characteristic horizontal position, and the second rearward sensor mount group may be positioned at a second characteristic horizontal position. Furthermore, with reference to step 25620, the method may include inspecting the inspection surface with a second sled assembly. The second sled assembly may include a third forward sensor mount group and a fourth rearward sensor mount group, the third forward sensor mount group may be positioned at a third characteristic horizontal position, and the fourth rearward sensor mount group may be positioned at a fourth characteristic horizontal position.

The example method may further include interpreting a first calibration value for a plurality of sensors of the first forward sensor mount group and a plurality of sensors of the third forward sensor mount group, performing inspection operations based on the first calibration value, and capturing inspection data based on the inspection operations. The plurality of sensors of the first forward sensor group and the plurality of sensors of the third forward sensor group may be a same type of sensor.

The example method may further include interpreting a first processing value for a plurality of sensors of the first forward sensor mount group and a plurality of sensors of the third forward sensor mount group, interpreting a second processing value for a plurality of sensors of the second rearward sensor mount group and a plurality of sensors of the fourth rearward sensor mount group, performing inspection operations based on the first processing value and the second processing value, and capturing inspection data based on the inspection operations. The plurality of sensors of the first forward sensor mount group and the plurality of sensors of the third forward sensor mount group may be a same type of sensor.

The example method may further include interpreting a first calibration value for a plurality of sensors of the first forward sensor mount group and a plurality of sensors of the second rearward sensor mount group, performing inspection operations based on the first calibration value, and capturing inspection data based on the inspection operations. The plurality of sensors of the first forward sensor group and the plurality of sensors of the second rearward sensor group may be a same type of sensor.

The example method may further include interpreting a first processing value for a plurality of sensors of the first forward sensor mount group and a plurality of sensors of the second rearward sensor mount group, performing inspection operations based on the first processing value, and capturing inspection data based on the inspection operations. The plurality of sensors of the first forward sensor mount group and the plurality of sensors of the second rearward sensor mount group may be a same type of sensor.

FIG. 153 is a flowchart of an example method for inspecting an inspection surface using an inspection robot. For example, with reference to step 25710, the method may include operating a first group of ultrasonic sensors with a first calibration set. Furthermore, with reference to step 25720, the method may include operating a second group of ultrasonic sensors with a second calibration set. The first group of ultrasonic sensors may be included in a first sled assembly of a payload for the inspection robot, and the second group of ultrasonic sensors may be included in a second sled assembly of the payload for the inspection robot. The first group of ultrasonic sensors may be at a first characteristic vertical position on the first sled assembly, and the second group of ultrasonic sensors may be at a second characteristic vertical position on the second sled assembly.

In some examples, the first characteristic vertical position may be forward of the second characteristic vertical position relative to an inspection direction of the inspection robot.

In some examples, the first calibration set may include a same calibration as the second calibration set, and the second group of calibration sensors may provide inspection data that is redundant with inspection data provided by the first group of ultrasonic sensors.

In some examples, the first calibration set may be distinct from the second calibration set such that the second group of ultrasonic sensors inspects the inspection surface with a different calibration than the first group of ultrasonic sensors.

With reference to FIGS. 146-151, a system according to an example embodiment may include an inspection robot having a payload 19. The payload 19 may include a first sled assembly 25010 including a first forward sensor mount group 25012 and a second rearward sensor mount group 25014. Each sensor mount group may include at least two sensor mounts. The first forward sensor mount group 25012 may be positioned at a first characteristic horizontal position 1CHP, and the second rearward sensor mount group 25014 may be positioned at a second characteristic horizontal position 2CHP. The payload 19 may include a second sled assembly 25020 including a third forward sensor mount group 25022 and a fourth rearward sensor mount group 25024. The third forward sensor mount group 25022 may be positioned at a third characteristic horizontal position 3CHP, and the fourth rearward sensor mount group may be positioned at a fourth characteristic horizontal position 4CHP. The payload 19 may include a payload mount, such as a payload mount assembly as may be described herein, where the first sled assembly 25010 may be coupled to the payload mount at a first mounting position, and the second sled assembly may be coupled to the payload mount at a second mounting position. The payload mount may be coupled to a body of the inspection robot. However, embodiments are not limited thereto, and in some examples, a mount for the payload may be separate from the payload 19.

With reference to FIG. 148, in some embodiments, the first characteristic horizontal position 1CHP may be aligned with the fourth characteristic horizontal position 4CHP. However, in some embodiments, the first characteristic horizontal position 1CHP and fourth characteristic horizontal position 4CHP may be selected such that a last sensor mount of the first forward sensor mount group 26012 (e.g., the right-most sensor mount of the first forward sensor mount group 26012 in FIG. 148) may be horizontally displaced from a first sensor mount of the fourth rearward sensor mount group 26024 (e.g., the left-most sensor mount of the fourth sensor mount group 26024 in FIG. 148) by not greater than a selected inspection resolution—for example, by the same amount as a selected horizonal distance SHD as described herein.

In some embodiments, the first forward sensor mount group 26012 and third forward sensor mount group 26022 may each comprise mounts for a first sensor type, and the second rearward sensor mount group 26014 and fourth rearward sensor mount group 26024 may each comprise mounts for a second sensor type, as described herein. Furthermore, the first characteristic horizontal position 1CHP may be aligned with the fourth characteristic horizontal position 4CHP, but embodiments are not limited thereto. For example, in some embodiments, the first characteristic horizontal position 1CHP may not be aligned with the fourth characteristic horizontal position 4CHP, but both may be provided to provide a general inspection of the inspection surface without regard to their relative positioning in the forward versus rearward sensor mount groups or "layers" of the sled assemblies in the payload.

In some embodiments, with reference to FIG. 148, each sensor mount of the first forward sensor mount group 26012 may be aligned with a corresponding sensor mount of the fourth rearward sensor mount group 26024. For example, the first characteristic horizontal position 1CHP may be the same as the fourth characteristic horizontal position 4CHP, and the horizontal distribution profile of the sensor mounts of the first forward sensor mount group 26012 may be the same as the horizontal distribution profile of the fourth rearward sensor mount group 26024, such that the sensor mounts of the two sensor mount groups may be aligned.

In some embodiments, the first characteristic horizontal position 1CHP and third characteristic horizontal position 3CHP are selected such that a last sensor mount of the first forward sensor mount group 26012 is horizontally displaced from a first sensor mount of the third forward sensor mount group 26022 by not greater than a selected inspection resolution—for example, by the same as a selected horizonal distance SHD as described herein.

In some embodiments, such as where adjacent sled assemblies 26010 and 26020 have third portions (e.g., third portions 22214 as described herein) each with an angled shape angled in the same direction (e.g., offset angles θ that are both positive or negative, and which may have the same value), as illustrated by example in FIGS. 147 and 148, the system may include a means for inspecting an inspection surface at a selected inspection resolution between a first sensor mount of the second rearward sensor mount group 26014 (e.g., a left-most sensor mount of the second rearward sensor mount group 26014) and a last sensor mount of the third forward sensor mount group 26022 (e.g., a right-most sensor mount of the third forward sensor mount group 26022), inclusive. For example, the means may include a structural configuration of the system, such as a configuration of the sled assemblies to select the characteristic positions and/or sensor mount positions of the sensor mount groups, including intra-sled spacing and inter-sled spacing of the sensor mounts therein.

In some examples, gaps between sensors in a sensor mount group (e.g., intra-sled spacing) may have equal spacing (e.g., equal pitch) within the inspection lane (e.g., IL12 or IL24, as illustrated in FIG. 149) to have a selected inspection resolution, which may correspond to (e.g., be the same as) the selected inspection resolution between the last sensor mount of the first forward sensor mount group 26012 and the first sensor mount of the third rearward sensor mount group 26024 (intra-sled sensor mount spacing). Thus, the payload may inspect the inspection surface at the selected inspection resolution between the first sensor mount of the second rearward sensor mount group 26014 and a last sensor mount of the third forward sensor mount group 26022. In some embodiments, for some or all of the sled assemblies including the first and second sled assemblies expressly described herein, the last sensors/sensor mounts of the forward sensor mount groups and the first sensors/sensor mounts of the next adjacent sensor of the rearward sensor mount groups may have the selected inspection resolution.

In some examples, one sensor in each inspection lane may have a width of the inspection resolution. In some examples, there are no gaps between forward or rearward inspection sensors of the same or different sled assemblies greater than a width of the inspection resolution.

Figure 150:
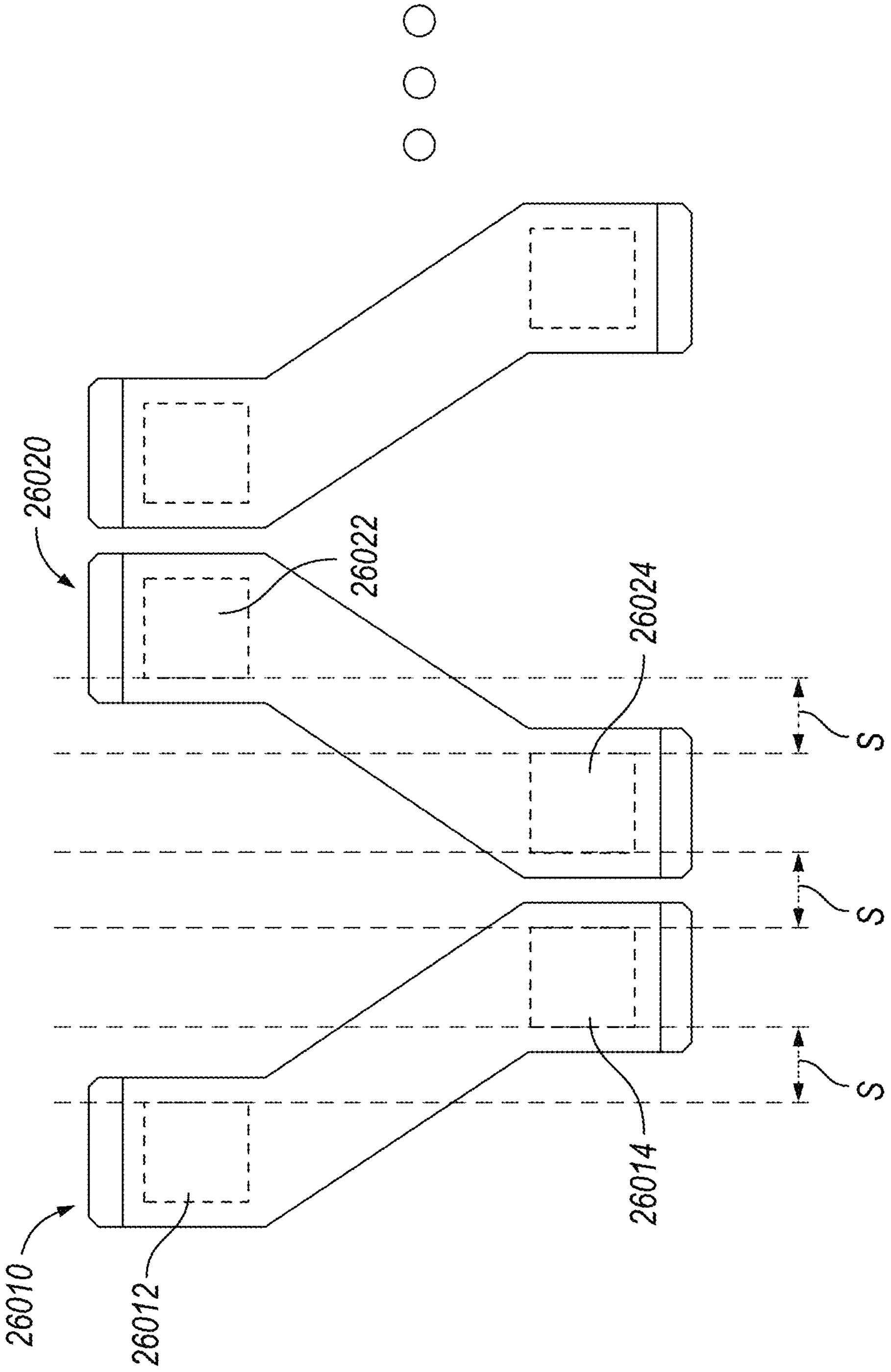

With reference to FIG. 150, in some examples, the system may include a means for inspecting an inspection surface at a selected inspection resolution between a first sensor mount of the first forward sensor mount group 26012 and a last sensor mount of the third forward sensor mount group 26022, inclusive. For example, the means may include adjacent first and second sled assemblies 26010 and 26020 having third portions (e.g., third portions 22214 as described herein) each with an angled shape, which are angled in opposite directions (e.g., offset angles θ with opposite magnitudes). The first forward sensor mount group 26012 and the third forward sensor mount group 26022 may be spaced apart from each other at a further distance than the second rearward sensor mount group and the fourth rearward sensor mount group, such that from the front to rear (e.g., relative to a direction of movement of the system and opposite to a direction of inspection), the third portions of each of the first and second sled assemblies 26010 and 26020 may be angled inwards in a V-shaped configuration, as illustrated by example in FIG. 150. A spacing between the last sensor of the second rearward sensor mount group and the first sensor of the fourth rearward sensor mount group (e.g., a pitch) may correspond to a selected inspection resolution, and may be the same as the intra-sled sensor mount spacing of some or all of the first, second, third, and fourth sensor mount groups. Additionally, the spacing between the last sensor of the second rearward sensor mount group and the first sensor of the fourth rearward sensor mount group may be the same as a spacing between the last sensor of the first forward sensor mount group and the first sensor of the second rearward sensor mount group (e.g., a selected horizontal distance SHD as described herein), and may be the same as a spacing between the last sensor of the fourth rearward sensor mount group and the first sensor of the third forward sensor mount group. Thus, the system may inspect the inspection surface at the selected resolution corresponding to a consistent spacing (e.g., pitch) between each of the sensor mounts of the first, second, third, and fourth sensor mount groups.

Additionally, the spacing between the last sensor of the second rearward sensor mount group and the first sensor of the fourth rearward sensor mount group may be the same as the last sensor of the third forward sensor mount group and a first sensor of a forward sensor mount group in an immediately adjacent sled assembly. Indeed, the inter-sled spacing and intra-sled spacing may be at a consistent spacing (e.g., pitch) for some or all of the sled assemblies of the payload, not just the first and second sled assemblies expressly described herein, and the payload may inspect the inspection surface at the selected inspection resolution.

Figure 151:
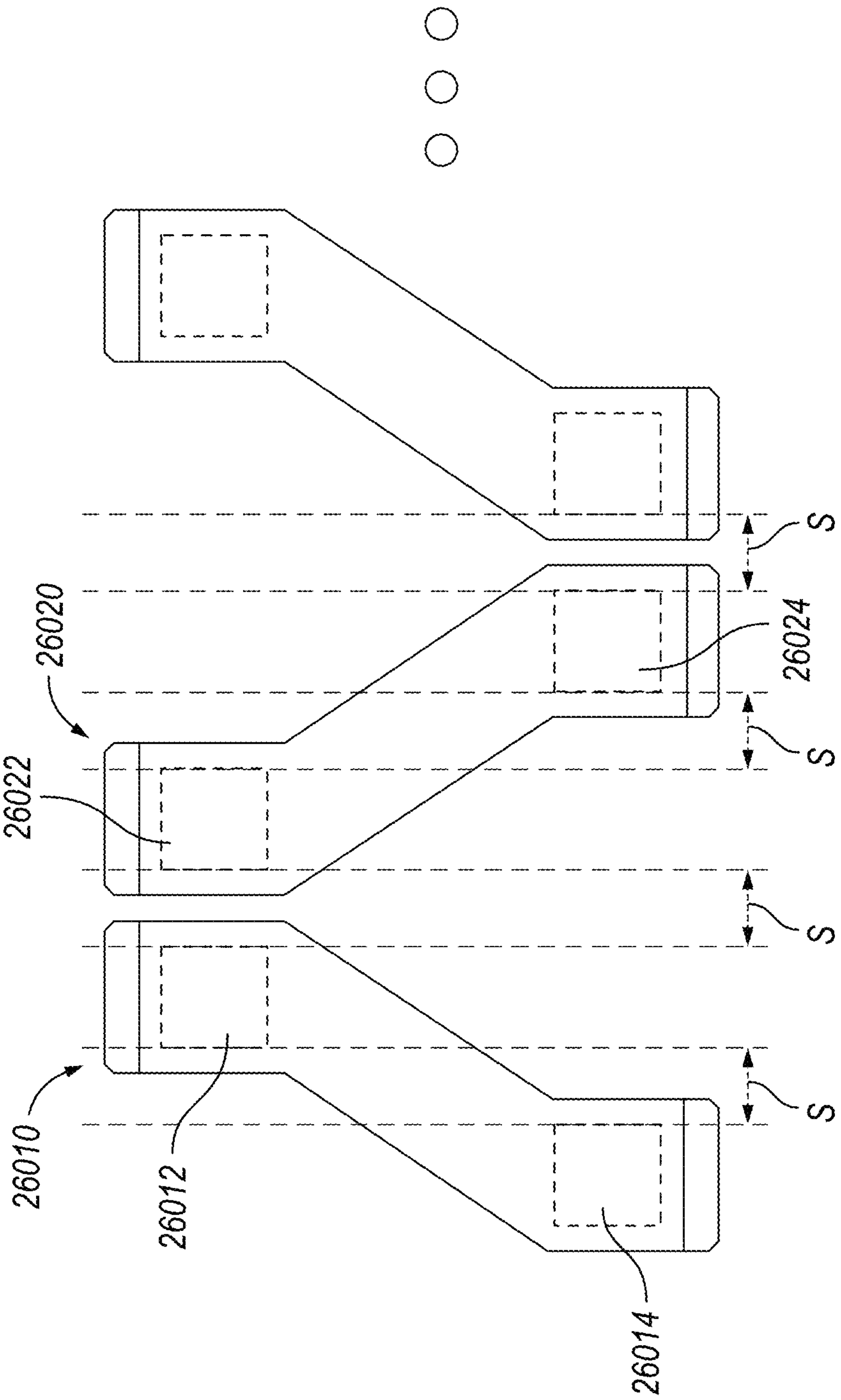

With reference to FIG. 151, in some examples, the system may include a means for inspecting an inspection surface at a selected inspection resolution between a first sensor mount of the second rearward sensor mount group and a last sensor mount of the fourth rearward sensor mount group, inclusive. For example, the means may include adjacent first and second sled assemblies 26010 and 26020 having third portions each with an angled shape, which are angled in opposite directions (e.g., opposite offset angles θ). The first forward sensor mount group and the third forward sensor mount group may be spaced apart from each other at a closer distance than the second rearward sensor mount group and the fourth rearward sensor mount group, such that from the front to rear, the third portions of each of the first and second sled assemblies 26010 and 26020 may be angled outwards in an inverted-V-shaped configuration, as illustrated by example in FIG. 151. A spacing between the last sensor of the first forward sensor mount group and the first sensor of the third forward sensor mount group (e.g., a pitch) may correspond to a selected inspection resolution, and may be the same as the intra-sled sensor mount spacing of some or all of the first, second, third, and fourth sensor mount groups. Additionally, the spacing between the last sensor of the first forward sensor mount group and the first sensor of the third forward sensor mount group may be the same as the spacing between the first sensor of the first forward sensor mount group and the last sensor of the second sensor mount group, and may be the same as a spacing between the last sensor of the third forward sensor mount group and the first sensor of the fourth rearward sensor mount group. Thus, the system may inspect the inspection surface at the selected resolution corresponding to a consistent spacing (e.g., pitch) between each of the sensor mounts of the first, second, third, and fourth sensor mount groups.

Additionally, the spacing between the last sensor of the first forward sensor mount group and the first sensor of the third forward sensor mount group may be the same as the last sensor of the fourth rearward sensor mount group and a first sensor of a second rearward sensor mount group in an immediately adjacent sled assembly. Indeed, the inter-sled spacing and intra-sled spacing may be at a consistent spacing (e.g., pitch) for some or all of the sled assemblies of the payload, not just the first and second sled assemblies expressly described herein, and the payload may inspect the inspection surface at the selected inspection resolution.

In some embodiments, the first forward sensor mount group and the third forward sensor mount group may include a same first type of sensor. Additionally, the second rearward sensor mount group and the fourth rearward sensor mount group may include a same second type of sensor that is different from the first type, and/or may include the first type of sensor. Thus, the system (e.g., a controller of the system) may easily adjust a back sensor package (e.g., the rearward sensor mount groups including the second rearward sensor mount group and the fourth rearward sensor mount group) in response to the sensed values from the forward sensor mount groups (e.g., the first forward sensor mount group and the third forward sensor mount group). The controller may be configured to interpret a first calibration value and calibrate, based on the first calibration value, the sensors of the first sensor mount group and the third sensor mount group, and to interpret a second calibration value and calibrate, based on the second calibration value, the sensors of the second sensor mount group and the fourth sensor mount group. Calibration here may generally refer to parameters relating to how the sensors in the sensor mounts operate—for example, aspects such as voltages, operational parameters of the sensors, protocols used, data/firing rates, firing durations, firing amplitude, etc. In certain embodiments, calibrations may reference processing values (e.g., cutoff times, analysis operations, etc.) that are performed locally on the inspection robot, and/or that are performed by the sensor before being provided as "raw data" from the sensor. The controller may be configured to calibrate the sensors of the first and third forward sensor mount groups in a first calibration routine and to calibrate the sensors of the second and fourth rearward sensor mount groups in a second calibration routine. Furthermore, the controller may be configured to perform inspection operations with regard to the first and second calibration values, and to capture inspection data with regard the inspection operations.

In some embodiments, the first forward sensor mount group and the third forward sensor mount group may include a same first type of sensor. Additionally, the second rearward sensor mount group and the fourth rearward sensor mount group may include a same second type of sensor that is different from the first type, and/or may include the first type of sensor. For example, the first forward sensor mount group and the third forward sensor mount group may include UT sensors, and the second rearward sensor mount group and the fourth rearward sensor mount group may include EMI sensors. Or, for example, the first forward sensor mount group and the third forward sensor mount group may include EMI sensors, and the second rearward sensor mount group and the fourth rearward sensor mount group may include UT sensors. The system (e.g., a controller) may be configured to interpret a first calibration value and calibrate, based on the first calibration value, the sensors of the first sensor mount group and the third sensor mount group, and to interpret a second calibration value and calibrate, based on the second calibration value, the sensors of the second sensor mount group and the fourth sensor mount group. The controller may be configured to calibrate the sensors of the first and third forward sensor mount groups in a first calibration routine and to calibrate the sensors of the second and fourth rearward sensor mount groups in a second calibration routine. Furthermore, the controller may be configured to perform inspection operations with regard to processing values, and to capture inspection data with regard the inspection operations. For example, processing values may be adjusted, and may include aspects such as cutoff times, time window values, filtering constants, spectral analysis algorithms, and screening for good/bad data values. Processing here may generally refer to parameters around how inspection data may be interpreted to produce the detected values. For example, a given aspect could be a calibration or a processing value, depending upon how the sensors of the sensor mount groups are configured, and where the processing duties are assigned. For example, some low level processing may be performed at the sensor, by an A/D converter or other hardware-type processing near the sensor or within the sensor, at a DAQ converter or programmable logic circuit on the inspection robot, etc. Both the calibration and processing, as described here, and which may take the form of algorithms, are lower level than the level of processing that is used later to characterize the actual inspection surface. In some examples, the data created after the calibration and processing are applied may nominally be called the "raw data." However, such data may be an estimate, since some of the "true" raw data (e.g., the data that the sensors literally detected) may be lost in filters, data compression, downsampling, etc. In other words, entropy losses may have already occurred, as multiple true raw data states could describe the data after the calibration and processing.

In some embodiments, the first forward sensor group and the second rearward sensor group may have a same first type of sensor. Additionally, the third forward sensor group and the fourth rearward sensor group may have a second same type of sensor, which may be different from the first type of sensor. Such embodiments may provide for an easier hardware configuration, since a same sled assembly (e.g. the first sled assembly 26010) may include all sensors of a same type. In some examples, the system (e.g., a controller) may be configured to calibrate the sensors of the first forward sensor group and the second rearward sensor group using a first calibration value. In some examples, the controller may be configured to process the data from the first forward sensor group and the second rearward sensor group using a first processing value. Furthermore, in some examples, the controller may be configured to calibrate the sensors of the third forward sensor group and the fourth rearward sensor group using a second calibration value, and in some examples, the controller may be configured to process the data from the third forward sensor group and the fourth rearward sensor group using a second processing value. Because inspection data from the first type of sensor in the rearward sensor mount group (e.g., the second rearward sensor mount group) has a delay from inspection data from the first type of sensor in the forward sensor mount group (e.g., the first forward sensor mount group) owing to the physical distance between the two groups, the controller may update the inspection data from the first forward sensor mount group based on inspection data from the second rearward sensor mount group. This may allow the system to generally respond to inspection information that it gleans from the inspection data.

With reference to FIGS. 118A-146, a payload 2 for an inspection robot according to an example embodiment may include a plurality of assembly sleds 22200 (which may also be referred to herein as sled assemblies 22200). Each assembly sled 22200 may include a first sensor 22220 structured to interrogate an inspection surface and a second sensor 22222 structured to interrogate the inspection surface. Furthermore, with reference to FIG. 145, each assembly sled may have a shape structured to offset an inspection path 24930 (e.g., a scanning path) of the first sensor 22220 with respect to an inspection path 24938 of the second sensor 22222 along the inspection surface. The plurality of assembly sleds 24910, 24912, 24914, and 24916 may be disposed in a staggered arrangement structured to offset the inspection paths 24930, 24938 of the first sensor 22220 and the second sensor 22222 of a first assembly sled 24910, of the plurality of assembly sleds, from the inspection paths of the first sensor 22220 and the second sensor 22222 of a second assembly sled 24912, of the plurality of assembly sleds.

In some embodiments, each assembly sled of the plurality of assembly sleds of the payload 2 may include a first portion 22210 that includes the first sensor 22220, a second portion 22212 that includes the second sensor 22222, and a third portion 22214 connecting the first portion 22210 to the second portion 22212 and having a shape structured to provide the offset of the inspection path 24930 of the first sensor 22220 with respect to the inspection path 24938 of the second sensor 22222 along the inspection surface.

In some embodiments, the first portion 22210 may include a first sensor housing 22216 that includes a first plurality of sensors 22220 (see, e.g., FIG. 118G) structured to interrogate the inspection surface, where the first plurality of sensors 22220 include the first sensor 22220. The first sensor housing 22216 may arrange the first plurality of sensors 22220 such that there is intra-housing spacing between scanning paths (which may also be referred to herein as inspection paths) of the first plurality of sensors, as illustrated by example in FIG. 145. Furthermore, the second portion 22212 may include a second sensor housing 22218 that includes a second plurality of sensors 22222 (see, e.g., FIG. 118G) structured to interrogate the inspection surface, where the second plurality of sensors 22222 include the second sensor 22222. The second sensor housing 22218 may arrange the second plurality of sensors 22222 such that there is intra-housing spacing between scanning paths of the second plurality of sensors, as illustrated by example in FIG. 145.

With reference to FIGS. 120 and 121, in some embodiments, at least one assembly sled of the plurality may include a sensor housing 22216 that includes the first sensor 22220 and has an opening 22520 through which couplant flows, and a film 22524 disposed over the opening 22520 so as to regulate the flow of couplant through the opening 22520, as described herein.

In some embodiments, at least one assembly sled of the plurality may include a sensor housing 22216 that includes the first sensor 22220. The sensor housing 22216 may include a delay line 22523 (e.g., included in a couplant chamber 22416) for the first sensor 22220. In some examples, the delay line 22523 may be between 5 mm to 50 mm inclusive. In some examples, the delay line 22523 may be between 0.20" to 1.97" inclusive. In some embodiments, the delay line may be about 1.25"—e.g., +−5%. In some examples, the delay line 22523 may be structured to provide for two backwall echoes from the inspection surface.

In some embodiments, the first plurality of sensors 22220 may be a first plurality of ultrasonic (UT) sensors, and the second plurality of sensors 22222 may be a second plurality of UT sensors.

A sled assembly for an inspection robot according to an example embodiment may include an ultrasonic (UT) sensor housing 22216 having a couplant chamber 22416 with an opening 22520 structured to disperse couplant onto an inspection surface, and a film 22524 disposed over the opening 22520 and structured to regulate a flow of the couplant out of the opening 22520.

In some embodiments, the film 22524 and the UT sensor housing 22216 may define at least one opening 22520 for the couplant to flow through. With reference to FIGS. 118F and 118G, in some embodiments, the UT sensor housing 22216 may be structured to house a plurality of sensors 22220, and the film 22524 and the UT sensor housing 22216 may define a plurality of openings 22520 each corresponding to a distinct one of the plurality of UT sensors 22220, where the plurality of openings 22520 may be for couplant to flow through.

In some embodiments, the film 22524 may include at least one of a low density polyethylene, tin, nylon, polyester ether ketone, acrylonitrile butadiene styrene, or polyfluoroethylene.

In some embodiments, the film 22524 may be secured to the UT sensor housing 22216 via at least one of an adhesive or a mechanical coupling.

In some embodiments, the UT sensor housing 22216 may include a plurality of channels 22516 extending from the opening 22520 to provide for couplant to flow out of the couplant chamber 22416 and around the sides of the film 22524 to thereby maintain a layer of couplant between the film 22524 and the inspection surface.

A sled assembly 24910 for an inspection robot according to an example embodiment may include a first portion 22210 having a first ultrasonic (UT) sensor 22220 structured to interrogate an inspection surface, and a second portion 22212 having a second UT sensor 22222 structured to interrogate the inspection surface. The first portion 22210 (which may be a lead or “forward” portion) and the second portion 22212 (which may be a trailing or "rearward" portion) may move independently of each other.

In some embodiments, the sled assembly 24910 may include a third portion 22214 connecting the first portion 22210 to the second portion 22212 and structured such that the first portion 22210 and the second portion 22212 move independently of each other. In some examples, the independent movement of the first portion and the second portion includes rotating and/or tilting. For example, as illustrated by example in FIG. 119, a sled assembly 22200 may include pivot points 22312 and 22314 such that the first portion 22210 and the second portion 22212 respectively pivot about points 22312 and 22314 in the direction indicated by the double arrowed lines (third degree of freedom 22310) with respect to the third portion 22214, as described herein.

In some embodiments, the third portion 22214 may have a shape structured to offset an inspection path of the first UT sensor 22220 with respect to an inspection path of the second UT sensor 22222 along the inspection surface.

In some embodiments, the third portion 22214 may include a pivot point 22320 for connecting the third portion 22214 to an arm 22224 of a payload for the inspection robot. For example, the arm 22224 may be connected/coupled to a sled mount 22226 of an inspection robot 100 (FIG. 1), as described herein. The pivot point 22320 may be structured to provide movement of the third portion 22214 with respect to the arm 22224.

In some embodiments, the first portion 22210 of the sled assembly may include a first UT sensor housing 22216 that includes a first plurality of UT sensors 22220 structured to interrogate the inspection surface, the first plurality of UT sensors 22220 including the first UT sensor 22220, where the first UT sensor housing 22216 may arrange the first plurality of UT sensors 22220 such that there is intra-housing spacing between scanning paths of the first plurality of UT sensors 22220 as described herein. The second portion 22212 of the sled assembly may include a second UT sensor housing 22218 that includes a second plurality of UT sensors 22222 structured to interrogate the inspection surface, where the second UT sensor housing 22218 arranges the second plurality of UT sensors 22222 such that there is intra-housing spacing between scanning paths of the second plurality of UT sensors 22222 as described herein.

Referencing FIGS. 92-104 and 105-107, example alternate embodiments for sleds, arms, payloads, and sensor interfaces, including sensor mounting and/or sensor electronic coupling, are described herein. The examples of FIGS. 92-104 and 105-107, and/or aspects of the examples of FIGS. 92-104 and 105-107, may be included in embodiments of inspection robots, payloads, arms, sleds, and arrangements of these as described throughout the present disclosure. The examples of FIGS. 92-104 and 105-107 include features that provide for, without limitation, ease of integration, simplified coupling, and/or increased options to achieve selected horizontal positioning of sensors, selected horizontal sensor spacing, increased numbers of sensors on a payload and/or inspection robot, and/or increased numbers of sensor types available within a given geometric space for an inspection robot.

Figure 92:
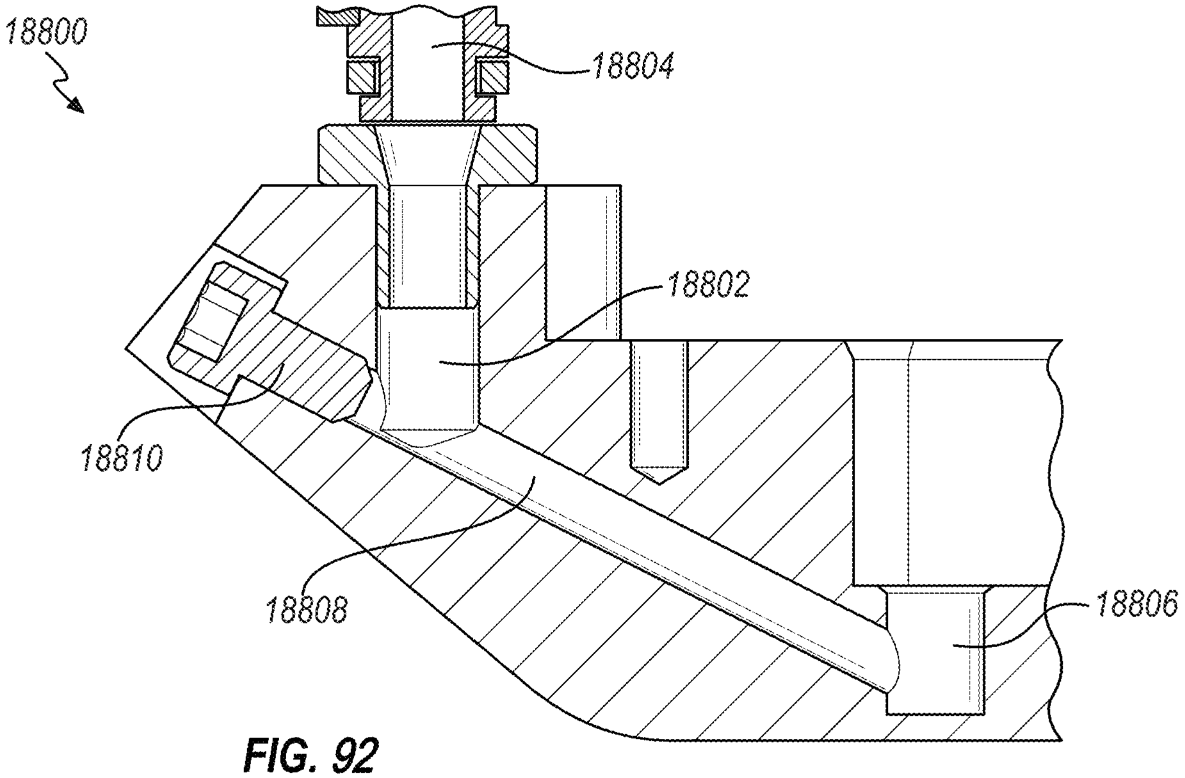
FIG. 92 depicts a side cutaway view of an example couplant routing mechanism for a sled.

Referencing FIG. 92, a side cutaway view 18800 of an example couplant routing mechanism for a sled is depicted. The example of FIG. 92 includes a couplant channel first portion 18802 that fluidly couples a couplant interface 18804 for the sled to a couplant manifold 18806 of the sled (via the couplant channel second portion 18808 in the example), providing for a single couplant interface 18804 to provide couplant to a number of sensors coupled to the sled. The example of FIG. 92 includes a couplant seal 18810 to selectively seal the couplant channel 18802, 18808, which may be provided as an access position for a sensor (e.g., to determine an aspect of the couplant in the couplant channel 18802, 18808 such as a temperature, composition, etc.), and/or to allow for a simple fabrication of the sled. For example, the couplant channel first portion 18802 may be provided by a first drilling or machining operation, and the couplant channel second portion 18808 may be provided by a second drilling or machining operation, with the resulting opening sealed with the couplant seal 18810. In certain embodiments, for example where the couplant channel 18802, 18808 is formed by an additive manufacturing operation, the couplant channel 18802, 18808 may be formed without the opening, and the couplant seal 18810 may be omitted. The couplant manifold 18806 may be formed by the sled, and/or may be formed by the sled interfacing with a sensor mounting insert (e.g., reference FIGS. 94, 95 and the related descriptions).

Figure 93:
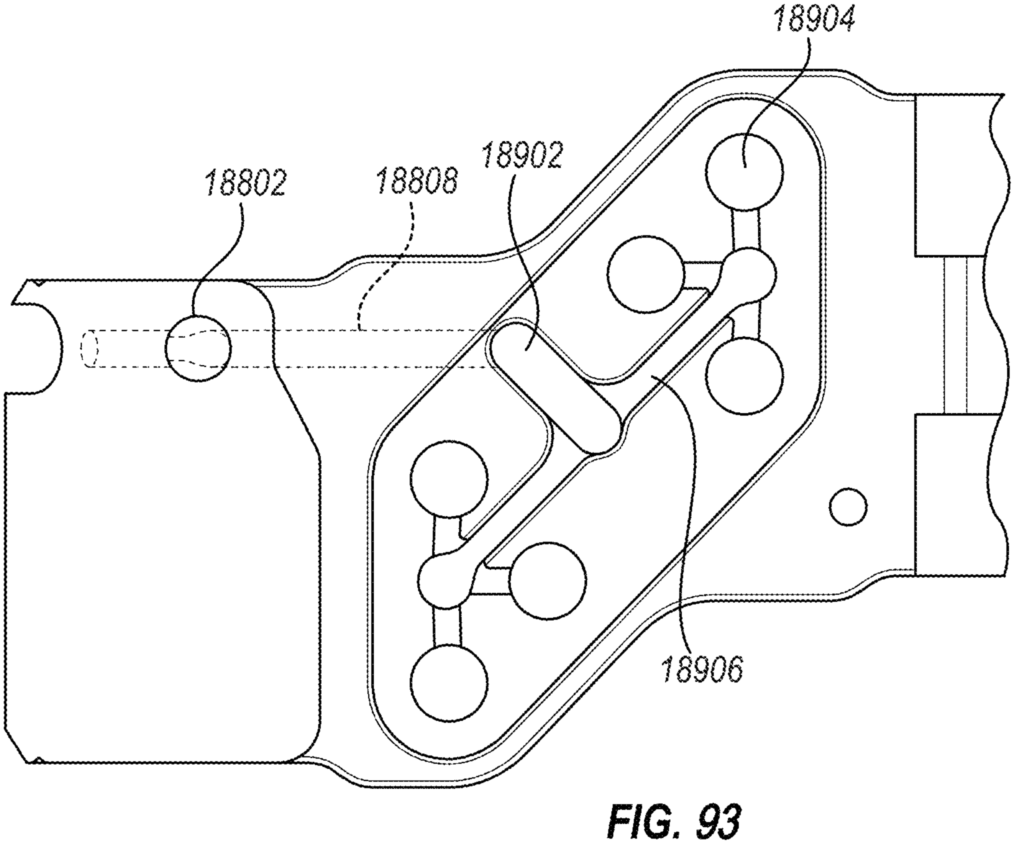
FIG. 93 depicts a partial cutaway bottom view of the example couplant routing mechanism for a sled.

Referencing FIG. 93, a partial cutaway bottom view of the example couplant routing mechanism for the sled is depicted. The example of FIG. 93 is compatible with an embodiment having a sled lower body portion as partially depicted in FIG. 93, wherein a sled mounting insert is coupled to the sled lower body portion forming the sled having sensors mounted thereon. The example of FIG. 93 includes a sled manifold portion 18902, consistent with the side view depicting the couplant manifold 18806. The sled manifold portion 18902 is fluidly coupled to the couplant channel 18808, 18802, and includes a distributing portion of lower portion manifold features 18906 routing couplant to couplant chamber groups associated with sensors to be mounted on the sled. The sled further includes a sensor opening 18904, which is an opening defined by the manifold configuration. Each sensor opening 18904 may have a sensor mounted to interrogate the inspection surface through the sensor opening 18904, where the manifold configuration defining the opening interacts with the sensor to form a couplant chamber. The couplant chamber, when filled with couplant, provides acoustic coupling between the sensor and the inspection surface, and a resulting distance between the inspection surface and the associated sensor at the respective sensor opening 18904 provides the delay line corresponding to that sensor. The example of FIG. 93 depicts a 6-sensor arrangement, where up to 6 sensors may be mounted on a single sled. Additionally, the position of the sensor openings 18904 and can be provided such that each sensor opening 18904 is horizontally displaced (e.g., at a distinct vertical position of FIG. 93 as depicted, where the sled in operation traverses the inspection surface to the left or to the right), and/or has a selected horizontal displacement. Accordingly, and embodiment such as that depicted in FIG. 93 includes multiple sensors on a single sled, having selected horizontal distribution. In certain embodiments, one of the available sensors may not be mounted on the sled, and the corresponding sensor opening 18904 may be sealed, and/or may just be allowed to leak couplant during operations of the inspection robot. In certain embodiments, one or more additional sensors (e.g., a sensor that is not a UT sensor) may be mounted to the sled at one of the sensor openings 18904, and the sensor may operate in the presence of the couplant, be sealed from the manifold, and/or a portion of the manifold may be omitted. For example, an embodiment of FIG. 93 where a leg of the manifold is omitted allows for three mounted UT sensors in a first sensor group, and three mounted sensor of another type in a second sensor group.

Additionally or alternatively, a sensor mounting insert (e.g., reference FIG. 95) a portion of the manifold, including a leg of the manifold and/or just a single sensor position, allowing for a group of sensors mounted on a sensor mounting insert to have the proper couplant flow configuration in a single operation of coupling the sensor mounting insert to the sled lower body portion.

Figure 94:
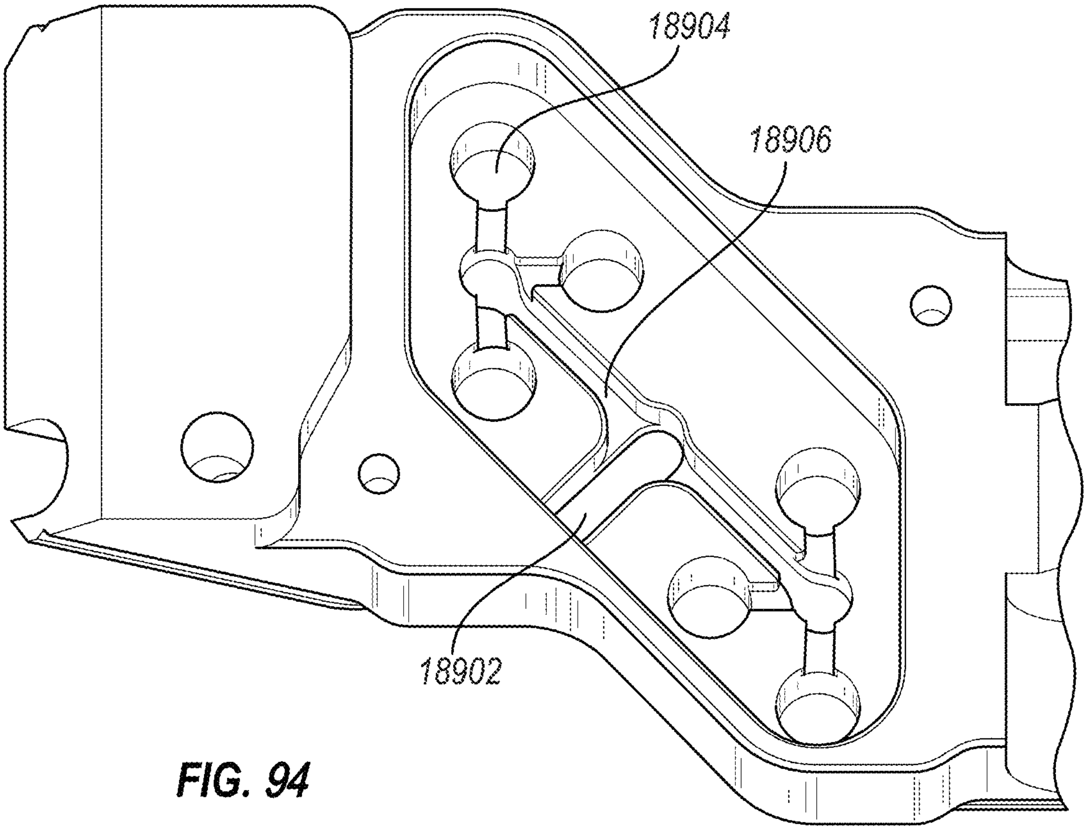
FIG. 94 depicts a perspective view of the example couplant routing mechanism for a sled.
Figure 95:
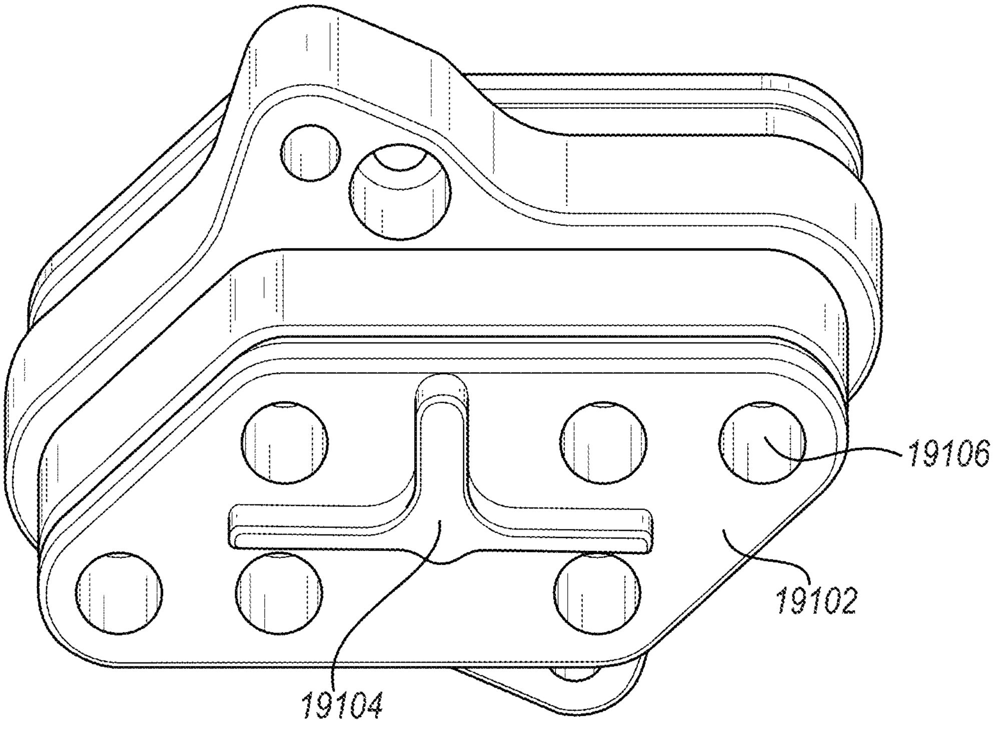
FIG. 95 depicts a perspective view of a sensor mounting insert for a sled.

Referencing FIG. 94, a perspective view of a sled lower body portion is depicted. The example of FIG. 94 depicts the lower portion manifold features 18902, 18906 as negative portions or cutouts of the sled lower body portion to form a portion of the couplant flow channels. Referencing FIG. 95, a perspective view of a sensor mounting insert (or group housing bottom portion) is depicted. The example sensor mounting insert interfaces with the sled lower body portion, for example plugging into it, and may then be secured at matching locations where holes are provided for screw, bolt, or connection interfaces. The example sensor mounting insert includes a manifold portion 19104 as positive portion (e.g., extending from the surface) that interfaces with the sled body lower portion manifold features 18902, 18906 to fully define the couplant manifold for the sensors. The manifold portion 19104 can be configured to seal one or more sensors from the manifold, and to form channels of selected size in the manifold. The example of FIGS. 94, 95 depicts the negative manifold feature on the sled lower body portion, and the positive manifold feature on the sensor mounting insert, but these may be reversed in whole or part, and/or both the sled lower body portion and the sensor mounting insert may include matching negative manifold features for all or a portion of the defined manifold. The sensor mounting insert further includes a number of sensor mounting holes 19106 therethrough, wherein sensors may be mounted and exposed to the corresponding sled lower body holes 18904. In certain embodiments, the sensors may be mounted on the sled mounting insert, allowing for the installation of the full sensor group in a single operation of coupling the sled mounting insert to the sled lower body portion.

Figure 96:
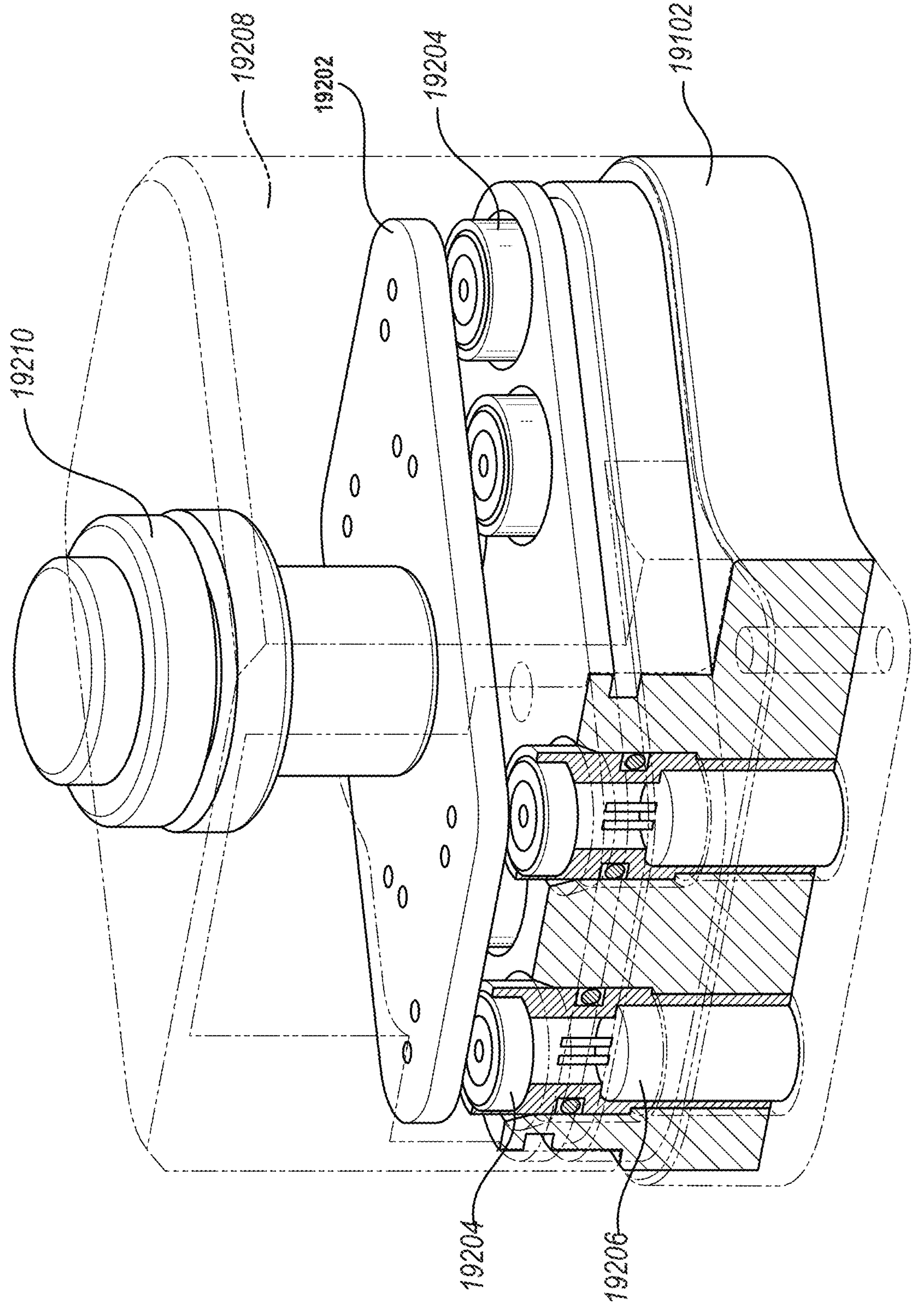
FIG. 96 depicts a partial cutaway view of a sensor electronics interface and a sensor mounting insert for a sled.

Referencing FIG. 96, a partial cutaway view of a sensor electronics interface and a sensor mounting insert for a sled is depicted. The example of FIG. 96 includes a sensor group housing upper portion 19208 coupled to the sensor group housing lower portion 19102 (or group housing lower portion), which may form a sensor group housing when coupled. The example of FIG. 96 further includes an electronic interface board 19202 for the sensors, providing an electrical interface between the group of sensors and a payload interface to the housing. The example of FIG. 96 includes a single connector interface 19210 that electronically couples all of the sensors of the sled at a single connector. The interface board 19202 may provide electrical connection, and/or may form a hardware controller or a portion of a hardware controller for an inspection robot. In certain embodiments, the interface board 19202 may include a sensor controller 19204 that determines raw sensor data, and/or partially processed sensor data, for example performing A/D operations, conversions of electrical values to sensed parameter values, and the like. In certain embodiments, the interface board 19202 may include a controller that performs minimal processing operations for sensor data, such as operations to determine a wall thickness value (e.g., in response to UT sensor data, and/or data calibrations such as expected return times, primary mode and/or secondary mode scoring, or the like). The example of FIG. 96 depicts sensors 19206 positioned within the group housing (in certain embodiments, a sensor 19206 is showing in FIG. 96, additionally or alternatively 19206 may be a sensor sleeve or housing positioned around the sensor), and a sensor controller 19204. The sensor controller 19204 is depicted away from the interface board 19202, but may be formed on the interface board 19202 and coupled to the sensor 19206 when the interface board 19202 is positioned within the group housing, and/or the sensor controller 19204 may be positioned on the sensor 19206, and engage connections to the interface board 19202 when the interface board 19202 is positioned within the group housing. The sensor controller 19204 may include an annular contact pad that engages a housing of the sensor 19206. The interface board 19202 includes connections between the sensor controllers 19204 and a connector interface 19210. The sensor controllers 19204 may be configured for the particular type of the corresponding sensor 19206. In certain embodiments, the sensor group housing lower portion 19102 may be coupled to the sensor group housing upper portion 19208, then the entire sensor group housing may be coupled to the sled lower body portion. In certain embodiments, the sensor group housing lower portion 19102 may first be coupled to the sled lower body portion, and then the sensor group housing upper portion 19208 is coupled to the sensor group housing lower portion, forming the entire sled with sensor mounted thereon.

Figure 98:
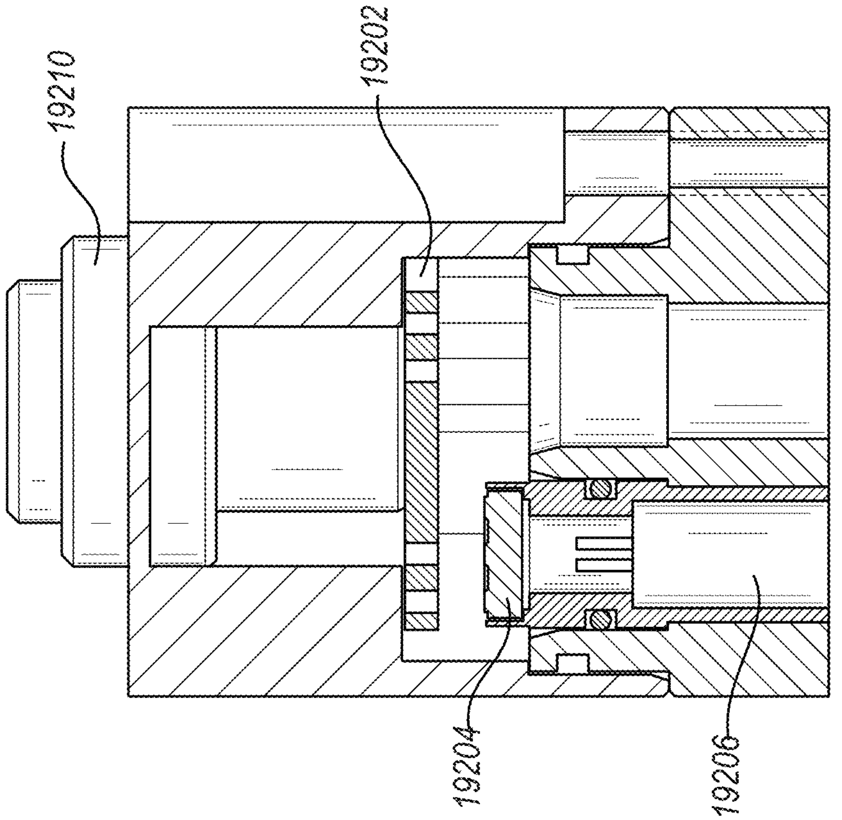
FIG. 98 depicts a cutaway side view of the sensor electronics interface and a sensor mounting insert for a sled.
Figure 97:
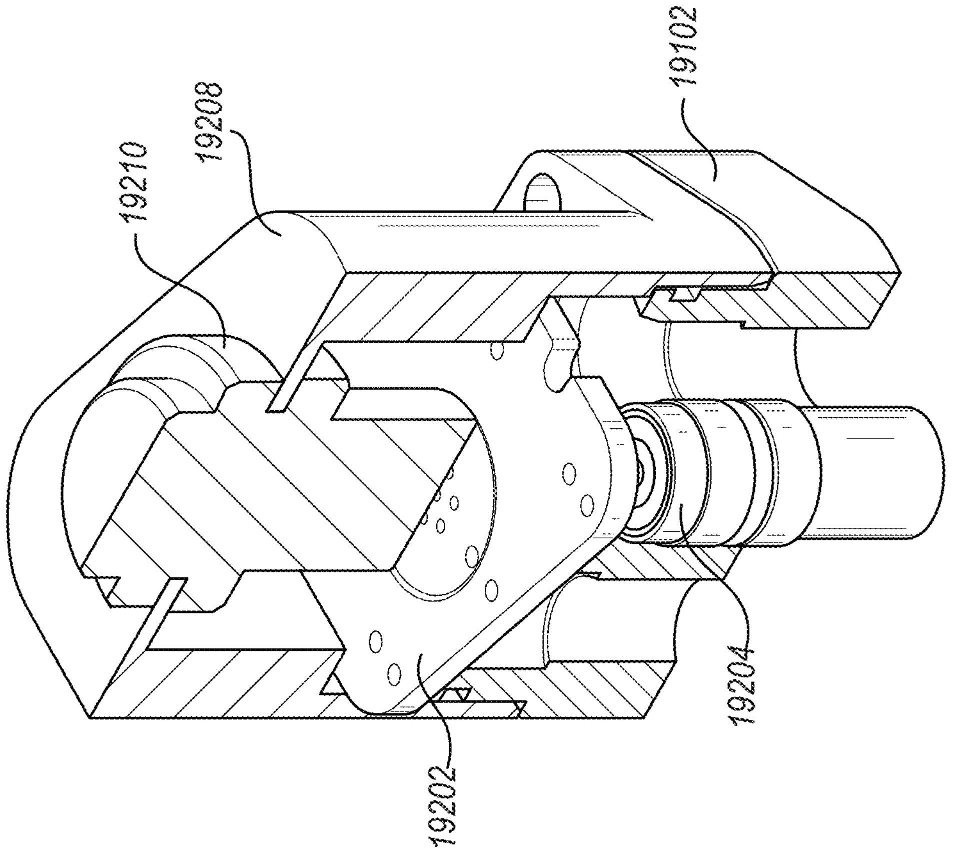
FIG. 97 depicts a cutaway perspective view of another embodiment of a sensor electronics interface and a sensor mounting insert for a sled.

FIG. 97 depicts a cutaway perspective view of another embodiment of a sensor electronics interface and a sensor mounting insert for a sled. The example of FIG. 97 includes a different shape for the sensor group housing upper portion 19208 and lower portion 19102, allowing the embodiment of FIG. 97 to interface with a sled body lower portion having a different geometric arrangement than the embodiment of FIGS. 92-96, but otherwise includes a similar arrangement. FIG. 98 depicts a cutaway side view depicting the sensor 19206, the sensor controller 19204, the interface board 19202, and the connector interface 19210.

Figure 100:
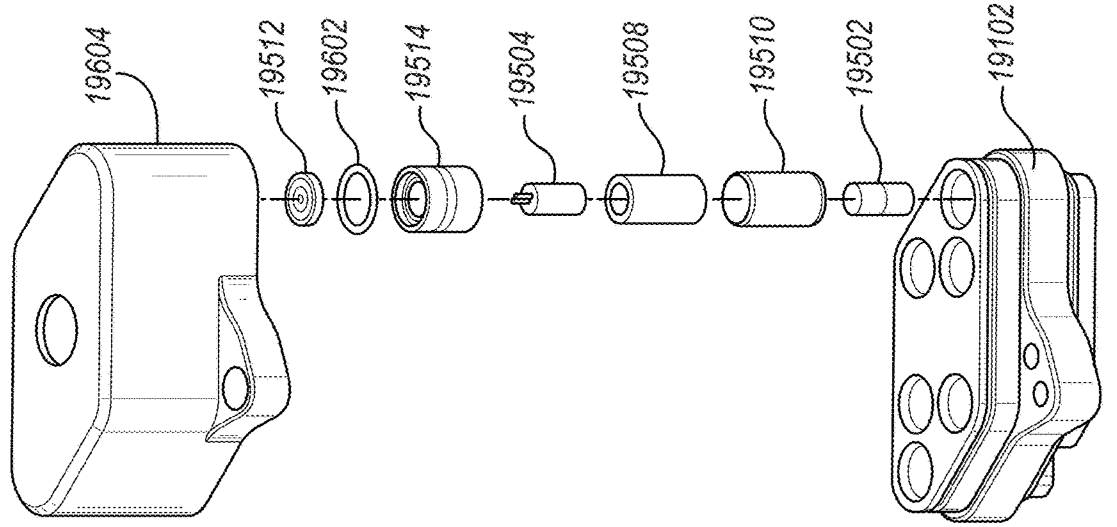
FIG. 100 depicts an exploded view of a sensor integrated into a sensor mounting insert.
Figure 99:
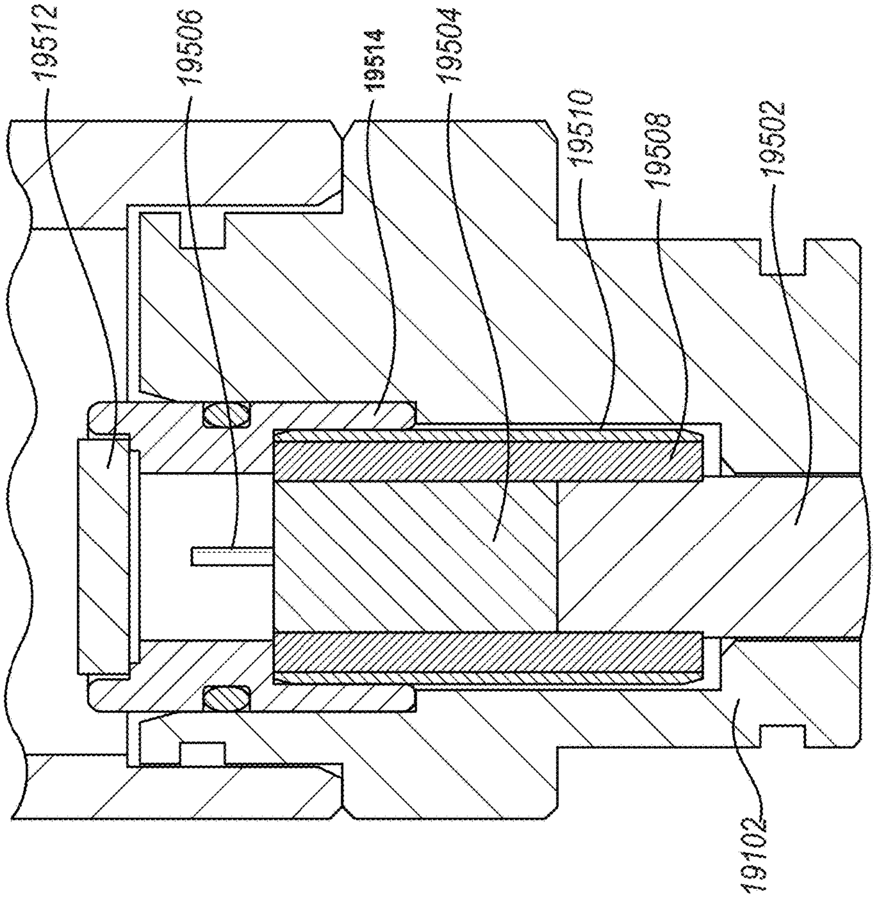
FIG. 99 depicts a side cutaway view of a sensor mounting interface.

Referencing FIGS. 99 and 100, a detail side cutaway view and an exploded view of a sensor integrated into a sensor mounting insert are depicted. Except for minor adjustments for sensor group housing geometry, the example of FIGS. 99-100 is compatible with the examples of FIGS. 92-98. The example of FIG. 100 includes the sensor group housing lower portion 19102 and the group housing top 19604. The sensor integration arrangement includes a delay sleeve 19502 defining at least a portion of the delay line for the sensor, a structural tube 19510 supporting the sensor, a sensor isolation element 19508, the sensor element 19504 that is positioned within the sensor isolation element 19508 and having connection elements 19506 extending therefrom, a sensor sealing cap 19514 and sensor O-ring 19602 that provide sealing between the sensor and the sensor controller 19512, and the sensor controller 19512 (or board interface for coupling to the interface board, for example if the sensor controller is positioned on the board and/or on the inspection robot body). Referencing FIG. 99, the arrangement of FIG. 100 is depicted in an assembled cutaway side view.

Figure 101:
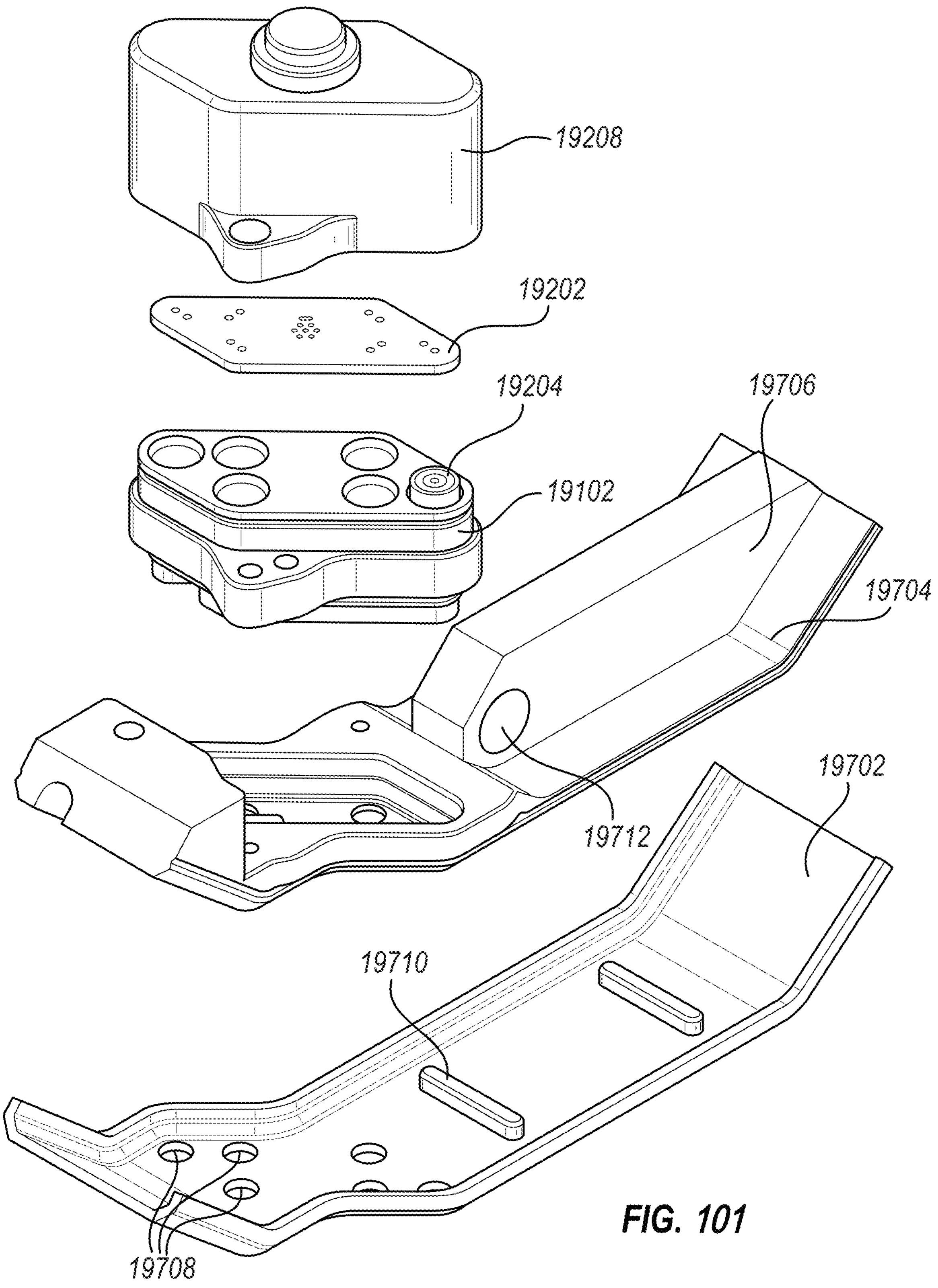
FIG. 101 depicts an exploded view of a sled and sensor mounting insert.

Referencing FIG. 101, an example sled and sensor mounting insert is depicted in an exploded view. The example of FIG. 101 is compatible with the examples of FIGS. 92-100, except for minor adjustments for sensor group housing geometry. The example of FIG. 101 depicts a sensor group housing upper portion 19208, a sensor group housing lower portion 19102 having a sensor 19206 positioned therein, and an interface board 19202 that is coupled to the sensor controller 19204 when the sensor group housing upper and lower portions are joined. The example of FIG. 101 further includes a sled body lower portion 19706 having a selected ramp 19704, with a ramp at each end of the sled body in the arrangement of FIG. 101. The example of FIG. 101 further includes a sled bottom surface having a matching geometry to the sled body lower portion, including matching ramps 19702 and defining holes 19708 matching the hole arrangement of the sled body lower portion and the position of the sensors 19206. The sled bottom surface may be a replaceable surface, and may further include coupling tabs 19710 that snap into matching slots of the sled body lower portion (reference FIG. 105), for example to enable quick removal and/or replacement of the sled body lower portion. The sled body lower portion 19712 further defines an arm coupling hole, for example allowing pivotal coupling between the sled body lower portion and an arm or a payload.

Figure 102:
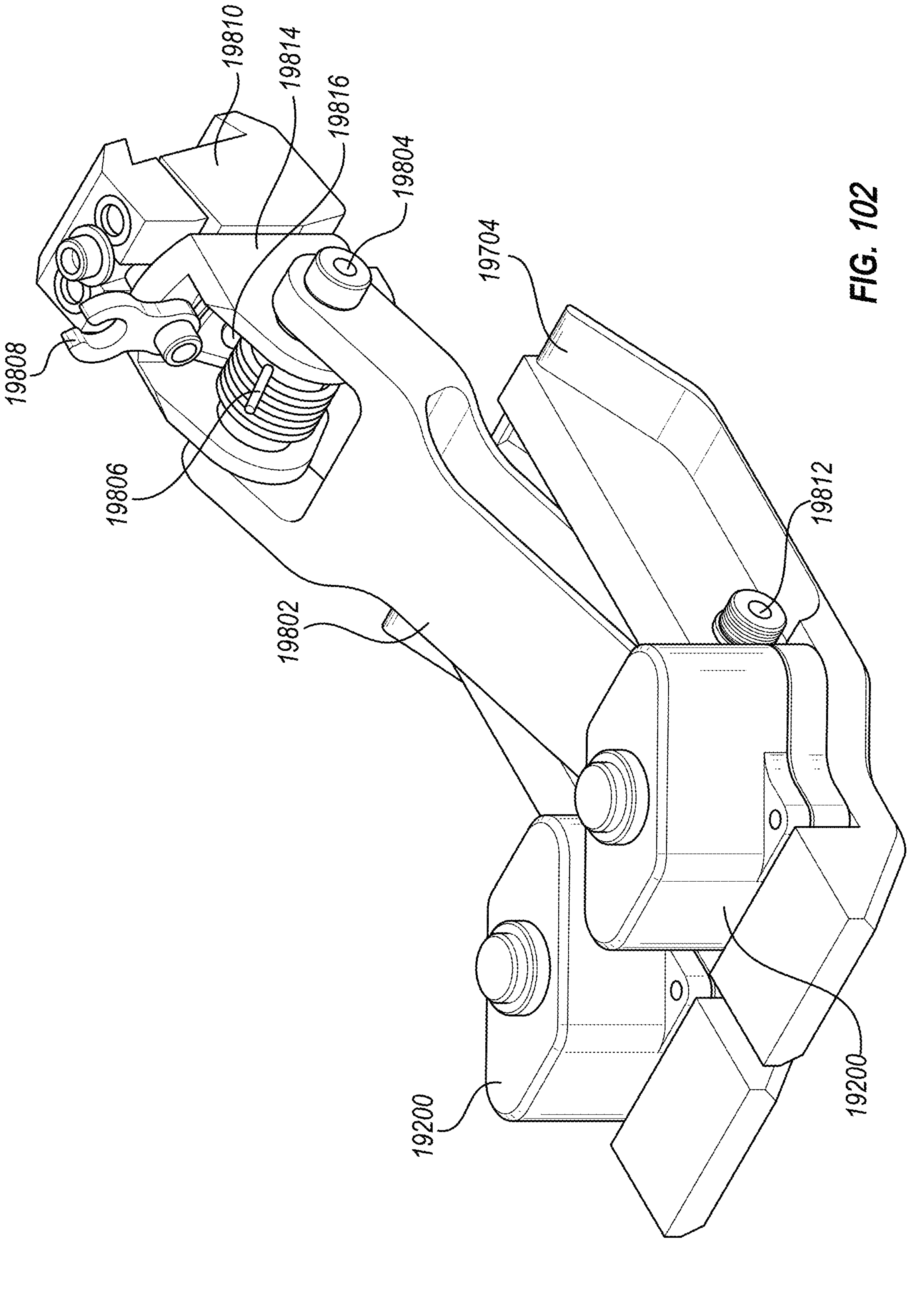
FIG. 102 depicts an example payload having an arm and two sleds mounted thereto.

Referencing FIG. 102, an example payload having an arm and two sleds mounted thereto is depicted. In certain embodiments, the arrangement of FIG. 102 forms a portion of a payload, for example as an arm coupled to a payload at a selected horizontal position. In certain embodiments, the arrangement of FIG. 102 forms a payload, for example coupled at a selected horizontal position to a rail or other coupling feature of an inspection robot chassis, thereby forming a payload having a number of inspection sensors mounted thereon. The example of FIG. 102 includes sleds and sensor group housings that are consistent with the embodiments of FIGS. 92-101, except for minor adjustments for sensor group housing geometry. The example of FIG. 102 includes an arm 19802 coupling the sled to a payload coupling 19810 (and/or chassis coupling 19810). The arm 19802 defines a passage therethrough, wherein a couplant connection may pass through the passage, or may progress above the arm to couple with the sensor lower body portion (e.g., reference 18804 of FIG. 92). The arrangement of FIG. 102 provides multiple degrees of freedom for movement of the sled, any one or more of which may be present in certain embodiments. For example, the pivot coupling 19812 of the arm 19802 to the sled (e.g., reference sled body lower portion 19712 at FIG. 101) allows for pivoting of the sled relative to the arm 19802, and each sled of the pair of sleds depicted may additionally or alternatively pivot separately or be coupled to pivot together (e.g., pivot coupling 19812 may be a single axle, or separate axles coupled to each sled). The arm coupling 19804 provides for pivoting of the arm 19802 relative to the inspection surface (e.g., raising or lowering), and a second arm coupling 19816 provides for rotation of the arm 19802 (and coupling joint 19814) along a second perpendicular axis relative to arm coupling 19804. Accordingly, couplings 19804, 19816 operate together to in a two-axis gimbal arrangement, allowing for rotation in one axis, and pivoting in the other axis. The selected pivoting and/or rotational degrees of freedom are selectable, and one or more of the pivoting or rotational degrees of freedom may be omitted, limited in available range of motion, and/or be associated with a biasing member that urges the movement in a selected direction and/or urges movement back toward a selected position. In the example of FIG. 102, a biasing spring 19806 urges the pivot coupling 19812 to move the arm 19802 toward the inspection surface, thereby contributing to a selected downforce on the sled. Any one or more of the biasing members may be passive (e.g., having a constant arrangement during inspection operations) and/or active (e.g., having an actuator that adjusts the arrangement, for example changing a force of the urging, changing a direction of the urging, and/or changing the selected position of the urging. The example of FIG. 102 depicts selected ramps 19704 defined by the sled, and sensor group housing 19200 elements positioned on each sled and coupling the sensors to the sled and/or the inspection surface. The example of FIG. 102 further includes a coupling line retainer 19808 that provides for routing of couplant lines and/or electrical communication away from rotating, pivoting, or moving elements, and provides for consistent positioning of the couplant lines and/or electrical communication for ease of interfacing the arrangement of FIG. 102 with a payload and/or inspection chassis upon which the arrangement is mounted. The example payload coupling 19810 includes a clamp having a moving portion and a stationary portion, and may be operable with a screw, a quick connect element (e.g., a wing nut and/or cam lever arrangement), or the like. The example payload coupling 19810 is a non-limiting arrangement, and the payload/chassis coupling may include any arrangement, including, without limitation, a clamp, a coupling pin, an R-clip (and/or a pin), a quick connect element, or combinations among these elements.

Figure 103:
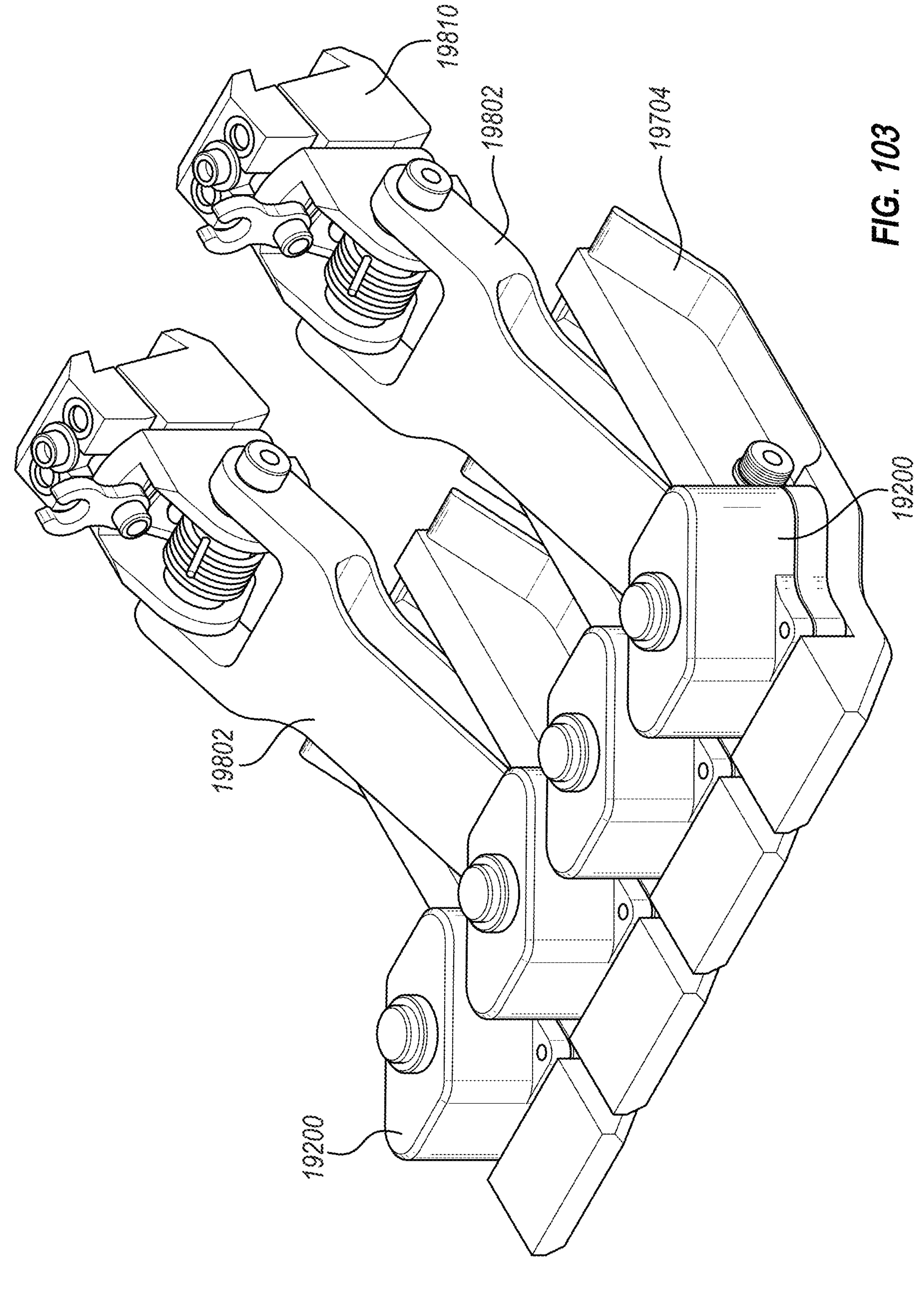
FIG. 103 depicts an example payload having two arms and four sleds mounted thereto.

Referencing FIG. 103, an example arrangement is depicted. The example of FIG. 103 may form a payload or a portion of a payload (e.g., with the arms coupled to the corresponding payload), and/or the example of FIG. 103 may depict two payloads (e.g., with the arms coupled to a feature of the inspection robot chassis). The arrangement of FIG. 103 is consistent with the arrangement of FIG. 102, and depicts two arm assemblies in an example side-by-side arrangement. In an example embodiment wherein each sensor group housing 19200 includes six sensors mounted therein, the example of FIG. 103 illustrates how an arrangement of 24 sensors can be readily positioned on an inspection surface, with each of the sensors having a separate and configurable horizontal position on the inspection surface, allowing for rapid inspection of the inspection surface and/or high resolution (e.g., horizontal distance between adjacent sensors) inspection of the inspection surface. An example embodiment includes each arm having an independent couplant and/or electrical interface, allowing for a switch of 12 sensors at a time with a single couplant and/or electrical connection to be operated. An example embodiment includes the arms having a shared couplant interface (e.g., reference FIG. 51) allowing for a switch of 24 sensors at a time with a single couplant connection to be operated. The pivotal and rotational couplings and/or degrees of freedom available may be varied between the arms, for example to allow for greater movement in one arm versus another (e.g., to allow an arm that is more likely to impact an obstacle, such as an outer one of the arms, to have more capability to deflect away from and/or around the obstacle).

Figure 104:
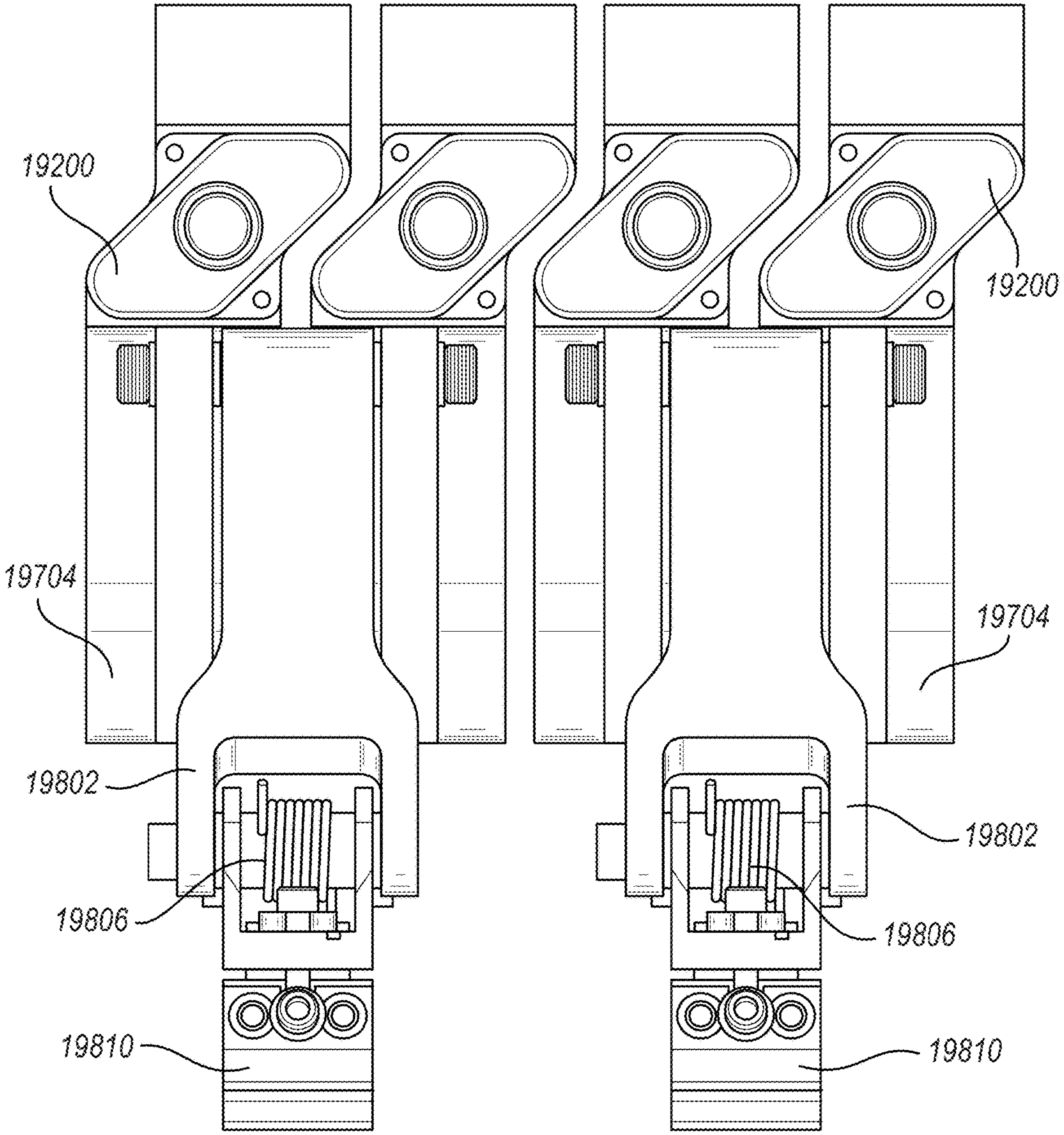
FIG. 104 depicts a top view of the example payload of FIG. 103.

Referencing FIG. 104, an example arrangement is depicted as a top view, consistent with the arrangement of FIG. 103. It can be seen that the sensor group housings 19200 can readily be configured to provide for selected horizontal distribution of the inspection sensors. The horizontal distribution can be adjusted by replacing the arms with arms having a different sensor group housing 19200 and sensor arrangement within the sensor group housing 19200, by displacing the arms along a payload and/or along the inspection robot chassis, and/or displacing a payload (where the arms are mounted to the payload) along the inspection robot chassis.

Figure 105:
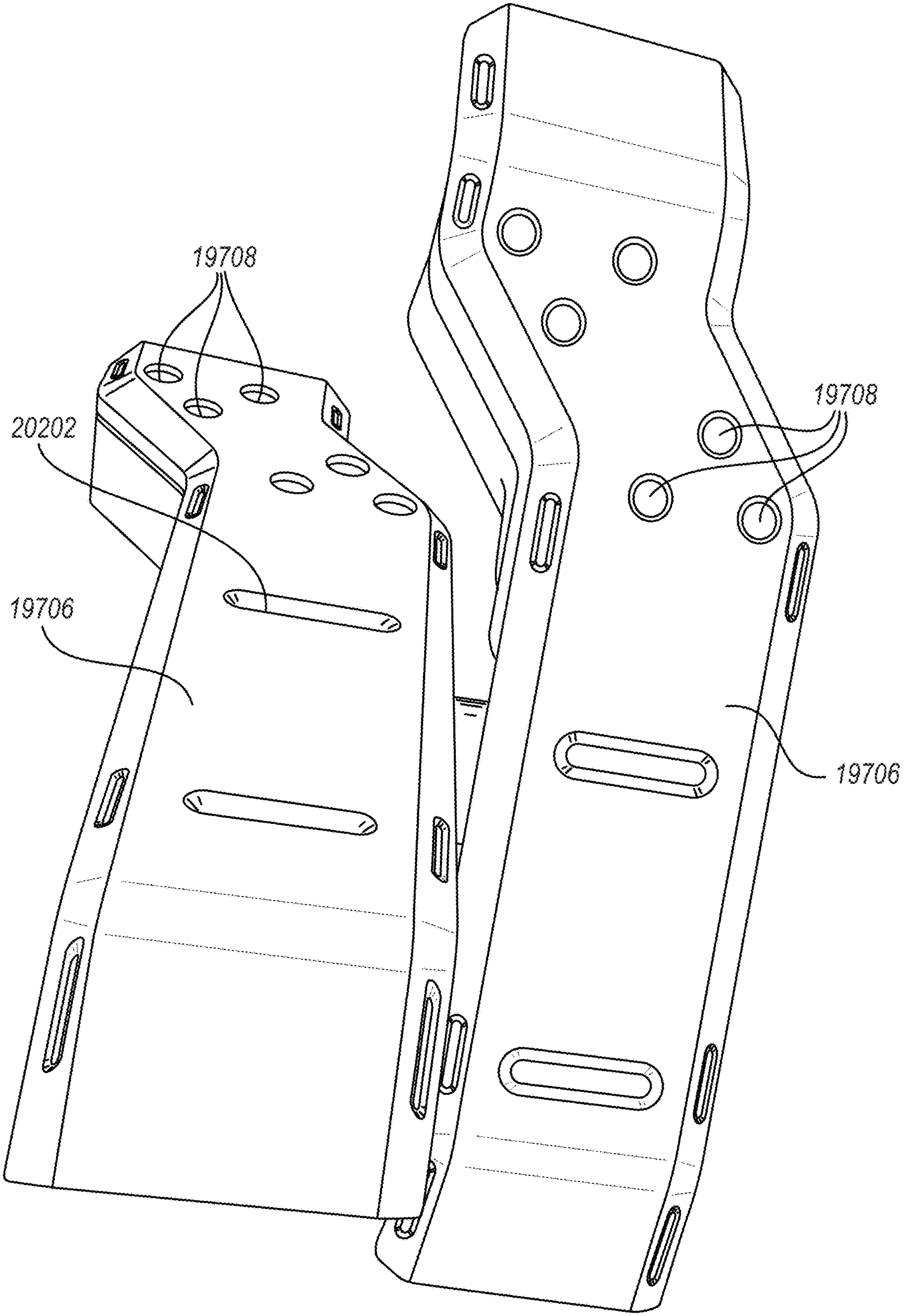
FIG. 105 depicts a bottom view of two sleds in a pivoted position.

FIG. 105 depicts a bottom view of two sled body lower portions 19706 in a pivoted position. The example of FIG. 105 is a schematic depiction of sled body lower portions, with the sled bottom surface omitted. In certain embodiments, the inspection robot may be operated with the sled lower body portions 19706 in contact with the inspection surface, and accordingly the sled bottom surface may be omitted. Additionally, the depiction of FIG. 105 with the sled bottom surface portion omitted allows for depiction of certain features of the example sled body lower portions 19706. The example of FIG. 105 includes sled body lower portions 19706 having coupling slots 20202 engageable with matching coupling tabs 19710 of the sled bottom surface. The number and position of the slots 20202 and/or tabs 19710 is a non-limiting example, and a sled body lower portion 19706 may include slots 20202 that are not utilized by a particular sled bottom surface, for example to maintain compatibility with a number of sled bottom surface components. In certain embodiments, the slots 20202 positioned on the sled body lower portions 19706 rather than on the sled bottom surface portions allow for the sleds to be operated without the sled bottom surface. In certain embodiments, the slots 20202 may be present on the sled bottom surface, and the tabs 19710 may be present on the sled body lower portions 19706, and/or the slots 20202 and tabs 19710 may be mixed between the sled bottom surface, and the tabs 19710 may be present on the sled body lower portions 19706.

In certain embodiments, an inspection robot and/or payload arrangement may be configured to engage a flat inspection surface, for example at FIG. 103. The depiction of FIG. 103 engageable to a flat inspection surface is a non-limiting example, and an arrangement otherwise consisting with FIG. 103 may be matched, utilizing sled bottom surfaces, overall sled engagement positions (e.g., see FIG. 51), or freedom of relative movement of sleds and/or arms to engage a curved surface, a concave surface, a convex surface, and/or combinations of these (e.g., a number of parallel pipes having undulations, varying pipe diameters, etc.). An inspection robot and/or payload arrangement as set forth herein may be configured to provide a number of inspection sensors distributed horizontally and operationally engaged with the inspection surface, where movement on the inspection surface by the inspection robot moves the inspection sensors along the inspection surface. In certain embodiments, the arrangement is configurable to ensure the inspection sensors remain operationally engaged with a flat inspection surface, with a concave inspection surface, and/or with a convex inspection surface. Additionally, the arrangement is configurable, for example utilizing pivotal and/or rotation arrangements of the arms and/or payloads, to maintain operational contact between the inspection sensors and an inspection surface having a variable curvature. For example, an inspection robot positioned within a large concave surface such as a pipe or a cylindrical tank, where the inspection robot moves through a vertical orientation (from the inspection robot perspective) is not either parallel to or perpendicular to a longitudinal axis of the pipe, will experience a varying concave curvature with respect to the horizontal orientation (from the inspection robot perspective), even where the pipe has a constant curvature (from the perspective of the pipe). In another example, an inspection robot traversing an inspection surface having variable curvature, such as a tank having an ellipsoid geometry, or a cylindrical tank having caps with a distinct curvature relative to the cylindrical body of the tank.

Numerous embodiments described throughout the present disclosure are well suited to successfully execute inspections of inspection surfaces having flat and/or varying curvature geometries. For example, payload arrangements described herein allow for freedom of movement of sensor sleds to maintain operational contact with the inspection surface over the entire inspection surface space. Additionally, control of the inspection robot movement with positional interaction, including tracking inspection surface positions that have been inspected, determining the position of the inspection robot using dead reckoning, encoders, and/or absolute position detection, allows for assurance that the entire inspection surface is inspected according to a plan (e.g., an inspection map 16330), and that progression across the surface can be performed without excessive repetition of movement. Additionally, the ability of the inspection robot to determine which positions have been inspected, to utilize transformed conceptualizations of the inspection surface (e.g., reference FIG. 85 and the related description), and the ability of the inspection robot to reconfigure (e.g., payload arrangements, physical sensor arrangements, down force applied, and/or to raise payloads), enable and/or disable sensors and/or data collection, allows for assurance that the entire inspection surface is inspected without excessive data collection and/or utilization of couplant. Additionally, the ability of the inspection robot to traverse between distinct surface orientations, for example by lifting the payloads and/or utilizing a stability support device, allows the inspection robot to traverse distinct surfaces, such as surfaces within a tank interior, surfaces in a pipe bend, or the like. Additionally, embodiments set forth herein allow for an inspection robot to traverse a pipe or tank interior or exterior in a helical path, allowing for an inspection having a selected inspection resolution of the inspection surface within a single pass (e.g., where representative points are inspected, and/or wherein the helical path is selected such that the horizontal width of the sensors overlaps and/or is acceptably adjacent on subsequent spirals of the helical path).

It can be seen that various embodiments herein provide for an inspection robot capable to inspect a surface such as an interior of a pipe and/or an interior of a tank. Additionally, embodiments of an inspection robot herein are operable at elevated temperatures relative to acceptable temperatures for personnel, and operable in composition environments (e.g., presence of $CO_2$, low oxygen, etc.) that are not acceptable to personnel. Additionally, in certain embodiments, entrance of an inspection robot into certain spaces may be a trivial operation, where entrance of a person into the space may require exposure to risk, and/or require extensive preparation and verification (e.g., lock-out/tag-out procedures, confined space procedures, exposure to height procedures, etc.). Accordingly, embodiments throughout the present disclosure provide for improved cost, safety, capability, and/or completion time of inspections relative to previously known systems or procedures. The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A method for inspecting an inspection surface using an inspection robot, comprising:

inspecting the inspection surface with a first sled assembly, wherein the first sled assembly includes a first forward sensor mount group and a second rearward sensor mount group, wherein the first forward sensor mount group is positioned at a first characteristic horizontal position, and wherein the second rearward sensor mount group is positioned at a second characteristic horizontal position;

inspecting the inspection surface with a second sled assembly, wherein the second sled assembly includes a third forward sensor mount group and a fourth rearward sensor mount group, wherein the third forward sensor mount group is positioned at a third characteristic horizontal position, and wherein the fourth rearward sensor mount group is positioned at a fourth characteristic horizontal position;

interpreting a first calibration value for a plurality of sensors of the first forward sensor mount group and a plurality of sensors of the third forward sensor mount group;

performing inspection operations based on the first calibration value; and capturing inspection data based on the inspection operations, wherein the plurality of sensors of the first forward sensor mount group and the plurality of sensors of the third forward sensor mount group are a same type of sensor.

2. The method of claim 1, further comprising:

interpreting a first processing value for the plurality of sensors of the first forward sensor mount group and the plurality of sensors of the third forward sensor mount group;

interpreting a second processing value for a plurality of sensors of the second rearward sensor mount group and a plurality of sensors of the fourth rearward sensor mount group; and performing the inspection operations based on the first processing value and the second processing value.

3. The method of claim 1, further comprising:

further interpreting the first calibration value for a plurality of sensors of the second rearward sensor mount group, wherein the plurality of sensors of the first forward sensor mount group and the plurality of sensors of the second rearward sensor mount group are a same type of sensor.

4. The method of claim 1, further comprising:

interpreting a first processing value for the plurality of sensors of the first forward sensor mount group and a plurality of sensors of the second rearward sensor mount group; and performing the inspection operations based on the first processing value, wherein the plurality of sensors of the first forward sensor mount group and the plurality of sensors of the second rearward sensor mount group are a same type of sensor.

5. A method for inspecting an inspection surface using an inspection robot, comprising:

inspecting the inspection surface with a first sled assembly, wherein the first sled assembly includes a first forward sensor mount group and a second rearward sensor mount group, wherein the first forward sensor mount group is positioned at a first characteristic horizontal position, and wherein the second rearward sensor mount group is positioned at a second characteristic horizontal position;

inspecting the inspection surface with a second sled assembly, wherein the second sled assembly includes a third forward sensor mount group and a fourth rearward sensor mount group, wherein the third forward sensor mount group is positioned at a third characteristic horizontal position, and wherein the fourth rearward sensor mount group is positioned at a fourth characteristic horizontal position;

interpreting a first calibration value for a plurality of sensors of the first forward sensor mount group and a plurality of sensors of the second rearward sensor mount group;

performing inspection operations based on the first calibration value; and capturing inspection data based on the inspection operations, wherein the plurality of sensors of the first forward sensor mount group and the plurality of sensors of the second rearward sensor mount group are a same type of sensor.

6. The method of claim 5, further comprising:

interpreting a first processing value for the plurality of sensors of the first forward sensor mount group and a plurality of sensors of the second rearward sensor mount group; and performing the inspection operations based on the first processing value.

7. A method for inspecting an inspection surface using an inspection robot, comprising:

inspecting the inspection surface with a first sled assembly, wherein the first sled assembly includes a first forward sensor mount group and a second rearward sensor mount group, wherein the first forward sensor mount group is positioned at a first characteristic horizontal position, and wherein the second rearward sensor mount group is positioned at a second characteristic horizontal position;

inspecting the inspection surface with a second sled assembly, wherein the second sled assembly includes a third forward sensor mount group and a fourth rearward sensor mount group, wherein the third forward sensor mount group is positioned at a third characteristic horizontal position, and wherein the fourth rearward sensor mount group is positioned at a fourth characteristic horizontal position;

interpreting a first processing value for a plurality of sensors of the first forward sensor mount group and a plurality of sensors of the third forward sensor mount group;

interpreting a second processing value for a plurality of sensors of the second rearward sensor mount group and a plurality of sensors of the fourth rearward sensor mount group;

performing inspection operations based on the first processing value and the second processing value; and capturing inspection data based on the inspection operations, wherein the plurality of sensors of the first forward sensor mount group and the plurality of sensors of the third forward sensor mount group are a same type of sensor.

8. The method of claim 7, further comprising:

interpreting a first calibration value for the plurality of sensors of the first forward sensor mount group and a plurality of sensors of the second rearward sensor mount group; and performing the inspection operations based on the first calibration value, wherein the plurality of sensors of the first forward sensor mount group and the plurality of sensors of the second rearward sensor mount group are a same type of sensor.

9. The method of claim 7, further comprising:

further interpreting the first processing value for a plurality of sensors of the second rearward sensor mount group, wherein the plurality of sensors of the first forward sensor mount group and the plurality of sensors of the second rearward sensor mount group are a same type of sensor.

10. A method for inspecting an inspection surface using an inspection robot, comprising:

inspecting the inspection surface with a first sled assembly, wherein the first sled assembly includes a first forward sensor mount group and a second rearward sensor mount group, wherein the first forward sensor mount group is positioned at a first characteristic horizontal position, and wherein the second rearward sensor mount group is positioned at a second characteristic horizontal position;

inspecting the inspection surface with a second sled assembly, wherein the second sled assembly includes a third forward sensor mount group and a fourth rearward sensor mount group, wherein the third forward sensor mount group is positioned at a third characteristic horizontal position, and wherein the fourth rearward sensor mount group is positioned at a fourth characteristic horizontal position;

interpreting a first processing value for a plurality of sensors of the first forward sensor mount group and a plurality of sensors of the second rearward sensor mount group;

performing inspection operations based on the first processing value; and capturing inspection data based on the inspection operations, wherein the plurality of sensors of the first forward sensor mount group and the plurality of sensors of the second rearward sensor mount group are a same type of sensor.

* * * * *